(12) United States Patent
Oshima et al.

(10) Patent No.: US 12,344,399 B2
(45) Date of Patent: Jul. 1, 2025

(54) LIFTING SYSTEM

(71) Applicant: Panasonic Intellectual Property Corporation of America, Torrance, CA (US)

(72) Inventors: Mitsuaki Oshima, Kyoto (JP); Takuya Takahama, Osaka (JP); Fumio Muramatsu, Kyoto (JP); Kazuma Kitazawa, Osaka (JP); Hideki Aoyama, Osaka (JP); Nobuaki Hayashi, Osaka (JP); Gaku Sasaki, Osaka (JP); Ryosuke Amagai, Osaka (JP); Tatsuya Kato, Osaka (JP); Naoyuki Taniuchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 377 days.

(21) Appl. No.: 17/618,782

(22) PCT Filed: Feb. 7, 2020

(86) PCT No.: PCT/JP2020/004943
§ 371 (c)(1),
(2) Date: Dec. 13, 2021

(87) PCT Pub. No.: WO2020/250484
PCT Pub. Date: Dec. 17, 2020

(65) Prior Publication Data
US 2022/0250768 A1 Aug. 11, 2022

Related U.S. Application Data

(60) Provisional application No. 62/968,542, filed on Jan. 31, 2020, provisional application No. 62/877,026, (Continued)

(30) Foreign Application Priority Data
Aug. 9, 2019 (JP) .................................. 2019-147334

(51) Int. Cl.
*B61B 13/00* (2006.01)
*B64C 19/02* (2006.01)
(Continued)

(52) U.S. Cl.
CPC ................ *B64F 1/32* (2013.01); *B61B 13/00* (2013.01); *B64C 19/02* (2013.01); *B64D 1/22* (2013.01);
(Continued)

(58) Field of Classification Search
CPC ....... B64C 39/02; B64C 39/024; B64C 37/02; B64U 10/13; B64U 2101/60; B64U 2101/67; B64D 1/08; B64D 1/12
See application file for complete search history.

(56) References Cited

U.S. PATENT DOCUMENTS 11,142,316 B2 * 10/2021 Sikora ...................... B64D 1/22
11,325,702 B2 * 5/2022 Zawadzki ................ B64D 1/02
(Continued)

FOREIGN PATENT DOCUMENTS

CN       204563394      8/2015
JP       2018-012477 A  1/2018
(Continued)

OTHER PUBLICATIONS

International Search Report (including English Language Translation), mailed Mar. 24, 2020 by the Japan Patent Office (JPO), in International Application No. PCT/JP2020/004943.
(Continued)

*Primary Examiner* — Philip J Bonzell
*Assistant Examiner* — Anna L. Gordon
(74) *Attorney, Agent, or Firm* — Greenblum & Bernstein, P.L.C.

(57) ABSTRACT

A lifting system includes an unmanned aerial vehicle, a thruster device, a first wire, a first reel, a second thruster device, a second wire, a second reel, and a controller. When the unmanned aerial vehicle is in a position separated from
(Continued)

the ground, the controller detaches the first thruster device and the second thruster device from the unmanned aerial vehicle, causes the first reel to reel out the first wire, detaches the second thruster device from the first thruster device, and causes the second reel to reel out the second wire.

17 Claims, 127 Drawing Sheets

Related U.S. Application Data filed on Jul. 22, 2019, provisional application No. 62/861,733, filed on Jun. 14, 2019.

(51) Int. Cl.
  *B64D 1/22* (2006.01)
  *B64F 1/32* (2006.01)
  *B64U 10/14* (2023.01)
  *B64U 50/19* (2023.01)
  *B64U 60/50* (2023.01)
  *B64U 101/67* (2023.01)
  *B64U 30/299* (2023.01)
  *B64U 101/30* (2023.01)

(52) U.S. Cl.
  CPC .............. *B64U 50/19* (2023.01); *B64U 10/14* (2023.01); *B64U 30/299* (2023.01); *B64U 60/50* (2023.01); *B64U 2101/30* (2023.01); *B64U 2101/67* (2023.01); *B64U 2201/10* (2023.01); *B64U 2201/102* (2023.01); *B64U 2201/20* (2023.01)

(56) References Cited

U.S. PATENT DOCUMENTS

| | | | |
|---|---|---|---|
| 2013/0233964 A1* | 9/2013 | Woodworth | B64D 17/80 244/175 |
| 2017/0247109 A1* | 8/2017 | Buchmueller | B64C 39/024 |
| 2017/0369167 A1* | 12/2017 | Meadow | G06Q 10/08 |
| 2020/0324902 A1* | 10/2020 | Burgess | B64C 39/024 |
| 2021/0047032 A1* | 2/2021 | Bosma | B64C 29/02 |

FOREIGN PATENT DOCUMENTS

| | | | | |
|---|---|---|---|---|
| JP | 2019-085104 A | | 6/2019 | |
| KR | 20160150444 A | * | 12/2016 | |
| WO | 2019/041038 A1 | | 3/2019 | |
| WO | WO-2019055690 A1 | * | 3/2019 | ............ B64C 27/08 |
| WO | WO-2020247870 A1 | * | 12/2020 | ............ B64C 39/022 |

OTHER PUBLICATIONS

Extended European Search Report, dated Jul. 21, 2022, by the European Patent Office (EPO), for the counterpart European Patent Application No. 20822254.7.
Office Action from Japan Patent Office (JPO) in Japanese Patent Appl. No. 2023-143319, dated Jul. 16, 2024, together with an English language translation.

* cited by examiner

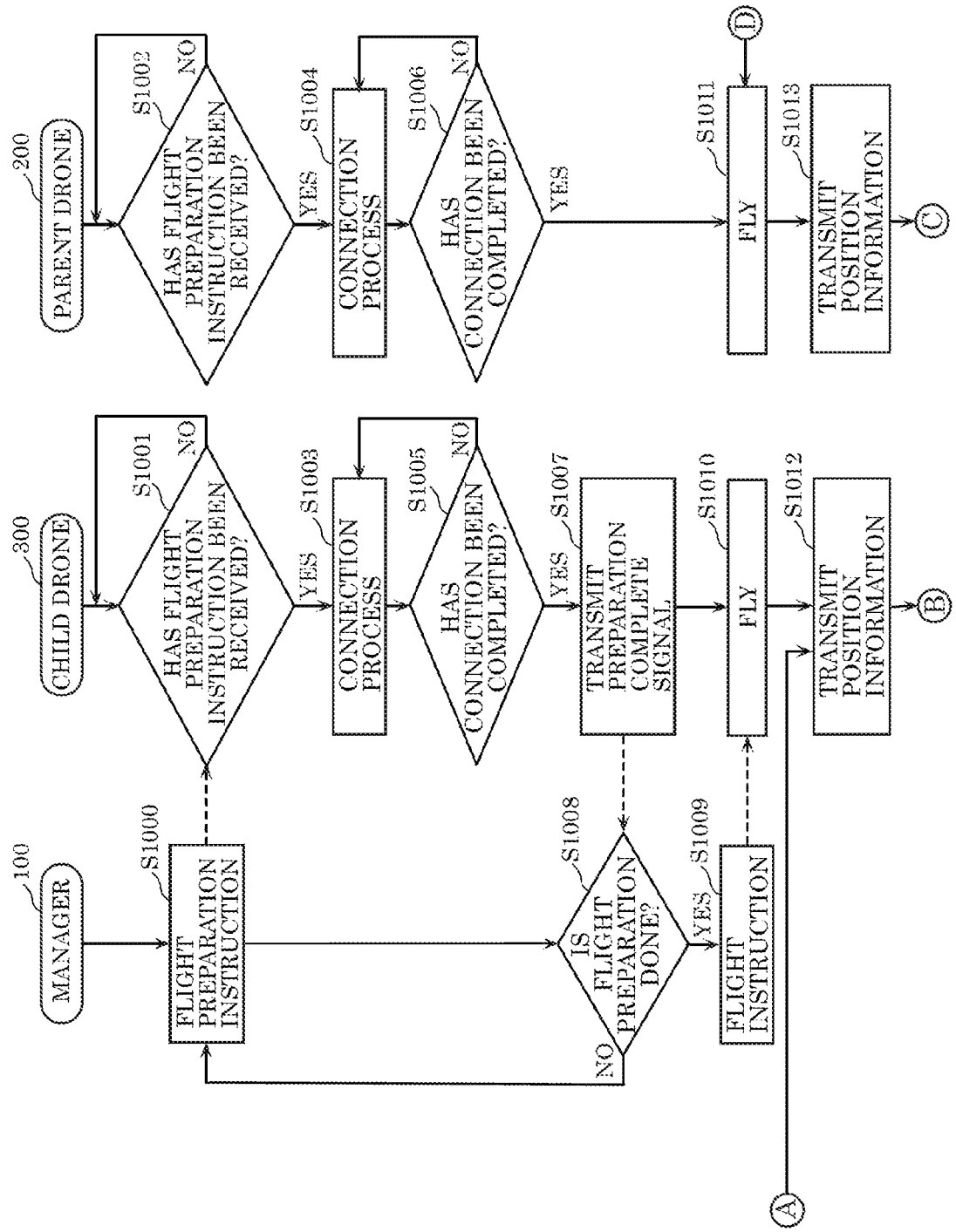

ARM IS ANCHORED TO RAIL

CHILD DRONE MAIN BODY DESCENDS

RETRACTED STATE

EXTENDED STATE

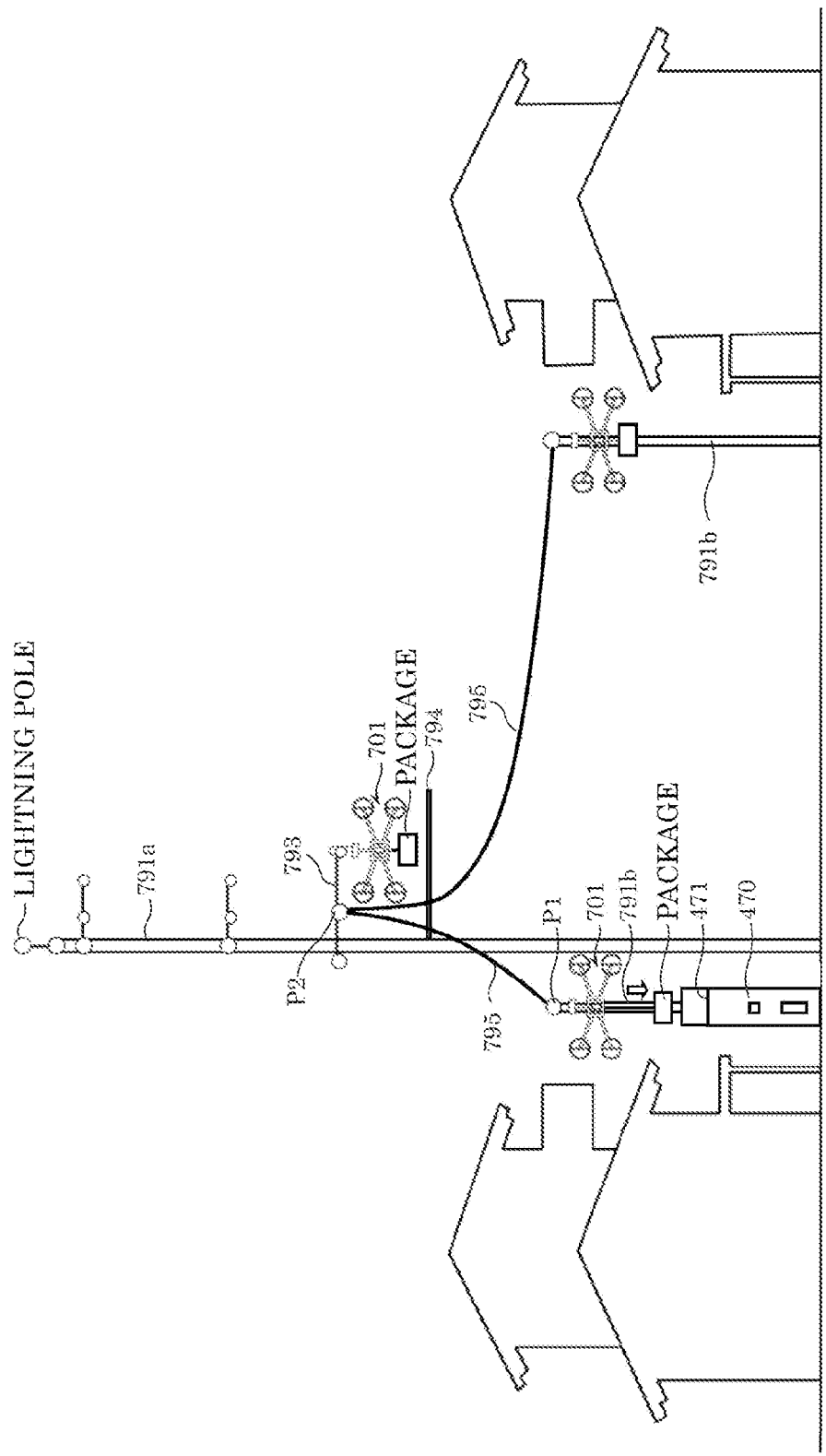

FIG. 119
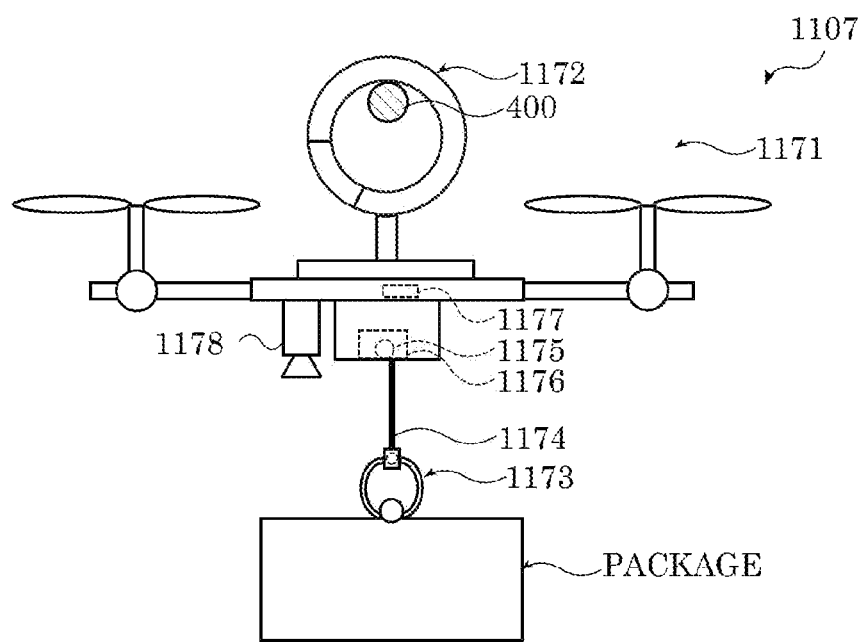
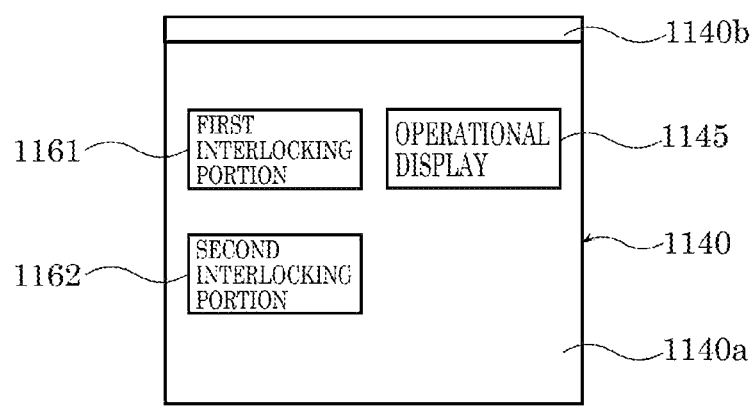

LIFTING SYSTEM

TECHNICAL FIELD

The present disclosure relates to a lifting system.

BACKGROUND ART

There is proposed a control method for providing improved safety while flying a drone, or an unmanned aerial vehicle (see, for example, Patent Literature (PTL) 1).

PTL 1 discloses a technique for detecting any anomaly in a flying drone with the use of various means and for retrieving the drone identified to be flying anomalously with the use of retrieving means provided on power lines, utility poles, or the like.

CITATION LIST

Patent Literature

PTL 1: Japanese Unexamined Patent Application Publication No. 2018-12477

SUMMARY OF THE INVENTION

Technical Problem

The system including the unmanned aerial vehicle disclosed in PTL 1 above can be improved upon.

Accordingly, the present disclosure provides a lifting system that improves upon the above related art.

Solution to Problem

A lifting system according to one aspect of the present disclosure includes: an unmanned aerial vehicle; a first device attachable to and detachable from the unmanned aerial vehicle; a first wire that connects the first device and the unmanned aerial vehicle; a first reel capable of reeling in the first wire; a second device attachable to and detachable from a package and attachable to and detachable from the first device; a second wire that connects the first device and the second device; a second reel capable of reeling in the second wire; and a controller. When the unmanned aerial vehicle is in a position separated from the ground, the controller: detaches the first device and the second device from the unmanned aerial vehicle; causes the first reel to reel out the first wire; detaches the second device from the first device; and causes the second reel to reel out the second wire.

These general or specific aspects may be implemented as an unmanned aerial vehicle, a storage device, one or more thruster devices, a system, a method, an integrated circuit, a computer program, or a computer-readable recording medium such as a CD-ROM, or any combination thereof.

Advantageous Effect of Invention

The lifting system according to the present disclosure is capable of improving upon the related art.

BRIEF DESCRIPTION OF DRAWINGS

FIG. 7A is a flowchart illustrating a third example of fall prevention control in the flying system according to Embodiment 1.

FIG. 63 is a schematic diagram illustrating an example of how a drone of the delivery system stores a package into a delivery box via a lead-in support pillar and a lead-in wire according to Embodiment 7.

FIG. 115 is a schematic diagram illustrating an example of the connector of the unmanned aerial vehicle according to Variation 1 of Embodiment 18.

FIG. 116 is a schematic diagram illustrating an example of the connector of the unmanned aerial vehicle according to Variation 2 of Embodiment 18.

FIG. 117 is a schematic diagram illustrating an example of the directions of rotation of the propellers when the unmanned aerial vehicle according to Variation 2 of Embodiment 18 is moving forward and braking.

FIG. 118 is a schematic diagram illustrating an example of the unmanned aerial vehicle and the delivery box according to Embodiment 19.

FIG. 119 is a schematic diagram illustrating an example of the unmanned aerial vehicle and the delivery box according to Embodiment 20.

FIG. 120 is a perspective view of an example of the unmanned aerial vehicle and the delivery box according to Embodiment 20.

FIG. 121 is a side view of an example of the movement of the delivery box when the unmanned aerial vehicle according to Embodiment 20 is hanging from a rail.

FIG. 122 is a flowchart illustrating an example of processes from start to finish of the delivery of a package to the delivery box by the unmanned aerial vehicle according to Embodiment 20.

FIG. 123 is a schematic diagram illustrating an example of processes from the start of storing of a package in the delivery box by the unmanned aerial vehicle according to Embodiment 20 to the disconnecting of the package by the second arm.

FIG. 124 is a schematic diagram illustrating an example of the unmanned aerial vehicle according to Embodiment 20 from the time the camera captures an image of the package stored in the delivery box to the time the unmanned aerial vehicle leaves the rail.

DESCRIPTION OF EXEMPLARY EMBODIMENTS

Figure 1:
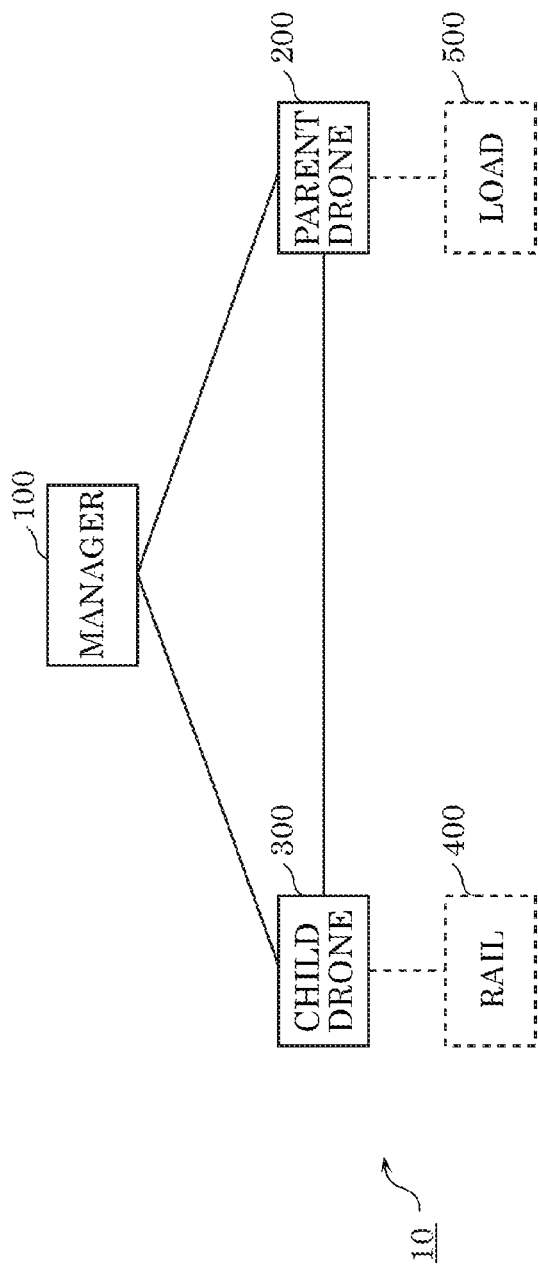
FIG. 1 is a schematic diagram illustrating an example of a flying system according to Embodiment 1.

A control method of controlling an unmanned aerial vehicle according to one aspect of the present disclosure is a control method of controlling a first unmanned aerial vehicle and a second unmanned aerial vehicle in a system that includes the first unmanned aerial vehicle and the second unmanned aerial vehicle coupled to the first unmanned aerial vehicle via a coupling line. The control method includes (A) causing the first unmanned aerial vehicle and the second unmanned aerial vehicle to move forward and (B) stopping the first unmanned aerial vehicle from moving forward when an anomaly has occurred in flying of the second unmanned aerial vehicle.

This method can reduce the possibility that the second unmanned aerial vehicle crashes into the ground, and a further improvement can be achieved as a result.

In the above (B), an operation of the first unmanned aerial vehicle may be changed from the forward movement to hovering.

This configuration allows the first unmanned aerial vehicle to remain in a predetermined position when an anomaly has occurred in the second unmanned aerial vehicle.

In the above (A), the first unmanned aerial vehicle may monitor the tension in the coupling line. In the above (B), the first unmanned aerial vehicle may detect an anomaly in flying of the second unmanned aerial vehicle based on a change in the tension.

This configuration allows the first unmanned aerial vehicle to detect an anomaly immediately when an anomaly has occurred in flying of the second unmanned aerial vehicle.

In the above (B), the first unmanned aerial vehicle may determine that an anomaly has occurred in flying of the second unmanned aerial vehicle when the tension has reached or exceeded a predetermined value.

This configuration allows the first unmanned aerial vehicle to quantitatively determine the presence of an anomaly when an anomaly has occurred in flying of the second unmanned aerial vehicle. The first unmanned aerial vehicle can detect an anomaly immediately when an anomaly has occurred in flying of the second unmanned aerial vehicle.

In the above (B), the second unmanned aerial vehicle may be caused to output an anomaly signal when an anomaly has occurred in flying of the second unmanned aerial vehicle, and the first unmanned aerial vehicle may determine that an anomaly has occurred in flying of the second unmanned aerial vehicle in response to receiving the anomaly signal.

This configuration allows the first unmanned aerial vehicle to detect an anomaly electrically when an anomaly has occurred in flying of the second unmanned aerial vehicle. The first unmanned aerial vehicle can receive the signal through wireless communication or wired communication. The first unmanned aerial vehicle can detect an anomaly immediately when an anomaly has occurred in flying of the second unmanned aerial vehicle.

The coupling line may include a communication cable, and the anomaly signal may be transmitted from the second unmanned aerial vehicle to the first unmanned aerial vehicle via the communication cable.

This configuration allows the first unmanned aerial vehicle to detect an anomaly immediately regardless of the radio signal reception status when an anomaly has occurred in flying of the second unmanned aerial vehicle.

The first unmanned aerial vehicle may include a camera. In the above (B), the first unmanned aerial vehicle may determine that an anomaly has occurred in the second unmanned aerial vehicle based on a video from the camera.

This configuration allows the first unmanned aerial vehicle to detect an anomaly while being aware of the specific situation through the video when an anomaly has occurred in flying of the second unmanned aerial vehicle even if no noticeable change occurs in the tension in the coupling line.

In the above (B), the length of the coupling line may be reduced when an anomaly has occurred in the second unmanned aerial vehicle.

This configuration makes it possible to reduce the size of the area in which the second unmanned aerial vehicle falls or the area in which the second unmanned aerial vehicle flies anomalously when an anomaly has occurred in the second unmanned aerial vehicle.

In the above (B), the length of the extended coupling line may be reduced by causing the first unmanned aerial vehicle to take up a portion of the coupling line.

This configuration makes it possible to reduce the length of the coupling line efficiently when an anomaly has occurred in the second unmanned aerial vehicle.

The system may further include a first rail fixed at a position spaced apart from the ground surface. In the above (A), the first unmanned aerial vehicle may be caused to move forward at a position where the first unmanned aerial vehicle is closer to the first rail than the second unmanned aerial vehicle is.

This configuration makes it possible to limit the flying route of the first unmanned aerial vehicle, and the first unmanned aerial vehicle can fly with higher spatial accuracy.

In the above (A), the first unmanned aerial vehicle may be caused to move forward at a position lower than the first rail.

This configuration allows the first unmanned aerial vehicle to fly stably.

In the above (A), the first unmanned aerial vehicle may be caused to move forward along the first rail with the first unmanned aerial vehicle being movably coupled to the first rail.

This configuration allows the first unmanned aerial vehicle to fly stably along the first rail.

In the above (B), the first unmanned aerial vehicle may be coupled to the first rail when an anomaly has occurred in flying of the second unmanned aerial vehicle.

This configuration allows the first unmanned aerial vehicle to fly stably even when an anomaly has occurred in the second unmanned aerial vehicle. In addition, the above configuration can keep the second unmanned aerial vehicle coupled to the first unmanned aerial vehicle via the coupling line from crashing into the ground.

The first unmanned aerial vehicle may include an arm that can be opened and closed. In the above (A), the first unmanned aerial vehicle may be caused to move forward with the arm open. In the above (B), the first unmanned aerial vehicle may be coupled to the first rail by closing the arm so as to enclose the first rail.

This configuration makes it possible to keep the first unmanned aerial vehicle from making contact with the rail while the first unmanned aerial vehicle is flying in the case of (A). In the case of (B), the above configuration allows the first unmanned aerial vehicle to fly stably even when an anomaly has occurred in the second unmanned aerial vehicle.

The arm may include a first arm and a second arm. When the arm is open, the distance between one end of the first arm and one end of the second arm is greater than the width of the first rail. When the arm is closed, the distance between the one end of the first arm and the one end of the second arm is smaller than the width of the first rail.

This configuration allows the first unmanned aerial vehicle to become disengaged from the rail while the arm is open and can keep the first unmanned aerial vehicle from becoming disengaged from the rail while the arm is closed.

The first unmanned aerial vehicle may be smaller than the second unmanned aerial vehicle.

This configuration can keep the first unmanned aerial vehicle from interfering with the flying second unmanned aerial vehicle, and the noise and so on can be reduced.

One end of the coupling line may be coupled to a lower surface of the first unmanned aerial vehicle while the first unmanned aerial vehicle is in a flying state.

This configuration can keep the coupling line coupling the first unmanned aerial vehicle and the second unmanned aerial vehicle from interfering with the flying first unmanned aerial vehicle.

The second unmanned aerial vehicle may include a ring that encloses the main body of the second unmanned aerial vehicle and that is rotatable relative to the main body. An outer peripheral surface of the ring may extend along a lower surface, a first side surface, an upper surface, and a second side surface of the main body of the second unmanned aerial vehicle while the second unmanned aerial vehicle is in a flying state. The other end of the coupling line may be coupled to the outer peripheral surface of the ring of the second unmanned aerial vehicle while the second unmanned aerial vehicle is in a flying state.

This configuration allows the second unmanned aerial vehicle to hang from the first unmanned aerial vehicle without flipping its body upside down even when the second unmanned aerial vehicle has fallen while flying.

The system may include a management server. The first rail may include a first recording surface on which first identification information for identifying the first rail is recorded. The first unmanned aerial vehicle may include at least one reading sensor for reading the first identification information from the first recording surface. In the above (A), the first unmanned aerial vehicle may cause the at least one reading sensor to read the first identification information continuously or intermittently. The first unmanned aerial vehicle may be caused to identify its own position based on the first identification information. The first unmanned aerial vehicle may be caused to wirelessly transmit first position information indicating the position of the first unmanned aerial vehicle to the management server continuously or intermittently.

This configuration allows the first unmanned aerial vehicle to identify its own position and in turn to fly with higher spatial accuracy.

In the above (A), the first unmanned aerial vehicle may be caused to wirelessly transmit second position information indicating the relative positions of the first unmanned aerial vehicle and the second unmanned aerial vehicle to the management server continuously or intermittently. The management server may be caused to identify the position of the second unmanned aerial vehicle based on the first position information and the second position information.

This configuration allows the management server to grasp the position of the second unmanned aerial vehicle. The second unmanned aerial vehicle can in turn fly with higher spatial accuracy.

Prior to the above (A), the first unmanned aerial vehicle may be caused to download, from the management server, rail information indicating a plurality of rails disposed along a planned flying route of the first unmanned aerial vehicle and the second unmanned aerial vehicle. In the above (A), the first unmanned aerial vehicle may be caused to compare the first identification information against the rail information so as to identify the position of the first unmanned aerial vehicle.

This configuration allows the first unmanned aerial vehicle to acquire the rail information and to identify its own position based on the acquired rail information. Thus, the first unmanned aerial vehicle can fly with higher spatial accuracy.

The rail information may include identification information of each of the plurality of rails and coordinate information indicating the geographical coordinates of each of the plurality of rails.

This configuration allows the first unmanned aerial vehicle to identify each rail and to acquire the coordinate information indicating the position of each rail. Thus, the first unmanned aerial vehicle can fly with higher spatial accuracy.

The at least one reading sensor may be at least one optical sensor.

This configuration allows the first unmanned aerial vehicle to grasp the position of the rail, and thus the first unmanned aerial vehicle can fly with higher spatial accuracy.

The recording surface may be disposed on the outer peripheral surface of the first rail. The at least one optical sensor may include a plurality of optical sensors. In the above (A), the plurality of optical sensors may scan the recording surface in mutually different directions.

This configuration allows the first unmanned aerial vehicle to read the identification information and so on of the rail from different directions with the use of the plurality of sensors and thus to read the identification information of the rail reliably.

The first recording surface may have further recorded thereon altitude information indicating the altitude of the first rail.

This configuration allows the first unmanned aerial vehicle to acquire the altitude information of each rail, and thus the first unmanned aerial vehicle can fly with higher spatial accuracy.

The control method may further include (C) changing the flying course of the second unmanned aerial vehicle when a following aerial vehicle that flies behind the second unmanned aerial vehicle passes the second unmanned aerial vehicle.

This configuration allows the unmanned aerial vehicle flying behind the second unmanned aerial vehicle to pass the second unmanned aerial vehicle without colliding with the second unmanned aerial vehicle by causing the second unmanned aerial vehicle to change its flying course.

In the above (C), the flying course of the second unmanned aerial vehicle may be changed to a direction away from the first unmanned aerial vehicle.

This configuration can keep the second unmanned aerial vehicle from colliding with the first unmanned aerial vehicle when the second unmanned aerial vehicle is passed by the following aerial vehicle.

In the above (C), the second unmanned aerial vehicle may be returned to its original flying course after the following aerial vehicle has passed the second unmanned aerial vehicle.

This configuration allows the second unmanned aerial vehicle to return to its original flying course after having been passed by the following aerial vehicle and thus to continue flying along the flying course held before the second unmanned aerial vehicle has been passed by the following aerial vehicle.

In the above (C), the length of the coupling line extending from the first unmanned aerial vehicle to the second unmanned aerial vehicle may be increased before the following aerial vehicle passes the second unmanned aerial vehicle.

This configuration allows the second unmanned aerial vehicle to change its own flying course smoothly when the second unmanned aerial vehicle is to be passed by the following aerial vehicle.

The system may further include a third unmanned aerial vehicle that shares the first rail with the first unmanned aerial vehicle and a fourth unmanned aerial vehicle that is coupled to the third unmanned aerial vehicle via a coupling line. The control method may further include (D) changing the flying course of the first unmanned aerial vehicle when the third unmanned aerial vehicle flying behind the first unmanned aerial vehicle passes the first unmanned aerial vehicle.

With this configuration, as the first unmanned aerial vehicle is caused to change its flying course, the third unmanned aerial vehicle and the fourth unmanned aerial vehicle coupled to the third unmanned aerial vehicle via the coupling line can pass the first unmanned aerial vehicle without colliding with the first unmanned aerial vehicle.

In the above (D), the flying course of the first unmanned aerial vehicle may be changed to a direction away from the first rail.

This configuration allows the third unmanned aerial vehicle and the fourth unmanned aerial vehicle coupled to the third unmanned aerial vehicle via the coupling line to pass the first aerial vehicle without changing the courses of the third unmanned aerial vehicle and the fourth unmanned aerial vehicle.

The system may further include a second rail that is fixed at a position spaced apart from the ground surface and that extends parallel to the first rail. In the above (D), the flying course of the first unmanned aerial vehicle may be changed to a direction approaching the second rail.

With this configuration, as the first unmanned aerial vehicle is caused to change its flying course so as to approach the second rail, the third unmanned aerial vehicle and the fourth unmanned aerial vehicle coupled to the third unmanned aerial vehicle via the coupling line can pass the first unmanned aerial vehicle without colliding with the first unmanned aerial vehicle.

In the above (A), the first unmanned aerial vehicle may be caused to move forward along the first rail with the first unmanned aerial vehicle being movably coupled to the first rail. In the above (D), the first unmanned aerial vehicle may be caused to disengage itself from the first rail and to couple itself to the second rail before the third unmanned aerial vehicle passes the first unmanned aerial vehicle, and the first unmanned aerial vehicle may be caused to disengage itself from the second rail and to couple itself to the first rail after the third unmanned aerial vehicle has passed the first unmanned aerial vehicle.

This configuration allows the third unmanned aerial vehicle and the fourth unmanned aerial vehicle coupled to the third unmanned aerial vehicle via the coupling line to pass the first unmanned aerial vehicle without colliding with the first unmanned aerial vehicle.

When viewed in a direction perpendicular to the ground surface, the distance between the first rail and the second rail may be greater than the width of the first unmanned aerial vehicle.

This configuration allows the first unmanned aerial vehicle to move within a space between the first rail and the second rail without making contact with the rails. The above configuration can also reduce the possibility that the first unmanned aerial vehicle collides with another unmanned aerial vehicle behind the first unmanned aerial vehicle when the first unmanned aerial vehicle is passed by the other unmanned aerial vehicle from behind.

The first rail and the second rail may be disposed at the same height from the ground surface.

This configuration allows a plurality of parent-child drones to fly at the same altitude when any passing occurs.

The system may further include a third unmanned aerial vehicle that is coupled to the second unmanned aerial vehicle via a coupling line and that shares the first rail with the first unmanned aerial vehicle, a fourth unmanned aerial vehicle that shares the first rail with the first unmanned aerial vehicle and the third unmanned aerial vehicle, and a fifth unmanned aerial vehicle that is coupled to the fourth unmanned aerial vehicle via a coupling line. In the above (A), the first unmanned aerial vehicle and the third unmanned aerial vehicle may each be caused to move forward along the first rail with the first unmanned aerial vehicle and the third unmanned aerial vehicle being movably coupled to the first rail. In the control method, furthermore, (E) in a case where the first unmanned aerial vehicle and the third unmanned aerial vehicle are flying behind the fourth unmanned aerial vehicle and where the second unmanned aerial vehicle is flying behind the fifth unmanned aerial vehicle, when the second unmanned aerial vehicle is to pass the fifth unmanned aerial vehicle, the first unmanned aerial vehicle may be disengaged from the first rail, the first unmanned aerial vehicle may be moved to the front of the fourth unmanned aerial vehicle, the first unmanned aerial vehicle may be recoupled to the first rail, the second unmanned aerial vehicle may be moved to the front of the fifth unmanned aerial vehicle after the first unmanned aerial vehicle has been recoupled to the first rail, the third unmanned aerial vehicle may be disengaged from the first rail after the first unmanned aerial vehicle has been recoupled to the first rail, the third unmanned aerial vehicle may be moved to the front of the fourth unmanned aerial vehicle, and the third unmanned aerial vehicle may be recoupled to the first rail.

This configuration allows the second unmanned aerial vehicle to pass the fifth unmanned aerial vehicle without the coupling lines being tangled up.

The system may further include a second rail that is fixed at a position spaced apart from the ground surface and that is disposed adjacent to the first rail with a space provided therebetween. In the control method, furthermore, (F) the first unmanned aerial vehicle may be moved from the vicinity of the first rail to the vicinity of the second rail when the first unmanned aerial vehicle is moving forward along the first rail and the second rail is located in the direction in which the first unmanned aerial vehicle moves forward.

This configuration allows the second unmanned aerial vehicle to pass the first unmanned aerial vehicle without colliding with the first unmanned aerial vehicle.

In the above (F), the altitude of the first unmanned aerial vehicle may be temporarily raised when the first unmanned aerial vehicle is to become disengaged from the first rail.

This configuration allows the first unmanned aerial vehicle to become disengaged from the first rail smoothly.

In the above (F), the altitude of the first unmanned aerial vehicle may be raised higher than the height of the first rail and the height of the second rail.

This configuration allows the first unmanned aerial vehicle to change its position without colliding with the rails.

In the control method, furthermore, (G) the first unmanned aerial vehicle may be stopped from flying while the second unmanned aerial vehicle is flying, the second unmanned aerial vehicle may be caused to take up the coupling line, and the first unmanned aerial vehicle may be anchored to the second unmanned aerial vehicle.

This configuration allows the second unmanned aerial vehicle to anchor the first unmanned aerial vehicle at a predetermined position between the second unmanned aerial vehicle and the first unmanned aerial vehicle.

In the above (G), the second unmanned aerial vehicle may be housed inside the first unmanned aerial vehicle.

This configuration allows the first unmanned aerial vehicle and the second unmanned aerial vehicle to fly while being united to each other in a location where no rail is present.

The second unmanned aerial vehicle may include a housing opening for housing a package, and the housing opening may be located in a panel regarded as a side panel when the second unmanned aerial vehicle is flying.

This configuration allows the second unmanned aerial vehicle to house a package through the housing opening and to deliver the package.

The control method of controlling an unmanned aerial vehicle may be executed by a computer.

Thus, the control method of controlling an unmanned aerial vehicle described above can be executed by a computer.

Moreover, a system may include an unmanned aerial vehicle and another unmanned aerial vehicle coupled to the unmanned aerial vehicle via a coupling line, and the unmanned aerial vehicle may include a first controller. The first controller may cause the unmanned aerial vehicle to move forward or to stop moving forward when an anomaly has occurred in the other unmanned aerial vehicle.

This configuration allows the first unmanned aerial vehicle to be caused to move forward or to stop moving forward by the first controller. Therefore, the first unmanned aerial vehicle can be operated remotely, for example.

Moreover, a system may include a first unmanned aerial vehicle and a second unmanned aerial vehicle coupled to the first unmanned aerial vehicle via a coupling line. The first unmanned aerial vehicle may include a first controller, and the second unmanned aerial vehicle may include a second controller. The first controller may cause the first unmanned aerial vehicle to move forward or to stop moving forward when an anomaly has occurred in flying of the second unmanned aerial vehicle.

This configuration allows the first unmanned aerial vehicle and the second unmanned aerial vehicle to be caused to move forward or to stop moving forward by the first controller and the second controller, respectively. Therefore, the first unmanned aerial vehicle and the second unmanned aerial vehicle can be operated remotely, for example.

An unmanned aerial vehicle is an unmanned aerial vehicle that delivers a package, and the unmanned aerial vehicle includes a plurality of rotary wings, a plurality of first motors that respectively rotate the plurality of rotary wings, a main body that supports the plurality of first motors, a connector that is to be connected to a rail provided at a position spaced apart from a ground surface with the main body hanging from the connector, a movable block that sets an inclination of an virtual plane containing the plurality of rotary wings relative to a support direction in which the connector is supported on the rail, and a control circuit that controls the plurality of first motors and the movable block. The connector includes a first end connected to the main body and a second end to be slidably connected to the rail. The support direction extends from the first end toward the second end of the connector. When the second end of the connector is connected to the rail, the control circuit (i) sets a rotation rate of the plurality of first motors to a rotation rate that is lower than a minimum rotation rate necessary for causing the unmanned aerial vehicle to float and that is higher than a minimum rotation rate necessary for propelling the unmanned aerial vehicle in a direction in which the rail extends and (ii) causes the movable block to increase an angle formed by a normal direction of the virtual plane relative to the support direction of the connector.

According to this configuration, the unmanned aerial vehicle can move along the rail with the connector of the unmanned aerial vehicle being connected to the rail. In the case of (i), the control circuit controls the rotation rate of the plurality of first motors to the rotation rate that is lower than the minimum rotation rate necessary for causing the unmanned aerial vehicle to float and that is higher than the minimum rotation rate necessary for propelling the unmanned aerial vehicle. Therefore, the unmanned aerial vehicle can move along the rail at an appropriate speed. In the case of (ii), the control circuit controls the actuator so as to change the inclination of the virtual plane containing the plurality of rotary wings relative to the support direction of the connector. Therefore, the speed of the unmanned aerial vehicle can be regulated.

A delivery system may include an unmanned aerial vehicle, a plurality of support pillars, and the rail stretched between two adjacent support pillars of the plurality of support pillars.

The movable block may be disposed between the main body and the connector.

This configuration allows the movable block to change the angle of the connector relative to the main body with ease.

For example, in a case where the connector is disposed at or around the center of gravity of the main body, the movable block is also disposed at or around the center of gravity of the main body. This configuration makes it possible to balance the center of gravity of the unmanned aerial vehicle.

The unmanned aerial vehicle may further include a pair of wings.

According to this configuration, for example, the unmanned aerial vehicle can be rotated in the horizontal direction if the pair of wings are yaw wings, or the unmanned aerial vehicle can be rotated in the vertical direction if the pair of wings are pitch wings. As a result, the traveling direction of the unmanned aerial vehicle can be steered freely, and thus the unmanned aerial vehicle can be moved stably.

After the movable block has increased the angle, the control circuit may disengage the connector from the rail when a propulsion speed of the unmanned aerial vehicle exceeds a predetermined value.

This configuration can keep the connector from making contact with the rail, and thus the safety of the unmanned aerial vehicle can be increased.

When the connector is being disengaged from the rail, the control circuit may cause the movable block to reduce the angle and control the rotation rate of the plurality of first motors to a rotation rate higher than the minimum rotation rate necessary for causing the unmanned aerial vehicle to float.

According to this configuration, when the connector is disengaged from the rail, the unmanned aerial vehicle can float to a predetermined height from the ground surface by reducing the angle. This can keep the unmanned aerial vehicle from making contact with an object, and thus the safety of the unmanned aerial vehicle can be increased.

In the above (ii), the control circuit may control the rotation rate of the plurality of first motors so as to increase the angle to greater than 15 degrees.

This configuration makes it possible to appropriately set the speed of the unmanned aerial vehicle.

In the above (ii), the control circuit may control the rotation rate of the plurality of first motors so as to increase the angle to greater than 45 degrees.

In the above (ii), the control circuit may control the rotation rate of the plurality of first motors so as to increase the angle to greater than 65 degrees.

In the above (ii), the control circuit may control the rotation rate of the plurality of first motors so as to increase the angle to greater than 80 degrees.

The connector may include a support portion swingably connected to the main body and a first arm connected to one end of the support portion.

This configuration allows the first arm to swing along with a swinging movement of the support portion. Therefore, the first arm can connect itself to the rail more easily.

The first arm may be a hanger for hanging the unmanned aerial vehicle from the rail.

According to this configuration, the first arm can be hung on the rail when the unmanned aerial vehicle has stopped. Therefore, the unmanned aerial vehicle can place a package at a receiver with the unmanned aerial vehicle hanging from the rail.

The connector may further include a wheel that is connected to the first arm and that allows the connector to rotatably make contact with the rail.

According to this configuration, when the unmanned aerial vehicle becomes connected to the rail, the unmanned aerial vehicle can move along the rail with the wheel making contact with the rail. The wheel starts rotating upon friction with the rail. Therefore, the unmanned aerial vehicle can travel on the rail solely with the propelling force acting in the traveling direction produced by the rotation of the rotary wings. This configuration renders it unnecessary for the unmanned aerial vehicle to use the rotary force of the rotary wings as a lifting force for lifting up the unmanned aerial vehicle. As a result, the energy used by the unmanned aerial vehicle can be reduced.

The connector may further include a second arm connected to the one end of the support portion.

According to this configuration, not only the first arm but also the second arm can be connected to the rail. Therefore, the possibility that the unmanned aerial vehicle falls off from the rail can be reduced, and the safety in the system that includes the unmanned aerial vehicle can be further increased.

The first arm may be a first hanger for hanging the unmanned aerial vehicle from the rail. The second arm may be a second hanger for hanging the unmanned aerial vehicle from the rail. The connector may further include a first actuator that sets an angle of the first arm relative to the support portion and a second actuator that sets an angle of the second arm relative to the support portion.

This configuration makes it possible to hang the unmanned aerial vehicle from the rail reliably. Therefore, the possibility that the unmanned aerial vehicle falls off from the rail can be reduced, and the safety in the system that includes the unmanned aerial vehicle can be further increased.

The connector may further include a base disposed between the support portion and the first and second arms and a third actuator that sets an angle of the base relative to the support portion.

According to this configuration, the height of the first arm relative to the main body or the height of the second arm relative to the main body can be changed only by changing the angle of the base. Therefore, the heights of the first arm and the second arm can be changed without tilting the main body, and thus the stability of the unmanned aerial vehicle can be maintained.

The first arm may include a first hook that extends from a first connected end connected to the first actuator to a first open end. The second arm may include a second hook that extends from a second connected end connected to the second actuator to a second open end. The first hook may include a first bent portion that is bent in a first direction and located between the first connected end and the first open end. The second hook may include a second bent portion that is bent in a second direction opposite the first direction and located between the second connected end and the second open end.

According to this configuration, the horizontal attitude of the main body can be maintained when the first hook is hung on the rail, and the horizontal attitude of the main body can be maintained also when the second hook is hung on the rail. Therefore, the first hook and the second hook can maintain an appropriate attitude of the unmanned aerial vehicle.

The first hook and the second hook make it easier to hook the unmanned aerial vehicle from the rail.

When the unmanned aerial vehicle is slidably hung from a first rail via the first hook, the control circuit may hook the second hook onto a second rail that extends along and adjacent to the first rail by controlling the second actuator and may disengage the first hook from the first rail by controlling the first actuator.

According to this configuration, for example, if the first hook is disengaged from the first rail after the second hook has become connected to the second rail while the first hook of the unmanned aerial vehicle is connected to the first rail, the unmanned aerial vehicle can switch the connection from the first rail to the second rail serving as another rail and then move along the second rail. Therefore, the unmanned aerial vehicle can reliably switch from one rail to another rail at the branching point of these rails. Thus, the possibility that the unmanned aerial vehicle falls off can be reduced, and the safety in the system that includes the unmanned aerial vehicle can be further increased.

The delivery system may include an unmanned aerial vehicle, a plurality of support pillars, and the first rail and the second rail that are stretched between two adjacent support pillars of the plurality of support pillars.

When the unmanned aerial vehicle is slidably hung from the first rail via the first hook and the second hook, the control circuit may disengage the second hook from the first rail and hook the second hook onto the second rail that extends along and adjacent to the first rail by controlling the second actuator and may disengage the first hook from the first rail and hook the first hook onto the second rail by controlling the first actuator.

According to this configuration, for example, if the first hook is disengaged from the first rail and connected to the second rail after the second hook has been disengaged from the first rail and has become connected to the second rail when the first hook and the second hook of the unmanned aerial vehicle are connected to the first rail, the unmanned aerial vehicle can switch the connection from the first rail to the second rail serving as another rail and then move along the second rail. Therefore, the unmanned aerial vehicle can reliably switch from one rail to another rail at the branching point of these rails. Thus, the possibility that the unmanned aerial vehicle falls off can be reduced, and the safety in the system that includes the unmanned aerial vehicle can be further increased.

When the second hook is to be hooked onto the second rail, the control circuit may tilt the main body or the support portion in the second direction so as to position the second connected end higher than the first connected end. When the first hook is to be disengaged from the first rail, the control circuit may tilt the main body or the support portion in the first direction so as to position the first connected end higher than the second connected end.

According to this configuration, by tilting the main body or the support portion, the first hook and the second hook can be hooked onto the rail with ease, or the first hook and the second hook can be disengaged from the rail with ease.

The unmanned aerial vehicle may further include a hanging wire connected to the main body and provided to hang the package and a lift motor that is capable of taking up the hanging wire. The control circuit may position the unmanned aerial vehicle vertically above a storage device for storing the package with the connector being connected to the rail. In addition, the control circuit may let out the hanging wire by actuating the lift motor, lower the package from the main body, and store the package into the storage device.

According to this configuration, upon the unmanned aerial vehicle arriving at the destination point, the control circuit controls the lift motor so as to let out the hanging wire. Thus, the unmanned aerial vehicle can lower the package and store the package into the storage device. Therefore, the unmanned aerial vehicle can deliver the package to the receiver.

While the control circuit lets out the hanging wire, the control circuit may adjust at least one of the position and the orientation of the main body in accordance with the position of the package relative to the storage device.

According to this configuration, even if the position of the unmanned aerial vehicle fails to match the position directly above the storage device, the control circuit can position the main body relative to the storage device by adjusting at least one of the position and the orientation of the main body. Therefore, the unmanned aerial vehicle can reliably lower the package and store the package into the storage device, which in turn makes it possible to deliver the package reliably to the receiver.

In particular, even if the unmanned aerial vehicle moves from the position directly above the storage device due to the wind or the like, the unmanned aerial vehicle can position the main body relative to the storage device.

When the position of the package is moved from the position vertically above the storage device in a third direction, the control circuit may move the unmanned aerial vehicle in a fourth direction opposite the third direction along the direction in which the rail extends.

According to this configuration, even if the position of the package has changed (moved) in the third direction via the hanging wire due to the wind or the like, the control circuit can change the position of the unmanned aerial vehicle in the fourth direction opposite the third direction. Therefore, the unmanned aerial vehicle can reliably lower the package and store the package into the storage device, which in turn makes it possible to deliver the package more reliably to the receiver.

When the position of the package has moved in the fifth direction from the position vertically above the storage device, the control circuit may cause the unmanned aerial vehicle to swing about the rail and may move the center of gravity of the unmanned aerial vehicle in a sixth direction opposite the fifth direction.

According to this configuration, even if the position of the package has changed in the fifth direction via the hanging wire due to the wind or the like, the control circuit can change the position of the package in the sixth direction opposite the fifth direction by moving the center of gravity of the unmanned aerial vehicle. Therefore, the unmanned aerial vehicle can reliably lower the package and store the package into the storage device, which in turn makes it possible to deliver the package more reliably to the receiver.

The unmanned aerial vehicle may further include a thruster device removably attached to the package. The thruster device may include a plurality of propellers, a plurality of second motors that respectively rotate the plurality of propellers, and a support member that supports the plurality of second motors.

According to this configuration, even if the position of the unmanned aerial vehicle fails to match the position directly above the storage device, the thruster device can guide the package to the storage device. Therefore, the unmanned aerial vehicle can reliably lower the package and store the package into the storage device, which in turn makes it possible to deliver the package more reliably to the receiver. Even in a case where the opening of the storage device is small and it is hard to insert the package into the storage device, the unmanned aerial vehicle can reliably insert the package into the storage device. Thus, the unmanned aerial vehicle does not require a large space for landing.

In particular, with this unmanned aerial vehicle, even in a case where the unmanned aerial vehicle moves from the position directly above the storage device due to the wind or the like, the thruster device can store the package into the storage device.

The plurality of propellers include a first propeller disposed on a first side portion of the support member and a second propeller disposed on a second side portion of the support member, and the second side portion may be different from the first side portion.

According to this configuration, the position and the orientation of the thruster device relative to the storage device can be adjusted. Therefore, with this unmanned aerial vehicle, the thruster device can more reliably store the package into the storage device.

The control circuit may cause the thruster device to actuate at least one of the plurality of second motors in at least a portion of a period in which the hanging wire is let out.

According to this configuration, when a package is lowered from the unmanned aerial vehicle, the position and the orientation of the thruster device relative to the storage device can be adjusted. Therefore, with this unmanned aerial vehicle, the package can be stored smoothly into the storage device.

In the delivery system, each of the plurality of support pillars may be a utility pole.

According to this configuration, existing utility poles can be used as the support pillars, and no new support pillar needs to be installed in order to stretch the rail. Therefore, this system can prevent a surge in the cost of installation.

The delivery system may further include a lead-in support pillar disposed within a predetermined site and a lead-in wire stretched to the rail. The height from the ground surface to a first connection point at which the lead-in wire and the lead-in support pillar are connected to each other may be lower than the height from the ground surface to a second connection point at which the lead-in wire and the rail are connected to each other.

According to this configuration, the rail is disposed at a position higher than the first connection point, and thus the unmanned aerial vehicle can move along a high position. Since the unmanned aerial vehicle travels along a position where the unmanned aerial vehicle is less likely to be recognized by people, the privacy of the user at the receiver and the privacy of people in the facilities, such as homes, that are located so as to face the rail can be protected.

The utility pole may support a power transmission line, and the rail may be provided at a position lower than the power transmission line and higher than the leading end of the lead-in support pillar.

According to this configuration, since the rail is disposed under the power transmission line, the rail can be disposed at a position where the unmanned aerial vehicle will not make contact with the power transmission line, and the unmanned aerial vehicle can travel along the rail. Therefore, the safety of the unmanned aerial vehicle delivering packages can be ensured.

The plurality of support pillars may each be a streetlight.

According to this configuration, existing streetlights can be used as the support pillars, and no new support pillar needs to be installed in order to stretch the rail. Therefore, this system can prevent a surge in the cost of installation.

The delivery system may further include a protective net stretched along a position vertically below an approaching region of the first rail and the second rail. The approaching region may be a region where the distance between the first rail and the second rail is smaller than or equal to the width of the unmanned aerial vehicle.

According to this configuration, since the distance between the first rail and the second rail is smaller than the width (the size) of the main body, the unmanned aerial vehicle can make a switch from the first rail to the second rail with ease and then move along the second rail.

As the protective net is provided along a position vertically below the approaching region of the first rail and the second rail, even if the unmanned aerial vehicle becomes disengaged from the first rail and the second rail, the possibility that the unmanned aerial vehicle falls to the ground can be reduced. Therefore, the safety in the system that includes the unmanned aerial vehicle can be further increased.

The height of at least a portion of the second rail may be higher than the height of the adjacent first rail.

According to this configuration, when two unmanned aerial vehicles are traveling along the first rail in opposite directions, one of the two unmanned aerial vehicles can take refuge in the second rail. In other words, the second rail can be used as a refuge track. This can keep the unmanned aerial vehicles from colliding with each other or suppress the congestion of the unmanned aerial vehicles.

The device may include: a support member to and from which a package is attachable and detachable; a wire capable of hanging the support member by one end of the wire being connected to the support member and the other end of the wire being connected to an object positioned spaced apart from the ground surface; a plurality of motors arranged on the side portion of the support member; a plurality of propellers actuated by the plurality of motors; and a controller that controls the plurality of motors. An angle of each of rotary shafts of the plurality of motors relative to a virtual surface passing through a center of each of the plurality of propellers is at least −45 degrees and at most +45 degrees.

According to this, by controlling the angle of the rotary shafts of the plurality of motors relative to the virtual surface, when the package is to be placed at a predetermined position, the package can be positioned relative to the predetermined position. It is possible to finely adjust the position of the device relative to the predetermined position by causing the device to travel in the desired direction.

When the device descends while the support member is hanging from the object via the wire, it is possible to finely adjust the position of the device so that the package aligns with the predetermined position when viewed from the vertical direction.

Accordingly, with this device, the package can be placed in the predetermined position. In particular, when the device is used outdoors, even if the device is misaligned with the predetermined position due to wind or the like, the device can move toward the predetermined position to compensate for the misalignment so that package can be placed at the predetermined position.

The angle may be at least −30 degrees and at most +30 degrees.

Since this inhibits an increase in the amount of thrust the device produces for hovering, for example, it is possible to inhibit the wire from becoming slack due the device suddenly rising.

The device may further include one or more actuators that adjust the angles of the rotary shafts of the plurality of motors relative to the virtual surface.

This makes it possible to adjust the attitudes of the plurality of motors relative to the support member. Accordingly, this allows the device to move horizontally and vertically. This allows for more accurate positioning of the package to align with the predetermined position.

The controller may adjust the angle of one or more of the rotary shafts relative to the virtual surface by controlling the one or more actuators, and may include a first mode that inclines the one or more rotary shafts so that the angle is 0 degrees, and a second mode that inclines the one or more rotary shafts so that the angle is an elevation angle.

This makes it possible to individually control the attitude of each rotary shaft of one or more motors among the plurality of rotary shafts of the plurality of motors. The position of the device can be finely adjusted more precisely because the attitude, traveling direction, and the like of the device can be finely controlled so that the device moves to the predetermined position.

The wire may be directly connected to at least one connection point of the support member.

This makes it possible to hang the support member via the wire with only one connection point on the support member. Accordingly, the configuration of the wire can be simplified.

The wire may include a main wire and a plurality of sub-wires. One ends of the plurality of sub-wires may be directly connected to a plurality of connection points of the support member. Other ends of the plurality of sub-wires may be connected to one end of the main wire at a single common connection point. The main wire may hang and support the support member from an object via the plurality of sub-wires.

This makes it possible to connect the plurality of sub-wires to the support member in one to one correspondence via the plurality of connection points. Therefore, the attitude of the support member while it is hanging by the wire can be stabilized.

The support member may include a polygonal frame arranged around the package, and the plurality of connection points may be arranged at a plurality of portions of the frame corresponding to the plurality of vertices.

With this, the attitude of the support member while it is hanging by the wire can be more reliably stabilized.

The support member may include a polygonal frame arranged around the package, and the one connection point may be movable in a plane that is within the frame and parallel to the virtual surface.

This makes it possible to change the position of the one connection point relative to the support member. Accordingly, for example, even if the center of gravity of the support member that is holding a package is displaced from the center, the position of the connection point can be changed so as to align the position of the connection point with the center of gravity. Therefore, the attitude of the support member hanging from the wire can be corrected to a desired attitude.

The side portions of the support member may include a first side portion and a second side portion on opposite sides of the support member and/or the package. The plurality of motors may include a first motor that is provided on the first side portion and includes a first rotary shaft, and a second motor that is provided on the second side portion and includes a second rotary shaft. The controller may include a third mode in which the first rotary shaft is rotated in a first direction of rotation and the second rotary shaft is rotated in a second direction of rotation opposite to the first direction of rotation, and a fourth mode in which the first rotary shaft and the second rotary shaft are rotated in the second direction of rotation.

With this, by making the direction of rotation of the first rotary shaft of the first motor and the direction of rotation of the second rotary shaft of the second motor opposite directions, the device can produce a thrust that causes it to travel in a desired direction. This allows the device to finely adjust its position relative to a predetermined position accurately.

The plurality of motors may further include a third motor that is provided on the first side portion at a position adjacent to the first motor in the virtual surface and includes a third rotary shaft, and a fourth motor that is provided on the second side portion at a position adjacent to the second motor in the virtual surface and includes a fourth rotary shaft. In the third mode, the controller may rotate the third rotary shaft in the second direction of rotation and rotate the fourth rotary shaft in the first direction of rotation. In the fourth mode, the controller may rotate the third rotary shaft and the fourth rotary shaft in the first direction of rotation.

With this, by making the direction of rotation of the third rotary shaft of the third motor and the direction of rotation of the fourth rotary shaft of the fourth motor opposite directions, the device can produce a thrust that causes it to travel in a desired direction. Since the directions of rotation of the first rotary shaft of the first motor and the second rotary shaft of the second motor can be controlled, the device can finely adjust its position relative to a predetermined position accurately.

The device may further include a protective member surrounding the plurality of propellers.

With this, since the protective member can protect the rotating propellers, the propellers can be prevented from coming into contact with other objects.

The device may further include a reel to which the other end of the wire is connected, and a lift motor that rotates the reel to reel out the wire. When the reel is positioned vertically above a storage device for storing the package, the controller starts actuating the plurality of motors after the length of the portion of the wire that has been reeled out exceeds a predetermined length.

With this, since the device starts adjusting its position relative to the predetermined position when the device approaches the storage device, it easier for the device to align itself relative to the predetermined position.

The device may further include a sensor that detects the position of the storage device for storing a package when the reel is positioned vertically above the storage device.

This enables the position of the device relative to the storage device to be accurately detected, allowing for more accurate and finer adjustment of the position of the device relative to the storage device.

The predetermined length may be equivalent to half the distance from the storage device to the reel.

With this, since the device starts adjusting its position relative to the predetermined position when the device is positioned near the storage device, it even easier for the device to align itself relative to the predetermined position.

Each of the plurality of propellers may include a plurality of blades. A plurality of protrusions may be provided on the surface of each of the plurality of blades. The plurality of protrusions may form a striped pattern extending in the direction of rotation of the plurality of blades.

This makes it possible to reduce the influence of wind during flight of the device. This makes it even easier to align the device relative to the predetermined position, because the attitude of the device can be stabilized even in windy conditions.

A lifting system may include: an unmanned aerial vehicle; a first device attachable to and detachable from the unmanned aerial vehicle; a first wire that connects the first device and the unmanned aerial vehicle; a first reel capable of reeling in the first wire; a second device attachable to and detachable from a package and attachable to and detachable from the first device; a second wire that connects the first device and the second device; a second reel capable of reeling in the second wire; and a controller. When the unmanned aerial vehicle is in a position separated from the ground, the controller may: detach the first device and the second device from the unmanned aerial vehicle; cause the first reel to reel out the first wire; detach the second device from the first device; and cause the second reel to reel out the second wire.

With this, even when it is difficult to carry the package to a predetermined position, such as when there is an obstacle vertically above the predetermined position, it is possible to move the first device and the second device so as to avoid the obstacle. It is therefore possible to deliver the package to the predetermined position with certainty since the second device can be moved to a position vertically above the predetermined position.

The first device may include: a first support member attachable to and detachable from the unmanned aerial vehicle; a plurality of first motors disposed on a plurality of side portions of the first support member; and a plurality of first propellers actuated by the plurality of first motors. The second device may include: a second support member attachable to and detachable from the first device; a plurality of second motors disposed on a plurality of side portions of the second support member; and a plurality of second propellers actuated by the plurality of second motors.

With this, the position of the first device relative to the unmanned aerial vehicle can be adjusted, and the position of the second device relative to the first device can be adjusted. This makes it possible to move the first device and the second device so as to avoid an obstacle. As a result, the package can be reliably delivered to the predetermined position.

The controller may: actuate at least one of the plurality of first motors or the plurality of second motors after detaching the first device and the second device from the unmanned aerial vehicle, and actuate the plurality of first motors and the plurality of second motors after detaching the second device from the first device.

This makes it possible to move the first device and the second device as a single unit to a target position for avoiding the obstacle. Therefore, the controller can inhibit an increase in the processing burden of actuating and controlling the plurality of first motors and the plurality of second motors.

After detaching the second device from the first device, the controller may control the plurality of first motors and control the plurality of second motors differently than the plurality of first motors to make a first hanging direction and a second hanging direction mutually different, the first hanging direction being a direction in which the first wire extends between the unmanned aerial vehicle and the first device, and the second hanging direction being a direction in which the second wire extends between the first device and the second device.

With this, even if there is an obstacle vertically above the predetermined position, the first device and the second device can be positioned so as to reliably bypass the obstacle. As a result, with this lifting system, the package can be reliably delivered to the predetermined position.

After detaching the second device from the first device, the controller may control the plurality of first motors and control the plurality of second motors differently than the plurality of first motors to reduce or eliminate an amount of overlap between the first device and the second device in terms of area size in a view perpendicular to a ground surface.

With this, the relative positions of the first device and the second device can be changed so that the first device is not disposed vertically above the second device. Accordingly, even if there is an obstacle vertically above the predetermined position, the first device and the second device can be positioned so as to reliably bypass the obstacle. As a result, the package can be reliably delivered to the predetermined position.

After detaching the package from the second device, the controller may: reel in the second wire using the second reel; attach the second device to the first device; reel in the first wire using the first reel; and attach the first device and the second device to the unmanned aerial vehicle.

With this, after delivering the package to the predetermined position, the second device can be attached to the first device while reeling in the second wire, and the first device and the second device can be attached to the unmanned aerial vehicle while reeling in the first wire. As a result, it is possible to prevent the first wire and the second wire from being damaged or entangled due to contact with an obstacle or the like. This makes it possible to inhibit a decrease in the operating efficiency of the lifting system.

The unmanned aerial vehicle may include an arm capable of engaging a rail, and when the unmanned aerial vehicle is in a position separated from the ground and the arm is engaged with the rail, the controller may detach the first device and the second device from the unmanned aerial vehicle.

This makes it possible to hold the unmanned aerial vehicle onto the rail via the arm. As a result, even if the first device and the second device are detached from the unmanned aerial vehicle, the first device and the second device can be held via the first wire and the second wire. This makes it possible to inhibit the first device and the second device from falling.

Since the unmanned aerial vehicle can be held onto the rail without flying, energy consumption by the unmanned aerial vehicle can be reduced.

The lifting system may further include: a third device attachable between and detachable from between the first device and the second device; a third wire that connects the first device and the third device; a third reel capable of reeling in the third wire; a fourth wire that connects the third device and the second device; and a fourth reel capable of reeling in the fourth wire.

With this, after delivering the package to the predetermined position, the second device can be attached to the third device while reeling in the fourth wire, the second device and the third device can be attached to the first device while reeling in the third wire, and the second device, the third device, and the first device can be attached to the unmanned aerial vehicle while reeling in the first wire. As a result, it is possible to prevent the first wire, the third wire, and the fourth wire from being damaged or entangled due to contact with an obstacle or the like. This makes it possible to inhibit a decrease in the operating efficiency of the lifting system.

A storage device may include: a container that defines a space for storing a package; a top lid that is provided on a top portion of the container and can open and close a top opening for inserting the package into the space through the top opening; and a side lid that is provided on a side portion of the container and can open and close a side opening for removing the package in the space through the side opening.

With this, a package can be placed into the space of the storage device from above the storage device, and a package stored in the space can be removed from the side of the storage device. Accordingly, a package can be easily removed.

A system may include a storage device and a lifting device that is attachable to and detachable from a package and can be lowered from vertically above the storage device. The lifting device may include a protrusion. The storage device may include a hole that is provided in the top portion and accommodates the insertion of the protrusion, and a mechanism for opening the top lid when the protrusion is inserted into the hole.

With this, when the lifting device stores the package in the storage device, the lifting device can be aligned with the top opening of the storage device by inserting the protrusion into the hole. As a result, the package can be stored with certainty in the space in the storage device.

An unmanned aerial vehicle may include: a plurality of rotary wings; a plurality of motors that respectively rotate the plurality of rotary wings; a main body that supports the plurality of motors; and a connector for connecting to a rail positioned separated from the ground surface while the main body is hanging. The connector may include: a fixed portion; a first arm including one end connected to the fixed portion and another end that opens and closes with respect to the fixed portion; a second arm including one end connected to the fixed portion and another end that opens and closes with respect to the fixed portion; a first actuator that opens and closes the first arm; a second actuator that opens and closes the second arm; and a controller that controls the first actuator and the second actuator. A first region enclosed by the first arm in the closed state and the fixed portion may be separated from a second region enclosed by the second arm in the closed state and the fixed portion.

With this, when the first arm of the unmanned aerial vehicle is connected to a first rail, which is one example of the rail, the first arm can be disconnected from the first rail after the second arm is connected to a second rail. This allows the unmanned aerial vehicle to switch connections from the first rail to the second rail, which is one example of another rail, and continue moving.

The fixed portion may extend upwardly from the main body and include a partition portion separating the first region and the second region.

With this, a single connector can be used to connect to two rails. Accordingly, the attitude of the connector can be maintained better than when two connectors are used.

The controller may control the first actuator and the second actuator so that at least one of the first arm and the second arm is in a closed state.

With this, if a rail is present in at least one of the closed first region and the closed second region, the unmanned aerial vehicle can securely hang from the rail.

When the controller receives an instruction to change the first arm from the closed state to the open state, the controller may determine whether the second arm is in the closed state or not. When the second arm is in the closed state, the controller may change the first arm to the open state. When the second arm is in the open state, the controller may maintain the first arm in the closed state.

With this, when a second rail is connected to the second arm in the closed state, a first rail can be connected to the first arm. When the second arm is in the open state, if a first rail is connected to the first arm in the closed state, the first arm can be maintained in the closed state without placing the first arm in the open state. In this way, the unmanned aerial vehicle can reliably hang from a rail, thereby inhibiting the unmanned aerial vehicle from falling.

When the controller receives an instruction to change the second arm from the closed state to the open state, the controller may determine whether the first arm is in the closed state or not. When the first arm is in the closed state, the controller may change the second arm to the open state. When the first arm is in the open state, the controller may maintain the second arm in the closed state.

With this, when a first rail is connected to the first arm in the closed state, a second rail can be connected to the second arm. When the first arm is in the open state, if a second rail is connected to the second arm in the closed state, the second arm can be maintained in the closed state without placing the second arm in the open state. In this way, the unmanned aerial vehicle can reliably hang from a rail, thereby inhibiting the unmanned aerial vehicle from falling.

The controller may further control the rotational speed of the plurality of motors, and when the first arm is in the open state, the second arm is in the closed state, and the second arm is hanging from the rail passing through the second region, the controller may increase a first rotational speed of a first motor, which is the motor closest to the first arm among the plurality of motors, to a rotational speed greater than a second rotational speed of a second motor, which is the motor closest to the second arm among the plurality of motors. Alternatively, when the second arm is in the open state, the first arm is in the closed state, and the first arm is hanging from the rail passing through the first region, the controller may increase the second rotational speed of the second motor, which is the motor closest to the second arm among the plurality of motors, to a rotational speed greater than the first rotational speed of the first motor, which is the motor closest to the first arm among the plurality of motors.

With this, if the second arm is in the closed state and the first arm is in the open state, the weight of the first arm moves the center of gravity to the first arm side. Therefore, by making the first rotational speed of the first motor on the first arm side greater than the second rotational speed of the second motor on the second arm side, an amount of buoyancy equivalent to the weight of the center of gravity displaced to the first arm side can be imparted to the unmanned aerial vehicle.

If the first arm is in the closed state and the second arm is in the open state, the weight of the second arm moves the center of gravity to the second arm side. Therefore, by making the second rotational speed of the second motor on the second arm side greater than the first rotational speed of the first motor on the first arm side, an amount of buoyancy equivalent to the weight of the center of gravity displaced to the second arm side can be imparted to the unmanned aerial vehicle.

As a result, the unmanned aerial vehicle can maintain the attitude of the main body of the unmanned aerial vehicle approximately parallel to the horizontal direction, even if the center of gravity is displaced from the center of the main body of the unmanned aerial vehicle.

The connector may further include a third actuator that changes the angle of the fixed portion relative to the main body. The controller may further control the third actuator. When the first arm is in the open state, the second arm is in the closed state, and the second arm is hanging from the rail passing through the second region, the controller may change the angle via the third actuator to position the second region directly above the center of the main body. When the second arm is in the open state, the first arm is in the closed state, and the first arm is hanging from the rail passing through the first region, the controller may change the angle via the third actuator to position the first region directly above the center of the main body.

With this, if the first arm is in the open state and the second arm hanging on the second rail is in the closed state, the first rail present in the first region may be let outside of the first region by simply changing the attitude (angle) of the fixed portion relative to the main body of the unmanned aerial vehicle.

If the second arm is in the open state and the first arm hanging on the first rail is in the closed state, the second rail present in the second region can be let outside of the second region by simply changing the attitude (angle) of the fixed portion relative to the main body of the unmanned aerial vehicle.

Thus, the first rail can be easily disconnected from the connector and the second rail can be easily disconnected from the connector by simply inclining the fixed portion relative to the main body. This also makes it easy to switch the connector connected to the first rail to the second rail or to switch the connector connected to the second rail to the first rail.

A system including the unmanned aerial vehicle and the rail, wherein the rail may be provided with a marker including predetermined information.

This allows the unmanned aerial vehicle to read the predetermined information indicated by the marker added to the rail. For example, the package can be more accurately delivered to the predetermined position by the predetermined information including an address or position information or the like.

A system including the unmanned aerial vehicle and the rail, wherein the rail may be provided with an uneven portion including predetermined information.

This allows the unmanned aerial vehicle to obtain predetermined information from the uneven portion added to the rail as it moves along the rail. For example, the package can be more accurately delivered to the predetermined position by the predetermined information including an address or position information or the like.

An unmanned aerial vehicle may include: a plurality of rotary wings; a plurality of motors that respectively rotate the plurality of rotary wings; a main body that supports the plurality of motors; a connector for connecting to a rail positioned separated from the ground surface while the main body is hanging; an actuator that changes the angle of the normal direction of a virtual plane including the plurality of rotary wings relative to a support direction in which the connector is supported by the rail; and a controller that controls the plurality of motors and the actuator. The connector may include a first end connected to the main body and a second end for slidably connecting to the rail. The support direction may be a direction from the first end of the connector toward the second end of the connector. In a first mode, the controller may align the normal direction of the virtual plane with the support direction via the actuator, and in a second mode, the controller may make the normal direction of the virtual plane orthogonal to the support direction via the actuator.

With this, the controller can change the attitude of the main body of the unmanned aerial vehicle relative to the support direction when traveling on the rail. For example, when the unmanned aerial vehicle is to travel on the rail, the second mode can be implemented, and when the unmanned aerial vehicle is to leave the rail, the first mode can be implemented. Accordingly, the unmanned aerial vehicle can change its flight mode as appropriate depending on the situation.

In a third mode, the controller may make the angle at least 10 degrees and at most 30 degrees via the actuator.

This allows the unmanned aerial vehicle to move along the rail without contact between the rail and the support member.

The unmanned aerial vehicle may further include a sensor that detects the inclination of the rail. The controller may change the angle according to the inclination of the rail.

With this, even when the rail is inclined relative to the horizontal direction, the unmanned aerial vehicle can move along the inclined rail.

The controller may align the normal direction of the virtual plane with the inclination of the rail via the actuator.

This allows the connector to move along the rail, thereby inhibiting the rail from coming into contact with the support member.

When the controller receives a first instruction to propel the unmanned aerial vehicle in a first direction along the rail, the controller may incline the normal direction of the virtual plane from the support direction toward a second direction, rotate the rotary wings of a first motor among the plurality of motors that is positioned in the first direction from the center of the main body in a first direction of rotation, and rotate the rotary wings of a second motor among the plurality of motors that is positioned in the second direction from the center of the main body in a second direction of rotation. The second direction may be the opposite of the first direction, and the second direction of rotation may be the opposite of the first direction of rotation.

This allows the unmanned aerial vehicle to move forward while maintaining the attitude of the unmanned aerial vehicle with respect to the main body relative to the support direction in a desired state.

When the controller obtains a second instruction to propel the unmanned aerial vehicle in the second direction along the rail, the controller may rotate the rotary wings of the first motor in the second direction of rotation and rotate the rotary wings of the second motor in the first direction of rotation.

With this, by reversing the directions of rotation of the first motor and the second motor, the unmanned aerial vehicle can move in reverse. For example, after the package is delivered, the unmanned aerial vehicle can return along the same rail along which it arrived.

When the controller obtains the second instruction, the controller may further incline the normal direction of the virtual plane from the support direction toward the first direction via the actuator, rotate the rotary wings of the first motor in the first direction of rotation, and rotate the rotary wings of the second motor in the second direction of rotation.

This allows the unmanned aerial vehicle to reverse the inclination of the main body of the unmanned aerial vehicle relative to the support direction. The inclination of the normal direction of the virtual plane changes from inclining toward the second direction to inclining toward the first direction relative to the support direction. This allows the unmanned aerial vehicle to move in reverse. For example, in this case as well, after the package is delivered, the unmanned aerial vehicle can return along the same rail along which it arrived.

The connector may include a fixed portion connected to a main body, an arm connected to the rail, and a second actuator that is disposed between the fixed portion and the arm and is rotatable about an axis of rotation parallel to the support direction. When the controller receives a second instruction to propel the unmanned aerial vehicle in the second direction along the rail, the controller may reverse the orientation of the main body by rotating the main body via the second actuator about the axis of rotation that is parallel to the support direction.

This makes it possible to invert the inclination of the main body of the unmanned aerial vehicle symmetrically with respect to the support direction by the fixed portion rotating relative to the arm about the axis of rotation that is parallel to the support direction. This allows the unmanned aerial vehicle to move in reverse. For example, in this case as well, after the package is delivered, the unmanned aerial vehicle can return along the same rail along which it arrived.

The connector may include an arm that is connected to the rail and can be opened and closed, and a third actuator that opens and closes the arm. When the controller receives a second instruction to propel the unmanned aerial vehicle in the second direction along the rail, the controller may change the arm from a closed state to an open state via the third actuator, control the plurality of motors to reverse the orientation of the main body about the support direction, and change the arm from the open state to the closed state via the third actuator.

With this, the unmanned aerial vehicle is temporarily disconnected from the rail, the orientation of the unmanned aerial vehicle is reversed, and then the connector of the unmanned aerial vehicle is reconnected to the rail. For example, in this case as well, after the package is delivered, the unmanned aerial vehicle can return along the same rail along which it arrived.

The connector may include an arm connected to the rail, and a roller that is provided on the inner peripheral surface of the arm and rotatably contacts the rail.

Accordingly, when the connector of the unmanned aerial vehicle is connected to the rail, the roller contacts the rail, allowing the unmanned aerial vehicle to move along the rail. The unmanned aerial vehicle is able to move along the rail using only its own propulsion in the traveling direction. Since the unmanned aerial vehicle does not have to expend energy on lift force to lift itself, the unmanned aerial vehicle can save energy.

The connector may include a pair of brake pads and a braking mechanism that changes the distance between the pair of brake pads so as to sandwich the rail between the pair of brake pads.

Accordingly, when the connector of the unmanned aerial vehicle is connected to the rail, the rail can be sandwiched between the pair of brake pads. This makes it easy to decelerate or stop the unmanned aerial vehicle that is moving.

When the controller obtains a stop instruction to stop the unmanned aerial vehicle, the controller may rotate the rotary wings of the first motor in the second direction of rotation and rotate the rotary wings of the second motor in the first direction of rotation.

This makes it possible to reverse the directions of rotation of the rotary wings of the first motor and the rotary wings of the second motor, in accordance with the stop instruction, relative to the directions of rotation of the rotary wings of the first motor and the rotary wings of the second motor when traveling forward. This makes it possible to stop movement of the unmanned aerial vehicle.

A storage device capable of storing a package delivered by an unmanned aerial vehicle may include: a container including a bottom portion and a side portion; a top lid provided above the container; and a load support member capable of supporting the load of the unmanned aerial vehicle carrying a package. The unmanned aerial vehicle may include a plurality of legs that can land on the load support member. The load support member may include a plurality of recesses that can support the plurality of legs. Each of the plurality of recesses may be a bowl-shaped or cone-shaped recess that opens upwardly.

With this, the plurality of recesses can engage with the plurality of legs to guide the plurality of legs when the unmanned aerial vehicle descends. As a result, the load support member can hold the unmanned aerial vehicle at a predetermined attitude. When the unmanned aerial vehicle delivers a package, the unmanned aerial vehicle can thus position itself vertically above the container. As a result, a package can be stored with certainty in the storage device.

A storage device capable of storing an article delivered by an unmanned aerial vehicle may include: a container including a bottom portion and a side portion; a lid rotatably coupled to the container; a load support member capable of supporting the load of the unmanned aerial vehicle carrying an article; and one or more link rods coupled between the load support member and the lid. When the unmanned aerial vehicle applies a load to the load support member, the one or more link rods may transfer the load to the lid and open the lid.

With this, the lid of the container can be automatically opened simply by the unmanned aerial vehicle hanging from the load support member. Accordingly, the article delivered by the unmanned aerial vehicle can be stored in the container.

A method for storing an article delivered by an unmanned aerial vehicle into a storage device may include: supporting the unmanned aerial vehicle using a load support member of the storage device; storing the article in a container after a lid of the storage device opens and the article is lowered from the unmanned aerial vehicle via a wire; disconnecting the connection between the article and the wire; reeling in the wire; and separating the unmanned aerial vehicle from the load support member.

The lid may close to cover the top portion of the container when the load applied to the load support member is removed.

With this, the lid of the container can be automatically closed by the unmanned aerial vehicle flying away from the load support member.

The load support member may be disposed above the container.

With this, since the lid of the container is opened so long as the unmanned aerial vehicle is hanging from the load support member, the article delivered by the unmanned aerial vehicle can be easily stored in the container.

The load support member may be a suspension rod from which the unmanned aerial vehicle can hang.

With this, the load of the unmanned aerial vehicle hanging from the load support member can be reliably supported.

The suspension rod may include a V-shaped or U-shaped bend directly above the container.

This makes it easier to position the unmanned aerial vehicle because the unmanned aerial vehicle can easily be caught by the bend. Accordingly, since the lid of the container is opened so long as the unmanned aerial vehicle is hanging from the load support member, the article delivered by the unmanned aerial vehicle can be stored in the container even more easily.

The one or more link rods may include a first link rod, a second link rod, and a third link rod. A first end of the first link rod may be rotatably coupled to the suspension rod, a second end of the first link rod may be rotatably coupled to a third end of the second link rod, a fourth end of the second link rod may be rotatably coupled to a fifth end of the third link rod, and a sixth end of the third link rod may be rotatably coupled to the lid.

With this, when the unmanned aerial vehicle is hanging from the suspension rod, the suspension rod flexes vertically downward due to the load of the unmanned aerial vehicle. As a result, the load thereof is transferred, via the suspension rod, to the lid of the container via the first link rod, the second link rod, and the third link rod. Accordingly, the lid of the container can be reliably opened simply by the unmanned aerial vehicle hanging from the suspension rod. Accordingly, with this storage device, the article delivered by the unmanned aerial vehicle can be stored in the container more easily.

The storage device may further include a first axle that supports rotation of the load support member at a position between the two ends of the suspension rod, and a second axle that supports rotation of the third link rod at a position between the fifth end and the sixth end of the third link rod.

With this, the load of the unmanned aerial vehicle can be reliably transferred to the first link rod via the first axle. The load of the unmanned aerial vehicle transferred to the third link rod can be reliably transferred to the lid of the container via the second axle. This makes it possible to open the lid of the container.

The storage device may further include a support member that fixes the positions of the first axle and the second axle.

With this, the weight of the unmanned aerial vehicle hanging from the suspension rod can be reliably transferred to the lid of the container via the first link rod, the second link rod, and the third link rod, so that the lid of the container can be reliably opened.

The storage device may further include a door provided on the side portion of the container, and a first interlocking portion that locks the door when the lid is opened.

This inhibits an article from going through the door upon storing the article in the container. Locking the door makes it possible to inhibit forgetting to lock the door manually, which is excellent for convenience because it can inhibit theft of a package stored in the storage device.

The storage device may further include a second interlocking portion that locks the lid when the lid is closed.

With this, the lid can be automatically locked when the lid is closed. This reduces the frequency of having to lock the lid by hand. Locking the lid makes it possible to inhibit forgetting to lock the lid manually, which is excellent for convenience because it can inhibit theft of a package stored in the storage device.

A system may include the storage device and the unmanned aerial vehicle.

The unmanned aerial vehicle may include a first arm for hanging from the load support member.

With this, since the unmanned aerial vehicle can securely hang from the load support member, the unmanned aerial vehicle can maintain its attitude even if the actuation of a motor, for example, is stopped.

In the system, the unmanned aerial vehicle may include: a wire; a second arm that is connected to one end of the wire and holds an article; a reel that is connected to the other end of the wire and is capable of reeling in the wire; and a controller. The controller may reel out the wire to place the article into the container after the lid is opened, and after the article is placed on the bottom portion of the container, may cause the second arm to let go of the article and cause the reel to reel in the wire.

Accordingly, when the unmanned aerial vehicle is hanging from the load support member, the second arm and the article can be lowered toward the container by reeling out the wire. Once the article is placed on the bottom portion of the container, the second arm can be moved away from the article. Thus, the system can ensure that the article is stored inside the container.

In the system, the unmanned aerial vehicle may further include a camera capable of capturing images of the inside of the container.

This enables the unmanned aerial vehicle to confirm whether or not the package has been stored in the container. This can also prevent the second arm from separating from the article if the article is not correctly stored inside the container. After pulling up the package, the package can be stored in the container once again.

In the system, the controller may obtain an image of the inside of the storage device via the camera, and based on the image, execute an authenticated process that confirms that the unmanned aerial vehicle has stored the article.

This ensures the certainty that the article was stored in the container since the storing of the article into the storage device can be verified.

The angle of each of rotary shafts of the plurality of first motors relative to a virtual surface passing through a center of each of the plurality of first propellers may be at least −45 degrees and at most +45 degrees.

The lifting system may further include one or more actuators that adjust the angle of each of the rotary shafts of the plurality of first motors relative to the virtual surface.

The one or more actuators may incline each of the rotary shafts so that the angle is 0 degrees in a first mode, and incline each of the rotary shafts so that the angle is an elevation angle in a second mode.

The first wire may be directly connected to at least one connection point of the first support member.

The first wire may include a first main wire and a plurality of first sub-wires. One ends of the plurality of first sub-wires may be respectively directly connected to a plurality of connection points of the first support member, and other ends of the plurality of first sub-wires may be connected to one end of the first main wire at a single common connection point. The first main wire may hang and support the first support member from the unmanned aerial vehicle via the plurality of first sub-wires.

The first support member may include a first frame that is polygonal, and the plurality of connection points may be arranged at a plurality of portions of the first frame corresponding to a plurality of vertices.

The first support member may include a first frame that is polygonal, and the at least one connection point may be movable in a plane that is within the first frame and parallel to a virtual surface.

The plurality of side portions of the first support member may include a first side portion and a second side portion on opposite sides of at least one of the first support member or the package. The plurality of first motors may include a first first motor provided on the first side portion and including a first rotary shaft, and a second first motor provided on the second side portion and including a second rotary shaft. The controller may execute a third mode that rotates the first rotary shaft in a first direction of rotation and rotates the second rotary shaft in a second direction of rotation opposite the first direction of rotation, and a fourth mode that rotates the first rotary shaft and the second rotary shaft in the second direction of rotation.

The plurality of first motors may further include a third first motor that is provided on the first side portion in a position adjacent to the first first motor in a virtual surface and includes a third rotary shaft, and a fourth first motor that is provided on the second side portion in a position adjacent to the second first motor in the virtual surface and includes a fourth rotary shaft. The controller may rotate the third rotary shaft in the second direction of rotation and rotate the fourth rotary shaft in the first direction of rotation in the third mode, and rotate the third rotary shaft and the fourth rotary shaft in the first direction of rotation in the fourth mode.

The second device may further include a sensor that detects a position of a storage device for storing the package.

These general or specific aspects may be implemented as a system, a method, an integrated circuit, a computer program, or a computer-readable recording medium such as a CD-ROM, or any combination thereof.

Hereinafter, some embodiments will be described in concrete terms with reference to the drawings.

It is to be noted that the embodiments described below merely illustrate general or specific examples. The numerical values, the shapes, the materials, the elements, the arrangement and connectivity of the elements, the steps, the order of the steps, and so on illustrated in the following embodiments are examples and are not intended to limit the present invention. Among elements described in the following embodiments, those not described in any of the independent claims are to be construed as optional elements.

Embodiment 1

FIG. 1 is a schematic diagram illustrating an example of flying system 10 according to Embodiment 1. With reference to FIG. 1, flying system 10 according to the present embodiment will be described. Flying system 10 according to the present embodiment includes manager 100, parent drone 200, and child drone 300. Manager 100 manages position information of rail 400, information indicating flying conditions of the drones, and so on. Parent drone 200 is an unmanned aerial vehicle. Child drone 300 is also an unmanned aerial vehicle and is smaller than parent drone 200. Manager 100 may be implemented by a server or a cloud server. Child drone 300 may be coupled to rail 400. Parent drone 200 may store load 500. Parent drone 200 and child drone 300 are each wirelessly connected to manager 100. Parent drone 200 and child drone 300 are coupled to each other via a coupling line, such as wire 600, for example.

Child drone 300 and parent drone 200 fly while being coupled to each other via the coupling line. When parent drone 200 and child drone 300 fly while being coupled to each other via the coupling line, this state is referred to below as a parent-child coupled flight. When an anomaly occurs in flying of parent drone 200, child drone 300 stops moving forward. Child drone 300 or parent drone 200 may include a controller. When an anomaly occurs in flying of parent drone 200, the controller stops child drone 300 from moving forward.

Figure 2:
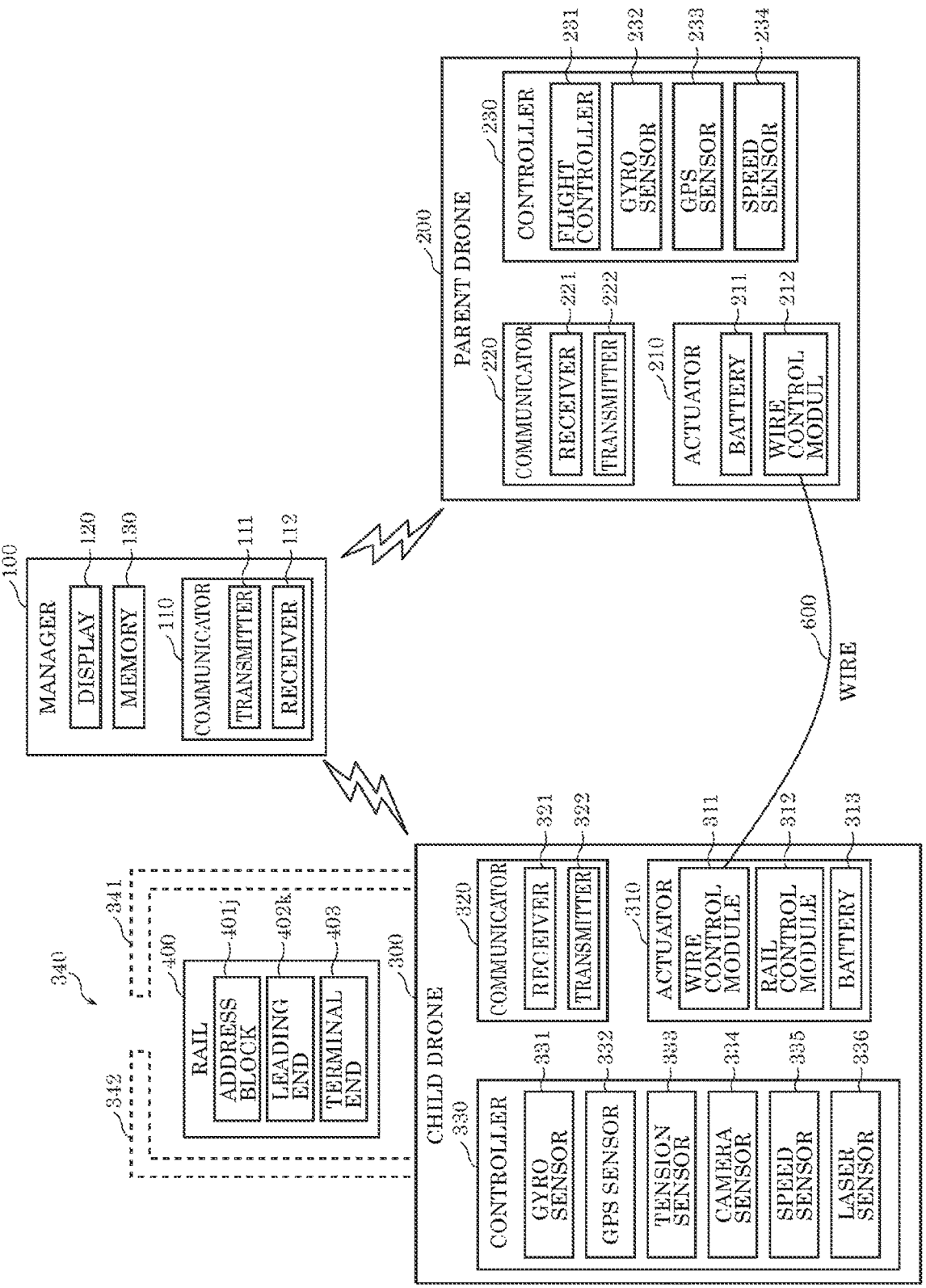
FIG. 2 is a block diagram illustrating a configuration of the flying system according to Embodiment 1.

FIG. 2 is a block diagram illustrating a configuration of flying system 10 according to Embodiment 1. Manager 100 includes communicator 110, display 120, and memory 130. Communicator 110 includes transmitter 111 and receiver 112. Communicator 110 communicates with parent drone 200 and child drone 300. Memory 130 is a recording medium for storing (recording) information such as identification information of rail 400.

Parent drone 200 includes controller 230, actuator 210, and communicator 220. Communicator 220 includes receiver 221 and transmitter 222. Actuator 210 includes battery 211 and wire control module 212. Controller 230 includes flight controller 231, gyro sensor 232, global positioning system (GPS) sensor 233, and speed sensor 234.

Communicator 220 communicates with manager 100 through receiver 221 and transmitter 222. Battery 211 is a battery for actuating parent drone 200. Battery 211 is implemented by, for example but not limited to, a lithium battery. Wire control module 212 controls wire 600 that couples parent drone 200 and child drone 300. Wire control module 212 may be an example of a lift motor. Flight controller 231 detects the inclination, the angle, and so on of the flying aerial vehicle and performs various arithmetic operations based on the detected pieces of information. Then, flight controller 231 provides the aerial vehicle with an instruction concerning the attitude and so on to be held during a flight. Gyro sensor 232 detects the angular speed and the acceleration of the flying aerial vehicle. GPS sensor 233 detects, for example but not limited to, geographical spatial information, such as latitude and longitude information. Speed sensor 234 detects the speed of parent drone 200.

Child drone 300 includes communicator 320, actuator 310, controller 330, and arm 340. Communicator 320 includes receiver 321 and transmitter 322. Actuator 310 includes wire control module 311, rail control module 312, and battery 313. Controller 330 includes gyro sensor 331, GPS sensor 332, tension sensor 333, camera sensor 334, speed sensor 335, and laser sensor 336. In this example, controller 330 may further include a flight controller. Arm 340 includes first arm 341 and second arm 342.

Communicator 320 communicates with manager 100 through receiver 321 and transmitter 322. Battery 313 is a battery for actuating child drone 300. Battery 313 is implemented by, for example but not limited to, a lithium battery. Wire control module 311 controls wire 600 that connects parent drone 200 and child drone 300. Rail control module 312 is a module that controls child drone 300 when child drone 300 couples itself to rail 400. Gyro sensor 331 detects the angular speed and the acceleration of the flying aerial vehicle. GPS sensor 332 detects, for example but not limited to, geographical spatial information, such as latitude and longitude information. Speed sensor 335 detects the speed of child drone 300. Tension sensor 333 detects the tension in wire 600 that couples wire control module 311 of child drone 300 to wire control module 212 of parent drone 200. Camera sensor 334 is a sensor that detects an anomaly in flying of parent drone 200 based on an image captured by a camera. Laser sensor 336 is a sensor that detects the position of an object and detects, for example but not limited to, the presence of an anomaly in flying of parent drone 200. Arm 340 couples itself to rail 400 by actuating first arm 341 and second arm 342.

Parent drone 200 and child drone 300 are coupled to each other by wire 600 via wire control module 212 of parent drone 200 and wire control module 311 of child drone 300.

Rail 400 includes address block 401*j*, leading end 402*k*, and terminal end 403. Address block 401*j* stores, for example but not limited to, the identification information of rail 400. Leading end 402*k* is a point where rail 400 begins, and terminal end 403 is a point where rail 400 ends. Rail 400 is formed of metal or resin. Data such as the identification information or the position information of rail 400 can be written on a surface of rail 400. In this example, the data such as the identification information or the position information of rail 400 is stored in rail 400 in the form of address block 401*j*.

Figure 3:
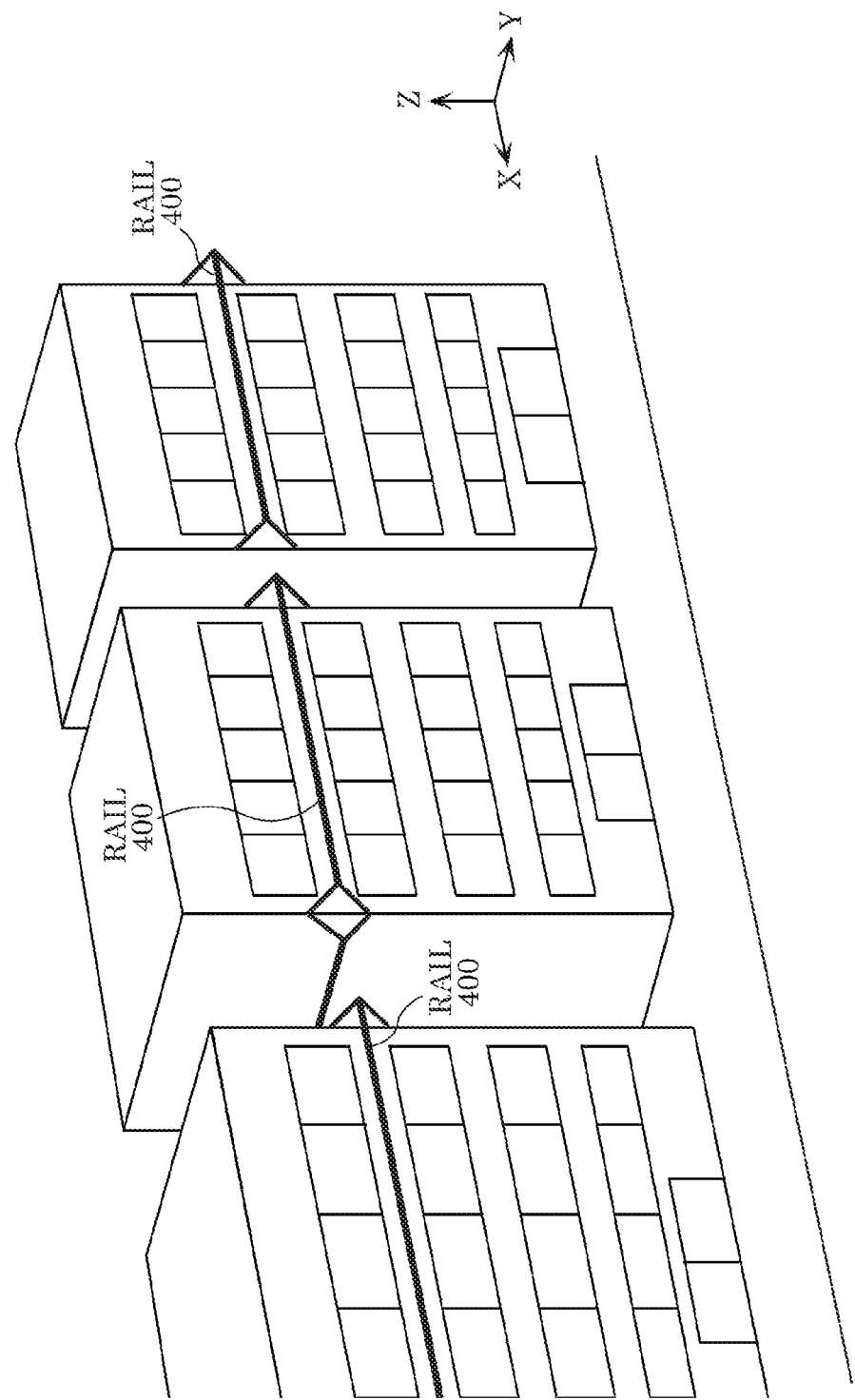
FIG. 3 illustrates an example of rails installed on buildings within a flying area according to Embodiment 1.

FIG. 3 illustrates an example of rail 400 installed on building 700 within a flying area according to Embodiment 1. Three coordinate axes are defined in FIG. 3, and the X-axis direction coincides with the direction in which the drones travel. The forward moving direction of the drones coincides with the positive direction along the X-axis, and the backward moving direction of the drones coincides with the negative direction along the X-axis. The Y-axis direction is a direction perpendicular to the X-axis direction and the vertical direction. The direction away from building 700 or rail 400 coincides with the positive direction along the Y-axis, and the direction approaching building 700 or rail 400 coincides with the negative direction along the Y-axis. The Z-axis direction is the vertical direction. The vertically upward direction coincides with the positive direction along the Z-axis, and the vertically downward direction coincides with the negative direction along the Z-axis. Rails 400 extend in the horizontal direction on side walls of buildings 700. Each rail 400 is fixed and installed at a position spaced apart from the ground surface. In FIG. 3, rail 400 is installed on the upper half of building 700. Alternatively, rail 400 may be installed on the lower half of building 700. For example, in flying system 10 according to the present embodiment, child drone 300 flies closer to rail 400 than parent drone 200 does. Child drone 300 flies along a position lower than where rail 400 is installed. This configuration allows child drone 300 to couple itself to rail 400 with ease via arm 340 provided in an upper portion of child drone 300. Child drone 300 flies along installed rail 400. Alternatively, child drone 300 couples arm 340 provided in child drone 300 to rail 400 and thus flies while being prevented from falling. Child drone 300 can be movably coupled to rail 400 via arm 340 provided in child drone 300. Child drone 300 may fly while being coupled to rail 400.

Figure 4:
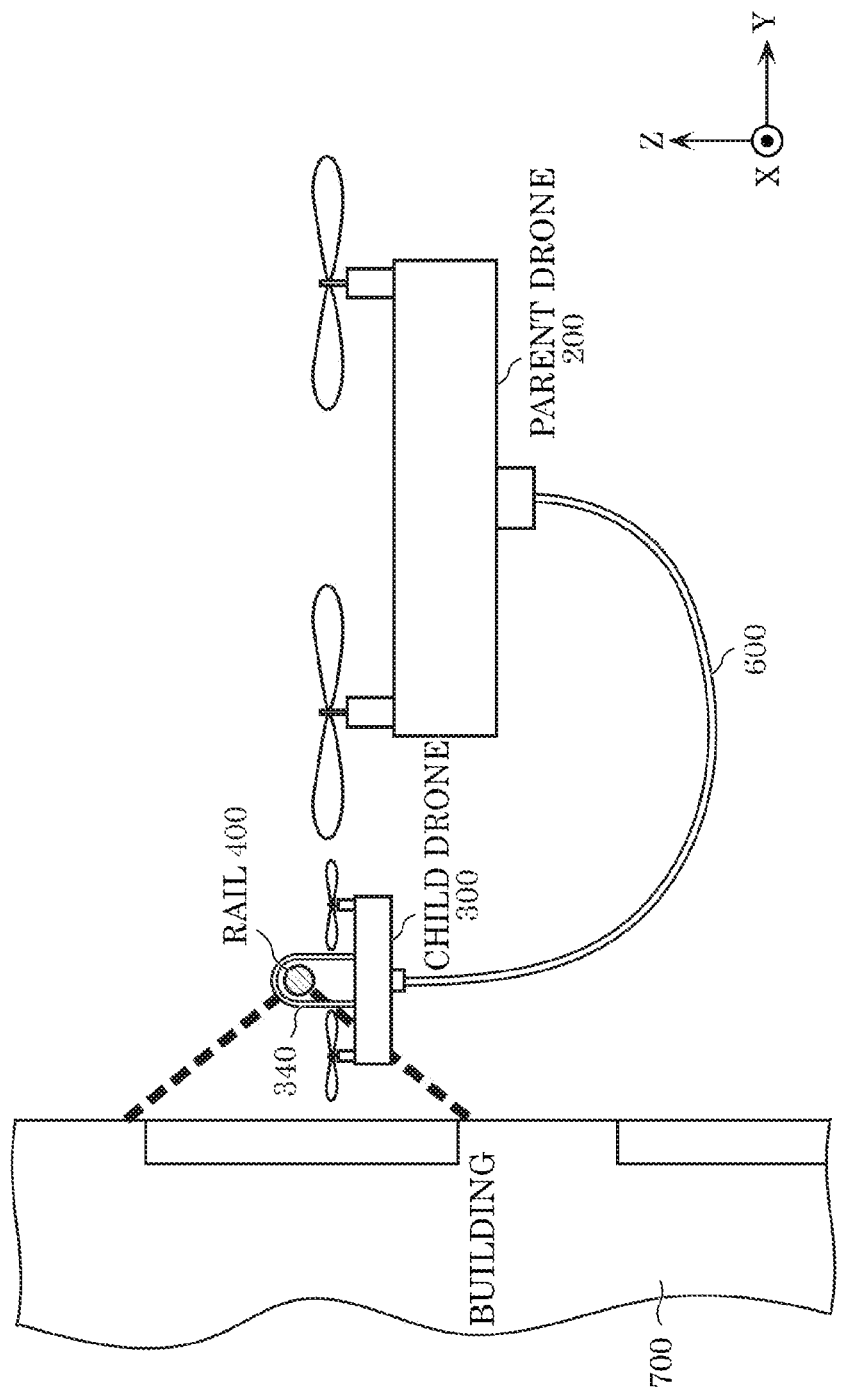
FIG. 4 illustrates an example of a state in which a child drone is coupled to a rail installed on a building and a parent drone is coupled to the child drone via a wire according to Embodiment 1.

FIG. 4 illustrates an example of a state in which child drone 300 is coupled to rail 400 installed on building 700 and parent drone 200 is coupled to child drone 300 via wire 600 according to Embodiment 1. In FIG. 4, child drone 300 is coupled to rail 400 installed on building 700. Child drone 300 is coupled to parent drone 200 via wire 600. In order to reduce the wear of rail 400, child drone 300 flies with arm 340 of child drone 300 making no contact with rail 400. Parent drone 200 can fly freely within a range that wire 600 can reach from the point where parent drone 200 is coupled to child drone 300 via wire 600. On the other hand, child drone 300 flies linearly along rail 400 installed on building 700. Since child drone 300 is coupled to rail 400 via arm 340, there is little possibility that child drone 300 or parent drone 200 falls even if an anomaly occurs in flying of child drone 300 or parent drone 200.

Figure 5:
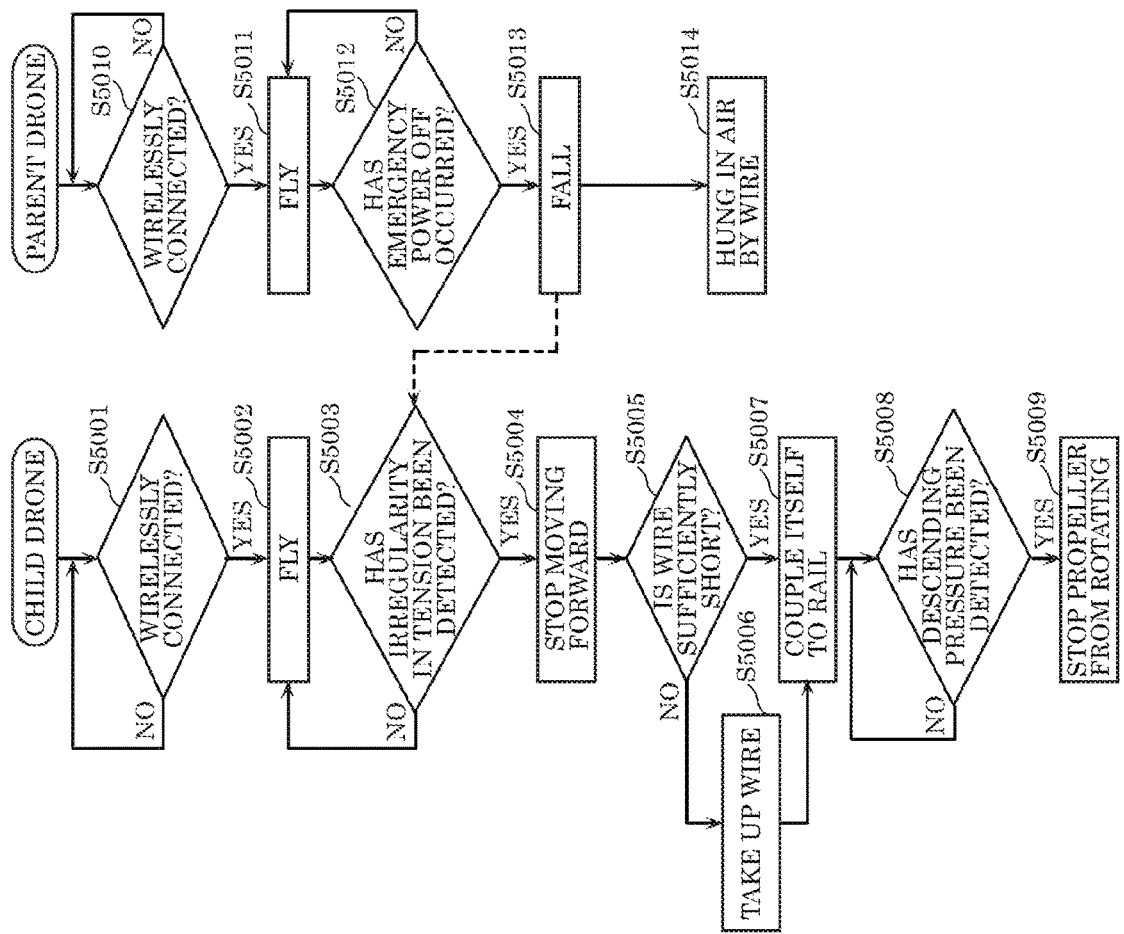
FIG. 5 is a flowchart illustrating a first example of fall prevention control in the flying system according to Embodiment 1.

FIG. 5 is a flowchart illustrating a first example of fall prevention control in flying system 10 according to Embodiment 1. Child drone 300 determines whether child drone 300 is wirelessly connected to parent drone 200 (S5001). If child drone 300 is wirelessly connected to parent drone 200 (YES in S5001), child drone 300 starts flying (S5002). If child drone 300 is not wirelessly connected to parent drone 200 (NO in S5001), the flow returns to step S5001. Next, child drone 300 determines, via tension sensor 333, whether there is any irregularity in the tension of wire 600 (S5003). If child drone 300 has detected an irregularity in the tension of wire 600 (YES in S5003), child drone 300 stops moving forward (S5004). Next, child drone 300 determines whether the length of wire 600 connecting child drone 300 and parent drone 200 is less than or equal to a predetermined length (S5005). If the length of wire 600 is less than or equal to the predetermined length (YES in S5005), child drone 300 couples itself to rail 400 (S5007). If the length of wire 600 is neither less than nor equal to the predetermined length (NO in S5005), child drone 300 takes up wire 600 with wire control module 311 (S5006). Thereafter, child drone 300 couples itself to rail 400 (S5007). Next, child drone 300 determines whether child drone 300 has detected a descending pressure (S5008). For example, in a case where controller 230 includes a pressure sensor, child drone 300 determines whether the descending pressure detected by that pressure sensor is higher than or equal to a threshold. If child drone 300 has detected the descending pressure (YES in S5008), child drone 300 stops its propellers from rotating (S5009).

Parent drone 200 determines whether parent drone 200 is wirelessly connected to child drone 300 (S5010). If parent drone 200 is wirelessly connected to child drone 300 (YES in S5010), parent drone 200 starts flying (S5011). Next, it is determined whether an emergency power off has occurred in parent drone 200 (S5012). If an emergency power off has occurred in parent drone 200 (YES in S5012), parent drone 200 falls (S5013). In this case, child drone 300 detects an irregularity in the tension in step S5003. Next, parent drone 200 that has fallen becomes hung in the air by wire 600 coupling child drone 300 and parent drone 200 (S5014).

Through the series of operations described above, when an emergency power off has occurred in flying parent drone 200, child drone 300 can determine that parent drone 200 has fallen based on a change in the tension of wire 600 connecting parent drone 200 and child drone 300. Child drone 300 may determine that an anomaly has occurred in flying of parent drone 200 when the tension of wire 600 has reached or exceeded a predetermined threshold. When parent drone 200 has fallen, child drone 300, via wire control module 311, takes up wire 600 connecting child drone 300 and parent drone 200 to reduce the length of wire 600. Then, child drone 300 couples itself to rail 400. This operation can reduce the distance between child drone 300 and parent drone 200, and thus child drone 300 and parent drone 200 can be kept from falling to the ground. Lastly, child drone 300 stops its propellers from rotating and stops flying.

Figure 6:
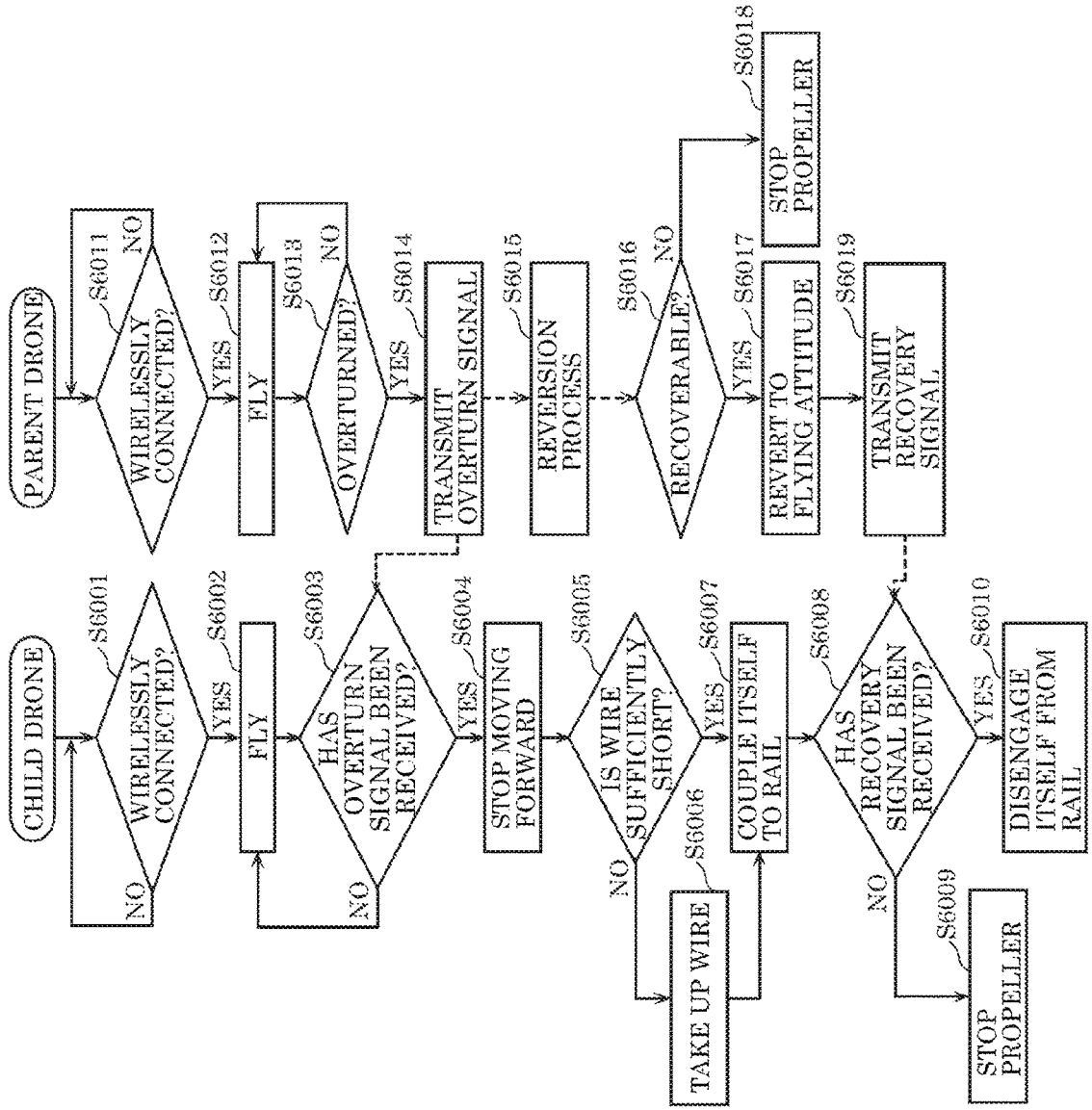
FIG. 6 is a flowchart illustrating a second example of fall prevention control in the flying system according to Embodiment 1.

FIG. 6 is a flowchart illustrating a second example of fall prevention control in flying system 10 according to Embodiment 1. Child drone 300 determines whether child drone 300 is wirelessly connected to parent drone 200 (S6001). If child drone 300 is wirelessly connected to parent drone 200 (YES in S6001), child drone 300 starts flying (S6002). If child drone 300 is not wirelessly connected to parent drone 200 (NO in S6001), the flow returns to step S6001. Next, child drone 300 determines whether child drone 300 has received an overturn signal from parent drone 200 (S6003). If child drone 300 has received an overturn signal from parent drone 200 (YES in S6003), child drone 300 stops moving forward (S6004). Next, child drone 300 determines whether the length of wire 600 coupling parent drone 200 and child drone 300 is less than or equal to a predetermined length (S6005). If wire 600 is sufficiently short (YES in S6005), child drone 300 couples itself to rail 400 (S6007). If wire 600 is not sufficiently short, child drone 300, via wire control module 311, takes up wire 600 connecting child drone 300 and parent drone 200. Thereafter, child drone 300 couples itself to rail 400 (S6007). Next, child drone 300 determines whether child drone 300 has received a recovery signal from parent drone 200 (S6008). If child drone 300 has received a recovery signal from parent drone 200 (YES in S6008), child drone 300 disengages itself from rail 400 (S6010). If child drone 300 does not receive any recovery signal from parent drone 200 (NO in S6008), child drone 300 stops its propellers (S6009).

Parent drone 200 determines whether parent drone 200 is wirelessly connected to child drone 300 (S6011). If parent drone 200 is wirelessly connected to child drone 300 (YES in S6011), parent drone 200 starts flying (S6012). If parent drone 200 is not wirelessly connected to child drone 300 (NO in S6011), the flow returns to step S6011. Next, parent drone 200 determines whether parent drone 200 itself has overturned (S6013). In this example, that parent drone 200 has overturned means that the body of parent drone 200 is inverted and turned almost upside down while flying. If parent drone 200 has overturned (YES in S6013), parent drone 200 transmits an overturn signal to child drone 300 (S6014). Thereafter, parent drone 200 performs a reversion process (S6015). In this example, a reversion process is a process of gathering information for recovering from the overturned attitude. Then, parent drone 200 determines whether parent drone 200 itself is capable of recovery (S6016). In this example, that parent drone 200 recovers means that parent drone 200 brings its overturned attitude back to the attitude held in a normal flying condition. If parent drone 200 is capable of recovery (YES in S6016), parent drone 200 reverts to its flying attitude (S6017). If parent drone 200 is not capable of recovery (NO in S6016), parent drone 200 stops its propellers (S6018). After parent drone 200 has reverted to its flying attitude in step S6017, parent drone 200 transmits a recovery signal to child drone 300 (S6019).

The above operations allow child drone 300 to detect an overturn of parent drone 200 based on an electric signal transmitted from parent drone 200. If child drone 300 has detected an overturn of parent drone 200, child drone 300, via wire control module 311, takes up wire 600 coupling parent drone 200 and child drone 300. This operation can reduce the length of wire 600 present between parent drone 200 and child drone 300. Thereafter, child drone 300 couples itself to rail 400, and this can keep parent drone 200 and child drone 300 from falling to the ground. If parent drone 200 has reverted to its flying attitude, child drone 300 disengages itself from rail 400 in response to receiving a recovery signal transmitted from parent drone 200. This configuration allows parent drone 200 and child drone 300 to fly again with a high degree of freedom. If child drone 300 fails to receive a recovery signal transmitted from parent drone 200, parent drone 200 and child drone 300 each stop its propellers, and child drone 300 remains coupled to rail 400. Therefore, parent drone 200 and child drone 300 can be kept from falling to the ground and can stop operating safely.

Figure 7B:
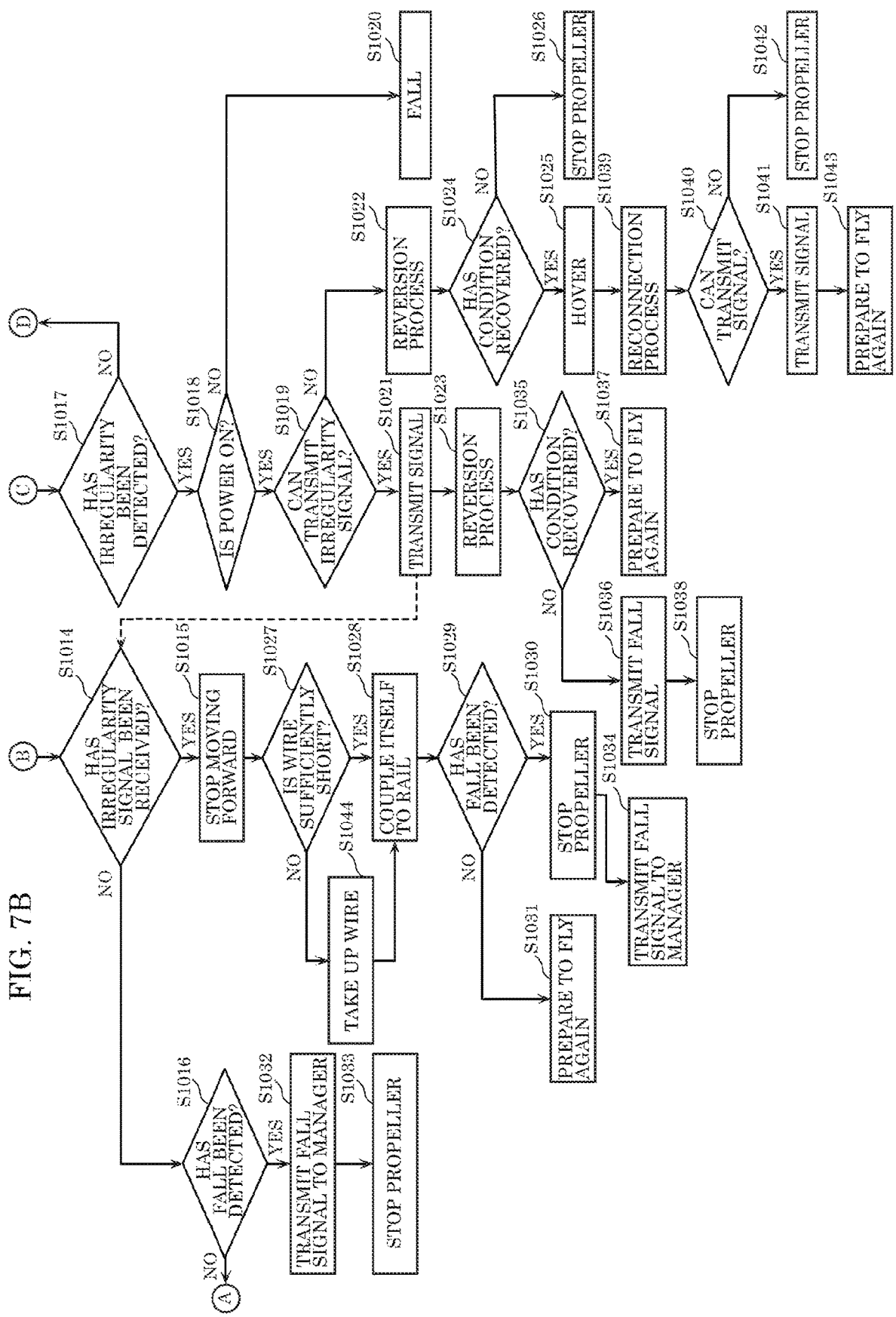
FIG. 7B is another flowchart illustrating the third example of the fall prevention control in the flying system according to Embodiment 1.

FIGS. 7A and 7B are flowcharts illustrating a third example of fall prevention control in flying system 10 according to Embodiment 1.

First, manager 100, which operates the drones, wirelessly transmits a flight preparation instruction to each of parent drone 200 and child drone 300 (S1000). Child drone 300 receives the flight preparation instruction (S1001). Parent drone 200 also receives the flight preparation instruction (S1002). Next, child drone 300 tries to connect to parent drone 200 wirelessly or via a cable (S1003). Parent drone 200 also tries to connect to child drone 300 wirelessly or via a cable (S1004). Child drone 300 determines whether child drone 300 has connected to parent drone 200 (S1005). Parent drone 200 determines whether parent drone 200 has connected to child drone 300 (S1006). If child drone 300 determines that child drone 300 has connected to parent drone 200 (YES in S1005), child drone 300 transmits a preparation complete signal to manager 100 (S1007). In response to receiving the preparation complete signal from child drone 300, manager 100 determines whether child drone 300 is prepared to fly (S1008). If manager 100 determines that child drone 300 is prepared to fly (YES in S1008), manager 100 issues a flight instruction to child drone 300 (S1009). Upon receiving the flight instruction from manager 100, child drone 300 starts flying (S1010). If manager 100 determines that child drone 300 is not prepared to fly (NO in S1008), manager 100 wirelessly transmits a flight preparation instruction to each of parent drone 200 and child drone 300 (the flow returns to step S1000). If child drone 300 determines that child drone 300 has not connected to parent drone 200 (NO in S1005), child drone 300 tries to connect to parent drone 200 wirelessly or via a cable (the flow returns to step S1003). Next, if parent drone 200 determines that parent drone 200 has connected to child drone 300 (YES in S1006), parent drone 200 starts flying (S1011). If parent drone 200 determines that parent drone 200 has not connected to child drone 300 (NO in S1006), parent drone 200 tries to connect to child drone 300 wirelessly or via a cable (the flow returns to step S1004).

While child drone 300 is flying, child drone 300 intermittently transmits, to manager 100, its own position information acquired through the global navigation satellite system (GNSS) (S1012). Parent drone 200 also intermittently transmits, to manager 100, its own position information acquired through the GNSS (S1013).

As illustrated in FIG. 7B, if an irregularity occurs to parent drone 200 while parent drone 200 is flying, that is, if a certain situation arises that keeps parent drone 200 from further flying stably (YES in S1017), parent drone 200 first determines whether its own power is on (S1018). If the power is off (NO in S1018), the propellers of parent drone 200 are forced to stop, and parent drone 200 falls downward by its own weight (S1020).

Specifically, the above situation occurs conceivably, for example but not limited to, when battery 211 of parent drone 200 is depleted or when the power supply system of parent drone 200 is damaged instantaneously upon parent drone 200 colliding with an object.

If parent drone 200 can keep its power on (YES in S1018), parent drone 200 then determines whether parent drone 200 is still electrically connected to child drone 300 and whether parent drone 200 can transmit, to child drone 300, a signal that informs child drone 300 of an irregularity (S1019).

If parent drone 200 cannot transmit a signal that informs child drone 300 of an irregularity (NO in S1019), parent drone 200 performs a process of reverting to the flying status on its own (S1022).

Some specific examples of the case where parent drone 200 cannot transmit a signal include a case where communicator 220 of parent drone 200 has been damaged upon parent drone 200 colliding with an object and a case where the wireless connection has been lost due to radio wave interference or the like.

The reversion process in this example refers to a process in which flight controller 231 of parent drone 200 measures and analyzes the flight condition and the position information via sensors provided in parent drone 200 and tries to bring parent drone 200 back into a stable flying condition. This reversion process may be performed autonomously by parent drone 200 itself or may be performed remotely by manager 100.

It is determined whether the flying condition of parent drone 200 has recovered through the reversion process (S1024). If the flying condition has recovered (YES in S1024), parent drone 200 temporarily hovers (S1025) and tries to electrically reconnect to child drone 300 (S1039). If the flying condition fails to recover even after a predefined time has passed (NO in S1024), parent drone 200 automatically stops its propellers and falls toward the ground (S1026). In this case, it is also conceivable that the manager remotely transmits a signal that causes an emergency stop of the propellers and makes parent drone 200 fall.

After parent drone 200 has tried to reconnect to child drone 300 (S1039), parent drone 200 determines whether an electrical connection has been established to allow parent drone 200 to transmit a signal (S1040). If parent drone 200 can transmit a signal (YES in S1040), parent drone 200 transmits a signal to child drone 300 concerning the flying condition of parent drone 200 (S1041) and prepares again for a flight that is based on an initial flight plan (S1043). If parent drone 200 is still unable to transmit a signal even after a predefined time has passed, parent drone 200 automatically stops its propellers, or manager 100 manually stops the propellers of parent drone 200. Then, parent drone 200 falls (S1042).

If parent drone 200 can transmit an irregularity signal from the beginning (YES in S1019), parent drone 200 transmits an irregularity signal to child drone 300 (S1021) and performs the reversion process (S1023). Parent drone 200 determines whether its flying condition has recovered as a result of the reversion process (S1035). If the flying condition has recovered, parent drone 200 prepares to fly again (S1037). If the flying condition fails to recover, parent drone 200 transmits, to child drone 300, a signal informing child drone 300 that parent drone 200 is to fall (S1036). Then, parent drone 200 falls upon stopping its propellers manually or automatically (S1038). Child drone 300 constantly monitors whether child drone 300 receives an irregularity signal from parent drone 200 (S1014). If child drone 300 has received an irregularity signal (YES in S1014), child drone 300 stops moving forward against the flight plan (S1015) and starts preparing for a fall of parent drone 200.

First, child drone 300 measures the length of wire 600 coupling child drone 300 and parent drone 200 and, in consideration of the current speed or the current position information of parent drone 200, determines whether wire 600 is sufficiently short so that parent drone 200 does not crash into the ground (S1027). If child drone 300 determines that wire 600 is not sufficiently short, child drone 300 takes up wire 600 by a necessary amount (S1044) and tries to couple itself to rail 400 near child drone 300 (S1028). In this example, that child drone 300 couples itself to rail 400 means that child drone 300 couples arm 340 physically to rail 400 via rail control module 312.

Thereafter, child drone 300 determines whether child drone 300 has received a fall signal from parent drone 200 or whether wire control module 311 has detected a fall of parent drone 200 (S1029). If child drone 300 has detected a fall of parent drone 200 (YES in S1029), child drone 300 stops its propellers (S1030) and transmits, to manager 100, a signal informing manager 100 that child drone 300 has also fallen (S1034). When child drone 300 falls in this situation, the altitude of child drone 300 is lowered to a certain extent due to the loss of the lifting power provided by the propellers, but child drone 300 does not crash into the ground since child drone 300 is coupled to rail 400. This also applies similarly to the case where parent drone 200 falls, and parent drone 200 does not crash into the ground.

If no fall is detected even after a predefined time has passed (NO in S1029), it is determined that parent drone 200 has successfully reverted to its flying condition, and child drone 300 prepares to fly again (S1031).

Even if no irregularity signal is received from parent drone 200 (NO in S1014), if child drone 300 has detected a fall of parent drone 200 (YES in S1016), child drone 300 transmits, to manager 100, a signal informing manager 100 that child drone 300 is to fall and then stops its propellers (S1033).

Figure 8:
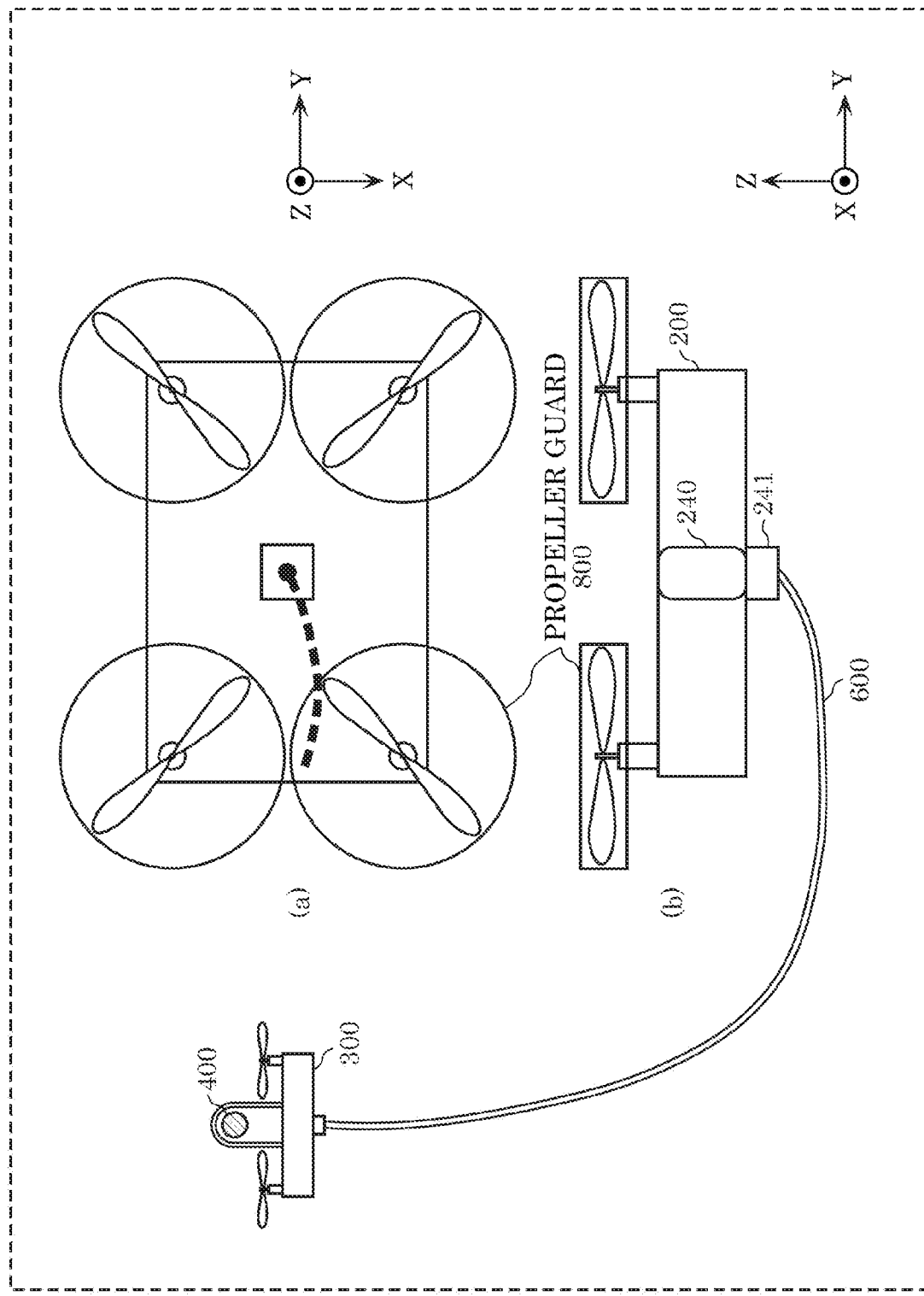
FIG. 8 schematically illustrates an appearance of a parent drone coupled to a child drone via a wire according to Embodiment 1.

FIG. 8 schematically illustrates an appearance of parent drone 200 coupled to child drone 300 via wire 600 according to Embodiment 1. Illustrated in (a) in FIG. 8 is a top view of parent drone 200. Parent drone 200 includes four propellers provided on an upper surface. The four propellers are each provided with propeller guard 800. Each propeller guard 800 has a ring shape and encircles the corresponding propeller. The presence of propeller guards 800 can help prevent wire 600 or the like from being caught by the propellers while parent drone 200 is flying. Wire 600 that couples parent drone 200 and child drone 300 is coupled to a lower surface of parent drone 200. Wire 600 is attached to wire connector 241 provided on rotary ring 240. Rotary ring 240 surrounds the fuselage of parent drone 200 and is rotatably attached to parent drone 200. As rotary ring 240 is rotated, wire connector 241 can be positioned on the upper surface of parent drone 200 or positioned on the lower surface of parent drone 200. Therefore, with respect to parent drone 200, wire 600 can extend from the upper surface of parent drone 200 or can hang down from the lower surface of parent drone 200. As illustrated in (b) in FIG. 8, parent drone 200 is coupled to child drone 300 via wire 600 that is coupled to wire connector 241.

Figure 9:
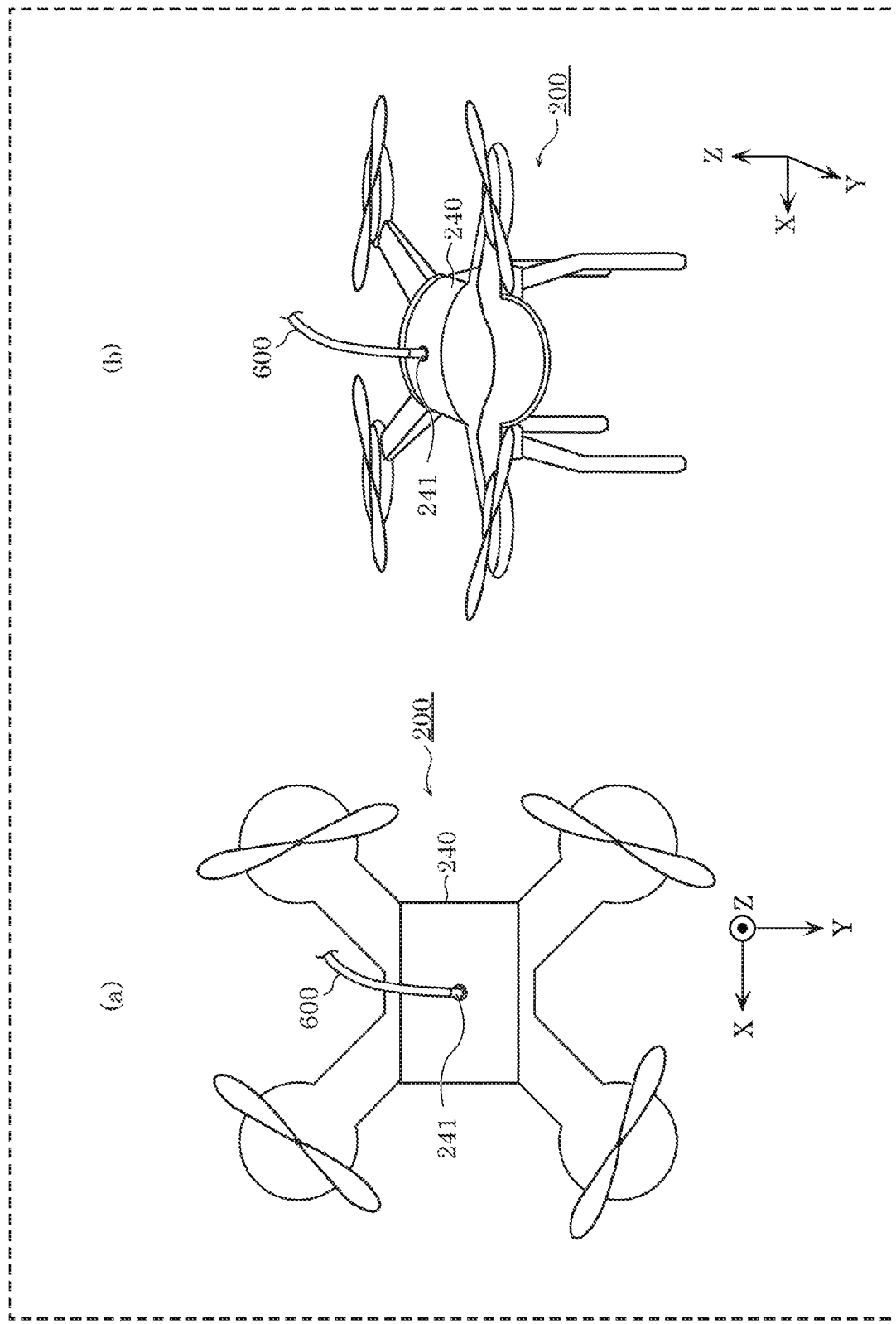
FIG. 9 illustrates a top view and a side view of a parent drone that includes a rotary ring to which a wire is to be connected.

FIG. 9 illustrates a top view and a side view of parent drone 200 that includes rotary ring 240 to which wire 600 is to be coupled. Illustrated in (a) in FIG. 9 is a top view of parent drone 200. Parent drone 200 includes four propellers provided on its upper surface. The number of the propellers provided in parent drone 200 is not limited to four, and it suffices that a plurality of propellers be provided in parent drone 200. Parent drone 200 includes rotary ring 240. Rotary ring 240 surrounds the fuselage of parent drone 200 and is rotatably attached to parent drone 200. Wire 600 is coupled to rotary ring 240 via wire connector 241. In (a) in FIG. 9, rotary ring 240 is installed such that wire connector 241 where rotary ring 240 is connected to wire 600 is located on the upper surface of parent drone 200. Illustrated in (b) in FIG. 9 is a side view of parent drone 200. Parent drone 200 is shaped such that the lower surface of its fuselage bulges in the vertical direction. The fuselage of parent drone 200 may have a cylinder-like shape. Parent drone 200 may include one or more legs that help parent drone 200 stand on the ground. The propellers installed in parent drone 200 may be arranged radially about the center of parent drone 200. In (b) in FIG. 9, wire 600 coupled to parent drone 200 is located on the upper surface of parent drone 200 via wire connector 241 in rotary ring 240. In this manner, wire 600 may extend from the upper surface of parent drone 200.

Figure 10:
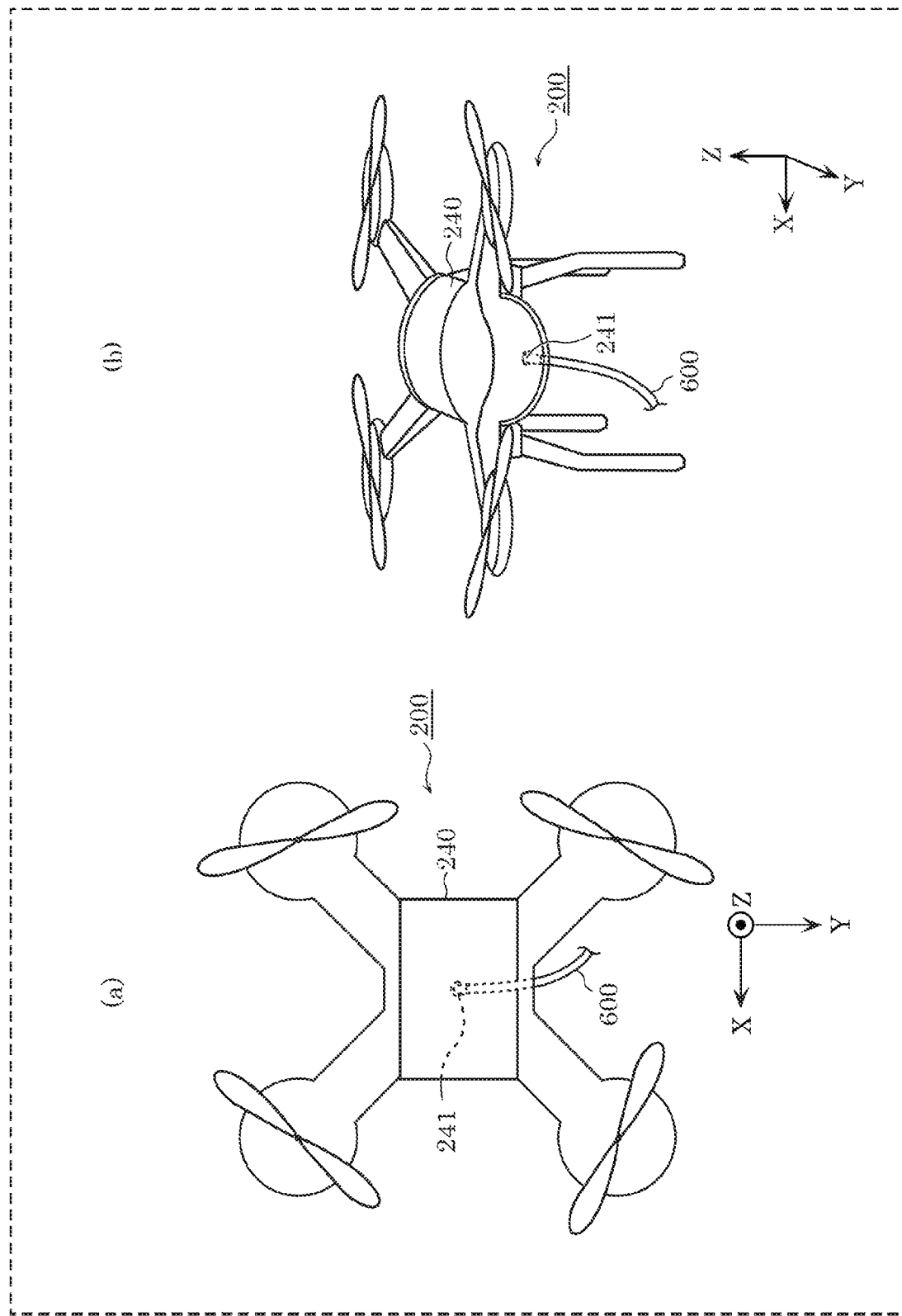
FIG. 10 illustrates a top view and a side view of a parent drone that includes a rotary ring to which a wire is to be connected, and a wire connector is located on a lower surface of the parent drone.

FIG. 10 illustrates a top view and a side view of parent drone 200 that includes rotary ring 240 to which wire 600 it to be coupled, and wire connector 241 is located on the lower surface of parent drone 200. Illustrated in (a) in FIG. 10 is a top view of parent drone 200. Parent drone 200 includes four propellers provided on its upper surface. The number of the propellers provided in parent drone 200 is not limited to four, and it suffices that a plurality of propellers be provided in parent drone 200. Parent drone 200 includes rotary ring 240. Rotary ring 240 surrounds the fuselage of parent drone 200 and is rotatably attached to parent drone 200. Wire 600 is coupled to rotary ring 240 via wire connector 241. In (a) in FIG. 10, rotary ring 240 is installed such that wire connector 241 where rotary ring 240 is connected to wire 600 is located on the lower surface of parent drone 200. Illustrated in (b) in FIG. 10 is a side view of parent drone 200. Wire 600 is attached to rotary ring 240. In (b) in FIG. 10, wire connector 241 provided in rotary ring 240 that is rotatably attached to parent drone 200 is located on the lower surface of parent drone 200. In this manner, wire 600 may hang down from the lower surface of parent drone 200.

Figure 11:
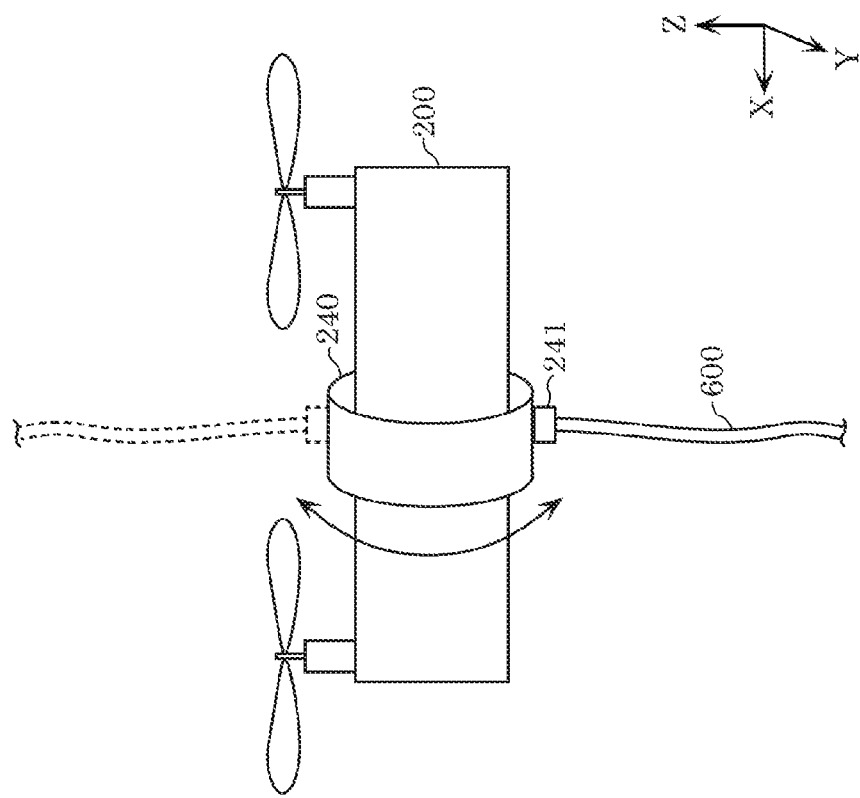
FIG. 11 illustrates an example of a movement of a rotary ring connected to a wire.

FIG. 11 illustrates an example of a movement of rotary ring 240 coupled to wire 600. The coordinate axes defined in FIG. 11 are the X-axis extending in the right and left direction, the Y-axis extending in the depthwise direction, and the Z-axis extending in the up and down direction. Rotary ring 240 is attached to parent drone 200. Rotary ring 240 is attached so as to surround the fuselage of parent drone 200. Rotary ring 240 rotates about an axis extending in the X-axis direction. Rotary ring 240 has a ring-like shape. Rotary ring 240 is made of metal, resin, or the like. Wire connector 241 is disposed in a portion of rotary ring 240. Wire connector 241 may be a cylindrical projection formed on rotary ring 240. Wire 600 is attached to wire connector 241. Rotary ring 240 rotates in accordance with the tension in wire 600. Therefore, parent drone 200 can maintain its attitude to a certain extent regardless of the tension in wire 600.

Figure 12:
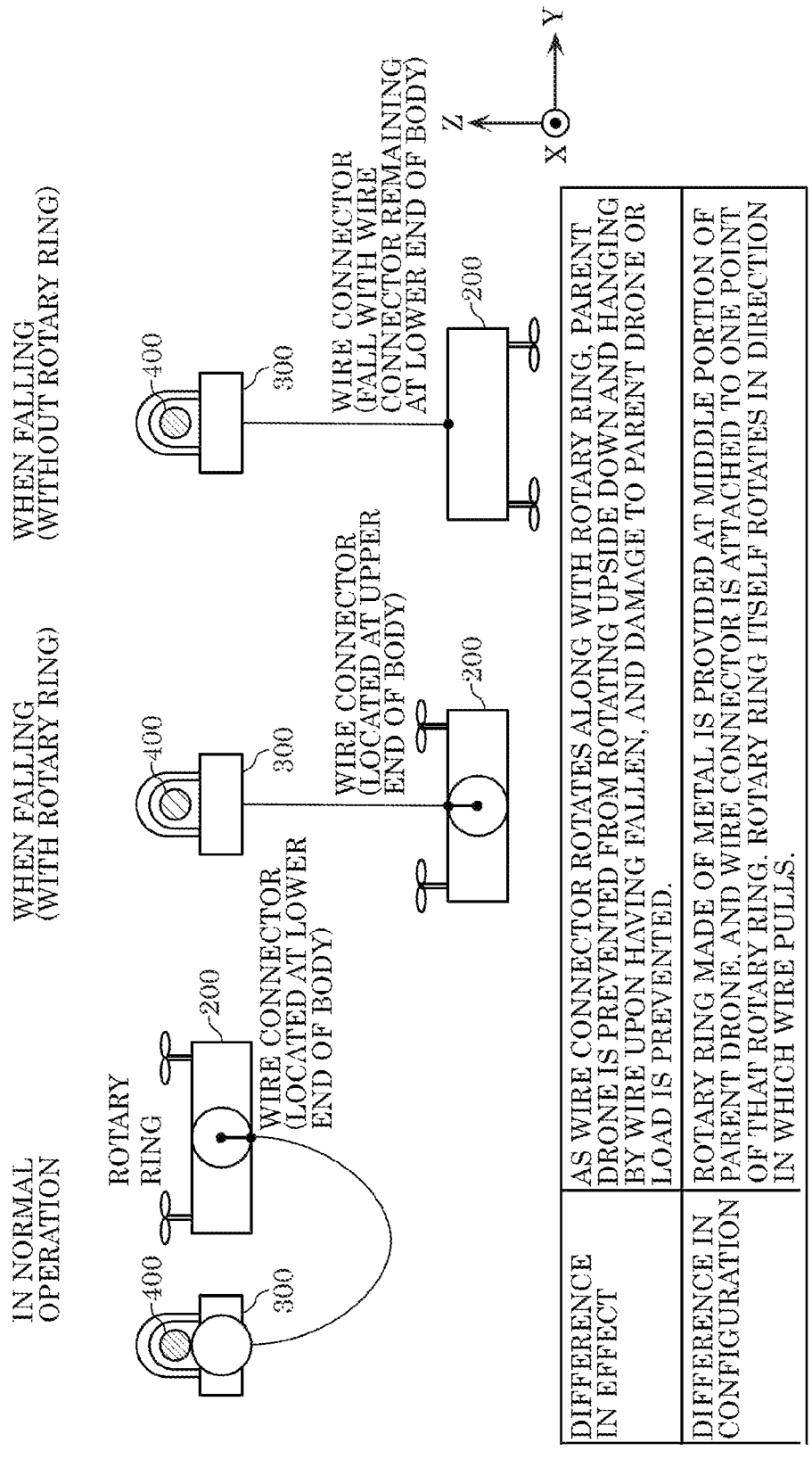
FIG. 12 is a schematic diagram for describing a role that a rotary ring plays when a parent drone falls according to Embodiment 1.

FIG. 12 is a schematic diagram for describing a role that rotary ring 240 plays when parent drone 200 falls according to Embodiment 1. In a normal operation, wire connector 241 provided in rotary ring 240 is located at a lower end of the body of parent drone 200. In a normal operation, parent drone 200 is coupled to child drone 300 by wire 600 via wire connector 241 located at the lower end of the body of parent drone 200. Rotary ring 240 is mounted on and around a middle portion of the body of the parent drone. Wire connector 241 is provided in rotary ring 240. Therefore, rotary ring 240 rotates in a direction in which wire 600 pulls rotary ring 240.

When the parent drone falls, rotary ring 240 provided with the wire connector and installed on parent drone 200 rotates a half circle, and parent drone 200 hangs down from a lower portion of child drone 300. Rotary ring 240 rotates, and this reduces the possibility that parent drone 200 gets tangled in wire 600. This configuration can keep the body of the parent drone from rotating upside down when the parent drone falls and can thus prevent damage to the body of parent drone 200 and to load 500 loaded in parent drone 200.

If rotary ring 240 is not provided in parent drone 200, parent drone 200, upon having fallen, ends up hanging down from child drone 300 upside down with the lower end of parent drone 200 where wire connector 241 is located facing upward.

Figure 13:
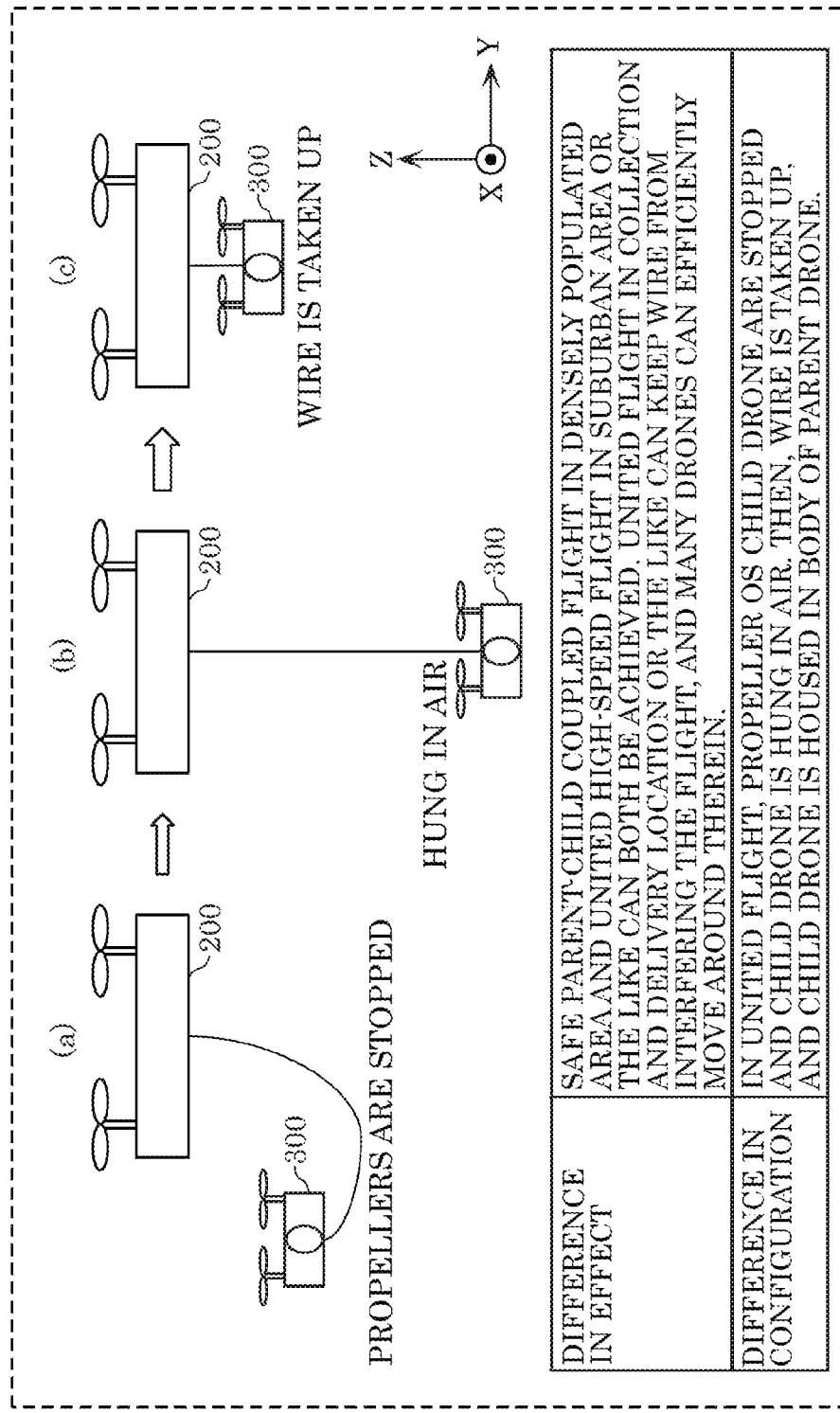
FIG. 13 schematically illustrates procedures that a parent drone performs to retrieve a child drone according to Embodiment 1.

FIG. 13 schematically illustrates procedures performed when parent drone 200 retrieves child drone 300 according to Embodiment 1. Child drone 300 may include a rotary ring to which the wire is to be coupled. In (a) in FIG. 13, the propellers of child drone 300 stop for some reason. Then, as illustrated in (b) in FIG. 13, child drone 300 is hung in the air while hanging down from parent drone 200. Thereafter, as illustrated in (c) in FIG. 13, parent drone 200, via wire control module 212 of actuator 210, takes up wire 600 connecting parent drone 200 and child drone 300. With this operation, child drone 300 is retrieved by parent drone 200. In this state, parent drone 200 and child drone 300 are regarded as being united. Child drone 300 may be housed inside parent drone 200. Uniting parent drone 200 and child drone 300 enables a high-speed flight in a location, such as a suburban area, where no rail 400 is installed. In a location such as a collection and delivery location for loads to be transported by parent drone 200 as well, if parent drone 200 and child drone 300 fly while being united, wire 600 does not interfere with other parent drones 200 and child drones 300, and this allows many drones to efficiently move around in the collection and delivery location.

Figure 14:
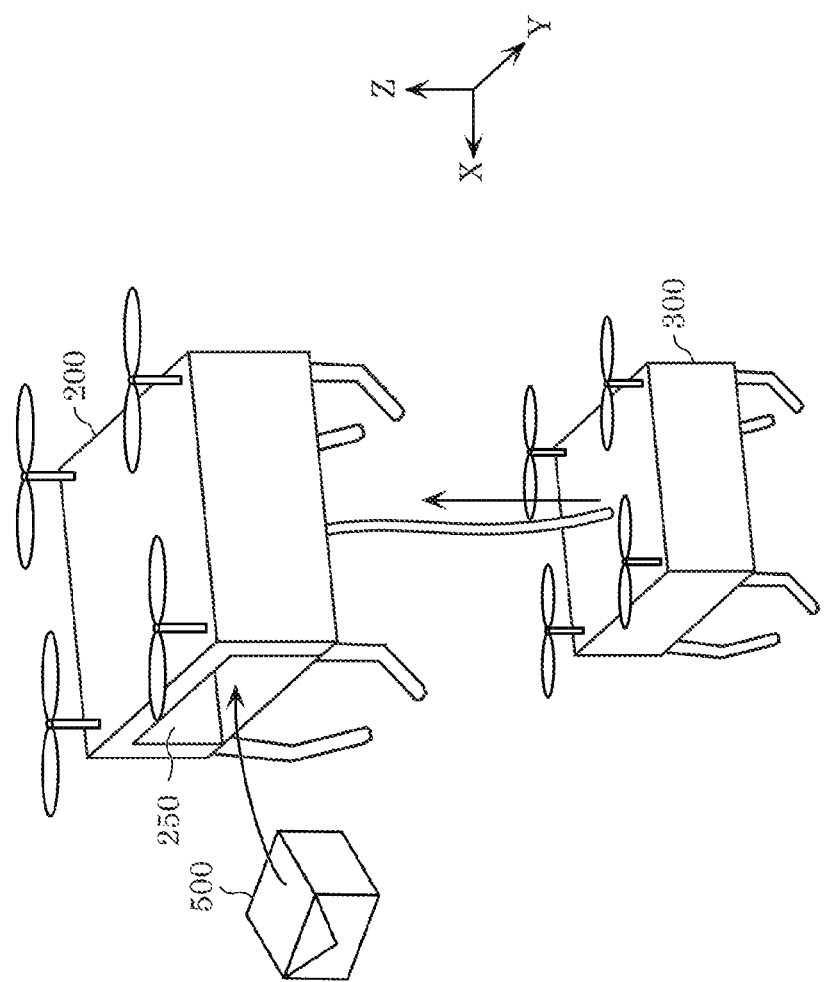
FIG. 14 illustrates how a load is loaded into a parent drone from its side.

FIG. 14 illustrates how load 500 is loaded into parent drone 200 from the side. Opening 250 is provided in a side of parent drone 200 so that load 500 can be loaded into a hollow space in the fuselage of parent drone 200. The shape of opening 250 may be rectangular or circular, for example. Load 500 may be loaded not into the hollow space in the fuselage of parent drone 200 but into a box-like container attached to a lower portion of the fuselage of parent drone 200. Parent drone 200 can house child drone 300 in a lower portion of parent drone 200. While the propellers of child drone 300 are stopped, wire control module 212 of parent drone 200 may take up wire 600 coupling parent drone 200 and child drone 300. Thus, parent drone 200 can house child drone 300 in a lower portion of parent drone 200.

When parent drone 200 and child drone 300 fly together, with child drone 300 housed inside parent drone 200, at a higher speed than they do when they perform a parent-child coupled flight, this mode of flight is referred to as a united high-speed flight. A united high-speed flight refers not only to a flight in which parent drone 200 and child drone 300 fly with child drone 300 housed in parent drone 200 but also to a flight in which parent drone 200 and child drone 300 can fly together with the coupling line that couples parent drone 200 and child drone 300 shortened.

Figure 15:
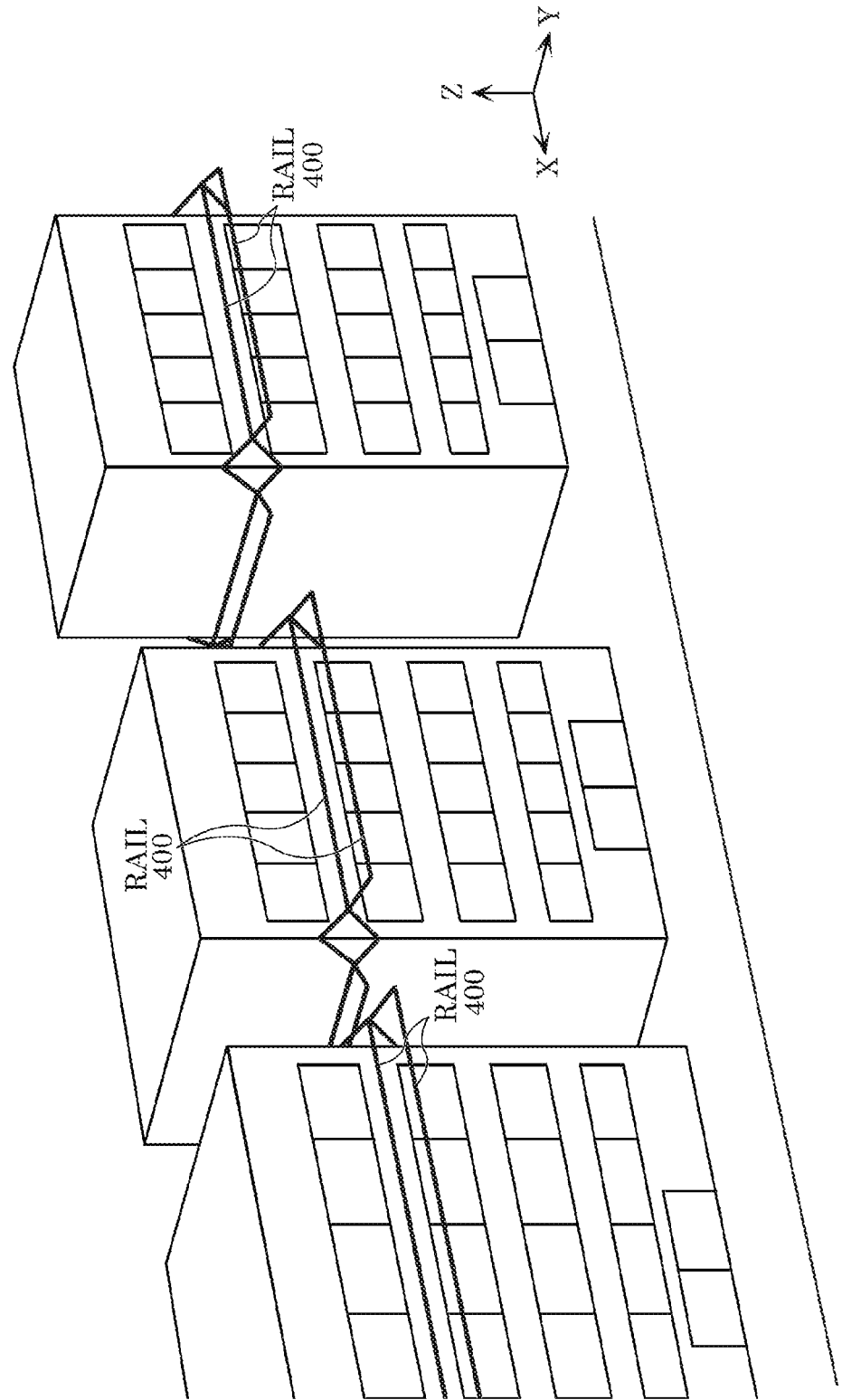
FIG. 15 illustrates an example of two rails installed on each building within a flying area according to Embodiment 1.

FIG. 15 illustrates an example of two rails 400 installed on each building 700 within a flying area according to Embodiment 1. As in the example illustrated in FIG. 3, rails 400 are installed on side walls of the buildings so as to extend in the horizontal direction. In this example, the number of installed rails 400 is two. Two rails 400 may be arrayed side by side along a horizontal plane or may be disposed at different heights in the up and down direction. A flying body composed of parent drone 200 and child drone 300 coupled to each other is referred to as parent-child drone 30. When two or more parent-child drones 30 are flying along rails 400, the presence of the two rails allows one parent-child drone 30 to pass another parent-child drone 30.

Figure 16:
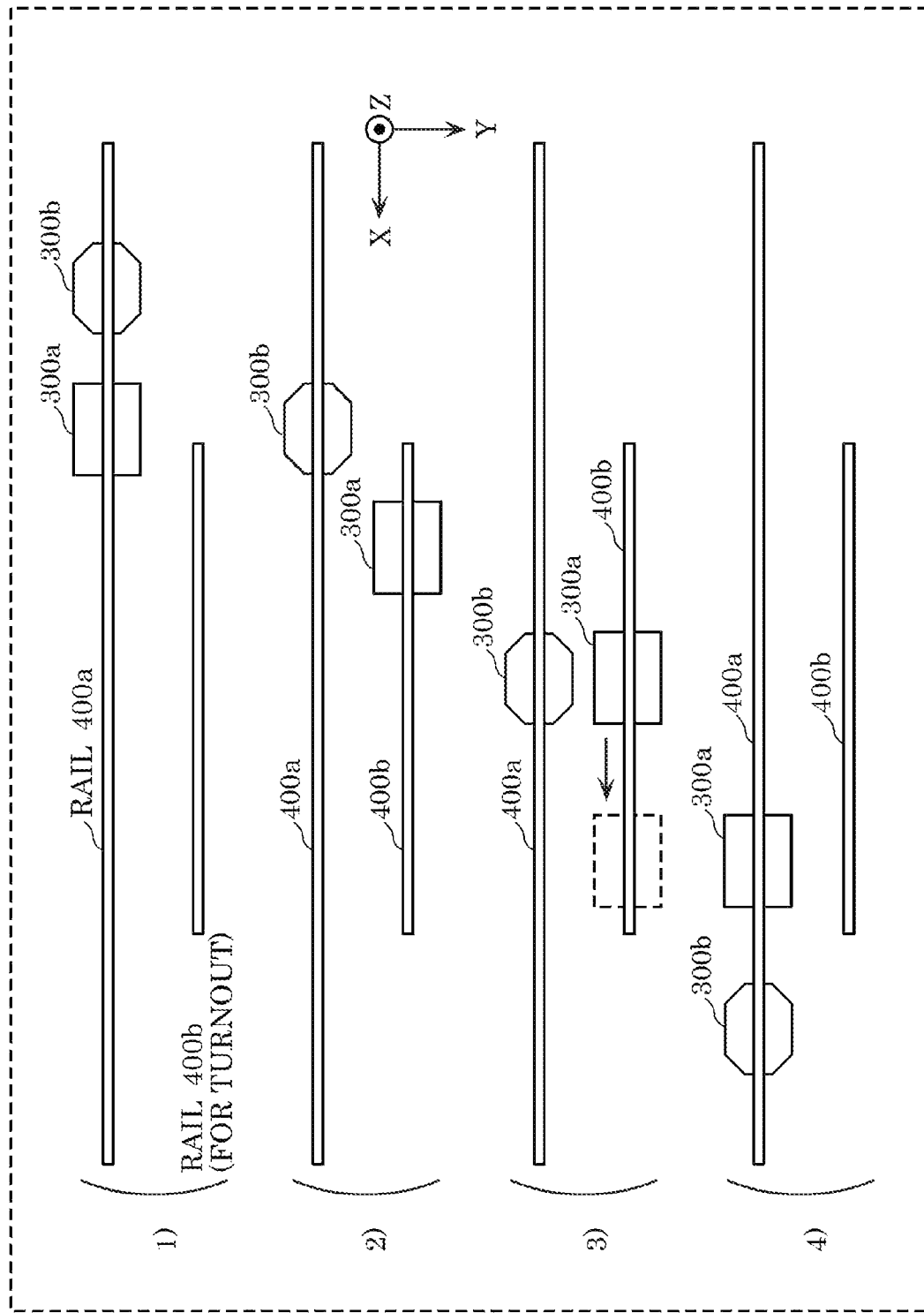
FIG. 16 illustrates an example of how one of the two child drones passes the other one of the two child drones in two-lane type rails according to Embodiment 1.

With reference to FIG. 16, how two drones can pass each other by utilizing two rails 400 will be described. FIG. 16 illustrates an example of how one of two child drones 300 passes the other one of two child drones 300 via two-lane type rails 400 according to Embodiment 1. Rails 400a and 400b illustrated in FIG. 16 correspond to two rails 400 illustrated in FIG. 15. For example, rail 400a is closer to a side wall of a building than rail 400b is. Child drones 300a and 300b illustrated in FIG. 16 each have a function and a configuration similar to those of child drone 300. In 1) of FIG. 16, child drone 300a and child drone 300b are coupled to rail 400. Child drone 300a is ahead of child drone 300b.

When child drone 300b is to pass child drone 300a, the following procedures are performed. As illustrated in 2) in FIG. 16, first, child drone 300a to be passed by temporarily moves over to rail 400b for the turnout. At this point, parent drone 200a (not illustrated) coupled to child drone 300a via wire 600 may be moved in a direction away from child drone 300a. Next, as illustrated in 3) in FIG. 16, child drone 300b remaining on rail 400a moves along rail 400a. As illustrated in 4) in FIG. 16, after child drone 300b has moved sufficiently along rail 400a, child drone 300a returns to rail 400a from rail 400b. At this point, the length of wire 600 coupling child drone 300 and parent drone 200a to be passed by may be increased. Through the operation described above, child drone 300b finishes passing child drone 300a. Thereafter, parent drone 200a (not illustrated) coupled to child drone 300a via wire 600 may be returned to its original flight course.

Figure 17:
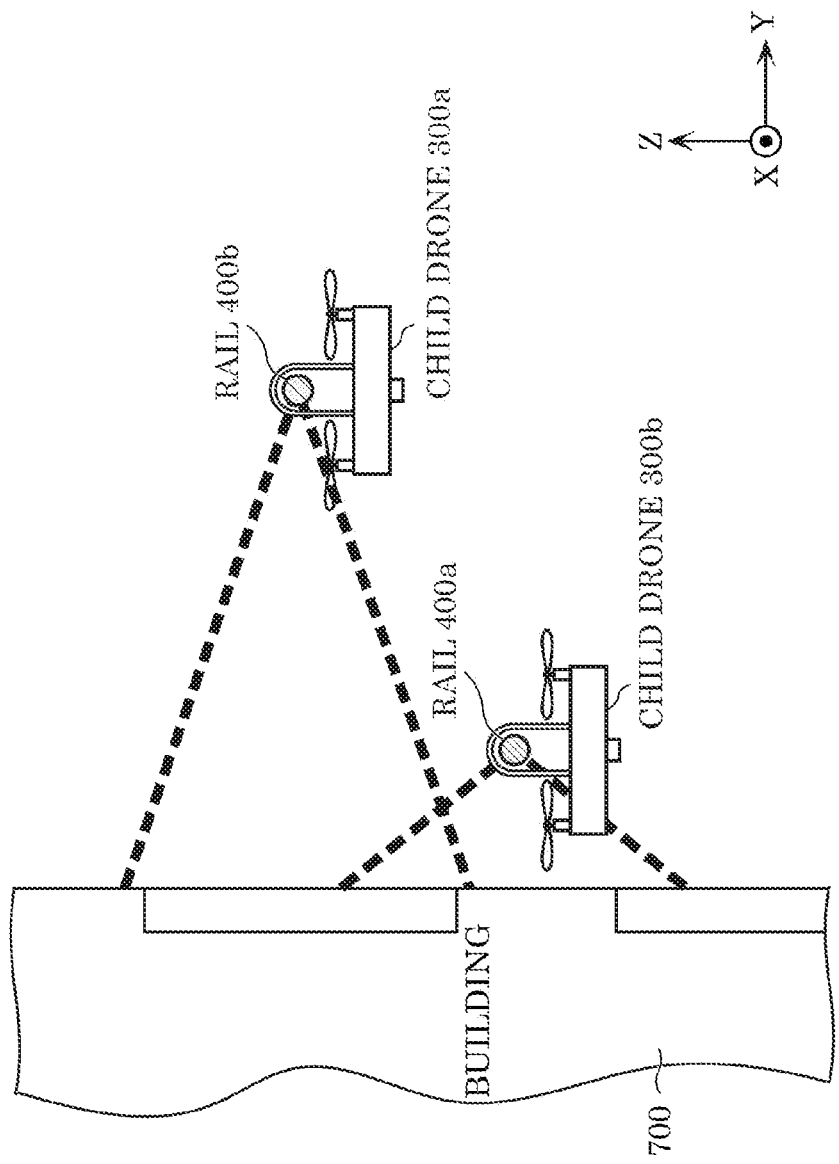
FIG. 17 illustrates an arrangement example of two-lane type rails according to Embodiment 1.

FIG. 17 illustrates an arrangement example of two-lane type rails 400 according to Embodiment 1. In this example, the distance between two rails 400a and 400b may be greater than the width of child drone 300. In FIG. 17, rail 400a at a lower level is disposed close to the building, and rail 400b at a higher level is disposed farther from the building than rail 400a is. Child drone 300b is coupled to rail 400a, and child drone 300a is coupled to rail 400b.

When a plurality of rails are to be used to allow a plurality of drones flying along the rails to pass each other, rail 400a and rail 400b may be disposed at different heights in the vertical direction, as illustrated in FIG. 17. In a case where rail 400a and rail 400b are disposed at different heights in the vertical direction in the aforementioned manner, the possibility that parent drone 200a (not illustrated) coupled to child drone 300a collides with parent drone 200b (not illustrated) coupled to child drone 300b can be reduced.

Figure 18:
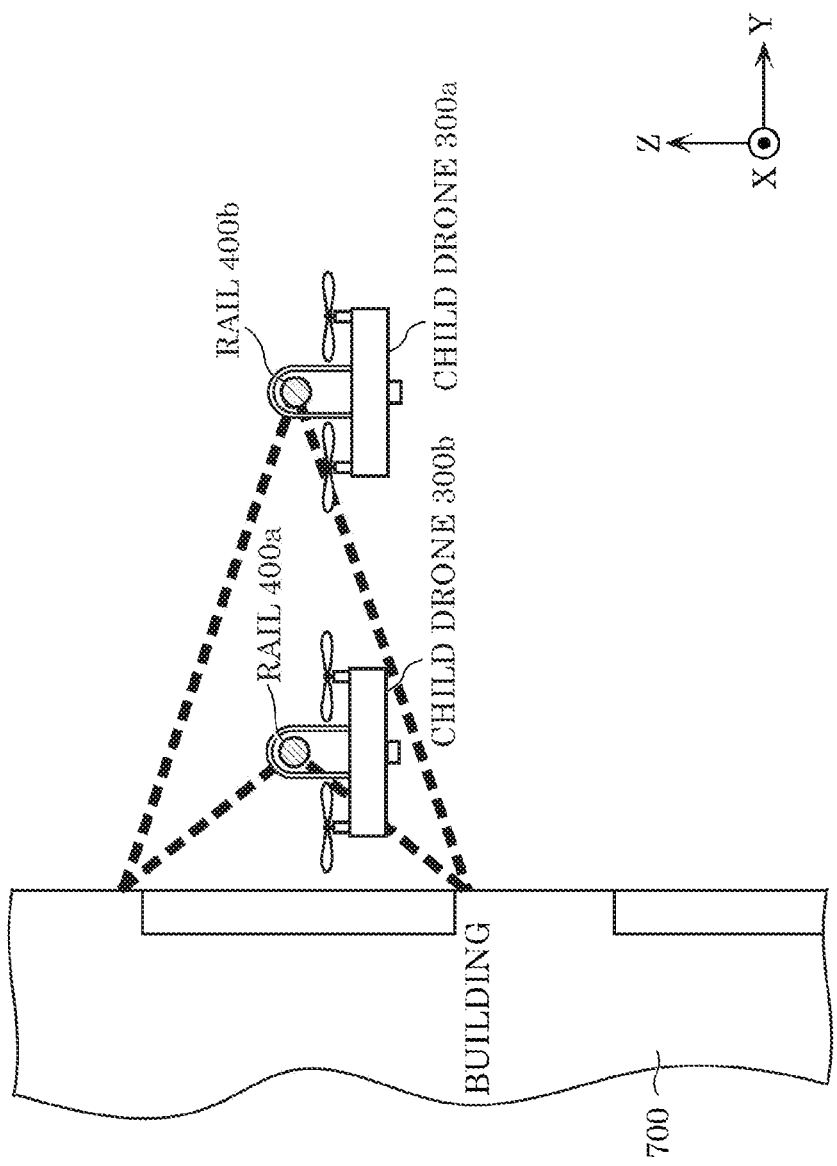
FIG. 18 illustrates another arrangement example of two-lane type rails according to Embodiment 1.

FIG. 18 illustrates another arrangement example of two-lane type rails 400 according to Embodiment 1. In FIG. 18, rail 400a is disposed close to the building, and rail 400b is disposed farther from the building than rail 400a is. Rail 400a and rail 400b are disposed level with each other along a horizontal plane and at the same height in the vertical direction. Child drone 300b is coupled to rail 400a, and child drone 300a is coupled to rail 400b.

When a plurality of rails are to be used to allow a plurality of drones flying along the rails to pass each other, rail 400a and rail 400b may be disposed at the same height in the vertical direction, as illustrated in FIG. 18. In a case where rail 400a and rail 400b are disposed level with each other along a horizontal plane and at the same height in the vertical direction in the aforementioned manner, child drone 300a and child drone 300b can move smoothly between rails 400a and 400b.

Figure 19:
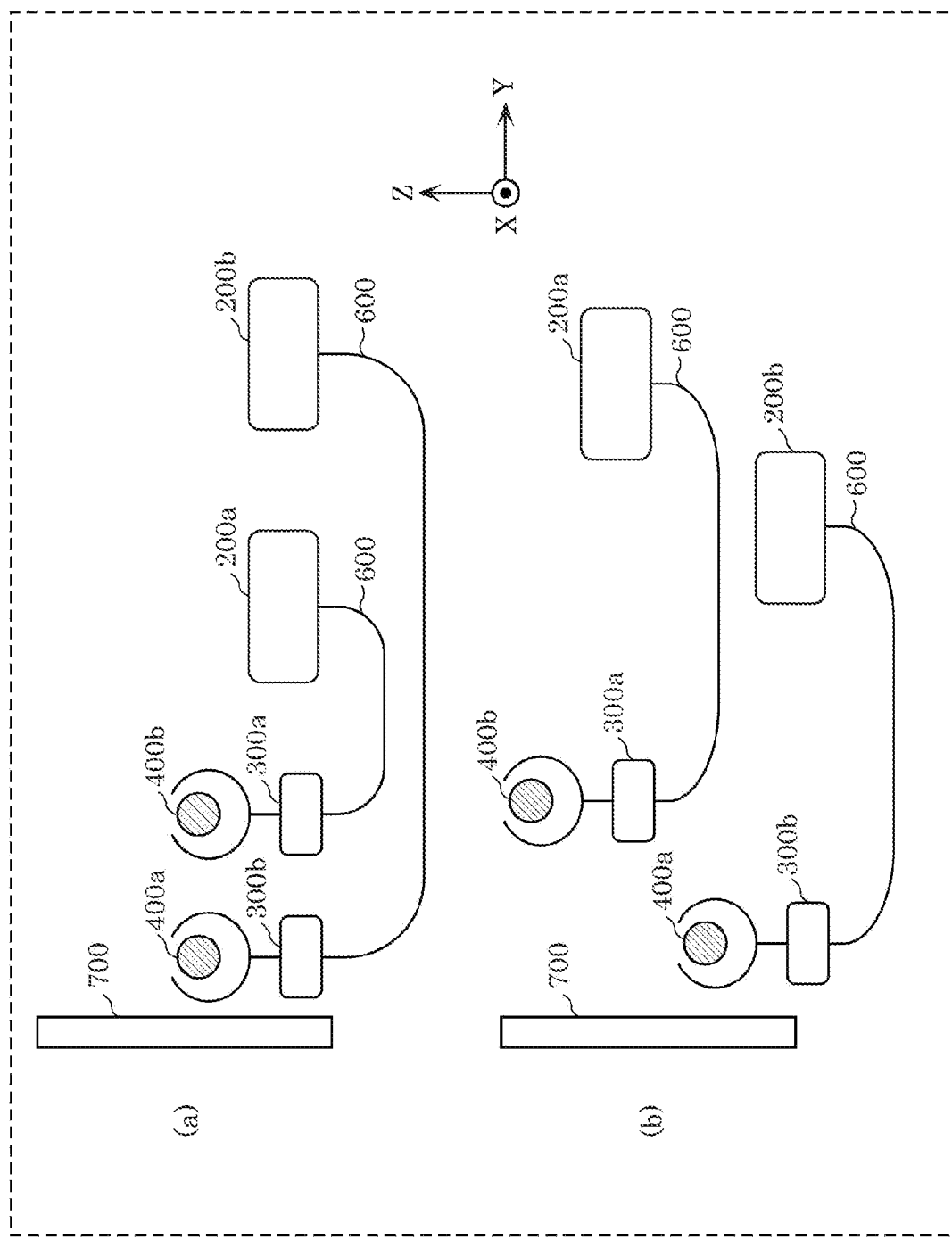
FIG. 19 is a schematic diagram illustrating an example of how parent-child drones can be arranged in a case where two rails are provided.

FIG. 19 is a schematic diagram illustrating an example of how parent-child drones 30 can be arranged in a case where two rails 400 are provided. As illustrated in (a) in FIG. 19, rails 400a and 400b are disposed along a horizontal plane on building 700. In this case, child drone 300b is coupled to rail 400 disposed closer to building 700, and child drone 300a is coupled to rail 400b that is farther from the building. Parent drone 200b is coupled to child drone 300b via wire 600, and parent drone 200a is coupled to child drone 300a via wire 600. This arrangement places child drone 300a and parent drone 200a between child drone 300b and parent drone 200b. Therefore, parent drone 200b coupled, via wire 600, to child drone 300b that is coupled to rail 400a closer to building 700 flies along the outermost location among the drones, that is, flies along a location farthest from the building.

With reference to (b) in FIG. 19, a case where rails 400a and 400b are disposed on building 700 at different heights in the vertical direction will be described. Child drone 300b is coupled to rail 400a disposed closer to building 700. Child drone 300a is coupled to rail 400b located farther from building 700 and disposed at a higher location than rail 400a. Parent drone 200b is coupled to child drone 300b via wire 600. Parent drone 200a is coupled to child drone 300a via wire 600. Child drone 300b and parent drone 200b are located lower than child drone 300a and parent drone 200a. Child drone 300b and parent drone 200b are located closer to building 700 than, respectively, child drone 300a and parent drone 200a are. Therefore, child drone 300a and parent drone 200a fly above and to the right of child drone 300b and parent drone 200b, respectively. The length of wire 600 coupling child drone 300a and parent drone 200a is equal to the length of wire 600 coupling child drone 300b and parent drone 200b. This configuration renders it unnecessary to vary the control of wire 600 between the passing parent-child drone and the parent-child drone to be passed by. The parent-child drones fly at different heights in the up and down direction, and this reduces the possibility of collision to occur when the parent-child drones pass each other.

Figure 20:
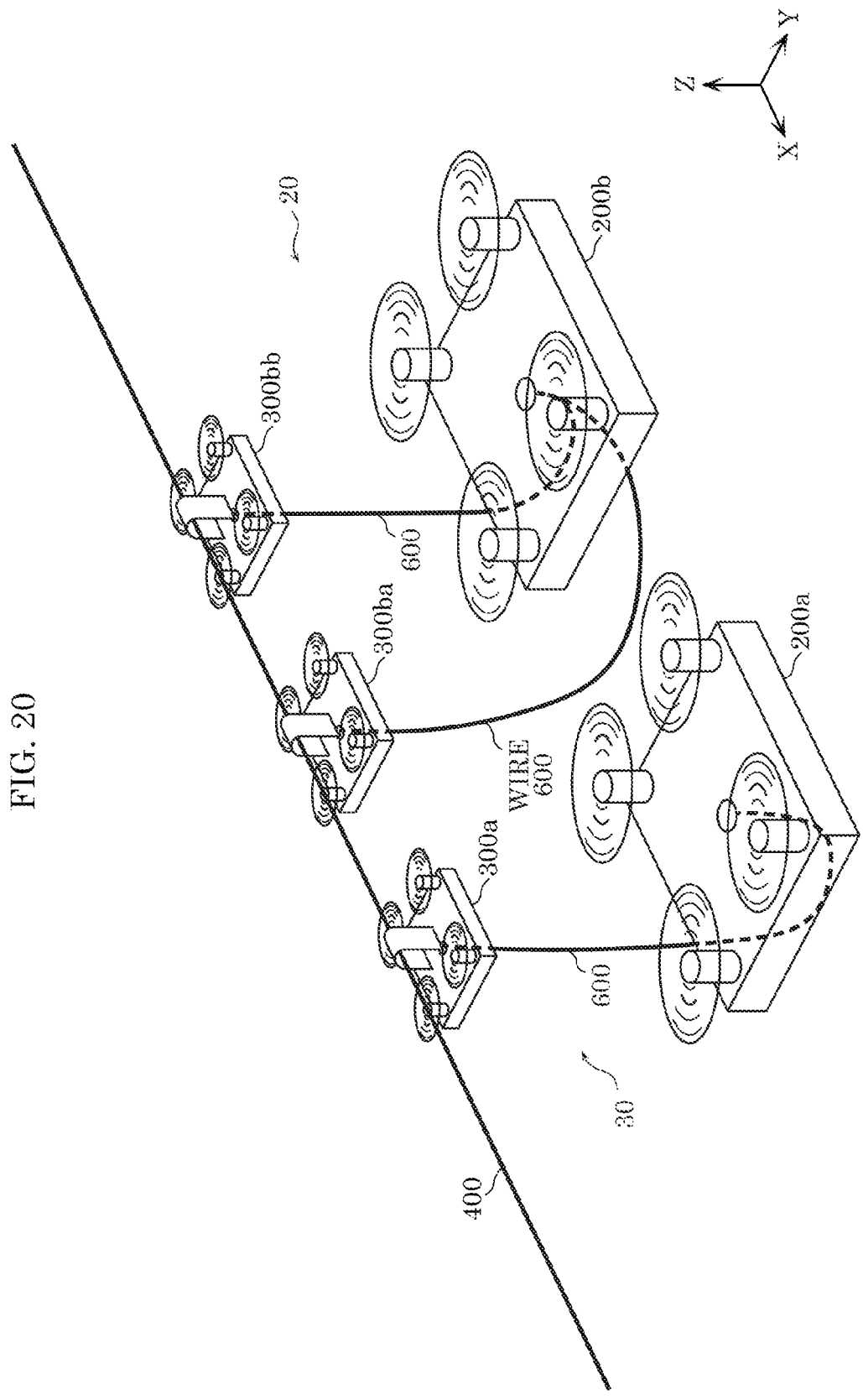
FIG. 20 illustrates an example of two child drones coupled to one parent drone according to Embodiment 1.
Figure 21:
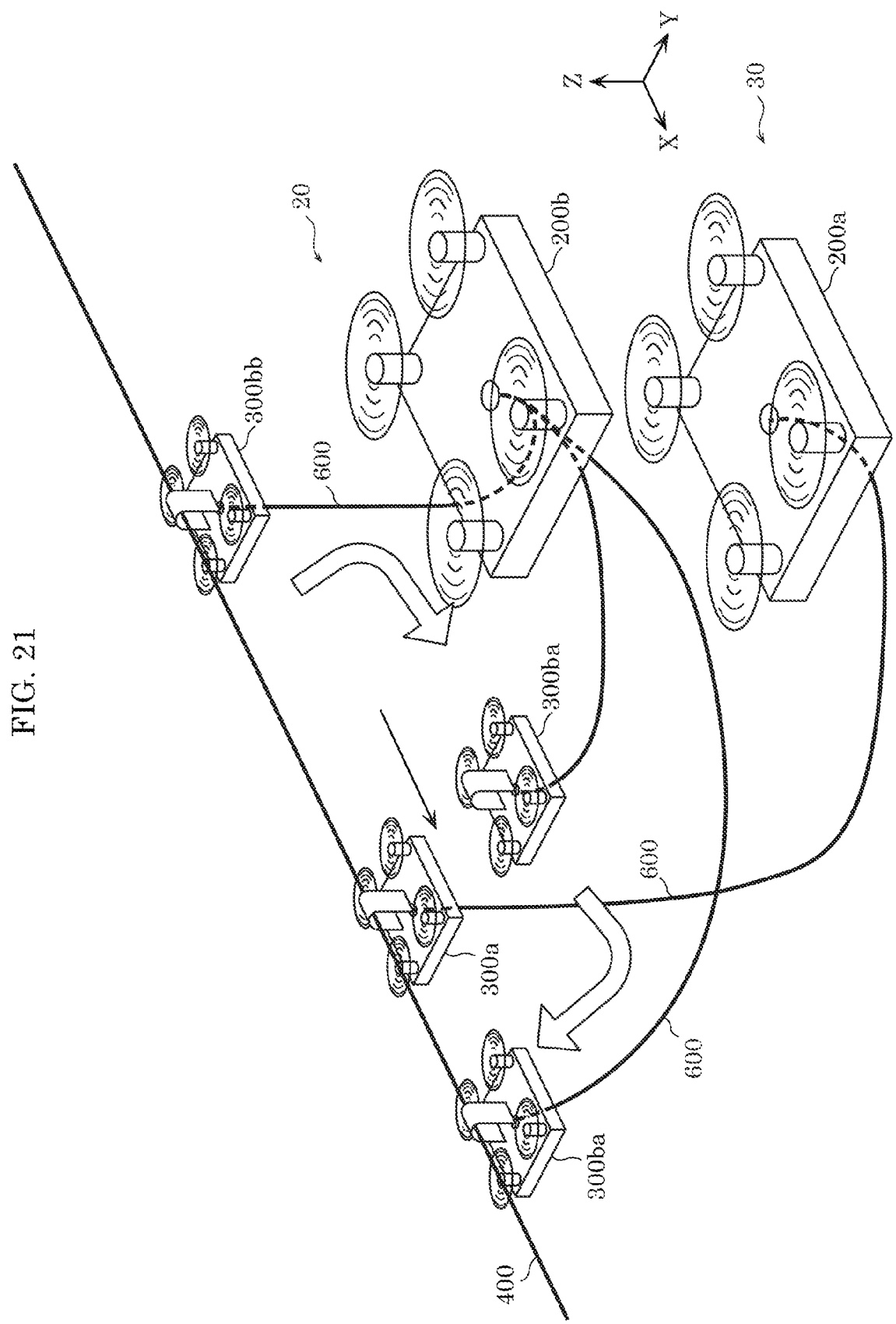
FIG. 21 illustrates an example of how one parent drone coupled to two child drones passes another set of a parent drone and child drones located ahead of the one parent drone according to Embodiment 1.

FIG. 20 illustrates an example of two child drones 300 coupled to one parent drone 200 according to Embodiment 1. FIG. 21 illustrates an example of how one parent drone 200 coupled to two child drones 300 passes other parent drone 200 and child drones 300 located ahead of one parent drone 200 according to Embodiment 1.

As illustrated in FIG. 20, parent drone 200a coupled, via wire 600, to child drone 300a that is coupled to rail 400 is flying, and parent drone 200b coupled, via respective wires 600, to child drone 300ba coupled to rail 400 and child drone 300bb coupled to rail 400 is flying behind parent drone 200a. Procedures to be performed when child drone 300ba, child drone 300bb, and parent drone 200b pass child drone 300a and parent drone 200a flying ahead of child drone 300ba, child drone 300bb, and parent drone 200b will be described.

As illustrated in FIG. 21, parent-child drone 20 includes parent drone 200b and child drones 300ba and 300bb coupled to parent drone 200b. As illustrated in FIG. 21, first, manager 100 changes the flying course of parent drone 200a of parent-child drone 30 flying ahead of parent-child drone 20. Manager 100 may change the direction of parent drone 200a to the direction that moves parent drone 200a away from rail 400. Child drone 300ba of parent-child drone 20 flying behind parent-child drone 30 disengages itself from rail 400, passes child drone 300a flying ahead of child drone 300ba, and couples itself to rail 400 at a position ahead of child drone 300a. Next, as with child drone 300ba, child drone 300bb flying behind parent-child drone 30 also disengages itself from rail 400 and couples itself to rail 400 at a position behind child drone 300ba and ahead of child drone 300a. Therefore, parent drone 200b flies to a position close to child drones 300ba and 300bb and passes parent drone 200a.

As parent drone 200b follows the above procedures to pass parent drone 200a, parent drone 200b can pass parent drone 200a without wire 600 that couples parent drone 200a and child drone 300a tangling with wires 600 that couples parent drone 200b and child drones 300ba and 300bb.

Figure 22:
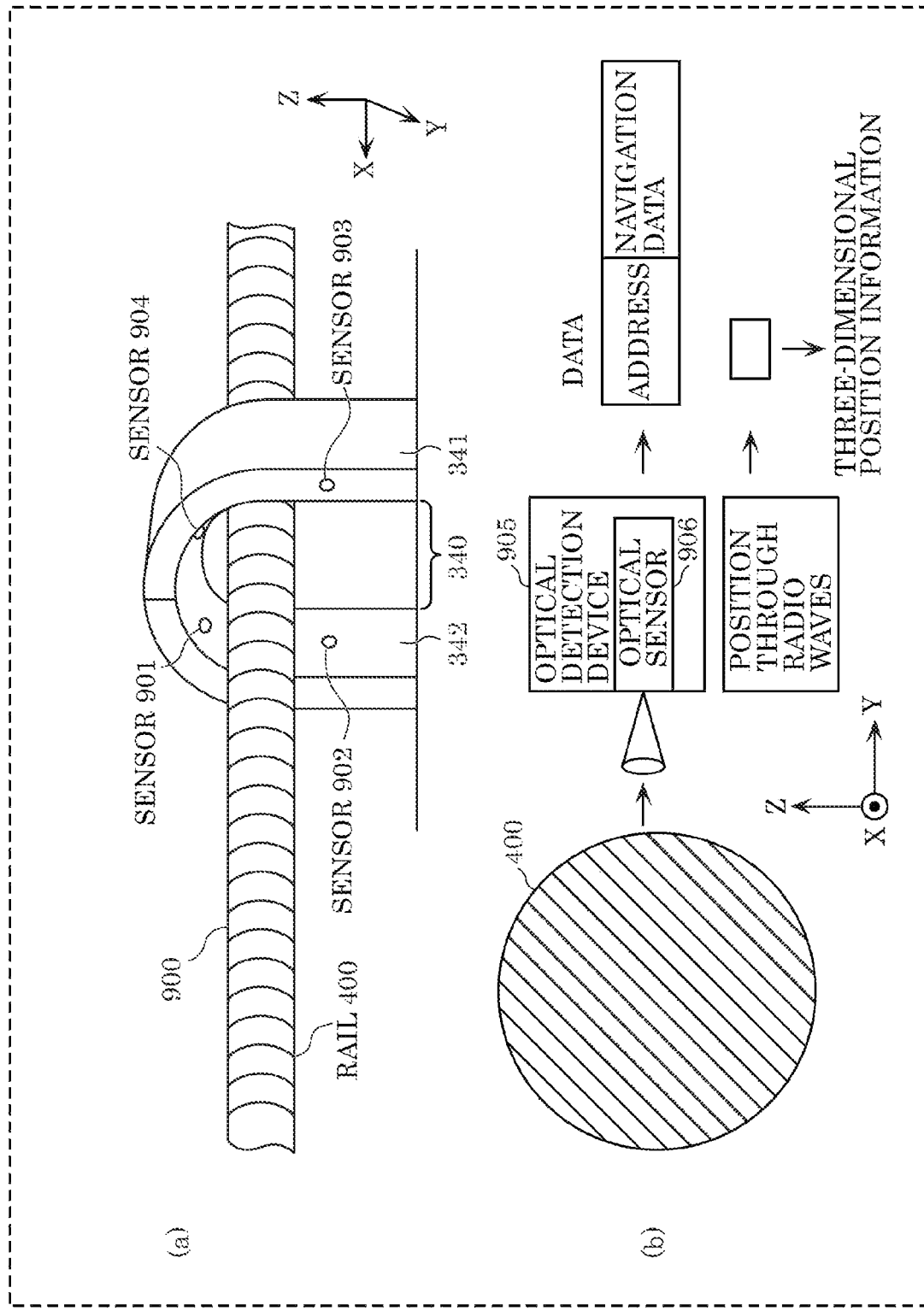
FIG. 22 is a configuration diagram in which address three-dimensional position information and navigation data are written on a surface of a wire that couples a parent drone and a child drone and a sensor reads the address three-dimensional position information and the navigation data according to Embodiment 1.

FIG. 22 is a configuration diagram in which address three-dimensional position information and navigation data are written on the surface of wire 600 that couples parent drone 200 and child drone 300 and a sensor reads the address three-dimensional position information and the navigation data. As illustrated in (a) in FIG. 22, data 900 is recorded on the surface of rail 400. Data 900 includes, for example but not limited to, the identification information and the three-dimensional position information of rail 400 and the navigation data for child drone 300. Data 900 may be recorded in a ring-like manner on the surface of rail 400. In this case, for example, a technique used to write data onto an optical drive, such as a CD-ROM, onto or a recording medium, such as a magnetic disk, may be used.

Sensor 901, sensor 902, sensor 903, and sensor 904 are attached to arm 340 of child drone 300. Sensors 901, 902, 903, and 904 may each be implemented by an optical sensor or the like. In this example, the number of the sensors is not limited to four. Data 900 recorded on rail 400 is read by a plurality of sensors from different angles with respect to rail 400. As data 900 is read by the plurality of sensors 901, 902, 903, and 904, even if there is a defect in a part of data 900 recorded on rail 400, child drone 300 can read out necessary data 900. Moreover, even if any one of the plurality of sensors 901, 902, 903, and 904 is damaged, child drone 300 can still read out data 900 from rail 400.

As illustrated in (b) in FIG. 22, a section of rail 400 shows that data 900 is recorded in the outline of rail 400. Sensors 901, 902, 903, and 904 are each constituted by optical detection device 905. Optical detection device 905 includes optical sensor 906. Optical detection device 905 reads data 900 with optical sensor 906. Data 900 includes, for example but not limited to, the address indicating the position information of rail 400 and the navigation data for child drone 300. The position of parent drone 200 relative to child drone 300 can be obtained through radio waves, and the position information indicating the absolute position of parent drone 200 in the three-dimensional space can be identified by comparing the relative position of parent drone 200 against the address information indicating the absolute position recorded on rail 400. Child drone 300 intermittently transmits, to manager 100, information concerning the position of child drone 300 or the position of parent drone 200 identified based on the data read from rail 400 or based on information on the data read from rail 400.

Figure 23:
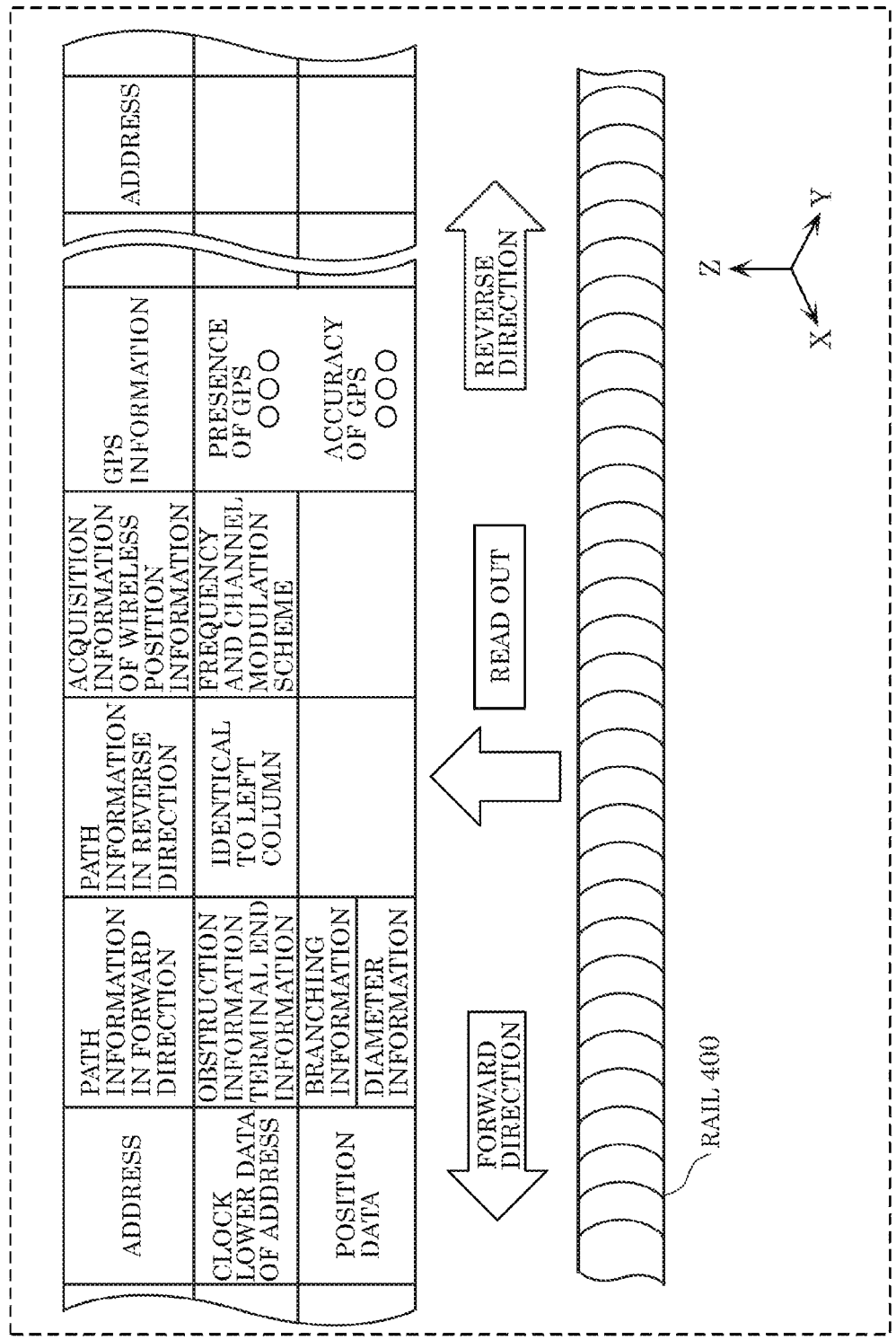
FIG. 23 illustrates an example of the content of data written on a rail according to Embodiment 1.

FIG. 23 illustrates an example of the content of data 900 written on rail 400 according to Embodiment 1. In this example, the forward direction and the reverse direction are defined on rail 400. Data 900 recorded on rail 400 includes, for example but not limited to, the address, the path information in the forward direction, the path information in the reverse direction, the acquisition information of wireless position information, and GPS information. The address includes the clock and the position data. The path information in the forward direction or the path information in the reverse direction includes, for example but not limited to, obstruction information, the terminal end information of rail 400, the branching information of rail 400, and the diameter information of rail 400. The acquisition information of the wireless position information includes the frequency and the channel modulation scheme. The GPS information includes the presence of the GPS and the accuracy of the GPS. In this example, data 900 may also include the geographical coordinate information indicating the location where rail 400 is present or the altitude information indicating the altitude of rail 400.

Figure 24:
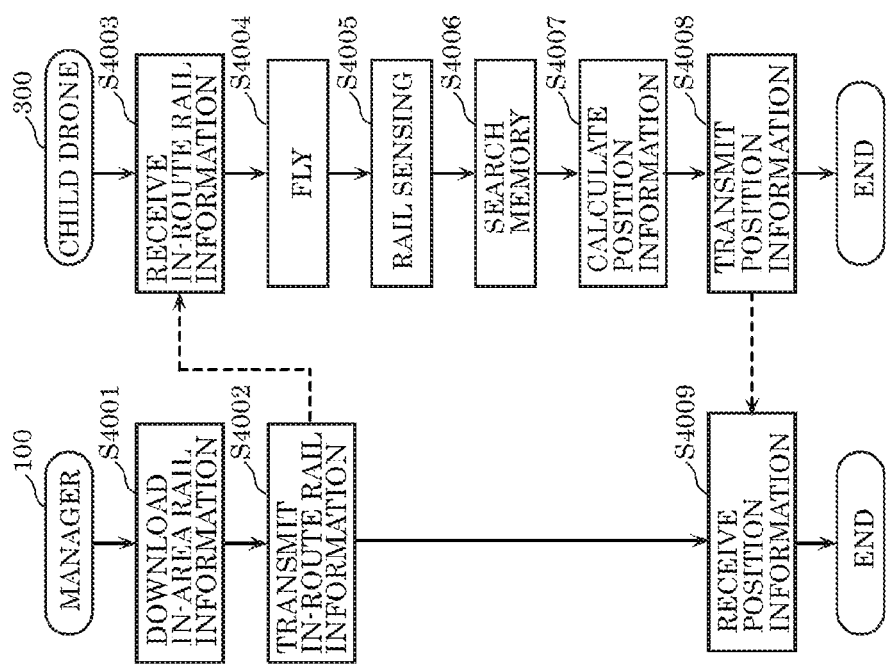
FIG. 24 is a flowchart illustrating an example of control concerning how a child drone acquires rail position information according to Embodiment 1.

FIG. 24 is a flowchart illustrating an example of control concerning how rail position information is acquired by child drone 300 according to Embodiment 1.

First, before child drone 300 starts flying, manager 100 downloads in-area rail information from a database (S4001) and transmits in-route rail information to child drone 300 (S4002).

Child drone 300 receives the in-route rail information and stores (records) the in-route rail information into a memory (S4003).

In this example, information including numbers, letters, and symbols are converted to a one-dimensional code in accordance with a predefined rule and this converted code is written on the upper surface and the lower surface of rail 400 in the form of stripe-patterned lines. Rail information as used herein is information indicating in which locations in map data a plurality of rails 400 are installed and which position information the code in each point of rail 400 corresponds to.

Two ends of each rail 400 are defined as leading end 402k and terminal end 403 in accordance with a predefined rule. Each code written on rail 400 is set in accordance with a rule that allows information to be obtained based on the difference from an immediately preceding code. Different pieces of information can be acquired when a drone flies from leading end 402k toward terminal end 403 than when the drone flies in the reverse direction.

Child drone 300 starts flying (S4004). Then, child drone 300 reads the stripe pattern on rail 400 near child drone 300 with the use of infrared laser sensor 336 (S4005). Based on the code that child drone 300 has read out, child drone 300 searches within its memory (S4006) and calculates the position information (S4007).

Then, child drone 300 transmits the position information to manager 100 (S4008), and manager 100 receives the position information (S4009).

A light emitter, such as an LED, may be provided on rail 400, and a signal may be transmitted to child drone 300 or the like through a change in the luminance of the light emitter. In other words, a signal may be transmitted from rail 400 to child drone 300 through visible light communication. A light emitter may be provided so as to penetrate through one rail 400. Such a method makes it possible to reduce any communication error as an emission region is broader. A light emitter may be provided within a predetermined range on rail 400. It is difficult to recognize the rail position at night, and the accuracy of sensing the stripe pattern decreases. However, the visible light communication between rail 400 and child drone 300 makes it possible to recognize the rail position with high accuracy.

In the visible light communication, child drone 300 captures an image showing a change in the luminance of the light emitter provided on rail 400 and acquires a visible light communication image. A CMOS sensor having a plurality of exposure lines may be used as an image sensor. The exposure time of each exposure line of the CMOS sensor is set shorter than a predetermined time, and an image of the light emitter is captured. This makes it possible to capture an image showing a change in the luminance of the light emitter on an exposure line by exposure line basis. In this example, an image showing a change in the luminance corresponding to an exposure line is referred to as an emission line. A visible light communication image includes a plurality of emission lines corresponding to a plurality of exposure lines in each frame, and a signal can be decoded based on the plurality of emission lines of a stripe pattern.

The visible light communication where a CMOS sensor is used includes a first step, a second step, and a third step. In the first step, the exposure time is set shorter than a predetermined time so that an emission line appears in a visible light communication image. In the second step, an image of a light emitter is captured by successively exposing a plurality of exposure lines in accordance with the set exposure time, and a visible light communication image is acquired. In the third step, a signal is decoded based on the emission lines in the visible light communication image. It suffices that the exposure time be set shorter than the exposure time to be held in normal shooting. Setting the exposure time to $1/2000$ seconds or shorter makes it possible to obtain a clear emission line.

Figure 25A:
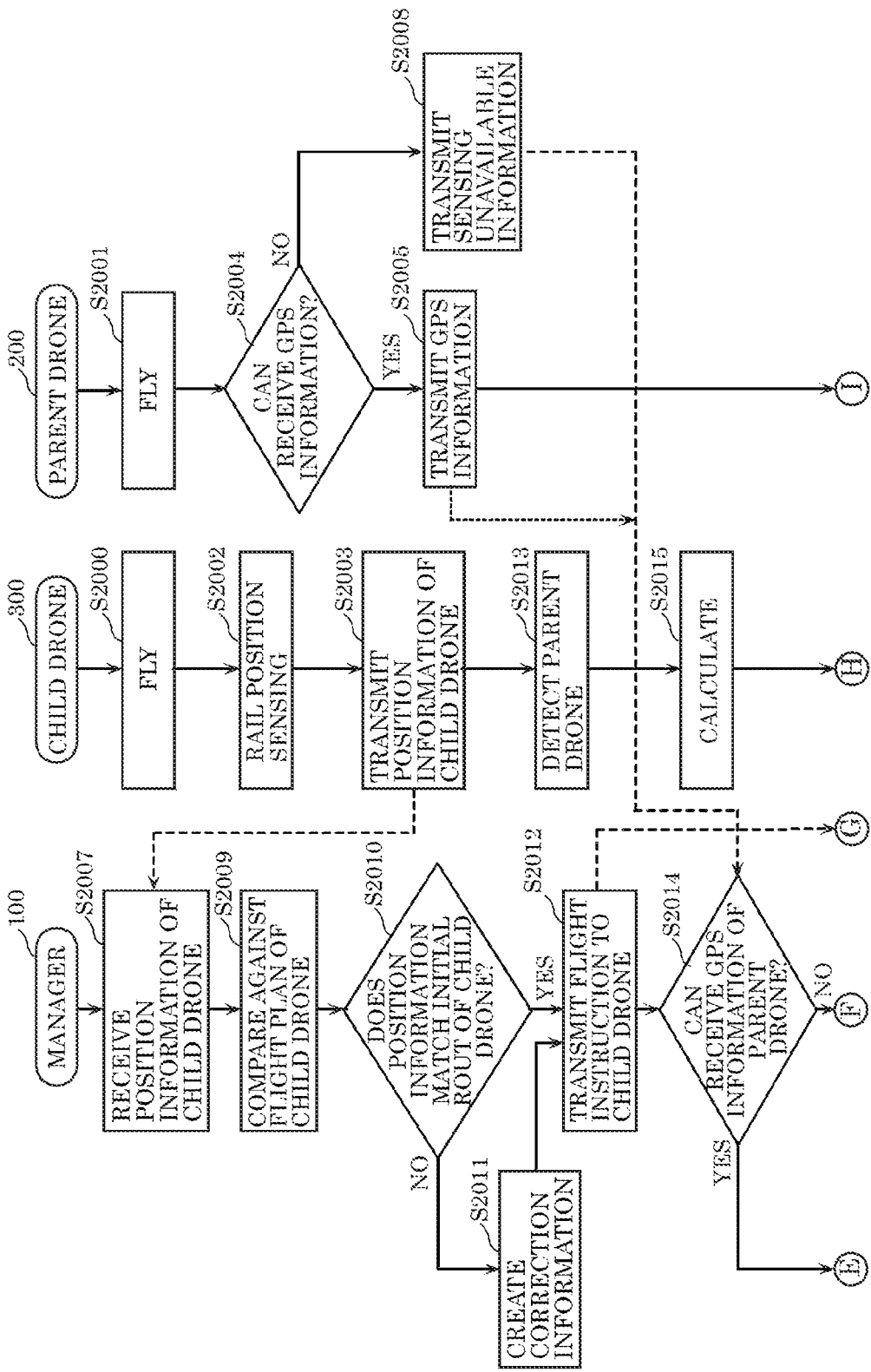
FIG. 25A is a flowchart illustrating an example of control concerning how position information of a parent drone is acquired according to Embodiment 1.
Figure 25B:
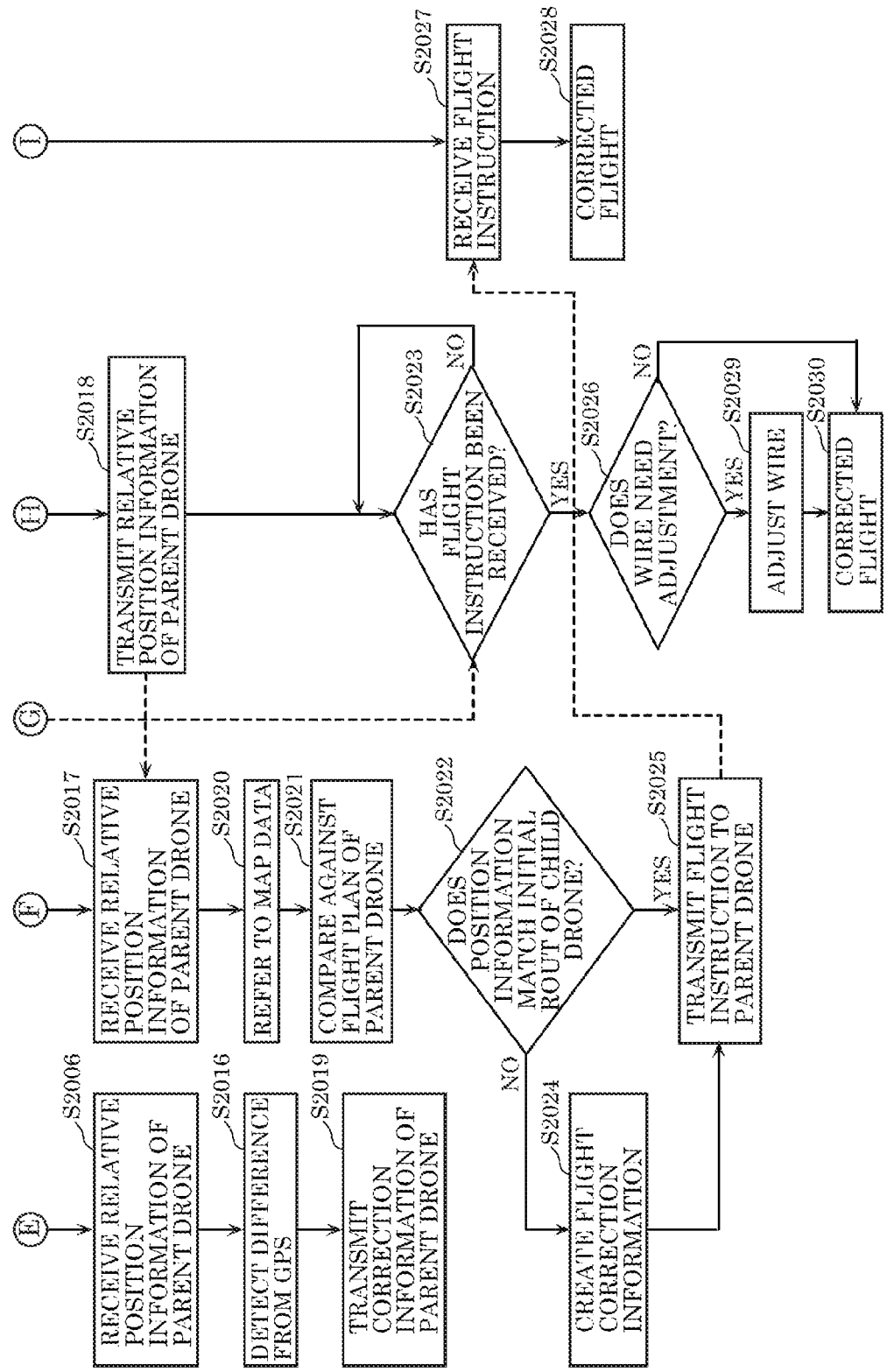
FIG. 25B is another flowchart illustrating an example of the control concerning how the position information of the parent drone is acquired according to Embodiment 1.

FIGS. 25A and 25B are flowcharts illustrating examples of the control concerning how the position information of parent drone 200 is acquired according to Embodiment 1.

First, child drone 300 and parent drone 200 start flying in response to instructions from manager 100 (S2001, S2000). Then, child drone 300 reads the address of rail 400 in the vicinity of child drone 300 with the use of laser sensor 336 (S2002) and transmits the position information of child drone 300 calculated from the address of rail 400 to manager 100 (S2003). Manager 100 receives the position information of child drone 300 (S2007) and compares the received position information against the flight plan of child drone 300 created in advance (S2009). Manager 100 determines whether the position information matches the initially planned flying route (S2010). If the current position fails to match the initial flying route (NO in S2010), manager 100 creates correction information for correcting the flying route to the proper route (S2011) and transmits a flight instruction to child drone 300 (S2012).

If the current position matches the initial route (YES in S2010), manager 100 instructs child drone 300 to continue flying without creating the correction information (S2012).

Parent drone 200 determines whether parent drone 200 can receive a GPS signal while flying (S2004). If parent drone 200 can receive a signal and measure its own position information (YES in S2004), parent drone 200 transmits that position information to manager 100 (S2005). If parent drone 200 cannot receive a signal (NO in S2004), parent drone 200 creates information indicating that GPS sensing is unavailable and transmits that information to manager 100 (S2008). Child drone 300 detects the direction, the speed, the distance, and so on of parent drone 200 relative to child drone 300 with the use of tension sensor 333 for wire 600 coupling child drone 300 and parent drone 200 (S2013). Then, child drone 300 calculates the position and the speed information of parent drone 200 relative to child drone 300 based on the detected information (S2015). At this point, it suffices that child drone 300 can calculate the position and the speed information of the parent drone relative to child drone 300 with any type of sensor. Therefore, child drone 300 may measure the relative position and the speed information based on, for example but not limited to, the optical information of the parent drone obtained with the use of camera sensor 334, the strength and direction information of radio waves transmitted from the parent drone and obtained with the use of receiver 321, or an electric signal transmitted via wire 600.

After child drone 300 has calculated the position and the speed information of parent drone 200 relative to child drone 300, as illustrated in FIG. 25B, child drone 300 transmits the calculated position and the speed information to manager 100 (S2018). Manager 100 determines whether manager 100 can receive the GPS information of parent drone 200 (S2014). If manager 100 can receive the GPS information (YES in S2014), manager 100 receives the position and the speed information of parent drone 200 relative to child drone 300 from child drone 300 (S2006). Then, manager 100 calculates the difference between the received information and the position information of the parent drone obtained through the GPS (S2016) and transmits, to parent drone 200, information for correcting the measurement error of the GPS based on the difference (S2019).

If manager 100 cannot receive the GPS information of the parent drone (NO in S2014), manager 100 receives the relative position information of parent drone 200 from child drone 300 (S2017). Then, manager 100 calculates the absolute position information of parent drone 200 by comparing the received information against the map data (S2020) and compares the absolute position information against the initial flight plan of parent drone 200 (S2021).

Then, manager 100 determines whether the absolute position information matches the initial flight plan (S2022). If there is any error from the initial flight plan (NO in S2022), manager 100 creates information for correcting the flight plan to correct the error and transmits a flight instruction to parent drone 200 (S2025). If the absolute position information matches the initial flight plan (YES in S2022), manager 100 instructs parent drone 200 to continue flying without creating the correction information (S2025).

Parent drone 200 receives the flight instruction (S2027). Then, parent drone 200 corrects the flight plan in accordance with the instruction and continues with the flight (S2028).

Child drone 300 determines whether child drone 300 has received a flight instruction from manager 100 (S2023). If child drone 300 has received a flight instruction, child drone 300 determines whether the length, the direction, and so on of wire 600 for coupling child drone 300 and parent drone 200 need to be adjusted based on the received information (S2026). If the length, the direction, and so on of wire 600 need to be adjusted, child drone 300 adjusts wire 600 (S2029). Then, child drone 300 corrects the flight plan of child drone 300 and continues with the flight (S2030). If no adjustment needs to be made to the length, the direction, and so on of wire 600, child drone 300 makes no adjustment (NO in S2026). Then, child drone 300 corrects the flight plan as necessary and continues with the flight.

Figure 26:
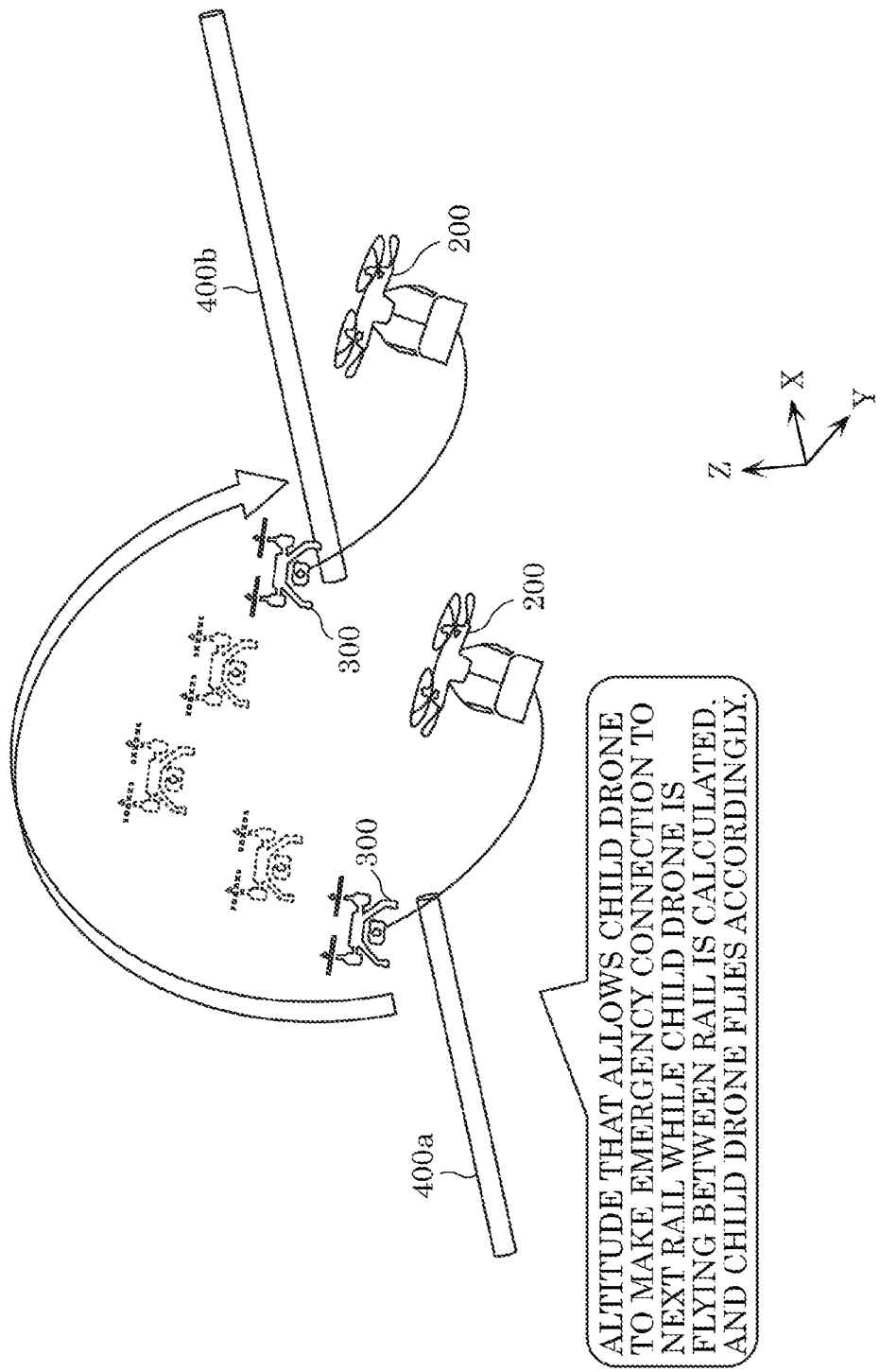
FIG. 26 is a schematic diagram illustrating an example of flight control performed between rails according to Embodiment 1.

FIG. 26 is a schematic diagram illustrating an example of flight control performed between rails according to Embodiment 1. While child drone 300 is flying along rail 400a, child drone 300 may reach the terminal end of rail 400a, and the leading end of rail 400b may be located ahead of the terminal end with a space provided between rail 400a and rail 400b. In that case, child drone 300 moves from the area surrounding rail 400a to the area surrounding rail 400b. At this point, child drone 300 may tentatively raise its altitude while moving from rail 400a to rail 400b. When child drone 300 moves from rail 400a to rail 400b, child drone 300 may fly at an altitude higher than the altitude of rail 400a and rail 400b. With this configuration, as long as child drone 300 is at a sufficiently high altitude while moving from rail 400a to rail 400b, even if an anomaly occurs while child drone 300 is flying, child drone 300 can reach rail 400b by falling from the point where the anomaly has occurred. The altitude and the course that, even if an anomaly occurs in flying child drone 300 while child drone 300 is moving from rail 400a to rail 400b, allow child drone 300 to reach rail 400b by falling from the point where the anomaly has occurred during the flight may be calculated, and child drone 300 may fly in accordance with the calculated altitude and course.

Figure 27:
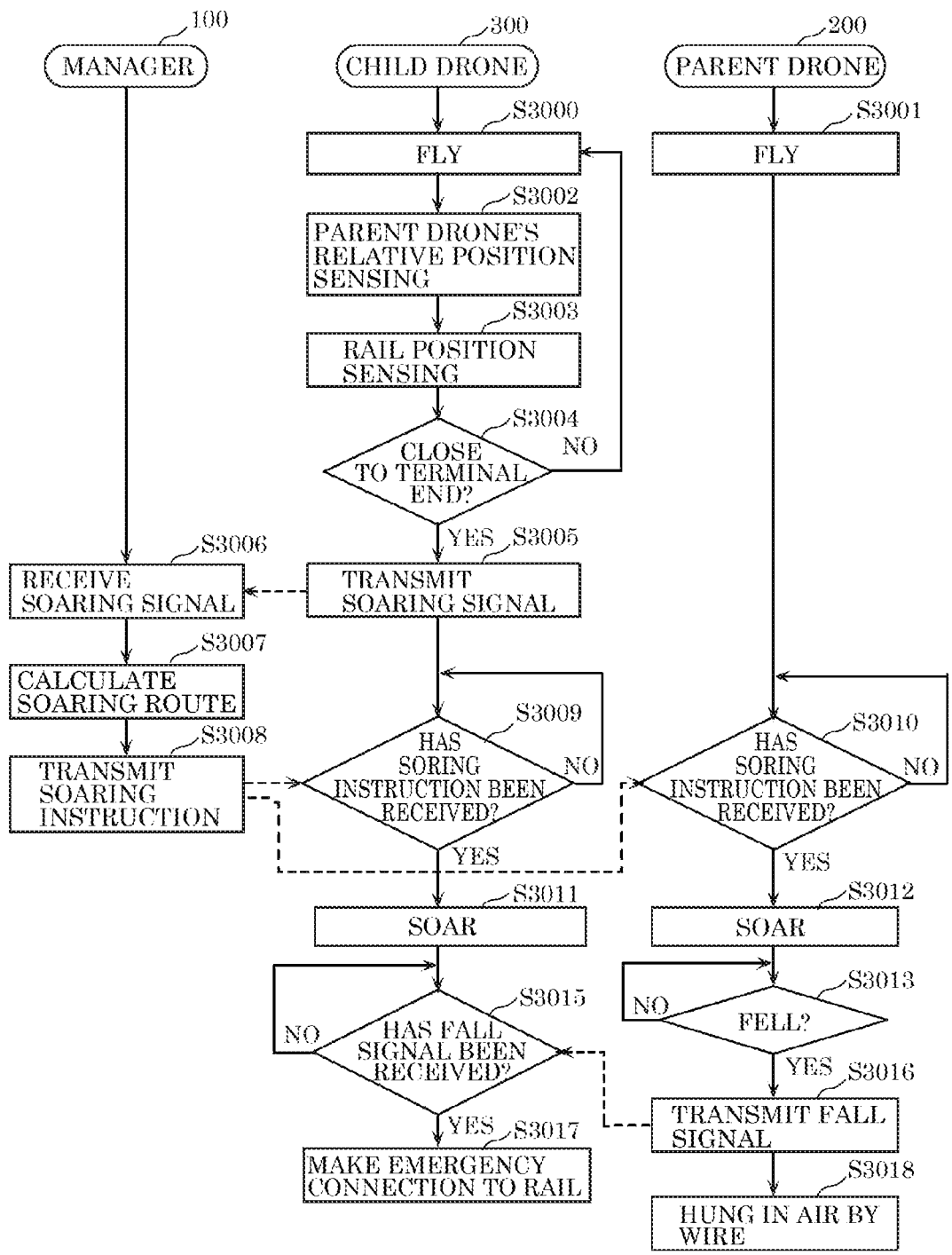
FIG. 27 is a flowchart illustrating an example of flight control performed between rails according to Embodiment 1.

FIG. 27 is a flowchart illustrating an example of the flight control performed between the rails according to Embodiment 1.

Child drone 300 starts flying (S3000). Parent drone 200 also starts flying (S3001). Next, child drone 300 detects the position of parent drone 200 relative to the child drone with the use of a sensor or the like (S3002). Then, child drone 300 detects the position of rail 400 with the use of a sensor or the like (S3003). Thereafter, child drone 300 determines whether child drone 300 is close to the terminal end of rail 400 (S3004). If the position where child drone 300 is located is not close to the terminal end of rail 400 (NO in S3004), child drone 300 continues with the flight (the flow returns to step S3000). If the position where child drone 300 is located is close to the terminal end of rail 400 (YES in S3004), child drone 300 transmits a soaring signal to manager 100 (S3005). Manager 100 receives the soaring signal transmitted from child drone 300 (S3006). Next, manager 100 calculates the flying route of each of child drone 300 and parent drone 200 (S3007). Manager 100 transmits a soaring instruction to each of child drone 300 and parent drone 200 (S3008). Child drone 300 determines whether child drone 300 has received the soaring instruction (S3009). If child drone 300 has failed to receive the soaring instruction (NO in S3009), the flow returns to step S3009. Parent drone 200 determines whether parent drone 200 has received the soaring instruction (S3010). If parent drone 200 has failed to receive the soaring instruction (NO in S3010), the flow returns to step S3010. If child drone 300 has received the soaring instruction (YES in S3009), child drone 300 soars (S3011). If parent drone 200 has received the soaring instruction (YES in S3010), parent drone 200 soars (S3012). Next, parent drone 200 determines whether parent drone 200 has fallen (S3013). If parent drone 200 has not fallen (NO in S3013), parent drone 200 returns to step S3013. If parent drone 200 has fallen (YES in S3013), parent drone 200 transmits a fall signal to child drone 300 (S3016). Thereafter, parent drone 200 becomes hung in the air from child drone 300 via wire 600 (S3018). Child drone 300 determines whether child drone 300 has received the fall signal from parent drone 200 (S3015). If child drone 300 has failed to receive the fall signal from parent drone 200 (NO in S3015), child drone 300 returns to step S3015. If child drone 300 has received the fall signal from parent drone 200 (YES in S3015), child drone 300 makes emergency coupling to rail 400 (S3017).

Child drone 300 may communicate with manager 100 and acquire rail information regarding rails 400 in a planned flying route. Then, child drone 300 may identify the position of child drone 300 by comparing the acquired rail information and the identification information of rails 400 acquired while flying.

Figure 28:
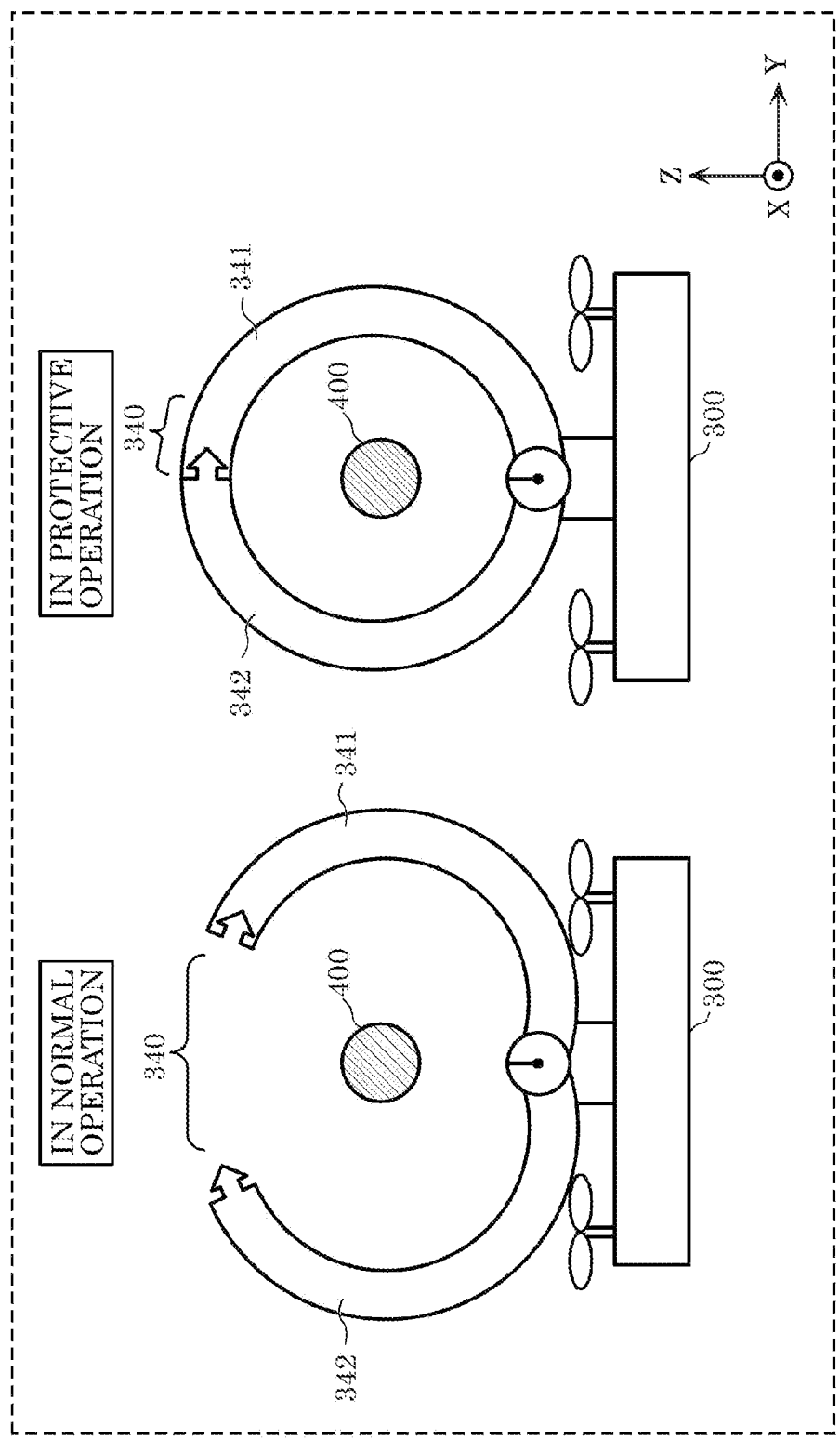
FIG. 28 schematically illustrates an example of opening and closing of an arm provided in a child drone according to Embodiment 1.

FIG. 28 schematically illustrates an example of opening and closing of arm 340 provided in child drone 300 according to Embodiment 1. Child drone 300 includes arm 340 that can be opened and closed. In a normal operation, child drone 300 flies forward along rail 400 with arm 340, which can be opened or closed, kept open. In this case, rail 400 may be located around the center portion of the space enclosed by open arm 340. When an anomaly has occurred in flying of parent drone 200, child drone 300 closes open arm 340 so as to enclose rail 400 with arm 340. At this point, child drone 300 couples itself to rail 400 by closing arm 340. Therefore, even in a case where an anomaly occurs in flying of parent drone 200, child drone 300 coupled to parent drone 200 can avoid entering an anomalous flying state or avoid crashing into the ground by coupling itself to rail 400.

Figure 29:
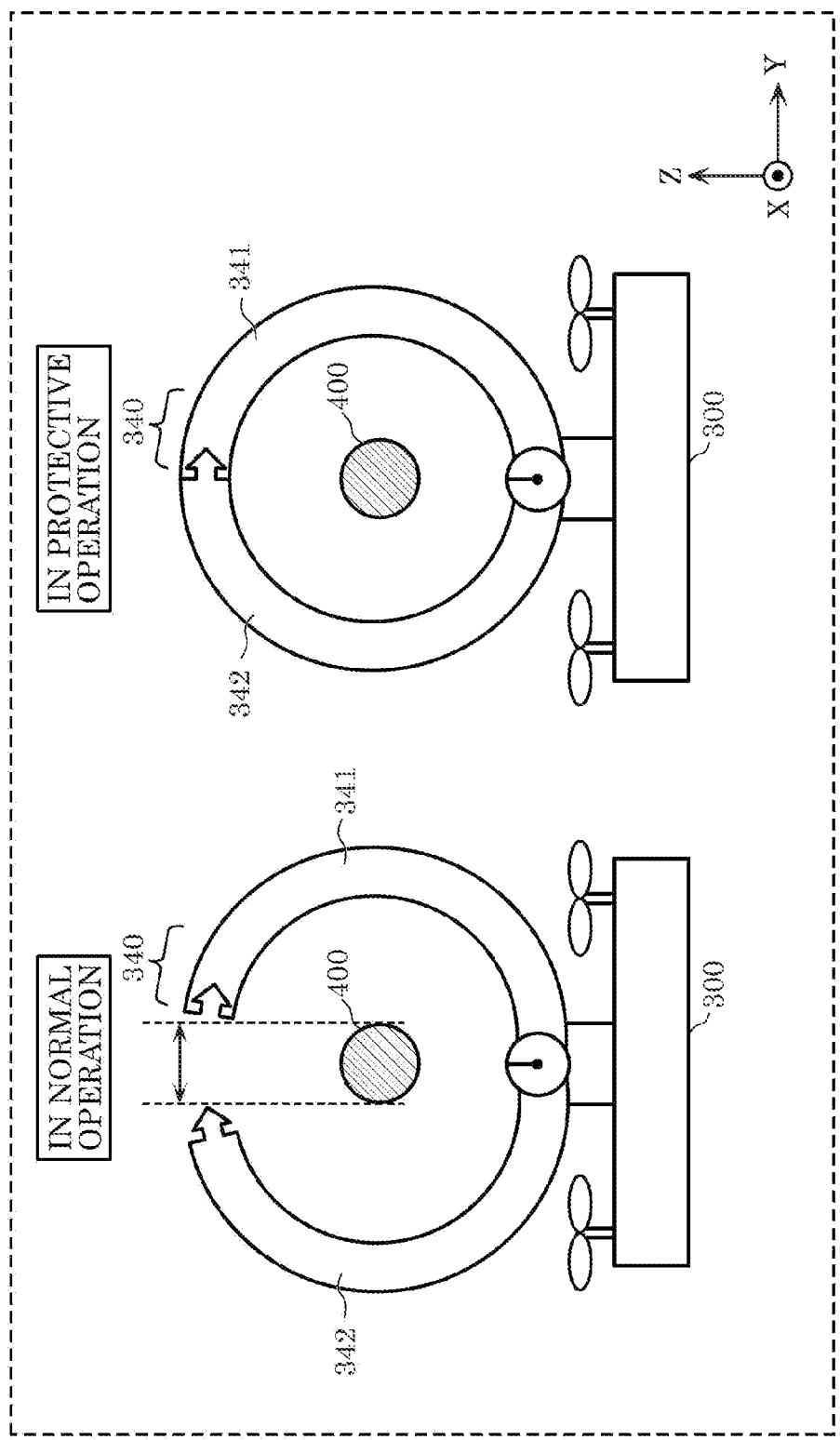
FIG. 29 schematically illustrates another example of opening and closing of an arm provided in a child drone according to Embodiment 1.

FIG. 29 schematically illustrates another example of opening and closing of arm 340 provided in child drone 300 according to Embodiment 1. Arm 340 of the child drone includes first arm 341 and second arm 342. As first arm 341 and second arm 342 become coupled to each other to form a ring, child drone 300 couples itself to rail 400. When arm 340 is open, the distance between the respective ends of first arm 341 and second arm 342 is greater than the diameter of rail 400. This configuration allows child drone 300 to become disengaged from rail 400. When arm 340 is closed, the distance between the respective ends of first arm 341 and second arm 342 is smaller than the diameter of rail 400. This configuration can keep child drone 300 coupled to rail 400 without allowing child drone 300 to become disengaged from rail 400.

Figure 30:
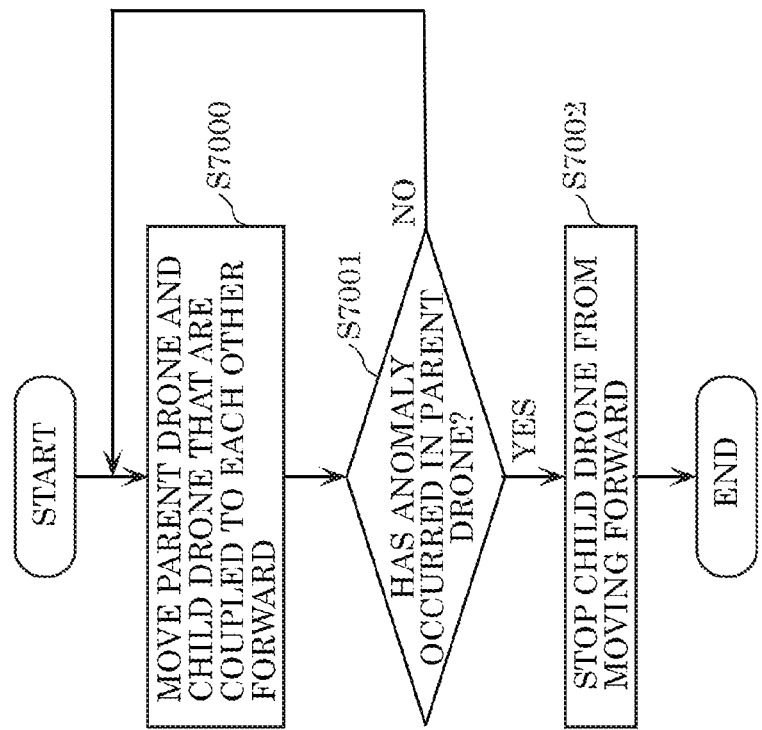
FIG. 30 is a flowchart illustrating an example of a method of controlling an unmanned flying body according to one aspect of the present disclosure.

FIG. 30 is a flowchart illustrating an example of a method of controlling an unmanned flying body according to one aspect of the present disclosure. First, parent drone 200 and child drone 300 that are coupled to each other are moved forward (S7000). Next, it is determined whether an anomaly has occurred in parent drone 200 (S7001). If an anomaly has occurred in the parent drone (YES in S7001), child drone 300 is stopped from moving forward (S7002). If no anomaly is occurring in the parent drone (NO in S7001), parent drone 200 and child drone 300 that are coupled to each other are allowed to move forward (the flow returns to step S7000).

Embodiment 2

In the following, a method of controlling a flying body and basic configurations of the flying body and of flying system 2a according to the present embodiment are identical to the basic configurations described in Embodiment 1 and so on. Therefore, the descriptions of the method of controlling a flying body and the basic configurations of the flying body and of flying system 2a according to the present embodiment will be omitted as appropriate, and mainly the differences from Embodiment 1 will be described.

Figure 31:
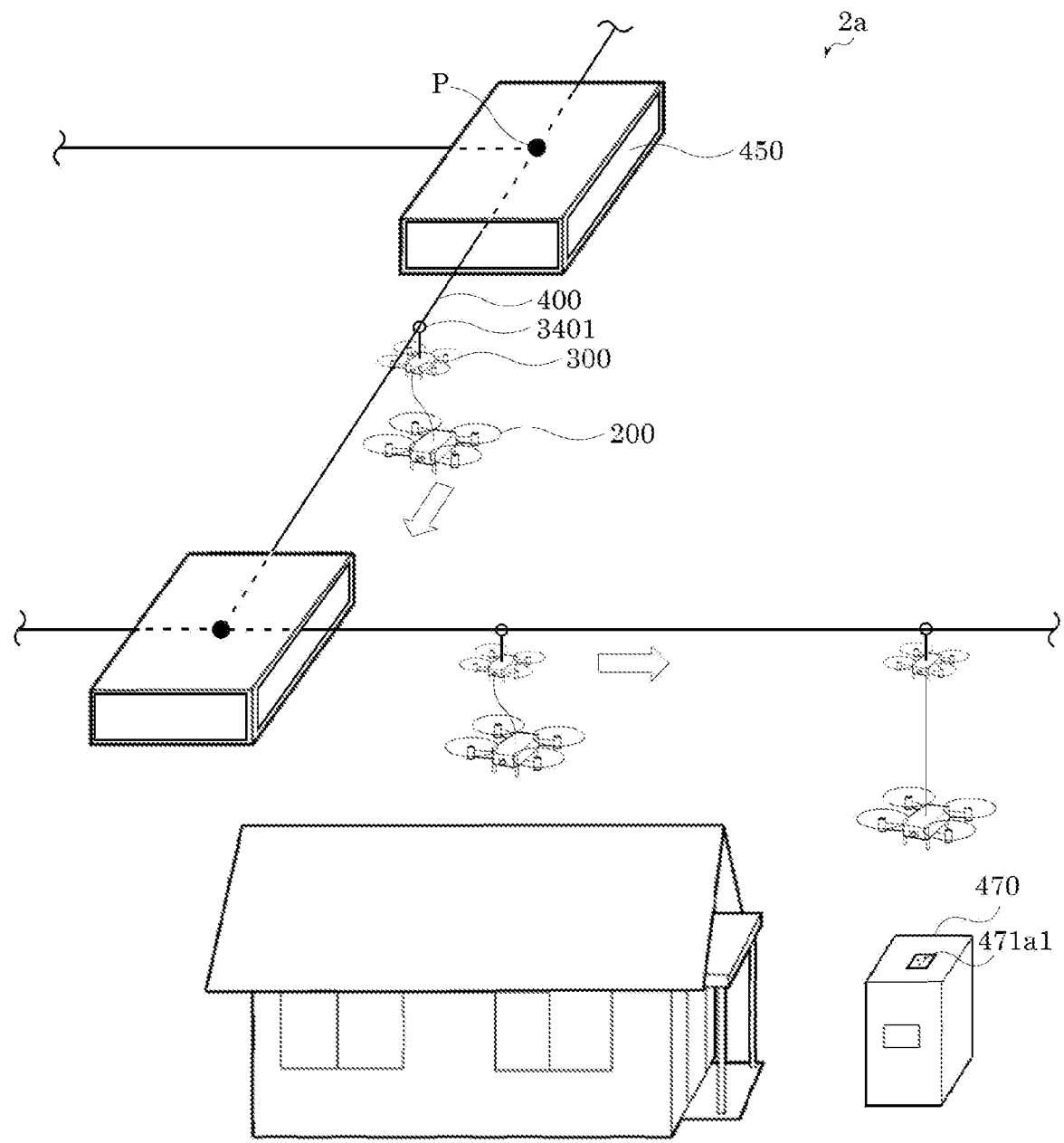
FIG. 31 is a schematic diagram illustrating an example of a flying system according to Embodiment 2.
Figure 32:
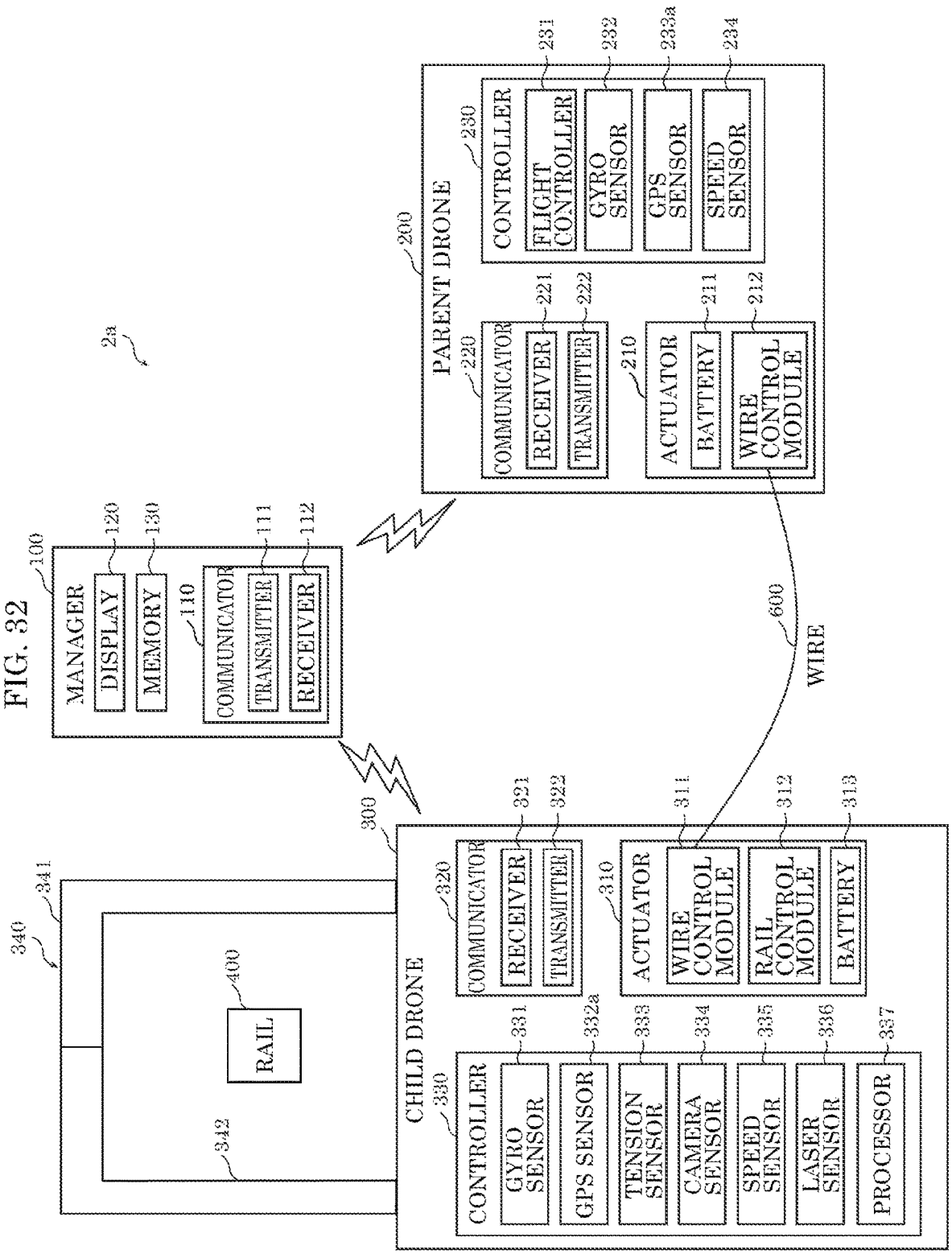
FIG. 32 is a block diagram illustrating a configuration of the flying system according to Embodiment 2.

FIG. 31 is a schematic diagram illustrating an example of flying system 2a according to Embodiment 2. FIG. 32 is a block diagram illustrating a configuration of flying system 2a according to Embodiment 2.

As illustrated in FIGS. 31 and 32, flying system 2a according to the present embodiment is a system that can deliver a load from a sender to a receiver with the use of parent drone 200 and child drone 300. A sender is the one that sends out an item, and a receiver is the one that receives the item. Parent drone 200 and child drone 300 are each an example of a flying body. Parent drone 200 is an example of a second flying body, and child drone 300 is an example of a first flying body. A flying body is, for example, an unmanned aerial vehicle. A load as referred to herein is an example of a package.

Parent drone 200 and child drone 300 do not simply fly in the air but move along rails 400 stretched around above the ground. Parent drone 200 flies along rail 400 so as to follow child drone 300 while parent drone 200 is coupled to child drone 300 via wire 600. A load is loaded in parent drone 200.

Specifically, child drone 300 flies from a sender to a receiver along rail 400 while holding rail 400 with arm 340 having ring 3401. To be more specific, child drone 300 flies from a sender to a receiver with ring 3401 of arm 340 being coupled to rail 400 (hereinafter, this state may be said that arm 340 is coupled to rail 400). In this example, that child drone 300 moves along rail 400 does not necessarily mean that arm 340 of child drone 300 slides directly on rail 400. If arm 340 slides directly on rail 400, arm 340 and rail 400 may be worn. Therefore, child drone 300 may fly with its arm 340 making no contact with rail 400.

When child drone 300 is nearing a receiver, processor 337 of controller 330 of child drone 300 compares a first position indicated in image information captured by camera sensor 334 and a second position indicated in position information acquired from GPS sensor 332*a*. Camera sensor 334 is an example of an image sensor. If the first position and the second position do not match, processor 337 controls the flying of child drone 300 so as to make the second position match the first position (i.e., processor 337 controls the rotation of the propellers). Specifically, when child drone 300 has neared a space above the receiver, camera sensor 334 captures an image of coded medium 471*a*1 placed on an upper surface of delivery box 470. Coded medium 471*a*1 includes the first position indicating the position of delivery box 470. As camera sensor 334 reads coded medium 471*a*1, processor 337 controls the flying of child drone 300 so as to make the second position match the first position. In this example, coded medium 471*a*1 is, for example, a two-dimensional barcode but may also be any mark that camera sensor 334 can recognize. GPS sensor 332*a* is an example of a sensor. Camera sensor 334 may be an example of a sensor. Delivery box 470 is an example of a storage base.

In this manner, child drone 300 arrives at a space above the receiver.

It suffices that at least one of parent drone 200 or child drone 300 include camera sensor 334. In the present embodiment, child drone 300 includes camera sensor 334.

The position of delivery box 470 relative to child drone 300 may be measured with the use of camera sensor 334 instead of GPS sensor 332*a*. The position of child drone 300 may be measured based on an image of its surroundings acquired by an image sensor.

Upon child drone 300 arriving at a space above the receiver, processor 337 controls actuator 310 so as to hold rail 400 with arm 340. Thus, child drone 300 is anchored to rail 400 at a predetermined position. If an electromagnet is provided in arm 340, for example, arm 340 may be anchored to rail 400 as processor 337 causes actuator 310 to make a current flow in a coil of the electromagnet. Since arm 340 is anchored to rail 400 upon child drone 300 arriving at the space above the receiver in the above manner, any positional shift resulting from an influence of the ground effect can be suppressed. In the present embodiment, the space above the receiver is a space above delivery box 470.

Once child drone 300 arrives at the space above the receiver and is anchored to rail 400, processor 337 transmits a descending instruction to parent drone 200 via communicator 320 so as to make parent drone 200 prepare for a descending movement.

In response to receiving the descending instruction from child drone 300, parent drone 200 descends toward delivery box 470 installed at a destination point. Specifically, controller 230 of parent drone 200 causes actuator 210 to control the rotation of the propellers so as to move parent drone 200 to a point directly under child drone 300. Controller 230 of parent drone 200 determines whether parent drone 200 has moved to a point directly under child drone 300.

If parent drone 200 has moved to a point under child drone 300, controller 230 of parent drone 200 causes actuator 210 to stop the propellers. Controller 230 of parent drone 200 controls wire control module 212 of actuator 210 so as to start letting out wire 600. This operation causes parent drone 200 to descend from child drone 300. In this manner, parent drone 200 enters delivery box 470 through its opening and lands on delivery box 470 serving as the destination point. In this example, the destination point is a point on which parent drone 200 is to land.

Parent drone 200 may include a range finding sensor, an atmospheric pressure sensor, and so on. Then, parent drone 200 can appropriately land on delivery box 470 by inspecting the environment surrounding delivery box 470 with the use of the range finding sensor, the atmospheric pressure sensor, and so on while parent drone 200 is descending.

Rail 400 is stretched at a position that is several meters to several tens of meters above the ground surface, for example. Rail 400 is fixed to support pillars, facilities, and so on installed on the ground. Rail 400 does not need to be stretched around in the entire region above the ground, and it suffices that rail 400 be stretched around at least in the vicinity of a receiver. Rail 400 is stretched along roads, for example.

Rail 400 includes connection point P. Connection point P is where one rail is connected to another rail. Placing structure 450 is disposed directly under connection point P.

Placing structure 450 allows child drone 300 to be placed therein at least between the ground surface directly under connection point P and connection point P. Placing structure 450 may be disposed directly on the ground or may be connected to rail 400. In a case where placing structure 450 is disposed directly on the ground, placing structure 450 may be a placing stage, for example. In a case where placing structure 450 is connected to rail 400, placing structure 450 may be a box-like structure having an opening lying in a plane orthogonal to rail 400. The opening may have a size that allows parent drone 200 and child drone 300 to pass therethrough. Placing structure 450 may be a net-like structure having a cushioning effect, for example.

Delivery box 470 is disposed at a destination point of a receiver. Delivery box 470 may have any configuration. Delivery box 470 according to the present embodiment includes a housing space and an opening that at least allows parent drone 200 to pass therethrough to enter delivery box 470.

In the present embodiment, coded medium 471*a*1 is provided on delivery box 470 at a position where the child drone can detect coded medium 471 from the above with the camera sensor.

In the present embodiment, delivery box 470 is disposed directly under rail 400. Alternatively, delivery box 470 may be disposed at a position that is spaced apart from a point directly under rail 400. It suffices that delivery box 470 be disposed within a range where parent drone 200 can enter the housing space inside delivery box 470 while child drone 300 is holding rail 400.

Operations

Now, a method of controlling a flying body and operations of the flying body and of flying system 2a according to the present embodiment will be described.

Figure 33:
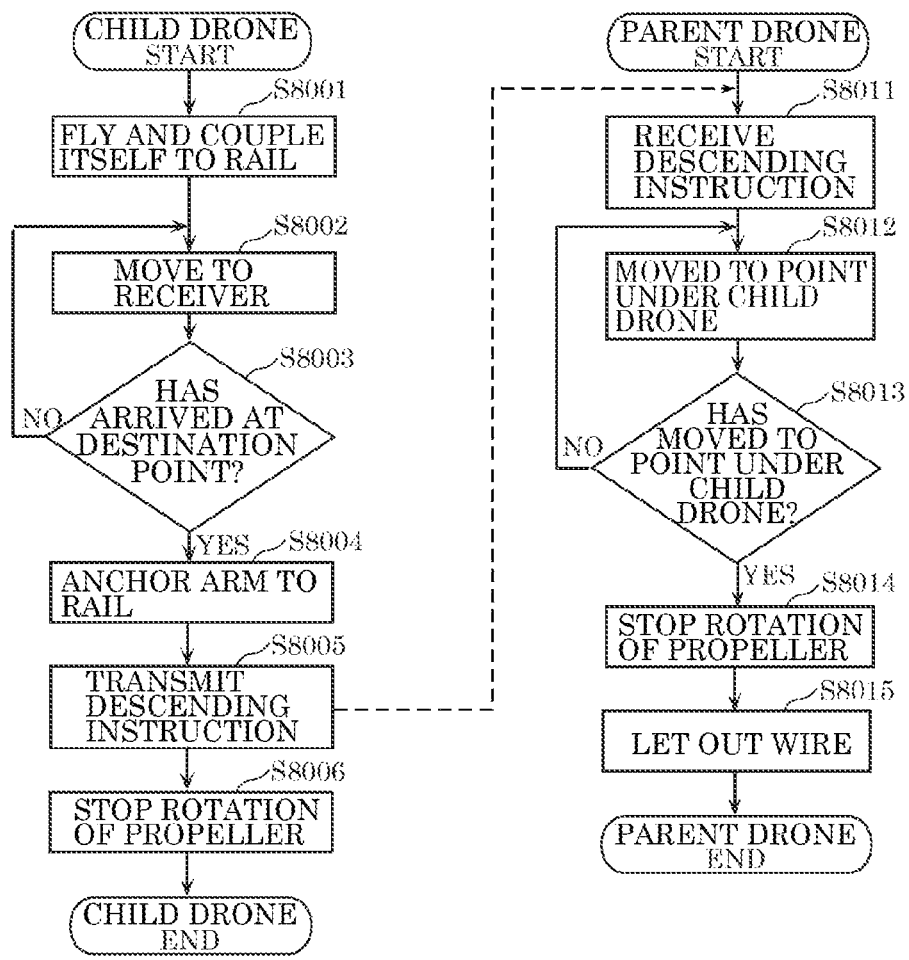
FIG. 33 is a flowchart illustrating an example of how a flying system operates along a route from a sender to a destination point of a receiver according to Embodiment 2.

FIG. 33 is a flowchart illustrating an example of how flying system 2a operates along a route from a sender to a destination point of a receiver according to Embodiment 2.

As illustrated in FIG. 33, first, manager 100 selects a flying route from a sender to a receiver based on map data. Manager 100 transmits the selected flying route to child drone 300. Then, after a load is loaded into parent drone 200 at the sender, child drone 300 starts flying in accordance with the user's operation. For example, child drone 300 detects the position of rail 400 with sensors 901, 902, 903, and 904 illustrated in FIG. 22 and so on. Arm 340 becomes coupled to rail 400 by actuating first arm 341 and second arm 342 so as to hold rail 400 (S8001).

This allows parent drone 200 and child drone 300 to move along rail 400 (S8002).

Parent drone 200 and child drone 300 continually transmit the position information (e.g., the geographical spatial information such as the latitude and longitude information described above) indicating their current positions detected by respective GPS sensors 233a and 332a to manager 100 at a predetermined interval. In this case, manager 100 successively receives the position information of each of parent drone 200 and child drone 300 and can thus immediately acquire the current position of each of parent drone 200 and child drone 300.

Next, processor 337 of child drone 300 determines whether child drone 300 has arrived at a space above the receiver (S8003). Processor 337 compares the current position obtained from GPS sensor 332a and the position of the space above the receiver acquired from the manager and determines whether these two positions match. If the current position matches the destination point, processor 337 determines that child drone 300 has arrived at the space above the receiver and controls actuator 310 so as to hold rail 400 with arm 340. In this manner, child drone 300 becomes anchored to rail 400 (S8004).

Next, processor 337 transmits a descending instruction to parent drone 200 via communicator 320 (S8005). Processor 337 stops the propellers (S8006). This operation causes child drone 300 to be hung in the air by the arm that is coupled to rail 400. In this example, upon arriving at the space above the receiver, child drone 300 may hover with its arm being coupled to rail 400 without holding rail 400 with arm 340.

Next, in response to receiving the descending instruction (S8011), parent drone 200 starts preparing to land in accordance with the descending instruction. Specifically, controller 230 of parent drone 200 causes actuator 210 to control the rotation of the propellers so as to move parent drone 200 to a point directly under child drone 300 (S8012).

Controller 230 of parent drone 200 determines whether parent drone 200 has moved to a point directly under child drone 300 (S8013). For example, controller 230 may make the determination based on whether the position information obtained by GPS sensor 233a of parent drone 200 matches the position information obtained by GPS sensor 332a of child drone 300. Alternatively, child drone 300 may make the determination based on a signal or the like detected by camera sensor 334 or the like.

Next, if parent drone 200 has moved to a point under child drone 300 (YES in S8013), controller 230 of parent drone 200 causes actuator 210 to stop the propellers from rotating (S8014). If parent drone 200 has not moved to a point under child drone 300 (NO in S8013), controller 230 of parent drone 200 returns the process to S8012.

Controller 230 of parent drone 200 controls wire control module 212 of actuator 210 so as to start letting out wire 600 (S8015). This operation causes parent drone 200 to descend from child drone 300. In this manner, parent drone 200 enters delivery box 470 through its opening and lands on delivery box 470 serving as the destination point.

Once parent drone 200 lands on delivery box 470, controller 230 of parent drone 200 controls wire control module 212 so as to stop letting out wire 600. Parent drone 200 unloads the load. Specifically, controller 230 of parent drone 200 controls actuator 210 so as to unload the load from parent drone 200. In this manner, the load is stored into the housing space inside delivery box 470.

Once parent drone 200 unloads the load, parent drone 200 leaves from delivery box 470 through the opening. Specifically, controller 230 of parent drone 200 controls wire control module 212 of actuator 210 so as to start taking up wire 600. Then, upon the length of wire 600 reaching a predetermined length, the propellers of parent drone 200 and child drone 300 start rotating, and this makes parent drone 200 and child drone 300 ready to fly. Processor 337 controls actuator 310 so as to disengage arm 340 of child drone 300 from rail 400. Then, parent drone 200 and child drone 300 return to the sender along the flying route that parent drone 200 and child drone 300 took to reach the receiver from the sender. If there is a next receiver, another load is delivered to the next receiver through the process similar to the process described above.

Advantageous Effects

Now, some advantageous effects of the method of controlling a flying body and the flying system according to the present embodiment will be described.

As described above, the method of controlling a flying body according to the present embodiment is a method of controlling a flying body by controlling a first flying body and a second flying body coupled to the first flying body via a coupling line. The first flying body includes an arm having a ring through which a fixed rail is to pass and a sensor that measures the position of the first flying body. The first flying body measures the position of the first flying body with the use of the sensor and determines whether the position matches a first predetermined position (an example of a receiver). If the position matches the first predetermined position, the first flying body is made to stop flying, the ring is coupled to the rail, and the length of the coupling line is increased. Thus, the second flying body is made to land at a second predetermined position (an example of a destination point).

For example, in an existing method of controlling a flying body, when a flying body lands, due to an influence of the wind called the ground effect, the flying body may erroneously land at a position that is radially about one meter off from the destination point serving as a second predetermined position. When the flying body lands, the flying body may become off balance and crash into the ground, or the flying body may collide with an object and cause an accident. Therefore, needs exist for a method of moving a flying body safely from a sender to a receiver.

According the foregoing method of controlling a flying body, the first flying body moves while being coupled to the rail. Therefore, even if the ground effect occurs, the first flying body can move safely to the first predetermined position along the rail. The second flying body is coupled to the first flying body via the coupling line. This keeps the second flying body from being separated far away from the first flying body. When the first flying body arrives at the receiver, the first flying body is in contact with the rail, and thus the first flying body and the second flying body are less likely to be moved away from the destination point even if the ground effect occurs. This allows the second flying body to deliver a package to the destination point with ease in accordance with an instruction.

Therefore, according to this flying system, the second flying body can deliver a package to a destination point.

The flying system according to the present embodiment is a flying system that delivers a package from a sender to a receiver. The flying system includes a first flying body that moves while being coupled to a rail fixed at a position spaced apart from the ground surface and a second flying body that is coupled to the first flying body via a coupling line. The first flying body includes an arm having a ring through which the fixed rail is to pass, a controller that determines whether the first flying body has arrived at the receiver, and a communicator that transmits, to the second flying body, a delivery instruction for delivering the package to a destination point of the receiver. When the first flying body has arrived at the receiver, the controller transmits the delivery instruction for delivering the package to the destination point of the receiver to the second flying body via the communicator with the ring being coupled to the rail.

In the method of controlling a flying body according to the present embodiment, the second flying body is stopped from flying after the first flying body has been stopped from flying.

This configuration allows the second flying body to move so as to follow the first flying body.

In the method of controlling a flying body according to the present embodiment, the sensor is an image sensor, and the position of the first flying body is measured from an image of the surroundings of the first flying body acquired with the use of the image sensor.

This configuration makes it possible to grasp the position of the first flying body accurately based on the image of the surroundings of the first flying body. Capturing an image of the second predetermined position with the image sensor makes it possible to grasp the second predetermined position accurately.

In the method of controlling a flying body according to the present embodiment, the sensor is a GPS sensor, and the position of the first flying body is measured with the use of the GPS sensor.

This configuration makes it possible to grasp the position of the first flying body accurately.

In the method of controlling a flying body according to the present embodiment, the second predetermined position is a position where a storage base that is to store the second flying body is installed.

This configuration makes it possible to grasp the position of the first flying body accurately.

In the method of controlling a flying body according to the present embodiment, the second flying body stores the package held by the second flying body into the storage base after landing on the storage base.

This configuration allows the second flying body to store the package at the destination point reliably.

The flying system according to the present embodiment further includes one rail fixed at a position spaced apart from the ground surface and another rail different from the one rail. The one rail is connected to the other rail at connection point P.

This configuration makes it possible to produce a plurality of flying routes along which the first flying body and the second flying body fly.

The flying system according to the present embodiment further includes a placing structure disposed at least between the ground surface directly under a connection point connecting one rail and another rail and the connection point, and the first flying body can be placed on the placing structure.

With this configuration, even if the first flying body falls off a rail unexpectedly when the first flying body coupled to one rail is to be coupled to another rail at the connection point, for example, the placing structure can receive the first flying body. This configuration can therefore keep at least the first flying body from being damaged.

In the flying system according to the present embodiment, a coded medium indicating the destination point on which the second flying body is to land is provided at the destination point of the receiver. At least one of the first flying body or the second flying body further includes a camera sensor. The second flying body lands on the destination point based on image information obtained by the camera sensor capturing the medium.

This configuration allows the first flying body and the second flying body that have arrived at the receiver to recognize the location for storing the package with ease based on the image information. This makes it easier for the second flying body to land on the destination point accurately.

The flying system according to the present embodiment further includes a GPS sensor that acquires position information of the first flying body. The controller compares a first position indicated in the image information and a second position indicated by the position information acquired from the GPS sensor. If the first position and the second position do not match, flying of the first flying body is controlled so that the first position and the second position match.

This configuration makes it possible to correct any positional mismatch of the second flying body by reading the image information even if the second flying body is shifted away from a point vertically above the destination point. This allows the second flying body to land on the destination point more accurately.

The flying system according to the present embodiment further includes an actuator that actuates and controls the arm so as to hold the rail with the arm when the first flying body has arrived at the receiver.

This configuration allows the arm to be anchored to the rail when the first flying body has arrived at the receiver. This in turn can reduce any positional mismatch of the first flying body and the second flying body that could be caused by the ground effect.

Embodiment 3

In the following, a method of controlling a flying body and a basic configuration of the flying body according to the present embodiment are identical to the basic configurations described in Embodiment 1 and so on. Therefore, the descriptions of the method of controlling a flying body and the basic configuration of the flying body according to the present embodiment will be omitted as appropriate. In the present embodiment, no parent drone such as the one described in Embodiment 1 above is present.

Figure 34A:
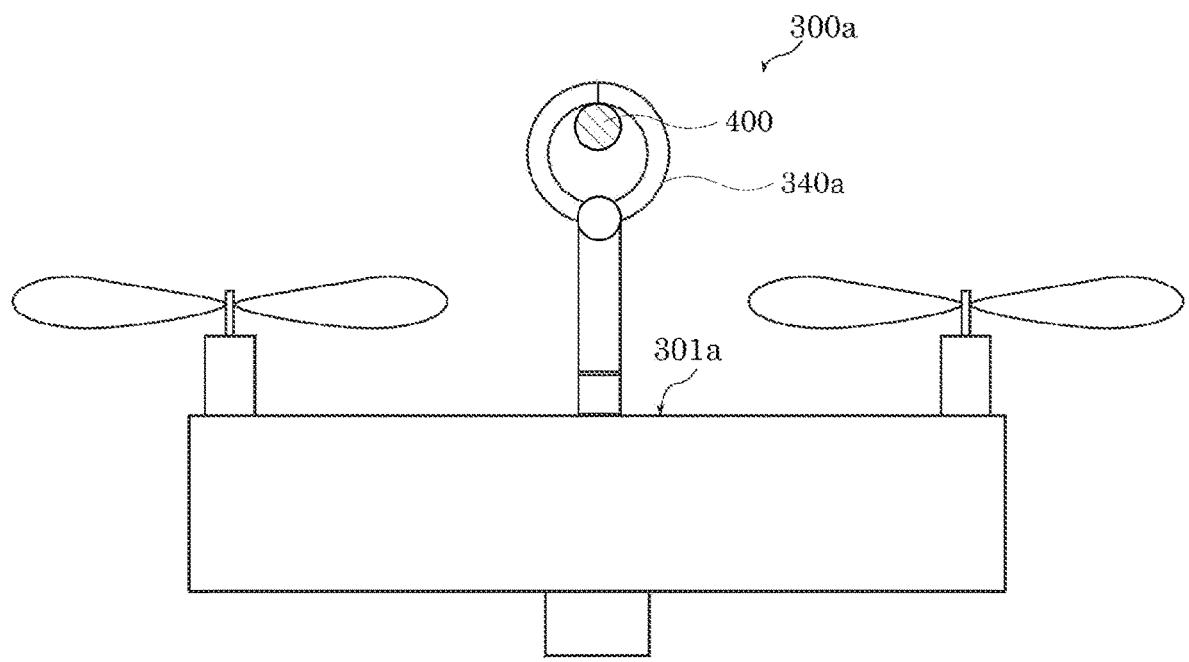
FIG. 34A is a schematic diagram illustrating an example of a state in which an arm of a child drone is anchored to a rail according to Embodiment 3.
Figure 34B:
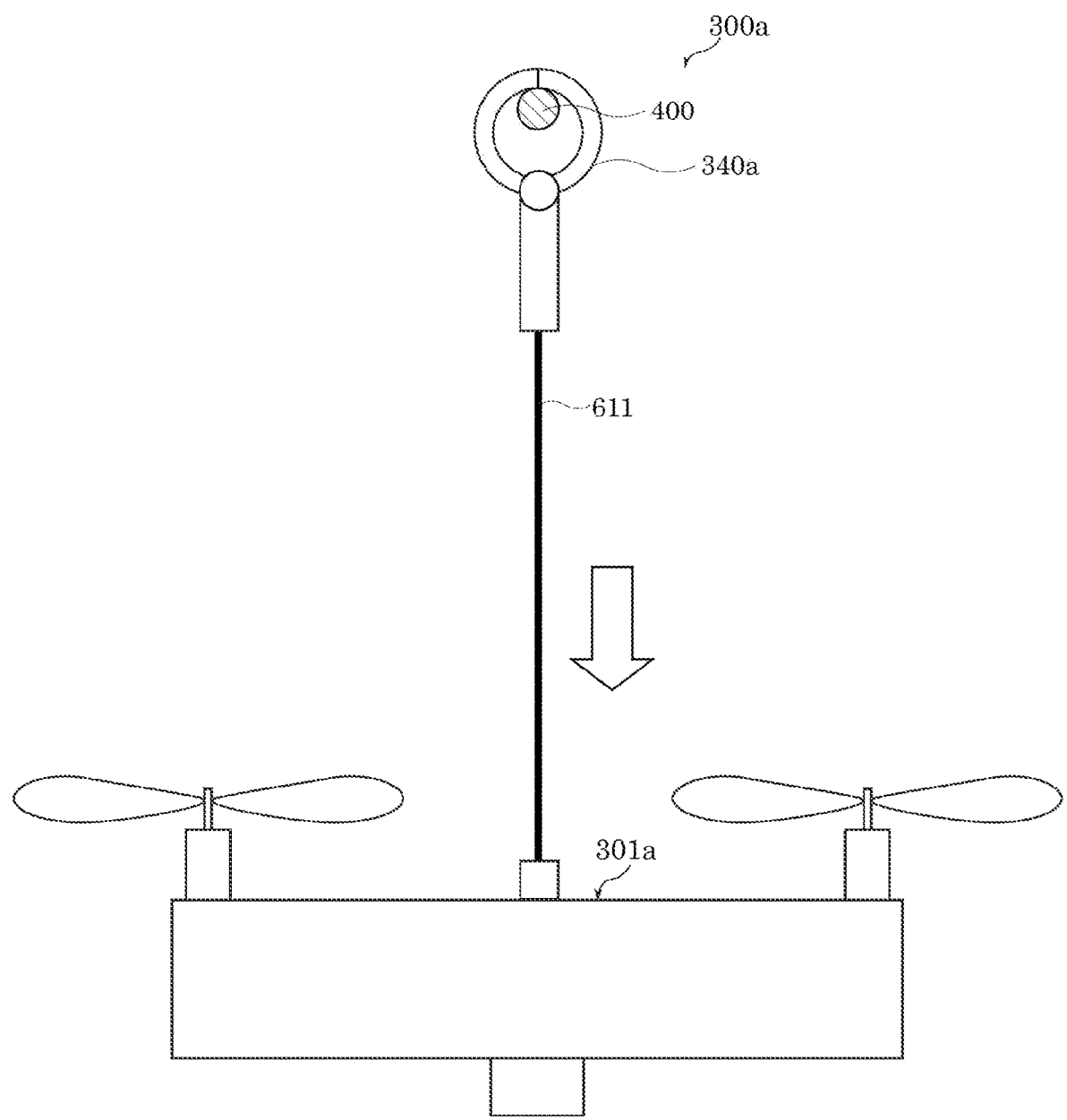
FIG. 34B is a schematic diagram illustrating an example of how a child drone descends while its arm is anchored to a rail according to Embodiment 3.

FIG. 34A is a schematic diagram illustrating an example of child drone 300a according to Embodiment 3. FIG. 34B is a schematic diagram illustrating an example of how child drone 300a descends with its arm 340a being anchored to rail 400 according to Embodiment 3.

As illustrated in FIGS. 34A and 34B, child drone 300a further includes wire 611 that couples arm 340a and child drone main body 301a. Arm 340a is connected to child drone main body 301a via wire 611 and can be moved away from child drone main body 301a.

A wire control module takes up wire 611 or lets out wire 611, for example.

With flying system 2a according to the present embodiment, upon child drone 300a arriving at a receiver, processor 337 controls actuator 310 so as to hold rail 400 with arm 340a and to anchor arm 340a to rail 400. Processor 337 controls the wire control module so as to let out wire 611. In this manner, as illustrated in FIG. 34B, child drone main body 301a descends from rail 400 and lands in a housing space inside a delivery box. This configuration allows child drone 300a to store a load into the delivery box.

Embodiment 4

In the following, a method of controlling a flying body and basic configurations of the flying body and of flying system 2b according to the present embodiment are identical to the basic configurations described in Embodiment 1 and so on. Therefore, the descriptions of the method of controlling the flying body and the basic configurations of the flying body and of flying system 2b according to the present embodiment will be omitted as appropriate, and mainly the differences from Embodiment 1 will be described.

Figure 35:
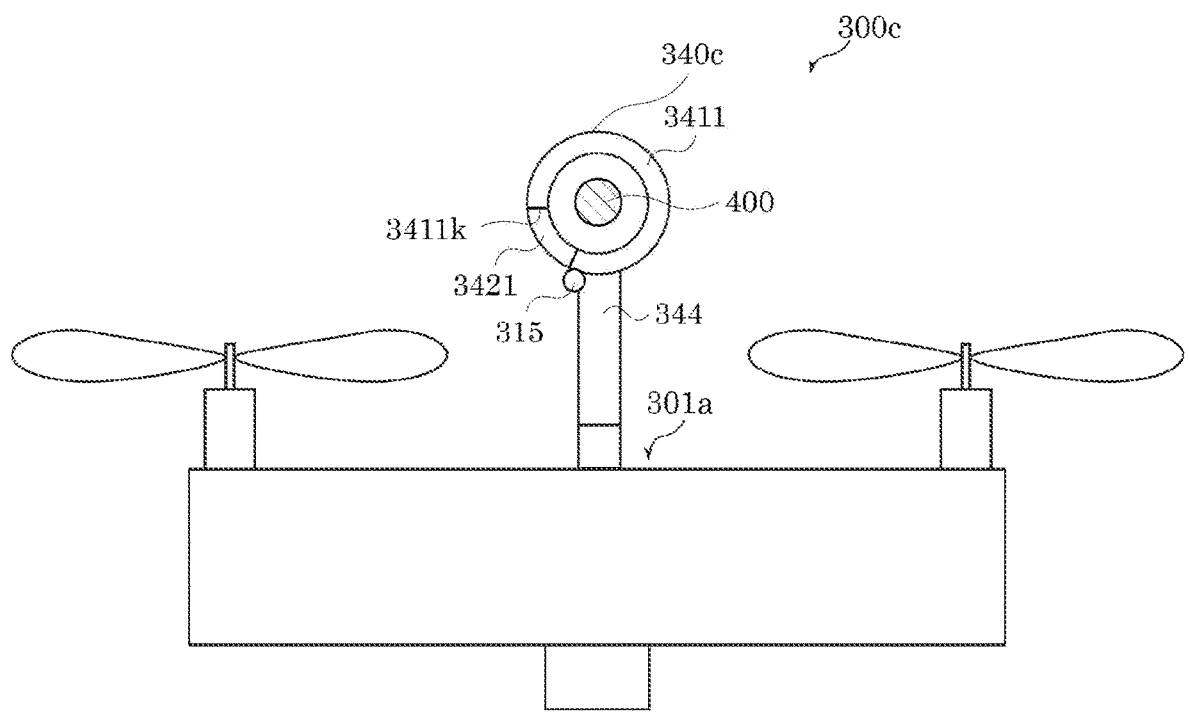
FIG. 35 is a schematic diagram illustrating an example of a child drone of a flying system according to Embodiment 4.
Figure 36:
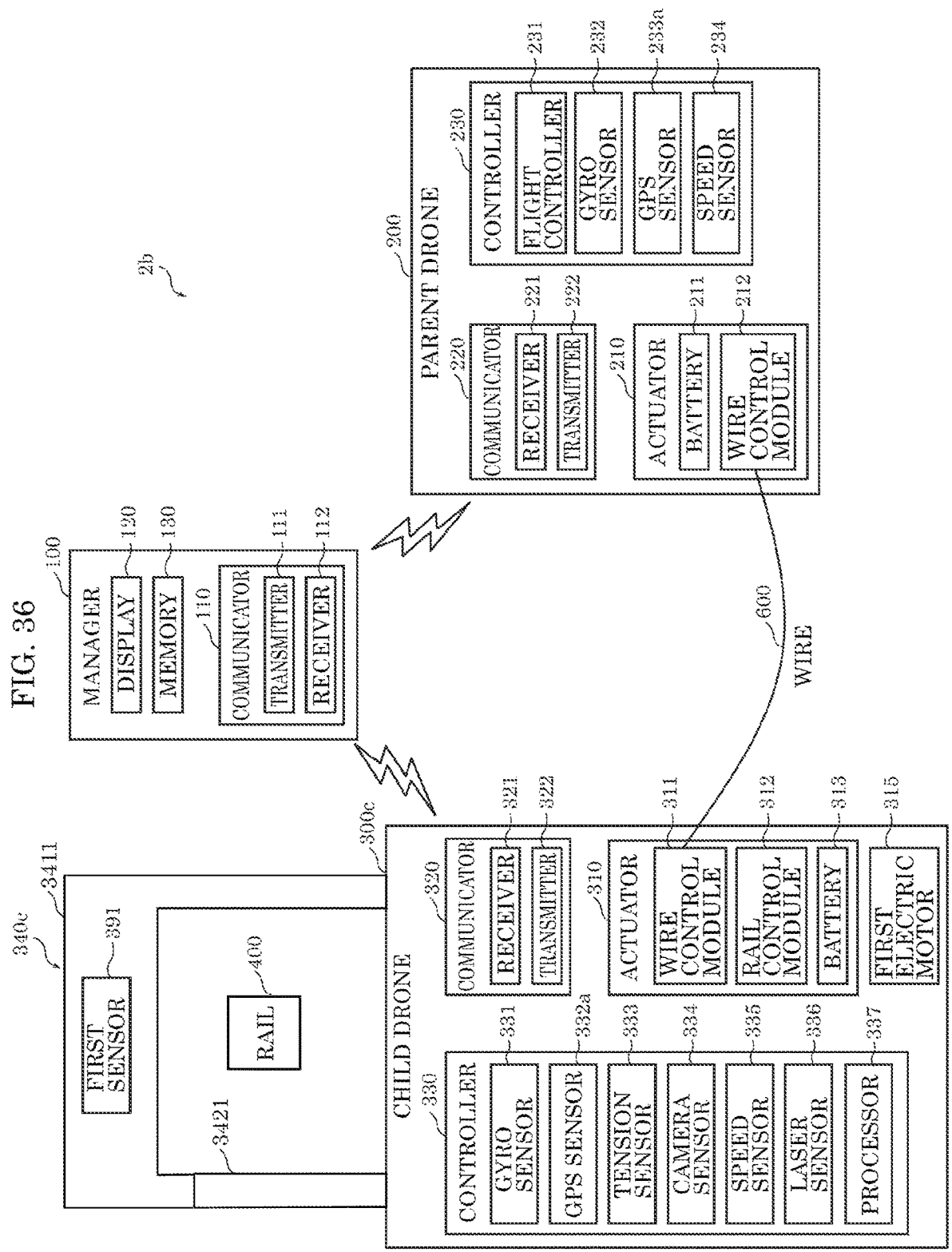
FIG. 36 is a block diagram illustrating a configuration of the flying system according to Embodiment 4.
Figure 37:
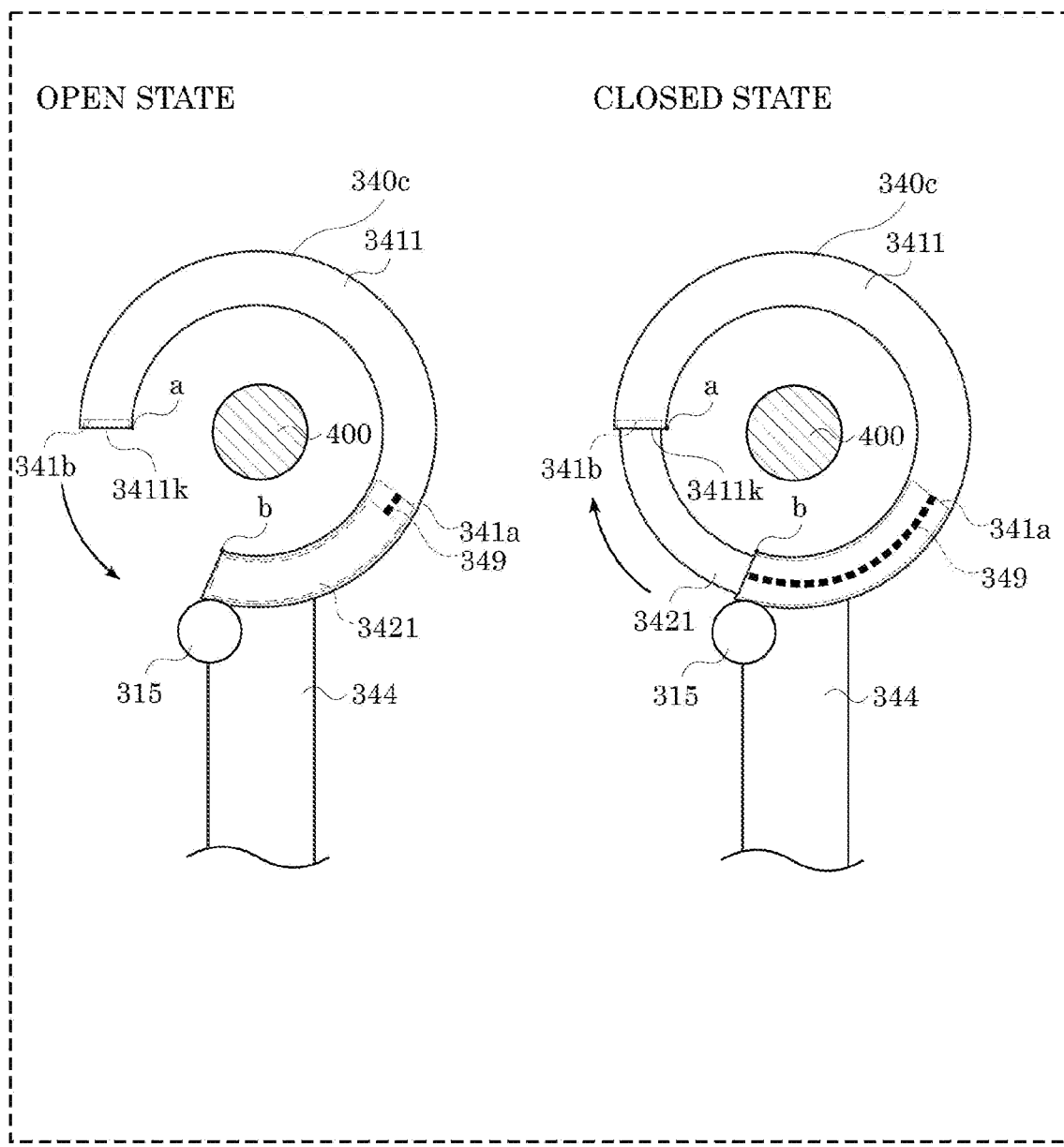
FIG. 37 is a schematic diagram illustrating an example of an arm of a child drone of the flying system according to Embodiment 4.

FIG. 35 is a schematic diagram illustrating an example of child drone 300c of flying system 2b according to Embodiment 4. FIG. 36 is a block diagram illustrating a configuration of flying system 2b according to Embodiment 4. FIG. 37 is a schematic diagram illustrating an example of arm 340c of child drone 300c of flying system 2b according to Embodiment 4. FIG. 37 illustrates a state in which second arm 3421 leaves opening 3411k of first arm 3411 open and a state in which second arm 3421 closes opening 3411k of first arm 3411.

As illustrated in FIGS. 35 to 37, the arm of child drone 300c constituting flying system 2b according to the present embodiment includes, in addition to first arm 3411 and second arm 3421, spring 349, support portion 344 that supports the arm, first electric motor 315, and first sensor 391. First arm 3411 and second arm 3421 constitute an example of a ring.

First arm 3411 and support portion 344 are formed integrally. First arm 3411 has a C-shaped hook-like form where a part of the ring is cut out as viewed in the direction in which child drone 300c travels. The portion cut out from the ring constitutes opening 3411k of first arm 3411 through which rail 400 can enter the space enclosed by arm 340c.

The length of opening 3411k (i.e., the distance from one end "a" to another end "b" of first arm 3411 illustrated in FIG. 37) is greater than the diameter of rail 400 so that rail 400 can enter the space enclosed by arm 340c through opening 3411k. The one end of first arm 3411 abuts second arm 3421, and housing 341a that houses second arm 3421 is formed in another end portion of first arm 3411. Housing 341a has a circular arc shape that follows the shape of first arm 3411.

Recess 341b is formed in one end portion of first arm 3411, and one end of second arm 3421 is inserted into recess 341b. With this configuration, when second arm 3421 closes opening 3411k of first arm 3411, even if a force is applied to second arm 3421 by rail 400, the possibility that second arm 3421 is separated from first arm 3411 is reduced since second arm 3421 is fitted in recess 341b.

Second arm 3421 can be slid and housed into housing 341a. Housing 341a may house the whole or a part of second arm 3421. Spring 349 is provided inside housing 341a. Spring 349 applies a biasing force against second arm 3421 so as to cause second arm 3421 to close opening 3411k of first arm 3411. One end of spring 349 is connected to another end of second arm 3421, and another end of spring 349 is connected to an inner bottom of housing 341a. For example, spring 349 is an elastic member, such as a coil spring or rubber.

First arm 3411 and second arm 3421 appear to form a circle when first arm 3411 and second arm 3421 are viewed in the direction in which child drone 300c travels. When arm 340c is positioned upright, opening 3411k of first arm 3411 is located below a horizontal line passing through the center axis of that circle. Therefore, even when opening 3411k of first arm 3411 is open, first arm 3411 functions as a hook, and this reduces the possibility that first arm 3411 coupled to rail 400 becomes disengaged from rail 400.

Second arm 3421 is slid and moved by first electric motor 315 such that second arm 3421 closes or opens opening 3411k of first arm 3411. When second arm 3421 has closed opening 3411k, first arm 3411 and second arm 3421 form a ring. When second arm 3421 opens opening 3411k, arm 340c has a C-like shape (a circular arc shape). Second arm 3421 has a circular arc shape that conforms to the shape of housing 341a.

Support portion 344 is a support pillar that supports first arm 3411 and second arm 3421 on child drone main body 301a. First arm 3411 is connected to one end of support portion 344, and child drone main body 301a is connected to another end of support portion 344. First electric motor 315 is attached to the vicinity of a connection portion where the one end of support portion 344 and first arm 3411 are connected to each other. Support portion 344 is provided so as to erect from the center portion of child drone main body 301a, as child drone main body 301a is viewed from the above.

First electric motor 315 is a motor that is actuated and controlled by processor 337 of controller 330. First electric motor 315 slides and moves second arm 3421 so as to house second arm 3421 into housing 341a. Specifically, a gear or the like provided on a rotary shaft of first electric motor 315 meshes with the teeth formed on an outer peripheral surface of second arm 3421, and this allows second arm 3421 to slide and move. As a matter of course, the actuation force of first electric motor 315 is stronger than the spring force of spring 349.

First electric motor 315 is provided at a position where first electric motor 315 can slide and move second arm 3421, that is, provided at the connection portion where support portion 344 and first arm 3411 are connected to each other. This connection portion lies in the vicinity of opening 3411k of first arm 3411 and on the outer peripheral side of housing 341a.

First sensor 391 measures a first distance between rail 400 and arm 340c. First sensor 391 is disposed on at least an upper portion or a lower portion of the ring of arm 340c.

First sensor 391 outputs first distance information indicating the measured first distance to processor 337 of controller 330.

Processor 337 performs control of moving arm 340c upward or downward in accordance with the first distance indicated by the first distance information. Specifically, processor 337 determines whether the first distance is greater than a predetermined value. In a case where first sensor 391 is provided on the upper portion of the ring of arm 340c, processor 337 controls actuator 310 so as to move arm 340c in an upward direction if the first distance is greater than the predetermined value. Processor 337 controls actuator 310 so as to move arm 340c in a downward direction if the first distance is smaller than or equal to the predetermined value. In a case where first sensor 391 is provided on the lower portion of the ring of arm 340c, processor 337 controls actuator 310 so as to move arm 340c in a downward direction if the first distance is greater than the predetermined value. Processor 337 controls actuator 310 so as to move arm 340c in an upward direction if the first distance is smaller than or equal to the predetermined value.

Processor 337 actuates first electric motor 315 so as to slide and move second arm 3421 into housing 341a only when opening 3411k of first arm 3411 is to be opened. When opening 3411k of first arm 3411 is to be closed, processor 337 refrains from actuating first electric motor 315, that is, stops first electric motor 315. In this case, second arm 3421 closes opening 3411k of first arm 3411 by the biasing force of spring 349.

In the present embodiment, spring 349 does not need to be used. Alternatively, opening 3411k of first arm 3411 may be closed or opened by sliding and moving second arm 3421 with first electric motor 315.

When child drone 300c couples arm 340c to rail 400, child drone 300c configured as described above places arm 340c diagonally above rail 400 with opening 3411k of first arm 3411 left open and then couples itself to rail 400. Alternatively, child drone 300c moves in the horizontal direction with opening 3411k of first arm 3411 left open and then couples itself to rail 400.

The shape of the ring portion of the arm is not limited to the one described above.

Figure 38:
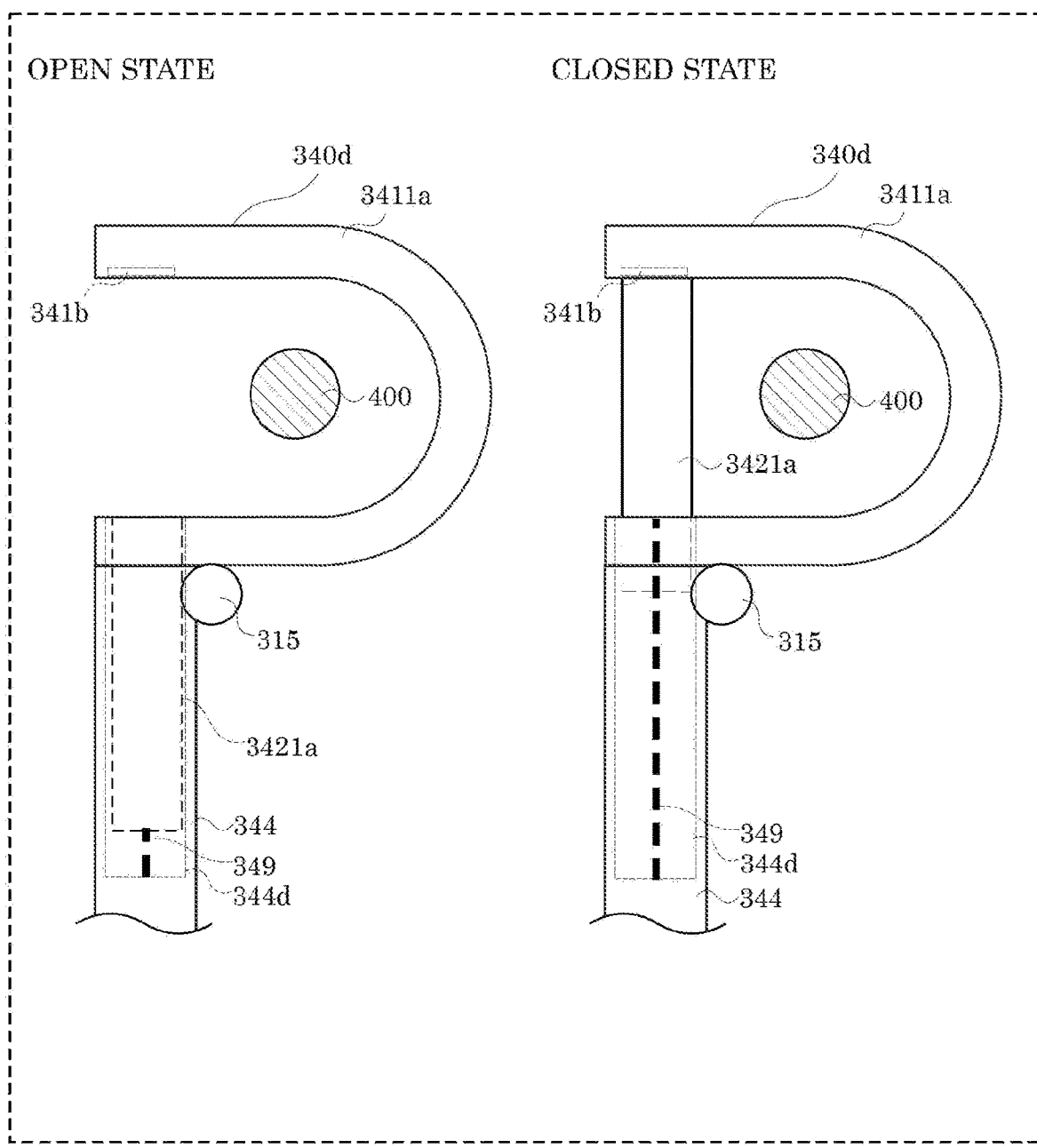
FIG. 38 is a schematic diagram illustrating an example of another arm of a child drone of the flying system according to Embodiment 4.

FIG. 38 is a schematic diagram illustrating an example of another arm 340d of the child drone of the flying system according to Embodiment 4.

As illustrated in FIG. 38, for example, first arm 3411a may have a U-like shape. In this case, opening 3411k of first arm 3411a through which rail 400 can enter the space enclosed by first arm 3411a is formed in a side of first arm 3411a. First arm 3411a has a shape that bulges in the horizontal direction from opening 3411k.

Second arm 3421a is a linear pillar-like member. Second arm 3421a is supported by support portion 344 such that second arm 3421a can be slid and moved by spring 349 in the vertical direction. The biasing force of spring 349 is applied to second arm 3421a in a vertically upward direction.

In FIG. 38, housing 344d that houses second arm 3421a is formed in support portion 344.

In this manner, when the child drone is to couple itself to rail 400, the child drone moves in the horizontal direction with opening 3411k of first arm 3411a left open and then couples itself to rail 400. This configuration reduces the possibility that rail 400 and arm 340d come into contact with each other and allows rail 400 and arm 340d to be coupled to each other with ease.

The function of arm 340d is not limited to the one described above.

Figure 39:
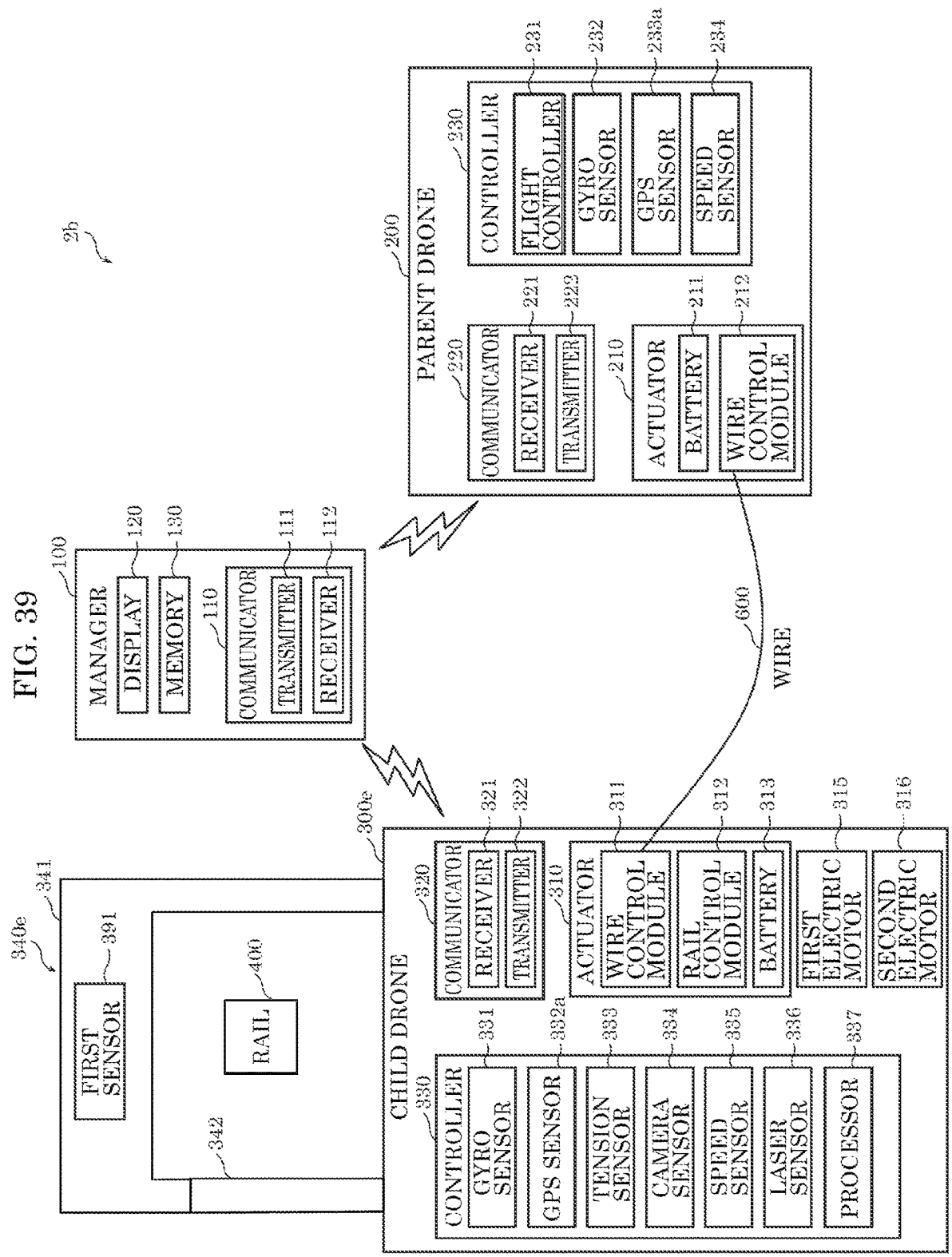
FIG. 39 is a block diagram illustrating another configuration of the flying system according to Embodiment 4.
Figure 40:
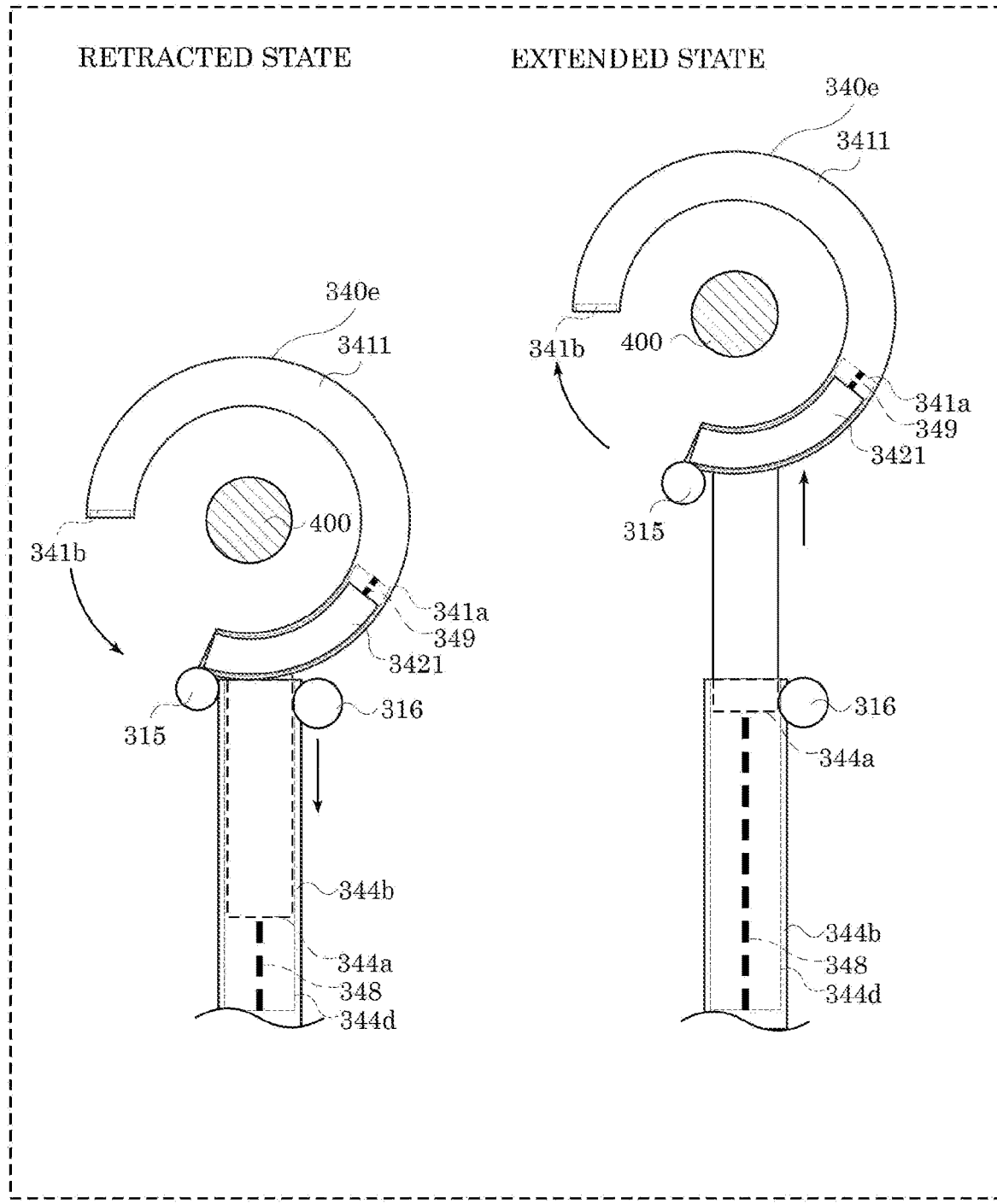
FIG. 40 is a schematic diagram illustrating an example of a state in which yet another arm of a child drone of the flying system is retracted or extended according to Embodiment 4.

FIG. 39 is a block diagram illustrating another configuration of flying system 2b according to Embodiment 4. FIG. 40 is a schematic diagram illustrating a state in which yet another arm 340e of child drone 300e of flying system 2b is retracted or extended according to Embodiment 4.

For example, as illustrated in FIGS. 39 and 40, arm 340e (i.e., first arm 3411 and second arm 3421) may be slid and moved. Specifically, child drone 300e further includes tubular guide portion 344b connected to child drone main body 301a, second electric motor 316, and spring 348. Housing 344d that houses support portion 344a is formed in guide portion 344b.

One end of support portion 344a is connected to first arm 3411, and another end of support portion 344a is connected to spring 348. The end of spring 348 that is opposite to the end connected to support portion 344a is connected to guide portion 344b or child drone main body 301a. Spring 348 applies a biasing force against support portion 344a so as to house support portion 344a into housing 344d in guide portion 344b. In other words, the biasing force of spring 348 acts on support portion 344a in a vertically downward direction.

Second electric motor 316 is a motor that is actuated and controlled by processor 337 of controller 330. Second electric motor 316 slides and moves support portion 344a so as to extend support portion 344a out of guide portion 344b. Specifically, a gear or the like provided on a rotary shaft of second electric motor 316 meshes with the teeth formed on an outer peripheral surface of support portion 344a, and this allows support portion 344a to slide and move in a vertically upward direction.

Second electric motor 316 is provided at a position where second electric motor 316 can slide and move support portion 344a, that is, provided at a leading end of guide portion 344b.

Processor 337 actuates second electric motor 316 only when arm 340e is to be extended from child drone 300e, and slides and moves support portion 344a so as to extend support portion 344a out of guide portion 344b. When arm 340e is to be retracted, processor 337 refrains from actuating second electric motor 316, that is, stops second electric motor 316. At this point, support portion 344a is retracted and housed into guide portion 344b by the biasing force of spring 348.

A plurality of arms may be provided.

Figure 41:
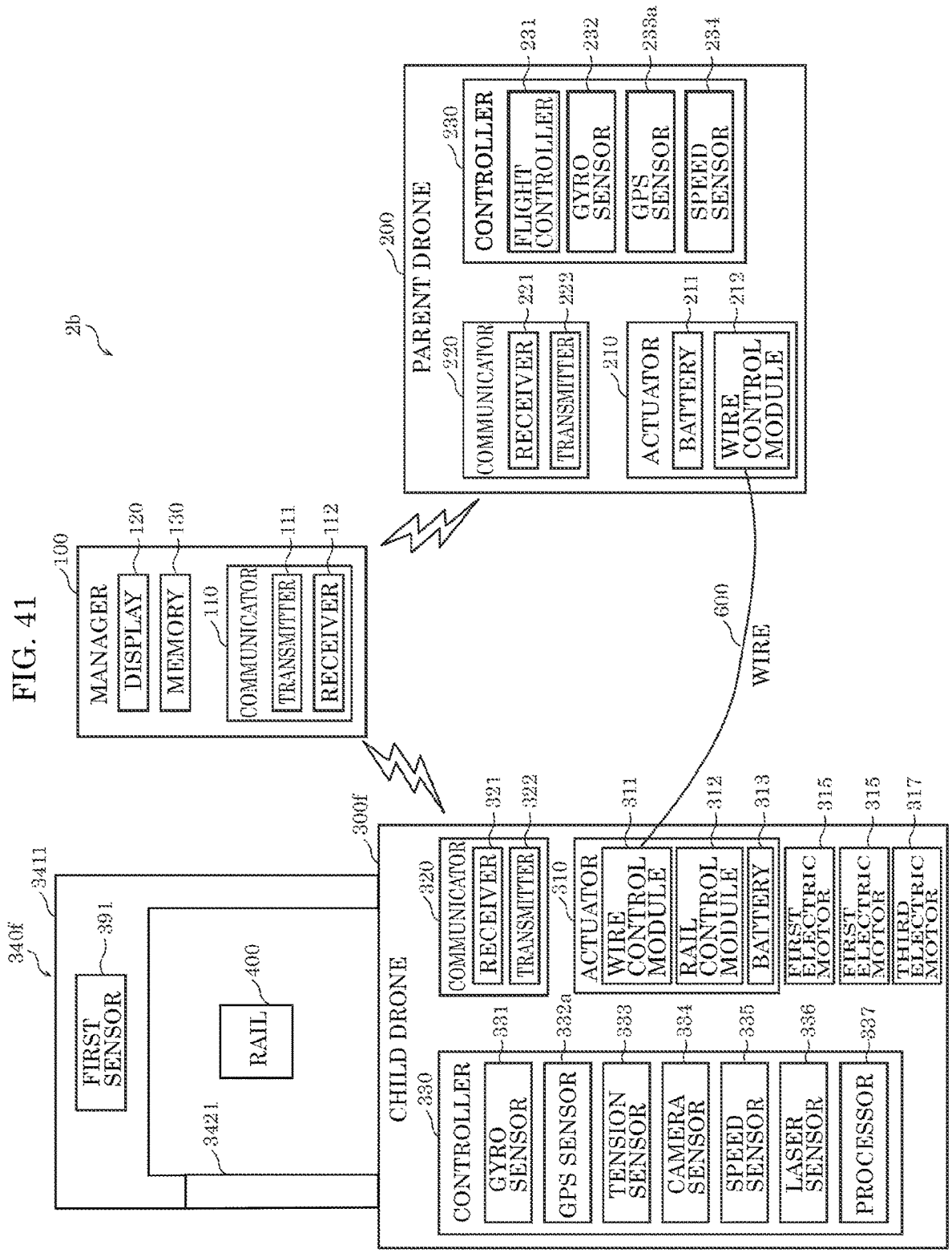
FIG. 41 is a block diagram illustrating yet another configuration of the flying system according to Embodiment 4.
Figure 42:
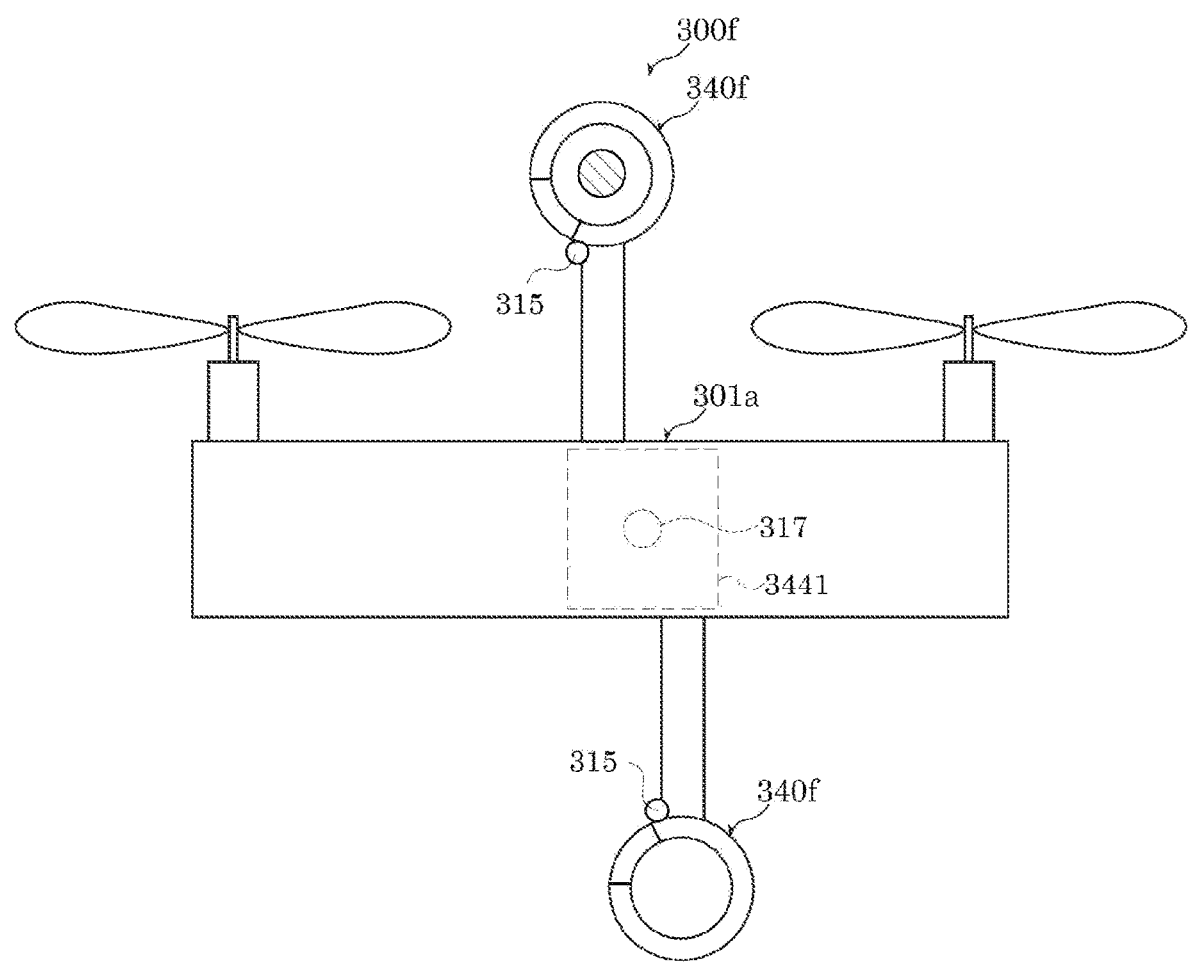
FIG. 42 is a schematic diagram illustrating an example of a child drone of the flying system according to Embodiment 4.
Figure 43A:
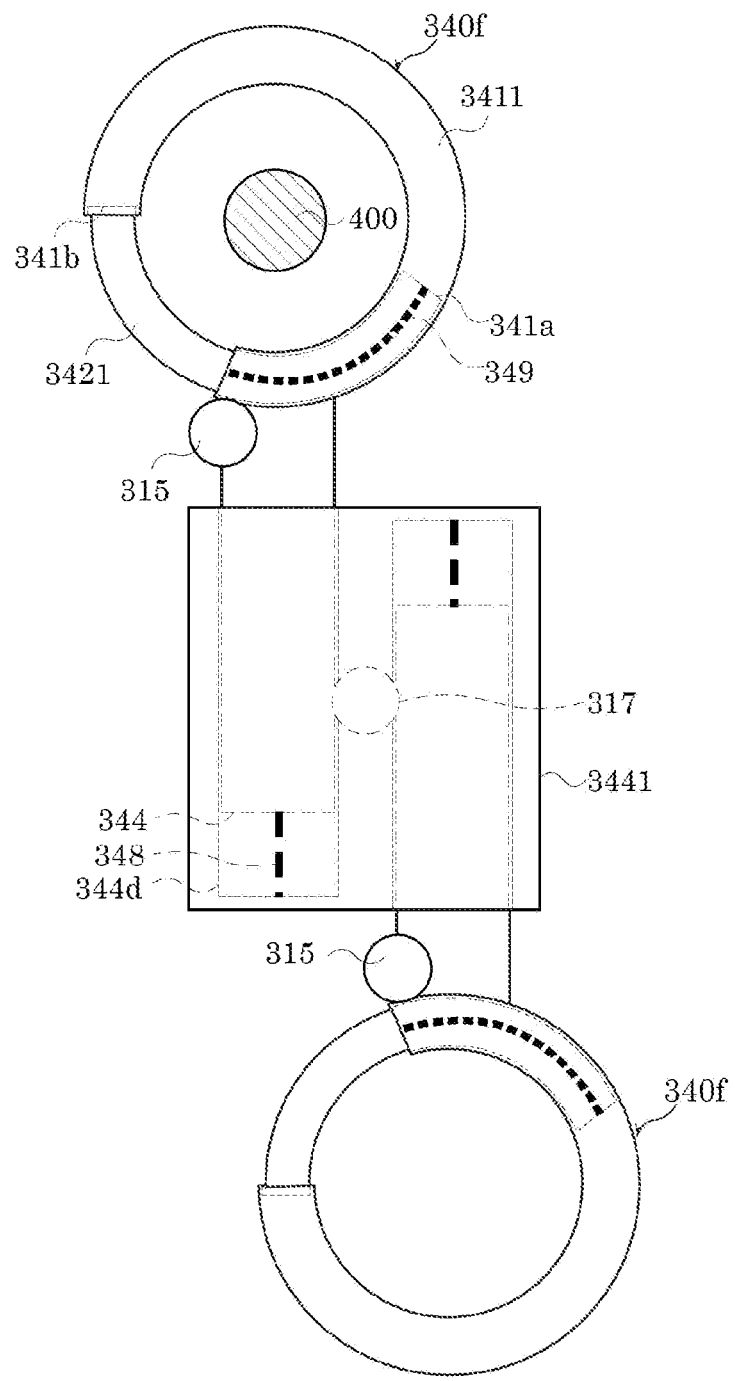
FIG. 43A is a schematic diagram illustrating an example of a state in which an arm of a child drone of the flying system is retracted according to Embodiment 4.
Figure 43B:
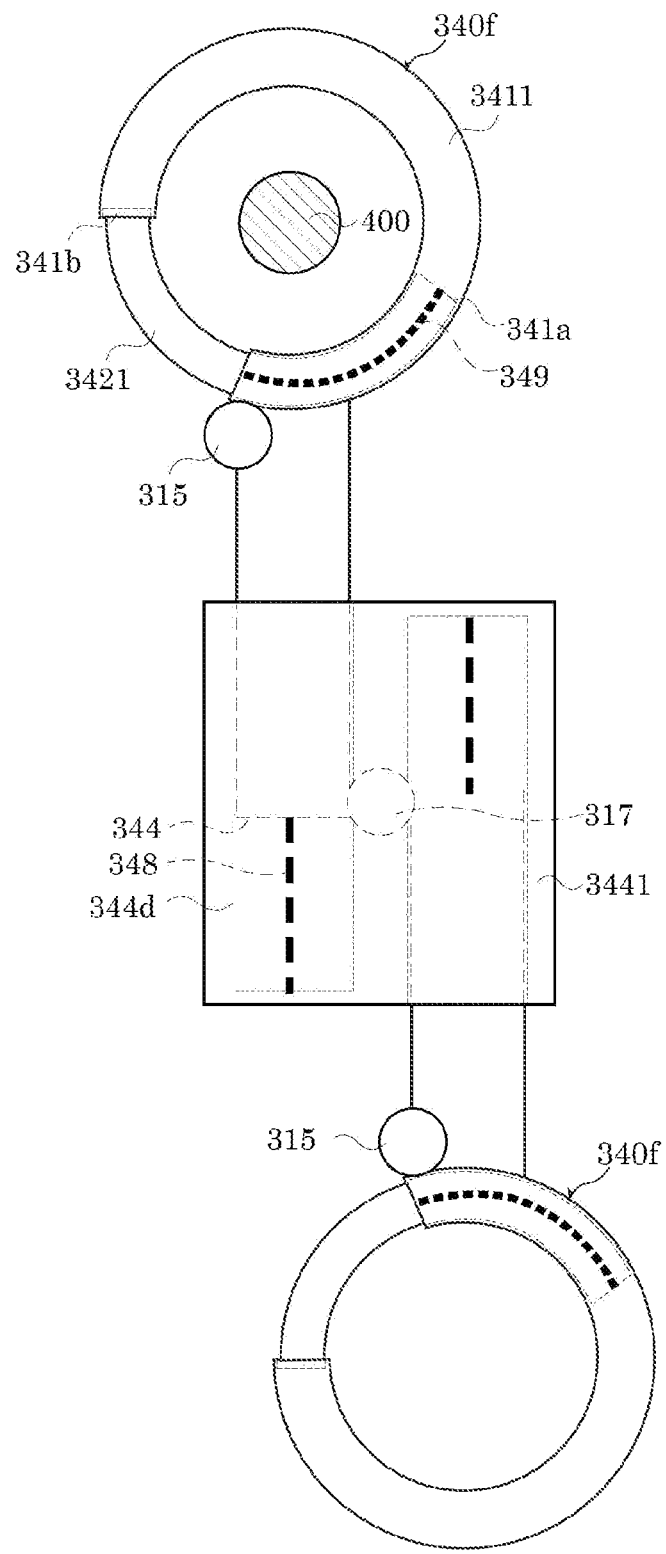
FIG. 43B is a schematic diagram illustrating an example of a state in which an arm of a child drone of the flying system is extended according to Embodiment 4.

FIG. 41 is a block diagram illustrating yet another configuration of flying system 2b according to Embodiment 4. FIG. 42 is a schematic diagram illustrating an example of yet other arm 340f of child drone 300f of flying system 2b according to Embodiment 4. FIG. 43A is a schematic diagram illustrating an example of a state in which arm 340f of child drone 300f of flying system 2b is retracted according to Embodiment 4. FIG. 43B is a schematic diagram illustrating an example of a state in which arm 340f of child drone 300f of flying system 2b is extended according to Embodiment 4.

For example, as illustrated in FIGS. 41, 42, 43A, and 43B, child drone 300f includes arm 340f (may also be referred to below as one arm 3400 that extends in a vertically upward direction from child drone main body 301a, arm 340f (may also be referred to below as other arm 3400 that extends in a vertically downward direction from child drone main body 301a, counterbalance 3441, and first electric motors 315.

One arm 340f and other arm 340f each have a configuration similar to the configuration described above. One arm 340f and other arm 340f are disposed symmetric to each other about child drone main body 301a.

Counterbalance 3441 is a balancer that balances the center of gravity of child drone 300f. Counterbalance 3441 is tubular. Housings 344d are formed inside counterbalance 3441. Support portion 344 of one arm 340f and support portion 344 of other arm 340f are inserted into respective housings 344d. Furthermore, third electric motor 317 is housed in counterbalance 3441.

Third electric motor 317 is disposed between support portion 344 of one arm 340f and support portion 344 of other arm 340f. Third electric motor 317 slides and moves support portion 344 of one arm 340f and support portion 344 of other arm 340f so as to extend these support portions 344 from counterbalance 3441. In addition, third electric motor 317 slides and moves support portion 344 of one arm 340f and support portion 344 of other arm 340f so as to retract these support portions 344 into counterbalance 3441. In other words, third electric motor 317 moves one arm 340f and other arm 340f so as not to change the position of the center of gravity of child drone 300f.

Third electric motor 317 is fixed to any one of support portion 344 of one arm 340f, support portion 344 of other arm 340f, or counterbalance 3441.

In the present embodiment, one arm 340f and other arm 340f are provided in a center portion of child drone main body 301a. Alternatively, for example, one arm 340f and other arm 340f may be disposed along the edge of child drone main body 301a. In this case, another counterbalance may be disposed at a position on a diagonal line between one arm 340f and other arm 340f with respect to the center of gravity of child drone 300f so that the counterbalance balances the center of gravity of child drone 300f.

In this example, another counterbalance may be used in place of other arm 340f. As such, it is not essential that two arms 340f be provided.

Figure 44:
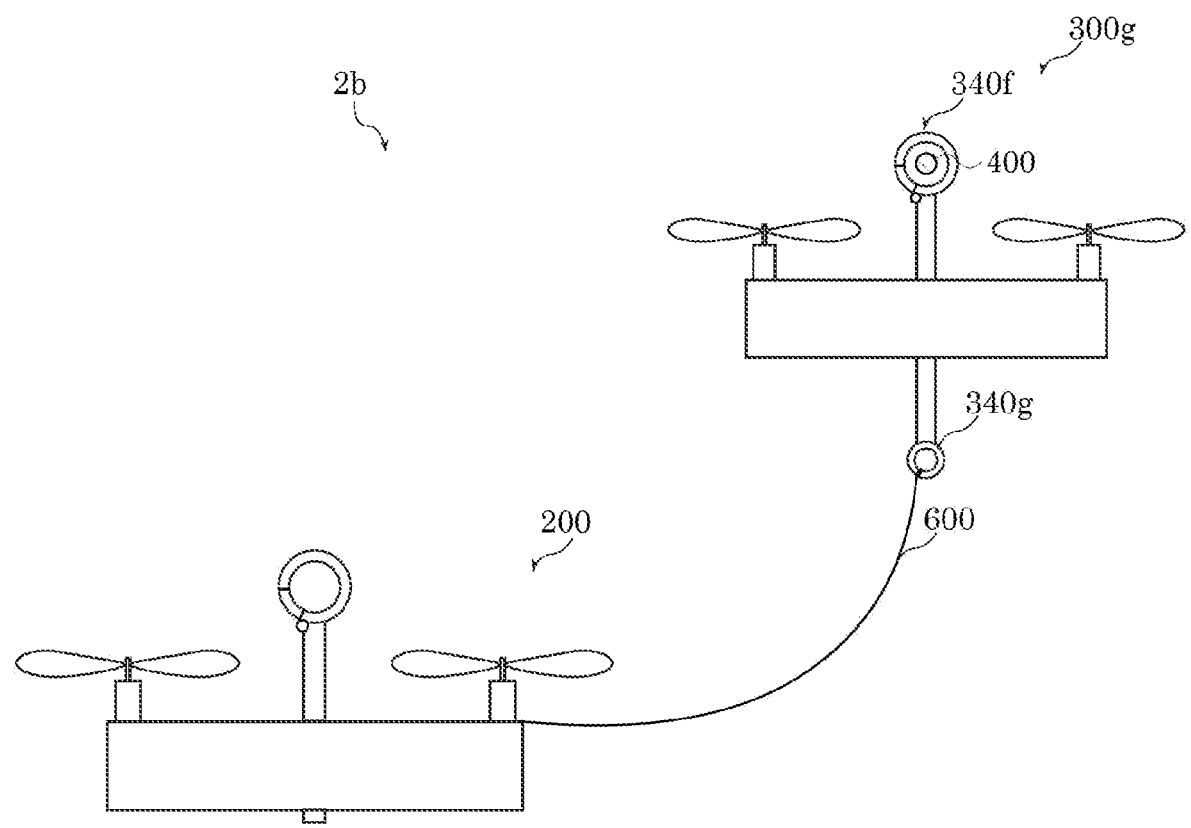
FIG. 44 is a schematic diagram illustrating an example of yet another arm of a child drone of the flying system according to Embodiment 4.

FIG. 44 is a schematic diagram illustrating an example of yet another arm 340g of child drone 300g of flying system 2b according to Embodiment 4.

For example, as illustrated in FIG. 44, an insertion hole is formed at a leading end of a counterbalance, and wire 600 can be tied to the insertion hole. Wire 600 is inserted into the insertion hole and tied thereto. Wire 600 is connected to parent drone 200.

Child drone 300g may include a gimbal in place of the counterbalance.

For example, the gimbal is provided at a portion where child drone main body 301a and arm 340f are connected to each other. In other words, child drone main body 301a is connected to arm 340f via the gimbal. In this case, even if child drone main body 301a tilts while child drone 300g is flying, arm 340f is less likely to tilt relative to the vertical direction. Therefore, child drone 300g can fly stably.

Advantageous Effects

Now, some advantageous effects of the method of controlling a flying body and of the flying body according to the present embodiment will be described.

As described above, the method of controlling a flying body according to the present embodiment is a method of controlling a flying body that is coupled to another flying body via a coupling line. The flying body includes an arm having a ring through which a fixed rail is to pass and a first sensor that measures a first distance between the rail and the ring. The flying body measure the first distance with the use of the first sensor and performs control of moving the arm upward or downward in accordance with the first distance.

This configuration allows the flying body to move appropriately along the rail without the arm making contact with the rail when the flying body moves with its arm being coupled to the rail.

The flying body according to the present embodiment is a flying body that is coupled to another flying body via a coupling line. The flying body includes an arm and a first sensor. The arm includes a ring through which a fixed rail is to pass. The first sensor is provided on an upper portion or a lower portion of the ring and measures a first distance between the rail and the ring.

In the method of controlling a flying body according to the present embodiment, the first sensor is provided on an upper portion of the ring. The arm is moved in an upward direction when the first distance is greater than a predetermined value. On the other hand, the arm is moved in a downward direction when the first distance is smaller than or equal to the predetermined value.

This configuration makes it possible to secure a certain distance between the ring and the rail so as to keep the ring and the rail from making contact with each other when the upper side or the lower side of the ring of the arm of the flying body has come too close to the rail. Therefore, the possibility that the ring makes contact with the rail while the flying body is flying is reduced.

In the method of controlling a flying body according to the present embodiment, the first sensor is provided on a lower portion of the ring. The arm is moved in a downward direction when the first distance is greater than a predetermined value. On the other hand, the arm is moved in an upward direction when the first distance is smaller than or equal to the predetermined value.

In the flying body according to the present embodiment, the arm includes a first arm, a second arm, and a first electric motor. The first arm has a substantially circular arc shape and is partially cut out to have an opening. The second arm has a substantially circular arc shape and forms a ring shape together with the first arm. The first electric motor slides and moves the second arm to at least open the opening. The arm becomes coupled to the rail when the rail is allowed to pass through the opening while the opening is open.

This configuration allows the arm to be coupled to the rail with ease by opening the opening of the first arm and allowing the rail to pass through the opening.

In the flying body according to the present embodiment, the arm further includes a spring that applies a biasing force against the second arm so as to close the opening of the first arm. The first electric motor slides and moves the second arm and stops the actuation that contributes to opening of the opening when the rail has entered the space enclosed by the first arm.

With this configuration, the first electric motor needs to be actuated only when the arm is to be coupled to the rail. When the first electric motor is stopped, the second arm automatically closes the opening of the first arm by the biasing force of the spring. Accordingly, any increase in the power used by the flying body can be suppressed.

Variation 1 of Embodiment 4

In the following, a method of controlling a flying body and basic configurations of the flying body and of a flying system according to the present variation are identical to the basic configurations described in Embodiment 1 and so on. Therefore, the descriptions of the method of controlling a flying body and the basic configurations of the flying body and of the flying system according to the present variation will be omitted as appropriate.

Figure 45:
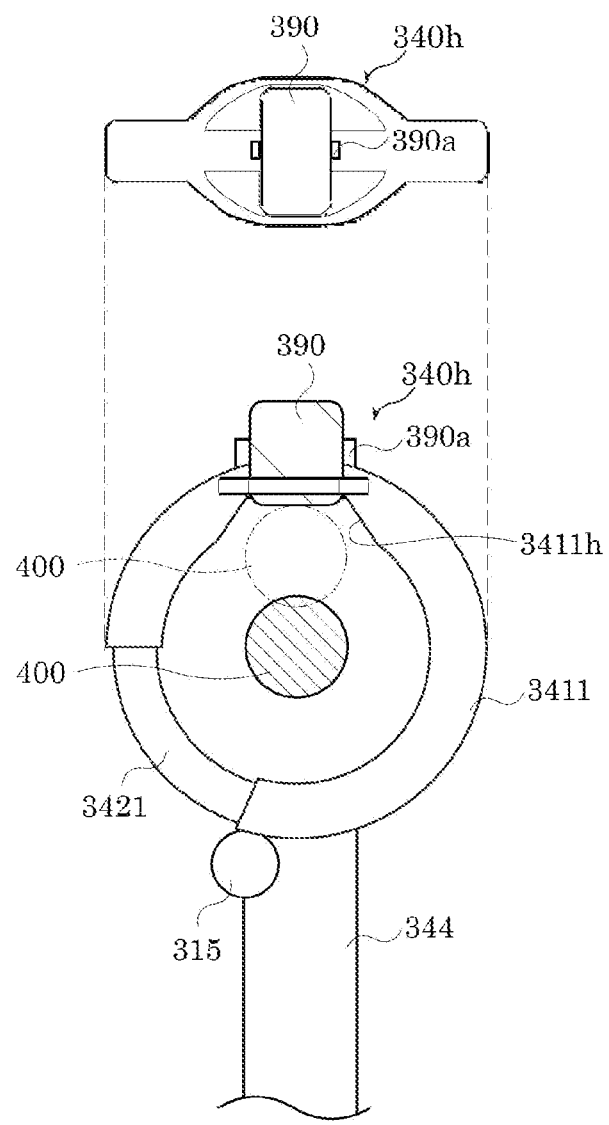
FIG. 45 is a schematic diagram illustrating an example of a child drone of a flying system according to Variation 1 of Embodiment 4.

FIG. 45 is a schematic diagram illustrating an example of a child drone of a flying system according to Variation 1 of Embodiment 4.

As illustrated in FIG. 45, the child drone according to the present variation further includes wheel 390 and axle 390a.

Wheel 390 makes contact with and freely rotates on rail 400. Wheel 390 is rotatably provided at an upper end portion of first arm 3411. Specifically, wheel 390 is supported by axle 390a provided at the upper end portion of first arm 3411 and rotates about axle 390a. When the child drone flies with arm 340h being coupled to rail 400, the axis of axle 390a extends in a direction that is orthogonal to the direction in which rail 400 extends and that is substantially parallel to the horizontal direction. Axle 390a constitutes a part of first arm 3411, and the two ends of rotary shaft 350 are fixed.

In this example, in place of wheel 390, a spherical ball may be provided. A plurality of wheels 390, balls, or the like may be provided on the inner peripheral side of the ring of arm 340h.

Recessed notch 3411h is formed in an inner periphery of the upper end side of first arm 3411 in order to keep first arm 3411 from making contact with rail 400. Wheel 390 is provided at a position closer to the outer peripheral surface than to the inner peripheral surface of first arm 3411. The outer peripheral surface of wheel 390 lies between the inner peripheral surface and the outer peripheral surface of first arm 3411.

Figure 46:
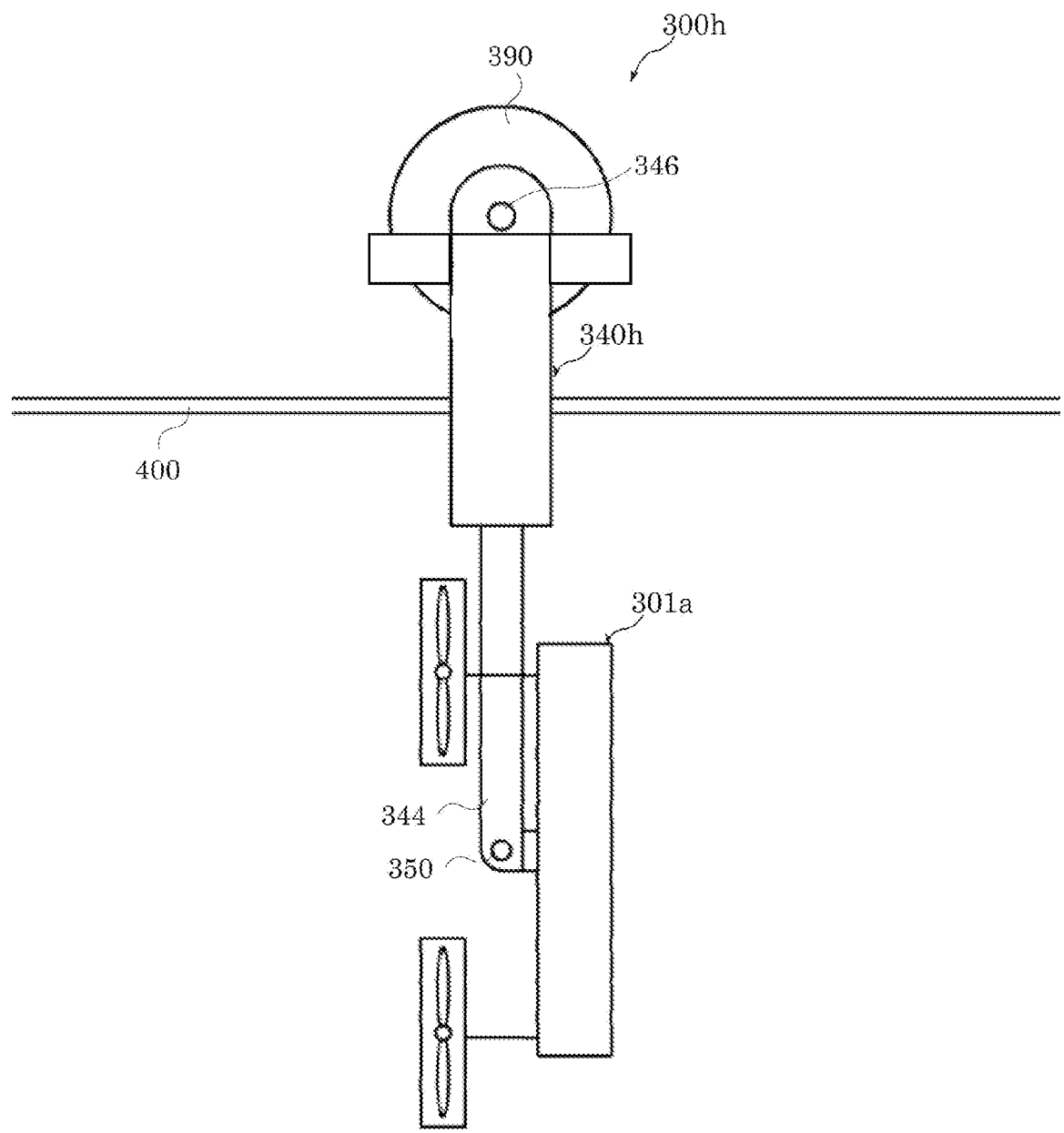
FIG. 46 is another schematic diagram illustrating an example of a child drone of the flying system according to Variation 1 of Embodiment 4.

FIG. 46 is a schematic diagram illustrating an example of a case where child drone main body 301a assumes an upright attitude while child drone 300h of the flying system is traveling along rail 400 according to Variation 1 of Embodiment 4.

As illustrated in FIG. 46, rotary shaft 350 is provided at a connection portion where child drone main body 301a and arm 340h are connected to each other. Specifically, when child drone 300h flies with arm 340h being coupled to rail 400, rotary shaft 350 brings child drone main body 301a into an upright attitude while maintaining the attitude of arm 340h. Specifically, when child drone 300h flies with arm 340h being coupled to rail 400, arm 340h assumes an attitude in which the lengthwise direction of arm 340h is substantially parallel to the vertical direction. Since child drone main body 301a has a plate-like shape, when child drone main body 301a is in the upright attitude, child drone main body 301a is substantially parallel to the vertical direction. In this manner, rotary shaft 350 causes child drone main body 301a to pivot mainly between the horizontal attitude and the upright attitude.

Processor 337 of controller 330 controls child drone main body 301a so as to bring child drone main body 301a into the upright attitude when child drone 300h flies with arm 340h being coupled to rail 400. Specifically, processor 337 causes child drone main body 301a to pivot about the axis of rotary shaft 350 by actuating rotary shaft 350 via actuator 310. In the present variation, actuator 310 is capable of rotating rotary shaft 350 by 180 degrees.

In child drone 300h configured as described above, child drone 300h can fly with wheel 390 in contact with rail 400 when child drone 300h flies with arm 340h being coupled to rail 400. Wheel 390 starts rotating upon friction with rail 400. Therefore, child drone 300h can travel on rail 400 solely with the propelling force in the traveling direction produced by the rotation of the propellers. This configuration thus renders it unnecessary for child drone 300h to use the rotary force of the propellers as the lifting force for lifting up child drone 300h.

In this child drone 300h, child drone main body 301a pivots about the axis of rotary shaft 350 as processor 337 controls actuator 310. Therefore, child drone 300h can change the attitude of child drone main body 301a.

Rotary shaft 350 brings child drone main body 301a into the upright attitude when child drone 300h flies with arm 340h being coupled to rail 400. Thus, child drone 300h can convert the rotary force of the propellers to the propelling force that acts in the traveling direction. Therefore, child drone 300h can smoothly travel on rail 400.

Moreover, since rail 400 is located in notch 3411h, it is less likely that wheel 390 is separated from rail 400 even if child drone 300h wavers while child drone 300h is traveling on rail 400. Therefore, child drone 300h can stably travel on rail 400.

Variation 2 of Embodiment 4

In the following, a method of controlling a flying body and basic configurations of the flying body and of a flying system according to the present variation are identical to the basic configurations described in Embodiment 1 and so on. Therefore, the descriptions of the method of controlling a flying body and the basic configurations of the flying body and of the flying system according to the present variation will be omitted as appropriate.

Figure 47:
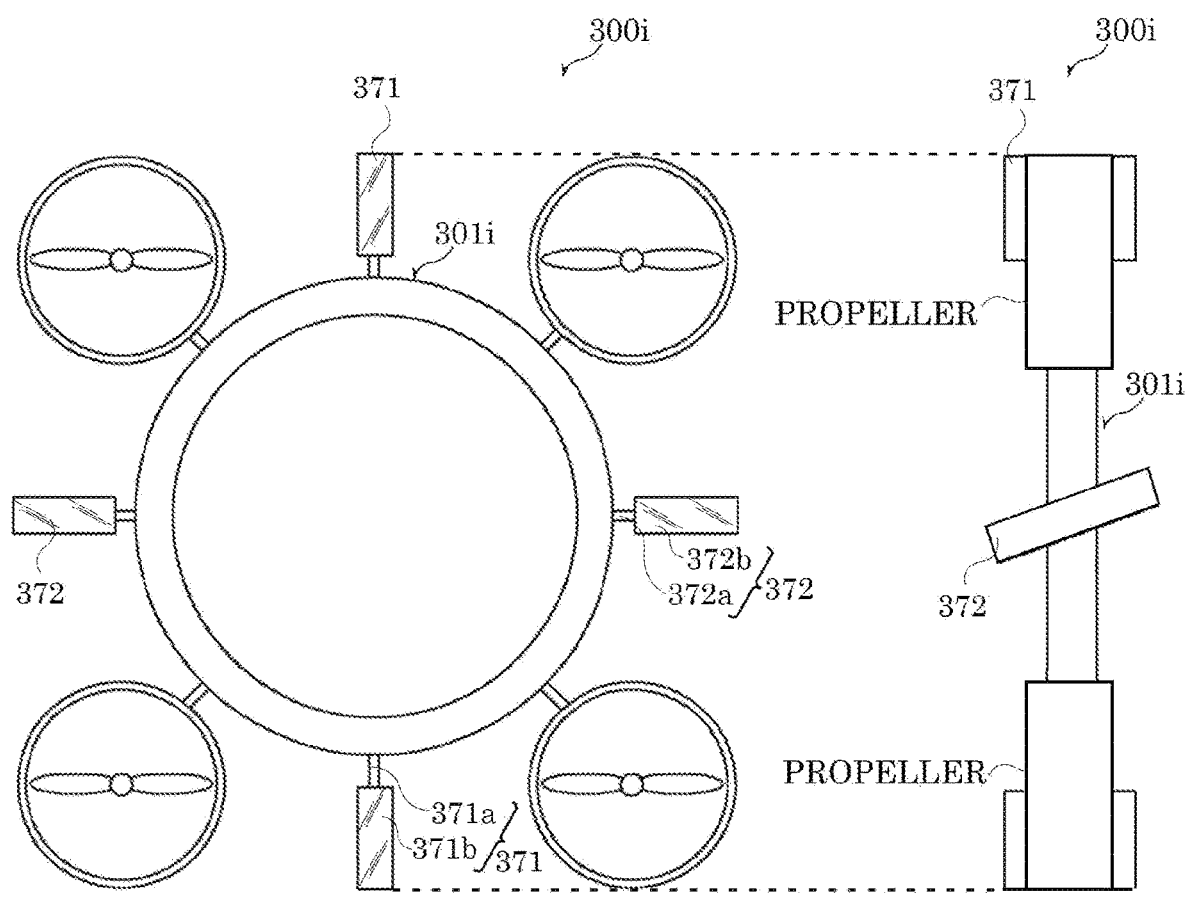
FIG. 47 illustrates a schematic front view and a schematic side view of an example of a child drone of a flying system according to Variation 2 of Embodiment 4.

FIG. 47 illustrates a schematic front view and a schematic side view of an example of child drone 300i of a flying system according to Variation 2 of Embodiment 4.

As illustrated in FIG. 47, child drone main body 301i according to the present variation has a ring-like shape. Child drone main body 301i couples itself to rail 400. Therefore, the main body of child drone 300i is shaped to function as an arm as well. Four propellers 801 are provided in respective directions from child drone main body 301i.

Child drone main body 301i further includes a pair of yaw wings 371, a pair of pitch wings 372, and a rudder controller (not illustrated).

The pair of yaw wings 371 are provided on an outer peripheral portion of child drone main body 301i. When child drone main body 301i is in the upright attitude, the pair of yaw wings 371 are disposed symmetrically in the vertical direction about the center of gravity of child drone main body 301i. Each of the pair of yaw wings 371 includes first shaft portion 371a having an axis extending in the vertical direction and first vane portion 371b that is pivotably supported by first shaft portion 371a. Each first vane portion 371b rotates about an axis extending in the vertical direction. The force of the wind in the right and left direction is controlled as first vane portions 371b rotate. When viewed in the traveling direction, child drone 300i is steered to the left when first vane portions 371b are rotated to the left or steered to the right when first vane portions 371b are rotated to the right.

The pair of pitch wings 372 are provided on an outer peripheral portion of child drone main body 301i. When child drone main body 301i is in the upright attitude, the pair of pitch wings 372 are disposed symmetrically in the horizontal direction about the center of gravity of child drone main body 301i. Each of the pair of pitch wings 372 includes second shaft portion 372a having an axis extending in the horizontal direction and second vane portion 372b pivotably supported by second shaft portion 372a. Each second vane portion 372b rotates about an axis extending in the horizontal direction. The force of the wind in the up and down direction is controlled as second vane portions 372b rotate. When viewed in the traveling direction, child drone 300i is steered in an upward direction when first vane portions 371b are rotated upward or steered in a downward direction when first vane portions 371b are rotated downward.

The rudder controller controls the pivoting movement of first vane portion 371b of each of the pair of yaw wings 371 and second vane portion 372b of each of the pair of pitch wings 372.

Processor 337 of controller 330 controls child drone main body 301i so as to bring child drone main body 301i into an inclined attitude when child drone 300i flies with child drone main body 301i being coupled to rail 400. Specifically, processor 337 controls the pivoting movement of second vane portion 372b of each of the pair of pitch wings 372 by actuating the rudder controller.

Child drone 300i configured as described above can be rotated in the horizontal direction by causing first vane portions 371b of yaw wings 371 to pivot and can be rotated in the vertical direction by causing second vane portions 372b of pitch wings 372 to pivot. When child drone 300i flies while being coupled to rail 400, child drone 300i flies in an attitude inclined with respect to the horizontal plane.

Figure 48:
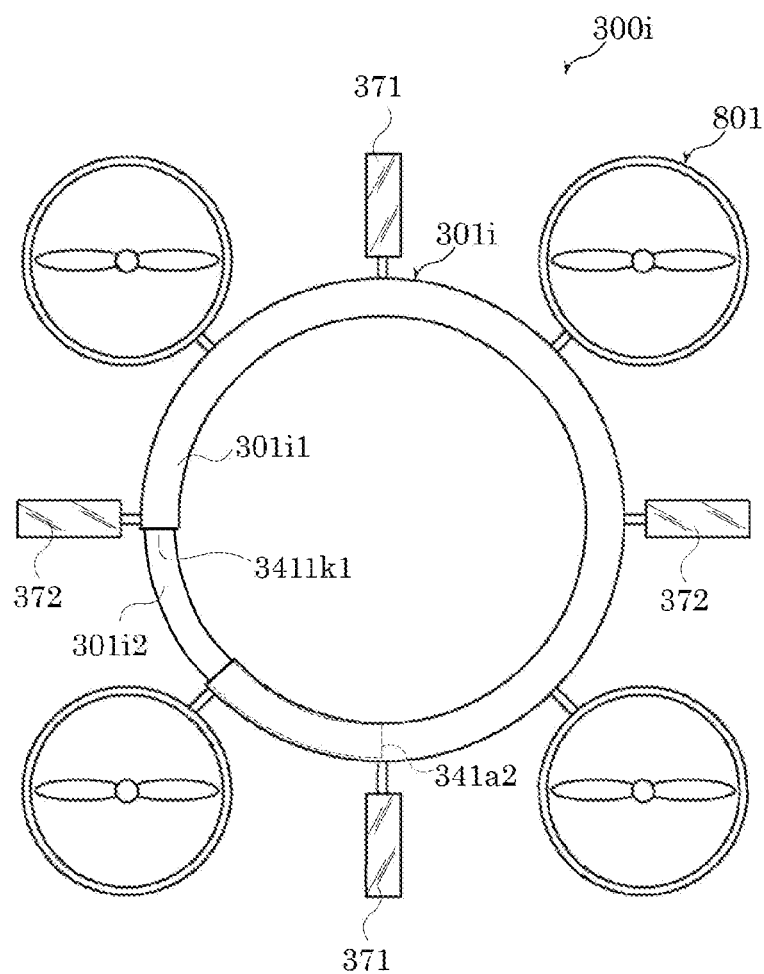
FIG. 48 is a schematic front view of another example of the child drone of the flying system according to Variation 2 of Embodiment 4.

FIG. 48 is a schematic front view of another example of child drone 300i in a flying system according to Variation 2 of Embodiment 4. As illustrated in FIG. 48, in the present variation, child drone main body 301i may adopt functions and configurations of first arm 3411 and second arm 3421. Child drone main body 301i includes first main body 301i1 having a hook-like shape and second main body 301i2 having a circular arc shape. Second main body 301i2 opens or closes opening 3411k1 in the outer periphery of first main body 301i1 by sliding and moving out of or into housing 341a2 in first main body 301i1.

A flying body according to the present variation configured as described above includes a first wing provided on each of an upper portion and a lower portion of the flying body and a second wing provided on each of a left side portion and a right side portion of the flying body with respect to the traveling direction of the flying body.

This configuration makes it possible to move a first flying body more appropriately with the four wings.

The flying body according to the present variation includes a main body (e.g., child drone main body 301i), four propellers, and four wings (e.g., a pair of yaw wings and a pair of pitch wings). The main body includes a ring through which a fixed rail is to pass. The four propellers are provided on the main body so as to be symmetric across the main body. The four wings are provided on the main body so as to be symmetric across the main body. The four propellers and the four wings are disposed in an alternating manner. The two wings (e.g., the pair of pitch wings) of the four wings that are disposed in a first predefined direction steer the main body in the vertical direction, and the two wings (e.g., the pair of yaw wings) of the four wings that are disposed in a second predefined direction different from the first predefined direction steer the main body in the horizontal direction.

With this configuration, steering the four wings makes it possible to steer the traveling direction of the first flying body freely, and thus the first flying body can move stably.

Variation 3 of Embodiment 4

In the following, a method of controlling a flying body and basic configurations of the flying body and of flying system 2c according to the present variation are identical to the basic configurations described in Variation 2 of Embodiment 4 and so on. Therefore, the descriptions of the method of controlling a flying body and the basic configurations of the flying body and of flying system 2c according to the present variation will be omitted as appropriate.

Figure 49:
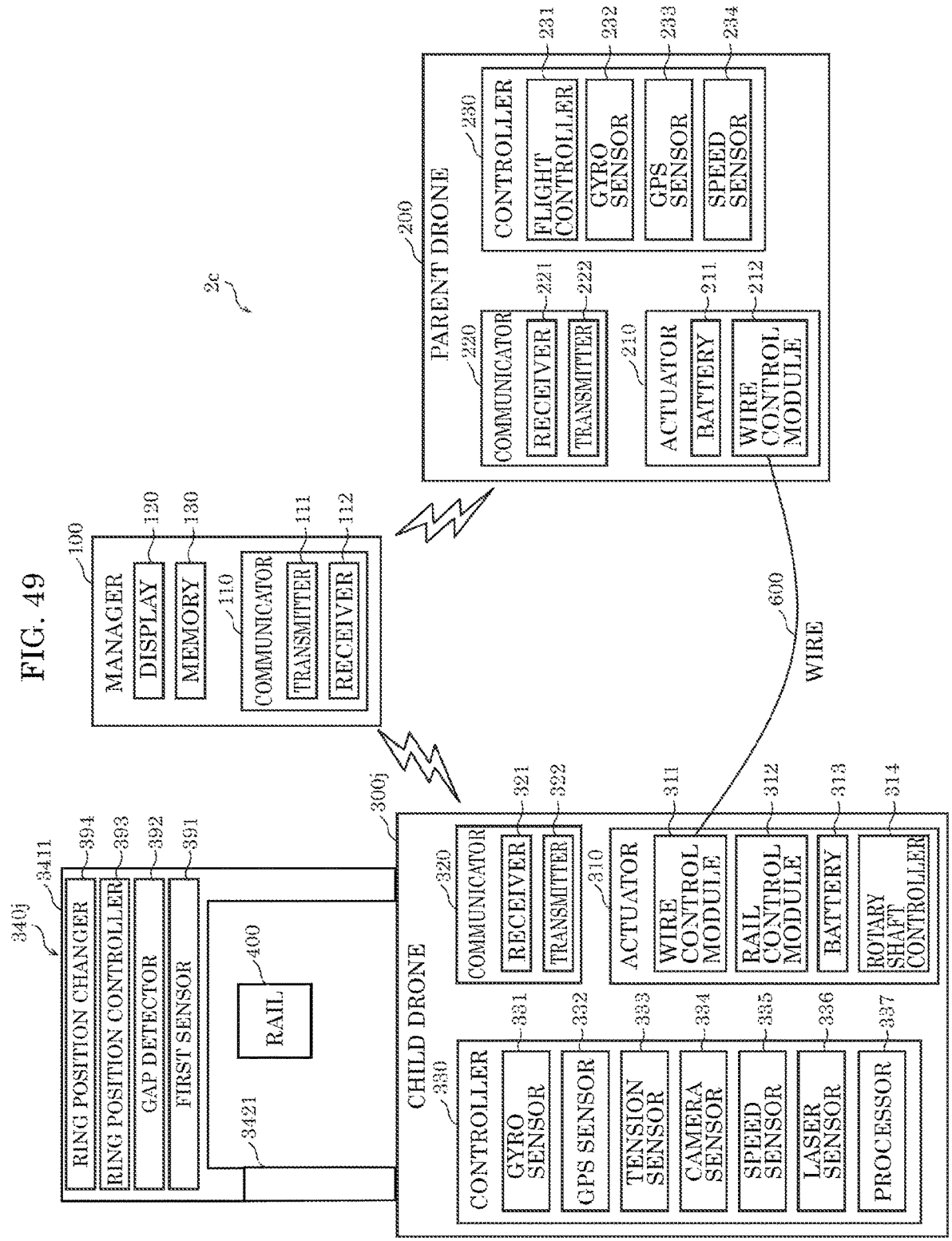
FIG. 49 is a block diagram illustrating a configuration of a flying system according to Variation 3 of Embodiment 4.
Figure 50:
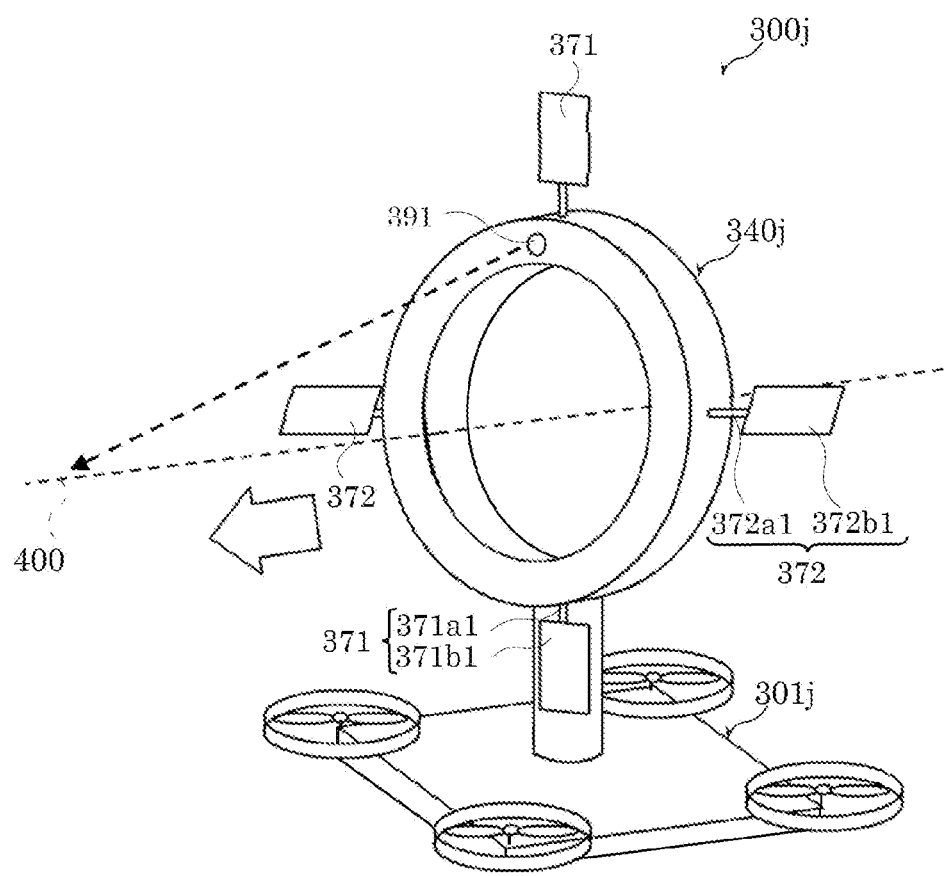
FIG. 50 is a schematic diagram illustrating an example of another child drone of the flying system according to Variation 3 of Embodiment 4.

FIG. 49 is a schematic diagram illustrating an example of another child drone 300j of flying system 2c according to Variation 3 of Embodiment 4. FIG. 50 is a schematic diagram illustrating an example of another child drone 300j of flying system 2c according to Variation 3 of Embodiment 4.

As illustrated in FIGS. 49 and 50, in the present variation, child drone 300j further includes first sensor 391, gap detector 392, ring position controller 393, and ring position changer 394. A pair of yaw wings 371, a pair of pitch wings 372, first sensor 391, gap detector 392, ring position controller 393, and ring position changer 394 are provided on arm 340j of child drone 300j.

The pair of yaw wings 371 are provided on an outer peripheral portion of arm 340j. The pair of yaw wings 371 are disposed on arm 340j so as to be symmetric in the vertical direction. Each of the pair of yaw wings 371 includes first shaft portion 371a1 having an axis extending in the vertical direction and first vane portion 371b1 that is pivotably supported by first shaft portion 371a1. Each first vane portion 371b1 rotates about an axis extending in the vertical direction.

The pair of pitch wings 372 are provided on an outer peripheral portion of arm 340j. The pair of pitch wings 372 are disposed on arm 340j so as to be symmetric in the horizontal direction. Each of the pair of pitch wings 372 includes second shaft portion 372a1 having an axis extending in the horizontal direction and second vane portion 372b1 pivotably supported by second shaft portion 372a1. Each second vane portion 372b1 rotates about an axis extending in the horizontal direction.

First sensor 391 captures an image of rail 400 and the ring when the ring is to be coupled to rail 400, for example. First sensor 391 outputs the captured image information to gap detector 392. In the present variation, first sensor 391 is a camera sensor and does not measure the distance directly. The position of first sensor 391 illustrated in FIG. 50 is merely an example. First sensor 391 may be disposed in a lower side, a left side, a right side, and so on of the ring. The number of first sensor 391 is not limited to one, and a plurality of first sensors 391 may be provided. For example, first sensor 391 may be provided at at least four positions including the upper side, the lower side, the left side, and the right side of the ring.

Gap detector 392 calculates a first distance between rail 400 and the ring based on the image information captured by first sensor 391. Gap detector 392 outputs distance information indicating the calculated first distance to ring position controller 393.

Ring position controller 393 controls ring position changer 394 based on the first distance such that the ring can be coupled to rail 400 appropriately. Ring position changer 394 is, for example, an electric motor.

Ring position changer 394 changes the attitude of arm 340j so that the ring can be coupled to rail 400 appropriately. Ring position changer 394 controls pitch wings 372 and so on such that the attitude of child drone main body 301j becomes inclined relative to the horizontal direction when child drone 300j flies with child drone main body 301j being coupled to rail 400. Specifically, ring position controller 393 controls the pivoting movement of second vane portion 372*b*1 of each of the pair of pitch wings 372 by actuating ring position changer 394. Ring position controller 393 controls yaw wings 371 and so on so that the attitude of child drone main body 301*j* becomes inclined relative to the vertical direction by actuating ring position changer 394. Specifically, ring position controller 393 controls the pivoting movement of second vane portion 372*b*1 of each of the pair of pitch wings 372 by actuating ring position changer 394.

In this example, ring position changer 394 may also be capable of extending or retracting arm 340*j* out of or into child drone main body 301*j*. In other words, ring position changer 394 may adjust the length of support portion 344.

With this configuration, steering the four wings makes it possible to steer the traveling direction of the flying body freely, and thus the flying body can move stably.

Variation 4 of Embodiment 4

In the following, a method of controlling a flying body and basic configurations of the flying body and of flying system 2*d* according to the present variation are identical to the basic configurations described in Embodiment 1 and so on. Therefore, the descriptions of the method of controlling a flying body and the basic configurations of the flying body and of flying system 2*d* according to the present variation will be omitted as appropriate.

Figure 51:
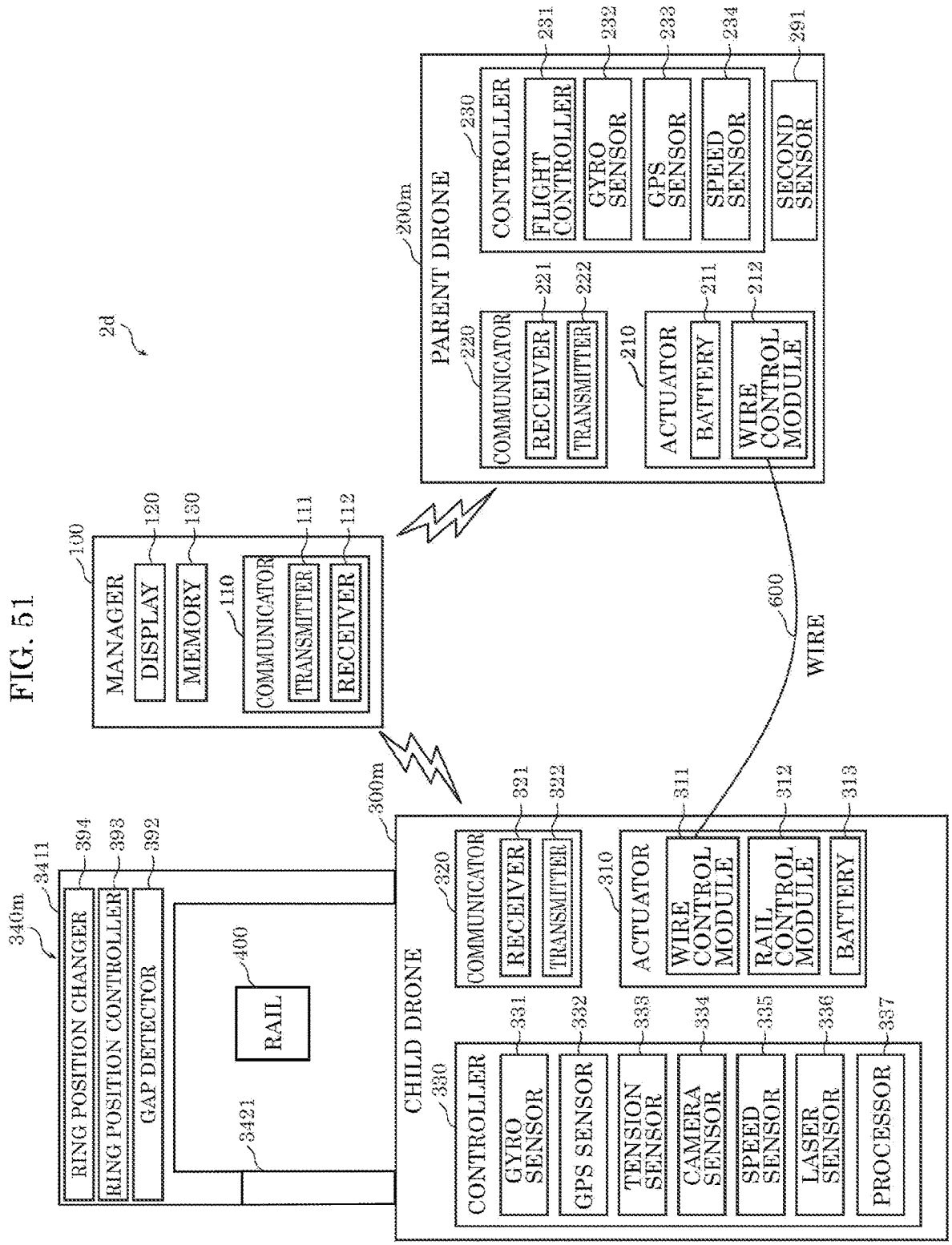
FIG. 51 is a block diagram illustrating a configuration of a flying system according to Variation 4 of Embodiment 4.

FIG. 51 is a block diagram illustrating a configuration of flying system 2*d* according to Variation 4 of Embodiment 4.

As illustrated in FIG. 51, in the present variation, arm 340*m* of child drone 300*m* does not include a first sensor. Instead, parent drone 200*m* may include second sensor 291. Second sensor 291 may have a configuration similar to that of the first sensor.

Second sensor 291 measures a second distance between rail 400 and the ring of arm 340*m*. Second sensor 291 may be provided on at least a left side portion or a right side portion of the ring of arm 340*m* with respect to the traveling direction of child drone 300*m*. Second sensor 291 transmits second distance information indicating the measured second distance to child drone 300*m* via communicator 220. Second sensor 291 may be similar to a gap detector.

Ring position controller 393 acquires the received second distance information. Ring position controller 393 controls parent drone 200*m* so as to move parent drone 200*m* to the right or the left with respect to the traveling direction of parent drone 200*m* in accordance with the second distance indicated by the second distance information. At this point, ring position controller 393 determines whether the second distance is greater than a predetermined value.

Specifically, if the second distance is greater than the predetermined value while second sensor 291 is provided in the left side portion of the ring with respect to the traveling direction or if the second distance is smaller than or equal to the predetermined value while second sensor 291 is provided in the right side portion of the ring with respect to the traveling direction, ring position controller 393 controls ring position changer 394 so as to move child drone 300*m* in the right direction with respect to the traveling direction. Specifically, ring position changer 394 rotates first vane portions 371*b*1 of yaw wings 371 to the right, and this operation causes arm 340*m* of child drone 300*m* to move in the right direction with respect to the traveling direction.

Specifically, if the second distance is smaller than or equal to the predetermined value while second sensor 291 is provided in the left side portion of the ring with respect to the traveling direction or if the second distance is greater than the predetermined value while second sensor 291 is provided in the right side portion of the ring with respect to the traveling direction, ring position controller 393 controls ring position changer 394 so as to move child drone 300*m* in the left direction with respect to the traveling direction. Specifically, ring position changer 394 rotates second vane portions 372*b*1 of pitch wings 372 to the left, and this operation causes arm 340*m* of child drone 300*m* to move in the left direction with respect to the traveling direction.

Although not illustrated in the drawings, arm 340*m* of child drone 300*m* may include the first arm and the second arm described above, and the opening of the first arm may be opened or closed by sliding and moving the second arm.

In the method of controlling a flying body according to the present variation as described above, the other flying body includes a second sensor that measures a second distance between the rail and the ring, and the flying body is moved to the right or the left with respect to the traveling direction in accordance with the second distance.

This configuration allows the flying body to move appropriately along the rail without the arm making contact with the rail when the flying body moves with the arm being coupled to the rail.

The flying body according to the present variation further includes a second sensor that measures a second distance between the rail and the ring. The second sensor is provided in a left side portion or a right side portion of the ring with respect to the traveling direction of the flying body.

In the method of controlling a flying body according to the present variation, the second sensor is provided in a left side portion of the ring with respect to the traveling direction of the flying body. The flying body is moved in the right direction with respect to the traveling direction if the second distance is greater than a predetermined value, or the flying body is moved in the left direction with respect to the traveling direction if the second distance is smaller than or equal to the predetermined value.

This configuration makes it possible to control the traveling of the flying body so as to secure a certain distance between the ring and rail and to keep the ring from making contact with the rail when the right side or the left side of the ring of the arm of the flying body comes too close to the rail. Therefore, the possibility that the ring makes contact with the rail while the flying body is flying is reduced.

In the method of controlling a flying body according to the present variation, the second sensor may be provided in the right side portion of the ring with respect to the traveling direction of the flying body. In this case, in the method of controlling a flying body, the flying body may be moved in the left direction with respect to the traveling direction if the second distance is greater than a predetermined value, or the flying body may be moved in the right direction with respect to the traveling direction if the second distance is smaller than or equal to the predetermined value.

Embodiment 5

In the following, a method of controlling a flying body and basic configurations of the flying body and of a flying system according to the present embodiment are identical to the basic configurations described in Embodiment 1 and so on. Therefore, the descriptions of the method of controlling a flying body and the basic configurations of the flying body and of the flying system according to the present embodiment will be omitted.

In the flying system according to the present embodiment, no parent drone is provided. The following description adopts the reference characters indicated in FIG. 53 described later. Child drone 3000 includes first extension arm 5340a and second extension arm 5340b.

First extension arm 5340a and second extension arm 5340b have similar configurations. First extension arm 5340a and second extension arm 5340b are connected to the child drone main body via wires 611a and 611b, respectively, and are capable of taking up or letting out wires 611a and 611b, respectively. Child drone 3000 includes wires 611a and 611b that connect, respectively, first extension arm 5340a and second extension arm 5340b to the child drone main body. Child drone 3000 further includes wire actuation controllers that control the lengths of respective wires 611a and 611b by taking up or letting out respective wires 611a and 611b.

The wire actuation controllers each have a configuration similar to the configuration of the wire control module. The wire actuation controllers adjust the lengths of wires 611a and 611b in accordance with the distance between child drone 3000 and the rail under the control of the processor.

Operations

Now, the method of controlling a flying body and operations of the flying body and of the flying system according to the present embodiment will be described.

Figure 52:
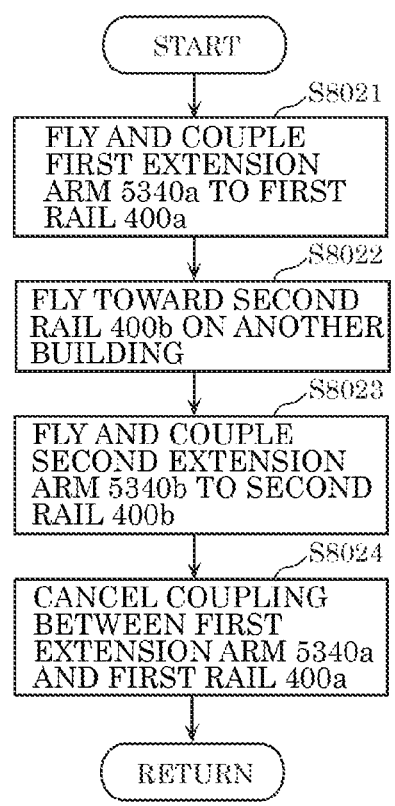
FIG. 52 is a flowchart illustrating an example of how a flying system operates along a route from a sender to a destination point of a receiver according to Embodiment 5.
Figure 53:
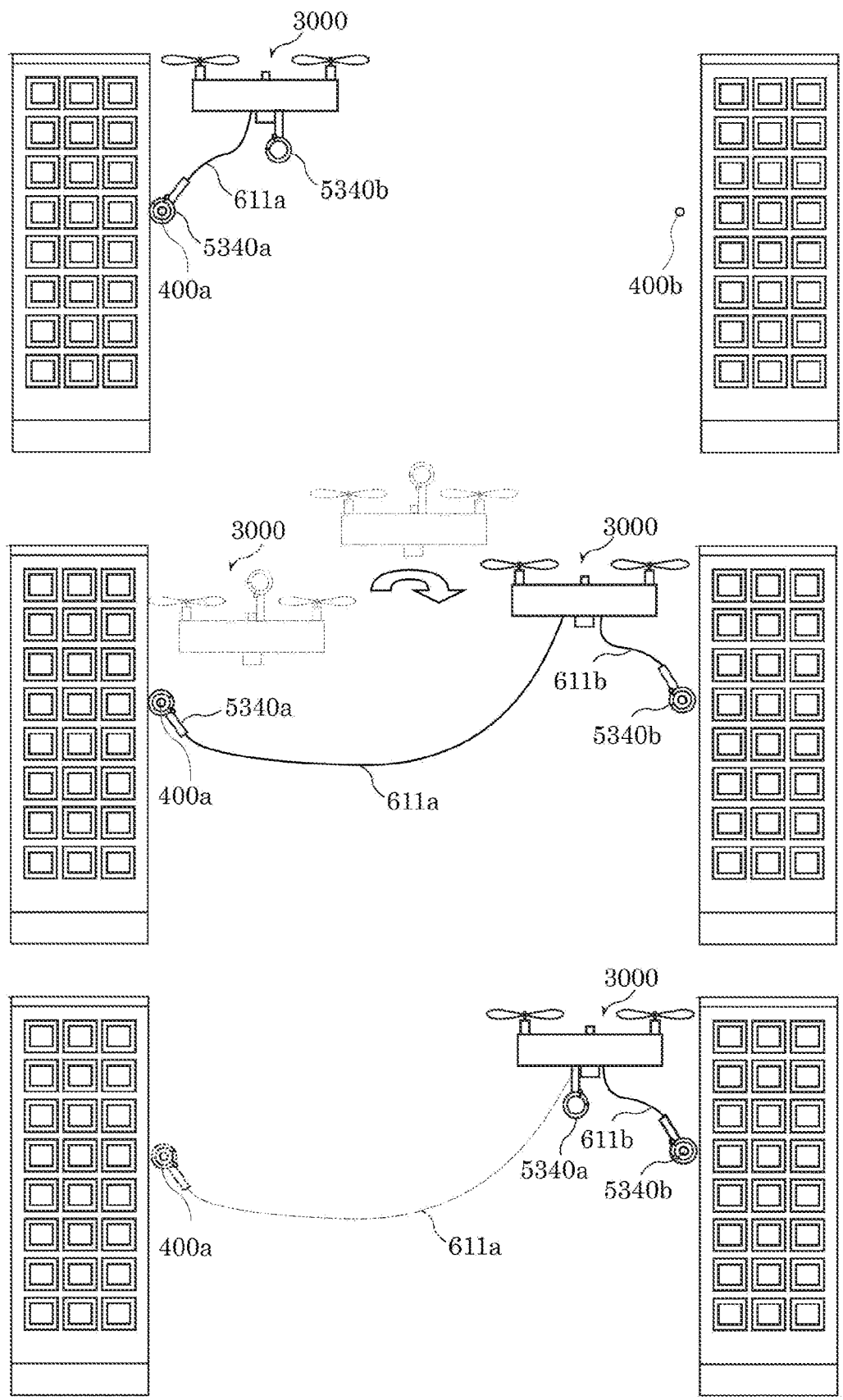
FIG. 53 is a schematic diagram illustrating an example of how the flying system operates along a route from a sender to a destination point of a receiver according to Embodiment 5.

FIG. 52 is a flowchart illustrating an example of how the flying system is operated along a route from a sender to a destination point of a receiver according to Embodiment 5. FIG. 53 is a schematic diagram illustrating an example of how the flying system operates along a route from a sender to a destination point of a receiver according to Embodiment 5.

The present embodiment assumes a case where a load is delivered from a sender to a receiver via first rail 400a installed on a building.

As illustrated in FIG. 52 and in (a) in FIG. 53, first, child drone 3000 flies toward first rail 400a installed on a building. Upon child drone 3000 approaching first rail 400a, child drone 3000 couples first extension arm 5340a to first rail 400a (S8021).

As illustrated in FIG. 52 and in (b) in FIG. 53, next, child drone 3000 flies toward second rail 400b on another building located in the vicinity of the building having first rail 400a to which first extension arm 5340a is coupled (S8022). At this point, child drone 3000 ascends once and flies toward second rail 400b on the other building so that wire 611a does not sag. Child drone 3000 flies toward second rail 400b on the other building with first extension arm 5340a being coupled to first rail 400a. At this point, the processor of child drone 3000 controls the wire control module so as to let out wire 611a connecting first extension arm 5340a and the child drone main body and thus adjusts the length of wire 611a. Then, upon child drone 3000 approaching second rail 400b on the other building, child drone 3000 couples second extension arm 5340b to second rail 400b (S8023).

Specifically, the processor actuates an electric motor so as to slide and move the second arm of second extension arm 5340b and opens the opening in the first arm. In this manner, child drone 3000 couples the arm to second rail 400b. Once the arm is coupled to second rail 400b, the processor stops the power supplied to the electric motor. This causes the second arm to close the opening in the first arm with the biasing force of the spring.

In this example, before child drone 3000 flies toward the other building, the processor of the controller may recognize, with a camera sensor or the like, the distance from the building to which first extension arm 5340a is currently coupled to the other building to which child drone 3000 is to couple second extension arm 5340b. Then, the processor of the controller may compare the sum total of the lengths of respective wires 611b of first extension arm 5340a and second extension arm 5340b against the distance to the other building and determine whether child drone 3000 can reach the other building.

As illustrated in FIG. 52 and in (c) in FIG. 53, next, child drone 3000 couples second extension arm 5340b to second rail 400b (e.g., child drone 3000 detects the coupling with the use of a first sensor or the like). Then, child drone 3000 ascends once so that wire 611b does not sag and then cancels the coupling between first extension arm 5340a and first rail 400a. The processor actuates the electric motor of first extension arm 5340a so as to slide and move the second arm to open the opening of the first arm (S8024). This causes first extension arm 5340a of child drone 3000 to become disengaged from first rail 400a. Once first extension arm 5340a becomes disengaged from first rail 400a, the processor causes the electric motor to stop the actuation force provided to the second arm of second extension arm 5340b. This causes the second arm to close the opening of the first arm with the biasing force of the spring.

In this manner, child drone 3000 moves from a sender to a receiver in accordance with a flying route as if child drone 3000 moves along a horizontal ladder by repeating steps S8021 to S8024.

Advantageous Effects

Now, some advantageous effects of the method of controlling a flying body and of the flying body according to the present embodiment will be described.

As described above, the method of controlling a flying body according to the present embodiment is a method of controlling a first flying body that flies in accordance with a flying route. The first flying body includes a main body that flies, a first extension arm having a ring through which a fixed first rail is to pass, a second extension arm having a ring through which a fixed second rail is to pass, a first wire to be coupled to the main body and to the first extension arm, and a second wire to be coupled to the main body and to the second extension arm. The method includes coupling the first extension arm to the first rail, causing the first flying body to fly toward the second rail while increasing the length of the first wire with the first extension arm being coupled to the first rail and coupling the second extension arm to the second rail, and canceling the coupling between the first extension arm and the first rail after the second extension arm has been coupled to the second rail.

With this configuration, since the first flying body is coupled to the first rail or the second rail, even if the first flying body has a mechanical failure, the possibility that the first flying body falls to the ground is reduced. Therefore, the above method of controlling a flying body provides high safety.

Embodiment 6

In the following, a method of controlling a flying body and basic configurations of the flying body and of a flying system according to the present embodiment are similar to the basic configurations described in Embodiment 1. Therefore, the descriptions of the method of controlling a flying body and the basic configurations of the flying body and of the flying system according to the present embodiment will be omitted as appropriate.

Parent drone 200 according to the present embodiment has a configuration similar to that of child drone 300. In other words, parent drone 200 also includes an arm, a processor that controls the arm, and so on.

Operations

Now, the method of controlling a flying body and operations of the flying body and of the flying system according to the present embodiment will be described.

Figure 54:
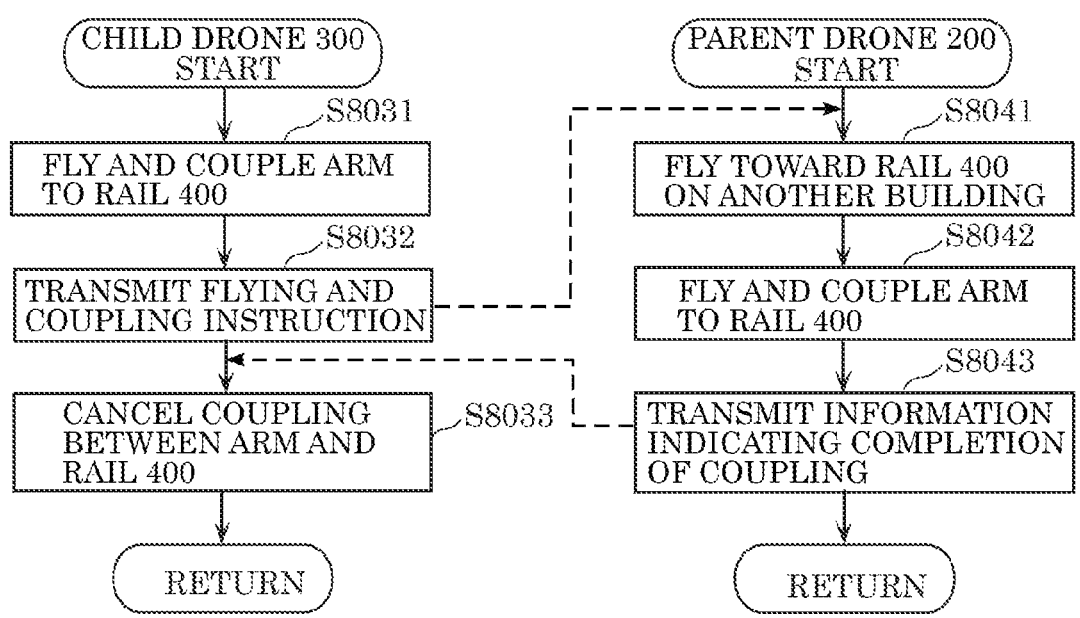
FIG. 54 is a flowchart illustrating an example of how a flying system operates along a route from a sender to a destination point of a receiver according to Embodiment 6.

FIG. 54 is a flowchart illustrating an example of how the flying system operates along a route from a sender to a destination point of a receiver according to Embodiment 6. A schematic diagram corresponding to FIG. 54 is similar to the schematic diagram illustrated in FIG. 53, and therefore the schematic diagram corresponding to FIG. 54 is omitted.

The present embodiment assumes a case where a load is delivered from a sender to a receiver via rail 400 installed on a building.

As illustrated in FIG. 54, first, child drone 300 and parent drone 200 fly toward rail 400 installed on a building. Upon child drone 300 approaching rail 400, child drone 300 couples the arm to rail 400 (S8031). Child drone 300 transmits a flying and coupling instruction to parent drone 200 (S8032).

Next, in response to receiving the flying and coupling instruction, parent drone 200 flies toward rail 400 on another building located in the vicinity of the building having rail 400 to which child drone 300 is connected (S8041). With child drone 300 being coupled to rail 400 on the building, parent drone 200 flies away from child drone 300 and toward the other building. At this point, the processor of child drone 300 controls the wire control module so as to let out a wire. Then, upon approaching rail 400, parent drone 200 couples its arm to rail 400 (S8042).

Specifically, the processor actuates an electric motor so as to slide and move the second arm to open the opening of the first arm. Thus, child drone 300 couples its arm to rail 400. Once the arm is coupled to rail 400, the processor stops the power supplied to the electric motor. This causes second arm to close the opening of the first arm with the biasing force of the spring.

In this example, before parent drone 200 flies toward the other building, the processor of the controller may recognize, with a camera sensor or the like, the distance from the building to which child drone 300 is currently coupled to the other building to which parent drone 200 is going to couple itself. Then, the processor of the controller may compare the length of rail 400 against the distance to the other building and determine whether parent drone 200 can reach the other building.

Next, upon the arm of parent drone 200 being coupled to rail 400, parent drone 200 transmits information indicating completion of coupling to child drone 300 (S8043).

Next, upon child drone 300 receiving the information indicating the completion of coupling, the processor of child drone 300 cancels the coupling between the arm and rail 400 (S8033). The processor actuates the electric motor so as to slide and move the second arm to opens the opening of the first arm. This causes child drone 300 to become disengaged from rail 400. Once the arm becomes disengaged from rail 400, the processor causes the electric motor to stop the actuation force provided to the second arm of the arm. This causes the second arm to closes the opening of the first arm with the biasing force of the spring.

In this manner, parent drone 200 and child drone 300 move from a sender to a receiver by repeating, respectively, steps S8031 to S8033 and steps S8041 to S8043.

Advantageous Effects

Now, some advantageous effects of the method of controlling a flying body and of the flying body according to the present embodiment will be described.

As described above, the method of controlling a flying body according to the present embodiment is a method of controlling a flying body by controlling a first flying body and a second flying body coupled to the first flying body via a coupling line, and the first flying body and the second flying body fly in accordance with a flying route. The first flying body and the second flying body each include an arm having a ring through which a fixed rail is to pass. The method includes coupling the first flying body to the rail, causing the second flying body to fly toward another rail while increasing the length of the coupling line and coupling the arm of the second flying body to the other rail after the first flying body has coupled itself to the rail, and canceling the coupling between the arm of the first flying body and the rail after the second flying body has coupled its arm to the other rail.

With this configuration, since at least one of the first flying body or the second flying body is coupled to a rail, even if the first flying body or the second flying body has a mechanical failure, the possibility that the first flying body or the second flying body falls to the ground is reduced. The first flying body and the second flying body move along the flying route as if they move along a horizontal ladder. Therefore, the above method of controlling a flying body provides high safety.

Embodiment 7

In the following, basic configurations of drone 701 and of delivery system 3*a* according to the present embodiment are identical to the basic configurations of the drones and of the flying systems according to Embodiment 1 and so on. Therefore, the descriptions of the basic configurations of drone 701 and of delivery system 3*a* according to the present embodiment are omitted as appropriate, and mainly the differences from Embodiment 1 and so on will be described.

Figure 55:
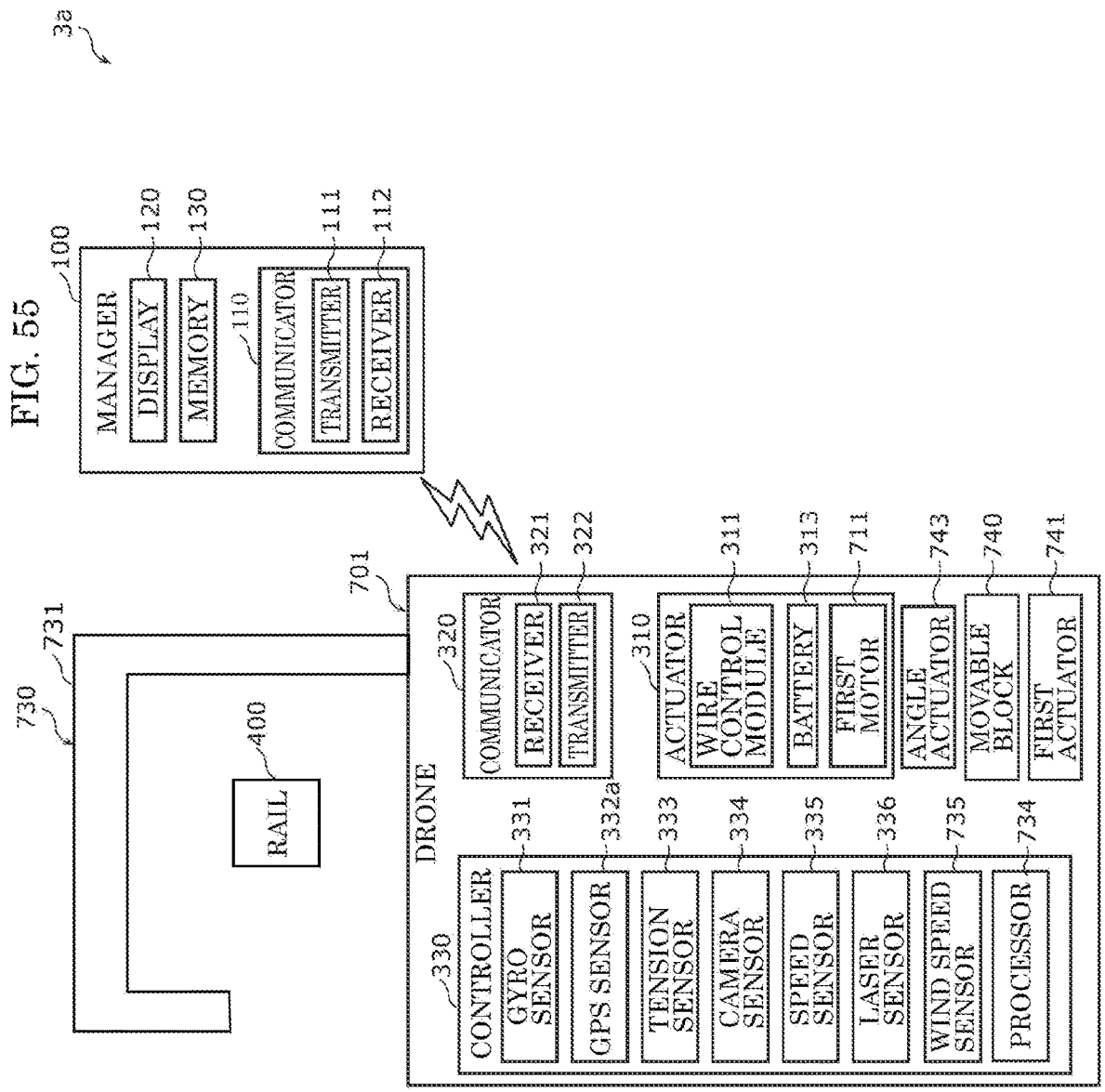
FIG. 55 is a block diagram illustrating a configuration of a delivery system according to Embodiment 7.
Figure 56:
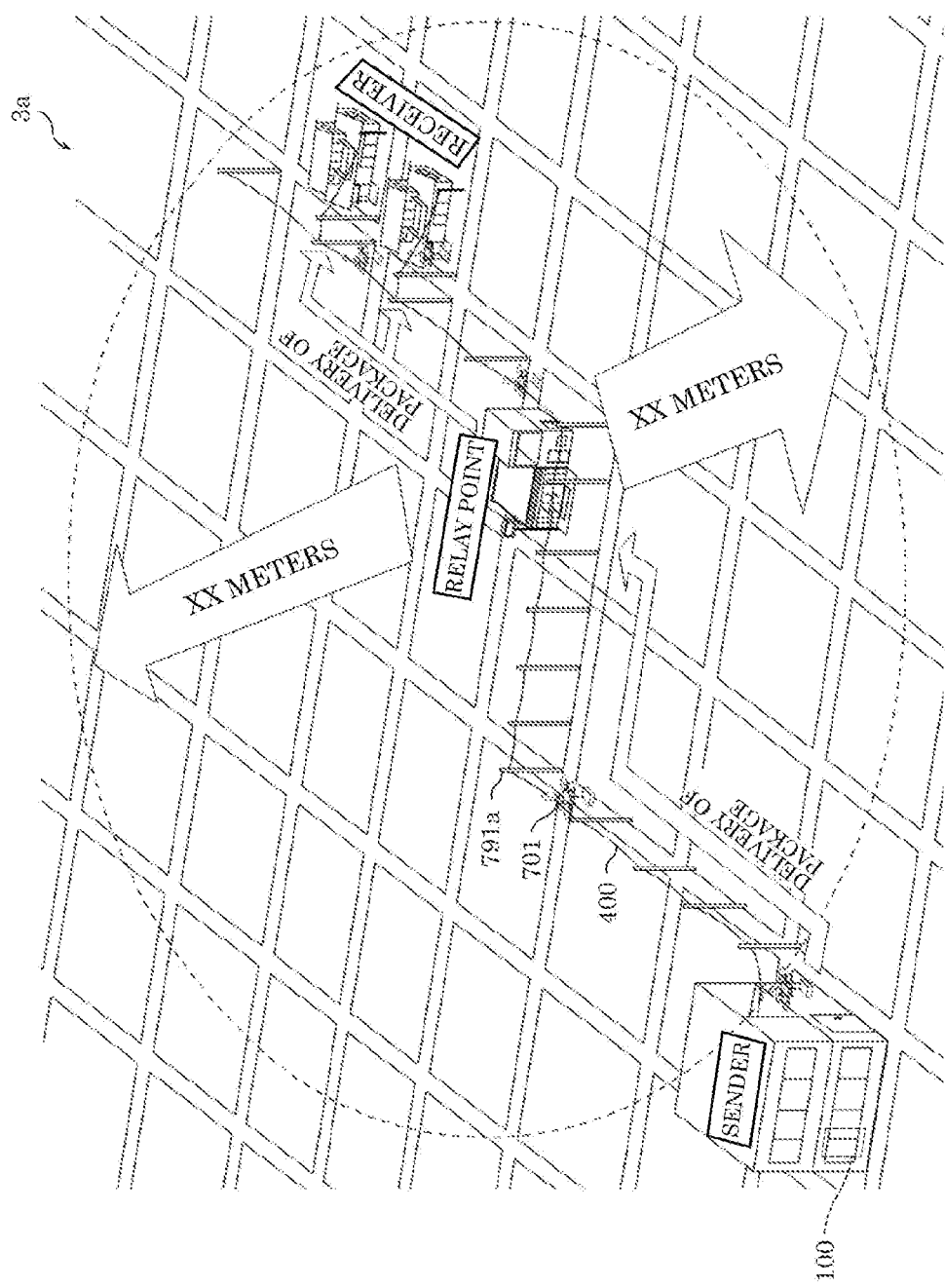
FIG. 56 is an image diagram illustrating an example of how a drone of the delivery system delivers a package from a sender to a receiver according to Embodiment 7.

FIG. 55 is a block diagram illustrating a configuration of delivery system 3*a* according to Embodiment 7. FIG. 56 is an image diagram illustrating an example of how drone 701 of delivery system 3*a* delivers a package from a sender to a receiver according to Embodiment 7.

As illustrated in FIGS. 55 and 56, delivery system 3*a* includes drone 701, manager 100, a plurality of support pillars 791*a*, and rail 400.

Delivery system 3*a* is a system capable of delivering a package, serving as a load, from a sender to a receiver with the use of drone 701. Drone 701 is an example of an unmanned aerial vehicle.

In the present embodiment, a sender is a distribution center, which is, for example but not limited to, a facility of a deliver service agent or a convenience store serving as a relay point. A receiver is a party that receives a package, that is, a party to which a package is to be delivered. A receiver is, for example but not limited to, a home or a convenience store serving as a relay point. A relay point is, but is not limited to, a convenience store or a facility attached to a convenience store.

In one example, in a case where a sender is a distribution center, mid-sized drone 701 is used to deliver a large number of packages from the distribution center to a relay point, and small-sized drone 701 is used from the relay point to a home serving as a receiver. In this case, mid-sized drone 701 delivers a large number of packages from the distribution center to the relay point, and small-sized drone 701 is used to deliver the packages from the relay point to individual homes.

Delivery system 3a according to the present embodiment may mainly make short-distance deliveries. For example, a short distance refers to a distance of about several hundred meters from a sender to a receiver. Drone 701 moves within a range in the radius of several hundred meters from a sender. In the present embodiment, the range is within a radius of less than or equal to about 500 or within a radius of less than or equal to about 1,000 meters. In the present embodiment, an assumption is that the range is within a radius of about 400 meters.

Configuration of Drone 701

Drone 701 of delivery system 3a acquires, from manager 100 of a sender, route information indicating a flying route from the sender to a receiver indicated in map data. Drone 701 delivers a loaded package from the sender to the receiver in accordance with the route information acquired from manager 100.

Figure 57:
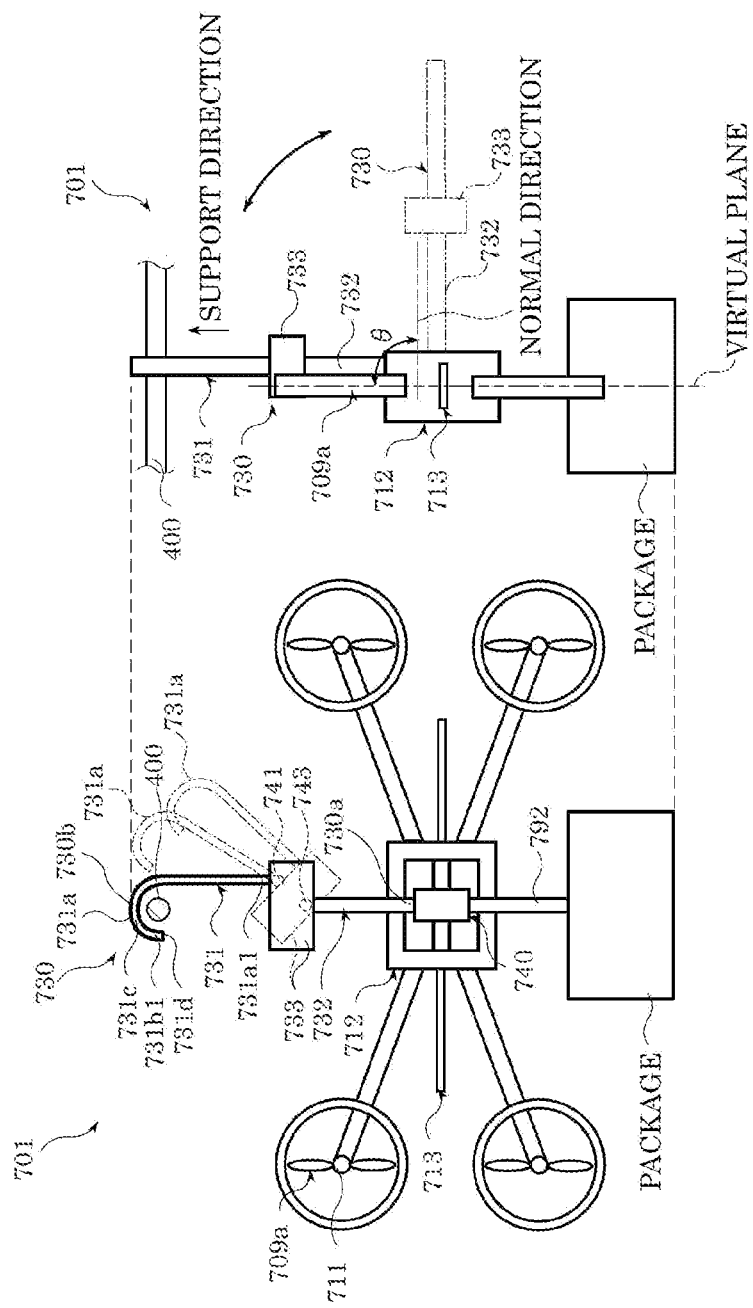
FIG. 57 illustrates a front view and a side view of an example of a drone of the delivery system according to Embodiment 7.

FIG. 57 illustrates a front view and a side view of an example of drone 701 of delivery system 3a according to Embodiment 7. Specifically, FIG. 57 illustrates a front view and a side view of drone 701 having an attitude that puts a direction in which connector 730 extends to be substantially orthogonal to a normal direction of an virtual plane.

As illustrated in FIGS. 55 and 57, drone 701 includes a plurality of propellers 709a, a plurality of first motors 711, main body 712, a pair of wings 713, connector 730, movable block 740, and controller 330.

The plurality of first motors 711 are provided for respective propellers 709a. The plurality of propellers 709a rotate about the rotary shafts of respective first motors 711 as each first motor 711 is rotationally driven, and this provides a propulsive force to main body 712 of drone 701. Propellers 709a are each an example of a rotary wing. The plurality of propellers 709a are fixed to main body 712. In the present embodiment, main body 712 has a rectangular shape as viewed in a plan view. Therefore, the plurality of propellers 709a are disposed at the respective corner portions of main body 712.

The plurality of first motors 711 are electric motors that rotate respective propellers 709a. Each first motor 711 is actuated and controlled by processor 734 of controller 330.

Main body 712 is the main body of drone 701 that supports the plurality of first motors 711, the plurality of propellers 709a, the pair of wings 713, connector 730, and so on. Main body 712 houses controller 330, communicator 320, actuator 310, and so on.

The pair of wings 713 are provided on an outer peripheral portion of main body 712. The pair of wings 713 function as the pair of yaw wings or the pair of pitch wings described above. In this example, the pair of yaw wings and the pair of pitch wings described above may be provided on an outer peripheral portion of main body 712.

Connector 730 can be connected to rail 400 located at a position spaced apart from the ground surface with main body 712 hanging from connector 730. Connector 730 is an elongated supporting and connecting member that extends in a direction (a vertically upward direction) away from main body 712.

Connector 730 includes first end 730a and second end 730b.

First end 730a is the end of connector 730 that faces main body 712. First end 730a is swingably supported by main body 712 and is connected to main body 712. Second end 730b is the end opposite to first end 730a. Second end 730b can be slidably connected to rail 400.

Connector 730 includes first arm 731, support portion 732, base 733, angle actuator 743, and first actuator 741.

First arm 731 is connected to one end of support portion 732. First arm 731 according to the present embodiment is connected to support portion 732 via base 733. First arm 731 is a hanger for hanging drone 701 from rail 400.

First arm 731 includes first hook 731a.

First hook 731a extends from first connected end 731a1 connected to first actuator 741 to first open end 731b1 on the other end. First hook 731a includes first bent portion 731c that is bent in a first direction and that is located between first connected end 731a1 and first open end 731b1. First hook 731a has, for example but not limited to, a substantially C-like shape, a substantially F-like shape, a substantially J-like shape, or a substantially U-like shape in which a part of the ring-shaped outer shell portion is missing as viewed in the traveling direction of drone 701. The portion cut out from the outer shell portion constitutes opening 731d of first hook 731a through which rail 400 can enter the space enclosed by first hook 731a. Opening 731d lies between first open end 731b1 and first connected end 731a1. First hook 731a corresponds to second end 730b of connector 730. In this example, first hook 731a may be provided with a wheel that allows first hook 731a to make contact with and freely rotate on rail 400 as described above.

One end of support portion 732 is swingably connected to main body 712, and the other end of support portion 732 is connected to first arm 731 via base 733. Thus, support portion 732 supports first arm 731 on main body 712. In the present embodiment, support portion 732 swings ±90 degrees relative to the attitude that is upright with respect to main body 712. Support portion 732 is an elongated support pillar that extends in a direction away from main body 712. The portion where support portion 732 and main body 712 are connected to each other corresponds to first end 730a.

Base 733 is where support portion 732 and first arm 731 are connected to each other. Base 733 is a support member that is disposed between support portion 732 and first arm 731 and that supports first arm 731. Base 733 is connected to first connected end 731a1 of first arm 731 and the other end of support portion 732. Angle actuator 743 is provided in base 733.

Angle actuator 743 can cause base 733 to swing relative to support portion 732 by changing the angle of base 733 relative to the direction in which support portion 732 extends (or relative to main body 712). Angle actuator 743 is an example of a third actuator.

First actuator 741 sets the angle of first hook 731a relative to support portion 732. First actuator 741 is disposed between support portion 732 and first hook 731a and swingably supports first connected end 731a1 of first hook 731a. In the present embodiment, first actuator 741 is disposed in base 733.

In this example, connector 730 may be the arm according to any one of Embodiments 1 to 6 and their variations described above, and it is needless to say that these arms can be applied to drone 701 according to the present embodiment. For example, first arm 731 may include an opening and closing member that opens or closes opening 731d. With this configuration, after first arm 731 has become connected to rail 400, opening 731d may be closed so that first arm 731 does not become disengaged from rail 400.

Movable block 740 sets the inclination of the virtual plane that contains the plurality of propellers 709a relative to the support direction in which connector 730 is supported on rail

400. Movable block 740 may be an actuator that can actively change the inclination in response to an instruction from processor 734. Alternatively, movable block 740 may be a rotatable member that can passively change the inclination by utilizing the rotary force exerted on main body 712 that is produced due to the difference among the rotation rates of the plurality of first motors 711. Movable block 740 is disposed between main body 712 and connector 730. Alternatively, movable block 740 may be housed in main body 712. The support direction is the direction that extends from first end 730a toward second end 730b of connector 730 and is also the direction in which support portion 732 extends.

Movable block 740 can control the attitude of support portion 732 with respect to main body 712 by causing the one end of support portion 732 supported on main body 712 to swing about an axis of movable block 740. In this example, the virtual plane is substantially parallel to the horizontal direction when main body 712 has the horizontal attitude and is substantially parallel to the vertical direction when main body 712 has the upright attitude.

Controller 330 includes wind speed sensor 735 in addition to camera sensor 334, processor 734, and so on.

Wind speed sensor 735 is a sensor that detects the wind speed in the surroundings of drone 701. Wind speed sensor 735 mainly detects the wind speed in the surroundings of drone 701 while drone 701 is hovering. To be more specific, wind speed sensor 735 detects the wind speed in the surroundings of drone 701 when wire control module 311 lets out hanging wire 792 for hanging a package under the control of processor 734. Wind speed sensor 735 outputs, to processor 734, wind speed information indicating the wind speed in the surroundings of drone 701. Wire control module 311 is an example of a lift motor.

Controller 330 includes camera sensor 334. Camera sensor 334 is provided on main body 712 and can capture an image of a package and a delivery box from the above. Camera sensor 334 captures an image of a package and a delivery box and outputs image information including the captured image to processor 734. For example, the image information includes information indicating, for example but not limited to, the relative positions of (i.e., the distance between) the package and the delivery box, the distance from main body 712 to the package, the distance from main body 712 to the delivery box, and the height of an opening in the delivery box from the ground surface. Camera sensor 334 may be, for example but not limited to, a time-of-flight (TOF) camera or a range finding sensor. The delivery box is an example of a storage device.

Controller 330 includes processor 734. Processor 734 is a control device that controls the plurality of first motors 711, movable block 740, first actuator 741, and so on. Processor 734 is provided in controller 330. Alternatively, processor 734 may be a device separate from controller 330, and the present embodiment is not limiting. Processor 734 is an example of a control circuit.

When connector 730 is to be connected to rail 400, processor 734 recognizes rail 400 indicated in the image information acquired from camera sensor 334 or the like and then connects connector 730 to rail 400.

When connector 730 is to be disengaged from rail 400, processor 734 actuates first actuator 741 so as to tilt connector 730 relative to the normal direction of the virtual plane. Processor 734 controls first actuator 741 so as to increase the angle of the direction in which connector 730 extends relative to the normal direction, and this causes connector 730 to become disengaged from rail 400. Processor 734 can change the angle of base 733 relative to the direction in which support portion 732 extends by controlling angle actuator 743. Thus, processor 734 can raise first hook 731a, cause first hook 731a to swing, and disengage first hook 731a from rail 400. In this example, processor 734 may disengage connector 730 from rail 400 by controlling first actuator 741, movable block 740, and so on. Processor 734 may disengage connector 730 from rail 400 by causing drone 701 to swing or by changing the flying altitude of drone 701.

When first hook 731a of connector 730 is connected to rail 400, processor 734 (i) sets the rotation rate of the plurality of first motors 711 to the rotation rate that is lower than the minimum rotation rate necessary for causing drone 701 to float and that is higher than the minimum rotation rate necessary for propelling drone 701 in the direction in which rail 400 extends and (ii) causes movable block 740 to increase angle θ formed by the normal direction of the virtual plane relative to the support direction of connector 730.

In (i), processor 734 controls the rotation rate of each first motor 711 while maintaining an appropriate speed that allows drone 701 to move along rail 400. For example, processor 734 controls the movement of drone 701 while keeping connector 730 from making contact with rail 400. Processor 734 adjusts the speed of drone 701 or adjusts the distance between rail 400 and first hook 731a by adjusting this angle θ. In (ii), the attitude of drone 701 approaches the upright attitude as processor 734 increases angle θ, which in turn increases the propulsive power of drone 701. Hence, the speed of drone 701 increases.

For example, in (ii), processor 734 controls the rotation rate of the plurality of first motors 711 so as to set angle θ to greater than 15 degrees, greater than 45 degrees, greater than 65 degrees, or greater than 80 degrees.

The operation in (i) may be executed before or after the operation in (ii). Alternatively, at least a part of each of the operations may be executed in parallel.

Processor 734 disengages connector 730 from rail 400 if the speed of drone 701 provided by the propelling force exceeds a predetermined value after angle θ has been increased by first actuator 741. In other words, if processor 734 is to raise the speed of drone 701 higher than the predetermined value, processor 734 disengages connector 730 from rail 400, increases the rotation rate of the plurality of first motors 711, and raises the speed of drone 701. Processor 734 determines whether the speed is higher than the predetermined value by acquiring the speed information from speed sensor 335.

If connector 730 has been disengaged from rail 400, processor 734 causes movable block 740 to reduce angle θ and controls the rotation rate of the plurality of first motors 711 so as to achieve a rotation rate that is higher than the minimum rotation rate necessary for causing drone 701 to float. For example, processor 734 increases the rotation rate of the plurality of first motors 711 and thus raises the speed or the flying altitude of drone 701.

While processor 734 is letting out hanging wire 792, processor 734 adjusts (corrects) the position of drone 701 in accordance with the position of the package relative to the delivery box. Specifically, upon acquiring the wind speed information from wind speed sensor 735 and the image information, processor 734 recognizes, for example but not limited to, the relative positions of (the distance between) the delivery box and the package indicated in the image information and the orientation of the opening of the delivery box relative to the package. For example, when the position of the package is displaced in a third direction from the position vertically above the delivery box, processor 734 moves drone 701 in a fourth direction opposite the third direction along the direction in which rail 400 extends. In this manner, processor 734 corrects the position of drone 701.

Operations

Next, operations of drone 701 and delivery system 3*a* according to the present embodiment will be described. With regard to these operations, operations performed from when hanging wire 792 is let out upon drone 701 reaching a destination point to when a package serving as a load is cut off will be described.

Figure 58:
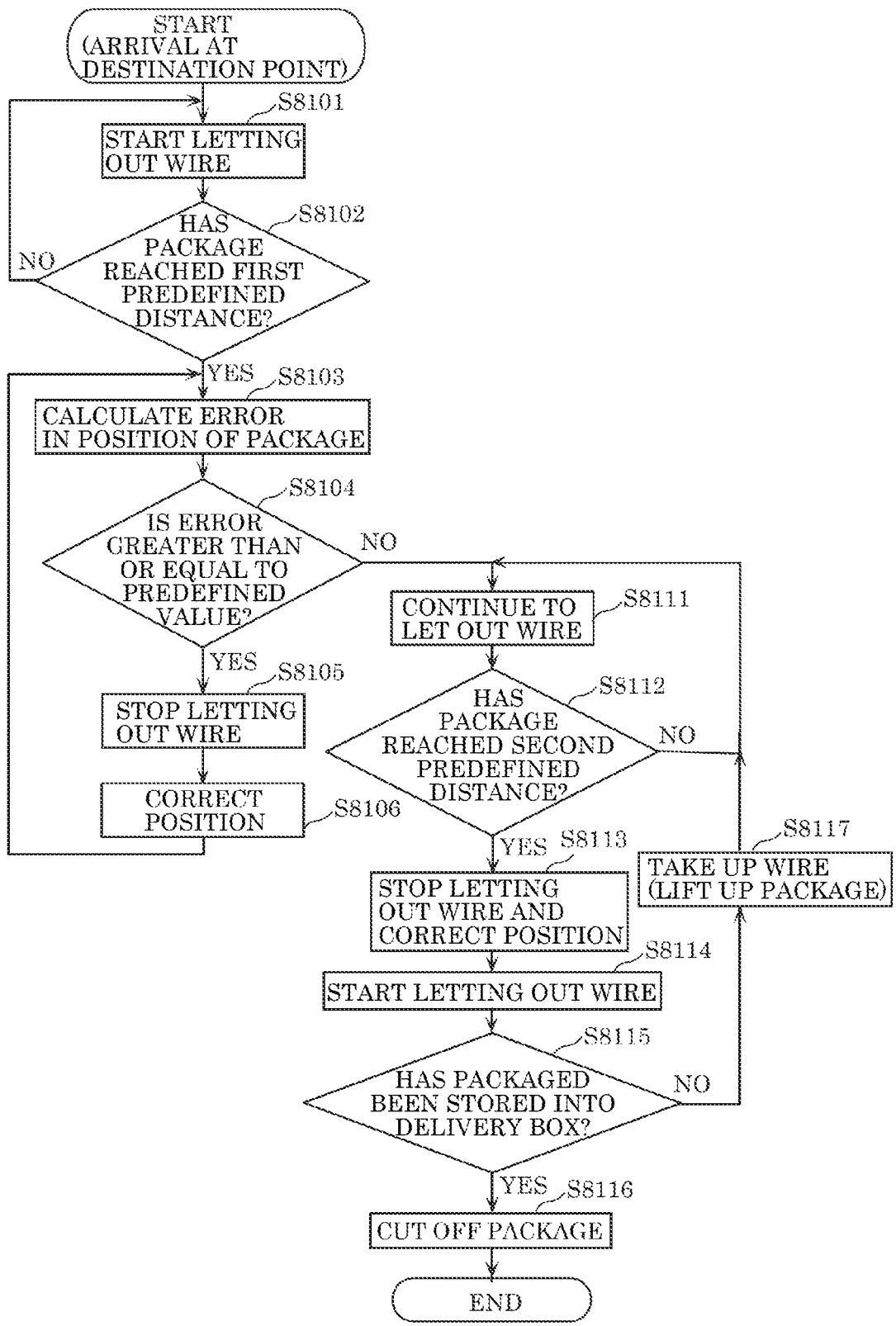
FIG. 58 is a flowchart illustrating an example of an operation of the delivery system according to Embodiment 7.

FIG. 58 is a flowchart illustrating an example of an operation of delivery system 3*a* according to Embodiment 7.

As illustrated in FIGS. 55 to 58, first, with connector 730 being connected to rail 400, drone 701 arrives at (is positioned at) a position vertically above a delivery box serving as a receiver. Then, processor 734 controls wire control module 311 so as to start letting out hanging wire 792 (S8101). Thus, the package is lowered. At this point, processor 734 acquires image information from camera sensor 334 and calculates the distance between the package and the delivery box.

Next, processor 734 determines whether the distance between the package and the delivery box has reached a first predefined distance (S8102). The first predefined distance is, for example but not limited to, one half or one third of the distance from main body 712 to the delivery box. The first predefined distance may be such a distance that allows processor 734 to calculate an error in the position of the package relative to the delivery box. Therefore, the first predefined distance is not limited to one half, one third, or the like of the distance from main body 712 to the delivery box. In this example, processor 734 may control wire control module 311 so as to lower the package at a first speed at which hanging wire 792 is let out at a high speed. Processor 734 may lower the package at the first speed for a period from when hanging wire 792 starts being let out to when the package reaches the first predefined distance.

Whether the distance between the package and the delivery box has reached the first predefined distance can be determined by calculating the first predefined distance based on the image information acquired from camera sensor 334 or based on the length of hanging wire 792 that has been let out, for example.

If processor 734 determines that the distance between the package and the delivery box has not reached the first predefined distance (NO in S8102), the flow returns to the process in step S8101.

If processor 734 determines that the distance between the package and the delivery box has reached the first predefined distance (YES in S8102), processor 734 measures the positions of the package and the delivery box based on the image information acquired from camera sensor 334 and calculates an error in the position (positional mismatch) of the package relative to the delivery box. At this point, processor 734 calculates an error between the opening of the delivery box and the package as the package and the delivery box are viewed from the above. In this example, an error means a positional mismatch of the package along the X-axis, along the Y-axis, and in the roll angle with respect to the XY-plane that is based on the longitudinal direction and the lateral direction of the opening of the delivery box.

If the determination is YES in step S8102, processor 734 may control wire control module 311 so as to lower the package at a second speed at which hanging wire 792 is let out at a low speed. Processor 734 may lower the package at the first speed when hanging wire 792 first starts being let out and may then lower the package at the second speed after the package has reached the first predefined distance. The second speed is lower than the first speed.

Next, processor 734 determines whether the error is greater than or equal to a predefined value. When the error is large, the package may be spaced apart from the delivery box due to their positional mismatch, and the package may not be stored into the delivery box. The predefined value serves as an index for determining whether the package can be stored into the delivery box through its opening.

If processor 734 determines that the error is greater than or equal to the predefined value (YES in S8104), processor 734 controls wire control module 311 so as to stop letting out hanging wire 792 (S8105).

Processor 734 corrects the position of the package (corrects the error) so that the package overlaps the opening of the delivery box, that is, the package is contained within the opening of the delivery box. Specifically, processor 734 controls the plurality of first motors 711 based on the image information and moves drone 701 so as to correct the position of the package relative to the opening of the delivery box (S8106). Then, processor 734 returns to the process in step S8103. In this manner, the position of the package relative to the opening of the delivery box is corrected repeatedly.

Now, an example of how the position of a package relative to the opening of the delivery box is corrected will be described.

Figure 59:
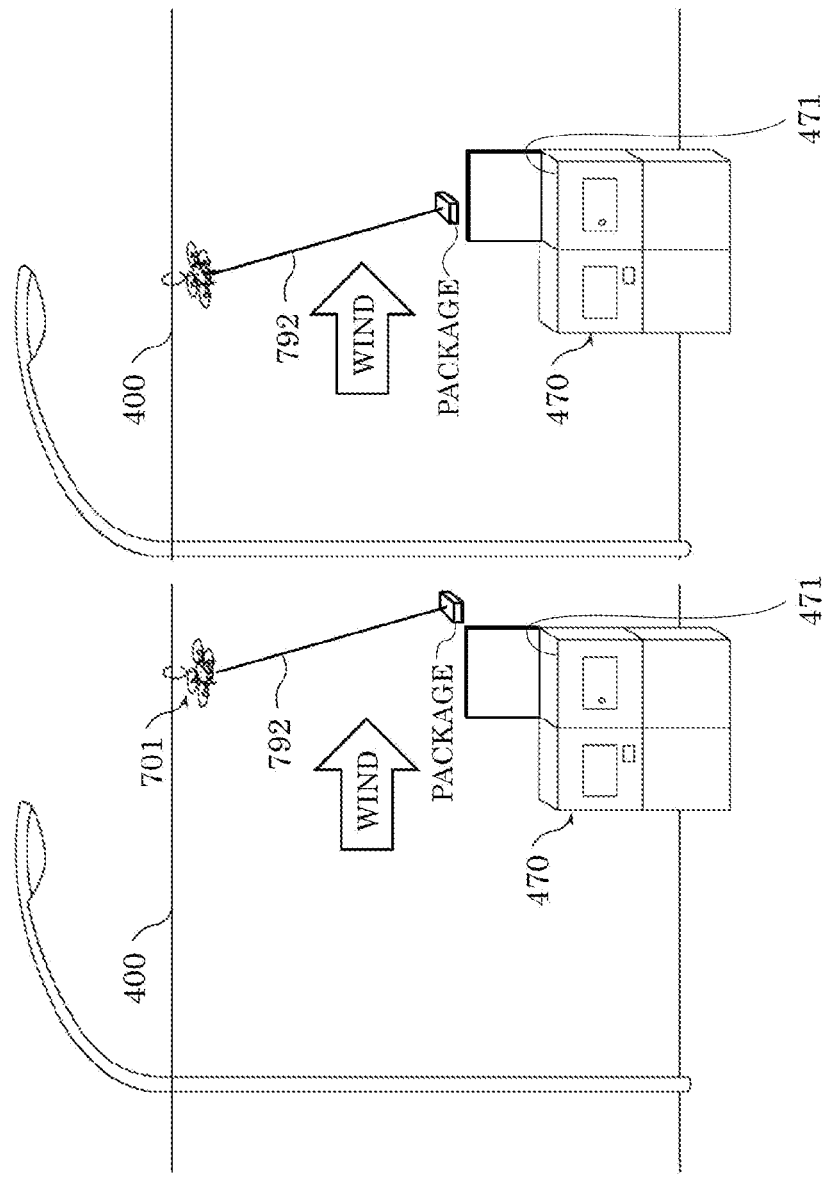
FIG. 59 is a schematic diagram illustrating an example of how the position of a package relative to an opening of a delivery box is corrected when the package is pushed in a third direction by the wind.

FIG. 59 is a schematic diagram illustrating an example of how the position of a package relative to opening 471 of delivery box 470 is corrected when the package has been pushed in a third direction by the wind. In FIG. 59, (a) illustrates a state in which drone 701 has moved to the position vertically above delivery box 470, lets out hanging wire 792, and lowers the package. In (a) in FIG. 59, the wind blows in the direction indicated by the arrow (an example of the third direction), and drone 701 is being displaced downwind from the position vertically above delivery box 470. Therefore, in the state illustrated in (b) in FIG. 59, drone 701 has moved upwind (an example of a fourth direction).

Figure 60:
FIG. 60 is a schematic diagram illustrating another example of how the position of a package relative to an opening of a delivery box is corrected when the package is pushed in the third direction by the wind.

FIG. 60 is a schematic diagram illustrating another example of how the position of a package relative to opening 471 of delivery box 470 is corrected when the package has been pushed by the wind in the direction indicated by the arrow (an example of the third direction). In FIG. 60, (a) illustrates a state in which no wind is blowing. In this case, the package can be stored into delivery box 470 without making any correction. FIG. 60, (b) and (d) each illustrate a state in which the wind blows in the direction indicated by the arrow and the position of the package has moved (shifted) downwind (an example of a fifth direction) from the position vertically above opening 471 of delivery box 470. In (c) and (e) in FIG. 60, processor 734 tilts the attitude of main body 712, that is, causes main body 712 to swing in the direction of the arrow by controlling the plurality of first motors 711 and movable block 740, and thus processor 734 moves the package coupled to hanging wire 792 upwind (an example of a sixth direction). Specifically, processor 734 controls the plurality of first motors 711 and movable block 740 and tilts the attitude of main body 712 upwind so that the position of the package is moved upwind. When the package is displaced in the fifth direction from the position vertically above delivery box 470, processor 734 causes drone 701 to swing about rail 400 and moves the center of gravity of drone 701 in the sixth direction opposite the fifth direction.

In this manner, processor 734 causes drone 701 to move or swing by controlling the plurality of first motors 711 and movable block 740 based on the image information and thus corrects the position of the package relative to opening 471 of delivery box 470.

In this example, processor 734 may correct the position of the package relative to opening 471 of delivery box 470 while processor 734 continues to let out hanging wire 792. In this case, step S8105 may be omitted. When processor 734 corrects the position of the package relative to opening 471 of delivery box 470, processor 734 may control wire control module 311 so as to set the speed at which hanging wire 792 is let out to a third speed lower than the second speed.

If processor 734 determines that the error is smaller than the predefined value (NO in S8104), processor 734 continues to let out hanging wire 792 (S8111).

Next, processor 734 determines whether the distance between the package and delivery box 470 has reached a second predefined distance shorter than the first predefined distance (S8112). The second predefined distance is, for example but not limited to, one fifth, one tenth, or less than one tenth of the distance from main body 712 to delivery box 470. In this example, processor 734 may control wire control module 311 so as to lower the package at the second speed or the third speed at which hanging wire 792 is let out. Processor 734 may lower the package at the second speed or the third speed from when hanging wire 792 first starts being let out until when the package reaches the second predefined distance from the first predefined distance.

Whether the distance between the package and delivery box 470 has reached the second predefined distance can be determined by calculating the second predefined distance based on the image information acquired from camera sensor 334 or based on the length of hanging wire 792 that has been let out, for example.

If processor 734 determines that the distance between the package and delivery box 470 has not reached the second predefined distance (NO in S8112), processor 734 returns to the process in step S8111.

Next, if processor 734 determines that the distance between the package and delivery box 470 has reached the second predefined distance (YES in S8112), processor 734 controls wire control module 311 so as to stop letting out hanging wire 792. Then, processor 734 measures the positions of the package and delivery box 470 based on the image information acquired from camera sensor 334 and calculates the error in the position of the package relative to delivery box 470. At this point, processor 734 calculates an error (positional mismatch) of the package relative to opening 471 of delivery box 470 as the package and delivery box 470 are viewed from the above.

Processor 734 controls the plurality of first motors 711 and moves drone 701 so as to correct the position of the package relative to opening 471 of delivery box 470 so that the package can be contained within opening 471 of delivery box 470. In this example, as in step S8104, processor 734 may determine whether the error is greater than or equal to a predefined value.

Next, processor 734 controls wire control module 311 so as to start letting out hanging wire 792 (S8114).

Next, processor 734 determines whether the package has passed through opening 471 of delivery box 470 and has been stored in delivery box 470 based on the image information acquired from camera sensor 334 (S8115). For example, processor 734 calculates an overlap between opening 471 of delivery box 470 and the package based on the image information acquired from camera sensor 334 and detects the looseness in the tension of hanging wire 792 with the use of tension sensor 333. Then, processor 734 determines that the package has been placed on the bottom of delivery box 470 based on the tension information acquired from tension sensor 333.

If processor 734 determines that the package have been stored into delivery box 470 (YES in S8115), processor 734 controls a package mounting portion (not illustrated) provided at the leading end of hanging wire 792, and the package mounting portion releases (cuts off) the package. Thus, the package is stored in delivery box 470 (S8116). The package mounting portion can couple a package thereto or hold a package. Processor 734 controls wire control module 311 so as to take up hanging wire 792 and returns to the sender upon having taken up hanging wire 792. Then, processor 734 terminates the flow.

If processor 734 determines that the package has not been stored into delivery box 470 (NO in S8115), processor 734 is neither able to calculate an overlap between opening 471 of delivery box 470 and the package based on the image information acquired from camera sensor 334 nor able to detect the looseness in the tension of hanging wire 792 based on the tension information acquired from tension sensor 333. Therefore, processor 734 causes wire control module 311 to take up hanging wire 792 by a predefined amount and thus moves the package away from opening 471 of delivery box 470 (S8117). In this example, the predefined amount is, for example, less than or equal to several centimeters or less than or equal to several tens of centimeters. Then, processor 734 returns to step S8111.

Configuration of Delivery System 3*a*

Next, an example of how a package is delivered with the use of drone 701 and delivery system 3*a* according to the present embodiment will be described.

Figure 61:
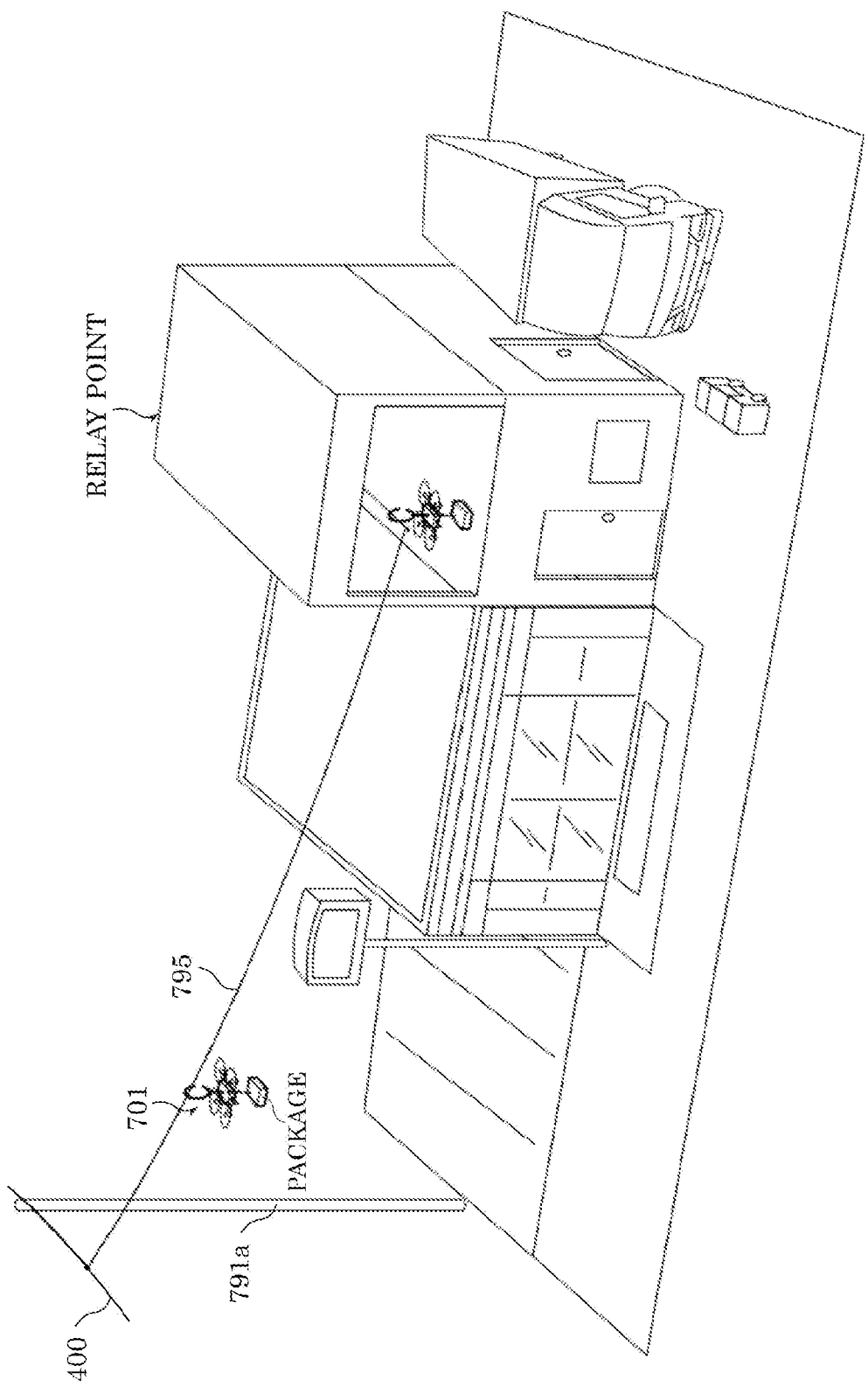
FIG. 61 is an image diagram illustrating an example of how a drone of the delivery system delivers a package from a sender to a relay point of a receiver according to Embodiment 7.

FIG. 61 is an image diagram illustrating an example of how drone 701 of delivery system 3*a* delivers a package from a sender to a relay point of a receiver according to Embodiment 7.

As illustrated in FIGS. 56 and 61, in a case where a receiver is a relay point, upon a package being delivered to the relay point, that relay point starts serving as a sender and sends out that package to a subsequent receiver via a transportation means. A relay point also serves as a sender that sends out packages to individual receivers such as homes and as a receiver where packages are collected from receivers present within a predetermined distance from the relay point. Collected packages are distributed at a relay point, and the packages are delivered to individual receivers with the use of a distribution means such as drone 701, for example. In this case, manager 100 illustrated in FIG. 55 may be provided at a relay point as well, and drone 701 may acquire route information from this manager 100, or drone 701 may acquire route information from manager 100 of a distribution center. In this example, the transportation means is not limited to drone 701 described above and may also be a delivery robot, a vehicle, a person, or the like.

At a relay point, packages to be delivered to receivers may be classified in accordance with their weights into the packages to be delivered by drone 701 and the packages to be delivered by a delivery robot or the like. A package may be delivered by drone 701 if the weight of that package is less than a predetermined value, or a package may be delivered by a delivery robot if the weight of that package is greater than or equal to the predetermined value. For example, a package may be delivered by drone 701 if the weight of that package is less than 5 Kg, or a package may be delivered by a delivery robot if the weight of that package is greater than or equal to 5 Kg.

Delivery system 3*a* can manage a plurality of drones 701 simultaneously and deliver packages to a plurality of receivers. In this example, one drone 701 returns to the sender upon delivering a package to a receiver. Alternatively, one drone 701 may deliver packages to two or more receivers.

Figure 62A:
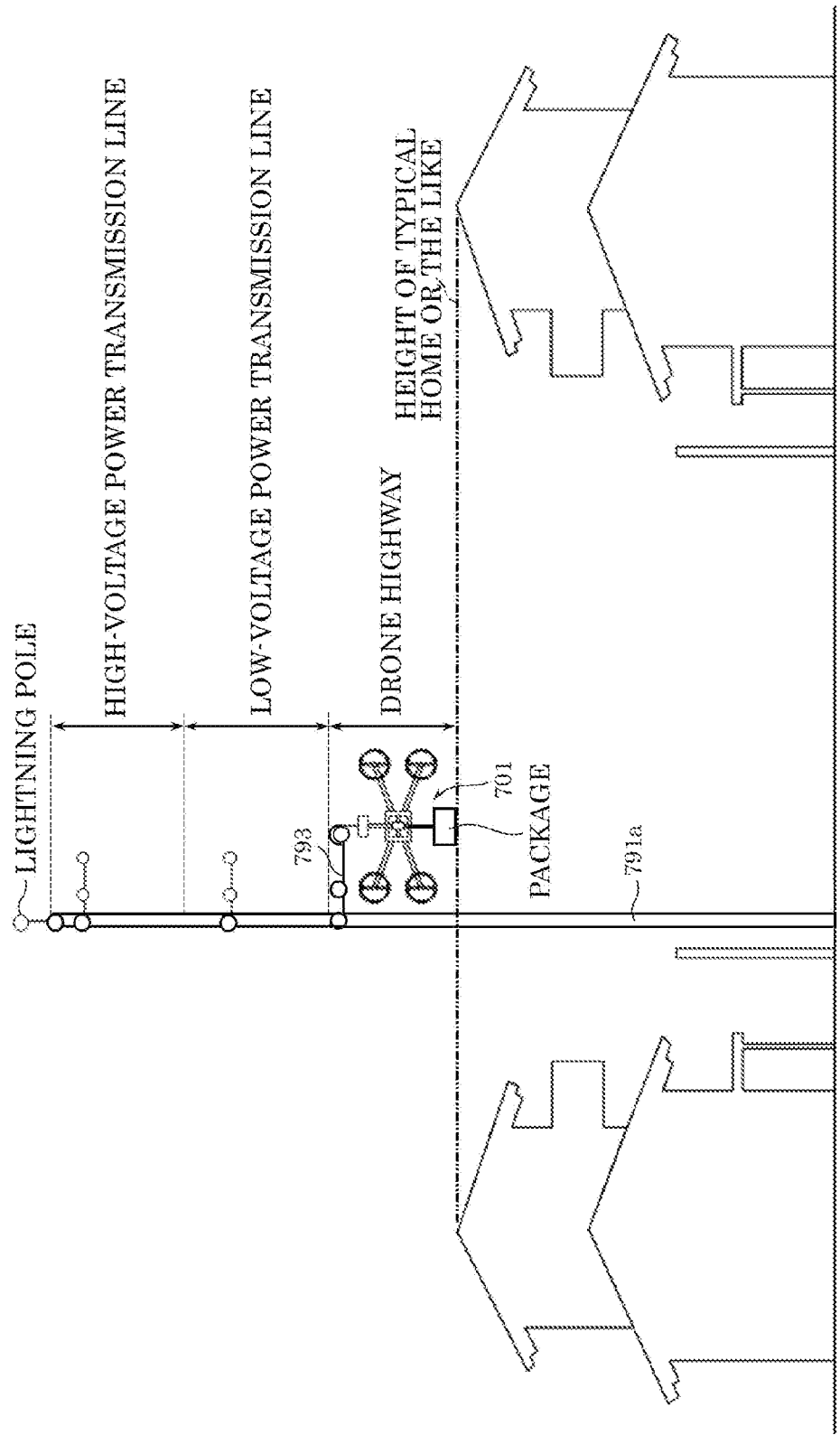
FIG. 62A is a schematic diagram illustrating some heights from the ground surface at which a drone of the delivery system moves according to Embodiment 7.

FIG. 62A is a schematic diagram illustrating some examples of heights from the ground surface at which drone 701 of delivery system 3*a* moves according to Embodiment 7.

As illustrated in FIGS. 56 and 62A, delivery system 3*a* further includes rail support portion 793, protective net 794 illustrated in FIG. 63 described later, lead-in support pillar 791*b*, lead-in wire 795, and delivery box 470 illustrated in FIG. 59.

The plurality of support pillars 791*a* are each a utility pole or a streetlight. Support pillars 791*a* are each installed on the ground. Rail 400 used by delivery system 3*a* is fixed to each support pillar 791*a*. For example, rail support portion 793 is fixed to each of the plurality of support pillars 791*a*. Specifically, rail support portion 793 is a support member that supports rail 400 of delivery system 3*a*. Rail support portion 793 is fixed so as to project from the direction in which support pillar 791*a* extends and can hold rail 400 with a space provided between rail 400 and support pillar 791*a*.

Rail 400 of delivery system 3*a* is stretched over the plurality of support pillars 791*a*, facilities, and so on and fixed thereon, for example. Rail 400 guides the movement of drone 701 such that drone 701 can move along rail 400 with the connector of drone 701 being connected to rail 400. Rail 400 can support drone 701 and one or more packages loaded in drone 701 even when drone 701 is hanging from rail 400 via the connector. Rail 400 is, for example but not limited to, an elongated stick-like member or a wire.

As illustrated in FIG. 62A, rail 400 is installed at a position spaced apart from the ground surface and between the plurality of support pillars 791*a*. For example, rail 400 is stretched at a height of greater than or equal to about 10 meters and less than or equal to 13 meters from the ground surface so that drone 701 can move along a drone highway that runs at a height of greater than or equal to about 10 meters and less than or equal to 13 meters from the ground surface. Therefore, rail 400 may be stretched at a height of greater than or equal to about 12 meters and less than or equal to about 13 meters from the ground surface.

In a case where support pillar 791*a* is a utility pole, a lightning rod, a power transmission line, and so on are provided on the utility pole. Normally, a lightning rod is mounted at the leading end of the utility pole, a high-voltage power transmission line is provided below the lightning rod, and a low-voltage power transmission line is provided below the high-voltage power transmission line and at a height of greater than or equal to about 13 meters. Then, if the height of a typical home or the like is about 10 meters, it is conceivable that there is a space extending from a height of greater than or equal to about 10 meters to a height of less than or equal to about 13 meters. As drone 701 flies along a position higher than the height of homes, drone 701 is less likely to make contact with the homes or the power transmission lines, and the privacy of the user serving as a receiver and the privacy of people in the facilities such as the homes can be protected.

The numerical values for these heights are merely examples and vary depending on the surrounding environment, and thus these numerical values for the heights are not limiting. Therefore, there may be a case where the drone highway is installed along a position lower than a height of about 10 meters from the ground surface.

Figure 62B:
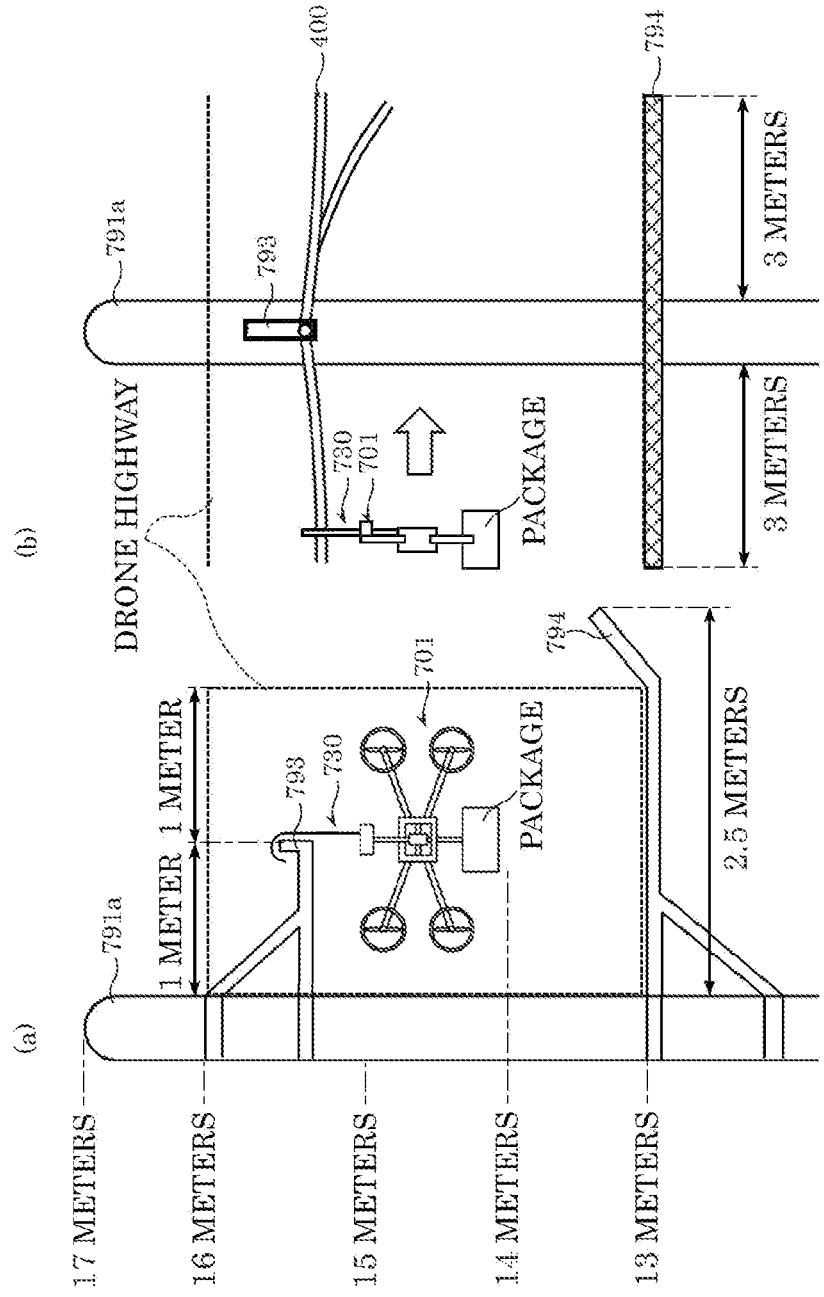
FIG. 62B is a schematic diagram illustrating an example of a position of a drone highway in the delivery system according to Embodiment 7.

FIG. 62B is a schematic diagram illustrating an example of a position of a drone highway in delivery system 3*a* according to Embodiment 7. In FIG. 62B, (a) illustrates a state as viewed in the moving direction of drone 701, and (b) illustrates a state as viewed in a direction orthogonal the moving direction of drone 701.

As illustrated in (a) and (b) in FIG. 62B, for example, in a case where support pillar 791*a* is a utility pole or the like that is 17 meters high from the ground surface, rail 400 is provided along a position at a height of greater than or equal to about 15 meters and less than or equal to about 16 meters. Drone 701 along with a package therein is located within a range from higher than or equal to about 13 meters to lower than or equal to about 16 meters.

The drone highway has a width of about 2 meters. Therefore, if another rail 400 is to be installed across from rail 400, rail 400 is installed with its width taken into account as well.

Protective net 794 is provided on support pillar 791*a* at a position that is about 13 meters high from the ground surface. Protective net 794 is stretched along a position vertically below rail support portion 793 and is supported by support pillar 791*a*. Specifically, protective net 794 is supported by support pillar 791*a* such that protective net 794 is substantially parallel to a plane orthogonal to the lengthwise direction of support pillar 791*a*. Protective net 794 is provided along a position vertically below the drone highway such that protective net 794 stretches out from support pillar 791*a*. In FIG. 62B, protective net 794 stretches out about 2.5 meters from support pillar 791*a* and measures about 6 meters or more in the moving direction of drone 701 (i.e., the direction in which rail 400 extends). When protective net 794 and drone 701 are viewed in a plan view, protective net 794 is larger than drone 701. Protective net 794 is a structure made of a net or fabric having cushioning effect, for example. Protective net 794 keeps drone 701 from colliding with the ground even if connector 730 becomes disengaged from rail 400.

Figure 64:
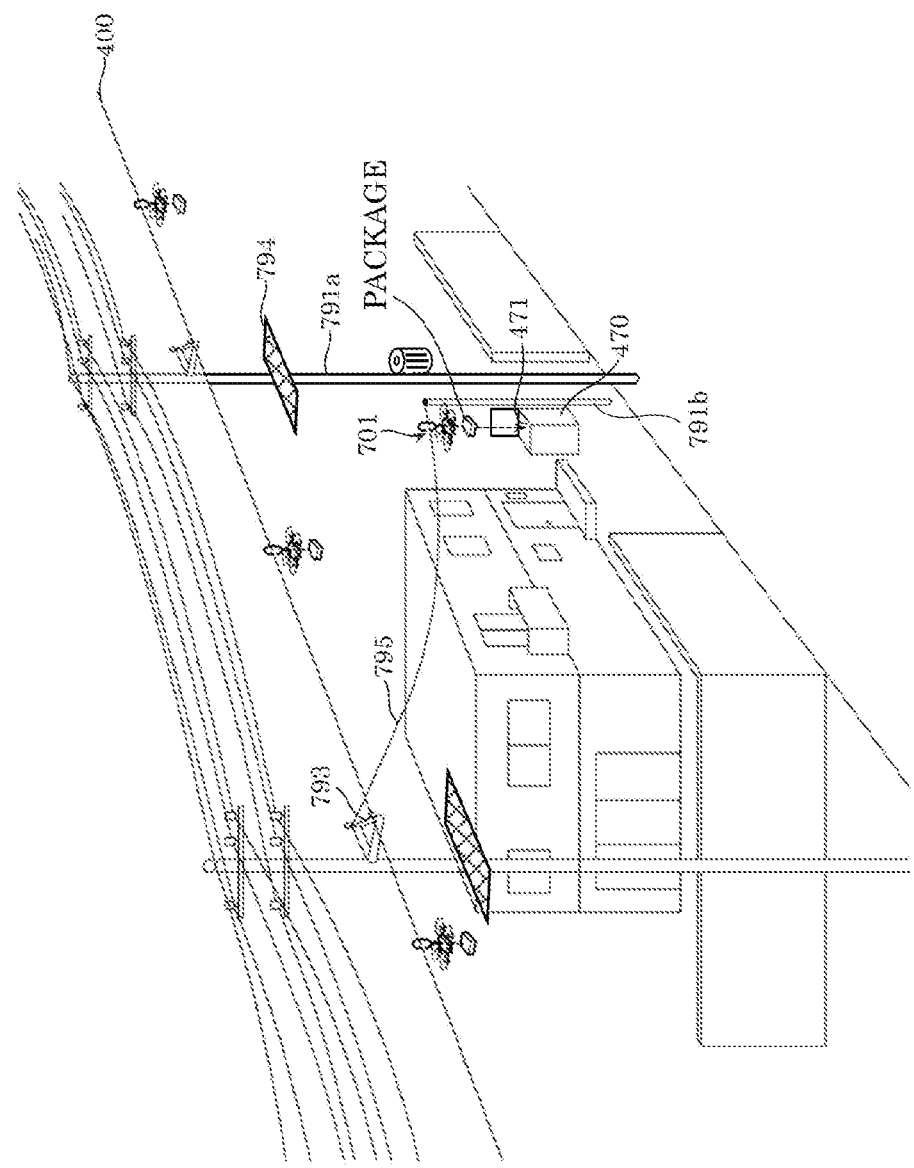
FIG. 64 is a perspective view illustrating an example of how a drone of the delivery system stores a package into a delivery box via a lead-in support pillar and a lead-in wire according to Embodiment 7.

FIG. 63 is a schematic diagram illustrating an example of how drone 701 of delivery system 3*a* stores a package into delivery box 470 via lead-in support pillar 791*b* and lead-in wire 795 according to Embodiment 7. FIG. 64 is a perspective view illustrating an example of how drone 701 of delivery system 3*a* stores a package into delivery box 470 via lead-in support pillar 791*b* and lead-in wire 795 according to Embodiment 7.

As illustrated in FIGS. 63 and 64, lead-in support pillar 791*b* is disposed within a predetermined site and installed on the ground or on a facility, for example. FIGS. 63 and 64 illustrate an example in which lead-in support pillar 791*b* is installed on the ground. Lead-in support pillar 791*b* is shorter than support pillar 791*a*, and one end of lead-in wire 795 is fixed to lead-in support pillar 791*b*. The leading end of lead-in support pillar 791*b* is located at a position lower than rail 400 and the power transmission lines.

Lead-in wire 795 is stretched to rail 400. Specifically, the one end of lead-in wire 795 is connected and fixed to lead-in support pillar 791*b*, and the other end of lead-in wire 795 is stretched and fixed to rail 400. Since the connector of drone 701 includes a hook, drone 701 can made a direct connection from rail 400 to lead-in wire 795 at a connection point (branching point) of the other end of lead-in wire 795 and rail 400. This connection point is provided between a first support pillar and an adjacent second support pillar among the plurality of support pillars 791*a*. Alternatively, the connection point may be provided on the first support pillar or the second support pillar.

Protective net 794 is disposed along a position vertically below the connection point and supported by support pillar 791*a*. Even if the connector becomes disengaged from the connection point, protective net 794 can keep drone 701 from colliding with the ground surface.

The connector connected to rail 400 makes a switch from rail 400 to lead-in wire 795 at the connection point. Then, lead-in wire 795 becomes connected to the connector and guides the connector to lead-in support pillar 791*b*. Thus, drone 701 arrives at lead-in support pillar 791*b*. In this case, lead-in support pillar 791*b* serves substantially as a receiver.

In the present embodiment, delivery system 3*a* includes protective net 794, lead-in support pillar 791*b*, and lead-in wire 795. Alternatively, delivery system 3*a* does not need to include lead-in support pillar 791*b* and lead-in wire 795. Drone 701 may lower a package upon arriving at a receiver, and lead-in support pillar 791*b* and lead-in wire 795 are not essential constituent elements of delivery system 3*a*.

Delivery box 470 is installed at a receiver, such as a home. In FIGS. 63 and 64, delivery box 470 is installed at a root portion of lead-in support pillar 791*b*. However, since it suffices that drone 701 can store a package into delivery box 470, there is no particular limitation on the installation location of delivery box 470. Delivery box 470 serves as a destination point for storing a package transported by drone 701.

As illustrated in FIGS. 63 and 64, lead-in support pillar 791*b* is disposed within a predetermined site and installed on the ground, for example. Lead-in support pillar 791*b* is shorter than support pillar 791*a*, and one end of lead-in wire 795 is fixed to lead-in support pillar 791*b*.

Lead-in wire 795 is stretched to rail 400. Specifically, the one end of lead-in wire 795 is connected and fixed to lead-in wire 795, and the other end of lead-in wire 795 is stretched and fixed to rail 400. Since the connector of drone 701 includes a hook, drone 701 can made a direct connection from rail 400 to lead-in wire 795 at a connection point of the other end of lead-in wire 795 and rail 400. This connection point is provided between a first support pillar and an adjacent second support pillar among the plurality of support pillars 791*a*. Alternatively, the connection point may be provided on the first support pillar or the second support pillar. To be more specific, the height from the installation surface to first connection point P1 at which lead-in wire 795 and lead-in support pillar 791*b* are connected to each other is lower than the height from the installation surface to second connection point P2 at which lead-in wire 795 and lead-in support pillar 791*b* or rail 400 are connected to each other. The installation surface is the ground surface in the present embodiment. In a case where support pillar 791*a* or lead-in support pillar 791*b* is grounded, the portion of the building where support pillar 791*a* or lead-in support pillar 791*b* is connected serves as the installation surface.

Figure 65:
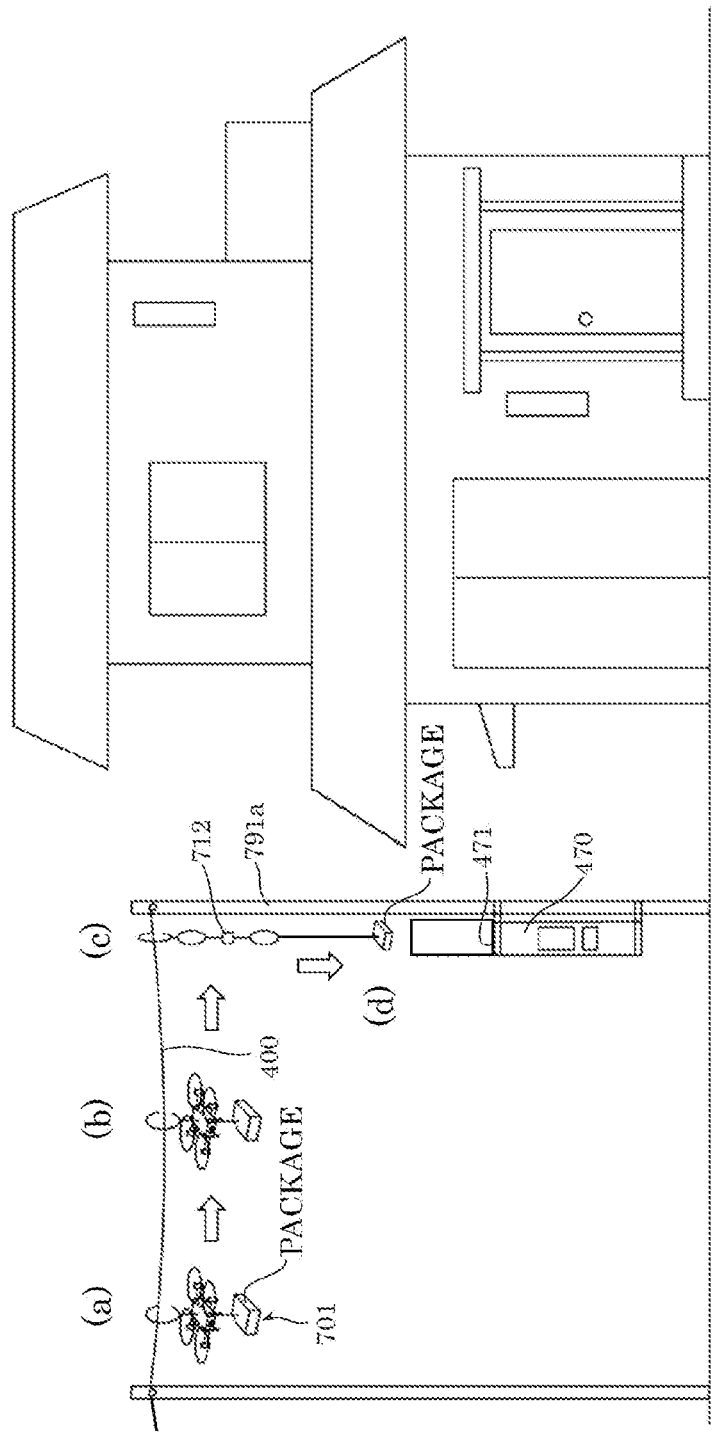
FIG. 65 is a schematic diagram illustrating an example of how a drone of the delivery system stores a package into a delivery box via a lead-in support pillar and a lead-in wire while the attitude of the main body of the drone is substantially parallel to the vertical direction according to Embodiment 7.

FIG. 65 is a side view illustrating an example of how drone 701 of delivery system 3*a* stores a package into delivery box 470 via support pillar 791*a* and rail 400 while main body 712 of drone 701 has an attitude substantially parallel to the vertical direction.

In a case where opening 471 of delivery box 470 is small, drone 701 may come into contact with support pillar 791*a* (or a lead-in support pillar), and this may prevent drone 701 from storing a package into delivery box 470. Therefore, as illustrated in FIGS. 55 and 65, processor 734 of drone 701 changes the attitude of main body 712 to an attitude substantially parallel to the vertical direction by controlling an actuator and brings main body 712 into the upright attitude. Processor 734 brings main body 712 into the upright attitude by controlling the actuator so as to increase angle θ formed by the normal direction of the virtual plane containing the plurality of propellers 709*a* as illustrated in FIG. 57 relative to the support direction of the connector (i.e., the vertical direction).

Whether opening 471 of delivery box 470 is small is determined based on image information or the like acquired from camera sensor 334 or the like provided in drone 701.

For example, as illustrated in FIG. 55 and in (a) and (b) in FIG. 65, drone 701 moves along rail 400. Processor 734 of drone 701 captures an image of opening 471 of delivery box 470 with camera sensor 334 or the like and determines, based on the captured image information, whether drone 701 can store a package into delivery box 470 with the virtual plane of main body 712 being oriented substantially parallel to the horizontal direction. If processor 734 determines, based on the above determination result, that drone 701 cannot store the package into delivery box 470 with the virtual plane of main body 712 being oriented substantially parallel to the horizontal direction, processor 734 changes the attitude of main body 712 to an attitude substantially parallel to the vertical direction by controlling movable block 740. As illustrated in (c) in FIG. 65, drone 701 arrives at a position vertically above delivery box 470. As illustrated in (d) in FIG. 65, processor 734 lets out hanging wire 792 and lowers the package by controlling wire control module 311 and stores the package into delivery box 470. Such delivery system 3*a* reliably stores a package into delivery box 470.

Figure 66:
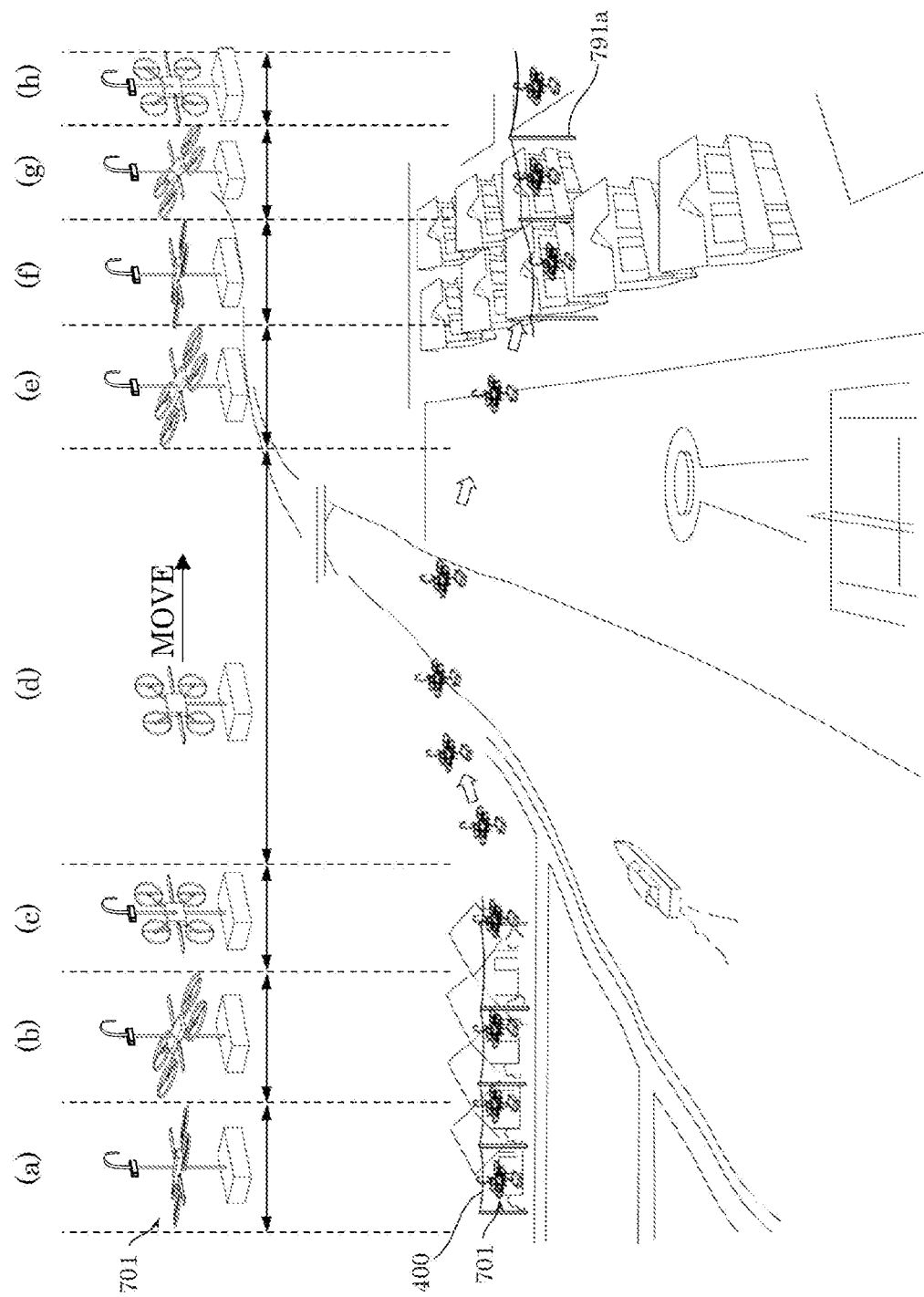
FIG. 66 is a schematic diagram illustrating an example in which a drone of the delivery system flies through a location where no rail is provided according to Embodiment 7.

FIG. 66 is a schematic diagram illustrating an example in which drone 701 of delivery system 3*a* flies in a location where no rail 400 is provided according to Embodiment 7. There may be a location, such as a river, where no rail 400 can be installed depending on the widthwise dimension of the location. Thus, FIG. 66 illustrates an example in which drone 701 crosses over a river.

As illustrated in FIG. 55 and in (a) to (c) in FIG. 66, movable block 740 tilts main body 712 so as to change the attitude of main body 712 from the attitude where the virtual plane of main body 712 is substantially horizontal to the upright attitude. Drone 701 accelerates in order to cross over the river.

As illustrated in FIG. 55 and in (c) and (d) in FIG. 66, connector 730 becomes disengaged from rail 400.

As illustrated in FIG. 55 and in (d) and (e) in FIG. 66, drone 701 crosses over the river by utilizing the propelling force caused by the acceleration and with the use of the pair of wings 713. Processor 734 calculates the position of rail 400 based on image information and so on. Upon drone 701 approaching rail 400, processor 734 controls movable block 740 so as to tilt main body 712 such that the attitude of main body 712 is changed from the upright attitude to the attitude where the virtual plane of main body 712 is substantially horizontal. This causes drone 701 to decelerate.

As illustrated in FIG. 55 and in (e) and (f) in FIG. 66, processor 734 calculates the position of rail 400 based on image information and so on, and connector 730 of drone 701 connects itself to rail 400 installed on the other side of the river.

As illustrated in FIG. 55 and in (f), (g), and (h) in FIG. 66, after drone 701 has decelerated and connected connector 730 to rail 400, processor 734 controls movable block 740 so as to tilt main body 712 such that the attitude of the main body is changed from the attitude where the virtual plane of main body 712 is substantially horizontal to the upright attitude. This causes drone 701 to accelerate to the speed that allows drone 701 to safely travel on rail 400. In this manner, drone 701 crosses over a location, such as a river, where rail 400 cannot be installed.

Advantageous Effects

Next, some advantageous effects of drone 701 and delivery system 3a according to the present embodiment will be described.

Drone 701 is an unmanned aerial vehicle that delivers a package, and drone 701 includes a plurality of rotary wings, a plurality of first motors 711 that each rotate a corresponding one of the plurality of rotary wings, main body 712 that supports the plurality of first motors 711, connector 730 that is to be connected to rail 400 located at a position spaced apart from the ground surface with main body 712 hanging from connector 730, movable block 740 that sets an inclination of an virtual plane containing the plurality of rotary wings relative to a support direction in which connector 730 is supported on rail 400, and processor 734 that controls the plurality of first motors 711 and movable block 740. Connector 730 includes first end 730a connected to main body 712 and second end 730b to be slidably connected to rail 400. The support direction is a direction extending from first end 730a toward second end 730b of connector 730. When second end 730b of connector 730 is connected to rail 400, processor 734 (i) sets the rotation rate of the plurality of first motors 711 to the rotation rate that is lower than the minimum rotation rate necessary for causing drone 701 to float and that is higher than the minimum rotation rate necessary for propelling drone 701 in the direction in which rail 400 extends and (ii) causes movable block 740 to increase angle θ formed by the normal direction of the virtual plane relative to the support direction of connector 730.

According to this configuration, drone 701 can move along rail 400 while connector 730 is connected to rail 400. In the case of (i), processor 734 controls the rotation rate of the plurality of first motors 711 so as to achieve the rotation rate that is lower than the minimum rotation rate necessary for causing drone 701 to float and that is higher than the minimum rotation rate necessary for propelling drone 701. Thus, drone 701 can move along rail 400 at an appropriate speed. In the case of (ii), processor 734 controls movable block 740 so as to change the inclination of the virtual plane containing the plurality of rotary wings relative to the support direction of connector 730. This makes it possible to regulate the speed of drone 701.

Delivery system 3a includes drone 701, a plurality of support pillars 791a, and rail 400 stretched between two adjacent support pillars among the plurality of support pillars 791a.

Movable block 740 is disposed between main body 712 and connector 730.

This configuration allows movable block 740 to change angle θ of connector 730 relative to main body 712 with ease.

For example, in a case where connector 730 is disposed at or around the center of gravity of main body 712, movable block 740 is also disposed at or around the center of gravity of main body 712. This configuration makes it possible to balance the center of gravity of drone 701.

Drone 701 further includes a pair of wings 713.

According to this configuration, for example, drone 701 can be rotated in the horizontal direction if the pair of wings 713 are yaw wings, or drone 701 can be rotated in the vertical direction if the pair of wings 713 are pitch wings. Therefore, the traveling direction of drone 701 can be steered freely, and drone 701 can be moved stably.

After processor 734 has increased angle θ with movable block 740, processor 734 disengages connector 730 from rail 400 if the propelling speed of drone 701 has exceeded a predetermined value.

This configuration can keep connector 730 from making contact with rail 400, and thus the safety of drone 701 can be increased.

If connector 730 is being disengaged from rail 400, processor 734 causes movable block 740 to reduce angle θ and controls the rotation rate of the plurality of first motors 711 so as to achieve a rotation rate higher than the minimum rotation rate necessary for causing drone 701 to float.

According to this configuration, when connector 730 is disengaged from rail 400, reducing angle θ allows drone 701 to float to a predetermined height from the ground surface. This can keep drone 701 from making contact with an object, and thus the safety of drone 701 can be increased.

Processor 734 may control the rotation rate of the plurality of first motors 711 so as to increase angle θ to greater than 15 degrees in (ii).

Processor 734 controls the rotation rate of the plurality of first motors 711 so as to increase angle θ to greater than 45 degrees in (ii).

Processor 734 controls the rotation rate of the plurality of first motors 711 so as to increase angle θ to greater than 65 degrees in (ii).

Processor 734 controls the rotation rate of the plurality of first motors 711 so as to increase angle θ to greater than 80 degrees in (ii).

Setting the angle of movable block 740 appropriately makes it possible to adjust the ratio of the propulsive power and the lifting power that act on drone 701. As angle θ increases, the rate of contribution of the power caused by the rotation of the plurality of first motors 711 to the propulsive power of drone 701 acting in substantially the horizontal direction increases. Accordingly, even if the rotation rate of the plurality of first motors 711 is reduced, drone 701 can still obtain a sufficient propulsive power.

Connector 730 includes support portion 732 swingably connected to main body 712 and first arm 731 connected to one end of support portion 732.

This configuration allows first arm 731 to swing along with a swinging movement of support portion 732. Therefore, first arm 731 can connect itself to rail 400 more easily.

First arm 731 is a hanger for hanging drone 701 from rail 400.

According to this configuration, first arm 731 can be hung on rail 400 when drone 701 has stopped. Therefore, a package can be placed at a receiver with drone 701 hanging from rail 400.

Drone 701 further includes hanging wire 792 that is connected to main body 712 and that hangs a package therefrom and a lift motor that can take up hanging wire 792. Processor 734 positions drone 701 at a position vertically above delivery box 470 for storing a package with connector 730 being connected to rail 400. Then, processor 734 lets out hanging wire 792 by driving the lift motor and lowers the package from main body 712 so as to store the package into delivery box 470.

According to this configuration, upon drone 701 arriving at the destination point, processor 734 controls the lift motor so as to let out hanging wire 792. Thus, drone 701 can lower the package and store the package into delivery box 470. Therefore, drone 701 can deliver the package to the receiver.

While processor 734 is letting out hanging wire 792, processor 734 adjusts at least one of the position and the orientation of main body 712 in accordance with the position of the package relative to delivery box 470.

According to this configuration, even if the position of drone 701 fails to match the position directly above delivery box 470, processor 734 can position main body 712 relative to delivery box 470 by adjusting at least one of the position and the orientation of main body 712. Therefore, drone 701 can reliably lower the package and store the package into delivery box 470, which in turn makes it possible to reliably deliver the package to the receiver.

In particular, even if drone 701 moves from a position directly above delivery box 470 due to the wind or the like, drone 701 can position main body 712 relative to delivery box 470.

When the position of the package is displaced in a third direction from the position vertically above delivery box 470, processor 734 moves drone 701 in a fourth direction opposite the third direction along the direction in which rail 400 extends.

According to this configuration, even if the position of the package has changed (moved) in the third direction via hanging wire 792 due to the wind or the like, processor 734 can change the position of drone 701 in the fourth direction opposite the third direction. Therefore, drone 701 can reliably lower the package and store the package into delivery box 470, which in turn makes it possible to deliver the package more reliably to the receiver.

When the position of the package has moved in the fifth direction from the position vertically above delivery box 470, processor 734 causes drone 701 to swing about rail 400 and moves the center of gravity of drone 701 in a sixth direction opposite the fifth direction.

According to this configuration, even if the package has been displaced in the fifth direction via hanging wire 792 due to the wind or the like, processor 734 can move the package in the sixth direction opposite the fifth direction by moving the center of gravity of drone 701. Therefore, drone 701 can reliably lower the package and store the package into delivery box 470, which in turn makes it possible to deliver the package more reliably to the receiver.

In delivery system 3a, each of the plurality of support pillars 791a is a utility pole.

According to this configuration, existing utility poles can be used as support pillars 791a, and no new support pillar 791a needs to be installed in order to stretch rail 400. Therefore, this system can prevent a surge in the cost of installation.

Delivery system 3a further includes lead-in support pillar 791b disposed within a predetermined site and lead-in wire 795 stretched to rail 400. The height from the ground surface to first connection point P1 at which lead-in wire 795 and lead-in support pillar 791b are connected to each other is lower than the height from the ground surface to second connection point P2 at which lead-in wire 795 and rail 400 are connected to each other.

According to this configuration, rail 400 is disposed at a position higher than first connection point P1, and thus drone 701 can move along a high position. Since drone 701 travels along a position where drone 701 is less likely to be recognized by people, the privacy of the user at the receiver and the privacy of people in a facility, such as a home, that is located so as to face rail 400 can be protected.

The utility pole supports a power transmission line, and rail 400 is provided at a position that is lower than the power transmission line and higher than the leading end of lead-in support pillar 791b.

According to this configuration, since rail 400 is disposed under the power transmission line, rail 400 can be disposed at a position where drone 701 will not make contact with the power transmission line, and drone 701 can travel along rail 400. Therefore, the safety of drone 701 delivering packages can be ensured.

Connector 730 may further include a wheel such as the one according to Variation 1 of Embodiment 4 that is connected to first arm 731 and that is to rotatably make contact with rail 400.

According to this configuration, when drone 701 becomes connected to rail 400, drone 701 can move along rail 400 with the wheel making contact with rail 400. The wheel starts rotating upon friction with rail 400. Therefore, drone 701 can travel on rail 400 solely with the propelling force produced by the rotation of the rotary wings in the traveling direction. Thus, this configuration renders it unnecessary for drone 701 to use the rotary force of the rotary wings as a lifting force for lifting itself up. As a result, the energy consumed by drone 701 can be reduced.

Variation 1 of Embodiment 7

In the following, basic configurations of drone 701 and of a delivery system according to the present variation are identical to the basic configurations of the drones and of the delivery systems according to Embodiment 7 and so on. Therefore, the descriptions of the basic configurations of drone 701 and of the delivery system according to the present variation will be omitted as appropriate.

Figure 67:
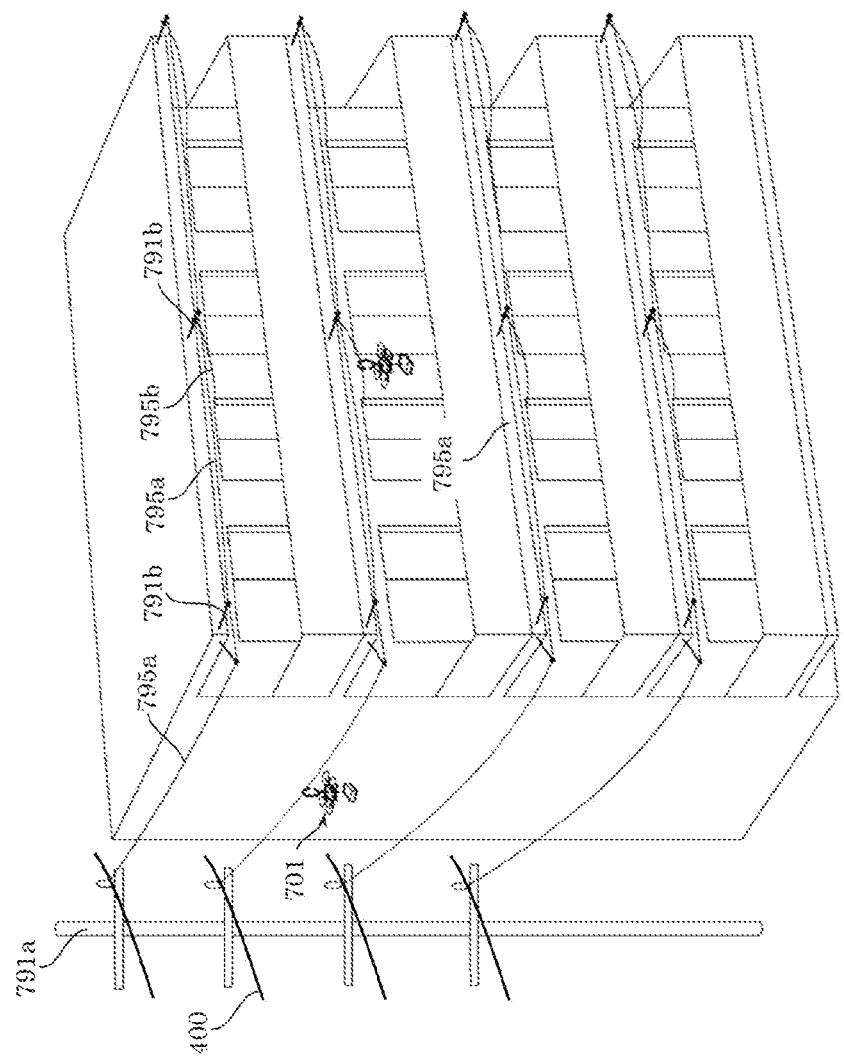
FIG. 67 is a schematic diagram illustrating an example in which a lead-in support pillar, a first lead-in wire, and a second lead-in wire of a delivery system are installed on an apartment building according to Embodiment 7.

FIG. 67 is a schematic diagram illustrating an example in which lead-in support pillar 791b, first lead-in wire 795a, and second lead-in wire 795b of the delivery system are installed on an apartment building according to Variation 1 of Embodiment 7.

FIG. 67 illustrates an example in which lead-in support pillar 791b is installed on a side wall of a ceiling portion of a facility (an apartment building in the present variation). In FIG. 67, first lead-in wire 795a and second lead-in wire 795b are used as lead-in wires.

First lead-in wire 795a is stretched over the side wall of the ceiling portion in each floor via lead-in support pillars 791b installed on the side wall of the ceiling portion. One end of second lead-in wire 795b is connected to lead-in support pillar 791b or first lead-in wire 795a, and the other end of second lead-in wire 795b is connected to the outer wall of the facility. In this example, support pillar 791b may also be provided on the outer wall. Second lead-in wire 795b may or may not be connected to every apartment unit in the facility.

Figure 68:
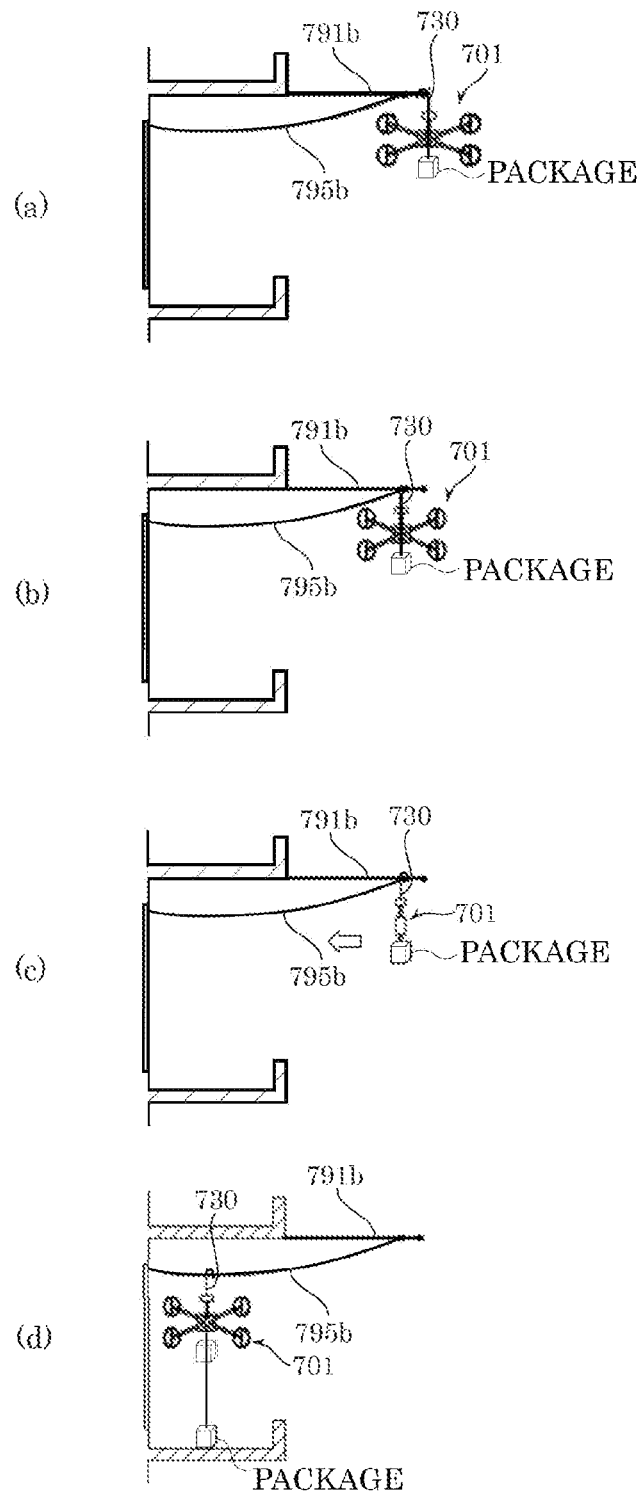
FIG. 68 is a schematic diagram illustrating an example of how a drone delivers a package to an apartment building according to Variation 1 of Embodiment 7.

FIG. 68 is a schematic diagram illustrating an example of how drone 701 delivers a package to the apartment building according to Variation 1 of Embodiment 7.

For example, as illustrated in (a) and (b) in FIG. 68, drone 701 moves along first lead-in wire 795a with connector 730 being connected to first lead-in wire 795a. As illustrated in (c) in FIG. 68, drone 701 changes the connection of connector 730 to second lead-in wire 795b at a connection point of second lead-in wire 795b connected to the receiver and first lead-in wire 795a or lead-in support pillar 791b. As illustrated in (d) in FIG. 68, drone 701 arrives at the receiver of the destination as being guided by second lead-in wire 795b and unloads the package.

In FIG. 67, first lead-in wire 795a and second lead-in wire 795b are stretched over the apartment building. Alternatively, rail 400 may be stretched over the apartment building.

Variation 2 of Embodiment 7

In the following, basic configurations of drone 701 and of a delivery system according to the present variation are identical to the basic configurations of the drones and of the delivery systems according to Embodiment 7 and so on. Therefore, the descriptions of the basic configurations of drone 701 and of the delivery system according to the present variation will be omitted as appropriate.

Figure 69:
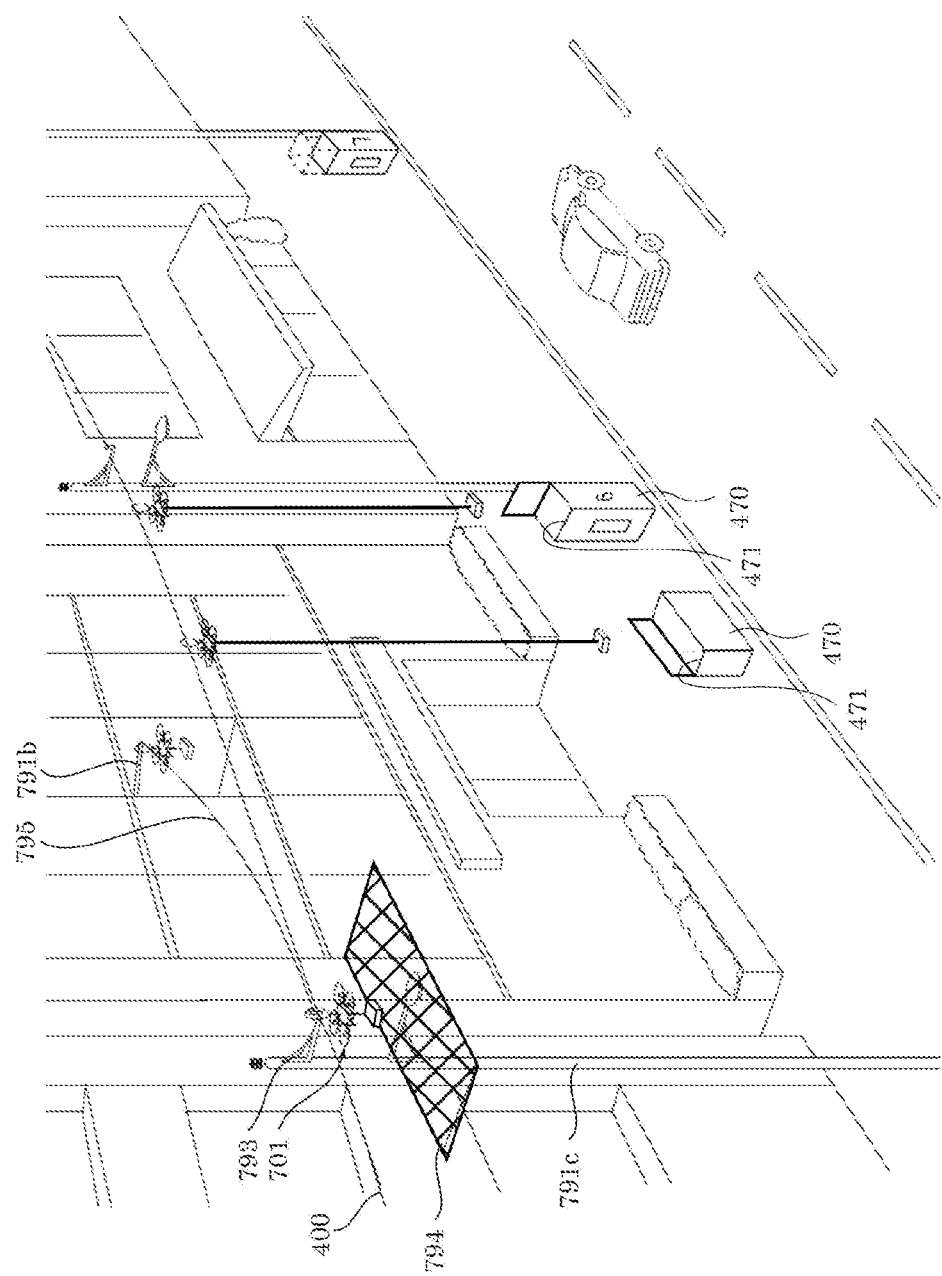
FIG. 69 is a schematic diagram illustrating an example in which a support pillar of a delivery system is a streetlight according to Variation 2 of Embodiment 7.

FIG. 69 is a schematic diagram illustrating an example in which support pillar 791c of the delivery system is a streetlight according to Variation 2 of Embodiment 7.

As illustrated in FIG. 69, delivery box 470 is disposed on a sidewalk and provided for each facility. A package is delivered to each floor of the facility via lead-in support pillar 791b and lead-in wire 795. Lead-in support pillar 791b and lead-in wire 795 may be installed if a receiver can be on the second floor or higher of the facility, for example.

Figure 70:
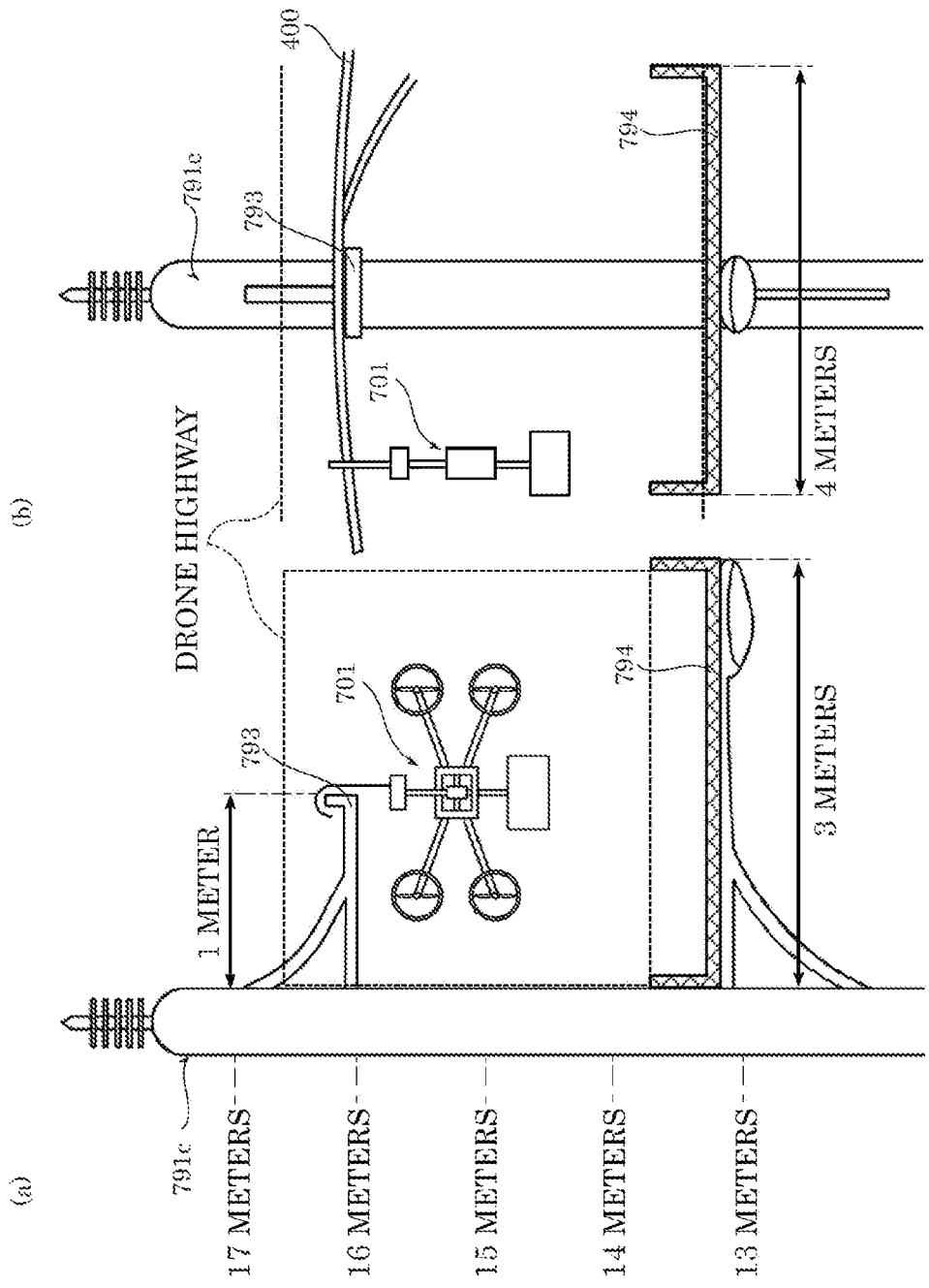
FIG. 70 is a schematic diagram illustrating an example of a position of a drone highway in an example in which a support pillar of the delivery system is a streetlight according to Variation 2 of Embodiment 7.

FIG. 70 is a schematic diagram illustrating an example of where a drone highway is located in a case where support pillar 791c of the delivery system is a streetlight according to Variation 2 of Embodiment 7. In FIG. 70, (a) illustrates a state as viewed in the moving direction of drone 701, and (b) illustrates a state as viewed in a direction orthogonal the moving direction of drone 701.

As illustrated in (a) and (b) in FIG. 70, protective net 794 is provided along a position vertically above the illumination device of the streetlight according to the present variation. Protective net 794 is supported by and fixed to a pole that supports the illumination device of support pillar 791c. In FIG. 70, protective net 794 stretches out about three meters from the pole and measures about four meters in the moving direction of drone 701 (i.e., the direction in which rail 400 extends). The size of protective net 794 may vary depending on the environment where the illumination device is installed.

Some advantageous effects of drone 701 and the delivery system configured as described above according to the present variation will be described.

The plurality of support pillars 791c are streetlights.

According to this configuration, existing streetlights can be used as support pillars 791c, and no new support pillar 791c needs to be installed in order to stretch rail 400. Therefore, this system can prevent a surge in the cost of installation.

Variation 3 of Embodiment 7

In the following, basic configurations of drone 701b and of a delivery system according to the present variation are identical to the basic configurations of the drones and of the delivery systems according to Embodiment 7 and so on. Therefore, the descriptions of the basic configurations of drone 701b and of the delivery system according to the present variation will be omitted as appropriate. The present variation differs from Embodiment 7 and so on in the configuration of connector 730c.

Connector 730c of drone 701b according to the present variation includes first arm 731, support portion 732, and first actuator 741. Unlike Embodiment 7, in the present variation, connector 730c does not include base 733 and angle actuator 743.

Figure 71:
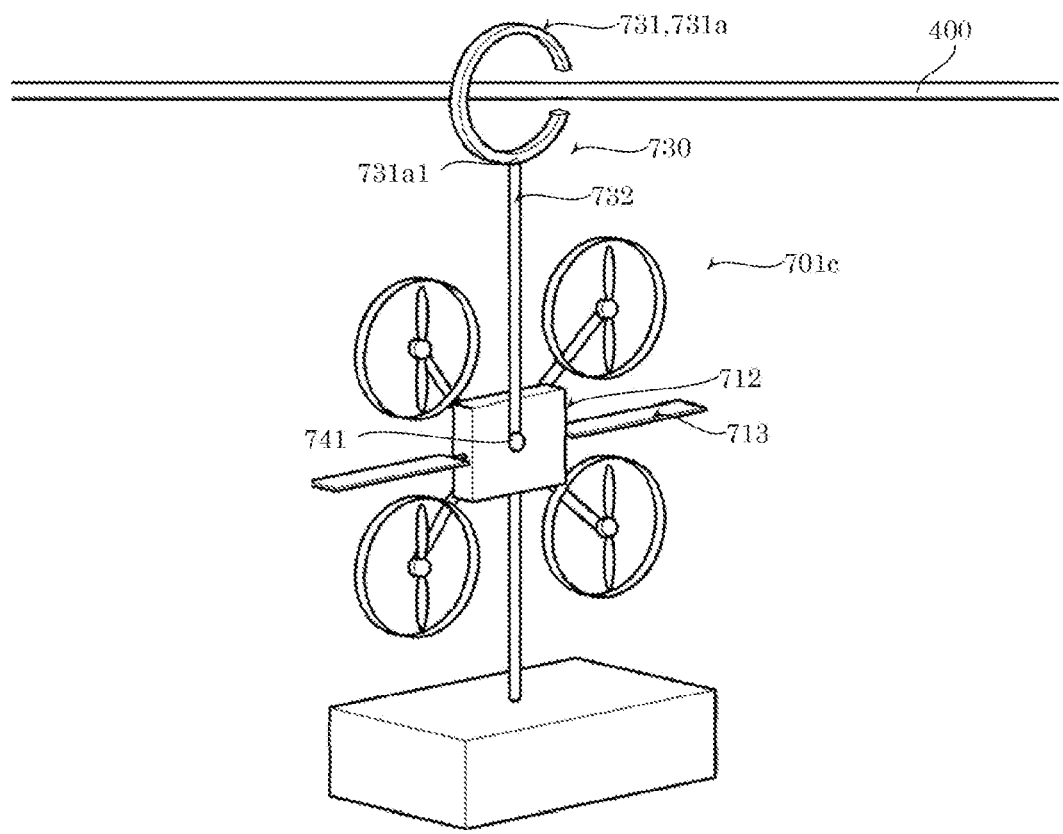
FIG. 71 is a perspective view illustrating an example of a drone of a delivery system according to Variation 3 of Embodiment 7.

FIG. 71 is a perspective view illustrating an example of drone 701b of the delivery system according to Variation 3 of Embodiment 7.

As illustrated in FIG. 71, first hook 731a of first arm 731 according to the present variation has a substantially C-like shape in which a part of the ring-shaped outer shell portion is missing as viewed in the traveling direction of drone 701b. First connected end 731a1 of first hook 731a is connected to the other end of support portion 732.

Figure 72:
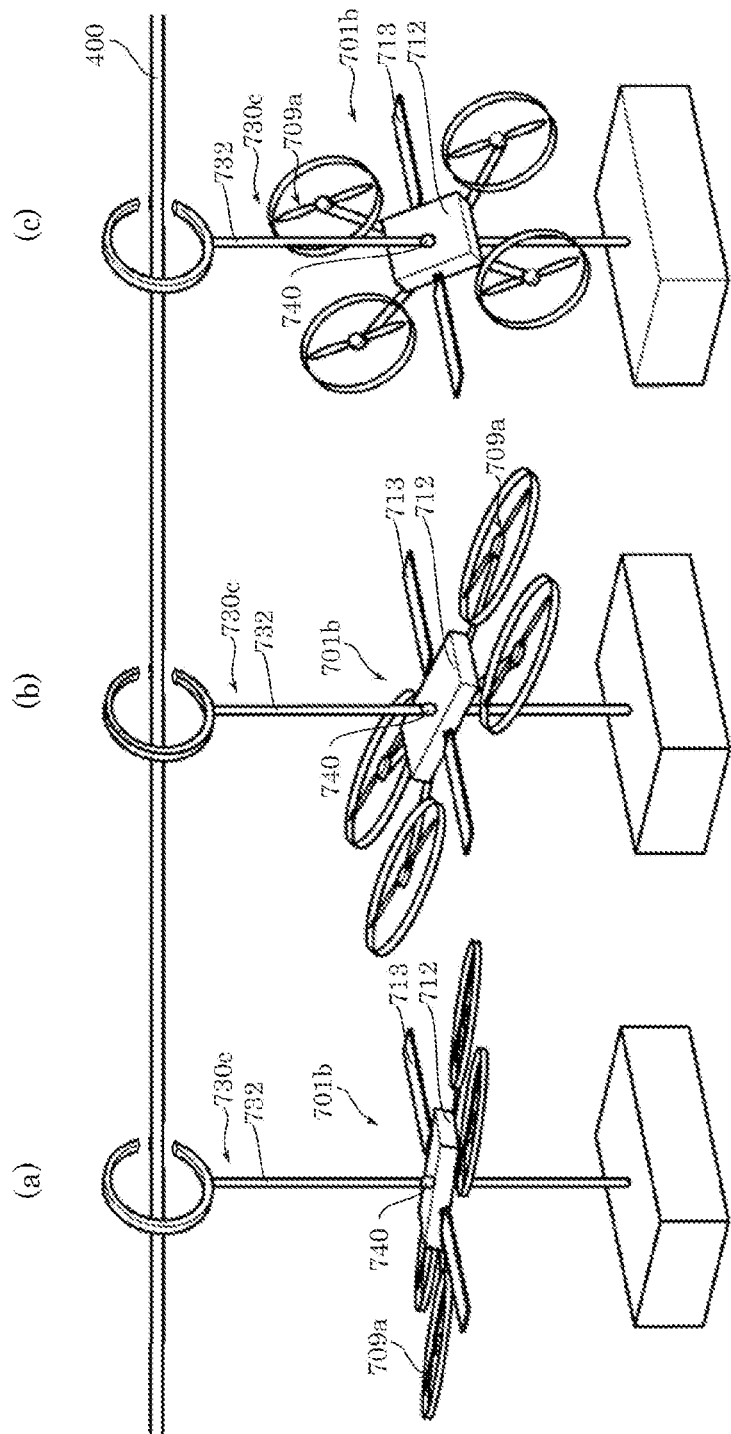
FIG. 72 is a perspective view illustrating an example of how the attitude of the main body of a drone of the delivery system is changed according to Variation 3 of Embodiment 7.

FIG. 72 is a perspective view illustrating an example of how the attitude of main body 712 of drone 701b of the delivery system is changed according to Variation 3 of Embodiment 7.

As illustrated in (a), (b), and (c) in FIG. 72, processor 734 illustrated in FIG. 55 changes the attitude of main body 712 while maintaining the attitude of support portion 732 of connector 730c by controlling movable block 740, the plurality of propellers 709a, and the pair of wings 713. Specifically, processor 734 changes the angle of the normal direction of the virtual plane relative to the direction in which support portion 732 extends.

Embodiment 8

In the following, basic configurations of drone 701c and of delivery system 4 according to the present embodiment are identical to the basic configurations described in Embodiment 7 and so on. Therefore, the descriptions of the basic configurations of drone 701c and of delivery system 4 according to the present embodiment will be omitted as appropriate. The present embodiment differs from Embodiment 7 and so on in that second arm 751 is further provided.

Figure 73:
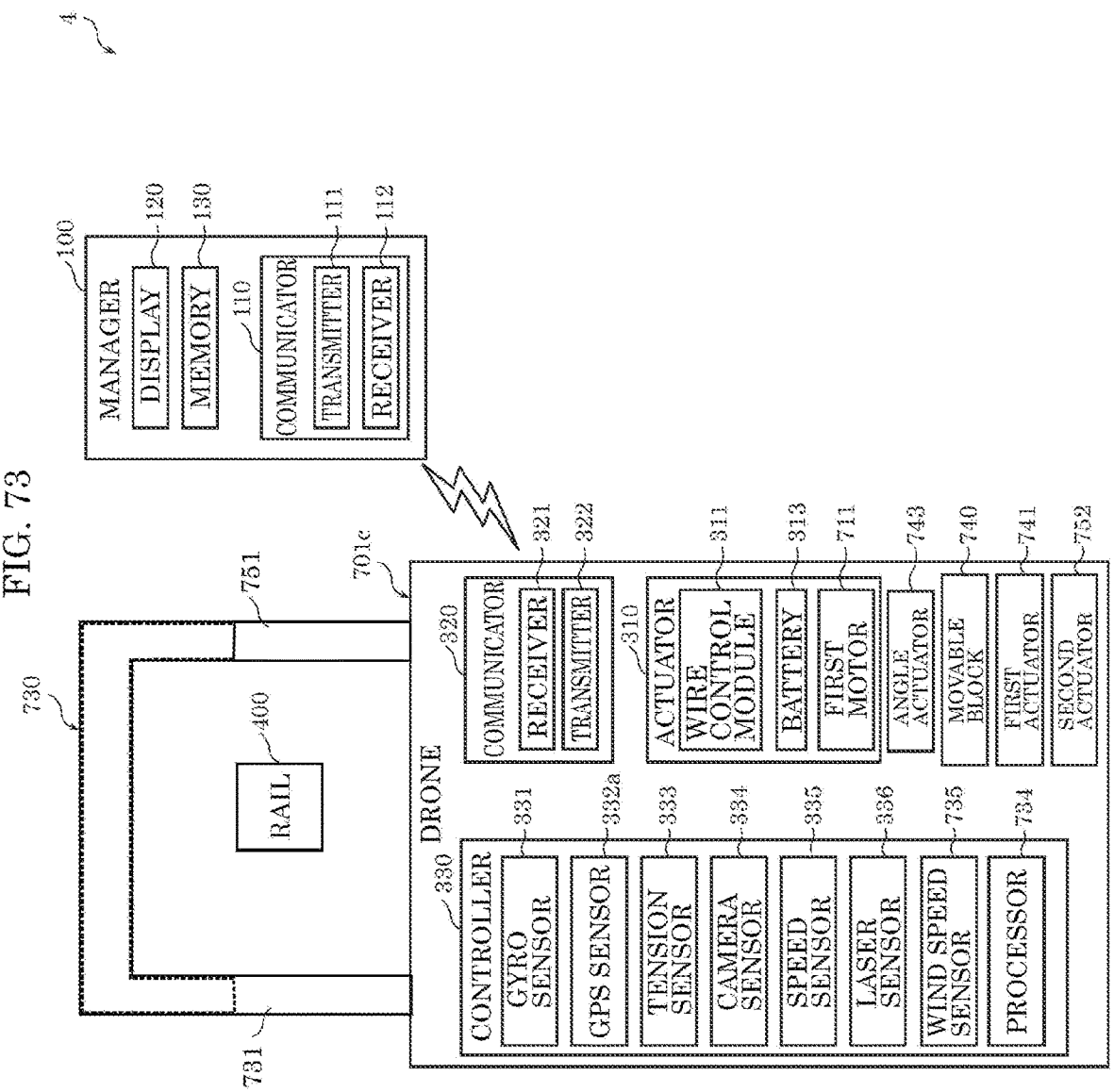
FIG. 73 is a block diagram illustrating an example of a configuration of a delivery system according to Embodiment 8.
Figure 74:
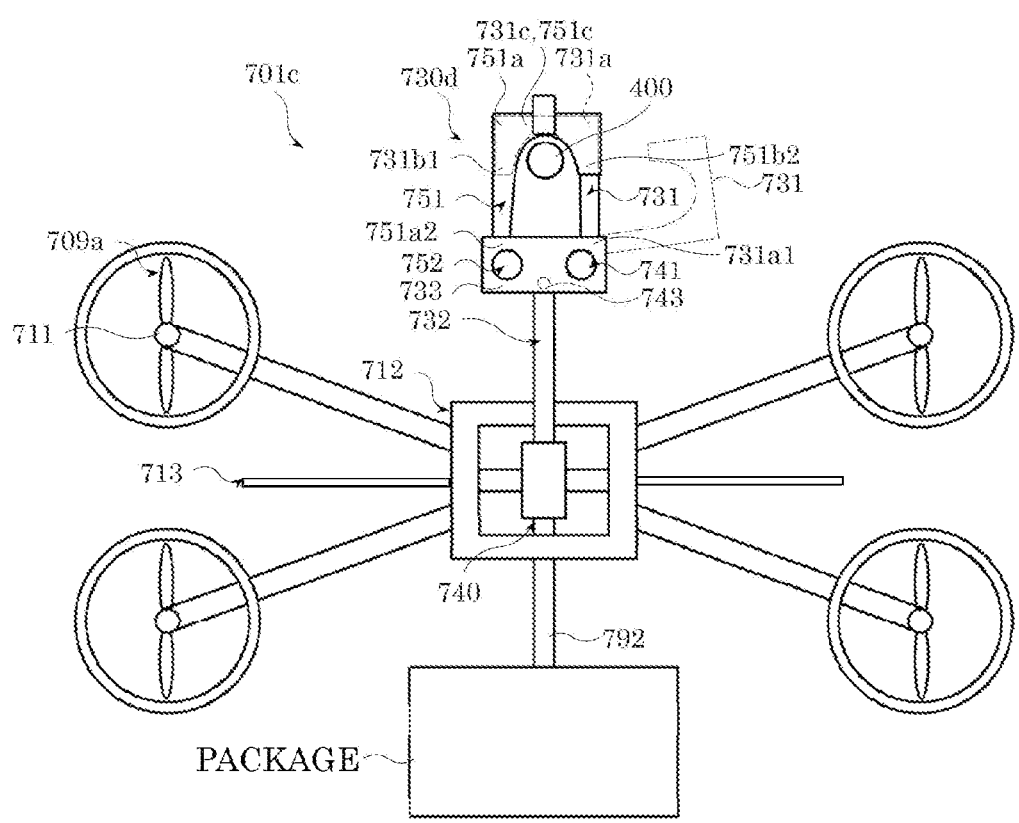
FIG. 74 is a front view illustrating a drone of the delivery system according to Embodiment 8.

FIG. 73 is a block diagram illustrating an example of a configuration of delivery system 4 according to Embodiment 8. FIG. 74 is a front view illustrating drone 701c of delivery system 4 according to Embodiment 8. Specifically, FIG. 74 is a front view illustrating drone 701c of delivery system 4 according to Embodiment 8.

As illustrated in FIGS. 73 and 74, connector 730d according to the present embodiment further includes second arm 751 and second actuator 752.

Second arm 751 is connected to one end of support portion 732. Specifically, second arm 751 is connected to support portion 732 via base 733 so as to oppose first arm 731. First arm 731 and second arm 751 are connected to base 733 and lie in different planes. Second arm 751 is a hanger for hanging drone 701c from rail 400.

Second arm 751 includes second hook 751a.

Second hook 751a extends from second connected end 751a2 connected to second actuator 752 to second open end 751b2 on the other end. Second hook 751a includes second bent portion 751c that is bent in a second direction opposite to the first direction and is located between second connected end 751a2 and second open end 751b2. Second hook 751a has a substantially C-like shape, a substantially F-like shape, a substantially J-like shape, or a substantially U-like shape in which a part of the ring-shaped outer shell portion is missing as viewed in the traveling direction of drone 701c. The portion cut out from the outer shell portion constitutes an opening of second hook 751a through which rail 400 can enter the space enclosed by second arm 751. The opening lies between second open end 751b2 and second connected end 751a2. Second hook 751a is an example of a second end of connector 730d. In this example, second hook 751a may be provided with a wheel that allows second hook 751a to make contact with and freely rotate on rail 400 as described above.

Second hook 751a and first hook 731a oppose each other. When second hook 751a and first hook 731a are viewed in the traveling direction of drone 701c, second open end 751b2 and second connected end 751a2 of second hook 751a oppose, respectively, first open end 731b1 and first connected end 731a1 of first hook 731a with rail 400 interposed therebetween.

Base 733 is a portion where support portion 732 are connected to first arm 731 and second arm 751 and is disposed between support portion 732 and first and second arms 731 and 751. Base 733 is connected to first connected end 731a1 of first arm 731, second connected end 751a2 of second arm 751, and the other end of support portion 732.

Second actuator 752 sets the angle of second hook 751a relative to support portion 732. Second actuator 752 is disposed between support portion 732 and second hook 751a and swingably supports second connected end 751a2 of second hook 751a. In the present embodiment, second actuator 752 is disposed in base 733.

Figure 75:
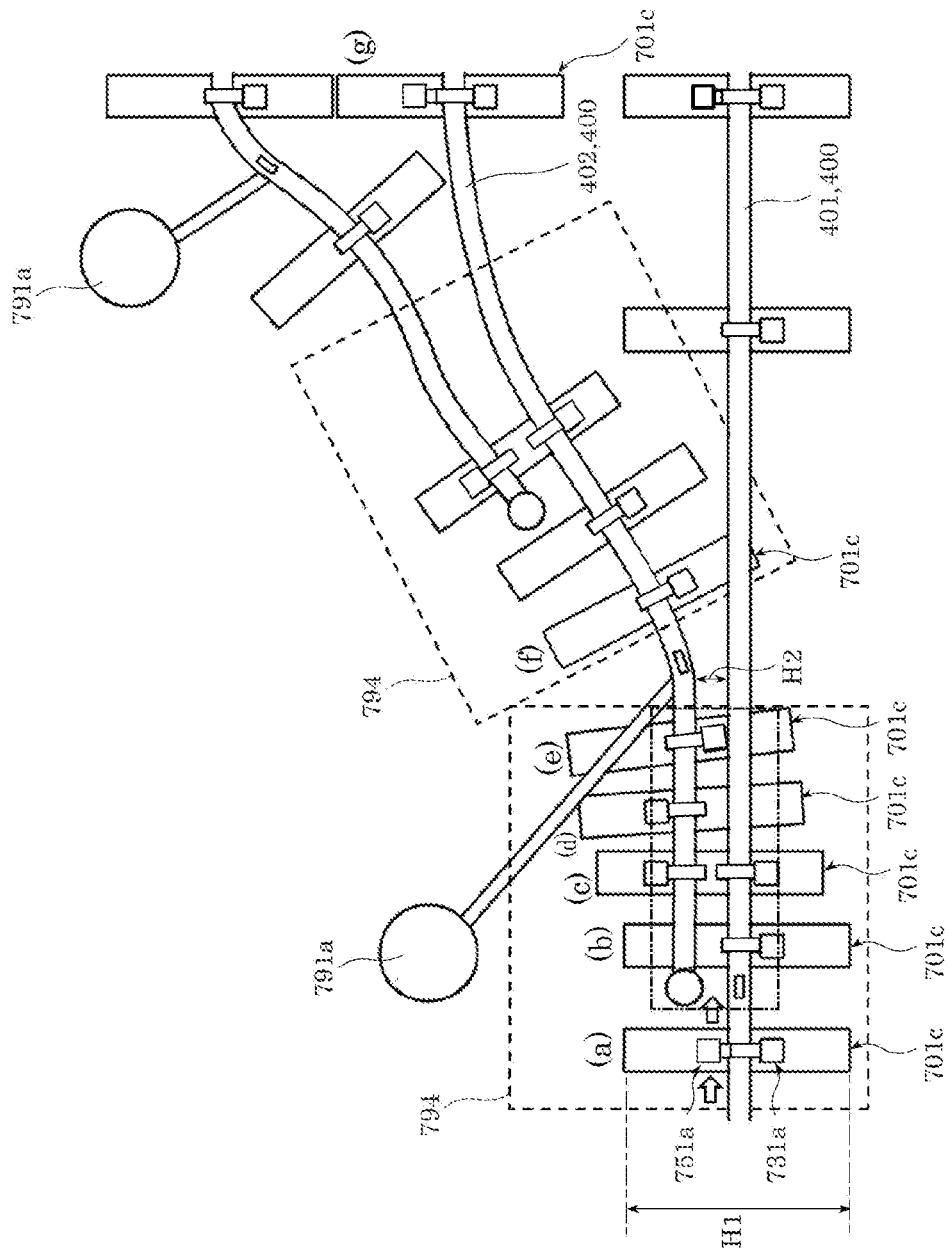
FIG. 75 is a top view of a drone and rails of the delivery system, illustrating an example of how the connection of a connector is switched from a first rail to a second rail, according to Embodiment 8.

FIG. 75 is a top view illustrating an example of how the connection of connector 730d is switched from first rail 401 to second rail 402, as drone 701c and rail 400 of delivery system 4 according to Embodiment 8 are viewed from the above. FIG. 75 illustrates first rail 401, second rail 402, and so on supported by support pillars 791a.

As illustrated in FIGS. 74 and 75, processor 734 according to the present embodiment can switch the connection of connector 730d connected to first rail 401 to second rail 402 by controlling first actuator 741 and second actuator 752. This switching between rails 400 will be described later. Rail 400 is a collective term for first rail 401 and second rail 402. In the present embodiment, when the term rail 400 is used, rail 400 may include first rail 401 and second rail 402.

Delivery system 4 according to the present embodiment includes protective net 794 as well as first rail 401 and second rail 402 stretched between two adjacent support pillars 791a among the plurality of support pillars 791a.

When first rail 401 is regarded as a stock rail, second rail 402 is a rail that branches off from first rail 401. Second rail 402 is disposed in the vicinity of first rail 401 with a space provided therebetween. In other words, second rail 402 extends alongside first rail 401. A section where first rail 401 and second rail 402 are close to each other is an approaching region and is a turnout serving as a branching point where drone 701c can switch between rails 400. Metaphorically speaking, second rail 402 is a tongue rail. The approaching region is a region where the distance (distance H2) between first rail 401 and second rail 402 is smaller than or equal to width H1 of drone 701c. For example, the approaching region is a region where first rail 401 and second rail 402 come closest to each other.

Figure 76:
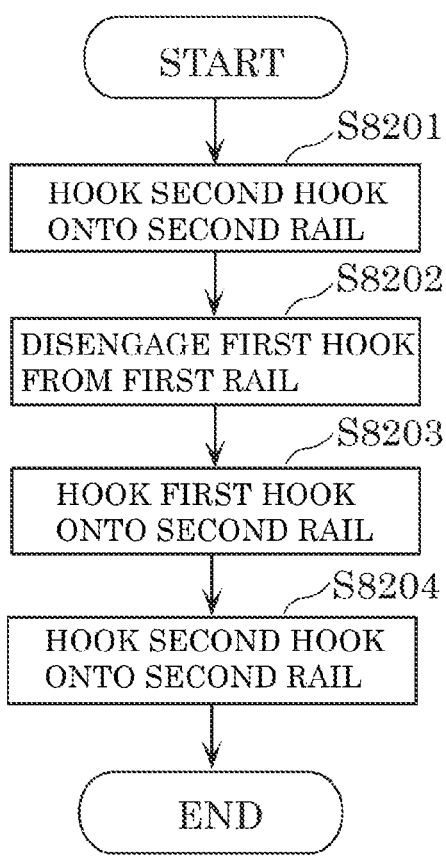
FIG. 76 is a flowchart illustrating an example of an operation in which the connector of a drone of the delivery system is switched from a first rail to a second rail according to Embodiment 8.

Protective net 794 is stretched along a position vertically below the approaching region of first rail 401 and second rail 402 and is supported by support pillar 791a Operations Next, operations of drone 701c and delivery system 4 according to the present embodiment will be described. Drone 701c of this delivery system 4 can switch the connection from first rail 401 to second rail 402 with the use of the two arms including first arm 731 and second arm 751. FIG. 76 is a flowchart illustrating an example of an operation in which the connection of connector 730d of drone 701c of delivery system 4 is switched from first rail 401 to second rail 402 according to Embodiment 8. In this example described below, drone 701c that is moving along first rail 401 switches its path from first rail 401 to second rail 402.

First, as illustrated in FIG. 73, in a in FIG. 75, and in FIG. 76, when first hook 731a and second hook 751a of connector 730d of drone 701c are connected to first rail 401, drone 701c is slidably hanging from first rail 401 via first hook 731a and second hook 751a. In this case, as illustrated in (b) and (c) in FIG. 75 and in FIG. 76, upon processor 734 determining that drone 701c has approached the leading end portion of second rail 402 and has passed this leading end portion based on image information and so on, processor 734 controls second actuator 752 so as to cause second hook 751a to swing, become disengaged from first rail 401, and be hooked onto second rail 402 (S8201). Processor 734 recognizes the approaching region where second rail 402 approaches first rail 401 based on the image information and so on. Then, processor 734 controls second actuator 752 in the approaching region so as to cause second hook 751a to swing and be hooked onto second rail 402. Thus, second hook 751a becomes connected to second rail 402, which results in the state illustrated in (c) in FIG. 75.

Next, as illustrated in (c) and (d) in FIG. 75 and in FIG. 76, processor 734 controls first actuator 741 so as to cause first hook 731a to swing and become disengaged from first rail 401 (S8202), which results in the state illustrated in (d) in FIG. 75.

Next, as illustrated in (d) and (e) in FIG. 75 and in FIG. 76, processor 734 controls first actuator 741 so as to cause first hook 731a to swing and be hooked onto second rail 402. Thus, first hook 731a becomes connected to second rail 402 (S8203). Thereafter, processor 734 controls second actuator 752 so as to cause second hook 751a to swing and become disengaged from second rail 402, which results in the state illustrated in (e) in FIG. 75. Then, drone 701c moves along second rail 402 or switches the connection of connector 730d from second rail 402 to a third rail.

In a case where drone 701c moves along second rail 402 thereafter, as illustrated in (g) in FIG. 75 and in FIG. 76, processor 734 controls second actuator 752 after drone 701c has passed rail support portion 793 so as to cause second hook 751a to swing and be hooked onto second rail 402. Thus, second hook 751a becomes connected to second rail 402 (S8204). As first hook 731a and second hook 751a are connected to second rail 402, drone 701c becomes connected to second rail 402 so as not to be disengaged from second rail 402.

Now, how connector 730d moves when the connection of connector 730d is switched from first rail 401 to second rail 402 will be described in detail.

Figure 77:
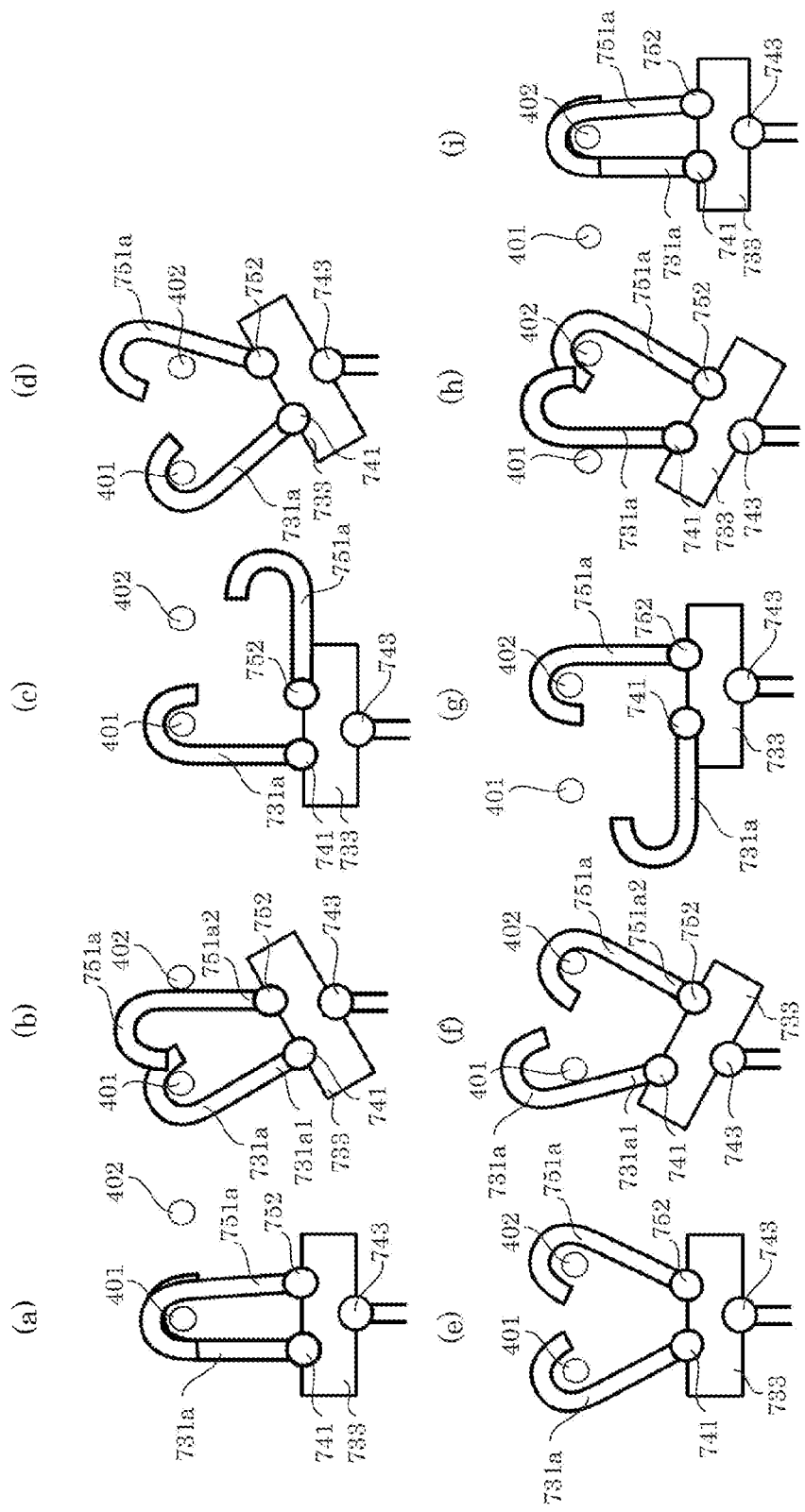
FIG. 77 is a front view of a drone and rails of the delivery system, illustrating an example of how the connection of a connector is switched from a first rail to a second rail, according to Embodiment 8.
Figure 78:
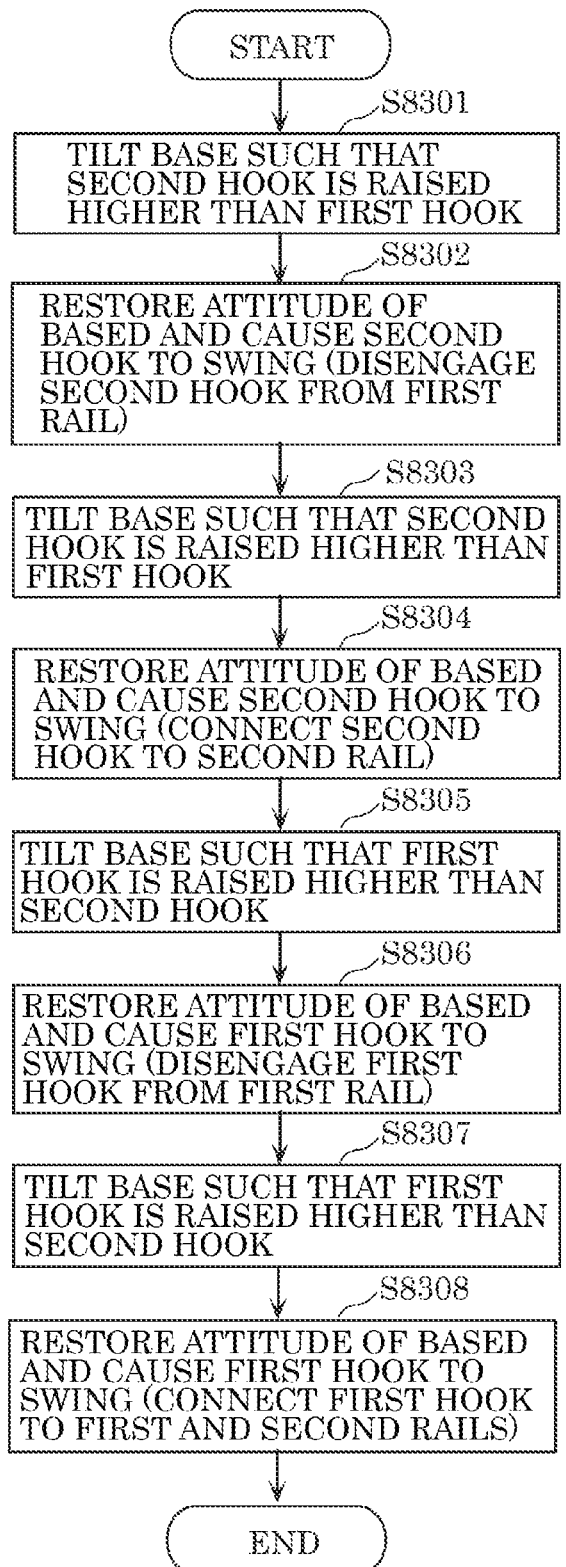
FIG. 78 is a flowchart illustrating, in detail, an example of an operation in which the connection of a connector of a drone of the delivery system is switched from a first rail to a second rail according to Embodiment 8.

FIG. 77 is a rear view illustrating an example of how the connection of connector 730d is switched from first rail 401 to second rail 402, as drone 701c and rail 400 of delivery system 4 according to Embodiment 8 are viewed from the rear side. FIG. 78 is a flowchart illustrating, in detail, an example of an operation in which the connection of connector 730d of drone 701c of delivery system 4 is switched from first rail 401 to second rail 402 according to Embodiment 8.

FIG. 77 illustrates first rail 401, second rail 402, and so on supported by support pillar 791a. FIG. 77 illustrates an example in which drone 701c, first rail 401, and second rail 402 are viewed in the traveling direction (toward the front side) of drone 701c.

As illustrated in FIG. 73, in (a) and (b) in FIG. 77, and in FIG. 78, when processor 734 hooks second hook 751a onto second rail 402, processor 734 controls angle actuator 743 so as to change the angle of base 733 relative to support portion 732 and tilt base 733 such that second hook 751a is raised higher than first hook 731a (S8301). At this point, second connected end 751a2 is located higher than first connected end 731a1. In this example, instead of base 733, main body 712 may be tilted.

As illustrated in FIG. 73, in (b) and (c) in FIG. 77 and in FIG. 78, second hook 751a becomes disengaged from first rail 401. Processor 734 controls angle actuator 743 so as to restore the attitude of base 733 and controls second actuator 752 so as to cause second hook 751a to pass between first rail 401 and second rail 402. Then, processor 734 causes second hook 751a to swing and disengages second hook 751a from first rail 401 (S8302).

As illustrated in FIG. 73, in (d) in FIG. 77, and in FIG. 78, processor 734 controls second actuator 752 so as to cause second hook 751a to swing and to bring second hook 751a close to second rail 402 and controls angle actuator 743 so as to change the angle of base 733 relative to support portion 732. Thus, processor 734 tilts base 733 such that second hook 751a is raised higher than first hook 731a (S8303).

As illustrated in FIG. 73, in (e) in FIG. 77, and in FIG. 78, processor 734 controls angle actuator 743 so as to restore the attitude of base 733 and controls second actuator 752 so as to cause second hook 751a to swing and to hook second hook 751a onto second rail 402. Thus, second hook 751a becomes connected to second rail 402 (S8304).

As illustrated in FIG. 73, in (f) in FIG. 77, and in FIG. 78, when first hook 731a is to be disengaged from first rail 401, processor 734 controls angle actuator 743 so as to change the angle of base 733 relative to support portion 732 and to tilt base 733 such that first hook 731a is raised higher than second hook 751a (S8305). At this point, first connected end 731a1 is located higher than second connected end 751a2. In this example, instead of base 733, main body 712 may be tilted.

As illustrated in FIG. 73, in (f) and (g) in FIG. 77, and in FIG. 78, first hook 731a becomes disengaged from first rail 401. Processor 734 controls angle actuator 743 so as to restore the attitude of base 733 and controls first actuator 741 so as to cause first hook 731a to swing and to disengage first hook 731a from first rail 401 (S8306).

As illustrated in FIG. 73, in (h) in FIG. 77, and in FIG. 78, processor 734 controls second actuator 752 so as to cause second hook 751a to pass between first rail 401 and second rail 402 and approach second rail 402 and controls angle actuator 743 so as to change the angle of base 733 relative to support portion 732. Thus, processor 734 tilts base 733 such that first hook 731a is raised higher than second hook 751a (S8307).

As illustrated in FIG. 73, in (i) in FIG. 77, and in FIG. 78, processor 734 controls angle actuator 743 so as to restore the attitude of base 733 and controls first actuator 741 so as to cause first hook 731a to swing and to hook first hook 731a onto second rail 402. Thus, first hook 731a becomes connected to second rail 402 (S8308). With the above operation, first hook 731a and second hook 751a become connected to second rail 402.

Advantageous Effects

Next, some advantageous effects of drone 701c and delivery system 4 according to the present embodiment will be described.

Connector 730d further includes second arm 751 connected to one end of support portion 732.

According to this configuration, not only first arm 731 but also second arm 751 can be connected to rail 400. Therefore, the possibility that drone 701c falls off from rail 400 can be reduced, and the safety in the system that includes drone 701c can be further increased.

First arm 731 is a first hanger for hanging drone 701c from rail 400. Second arm 751 is a second hanger for hanging drone 701c from rail 400. Connector 730d further includes first actuator 741 that sets the angle of first arm 731 relative to support portion 732 and second actuator 752 that sets the angle of second arm 751 relative to support portion 732.

This configuration makes it possible to hang drone 701c from rail 400 reliably. Therefore, the possibility that drone 701c falls off from rail 400 can be reduced, and the safety in the system that includes drone 701c can be further increased.

Connector 730d further includes base 733 disposed between support portion 732 and first and second arms 731 and 751 and a third actuator that sets the angle of base 733 relative to support portion 732.

According to this configuration, the height of first arm 731 relative to main body 712 or the height of second arm 751 relative to main body 712 can be changed only by changing the angle of base 733. Therefore, the heights of first arm 731 and second arm 751 can be changed without tilting main body 712, and thus the stability of drone 701c can be maintained.

First arm 731 includes first hook 731a that extends from first connected end 731a1 connected to first actuator 741 to first open end 731b1. Second arm 751 includes second hook 751a that extends from second connected end 751a2 connected to second actuator 752 to second open end 751b2. First hook 731a includes first bent portion 731c that is bent in a first direction and that is located between first connected end 731a1 and first open end 731b1. Second hook 751a includes second bent portion 751c that is bent in a second direction opposite the first direction and that is located between second connected end 751a2 and second open end 751b2.

According to this configuration, the horizontal attitude of main body 712 can be maintained when first hook 731a is hung on rail 400, and the horizontal attitude of main body 712 can be maintained also when second hook 751a is hung on rail 400. Therefore, first hook 731a and second hook 751a can maintain an appropriate attitude of drone 701c.

First hook 731a and second hook 751a make it easier to hook drone 701c from rail 400.

When drone 701c is slidably hung from first rail 401 via first hook 731a, processor 734 controls second actuator 752 so as to hook second hook 751a onto second rail 402 that extends along and adjacent to first rail 401 and controls first actuator 741 so as to disengage first hook 731a from first rail 401.

According to this configuration, for example, when first hook 731a of drone 701c is connected to first rail 401 and if first hook 731a is disengaged from first rail 401 after second hook 751a has become connected to second rail 402, drone 701c can switch the connection from first rail 401 to second rail 402 serving as another rail 400 and move along second rail 402. Therefore, drone 701c can reliably switch from one rail 400 to another rail 400 at the branching point of these rails 400. Thus, the possibility that drone 701c falls off can be reduced, and the safety in the system that includes drone 701c can be further increased.

Delivery system 4 includes drone 701c, a plurality of support pillars 791a, and first rail 401 and second rail 402 that are stretched between two adjacent support pillars 791a among the plurality of support pillars 791a.

When drone 701c is slidably hung from first rail 401 via first hook 731a and second hook 751a, processor 734 controls second actuator 752 so as to disengage second hook 751a from first rail 401 and to hook second hook 751a onto second rail 402 extending along and adjacent to first rail 401 and controls first actuator 741 so as to disengage first hook 731a from first rail 401 and to hook first hook 731a onto second rail 402.

According to this configuration, for example, when first hook 731a and second hook 751a of drone 701c are connected to first rail 401 and if first hook 731a is disengaged from first rail 401 and connected to second rail 402 after second hook 751a has been disengaged from first rail 401 and connected to second rail 402, drone 701c can switch the connection from first rail 401 to second rail 402 serving as another rail 400 and then move along second rail 402. Therefore, drone 701c can reliably switch from one rail 400 to another rail 400 at the branching point of these rails 400. Thus, the possibility that drone 701c falls off can be reduced, and the safety in the system that includes drone 701c can be further increased.

When second hook 751a is to be hooked onto second rail 402, processor 734 tilts main body 712 or support portion 732 in a second direction so as to position second connected end 751a2 higher than first connected end 731a1. When first hook 731a is to be disengaged from first rail 401, processor 734 tilts main body 712 or support portion 732 in a first direction so as to position first connected end 731a1 higher than second connected end 751a2.

According to this configuration, by tilting main body 712 or support portion 732, first hook 731a and second hook 751a can be hooked onto rail 400 with ease, or first hook 731a and second hook 751a can be disengaged from rail 400 with ease.

Delivery system 4 further includes protective net 794 stretched along a position vertically below the approaching region of first rail 401 and second rail 402. The approaching region is a region where the distance between first rail 401 and second rail 402 is smaller than or equal to the size of drone 701c.

According to this configuration, since distance H2 between first rail 401 and second rail 402 is smaller than width H1 (the size) of main body 712, drone 701c can make a switch from first rail 401 to second rail 402 with ease and then move along second rail 402.

As protective net 794 is provided along a position vertically below the approaching region of first rail 401 and second rail 402, even if drone 701c becomes disengaged from first rail 401 and second rail 402, the possibility that drone 701c falls to the ground can be reduced. Therefore, the safety in the system that includes drone 701c can be further increased.

Variation of Embodiment 8

In the following, basic configurations of drone 701c and of a delivery system according to the present variation are identical to the basic configurations of the drones and of the delivery systems according to Embodiment 7 and so on. Therefore, the descriptions of the basic configurations of drone 701c and of the delivery system according to the present variation will be omitted as appropriate.

Figure 79:
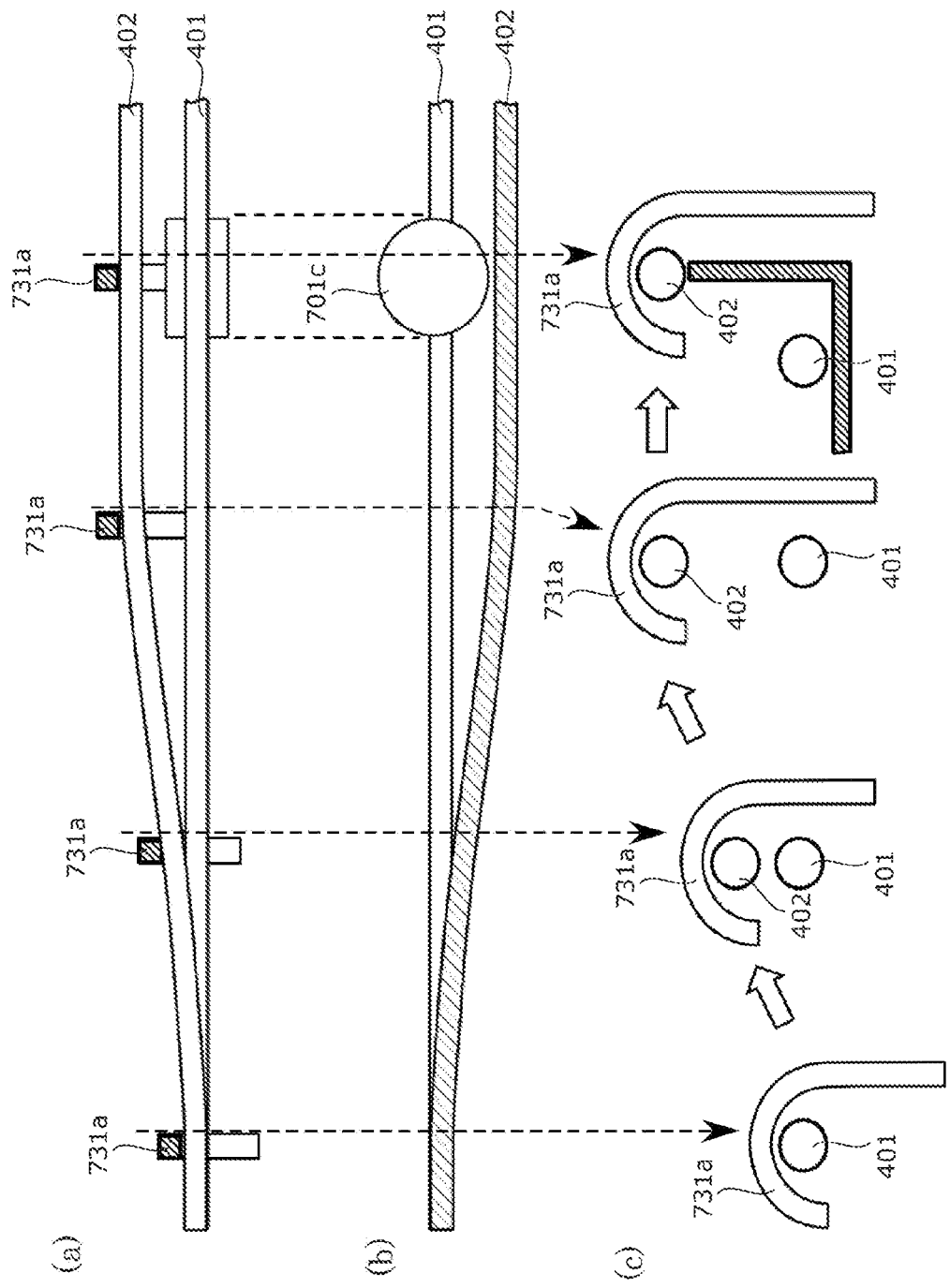
FIG. 79 illustrates a side view, a top view, and a front view of a first hook of a drone and rails of the delivery system according to Embodiment 8.

FIG. 79 illustrates a top view, a side view, and a front view of rails and first hook 731a of drone 701c of the delivery system according to a variation of Embodiment 8. In FIG. 79, (a) is a side view of first hook 731a of drone 701c of the delivery system, first rail 401, and second rail 402. In FIG. 79, (b) is a top view of first hook 731a of drone 701c of the delivery system, first rail 401, and second rail 402. In FIG. 79, (c) is a front view of first hook 731a of drone 701c of the delivery system, first rail 401, and second rail 402, as viewed from the traveling direction of drone 701c of the delivery system.

As illustrated in FIG. 79, in the present variation, the height of at least a portion of second rail 402 is higher than the height of adjacent first rail 401. Second rail 402 is a rail that branches off from first rail 401, and the leading end portion of second rail 402 is disposed along the direction in which first rail 401 extends. A portion of second rail 402 is disposed higher than first rail 401 and serves as a passing siding that extends so as to detour first rail 401. Second rail 402 is a rail for separating one of two drones 701c when these two drones 701c travel toward each other from opposite directions on first rail 401. In this example, first rail 401 and second rail 402 may each be a power transmission line.

In the delivery system according to the present variation, when a first drone of two drones 701c travels in a first moving direction along first rail 401 and a second drone of two drones 701c travels in a second moving direction opposite the first moving direction along first rail 401, the first drone switches the connection of connector 730d from first rail 401 to second rail 402 upon detecting the approaching second drone with the use of camera sensor 334 or the like. Since second rail 402 is higher than first rail 401, the second drone traveling on first rail 401 and the first drone traveling on second rail 402 can pass each other. Setting the heights of first rail 401 and second rail 402 differently can reduce the possibility that main body 712 of the first drone or a package therein makes contact with main body 712 of the second drone or a package therein.

In this example, since it suffices that the first drone and the second drone can pass each other, the distance between the first drone and the second drone may be secured by providing a space between first rail 401 and second rail 402.

Some advantageous effects of drone 701c and the delivery system configured as described above according to the present variation will be described.

The height of at least a portion of second rail 402 is higher than the height of adjacent first rail 401.

According to this configuration, when two drones 701c are traveling along first rail 401 in opposite directions, one drone 701c of two drones 701c can take refuge on second rail 402. Second rail 402 can be used as a refuge track. This configuration can keep drones 701c from colliding with each other or suppress the congestion of drones 701c.

Embodiment 9

In the following, basic configurations of drone 701 and of delivery system 5 according to the present embodiment are identical to the basic configurations of the drones and of the delivery systems described in Embodiment 7 and so on. Therefore, the descriptions of the basic configurations of drone 701 and of delivery system 5 according to the present embodiment will be omitted as appropriate. The present embodiment differs from Embodiment 7 and so on in that thruster device 910 is further provided with a package.

Figure 80:
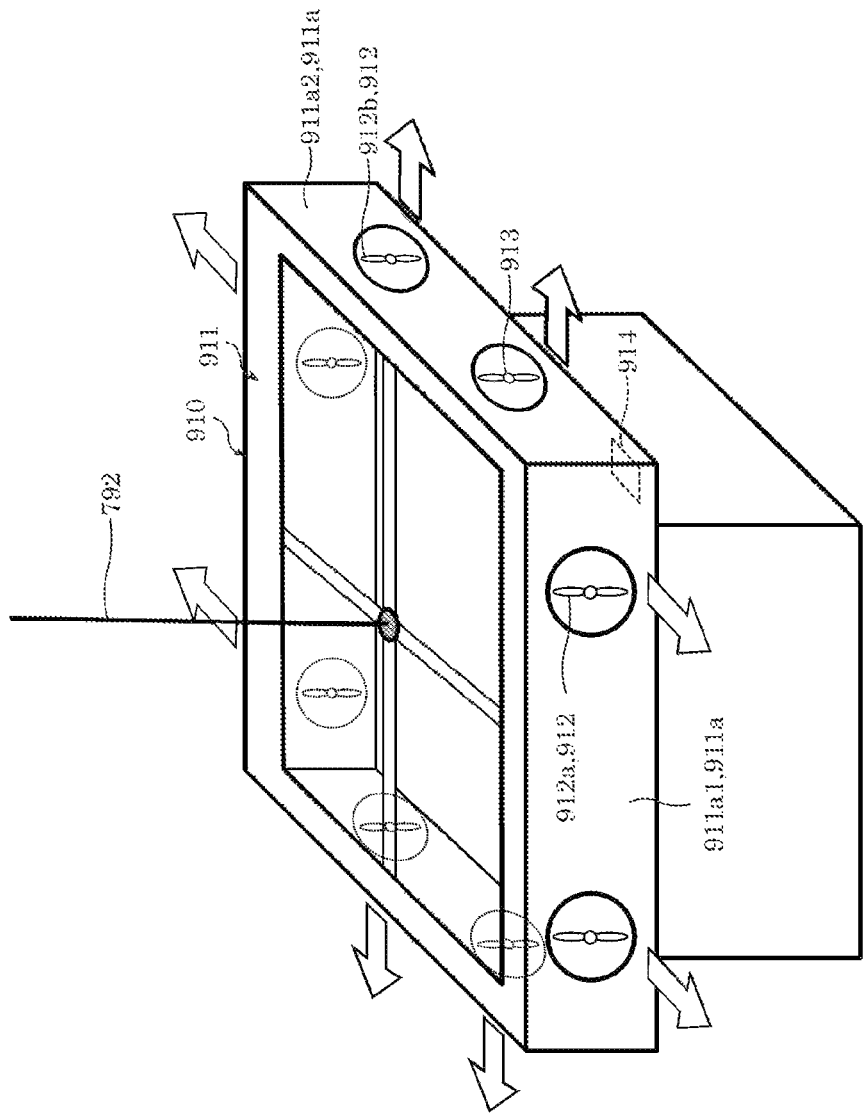
FIG. 80 is a perspective view illustrating an example of a thruster device of a delivery system and a package mounted to the thruster device according to Embodiment 9.
Figure 81:
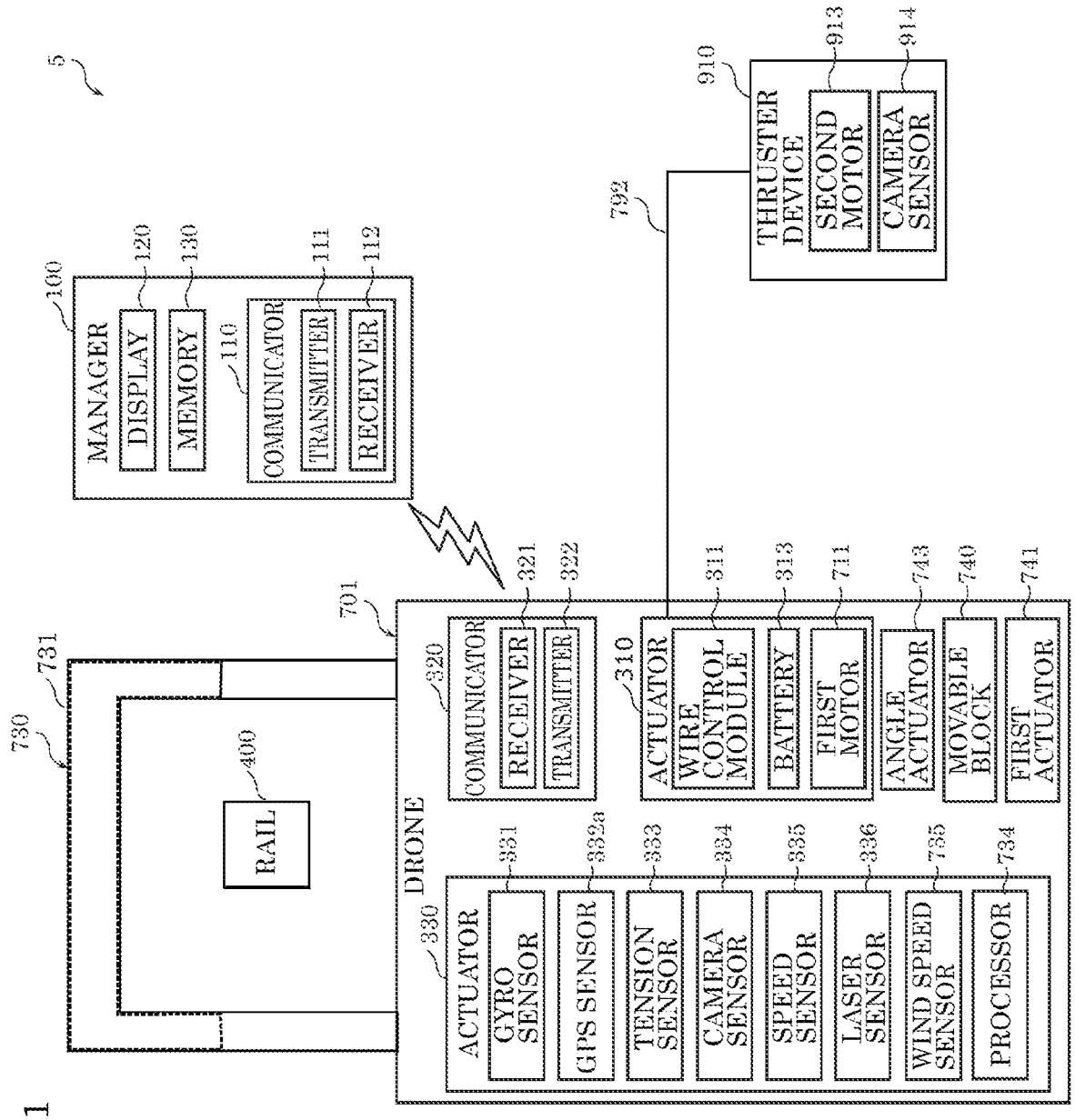
FIG. 81 is a block diagram illustrating a configuration of the delivery system according to Embodiment 9.

FIG. 80 is a perspective view illustrating an example of thruster device 910 of delivery system 5 and a package provided with thruster device 910 according to Embodiment 9. FIG. 81 is a block diagram illustrating a configuration of delivery system 5 according to Embodiment 9.

As illustrated in FIGS. 80 and 81, delivery system 5 further includes thruster device 910.

Thruster device 910 is a device to and from which a package is attachable and detachable and that can correct the position of the package relative to the delivery box. Thruster device 910 can communicate with main body 712 of drone 701 via hanging wire 792 or may wirelessly communicate with main body 712 via a communication module or the like. In this example, thruster device 910 may also be drone 701.

Thruster device 910 includes support member 911, a plurality of propellers 912, a plurality of second motors 913, and camera sensor 914.

Support member 911 engages with an upper portion of a package and can thus retain the package in a predetermined attitude. A lower end of hanging wire 792 is coupled to a center portion of support member 911. In the present embodiment, support member 911 is a frame-like member that encloses an upper periphery of a package. Support member 911 encloses the upper periphery of the package and grabs the package therein or connects itself to the package. Thus, support member 911 can retain the package in a predetermined attitude. In the present embodiment, support member 911 is a rectangular frame-like member.

Support member 911 supports the plurality of second motors 913 and the plurality of propellers 912. The plurality of second motors 913 and the plurality of propellers 912 are provided on an outer peripheral side portion 911*a* of support member 911. In the present embodiment, two propellers 912 and two second motors 913 are provided on each side of support member 911.

The plurality of propellers 912 are each disposed on outer peripheral side portion 911*a* of support member 911 and provided on support member 911 so as to produce the propulsive force in the horizontal direction. The plurality of propellers 912 are each provided on support member 911 in such an attitude where the plane of rotation of propeller 912 is substantially parallel to the vertical direction, and each propeller 912 sends out the air toward the outside of support member 911. The plane of rotation is a plane in which the blades of each propeller 912 rotate, and the plane of rotation is orthogonal to the axis of rotation of each propeller 912 (the axis of rotation of each second motor 913).

The plurality of propellers 912 include first propellers 912*a* and second propellers 912*b*. First propellers 912*a* are disposed on first side portion 911*a*1 that is included in outer peripheral side portion 911*a* of support member 911. Second propellers 912*b* are disposed on second side portion 911*a*2 that is included in outer peripheral side portion 911*a* of support member 911 and that is different from first side portion 911*a*1. In the present embodiment, first propellers 912*a* are provided on each of first side portion 911*a*1 on the front side and first side portion 911*a*1 on the rear side of outer peripheral side portion 911*a*, and second propellers 912*b* are provided on each of second side portion 911*a*2 on the right side and second side portion 911*a*2 on the left side of outer peripheral side portion 911*a*. The front side corresponds to the front side of thruster device 910 in the drawing, the rear side corresponds to the rear side of thruster device 910 in the drawing, the right side corresponds to the right side of thruster device 910 in the drawing, and the left side corresponds to the left side of thruster device 910 in the drawing.

The plurality of second motors 913 are electric motors that rotate respective propellers 912. For example, the power is supplied to second motors 913 from battery 313 of the main body of drone 701 via hanging wire 792. In this example, a battery may be provided in support member 911, and the power may be supplied to each of the plurality of second motors 913 from that battery.

Camera sensor 914 is provided on the side of support member 911 where support member 911 faces a package, that is, provided on a lower side of support member 911 in the vertical direction. Camera sensor 914 captures an image of delivery box 470 and outputs the acquired image information to processor 734. A plurality of camera sensors 914 may be provided.

Processor 734 of controller 330 provided in drone 701 performs control of actuating at least one of the plurality of second motors 913 of thruster device 910 in at least a portion of the period in which hanging wire 792 is being let out. Specifically, processor 734 calculates the position of delivery box 470 and the position of the package based on the image information acquired from camera sensor 914 of thruster device 910 and the image information acquired from camera sensor 334 of the main body of drone 701. Processor 734 controls the plurality of second motors 913 of thruster device 910 such that the package is located at a position vertically above the opening of the delivery box and moves thruster device 910 and the package such that the package is contained within the opening of the delivery box as viewed from the above. Specifically, processor 734 calculates the error (positional mismatch) between the opening of the delivery box and the package and corrects the position of the package relative to the opening of the delivery box so as to correct the calculated error.

Now, the procedures for storing a package into delivery box 470 with the use of thruster device 910 will be described. In the following, any description that overlaps the description given with reference to FIG. 58 will be omitted as appropriate.

Figure 82:
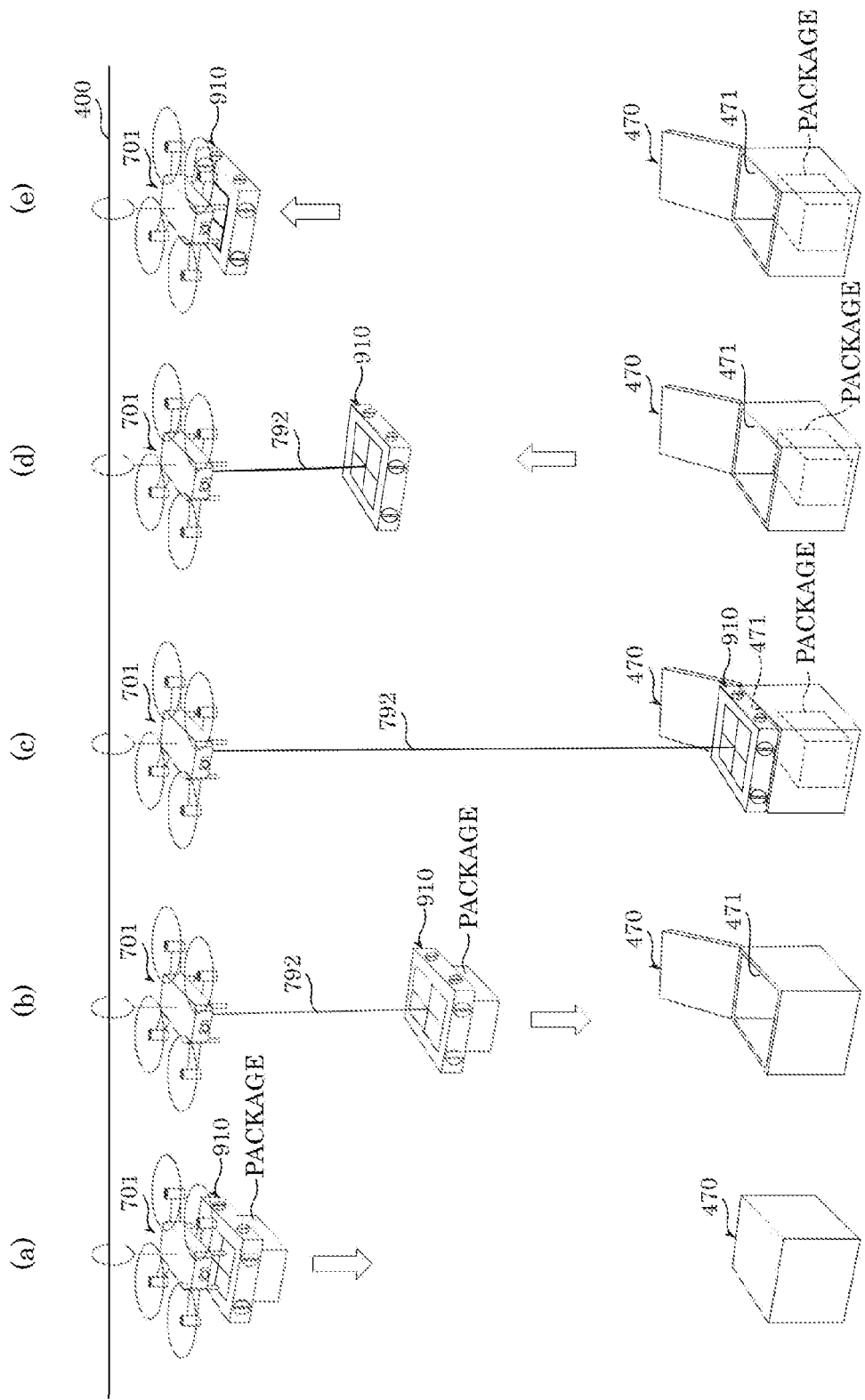
FIG. 82 is a schematic diagram illustrating an example of how a thruster device of the delivery system stores a package into a delivery box according to Embodiment 9.

FIG. 82 is a schematic diagram illustrating an example of how thruster device 910 of delivery system 5 stores a package into delivery box 470 according to Embodiment 9.

As illustrated in FIG. 81 and in (a) and (b) in FIG. 82, first, upon drone 701 arriving at a position vertically above delivery box 470 serving as a receiver, processor 734 starts letting out hanging wire 792 by controlling wire control module 311. As wire control module 311 lets out hanging wire 792 and when the distance between the package and delivery box 470 has reached a predefined distance, delivery box 470 opens its lid to release the opening.

Next, when processor 734 lets out hanging wire 792 by controlling wire control module 311, processor 734 measures the position of the package and the position of delivery box 470 and calculates an error in the position of the package relative to delivery box 470. If the error is greater than or equal to a predefined value, processor 734 corrects the position of the package relative to opening 471 of delivery box 470 by controlling each of the plurality of second motors 913 of thruster device 910. Processor 734 may move drone 701 so as to correct the position of the package relative to opening 471 of delivery box 470 by controlling the plurality of first motors 711. How the position of the package is corrected with the use of thruster device 910 will be described later in detail.

As illustrated in FIG. 81 and in (c) in FIG. 82, processor 734 positions thruster device 910 relative to opening 471 of delivery box 470 by repeatedly correcting the error in the position of thruster device 910 relative to the position of opening 471 of delivery box 470 and brings the position of thruster device 910 to match the position of opening 471 of delivery box 470. Processor 734 stores the package into delivery box 470 with the use of thruster device 910. Specifically, thruster device 910 descends over opening 471 of delivery box 470 and stores the package into delivery box 470.

As illustrated in FIG. 81 and in (d) and (e) in FIG. 82, after thruster device 910 has stored the package in delivery box 470, thruster device 910 cuts off the package, ascends, and becomes mounted onto the main body of drone 701. Then, drone 701 returns to the sender.

Now, an example in which the position of a package is corrected with the use of thruster device 910 will be described.

Figure 83:
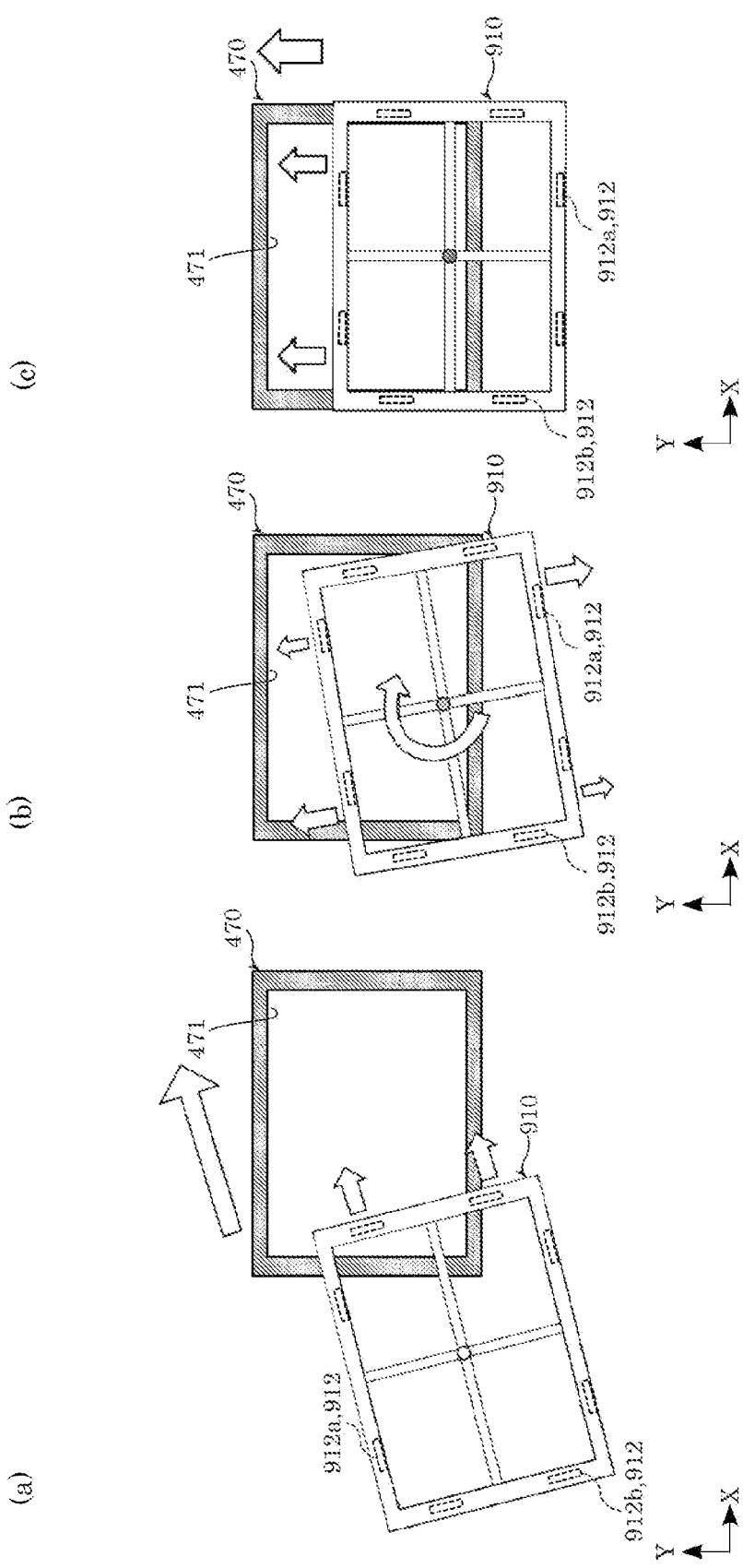
FIG. 83 is a top view of a thruster device of the delivery system and a delivery box according to Embodiment 9.

FIG. 83 is a top view of thruster device 910 of delivery system 5 and delivery box 470 according to Embodiment 9. FIG. 83 illustrates thruster device 910 and delivery box 470 as viewed from the above.

In FIG. 81 and in (a) in FIG. 83, although opening 471 of delivery box 470 and thruster device 910 partially overlap each other, thruster device 910 cannot store the package into delivery box 470 in this state. Therefore, processor 734 moves thruster device 910 in an XY-direction that is a composite of the X-axis direction and the Y-axis direction by controlling each of the plurality of second motors 913. For example, processor 734 moves drone 701 in the XY-direction by controlling each of two second motors 913 on second side portion 911a2 on the left side, and this results in the state illustrated in (b) in FIG. 83.

In FIG. 81 and in (b) in FIG. 83, opening 471 of delivery box 470 and thruster device 910 partially overlap each other, but the position of opening 471 of delivery box 470 and the position of the package fail to match. Processor 734 rotates thruster device 910 by a predetermined roll angle in the XY-plane by controlling each of the plurality of second motors 913. For example, processor 734 controls second motor 913 on the right side on first side portion 911a1 on the rear side and controls second motor 913 on the left side on first side portion 911a1 on the front side. Thus, processor 734 rotates thruster device 910 in the XY-plane, and this results in the state illustrated in (c) in FIG. 83.

In FIG. 81 and in (c) in FIG. 83, opening 471 of delivery box 470 and thruster device 910 partially overlap each other, but the position of opening 471 of delivery box 470 and the position of the package still fail to match. Processor 734 moves thruster device 910 in the Y-axis direction by controlling each of the plurality of second motors 913. For example, processor 734 moves drone 701 in the Y-axis direction by controlling each of two second motors 913 on first side portion 911a1 on the front side and brings the position of thruster device 910 to match the position of opening 471 of delivery box 470 so that the package is contained within opening 471 of delivery box 470. Thus, thruster device 910 can store the package into delivery box 470.

Figure 84:
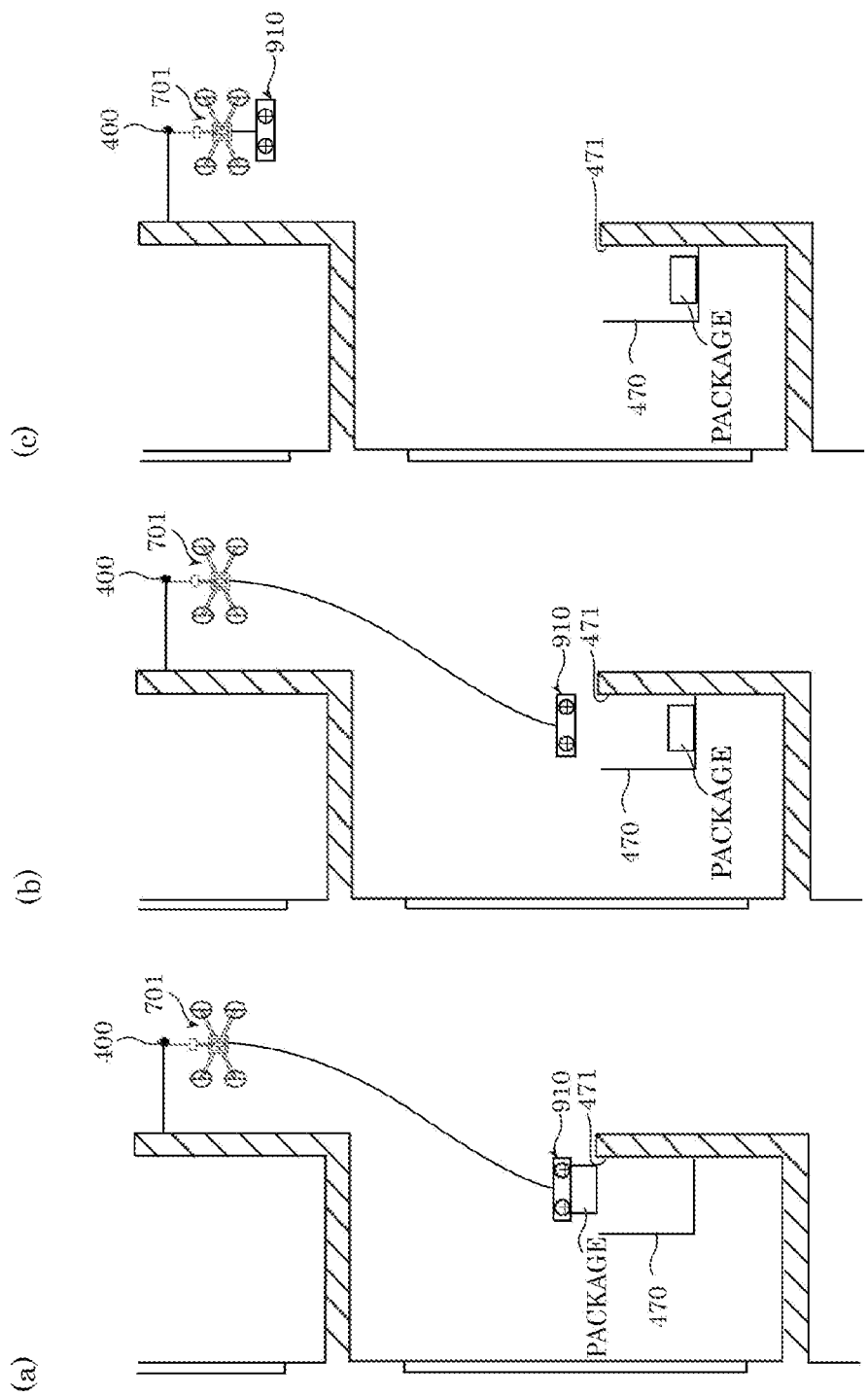
FIG. 84 is a schematic diagram illustrating an example of how a drone delivers a package to an apartment building with the use of a thruster device of the delivery system according to Embodiment 9.

FIG. 84 is a schematic diagram illustrating an example of how drone 701 delivers a package to an apartment building with the use of thruster device 910 of delivery system 5 according to Embodiment 9.

As illustrated in FIGS. 81 and 84, in a case where delivery box 470 is present vertically below rail 400, processor 734 recognizes delivery box 470 based on the image information acquired from camera sensor 914 and stores a package into delivery box 470 by controlling the plurality of second motors 913 of thruster device 910.

Specifically, in FIG. 81 and in (a) in FIG. 84, processor 734 starts letting out hanging wire 792 by controlling wire control module 311, calculates the position of delivery box 470 based on the image information, and controls the plurality of second motors 913. This causes thruster device 910 to move toward delivery box 470. Then, thruster device 910 moves to a position vertically above opening 471 of delivery box 470.

In FIG. 81 and in (b) in FIG. 84, processor 734 causes thruster device 910 to store the package into delivery box 470. Specifically, thruster device 910 descends toward opening 471 of delivery box 470 and stores the package into delivery box 470.

As illustrated in FIG. 81 and in (c) in FIG. 84, after thruster device 910 has stored the package in delivery box 470, thruster device 910 cuts off the package, ascends, and becomes mounted onto main body 712. Then, drone 701 returns to the sender.

Advantageous Effects

Next, some advantageous effects of drone 701 and delivery system 5 according to the present embodiment will be described.

Drone 701 further includes thruster device 910 attachable to and detachable from a package. Thruster device 910 includes a plurality of propellers 912, a plurality of second motors 913 that rotate respective propellers 912, and support member 911 that supports the plurality of second motors 913.

According to this configuration, even if the position of drone 701 fails to match the position directly above delivery box 470, thruster device 910 can guide the package to delivery box 470. Therefore, drone 701 can reliably lower the package and store the package into delivery box 470, which in turn makes it possible to deliver the package more reliably to the receiver. Even in a case where opening 471 of delivery box 470 is small and it is hard to insert a package into delivery box 470, drone 701 can reliably insert the package into delivery box 470. Thus, drone 701 does not require a large space for landing.

In particular, with this drone 701, even in a case where drone 701 moves from the position directly above delivery box 470 due to the wind or the like, thruster device 910 can store a package into delivery box 470.

The plurality of propellers 912 include first propellers 912a disposed on first side portion 911a1 of support member 911 and second propellers 912b disposed on second side portion 911a2 of support member 911 that is different from first side portion 911a1.

According to this configuration, the position and the orientation of thruster device 910 relative to delivery box 470 can be adjusted. Therefore, with this drone 701, thruster device 910 can more reliably store a package into delivery box 470.

Processor 734 performs control of causing thruster device 910 to actuate at least one of the plurality of second motors 913 in at least a portion of the period in which hanging wire 792 is being let out.

According to this configuration, when a package is lowered from drone 701, the position and the orientation of thruster device 910 relative to delivery box 470 can be adjusted. Therefore, with this drone 701, a package can be stored smoothly into delivery box 470.

Embodiment 10

Configuration

Since the basic configuration of thruster device 1001 according to the present embodiment is the same as the basic configuration of the thruster device according to Embodiment 9 and the like, repeated description of the basic configuration of thruster device 1001 in the present embodiment will be omitted where appropriate. The present embodiment differs from Embodiment 9 and the like in that motor 1010 of thruster device 1001 pivots relative to the frame.

Figure 85:
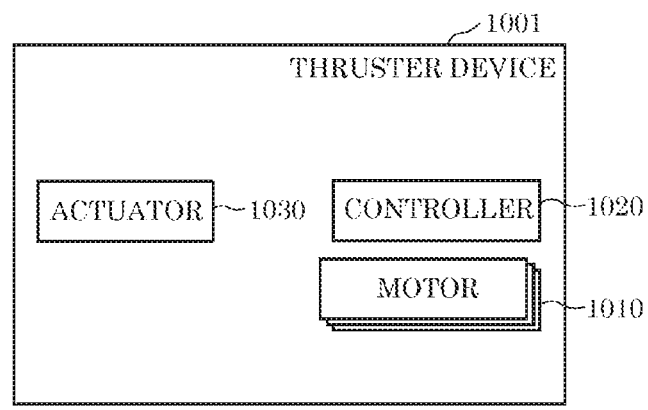
FIG. 85 is a block diagram illustrating an example of the thruster device according to Embodiment 10.
Figure 86:
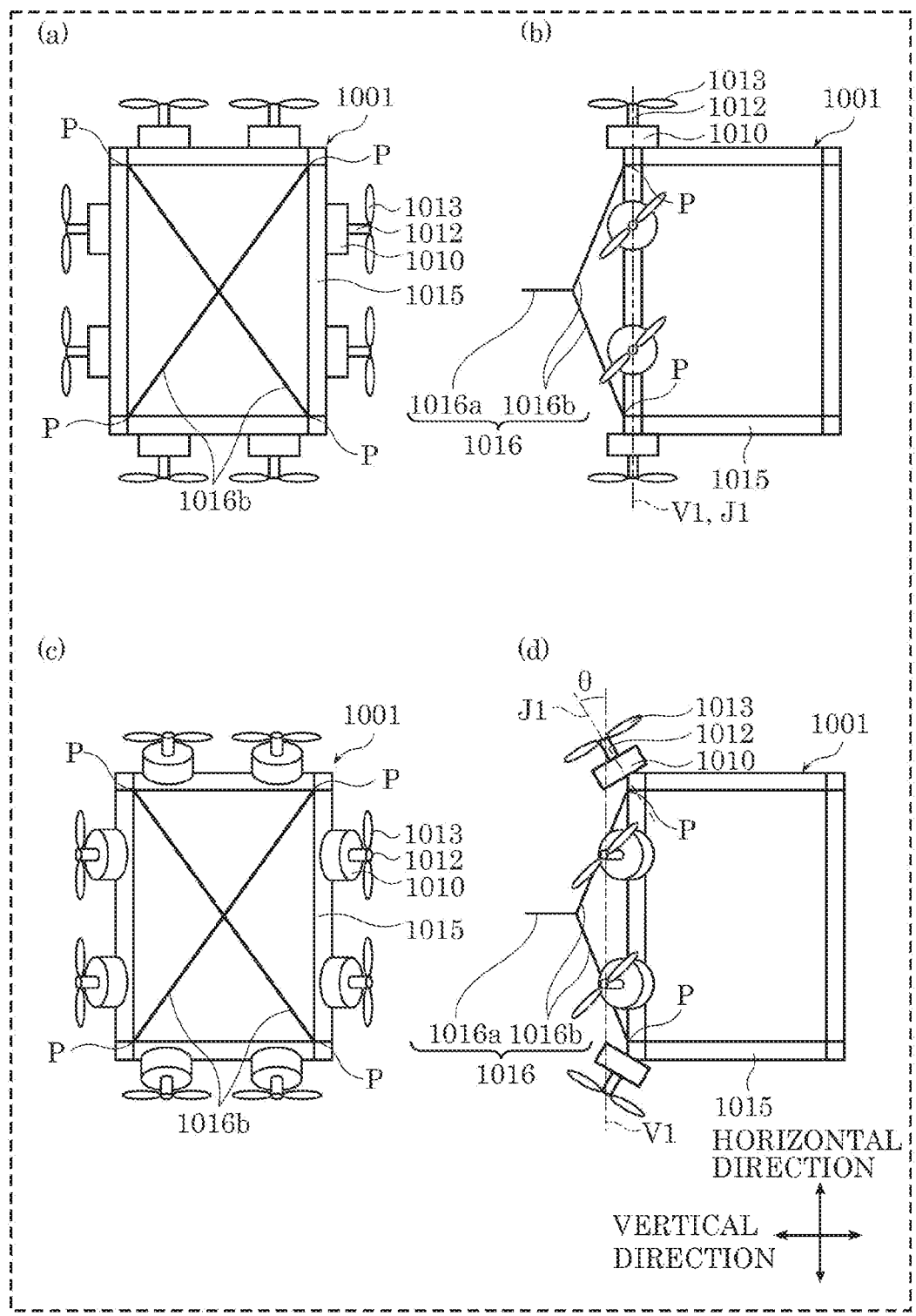
FIG. 86 is a schematic diagram illustrating an example of the thruster device according to Embodiment 10.

FIG. 85 is a block diagram illustrating an example of thruster device 1001 according to Embodiment 10. FIG. 86 is a schematic diagram illustrating an example of thruster device 1001 in the delivery system according to Embodiment 10. In FIG. 86, (a) is a plan view of thruster device 1001 when viewed from vertically above and when rotary shaft 1012 of motor 1010 is parallel to virtual surface V1, and (b) is a side view of thruster device 1001 when rotary shaft 1012 of motor 1010 is parallel to virtual surface V1. In FIG. 86, (c) is a plan view of thruster device 1001 when viewed from vertically above and when rotary shaft 1012 of motor 1010 is inclined relative to virtual surface V1, and (d) is a side view of thruster device 1001 when rotary shaft 1012 of motor 1010 is inclined relative to virtual surface V1. Thruster device 1001 is one example of a device. The arrows indicating the horizontal and vertical directions in FIG. 86 correspond to (b) and (d) in FIG. 86.

As illustrated in FIG. 85 and FIG. 86, thruster device 1001 includes support member 1015, wire 1016, a plurality of motors 1010, a plurality of propellers 1013, controller 1020, and one or more actuators 1030.

The package is attachable to and detachable from support member 1015. Support member 1015 is shaped according to the plan view shape of the package, and has a polygonal frame that surrounds the package. In the present embodiment, support member 1015 has a rectangular shape, which is one example of a polygonal shape.

Support member 1015 can hold the package at a predetermined attitude by housing the package inside and gripping the package around the top edge of the package to clamp the package, or by connecting to the package. In the present embodiment, support member 1015 includes an opening into which the package is inserted. When the attitude of virtual surface V1 (to be described later) is parallel to the horizontal plane, the opening is formed vertically (a direction parallel to the lengthwise direction of main wire 1016*a* to be described later) downward of support member 1015.

Wire 1016 is capable of hanging support member 1015, and is directly connected to at least one connection point P of support member 1015. Wire 1016 hangs support member 1015 by one end of wire 1016 being connected to support member 1015 and the other end being connected to an object positioned spaced apart from the ground surface. The object is, for example, the rail or the unmanned aerial vehicle such as a drone described above. In the present embodiment, when virtual surface V1 is parallel to the horizontal plane, wire 1016 is connected to the vertical upper side of support member 1015. When thruster device 1001 is hung from an object, wire 1016 holds thruster device 1001 at a horizontal attitude.

Wire 1016 includes main wire 1016*a* and a plurality of sub-wires 1016*b*.

One end of main wire 1016*a* is connected to the plurality of sub-wires 1016*b*, and the other end of main wire 1016*a* is connected to the object. Main wire 1016*a* hangs and supports support member 1015 from an object via the plurality of sub-wires 1016*b*. When thruster device 1001 is hung from an object, main wire 1016*a* is pulled along the vertical direction by support member 1015.

One ends of the plurality of sub-wires 1016*b* are directly connected to and fixed at a plurality of connection points P of support member 1015. More specifically, one ends of the plurality of sub-wires 1016*b* are connected in a one to one relationship with a plurality of corners of support member 1015, which has a polygonal plan view shape. Other ends of plurality of sub-wires 1016*b* are connected to one end of main wire 1016*a* at a single common connection point P. The plurality of connection points P are arranged at corners of the frame (which are portions of the frame) corresponding to vertices in a plan view. Since support member 1015 has a rectangular plan view shape in the present embodiment, the plurality of sub-wires 1016*b* are connected in one to one relationship with the four corners corresponding to the four vertices of the rectangle.

Note that some of the plurality of connection points P arranged on support member 1015 may move on support member 1015.

The plurality of motors 1010 are arranged on the side portion forming the outer periphery of support member 1015. The plurality of motors 1010 are dispersedly arranged so as to surround support member 1015 and are supported by support member 1015. The plurality of motors 1010 are pivotably supported by actuators 1030 relative to the frame. In the present embodiment, the plurality of motors 1010 are arranged on the vertically upper side of support member 1015 when the attitude of virtual surface V1 is parallel to the horizontal plane.

The plurality of motors 1010 are electric motors that rotate the plurality of propellers 1013 by the main body of the motors rotating rotary shafts 1012. For example, motor 1010 may be supplied with power from a battery included in thruster device 1001 via wire 1016. Note that when the object from which thruster device 1001 is hung is a drone, motor 1010 may be supplied with power from a battery included in the main body of the drone. Each of the plurality of motors 1010 may be supplied with power from these batteries.

The plurality of propellers 1013 correspond to the plurality of rotary shafts 1012 of the plurality of motors 1010 one to one, and are fixed one to one to the plurality of rotary shafts 1012 of the plurality of motors 1010. The plurality of propellers 1013 are respectively actuated by the plurality of motors 1010, and generate thrust along the lengthwise direction of rotary shafts 1012. The planes of rotation of the plurality of propellers 1013 incline relative to virtual surface V1 in synchronization with the pivoting of the plurality of motors 1010. When the attitudes of the plurality of motors 1010 relative to support member 1015 are the same, virtual surface V1 is a plane including the centers of the plurality of propellers 1013. Virtual surface V1 is preferably a virtual plane. The center of propeller 1013 refers to the point at which axis J1 of rotary shaft 1012 of motor 1010 and the plane of rotation of propeller 1013 intersect.

An angle θ of rotary shaft 1012 (i.e., axis J1) of each motor 1010 relative to virtual surface V1 is at least −45 degrees and at most +45 degrees. The angle θ is the range over which rotary shaft 1012 of each motor 1010 can pivot relative to virtual surface V1, and the angle θ of axis J1 of rotary shaft 1012 relative to virtual surface V1 ranges from −45 degrees to +45 degrees with reference to virtual surface V1. In particular, the angle θ is preferably at least −30 degrees and at most +30 degrees.

Controller 1020 controls the plurality of motors 1010.

More specifically, controller 1020 controls one or more actuators 1030 to adjust the angle θ of rotary shafts 1012 of the plurality of motors 1010 relative to virtual surface V1. Controller 1020 controls one or more actuators 1030 to control the attitudes of the plurality of motors 1010 by pivoting the plurality of motors 1010 relative to support member 1015. Controller 1020 controls the angle θ at which the plurality of motors 1010 are to be pivoted relative to support member 1015, i.e., the angle θ of rotary shafts 1012 of the plurality of motors 1010 relative to virtual surface V1.

Note that controller 1020 can individually control the angle θ of each of the plurality of motors 1010 relative to virtual surface V1.

Controller 1020 also controls the rotation rate of rotary shafts 1012 of plurality of motors 1010. Controller 1020 controls the rotation rate of rotary shafts 1012 by changing the current value supplied to the plurality of motors 1010. Note that controller 1020 can also individually control the rotation rate of each of rotary shafts 1012 of plurality of motors 1010.

Controller 1020 includes a first mode and a second mode.

The first mode inclines rotary shafts 1012 so that the angle θ of rotary shafts 1012 of the plurality of motors 1010 relative to virtual surface V1 is 0 degrees. The second mode inclines one or more rotary shafts 1012 relative to virtual surface V1 so that the angle θ is an elevation angle.

The one or more actuators 1030 adjust the angle θ of rotary shafts 1012 of plurality of motors 1010 relative to virtual surface V1. More specifically, the one or more actuators 1030 are actuated by controller 1020 to change the attitudes of the plurality of motors 1010 relative to support member 1015 by pivoting the plurality of motors 1010. The one or more actuators 1030 are, for example, an actuation mechanism such as a gear, a pulley, a belt, or the like.

Operations

In this thruster device 1001, when connected to an object via wire 1016, controller 1020 controls the attitude of the plurality of motors 1010 via one or more actuators 1030 so that axis J1 of rotary shaft 1012 is parallel to a horizontal plane, for example. For example, when thruster device 1001 moves in a horizontal plane, controller 1020 controls the attitudes of the plurality of motors 1010 so that axis J1 of rotary shafts 1012 of the plurality of motors 1010 are parallel to the horizontal plane, as illustrated in (a) and (b) in FIG. 86. Controller 1020 actuates one or more motors 1010 located on the side facing away from the desired direction of travel. This allows thruster device 1001 to proceed in the desired direction.

In this thruster device 1001, when connected to an object via wire 1016, controller 1020 controls the attitude of the plurality of motors 1010 via one or more actuators 1030 so as to incline axis J1 of rotary shaft 1012 relative to the horizontal plane, for example. For example, when thruster device 1001 is to be caused to rise or hover, controller 1020 controls the attitudes of the plurality of motors 1010 so as to incline axis J1 of rotary shafts 1012 of the plurality of motors 1010 relative to the horizontal plane, as illustrated in (c) and (d) in FIG. 86. Controller 1020 actuates one or more motors 1010. This allows thruster device 1001 to rise or hover.

In this way, when a package is to be stored in a delivery box, thruster device 1001 can be positioned with respect to the opening of the delivery box so that the package fits into the opening of the delivery box when viewed from the vertical direction.

Advantageous Effects

Next, the advantageous effects achieved by thruster device 1001 according to the present embodiment will be described.

As described above, thruster device 1001 according to the present embodiment includes: support member 1015 to and from which a package is attachable and detachable; wire 1016 capable of hanging support member 1015 by one end of wire 1016 being connected to support member 1015 and the other end of wire 1016 being connected to an object positioned spaced apart from the ground surface; a plurality of motors 1010 arranged on the side portion of support member 1015; a plurality of propellers 1013 actuated by the plurality of motors 1010; and controller 1020 that controls the plurality of motors 1010. An angle θ of each of rotary shafts 1012 of the plurality of motors 1010 relative to virtual surface V1 passing through a center of each of the plurality of propellers 1013 is at least −45 degrees and at most +45 degrees.

According to this, by controlling the angle θ of rotary shafts 1012 of the plurality of motors 1010 relative to the virtual surface V1, when the package is to be placed at a predetermined position, the package can be positioned relative to the predetermined position. It is possible to finely adjust the position of thruster device 1001 relative to the predetermined position by causing thruster device 1001 to travel in the desired direction.

When thruster device 1001 descends while support member 1015 is hanging from the object via wire 1016, it is possible to finely adjust the position of thruster device 1001 so that the package aligns with the predetermined position when viewed from the vertical direction.

Accordingly, with this thruster device 1001, the package can be placed in the predetermined position. In particular, when thruster device 1001 is used outdoors, even if thruster device 1001 is misaligned with the predetermined position due to wind or the like, thruster device 1001 can move toward the predetermined position to compensate for the misalignment so that package can be placed at the predetermined position.

In thruster device 1001 according to the present embodiment, the angle θ is preferably at least −30 degrees and at most +30 degrees.

Since this inhibits an increase in the amount of thrust thruster device 1001 produces for hovering, for example, it is possible to inhibit wire 1016 from becoming slack due to thruster device 1001 suddenly rising.

Thruster device 1001 according to the present embodiment further includes one or more actuators 1030 that adjust the angle θ of rotary shafts 1012 of the plurality of motors 1010 relative to virtual surface V1.

This makes it possible to adjust the attitudes of the plurality of motors 1010 relative to support member 1015. Accordingly, this allows thruster device 1001 to move horizontally and vertically. This allows for more accurate positioning of the package to align with the predetermined position.

In thruster device 1001 according to the present embodiment, controller 1020 adjusts the angle θ of the one or more rotary shafts 1012 relative to virtual surface V1 by controlling the one or more actuators 1030, and includes a first mode that inclines the one or more rotary shafts 1012 so that the angle θ is 0 degrees, and a second mode that inclines the one or more rotary shafts 1012 so that the angle θ is an elevation angle.

This makes it possible to individually control the attitude of each rotary shaft 1012 of one or more motors 1010 among the plurality of rotary shafts 1012 of the plurality of motors 1010. The position of thruster device 1001 can be finely adjusted more precisely because the attitude, traveling direction, and the like of thruster device 1001 can be finely controlled so that thruster device 1001 moves to the predetermined position.

In thruster device 1001 according to the present embodiment, wire 1016 includes main wire 1016a and a plurality of sub-wires 1016b. One ends of the plurality of sub-wires 1016b are directly connected to a plurality of connection points P of support member 1015. Other ends of plurality of sub-wires 1016b are connected to one end of main wire 1016a at a single common connection point P. Main wire 1016a hangs and supports support member 1015 from an object via the plurality of sub-wires 1016b.

This makes it possible to connect the plurality of sub-wires 1016b to support member 1015 in one to one correspondence via the plurality of connection points P. Therefore, the attitude of support member 1015 while it is hanging by wire 1016 can be stabilized.

In thruster device 1001 according to the present embodiment, support member 1015 includes a polygonal frame arranged around the package. The plurality of connection points P are arranged at a plurality of portions of the frame corresponding to the plurality of vertices.

With this, the attitude of support member 1015 while it is hanging by wire 1016 can be more reliably stabilized.

Variation 1 of Embodiment 10

Since the basic configuration of thruster device 1001a according to the present variation is the same as the basic configuration of the thruster device according to Embodiment 10 and the like, repeated description of the basic configuration of thruster device 1001a in the present variation will be omitted where appropriate. The present variation differs from Embodiment 10 and the like in that connection point P moves (shifts).

Figure 87:
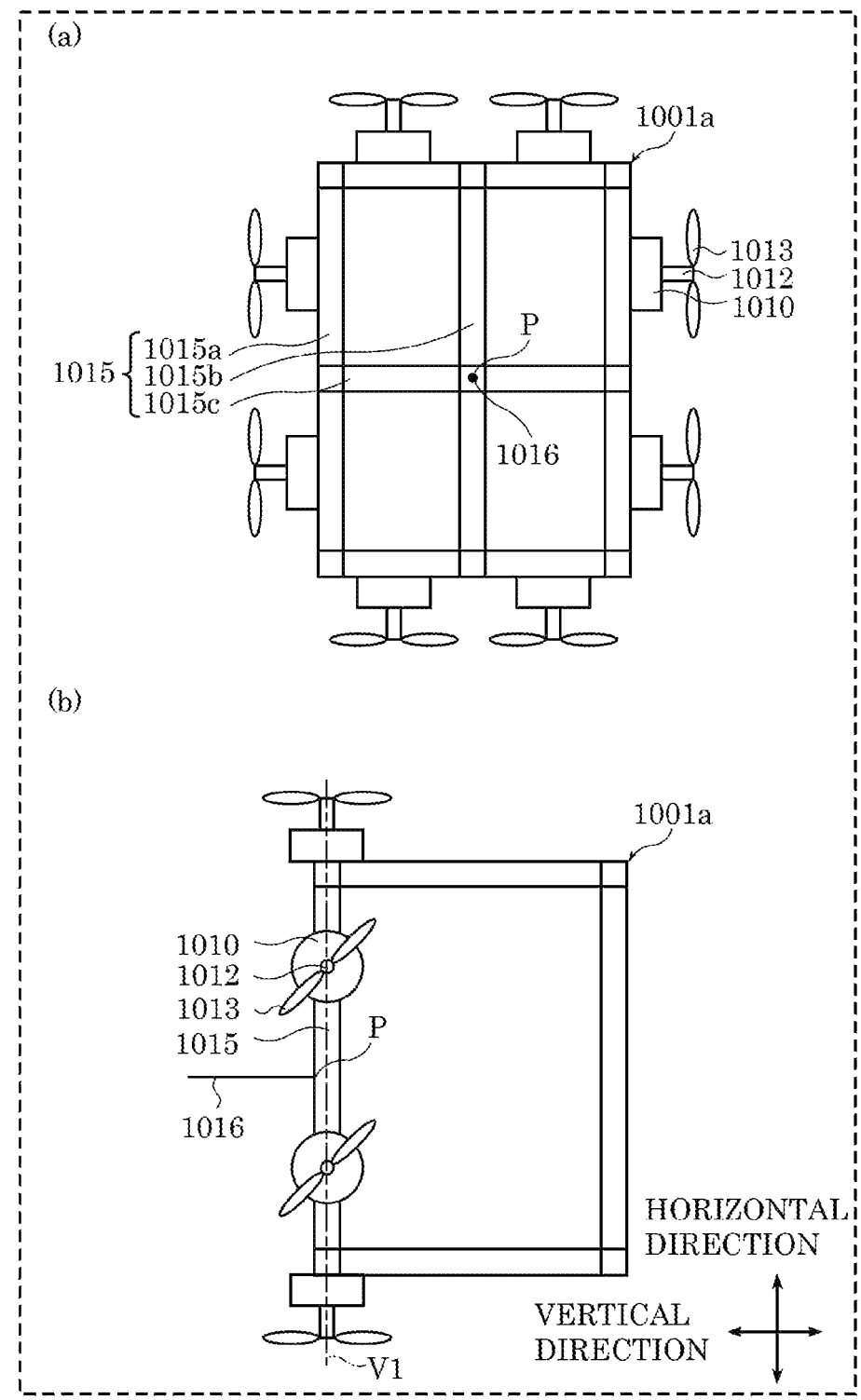
FIG. 87 is a schematic diagram illustrating an example of the thruster device according to Variation 1 of Embodiment 10.

FIG. 87 is a schematic diagram illustrating an example of thruster device 1001a according to Variation 1 of Embodiment 10. In FIG. 87, (a) is a plan view of thruster device 1001a when viewed from vertically above illustrating support member 1015 and wire 1016 and the like, and (b) is a side view of thruster device 1001a illustrating support member 1015 and wire 1016 and the like. The arrows indicating the horizontal and vertical directions in FIG. 87 correspond to (b) in FIG. 87.

In the present variation, connection point P is arranged in the center of support member 1015. More specifically, when virtual surface V1 is parallel to the horizontal plane, connection point P is located at the center of the vertical upper surface of the support member 1015.

Support member 1015 includes outer frame 1015a, vertical crosspiece 1015b, and horizontal crosspiece 1015c.

Outer frame 1015a forms the outer contour of support member 1015 and holds the package at a predetermined attitude. Outer frame 1015a has a polygonal shape that is arranged around the package. Vertical crosspiece 1015b and horizontal crosspiece 1015c are disposed inside outer frame 1015a in a lattice pattern and are disposed on the vertical upper side of support member 1015 when virtual surface V1 is parallel to the horizontal plane. When outer frame 1015a is viewed vertically, vertical crosspiece 1015b and horizontal crosspiece 1015c intersect at the center of outer frame 1015a. This connection point P is located at the intersection of vertical crosspiece 1015b and horizontal crosspiece 1015c.

Figure 88:
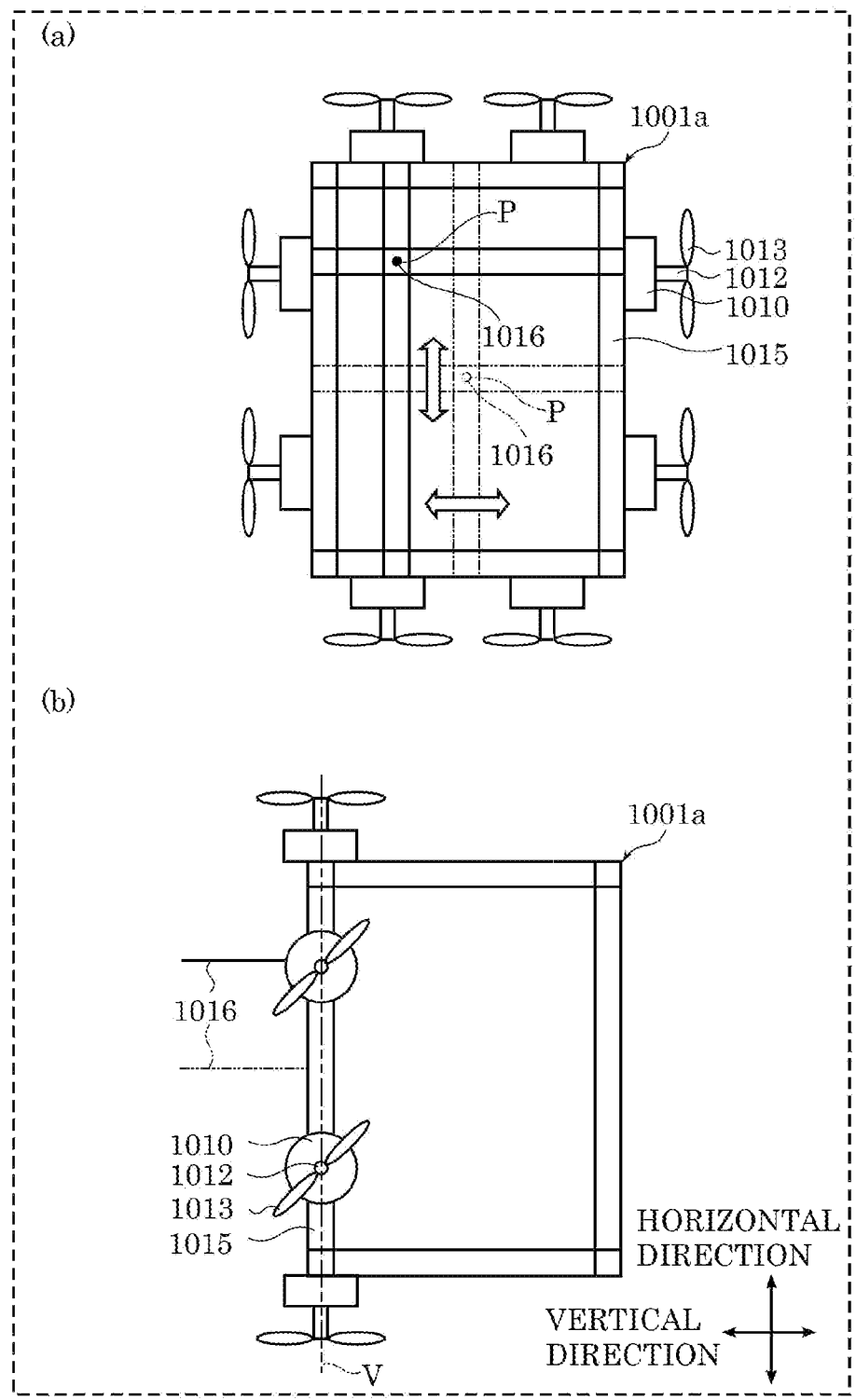
FIG. 88 is a schematic diagram illustrating an example of the sliding of the vertical crosspiece and the horizontal crosspiece included in the thruster device according to Variation 1 of Embodiment 10.

FIG. 88 is a schematic diagram illustrating an example of the sliding of vertical crosspiece 1015b and horizontal crosspiece 1015c included thruster device 1001a according to Variation 1 of Embodiment 10. The arrows indicating the horizontal and vertical directions in FIG. 88 correspond to (b) in FIG. 88.

Vertical crosspiece 1015b and horizontal crosspiece 1015c can slide within outer frame 1015a. The position of the intersection of vertical crosspiece 1015b and horizontal crosspiece 1015c shifts inside outer frame 1015a. More specifically, vertical crosspiece 1015b can slide in a direction orthogonal to the lengthwise direction of horizontal crosspiece 1015c. Stated differently, horizontal crosspiece 1015c can slide in a direction orthogonal to the lengthwise direction of vertical crosspiece 1015b. By vertical crosspiece 1015b and horizontal crosspiece 1015c sliding within outer frame 1015a, the one connection point P is movable in a plane parallel to virtual surface V1. A plane parallel to virtual surface V1 is a region in which vertical crosspiece 1015b and horizontal crosspiece 1015c can slide inside of the outer frame 1015a.

In thruster device 1001a according to the present variation, wire 1016 is directly connected to at least one connection point P of support member 1015.

This makes it possible to hang support member 1015 via wire 1016 with only one connection point P on support member 1015. Accordingly, the configuration of wire 1016 can be simplified.

In thruster device 1001a according to the present variation, support member 1015 includes a polygonal frame arranged around the package. One connection point P is movable in a plane that is within the frame and parallel to virtual surface V1.

This makes it possible to change the position of the one connection point P relative to support member 1015. Accordingly, for example, even if the center of gravity of support member 1015 that is holding a package is displaced from the center, the position of connection point P can be changed so as to align the position of connection point P with the center of gravity. Therefore, the attitude of support member 1015 hanging from wire 1016 can be corrected to a desired attitude.

Variation 2 of Embodiment 10

Since the basic configuration of thruster device 1001a according to the present variation is the same as the basic configuration of the thruster device according to Variation 1 of Embodiment 10 and the like, repeated description of the basic configuration of thruster device 1001a in the present variation will be omitted where appropriate. The present variation differs from Variation 1 of Embodiment 10 and the like in that some of the plurality of motors 1010 of thruster device 1001a rotate clockwise and others rotate counterclockwise.

Figure 89:
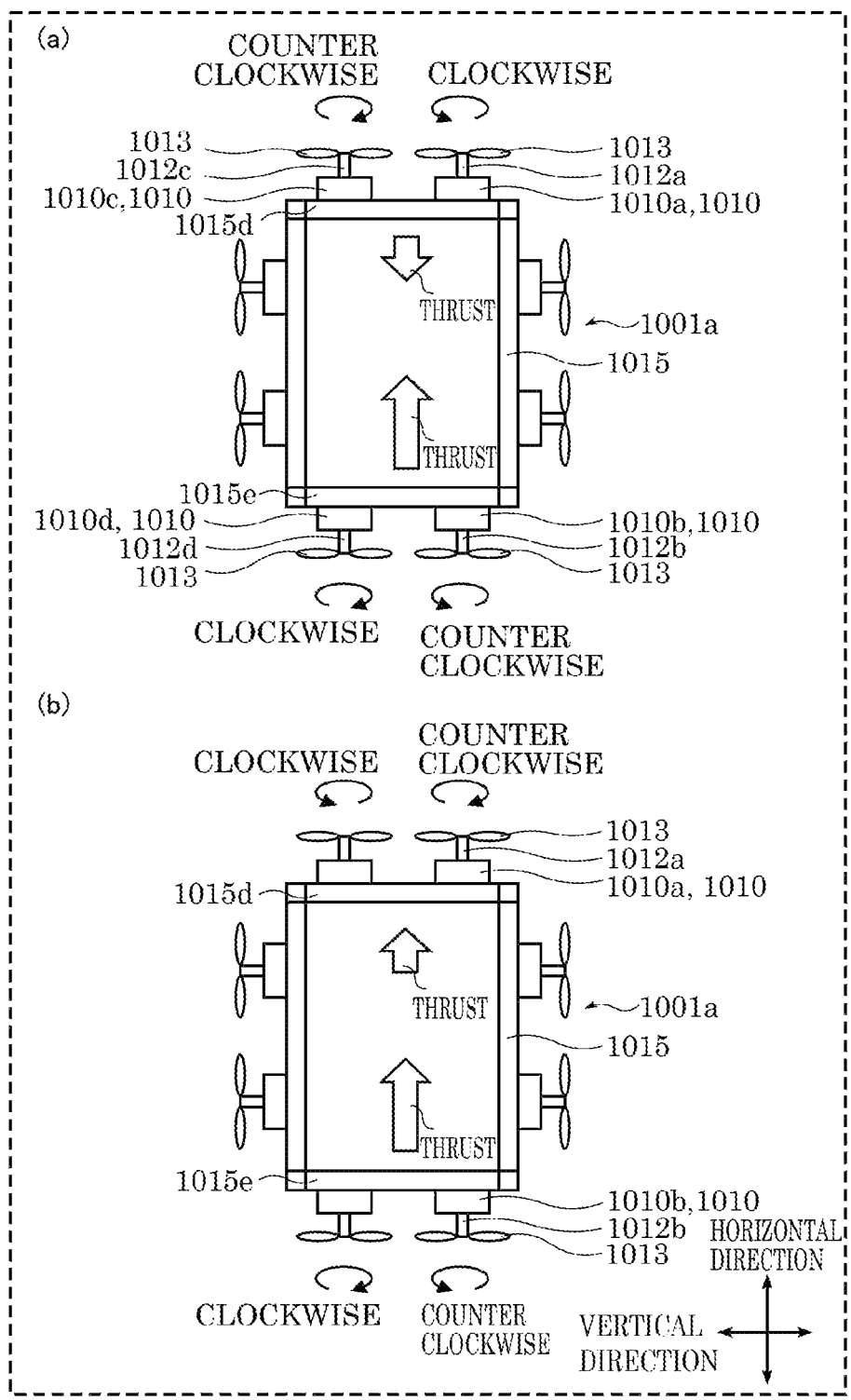
FIG. 89 is a schematic diagram illustrating an example of the directions of rotation of propellers in the plurality of motors included in the thruster device according to Variation 2 of Embodiment 10.

FIG. 89 is a schematic diagram illustrating an example of the directions of rotation of propellers 1013 in the plurality of motors 1010 included in thruster device 1001a according to Variation 2 of Embodiment 10.

As illustrated in FIG. 89, the side portions of support member 1015 include first side portion 1015d and second side portion 1015e on opposite sides of support member 1015 and/or the package. First side portion 1015d and second side portion 1015e constitute a part of outer frame 1015a. In the present variation, since outer frame 1015a of support member 1015 is rectangular, first side portion 1015d is a piece of outer frame 1015a, and second side portion 1015e is a piece on the other side relative to first side portion 1015d.

First motor 1010a, which is one of the plurality of motors 1010, is provided on first side portion 1015d and includes first rotary shaft 1012a. Second motor 1010b, which is one of the plurality of motors 1010, is provided on second side portion 1015e and includes second rotary shaft 1012b. Third motor 1010c, which is one of the plurality of motors 1010, is also provided on first side portion 1015d, and is positioned adjacent to first motor 1010a in the virtual surface. Third motor 1010c includes third rotary shaft 1012c. Fourth motor 1010d, which is one of the plurality of motors 1010, is also provided on second side portion 1015e, and is positioned adjacent to second motor 1010b in the virtual surface. Fourth motor 1010d includes fourth rotary shaft 1012d.

In the present variation, first motor 1010a and third motor 1010c are arranged along the lengthwise direction of first side portion 1015d, and second motor 1010b and fourth motor 1010d are arranged along the lengthwise direction of second side portion 1015e.

Controller 1020 includes a third mode and a fourth mode.

In the third mode, controller 1020 rotates first rotary shaft 1012a in a first direction of rotation and rotates second rotary shaft 1012b in a second direction of rotation opposite the first direction of rotation. For example, controller 1020 rotates axis J1 of first rotary shaft 1012a of first motor 1010a on first side portion 1015d clockwise and rotates axis J1 of second rotary shaft 1012b of second motor 1010b on second side portion 1015e counterclockwise. Clockwise direction is relative to when facing the front of the propeller.

In the third mode, controller 1020 rotates third rotary shaft 1012c in the second direction of rotation and rotates fourth rotary shaft 1012d in the first direction of rotation. For example, controller 1020 rotates axis J1 of third rotary shaft 1012c of third motor 1010c on first side portion 1015d counterclockwise and rotates axis J1 of fourth rotary shaft 1012d of fourth motor 1010d on second side portion 1015e clockwise.

In the fourth mode, controller 1020 rotates first rotary shaft 1012a and second rotary shaft 1012b in the second direction of rotation. For example, controller 1020 rotates axis J1 of first rotary shaft 1012a of first motor 1010a on first side portion 1015d counterclockwise and also rotates axis J1 of second rotary shaft 1012b of second motor 1010b on second side portion 1015e counterclockwise.

In the fourth mode, controller 1020 rotates third rotary shaft 1012c and fourth rotary shaft 1012d in the first direction of rotation; for example, controller 1020 rotates axis J1 of third rotary shaft 1012c of third motor 1010c on first side portion 1015d clockwise and axis J1 of fourth rotary shaft 1012d of fourth motor 1010d on second side portion 1015e clockwise as well.

In the present variation, as illustrated in (a) in FIG. 89, first rotary shaft 1012a of one first motor 1010a on first side portion 1015d is rotated clockwise and third rotary shaft 1012c of the other third motor 1010c on first side portion 1015d is rotated counterclockwise. Second rotary shaft 1012b of one second motor 1010b on second side portion 1015e is rotated counterclockwise, and fourth rotary shaft 1012d of the other fourth motor 1010d on second side portion 1015e is rotated clockwise. In this case, the thrust would be as shown by the solid arrows in (a) in FIG. 89. In this case, on the first side portion 1015d side, a small thrust force is generated in the direction from first side portion 1015d toward second side portion 1015e, and on the second side portion 1015e side, a large thrust force is generated in the direction from second side portion 1015e toward first side portion 1015d. This causes thruster device 1001a to slowly move in the direction from second side portion 1015e toward first side portion 1015d.

In the present variation, as illustrated in (b) in FIG. 89, first rotary shaft 1012a of one first motor 1010a on first side portion 1015d is rotated counterclockwise and third rotary shaft 1012c of the other third motor 1010c on first side portion 1015d is rotated clockwise. Second rotary shaft 1012b of one second motor 1010b on second side portion 1015e is rotated counterclockwise, and fourth rotary shaft 1012d of the other fourth motor 1010d on second side portion 1015e is rotated clockwise. In this case, the direction of the thrust would be as shown by the solid arrows in (b) in FIG. 89. In this case, on the first side portion 1015d side, a small thrust force is generated in the direction opposite to the second side portion 1015e side, and on the second side portion 1015e side, a large thrust force is generated in the direction from second side portion 1015e toward first side portion 1015d. This causes thruster device 1001a to move in the direction from second side portion 1015e toward first side portion 1015d.

In this way, in thruster device 1001a according to present variation, the side portions of support member 1015 include first side portion 1015d and second side portion 1015e on opposite sides of support member 1015 and/or the package. The plurality of motors 1010 include first motor 1010a that is provided on first side portion 1015d and includes first rotary shaft 1012a, and second motor 1010b that is provided on second side portion 1015e and includes second rotary shaft 1012b. Controller 1020 includes a third mode in which first rotary shaft 1012a is rotated in a first direction of rotation and second rotary shaft 1012b is rotated in a second direction of rotation opposite to the first direction of rotation, and a fourth mode in which first rotary shaft 1012a and second rotary shaft 1012b are rotated in the second direction of rotation.

With this, by making the direction of rotation of first rotary shaft 1012a of first motor 1010a and the direction of rotation of second rotary shaft 1012b of second motor 1010b opposite directions, thruster device 1001a can produce a thrust that causes it to travel in a desired direction. This allows thruster device 1001a to finely adjust its position relative to a predetermined position accurately.

In thruster device 1001a according to the present variation, the plurality of motors 1010 further include third motor 1010c that is provided on first side portion 1015d at a position adjacent to first motor 1010a in a virtual surface and includes third rotary shaft 1012c, and fourth motor 1010d that is provided on second side portion 1015e at a position adjacent to second motor 1010b in the virtual surface and includes fourth rotary shaft 1012d. In the third mode, a plurality of motors 1010 rotate third rotary shaft 1012c in the second direction of rotation and rotate fourth rotary shaft 1012d in the first direction of rotation. In the fourth mode, a plurality of motors 1010 rotate third rotary shaft 1012c and fourth rotary shaft 1012d in the first direction of rotation.

Accordingly, by making the direction of rotation of third rotary shaft 1012c of third motor 1010c and the direction of rotation of fourth rotary shaft 1012d of fourth motor 1010d opposite directions, thruster device 1001a can produce a thrust that causes it to travel in a desired direction. Since the directions of rotation of first rotary shaft 1012a of first motor 1010a and second rotary shaft 1012b of second motor 1010b can be controlled, the device can finely adjust its position relative to a predetermined position accurately.

Embodiment 11

Configuration

Since the basic configuration of thruster device 1001b according to the present embodiment is the same as the basic configuration of the thruster device according to Embodiment 10 and the like, repeated description of the basic configuration of thruster device 1001b in the present embodiment will be omitted where appropriate. The present embodiment differs from Embodiment 10 and the like in that protective member 1014 that surrounds thruster device 1001b is provided.

Figure 90:
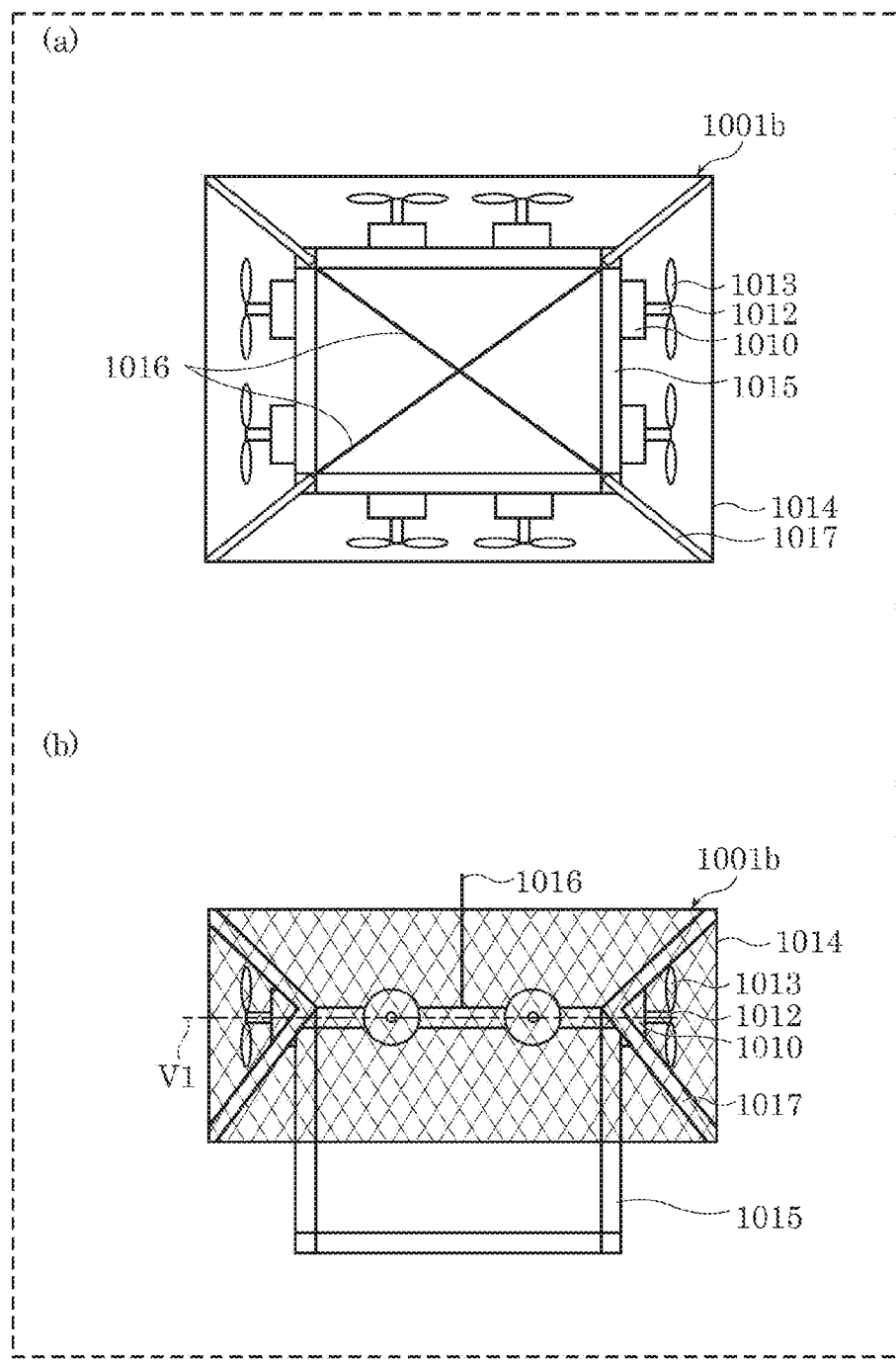
FIG. 90 is a schematic diagram illustrating an example of the thruster device according to Embodiment 11.

FIG. 90 is a schematic diagram illustrating an example of thruster device 1001b according to Embodiment 11.

As illustrated in FIG. 90, thruster device 1001b further includes protective member 1014 in addition to support member 1015, wire 1016, a plurality of motors 1010, a plurality of propellers 1013, controller 1020 illustrated in FIG. 85, and one or more actuators 1030.

Protective member 1014 is fixed to support member 1015 so that it intersects virtual surface V1 and surrounds thruster device 1001b. More specifically, protective member 1014 is arranged to surround at least the plurality of motors 1010, and covers the rotating propellers 1013 when thruster device 1001b is viewed from the side. In other words, protective member 1014 covers the rotation surface of the plurality of propellers 1013 when thruster device 1001b is viewed from the side.

Protective member 1014 is polygonal in shape in plan view that corresponds to the shape of support member 1015. Protective member 1014 may be any sort of structure, but in consideration of air resistance and weight, etc., protective member 1014 is preferably a netted structure. In the present embodiment, a protective net is used as protective member 1014.

Protective member 1014 is connected and fixed to support member 1015 by coupling 1017. More specifically, one end of coupling 1017 is connected to a corner of support member 1015, and the other end of coupling 1017 is coupled to a corner of protective member 1014. In the present embodiment, since both support member 1015 and protective member 1014 are rectangular in plan view, four couplings 1017 connect and secure protective member 1014 to support member 1015. It is sufficient if support member 1015 is capable of supporting protective member 1014; the number of couplings 1017 is not dependent on the number of corners of support member 1015.

Advantageous Effects

Next, the advantageous effects achieved by thruster device 1001b according to the present embodiment will be described.

As described above, thruster device 1001b according to the present embodiment further includes protective member 1014 surrounding the plurality of propellers 1013.

With this, since protective member 1014 can protect the rotating propellers 1013, propellers 1013 can be prevented from coming into contact with other objects.

Embodiment 12

Configuration

Since the basic configuration of thruster device 1001c according to the present embodiment is the same as the basic configuration of the thruster device according to Embodiment 10 and the like, repeated description of the basic configuration of thruster device 1001c in the present embodiment will be omitted where appropriate. The present embodiment differs from Embodiment 10 and the like in that thruster device 1001c includes reel 1018 or the like.

Figure 91:
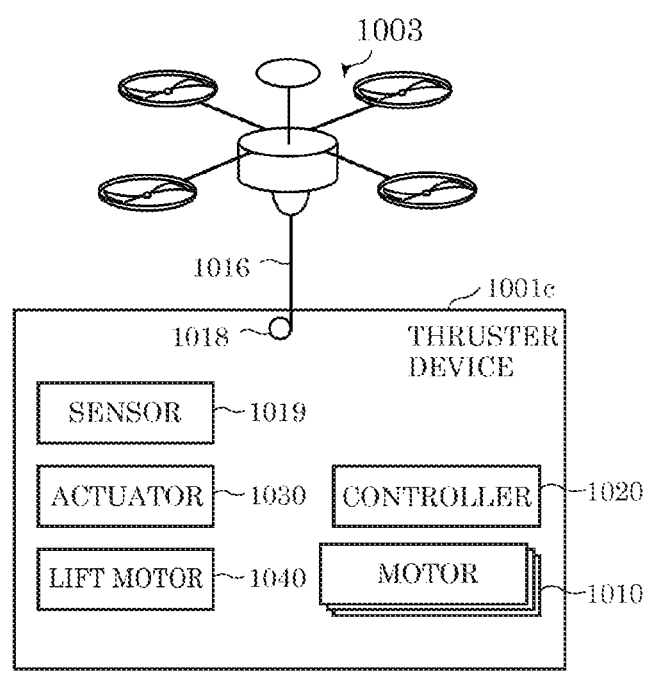
FIG. 91 is a block diagram illustrating an example of the thruster device according to Embodiment 12.
Figure 92:
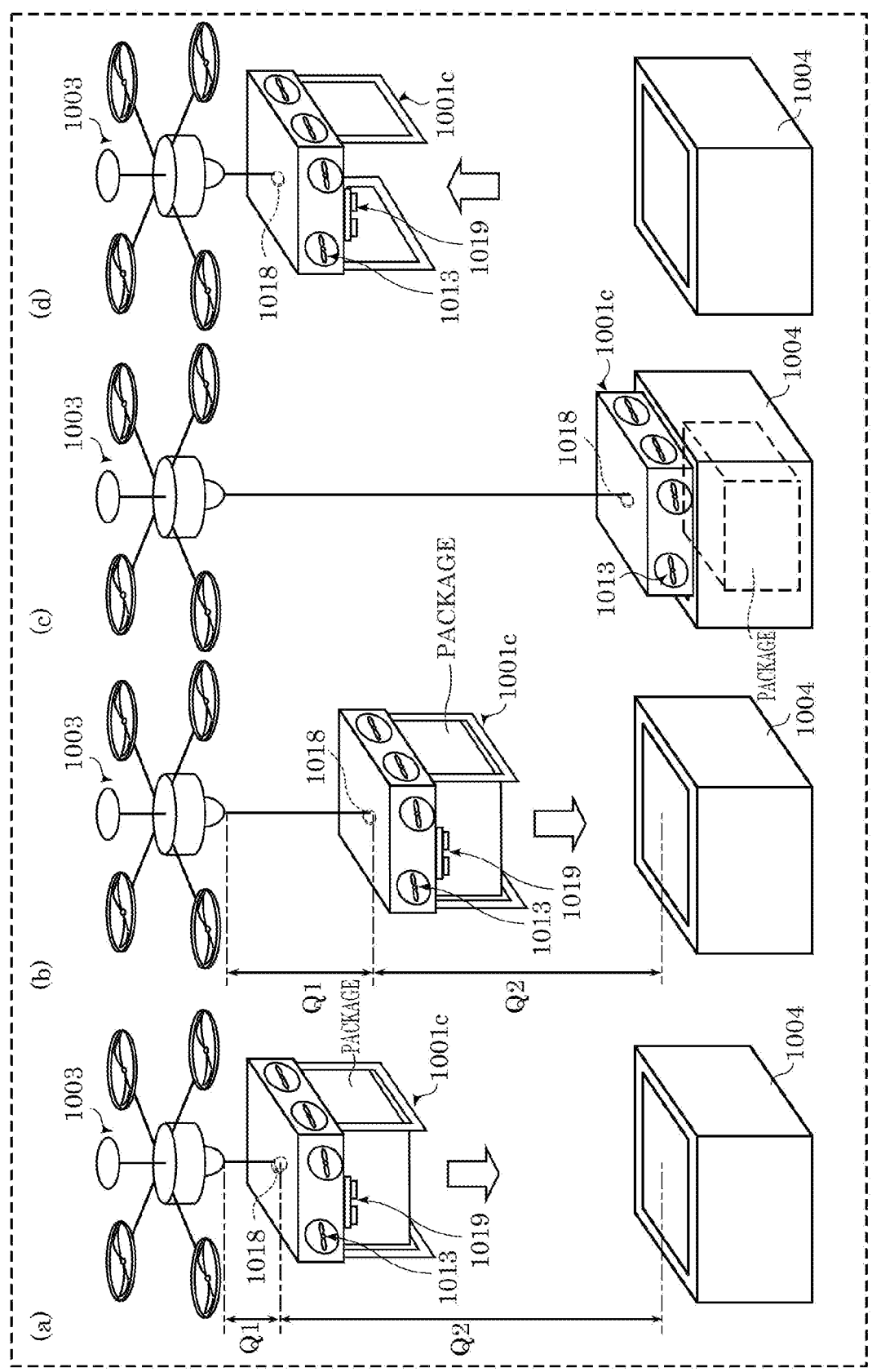
FIG. 92 is a schematic diagram illustrating an example of the thruster device storing a package in the delivery box according to Embodiment 12.

FIG. 91 is a block diagram illustrating an example of thruster device 1001c according to Embodiment 12. FIG. 92 is a schematic diagram illustrating an example of thruster device 1001c storing a package in delivery box 1004 according to Embodiment 12.

As illustrated in FIG. 91 and FIG. 92, in the present embodiment, thruster device 1001c is coupled via wire 1016 to unmanned aerial vehicle 1003 (the drone described above) functioning as a parent vehicle. Although FIG. 91 depicts unmanned aerial vehicle 1003 as one non-limiting example, wires 1016 may be connected to, for example, the rails described above instead.

Thruster device 1001c further includes reel 1018, lift motor 1040, and sensor 1019 in addition to the support member, wire 1016, the plurality of motors 1010, the plurality of propellers 1013, controller 1020, and the one or more actuators 1030.

Reel 1018 is connected to the other end of wire 1016 and can reel wire 1016 in and out by rotating. The rotation of reel 1018 is controlled by lift motor 1040.

Lift motor 1040 rotates reel 1018 to reel wire 1016 in and out. The rotational speed at which reel 1018 is rotated is changed by controlling the actuation of lift motor 1040 via controller 1020.

Sensor 1019 detects the position of delivery box 1004 for storing a package when reel 1018 is positioned vertically above delivery box 1004. Sensor 1019 is provided on the support member and is capable of detecting packages and delivery boxes 1004 from above. For example, when sensor 1019 is an image capturing device, it captures an image of the package and delivery box 1004, and outputs image information, which is the captured image, to controller 1020. The image information includes, for example, information indicating the relative position (distance) between the package and delivery box 1004, the relative position (distance) between delivery box 1004 and reel 1018, the distance from delivery box 1004 to the support member, and the distance from the package to delivery box 1004. Examples of sensor 1019 include a time-of-flight (TOF) camera and a range finding sensor or the like.

Based on the image information, controller 1020 determines whether or not reel 1018 is positioned vertically above delivery box 1004 for storing a package. When thruster device 1001c is positioned vertically above delivery box 1004 for storing a package, controller 1020 starts actuating the plurality of motors 1010 after the length of the portion of wire 1016 that has been reeled out exceeds a predetermined length. The predetermined length is equivalent to half the distance from delivery box 1004 to reel 1018.

Controller 1020 reels wire 1016 out by rotating reel 1018 via lift motor 1040 to lower thruster device 1001c from unmanned aerial vehicle 1003. This stores the package carried by thruster device 1001c in delivery box 1004. When the package is unloaded into delivery box 1004, controller 1020 reels in wire 1016 by rotating reel 1018 via lift motor 1040 to raise thruster device 1001c and bring it closer to unmanned aerial vehicle 1003.

Operations

Figure 93:
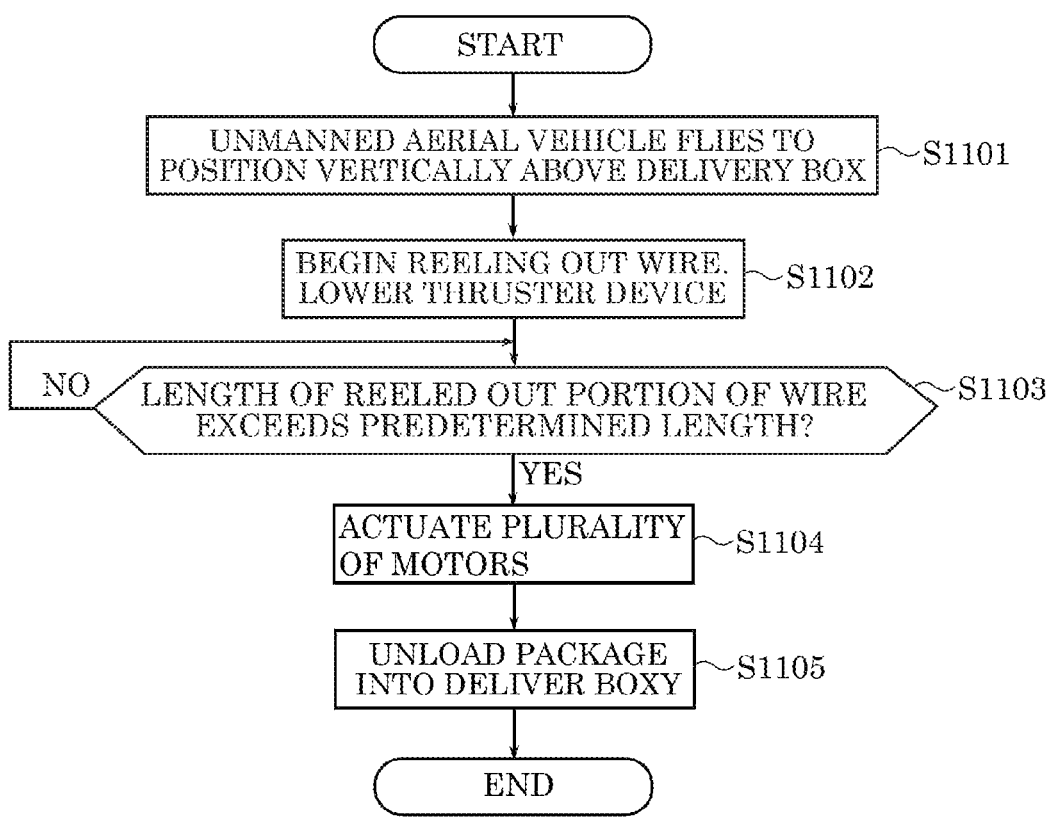
FIG. 93 is a flowchart illustrating an example of operations performed by the thruster device to store a package in the delivery box according to Embodiment 12.

FIG. 93 is a flowchart illustrating an example of operations performed by thruster device 1001c to store a package in delivery box 1004 according to Embodiment 12. FIG. 92 and FIG. 93 assume that unmanned aerial vehicle 1003 has arrived at a position vertically above delivery box 1004.

As illustrated in FIG. 93 and (a) in FIG. 92, first, unmanned aerial vehicle 1003 flies to and arrives at a position vertically above delivery box 1004, which is the receiver of the package (S1101).

Next, as illustrated in FIG. 93 and (a) and (b) in FIG. 92, controller 1020 controls lift motor 1040 to rotate reel 1018 and begin reeling out wire 1016. With this, thruster device 1001c starts descending (S1102).

Next, controller 1020 reels out wire 1016 by controlling lift motor 1040, and determines whether the length of the portion of wire 1016 reeled out exceeds a predetermined length (Q1>Q2/2) (S1103).

If the length of the portion of wire 1016 that has been reeled out does not exceed the predetermined length (NO in S1103), controller 1020 returns the process to step S1103.

When the length of the portion of wire 1016 that has been reeled out exceeds the predetermined length (YES in S1103), the plurality of motors 1010 are actuated (S1104). This corrects the position of the above-positioned thruster device 1001c relative to delivery box 1004, and corrects the position of the package relative to the opening of delivery box 1004. Controller 1020 positions thruster device 1001c with respect to the opening of delivery box 1004 by repeatedly correcting the error in overlap between thruster device 1001c and the opening of delivery box 1004 in the vertical direction as necessary to align the opening of delivery box 1004 with thruster device 1001c, i.e., the package.

As illustrated in FIG. 93 and (c) in FIG. 92, thruster device 1001c unloads the package into delivery box 1004 (51105). More specifically, thruster device 1001c descends to cover the opening of delivery box 1004 and stores the package in delivery box 1004.

As illustrated in FIG. 93 and (d) in FIG. 92, thruster device 1001c is attached to the main body of unmanned aerial vehicle 1003 by ascending after storing and then disconnecting the package in delivery box 1004. Unmanned aerial vehicle 1003 then returns to the sender.

Figure 94:
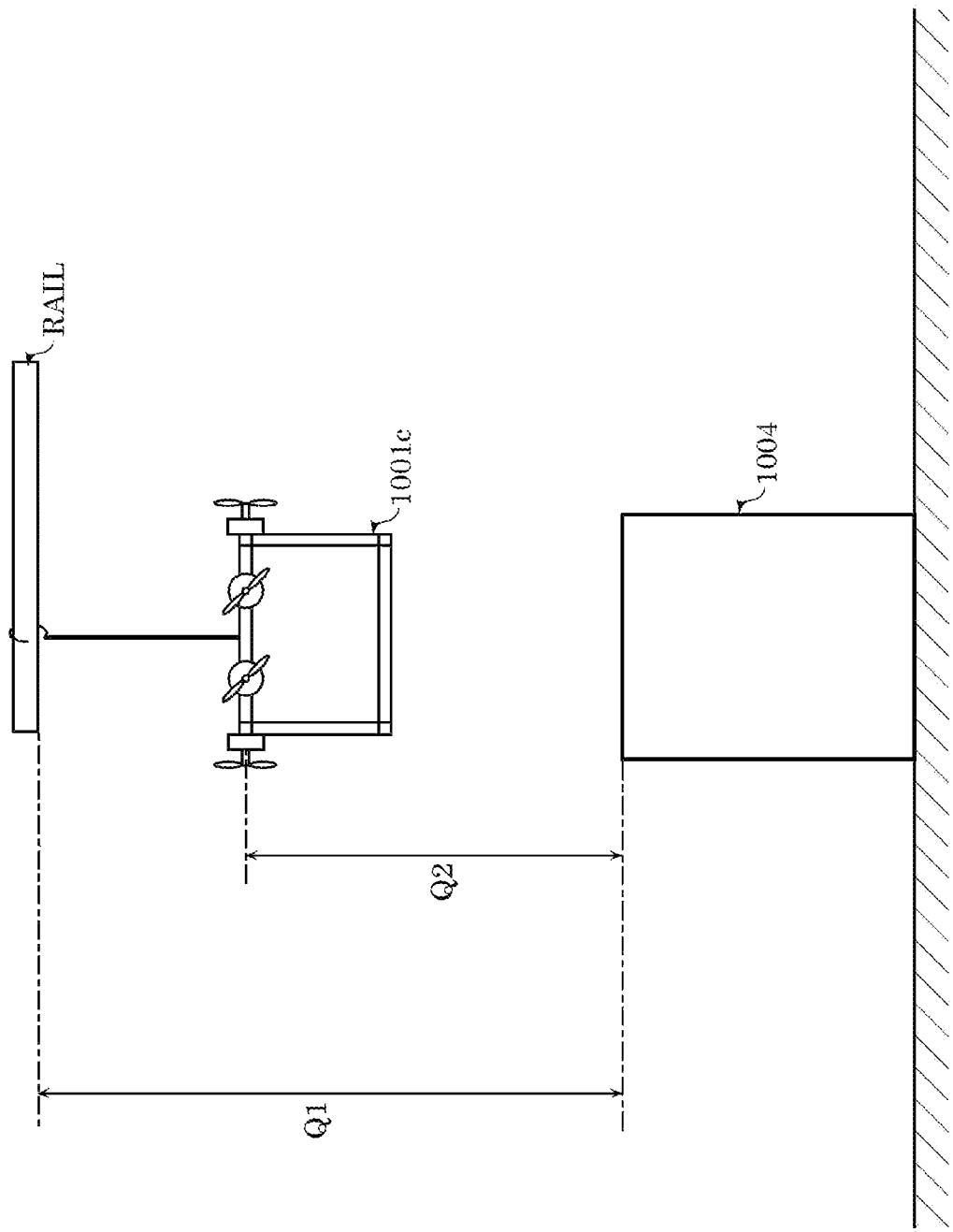
FIG. 94 is a schematic diagram illustrating another example of the thruster device storing a package in the delivery box according to Embodiment 12.

FIG. 94 illustrates an example in which the object to which thruster device 1001c affixes is a rail. FIG. 94 is a schematic diagram illustrating another example of thruster device 1001c storing a package in delivery box 1004 according to Embodiment 12. In this example as well, the processes and operations are the same as in FIG. 92 and FIG. 93.

Advantageous Effects

Next, the advantageous effects achieved by thruster device 1001c according to the present embodiment will be described.

As described above, thruster device 1001c according to the present embodiment further includes reel 1018 to which the other end of wire 1016 is connected, and lift motor 1040 that rotates reel 1018 to reel out wire 1016. When reel 1018 is positioned vertically above delivery box 1004 for storing a package, controller 1020 starts actuating the plurality of motors 1010 after the length of the portion of wire 1016 that has been reeled out exceeds a predetermined length.

With this, since thruster device 1001c starts adjusting its position relative to the predetermined position when thruster device 1001c approaches delivery box 1004, it easier for thruster device 1001c to align itself relative to the predetermined position.

Thruster device 1001c according to the present embodiment further includes sensor 1019 that detects the position of delivery box 1004 for storing a package when reel 1018 is positioned vertically above delivery box 1004.

This enables the position of thruster device 1001c relative to delivery box 1004 to be accurately detected, allowing for more accurate and finer adjustment of the position of thruster device 1001c relative to delivery box 1004.

In thruster device 1001c according to the present embodiment, the predetermined length is equivalent to half the distance from delivery box 1004 to reel 1018.

With this, since thruster device 1001c starts adjusting its position relative to the predetermined position when thruster device 1001c is positioned near delivery box 1004, it further easier for thruster device 1001c to align itself relative to the predetermined position.

Embodiment 13

Configuration

Since the basic configuration of the thruster device according to the present embodiment is the same as the basic configuration of the thruster device according to Embodiment 10 and the like, repeated description of the basic configuration of the thruster device in the present embodiment will be omitted where appropriate. The present embodiment differs from Embodiment 10 and the like in that blades 1013a1 of propeller 1013 of the thruster device include protrusions 1013a2.

Figure 95:
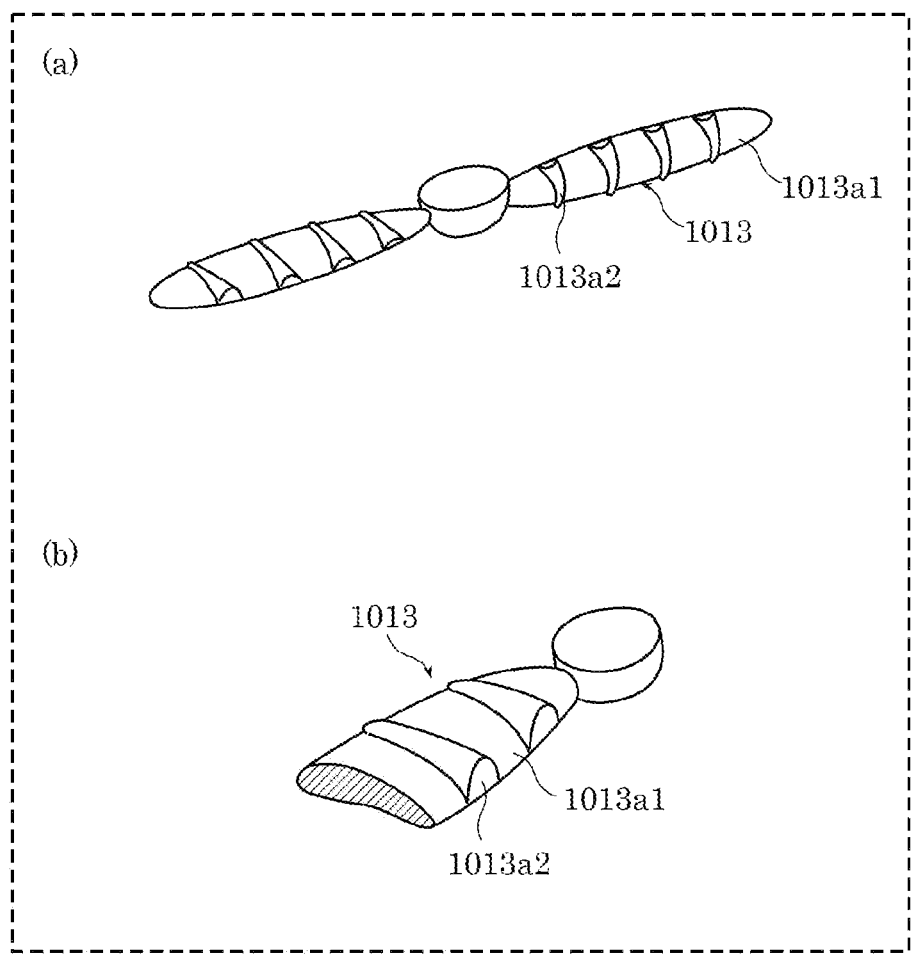
FIG. 95 illustrates an example of the propeller of the thruster device according to Embodiment 13.

FIG. 95 illustrates an example of propeller 1013 of the thruster device according to Embodiment 13. In FIG. 95, (a) is a perspective view of propeller 1013, and (b) is a partial cross sectional view of blade 1013a1 of propeller 1013.

As illustrated in FIG. 95, each of the plurality of propellers 1013 includes a plurality of blades 1013a1. In the present embodiment, each of the plurality of propellers 1013 is exemplified as including two blades 1013a1, but each of the plurality of propellers 1013 may include three or more blades 1013a1, or one blade 1013a1.

A plurality of protrusions 1013a2 are provided on the surface of each blade 1013a1. The plurality of protrusions 1013a2 form a striped pattern extending in the direction of rotation of the plurality of blades 1013a1. The plurality of protrusions 1013a2 are formed at equal intervals on the surface of each blade 1013a1.

Advantageous Effects

Next, the advantageous effects achieved by the thruster device according to the present embodiment will be described.

As described above, in the thruster device according to the present embodiment, each of the plurality of propellers 1013 includes a plurality of blades 1013a1. A plurality of protrusions 1013a2 are provided on the surface of each blade 1013a1. The plurality of protrusions 1013a2 form a striped pattern extending in the direction of rotation of the plurality of blades 1013a1.

This makes it possible to reduce the influence of wind during flight of the thruster device. This makes it even easier to align the thruster device relative to the predetermined position, because the attitude of the thruster device can be stabilized even in windy conditions.

Embodiment 14

Configuration

Since the basic configuration of lifting system 1100 according to the present embodiment is the same as the basic configuration of the delivery system according to Embodiment 9 and the like, and the basic configuration of the thruster device is the same as the basic configuration of the thruster device according to Embodiment 10 and the like, repeated description of the basic configuration of lifting system 1100 and the thruster device in the present embodiment will be omitted where appropriate. The present embodiment differs from Embodiment 9 and the like in regard to the usage of two thruster devices.

Figure 96:
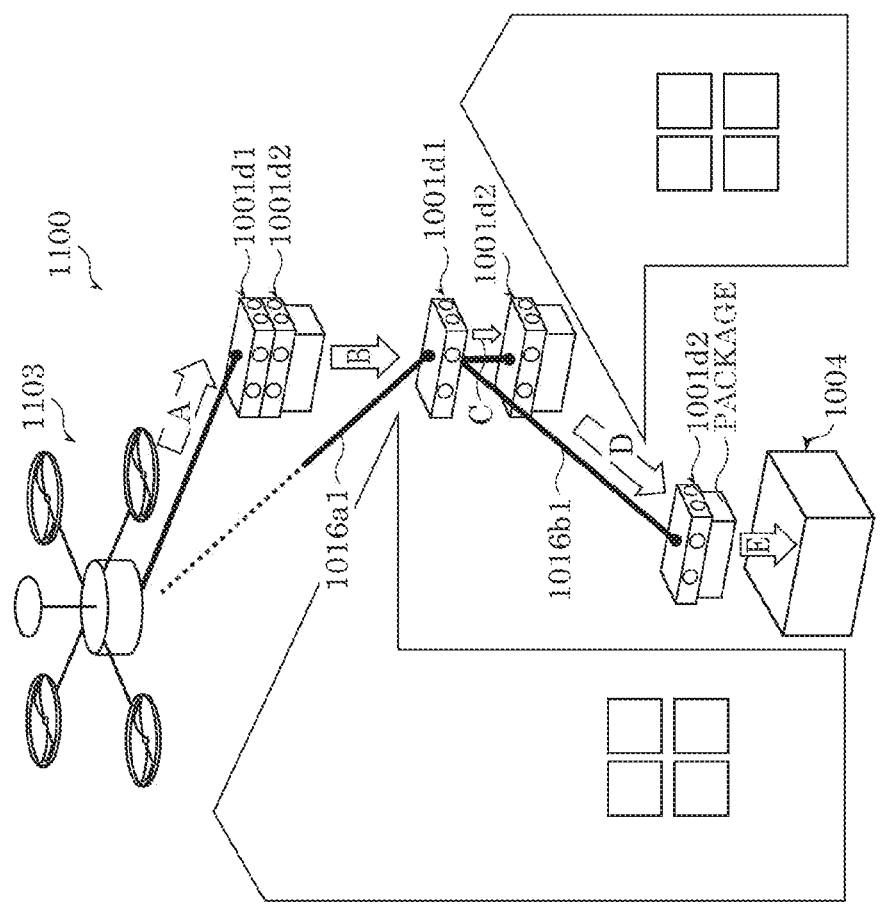
FIG. 96 illustrates an example of a thruster device of the lifting system according to Embodiment 14 unloading a package.
Figure 97:
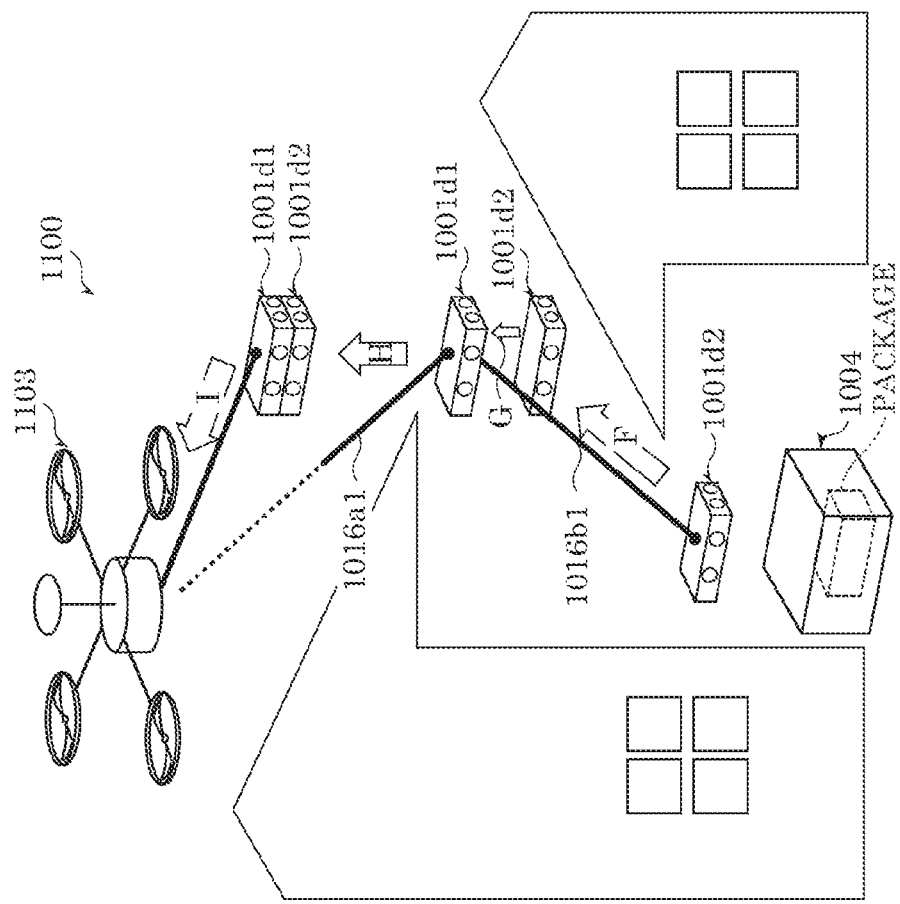
FIG. 97 illustrates an example of a scene after a thruster device of the lifting system according to Embodiment 14 has unloaded the package.

FIG. 96 illustrates an example of a thruster device of lifting system 1100 according to Embodiment 14 unloading a package. FIG. 97 illustrates an example of a scene after a thruster device of lifting system 1100 according to Embodiment 14 has unloaded the package.

FIG. 96 illustrates an example pertaining to lifting system 1100 of a delivery environment in which delivery box 1004 is located between two adjacent buildings and under the eaves of one of the buildings. In the example in FIG. 96, the eaves of the building may obstruct unmanned aerial vehicle 1103, making it difficult for unmanned aerial vehicle 1103 to move to a position over delivery box 1004. In this lifting system 1100, two thruster devices, first thruster device 1001d1 and second thruster device 1001d2, are used to deliver a package to delivery box 1004. In FIG. 97, after the package is delivered, first thruster device 1001d1 and second thruster device 1001d2 are retrieved.

Figure 98:
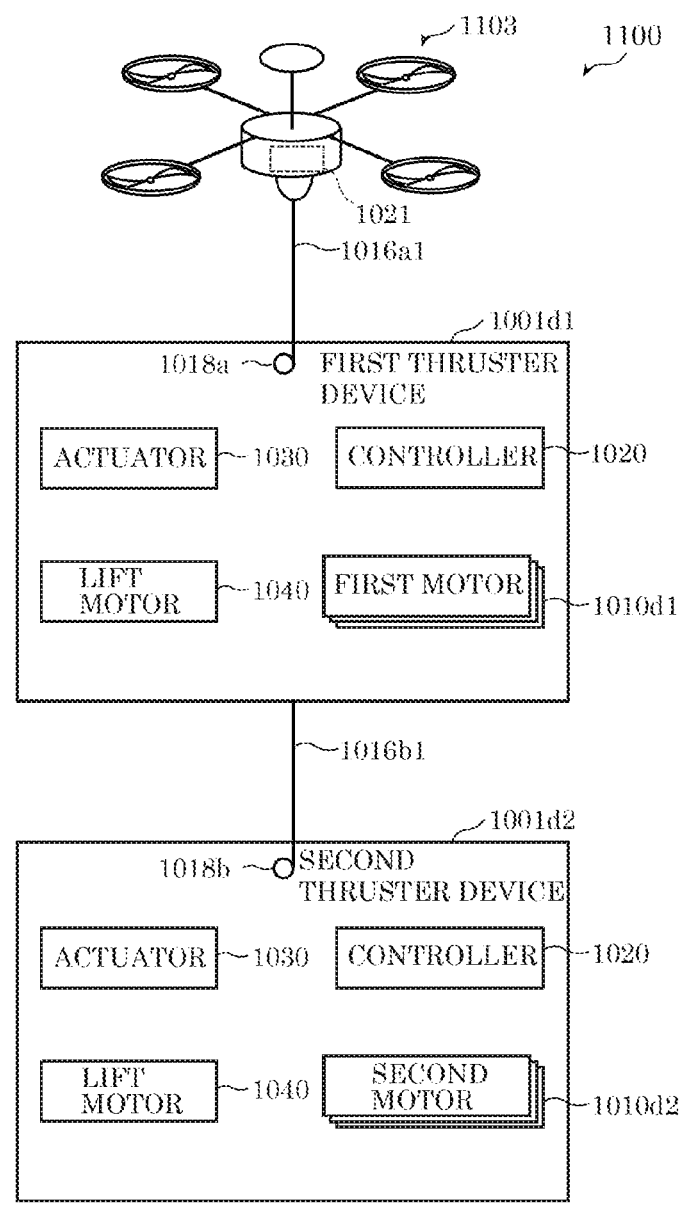
FIG. 98 is a block diagram illustrating an example of the lifting system according to Embodiment 14.

FIG. 98 is a block diagram illustrating an example of thruster devices according to Embodiment 14.

As illustrated in FIG. 98, lifting system 1100 includes unmanned aerial vehicle 1103, first thruster device 1001d1, first wire 1016a1, first reel 1018a, second thruster device 1001d2, second wire 1016b1, second reel 1018b, and a controller.

Unmanned aerial vehicle 1103 is, for example, a drone that serves as a parent vehicle, and is essentially the same as the drone described above.

First thruster device 1001d1 is a first child vehicle of unmanned aerial vehicle 1103 and is attachable to and detachable from unmanned aerial vehicle 1103. First thruster device 1001d1 includes a first support member, a plurality of first motors 1010d1, and a plurality of first propellers. The first support member is attachable to and detachable from unmanned aerial vehicle 1103. The plurality of first motors 1010d1 are arranged on a plurality of side portions forming the outer periphery of the first support member. The plurality of first propellers correspond one-to-one with the rotary shafts of the plurality of first motors 1010d1 and are actuated by the plurality of first motors 1010d1. First thruster device 1001d1 is essentially the same as the thruster device described above. The first support member and the first propeller have the same configurations as the support member and the propeller described above.

First wire 1016a1 connects first thruster device 1001d1 and unmanned aerial vehicle 1103. First wire 1016a1 is coupled to unmanned aerial vehicle 1103 at one end and to first thruster device 1001d1 at the other end.

First reel 1018a can reel first wire 1016a1 in and out by rotating. The rotation of first reel 1018a is controlled by lift motor 1040. In the present embodiment, first reel 1018a is provided on first thruster device 1001d1, but first reel 1018a may be provided on unmanned aerial vehicle 1103.

Second thruster device 1001d2 is a second child vehicle of unmanned aerial vehicle 1103. A package is attachable to and detachable from second thruster device 1001d2, and second thruster device 1001d2 is attachable to and detachable from first thruster device 1001d1. Second thruster device 1001d2 is coupled to first thruster device 1001d1 via second wire 1016b1. Second thruster device 1001d2 includes a second support member, a plurality of second motors 1010d2, and a plurality of second propellers.

The second support member is attachable to and detachable from unmanned aerial vehicle 1103. The plurality of second motors 1010d2 are arranged on a plurality of side portions forming the outer periphery of the second support member. The plurality of second propellers correspond one-to-one with the rotary shafts of the plurality of second motors 1010d2 and are actuated by the plurality of second motors 1010d2. Second thruster device 1001d2 has the same configuration as first thruster device 1001d1. The second support member and the second propeller have the same configurations as the support member and the propeller described above.

Second wire 1016b1 connects first thruster device 1001d1 and second thruster device 1001d2. Second wire 1016b1 is coupled to first thruster device 1001d1 at one end and to second thruster device 1001d2 at the other end.

Second reel 1018b can reel second wire 1016b1 in and out by rotating. The rotation of second reel 1018b is controlled by lift motor 1040. In the present embodiment, second reel 1018b is provided on second thruster device 1001d2, but second reel 1018b may be provided on first thruster device 1001d1.

The controller is provided in at least one of unmanned aerial vehicle 1103, first thruster device 1001d1, and second thruster device 1001d2. Although as illustrated in FIG. 98, the functions performed by controller 1021 are described for controller provided in unmanned aerial vehicle 1103 in the present embodiment, the controller may be provided in at least one of unmanned aerial vehicle 1103, first thruster device 1001d1, and second thruster device 1001d2; the example given in the present embodiment is non-limiting. The device that controller is provided in is not particularly limited.

Operations

Next, operations performed by first thruster device 1001d1 and second thruster device 1001d2 will be described with reference to FIG. 96 through FIG. 98.

As shown by arrow A in FIG. 96, when unmanned aerial vehicle 1103 positioned separated from the ground, controller 1021 controls first reel 1018a via lift motor 1040 to reel out first wire 1016a1 and detach first thruster device 1001d1 and second thruster device 1001d2 from unmanned aerial vehicle 1103. At this time, controller 1021 actuates at least one of the plurality of first motors 1010d1 and the plurality of second motors 1010d2 after first thruster device 1001d1 and second thruster device 1001d2 are detached from unmanned aerial vehicle 1103. When first thruster device 1001d1 and second thruster device 1001d2 detach from unmanned aerial vehicle 1103, controller 1021 controls the movement of at least one of first thruster device 1001d1 and second thruster device 1001d2 in order to align the thruster device(s) with delivery box 1004. It goes without saying that controller 1021 is aware of the distance and position of delivery box 1004 relative to each of unmanned aerial vehicle 1103, first thruster device 1001d1, and second thruster device 1001d2.

If first thruster device 1001d1 and second thruster device 1001d2 are detached from unmanned aerial vehicle 1103, controller 1021 controls second reel 1018b via lift motor 1040 to cause second wire 1016b1 to reel out, as shown by arrows B and C in FIG. 96, and detaches second thruster device 1001d2 from first thruster device 1001d1. At this time, controller 1021 actuates the plurality of first motors 1010d1 and the plurality of second motors 1010d2 after detaching second thruster device 1001d2 from first thruster device 1001d1. When second thruster device 1001d2 detaches from first thruster device 1001d1, controller 1021 controls the movement of first thruster device 1001d1 and second thruster device 1001d2 in order to align second thruster device 1001d2 with delivery box 1004.

Controller 1021 controls the plurality of first motors 1010d1 and controls the plurality of second motors 1010d2 differently than the plurality of first motors 1010d1 after detaching second thruster device 1001d2 from first thruster device 1001d1. As shown by arrow D in FIG. 96, controller 1021 adjusts the first hanging direction in which first wire 1016a1 extends between unmanned aerial vehicle 1103 and first thruster device 1001d1, and adjusts the second hanging direction in which second wire 1016b1 extends between first thruster device 1001d1 and second thruster device 1001d2. Controller 1021 makes the first hanging direction and the second hanging direction different by adjusting the positions of at least first thruster device 1001d1 and second thruster device 1001d2. Controller 1021 may make the first hanging direction different than the second hanging direction by further adjusting the position of unmanned aerial vehicle 1103.

Here, by controller 1021 controlling the plurality of first motors 1010d1 and controlling the plurality of second motors 1010d2 differently than the plurality of first motors 1010d1 after detaching second thruster device 1001d2 from first thruster device 1001d1, the area of overlap between the first thruster device 1001d1 and the second thruster device 1001d2 is reduced or the overlap between the first thruster device 1001d1 and the second thruster device 1001d2 is eliminated when viewed from a direction perpendicular to the ground surface (for example, a vertical direction). When first thruster device 1001d1 detaches from unmanned aerial vehicle 1103 and second thruster device 1001d2 detaches from first thruster device 1001d1, controller 1021 adjusts the positions of first thruster device 1001d1 and second thruster device 1001d2 so that first thruster device 1001d1 and second thruster device 1001d2 do not overlap vertically. This causes the positions of first thruster device 1001d1 and second thruster device 1001d2 to differ relative to the vertical direction, so that straight line segments connecting unmanned aerial vehicle 1103 and first thruster device 1001d1 and second thruster device 1001d2 are not parallel. First thruster device 1001d1 is no longer positioned on a straight line connecting unmanned aerial vehicle 1103 and second thruster device 1001d2. Thus, controller 1021 arranges first thruster device 1001d1 to bypass the obstacle with respect to the straight line connecting unmanned aerial vehicle 1103 and second thruster device 1001d2.

After detaching the package from second thruster device 1001d2 as shown by arrow E in FIG. 96, controller 1021 controls lift motor 1040 to cause second reel 1018b to reel in second wire 1016b1 as shown by arrows F, G, and H in FIG. 97 to attach second thruster device 1001d2 to first thruster device 1001d1. Controller 1021 causes second thruster device 1001d2 to be guided (pulled) to the position of first thruster device 1001d1 by reeling in second wire 1016b1 using second reel 1018b, thereby causing first thruster device 1001d1 to retrieve second thruster device 1001d2.

As shown by arrow I in FIG. 97, controller 1021 controls lift motor 1040 to reel in first wire 1016a1 using first reel 1018a to attach first thruster device 1001d1 and second thruster device 1001d2 to unmanned aerial vehicle 1103. Although controller 1021 attaches first thruster device 1001d1 and second thruster device 1001d2 to unmanned aerial vehicle 1103 after attaching second thruster device 1001d2 to first thruster device 1001d1, controller 1021 may attach second thruster device 1001d2 to first thruster device 1001d1 at the same time as attaching first thruster device 1001d1 and second thruster device 1001d2 to unmanned aerial vehicle 1103.

Advantageous Effects

Next, the advantageous effects achieved by lifting system 1100 according to the present embodiment will be described.

As described above, lifting system 1100 according to the present embodiment includes: unmanned aerial vehicle 1103; first thruster device 1001d1 attachable to and detachable from unmanned aerial vehicle 1103; first wire 1016a1 that connects first thruster device 1001d1 and unmanned aerial vehicle 1103; first reel 1018a capable of reeling in first wire 1016a1, second thruster device 1001d2 attachable to and detachable from a package and attachable to and detachable from first thruster device 1001d1; second wire 1016b1 that connects first thruster device 1001d1 and second thruster device 1001d2; second reel 1018b capable of reeling in second wire 1016b1; and controller 1021. When unmanned aerial vehicle 1103 is in a position separated from the ground, controller 1021 detaches first thruster device 1001d1 and second thruster device 1001d2 from unmanned aerial vehicle 1103, causes first reel 1018a to reel out first wire 1016a1, detaches second thruster device 1001d2 from first thruster device 1001d1, and causes second reel 1018b to reel out second wire 1016b1.

With this, even when it is difficult to carry the package to a predetermined position, such as when there is an obstacle vertically above the predetermined position, it is possible to move first thruster device 1001d1 and second thruster device 1001d2 so as to avoid the obstacle. It is therefore possible to deliver the package to the predetermined position with certainty since second thruster device 1001d2 can be moved to a position vertically above the predetermined position.

In lifting system 1100 according to the present embodiment, first thruster device 1001d1 includes: a first support member attachable to and detachable from unmanned aerial vehicle 1103; a plurality of first motors 1010d1 disposed on a plurality of side portions of the first support member; and a plurality of first propellers actuated by the plurality of first motors 1010d1. Second thruster device 1001d2 includes: a second support member attachable to and detachable from first thruster device 1001d1; a plurality of second motors 1010d2 disposed on a plurality of side portions of the second support member; and a plurality of second propellers actuated by the plurality of second motors 1010d2.

With this, the position of first thruster device 1001d1 relative to unmanned aerial vehicle 1103 can be adjusted, and the position of second thruster device 1001d2 relative to first thruster device 1001d1 can be adjusted. This makes it possible to move first thruster device 1001d1 and second thruster device 1001d2 so as to avoid an obstacle. As a result, the package can be reliably delivered to the predetermined position.

In lifting system 1100 according to the present embodiment, controller 1021 actuates the plurality of first motors 1010d1 and/or the plurality of second motors 1010d2 after detaching first thruster device 1001d1 and second thruster device 1001d2 from unmanned aerial vehicle 1103. Controller 1021 then actuates the plurality of first motors 1010d1 and the plurality of second motors 1010d2 after detaching second thruster device 1001d2 from first thruster device 1001d1.

This makes it possible to move first thruster device 100 ld1 and second thruster device 1001d2 as a single unit to a target position for avoiding the obstacle. Therefore, controller 1021 can inhibit an increase in the processing burden of actuating and controlling the plurality of first motors 1010d1 and the plurality of second motors 1010d2.

In lifting system 1100 according to the present embodiment, after detaching second thruster device 1001d2 from first thruster device 1001d1, controller 1021 controls the plurality of first motors 1010d1 and controls the plurality of second motors 1010d2 differently than the plurality of first motors 1010*d*1 to make the first hanging direction and the second hanging direction mutually different, the first hanging direction being the direction in which first wire 1016*a*1 extends between unmanned aerial vehicle 1103 and first thruster device 1001*d*1, and the second hanging direction being the direction in which second wire 1016*b*1 extends between first thruster device 1001*d*1 and second thruster device 1001*d*2.

With this, even if there is an obstacle vertically above the predetermined position, first thruster device 1001*d*1 and second thruster device 1001*d*2 can be positioned so as to reliably bypass the obstacle. As a result, with lifting system 1100, the package can be reliably delivered to the predetermined position.

In lifting system 1100 according to the present embodiment, after detaching second thruster device 1001*d*2 from first thruster device 1001*d*1, controller 1021 controls the plurality of first motors 1010*d*1 and controls the plurality of second motors 1010*d*2 differently than the plurality of first motors 1010*d*1 to reduce or eliminate the amount of overlap between first thruster device 1001*d*1 and second thruster device 1001*d*2 in terms of area size in a view perpendicular to the ground surface.

With this, the relative positions of first thruster device 1001*d*1 and second thruster device 1001*d*2 can be changed so that first thruster device 1001*d*1 is not disposed vertically above second thruster device 1001*d*2. Accordingly, even if there is an obstacle vertically above the predetermined position, first thruster device 1001*d*1 and second thruster device 1001*d*2 can be positioned so as to reliably bypass the obstacle. As a result, the package can be reliably delivered to the predetermined position.

In lifting system 1100 according to the present embodiment, after releasing the package from second thruster device 1001*d*2, controller 1021: reels in second wire 1016*b*1 using second reel 1018*b*; attaches second thruster device 1001*d*2 to first thruster device 1001*d*1; reels in first wire 1016*a*1 using first reel 1018*a*; and attaches first thruster device 1001*d*1 and second thruster device 1001*d*2 to unmanned aerial vehicle 1103.

With this, after delivering the package to the predetermined position, second thruster device 1001*d*2 can be attached to first thruster device 1001*d*1 while reeling in second wire 1016*b*1, and first thruster device 1001*d*1 and second thruster device 1001*d*2 can be attached to unmanned aerial vehicle 1103 while reeling in first wire 1016*a*1. As a result, it is possible to prevent first wire 1016*a*1 and second wire 1016*b*1 from being damaged or entangled due to contact with an obstacle or the like. This makes it possible to inhibit a decrease in the operating efficiency of lifting system 1100.

Variation 1 of Embodiment 14

Since the basic configuration of lifting system 1100 according to the present variation is the same as the basic configuration of the delivery system according to Embodiment 14 and the like, and the basic configuration of the thruster device is the same as the basic configuration of the thruster device according to Embodiment 14 and the like, repeated description of the basic configuration of lifting system 1100 and the thruster device in the present variation will be omitted where appropriate. The present variation differs from Embodiment 14 and the like in that three thruster devices are used, and that third wire 1016*c*, a third reel, fourth wire 1016*d*, and a fourth reel are used instead of the second wire and the second reel.

Figure 99:
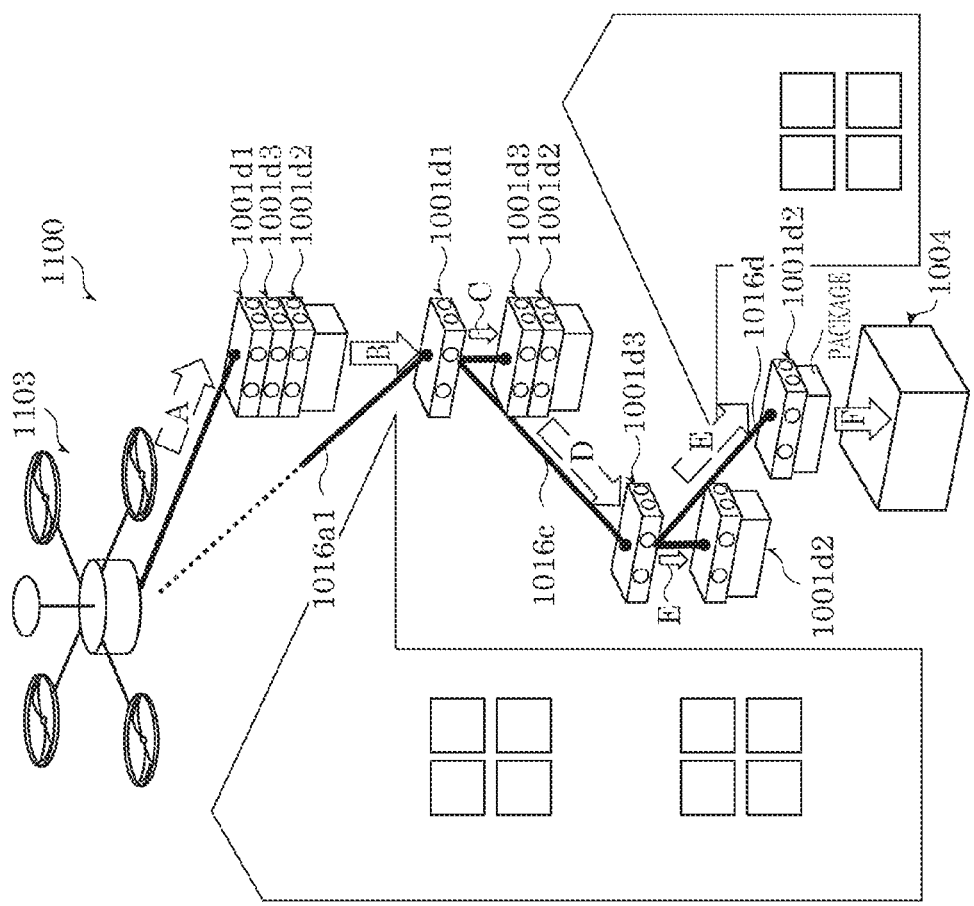
FIG. 99 illustrates an example of a thruster device of the lifting system according to Variation 1 of Embodiment 14 unloading a package.
Figure 100:
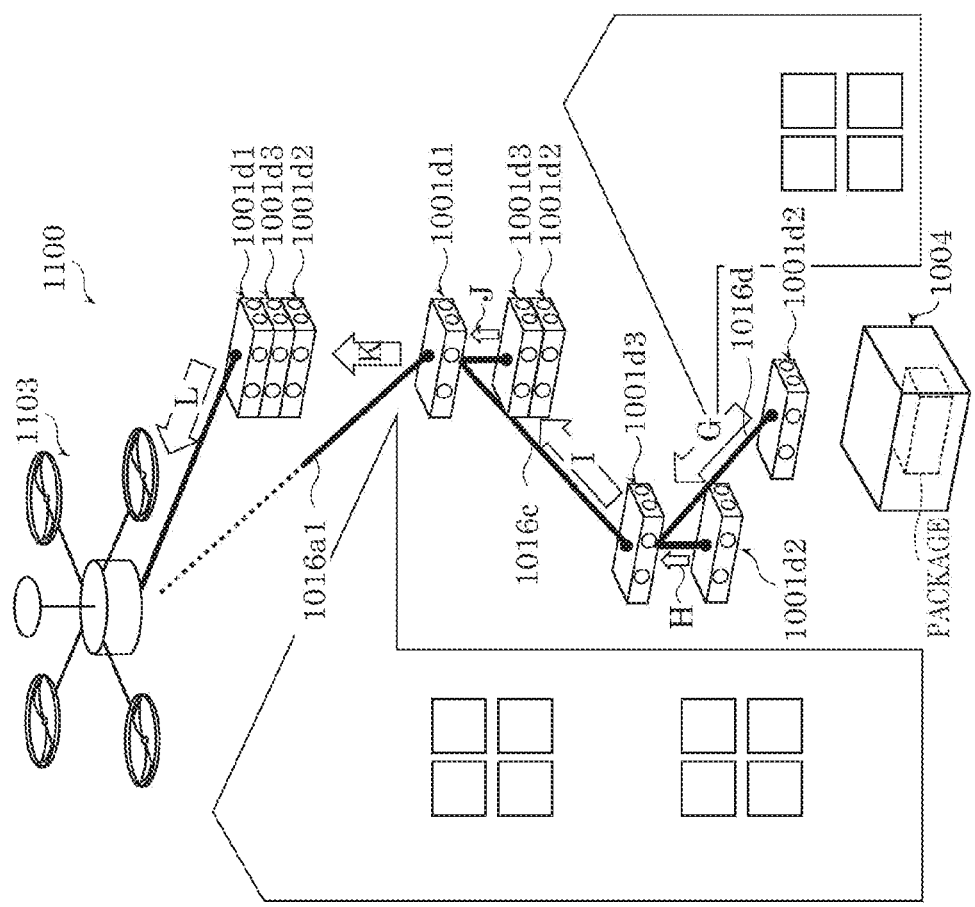
FIG. 100 illustrates an example of a scene after a thruster device of the lifting system according to Variation 1 of Embodiment 14 has unloaded the package.

FIG. 99 illustrates an example of a thruster device of lifting system 1100 according to Variation 1 of Embodiment 14 unloading a package. FIG. 100 illustrates an example of a scene after a thruster device of lifting system 1100 according to Variation 1 of Embodiment 14 has unloaded the package.

As illustrated in FIG. 99 and FIG. 100, lifting system 1100 includes third thruster device 1001*d*3, third wire 1016*c*, a third reel, fourth wire 1016*d*, and a fourth reel in addition to unmanned aerial vehicle 1103, first thruster device 1001*d*1, first wire 1016*a*1, first reel 1018*a*, second thruster device 1001*d*2, and controller 1021.

Third thruster device 1001*d*3 is attachable between and detachable from between first thruster device 1001*d*1 and second thruster device 1001*d*2. Third thruster device 1001*d*3 is a third child vehicle of unmanned aerial vehicle 1103, and is attachable to and detachable from first thruster device 1001*d*1. Third thruster device 1001*d*3 includes a third support member, a plurality of third motors, and a plurality of third propellers. The third support member is attachable to and detachable from first thruster device 1001*d*1. The plurality of third motors are arranged on a plurality of side portions forming the outer periphery of the third support member. The plurality of third propellers correspond one-to-one with the rotary shafts of the plurality of third motors and are actuated by the plurality of third motors. Third thruster device 1001*d*3 is essentially the same as the thruster device described above.

Third wire 1016*c* connects first thruster device 1001*d*1 and third thruster device 1001*d*3. Third wire 1016*c* is coupled to first thruster device 1001*d*1 at one end and coupled to third thruster device 1001*d*3 at the other end. The third reel can reel third wire 1016*c* in and out by rotating. The rotation of the third reel is controlled by lift motor 1040. In the present variation, the third reel is provided on third thruster device 1001*d*3, but the third reel may be provided on first thruster device 1001*d*1. The third reel, the third propeller and the third motor have the same configuration as the reel, the propeller, and the motor described above.

Fourth wire 1016*d* connects third thruster device 1001*d*3 and second thruster device 1001*d*2. Fourth wire 1016*d* is coupled to third thruster device 1001*d*3 at one end and coupled to second thruster device 1001*d*2 at the other end.

The fourth reel can reel fourth wire 1016*d* in and out by rotating. The rotation of the fourth reel is controlled by lift motor 1040. The fourth reel, the fourth propeller and the fourth motor have the same configuration as the reel, the propeller, and the motor described above.

Such a lifting system 1100 according to the present variation further includes: third thruster device 1001*d*3 attachable between and detachable from between first thruster device 1001*d*1 and second thruster device 1001*d*2; third wire 1016*c* that connects first thruster device 1001*d*1 and third thruster device 1001*d*3; a third reel capable of reeling in third wire 1016*c*; fourth wire 1016*d* that connects third thruster device 1001*d*3 and second thruster device 1001*d*2; and a fourth reel capable of reeling in fourth wire 1016*d*.

With this, after delivering a package to a predetermined position as shown by arrows A through F in FIG. 99, arrows G through L in FIG. 100 show that second thruster device 1001*d*2 can be attached to third thruster device 1001*d*3 while reeling in fourth wire 1016*d*, second thruster device 1001*d*2 and third thruster device 1001*d*3 can be attached to first thruster device 1001*d*1 while reeling in third wire 1016*c*, and second thruster device 1001*d*2, third thruster device 1001*d*3, and first thruster device 1001*d*1 can be attached to unmanned aerial vehicle 1103 while reeling in first wire 1016a1. As a result, it is possible to prevent first wire 1016a1, third wire 1016c, and fourth wire 1016d from being damaged or entangled due to contact with an obstacle or the like. This makes it possible to inhibit a decrease in the operating efficiency of lifting system 1100.

Variation 2 of Embodiment 14

Since the basic configuration of lifting system 1100 according to the present variation is the same as the basic configuration of the delivery system according to Embodiment 14 and the like, and the basic configuration of the thruster device is the same as the basic configuration of the thruster device according to Embodiment 14 and the like, repeated description of the basic configuration of lifting system 1100 and the thruster device in the present variation will be omitted where appropriate. The present variation differs from Embodiment 14 and the like in that it pertains to an example in which lifting system 1100 is delivering a package to a housing complex such as an apartment building.

Figure 101:
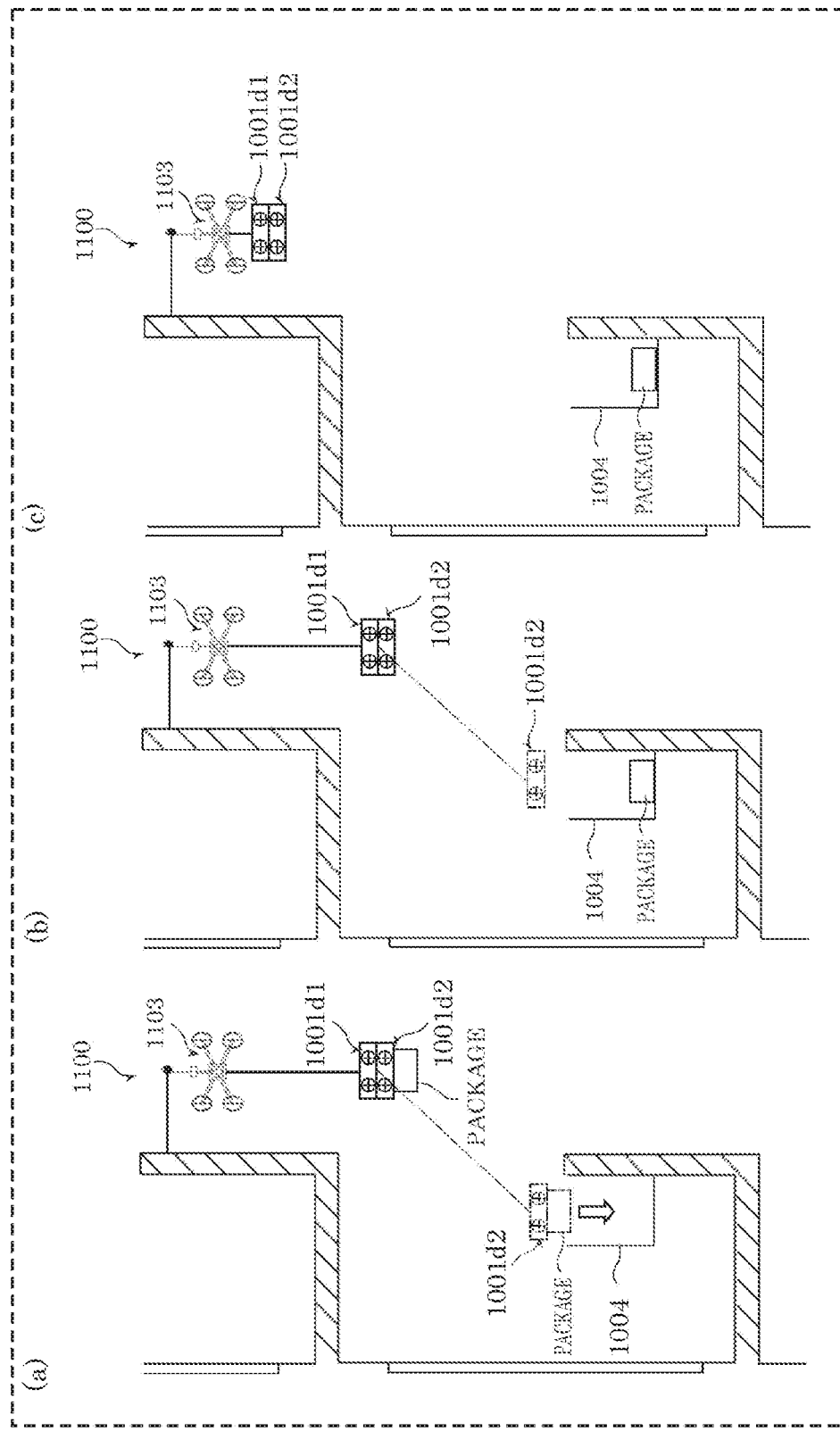
FIG. 101 is a schematic diagram illustrating an example of a first thruster device and a second thruster device of the lifting system according to Variation 2 of Embodiment 14 delivering a package to a housing complex facility.

FIG. 101 is a schematic diagram illustrating an example of first thruster device 1001d1 and second thruster device 1001d2 of lifting system 1100 according to Variation 2 of Embodiment 14 delivering a package to a housing complex facility.

In (a) in FIG. 101, controller 1021 controls lift motor 1040 of first thruster device 1001d1 to cause first reel 1018a to begin reeling out first wire 1016a1, and controls the plurality of first motors 1010d1 and/or the plurality of second motors 1010d2. This causes first thruster device 1001d1 and second thruster device 1001d2 to detach from unmanned aerial vehicle 1103 and descend to approach delivery box 1004.

When controller 1021 detects that first thruster device 1001d1 and second thruster device 1001d2 have come within a predetermined distance of delivery box 1004, second thruster device 1001d2 detaches from first thruster device 1001d1. Controller 1021 controls lift motor 1040 of second thruster device 1001d2 to cause second reel 1018b to begin reeling out second wire 1016b1, and controls the plurality of second motors 1010d2. Second thruster device 1001d2 then moves to a position vertically above the opening of delivery box 1004.

In (a) and (b) in FIG. 101, controller 1021 causes second thruster device 1001d2 to execute the disconnection of the package, thereby storing the package in delivery box 1004.

As illustrated in (b) and (c) in FIG. 101, controller 1021 controls lift motor 1040 of second thruster device 1001d2 to cause second reel 1018b to begin reeling in second wire 1016b1, and controls the plurality of second motors 1010d2. As a result, second thruster device 1001d2 moves to a position vertically below first thruster device 1001d1 and is attached to first thruster device 1001d1. Controller 1021 controls lift motor 1040 of first thruster device 1001d1 to cause first reel 1018a to begin reeling in first wire 1016a1, and controls the plurality of first motors 1010d1 and/or the plurality of second motors 1010d2. As a result, first thruster device 1001d1 and second thruster device 1001d2 rise as a single unit and move to a position vertically below unmanned aerial vehicle 1103, and first thruster device 1001d1 and second thruster device 1001d2 are attached to unmanned aerial vehicle 1103.

Variation 3 of Embodiment 14

Since the basic configuration of lifting system 1100 according to the present variation is the same as the basic configuration of the delivery system according to Embodiment 14 and the like, and the basic configuration of the thruster device is the same as the basic configuration of the thruster device according to Embodiment 14 and the like, repeated description of the basic configuration of lifting system 1100 and the thruster device in the present variation will be omitted where appropriate. The present embodiment differs from Embodiment 14 and the like in that the thruster device includes arm 1119.

Figure 102:
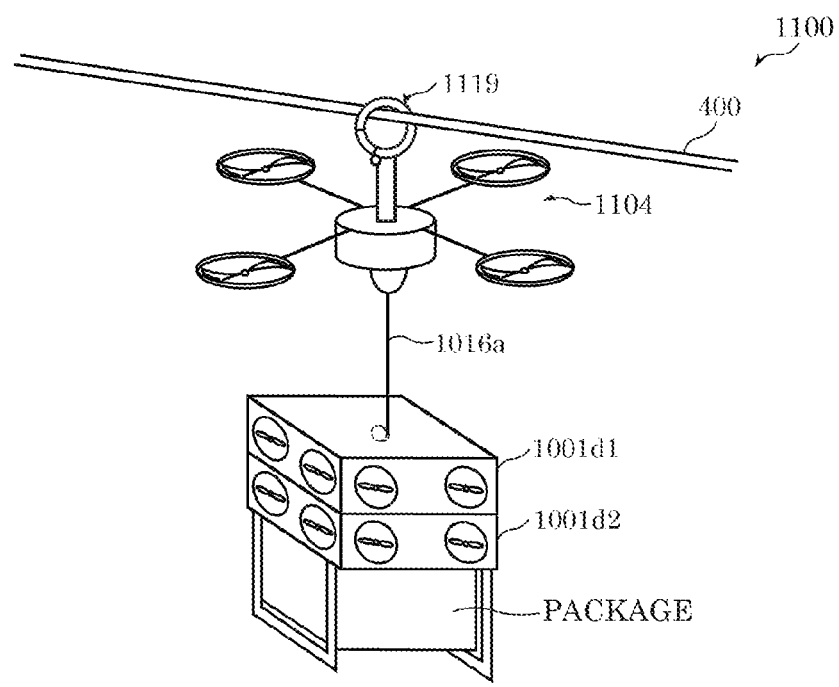
FIG. 102 is a schematic diagram illustrating an example of the lifting system according to Variation 3 of Embodiment 14.

FIG. 102 is a schematic diagram illustrating an example of lifting system 1100 according to Variation 3 of Embodiment 14.

Controller 1021 causes first thruster device 1001d1 and second thruster device 1001d2 to detach from unmanned aerial vehicle 1104 while arm 1119 is engaging rail 400. When controller 1021 obtains, by means of a sensor or the like, information regarding the engagement of rail 400 by arm 1119, based on the obtained information, controller 1021 causes first thruster device 1001d1 and second thruster device 1001d2 to detach from unmanned aerial vehicle 1104. Controller 1021 controls lift motor 1040 to cause first reel 1018a to begin reeling out first wire 1016a1, and controls the plurality of first motors 1010d1 and/or the plurality of second motors 1010d2. This causes first thruster device 1001d1 and second thruster device 1001d2 to detach from unmanned aerial vehicle 1104.

As described above, in lifting system 1100 according to the present variation, unmanned aerial vehicle 1104 includes arm 1119 capable of engaging rail 400. Controller 1021 causes first thruster device 1001d1 and second thruster device 1001d2 to detach from unmanned aerial vehicle 1104 while unmanned aerial vehicle 1104 is at a position separated from the ground and arm 1119 is engaging rail 400.

This makes it possible to hold unmanned aerial vehicle 1104 onto rail 400 via arm 1119. As a result, even if first thruster device 1001d1 and second thruster device 1001d2 are detached from unmanned aerial vehicle 1104, first thruster device 1001d1 and second thruster device 1001d2 can be held via first wire 1016a1 and second wire 1016b1. This makes it possible to inhibit first thruster device 1001d1 and second thruster device 1001d2 from falling.

Since unmanned aerial vehicle 1104 can be held onto rail 400 without flying, energy consumption by unmanned aerial vehicle 1104 can be reduced.

Variation 4 of Embodiment 14

Since the basic configuration of thruster device 1001f according to the present variation is the same as the basic configuration of the thruster device according to Embodiment 14 and the like, repeated description of the basic configuration of lifting system 1100 and thruster device 1001f in the present variation will be omitted where appropriate. The present embodiment differs from Embodiment 14 and the like in that thruster device 1001f includes arm 1119a.

Figure 103:
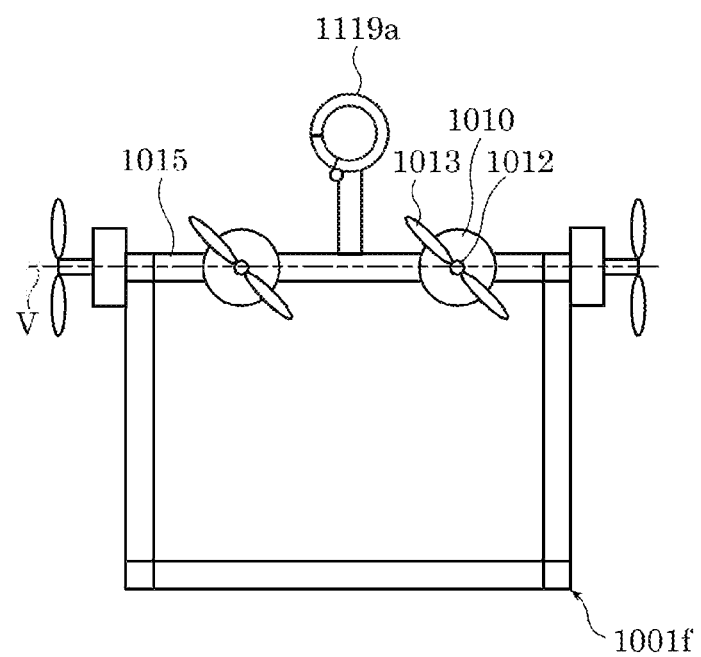
FIG. 103 is a schematic diagram illustrating an example of a thruster device of the lifting system according to Variation 4 of Embodiment 14.

FIG. 103 is a schematic diagram illustrating an example of thruster device 1001f in lifting system 1100 according to Variation 4 of Embodiment 14.

As illustrated in FIG. 103, thruster device 1001f further includes arm 1119a. As described above, arm 1119a can move along rail 400 by clasping (engaging) rail 400. Arm 1119a can also hang in midair by arm 1119a coupled to rail 400 if thruster device 1001f is stopped from moving.

Although the present variation includes arm 1119a as an example, a wire may be used instead of arm 1119a.

Embodiment 15

Configuration

Hereinafter, since the basic configuration of delivery box 1004a according to the present embodiment is the same as the basic configuration of the delivery box according to Embodiment 2 and the like, repeated description of the basic configuration of delivery box 1004a in the present embodiment will be omitted where appropriate. The present embodiment differs from Embodiment 2 and the like in that delivery box 1004a includes top lid 1004a2 and side lid 1004a3.

Figure 104:
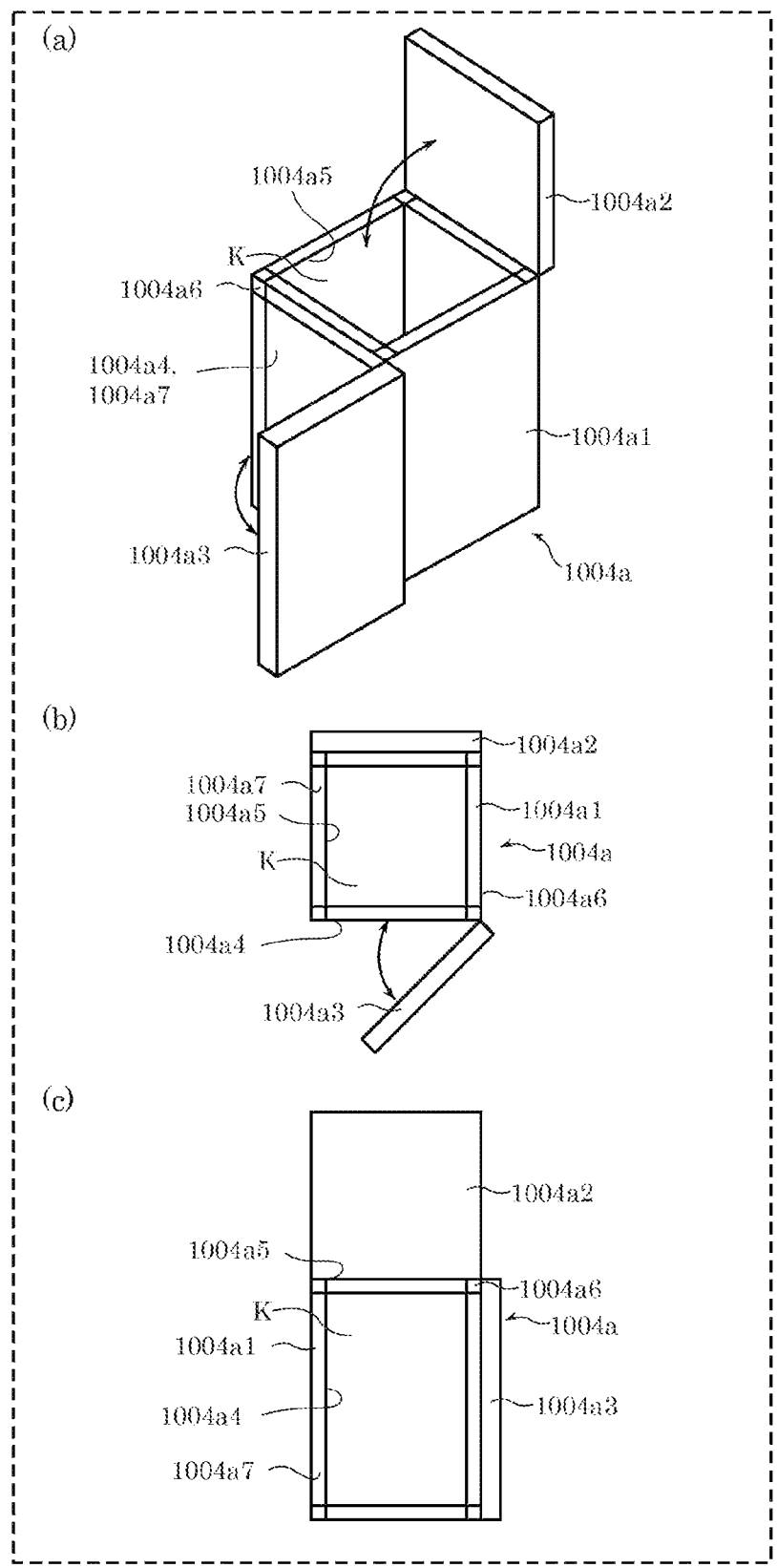
FIG. 104 is a schematic diagram illustrating an example of the delivery box according to Embodiment 15.

FIG. 104 is a schematic diagram illustrating an example of delivery box 1004a according to Embodiment 15.

As illustrated in FIG. 104, delivery box 1004a includes container 1004a1, top lid 1004a2, and side lid 1004a3.

Container 1004a1 defines space K for storing a package. Container 1004a1 is an enclosure for storing a package. Container 1004a1 is exemplified as rectangular in shape, but may be of any shape as long as it can store a package. Top opening 1004a5 is formed in top portion 1004a6 vertically above container 1004a1. Top opening 1004a5 is covered by the closing of top lid 1004a2. Side opening 1004a4 is formed in side portion 1004a7 of container 1004a1. Side opening 1004a4 is covered by the closing of side lid 1004a3. Top opening 1004a5 and side opening 1004a4 are in communication with space K of container 1004a1.

Top lid 1004a2 is provided on top portion 1004a6 of container 1004a1 and can open and close top opening 1004a5 for inserting a package into space K through top opening 1004a5. Top lid 1004a2 covers top opening 1004a5 when closed and opens top opening 1004a5 when opened. Top lid 1004a2 is held so as to be pivotable around a predetermined axis relative to container 1004a1.

Side lid 1004a3 is provided on side portion 1004a7 of container 1004a1 and can open and close side opening 1004a4 for removing a package in space K through side opening 1004a4. Side lid 1004a3 covers side opening 1004a4 when closed and opens side opening 1004a4 when opened. Side lid 1004a3 is held so as to be pivotable around a predetermined axis relative to container 1004a1.

Although top lid 1004a2 and side lid 1004a3 are configured to open outwardly with respect to container 1004a1, they may be configured to open inwardly into space K. Top lid 1004a2 and side lid 1004a3 are not limited to a single-swing opening mechanism, and may employ a dual-swing opening mechanism.

Advantageous Effects

Next, the advantageous effects achieved by delivery box 1004a according to the present embodiment will be described.

As described above, delivery box 1004a according to the present embodiment includes: container 1004a1 that defines space K for storing a package; top lid 1004a2 that is provided on top portion 1004a6 of container 1004a1 and can open and close top opening 1004a5 for inserting a package into space K through top opening 1004a5; and side lid 1004a3 that is provided on side portion 1004a7 of container 1004a1 and can open and close side opening 1004a4 for removing a package in space K through side opening 1004a4.

With this, a package can be placed into the space K of delivery box 1004a from above delivery box 1004a, and a package stored in the space K can be removed from the side of delivery box 1004a. Accordingly, a package can be easily removed.

Embodiment 16

Configuration

Hereinafter, since the basic configuration of delivery box 1004b included in system 1101 according to the present embodiment is the same as the basic configuration of the delivery box according to Embodiment 15 and the like, repeated description of the basic configuration of delivery box 1004b in the present embodiment will be omitted where appropriate. The present embodiment differs from Embodiment 15 and the like in that delivery box 1004b includes hole 1004a8 and the like.

Figure 105:
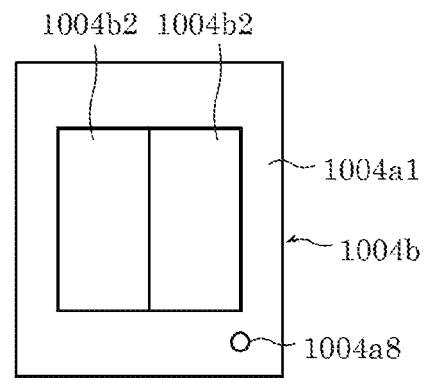
FIG. 105 is a top view of the delivery box included in the system according to Embodiment 16.
Figure 106:
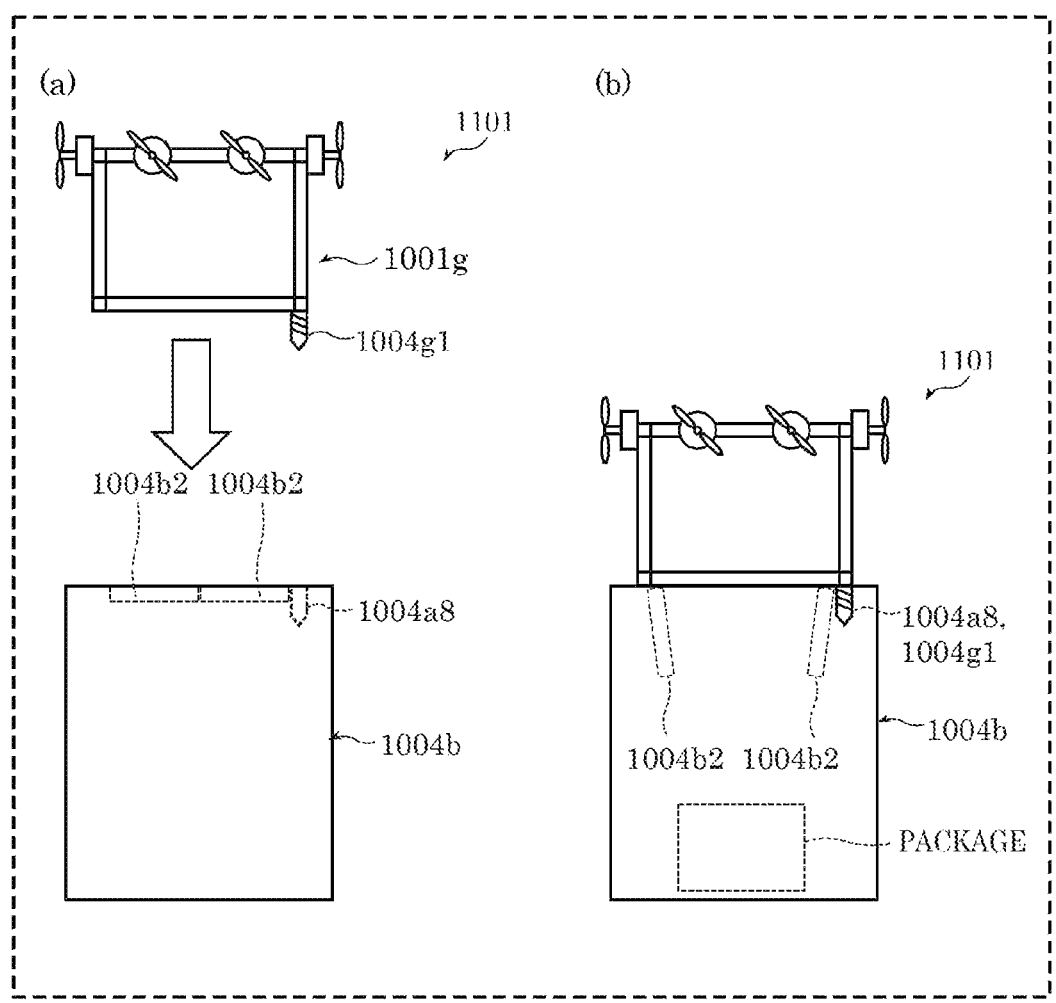
FIG. 106 is a schematic diagram illustrating an example of the lifting device included in the system according to Embodiment 16 unloading a package.

FIG. 105 is a top view of delivery box 1004b included in system 1101 according to Embodiment 16. FIG. 106 is a schematic diagram illustrating an example of lifting device 1001g included in system 1101 according to Embodiment 16 unloading a package. In FIG. 106, (a) illustrates lifting device 1001g descending from vertically above delivery box 1004b, and (b) illustrates protrusion 1004g1 of lifting device 1001g being inserted into hole 1004a8 of delivery box 1004b, and lifting device 1001g being connected to delivery box 1004b.

As illustrated in FIG. 105 and FIG. 106, system 1101 according to the present embodiment includes delivery box 1004b and lifting device 1001g.

Delivery box 1004b includes hole 1004a8 and an opening and closing member in addition to container 1004a1, top lid 1004b2, and the side lid. Hole 1004a8 is provided on the top portion of container 1004a1 and can accommodate the insertion of protrusion 1004g1. Although hole 1004a8 is exemplified as a recess formed in the top portion, hole 1004a8 may be, for example, a screw hole. Hole 1004a8 is formed in a corner area of container 1004a1 when container 1004a1 is viewed from vertically above.

Top lid 1004b2 is an inward-opening lid that opens inward into the space and employs a dual-swing opening mechanism. However, top lid 1004b2 may be a single-swing opening lid.

The opening and closing member is a mechanism that opens top lid 1004b2 when protrusion 1004g1 is inserted into hole 1004a8. The opening and closing member may be a mechanical mechanism such as an actuator, or a motorized mechanism that opens top lid 1004b2 upon detecting the insertion of protrusion 1004g1 into hole 1004a8.

Lifting device 1001g is attachable to and detachable from a package and can be lowered from vertically above delivery box 1004b. Lifting device 1001g includes protrusion 1004g1 engages by being inserted into hole 1004a8. Lifting device 1001g is, for example, the unmanned aerial vehicle or the thruster device described above. In the present embodiment, lifting device 1001g is exemplified as a thruster device.

Protrusion 1004g1 protrudes downwardly from the lower end surface of lifting device 1001g. Protrusion 1004g1 may be, for example, a screw or a leg or the like, as long as it is insertable into hole 1004a8.

As illustrated in (a) in FIG. 106, lifting device 1001g moves so that protrusion 1004g1 and hole 1004a8 of delivery box 1004b are vertically aligned as lifting device 1001g descends from a position vertically above delivery box 1004b toward delivery box 1004b. The insertion of protrusion 1004g1 into hole 1004a8 aligns lifting device 1001g with the top portion of delivery box 1004b. As a result, lifting device 1001g is connected to the top portion of delivery box 1004*b* so as to cover the top opening of delivery box 1004*b*. Lifting device 1001*g* then disconnects the package to store the package in the space in delivery box 1004*b*.

Advantageous Effects

Next, the advantageous effects achieved by system 1101 according to the present embodiment will be described.

As described above, system 1101 according to the present embodiment includes: delivery box 1004*b*; and lifting device 1001*g* that is attachable to and detachable from a package and can be lowered from vertically above delivery box 1004*b*. Lifting device 1001*g* includes protrusion 1004*g*1. Delivery box 1004*b* includes hole 1004*a*8 that is provided in the top portion and accommodates the insertion of protrusion 1004*g*1: and a mechanism for opening top lid 1004*b*2 when protrusion 1004*g*1 is inserted into hole 1004*a*8.

With this, when lifting device 1001*g* stores a package in delivery box 1004*b*, lifting device 1001*g* can be aligned with the top opening of delivery box 1004*b* by inserting protrusion 1004*g*1 into hole 1004*a*8. As a result, a package can be stored with certainty in the space in delivery box 1004*b*.

Embodiment 17

Configuration

Hereinafter, since the basic configuration of unmanned aerial vehicle 1105 according to the present embodiment is the same as the basic configuration of the unmanned aerial vehicle (drone) according to Embodiment 3 and the like, repeated description of the basic configuration of unmanned aerial vehicle 1105 in the present embodiment will be omitted where appropriate. The present embodiment differs from Embodiment 3 and the like in that unmanned aerial vehicle 1105 includes first arm 1121 and second arm 1122.

Figure 107:
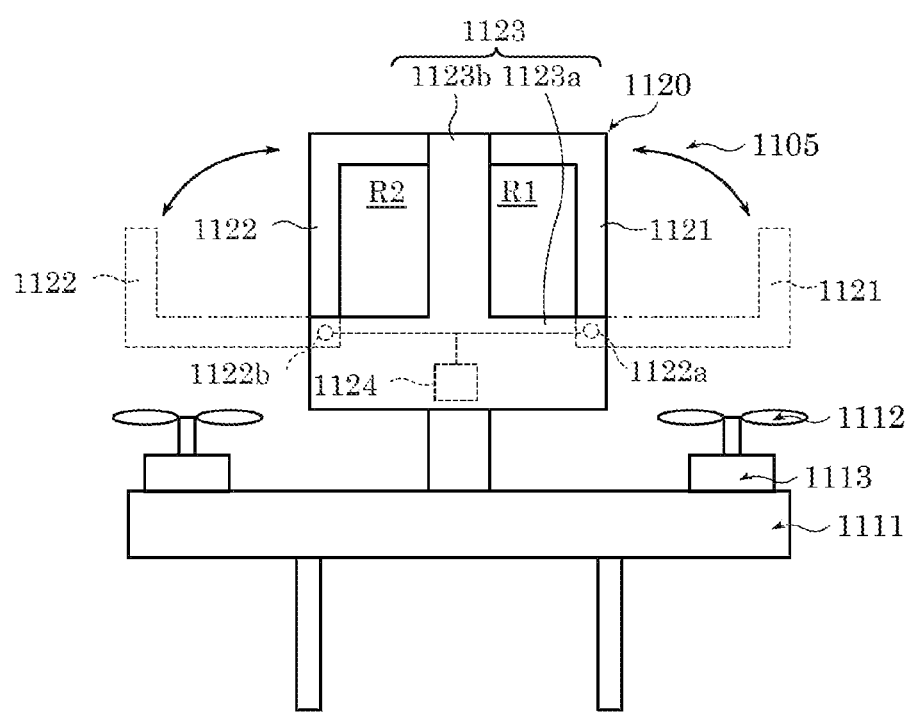
FIG. 107 is a schematic diagram illustrating an example of the unmanned aerial vehicle according to Embodiment 17.

FIG. 107 is a schematic diagram illustrating an example of unmanned aerial vehicle 1105 according to Embodiment 17.

Unmanned aerial vehicle 1105 includes a plurality of rotary wings 1112, a plurality of motors 1113 that respectively rotate the plurality of rotary wings 1112, main body 1111 that supports the plurality of motors 1113, and connector 1120.

Connector 1120 connects to a rail positioned separated from the ground surface while main body 1111 is hanging. Connector 1120 includes fixed portion 1123, first arm 1121, second arm 1122, first actuator 1122*a*, second actuator 1122*b*, and controller 1124. Since connector 1120 has the same structure as the above-described connector 1120, repeated description of the same structure will be omitted where appropriate.

Fixed portion 1123 pivotably supports first arm 1121 and second arm 1122, and is fixedly connected to main body 1111 of unmanned aerial vehicle 1105. Fixed portion 1123 has an upside down T-shape in a side view.

Fixed portion 1123 includes first base portion 1123*a* extending in the direction in which motors 1113 are aligned and second base portion 1123*b* disposed between first arm 1121 and second arm 1122. Second base portion 1123*b* extends upwardly from first base portion 1123*a* and separates first region R1 and second region R2, which will be described below. More specifically, second base portion 1123*b* extends so as to rise from the center portion of first base portion 1123*a* to the respective leading ends of first arm 1121 and second arm 1122 (also referred to as the "other end" of first arm 1121 and the "other end" of second arm 1122 as described below). Fixed portion 1123 is one example of a partition portion.

First arm 1121 and second arm 1122 are hangers for hanging unmanned aerial vehicle 1105 from a rail. First arm 1121 and second arm 1122 are staggered on fixed portion 1123.

More specifically, one end of first arm 1121 is connected to fixed portion 1123 and the other end opens and closes with respect to fixed portion 1123. Similarly, one end of second arm 1122 is connected to fixed portion 1123 and the other end opens and closes with respect to fixed portion 1123. The one end of first arm 1121 is pivotably coupled to one end of first base portion 1123*a*, and the one end of second arm 1122 is pivotably coupled to the other end of first base portion 1123*a*. The other end of first arm 1121 and the other end of second arm 1122 are capable of abutting and separating from the leading end of second base portion 1123*b* so as to sandwich the leading end.

In the closed state in which first arm 1121 is abutting the leading end of second base portion 1123*b*, first region R1 enclosed by first arm 1121 and fixed portion 1123 is formed. In the closed state in which second arm 1122 is abutting the leading end of second base portion 1123*b*, second region R2 enclosed by second arm 1122 and fixed portion 1123 is formed. First region R1 is separated from second region R2 by second base portion 1123*b*.

First actuator 1122*a* opens and closes first arm 1121. Second actuator 1122*b* opens and closes second arm 1122. First actuator 1122*a* is connected to the one end of first arm 1121 and pivots first arm 1121. Second actuator 1122*b* is connected to the one end of second arm 1122 and pivots second arm 1122.

Controller 1124 controls first actuator 1122*a* and second actuator 1122*b*. Controller 1124 switches connector 1120 connected to a first rail (one example of a rail) to a second rail (an example of a rail) different than the first rail by controlling first actuator 1122*a* and second actuator 1122*b*. Controller 1124 switches connector 1120 connected to a second rail to a first rail by controlling first actuator 1122*a* and second actuator 1122*b*.

Controller 1124 controls first actuator 1122*a* and second actuator 1122*b* so that at least one of first arm 1121 and second arm 1122 is in a closed state.

More specifically, when controller 1124 receives an instruction to change first arm 1121 from the closed state to an open state, controller 1124 determines whether second arm 1122 is in the closed state or not. When second arm 1122 is in the closed state, controller 1124 changes first arm 1121 to the open state. Since second region R2 is a closed region when second arm 1122 is in the closed state, if a second rail is present in second region R2, unmanned aerial vehicle 1105 is connected to the second rail and is thus prevented from falling from the second rail.

However, when second arm 1122 is in the open state, controller 1124 maintains first arm 1121 in the closed state. Since second region R2 is an open region when second arm 1122 is in the open state, unmanned aerial vehicle 1105 is not connected to the second rail and is connected to and held by the first rail via first arm 1121 in the closed state. Accordingly, controller 1124 does not place first arm 1121 in the open state but rather maintains first arm 1121 in the closed state. As a result, unmanned aerial vehicle 1105 is connected to and held by the first rail, thereby preventing it from falling from the first rail.

More specifically, when controller 1124 receives an instruction to change second arm 1122 from the closed state to the open state, controller 2124 determines whether first arm 1121 is in the closed state or not. When first arm 1121 is in the closed state, controller 1124 changes second arm 1122 to the open state. Since first region R1 is a closed region when first arm 1121 is in the closed state, if a first rail is present in first region R1, unmanned aerial vehicle 1105 is connected to the first rail and is thus prevented from falling from the first rail.

However, when first arm 1121 is in the open state, controller 1124 maintains second arm 1122 in the closed state. Since first region R1 is an open region when first arm 1121 is in the open state, unmanned aerial vehicle 1105 is not connected to the first rail and is connected to and held by the second rail via second arm 1122 in the closed state. Accordingly, controller 1124 does not place second arm 1122 in the open state but rather maintains second arm 1122 in the closed state. As a result, unmanned aerial vehicle 1105 is connected to and held by the second rail, thereby preventing it from falling from the second rail.

Controller 1124 can determine whether first arm 1121 is in the closed state and whether second arm 1122 is in the closed state based on, for example, the presence or absence of an instruction or the like output to first actuator 1122*a* and second actuator 1122*b*, or the pivot state of first actuator 1122*a* and second actuator 1122*b*. Controller 1124 may determine whether first arm 1121 is in the closed state and whether second arm 1122 is in the closed state by providing one or more sensors or the like that detect whether first arm 1121 and second arm 1122 are in the open or closed state.

Operations

Next, operations performed by unmanned aerial vehicle 1105 according to the present embodiment will be described.

Figure 108:
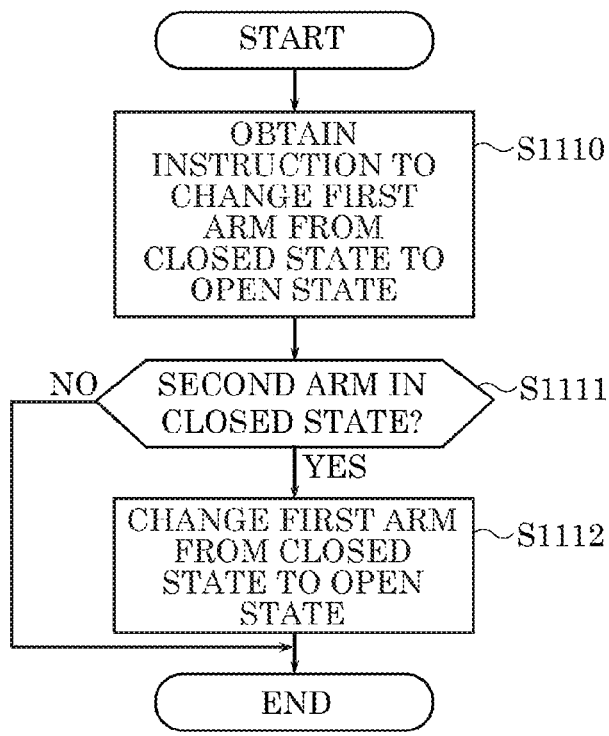
FIG. 108 is a flowchart illustrating an example of operations for changing the first arm of the unmanned aerial vehicle according to Embodiment 17 from a closed state to an open state.

FIG. 108 is a flowchart illustrating an example of operations for changing first arm 1121 of unmanned aerial vehicle 1105 according to Embodiment 17 from the closed state to the open state.

As illustrated in FIG. 108, controller 1124 obtains an instruction to change first arm 1121 from the closed state to the open state (S1110). For example, this instruction is obtained by controller 1124 when connection is switched from the second rail to the first rail while the second rail is connected to second arm 1122.

Next, when controller 1124 receives an instruction to change first arm 1121 from the closed state to the open state, controller 1124 determines whether second arm 1122 is in the closed state or not (S1111).

If second arm 1122 is in the closed state (YES in S1111), controller 1124 changes first arm 1121 from the closed state to the open state (S1112). Controller 1124 controls first actuator 1122*a* to pivot (clockwise) first arm 1121 away from the leading end of second base portion 1123*b* to place first arm 1121 in the open state. In this case, the first rail can be arranged in the open first region R1. Controller 1124 then ends the processing for the operations to change first arm 1121 from the closed state to the open state.

However, if second arm 1122 is in the open state (NO in S1111), controller 1124 maintains first arm 1121 in the closed state. Controller 1124 then ends the processing for the operations to change first arm 1121 from the closed state to the open state.

Unmanned aerial vehicle 1105 according to the present embodiment may perform the operations illustrated in FIG. 109 and described below. Operations illustrated in FIG. 109 and described below that are the same as those in FIG. 108 are assigned with the same reference signs and repeated description will be omitted where appropriate.

Figure 109:
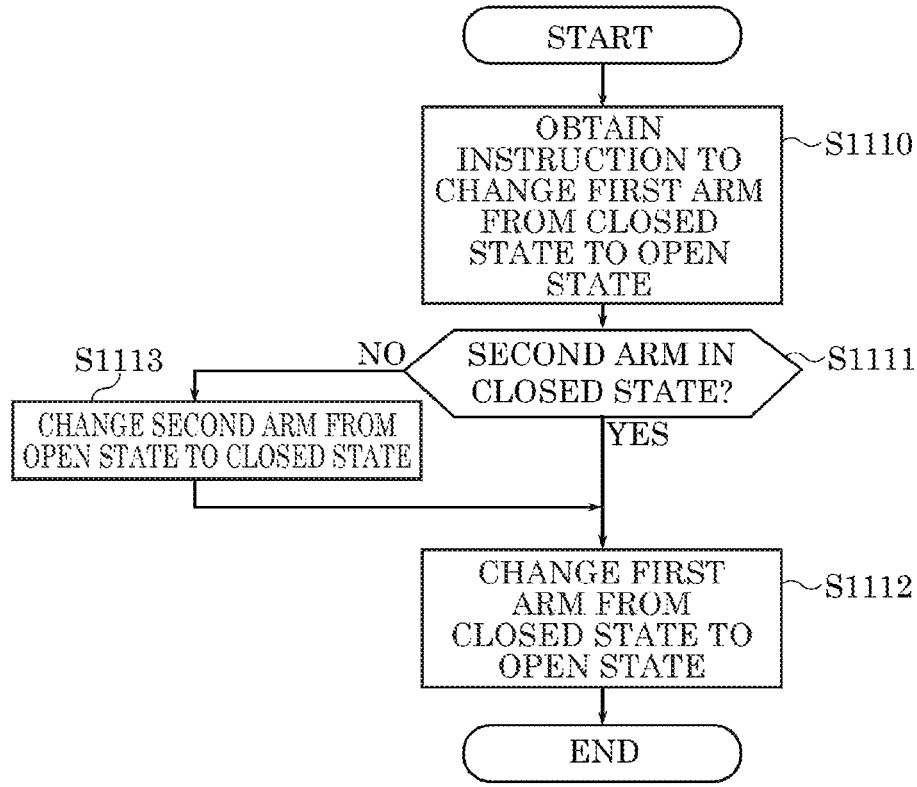
FIG. 109 is a flowchart illustrating an example of other operations for changing the state of the first arm of the unmanned aerial vehicle according to Embodiment 17 from a closed state to an open state.

FIG. 109 is a flowchart illustrating an example of other operations for changing the state of first arm 1121 of unmanned aerial vehicle 1105 according to Embodiment 17 from the closed state to the open state.

As illustrated in FIG. 108, controller 1124 changes second arm 1122 from the open state to closed state (S1113) if second arm 1122 is in open state (NO in S1111) after performing the processes of steps S1110 and S1111. Controller 1124 controls second actuator 1122*b* to pivot (clockwise) second arm 1122 toward the leading end of second base portion 1123*b* to place second arm 1122 in the closed state. In this case, the second rail can be arranged in the closed second region R2. Controller 1124 then proceeds to step S1112, and ends the processing for the operations to change first arm 1121 from the closed state to the open state.

Although FIG. 108 and FIG. 109 illustrate examples in which the instruction is an instruction to change first arm 1121 from the closed state to the open state, since the same processes apply when the instruction is an instruction to change second arm 1122 from the closed state to the open state, description will be omitted.

Advantageous Effects

Next, advantageous effects achieved by unmanned aerial vehicle 1105 according to the present embodiment will be described.

As described above, unmanned aerial vehicle 1105 according to the present embodiment includes: a plurality of rotary wings 1112; a plurality of motors 1113 that respectively rotate the plurality of rotary wings 1112; main body 1111 that supports the plurality of motors 1113; and connector 1120 for connecting to a rail positioned separated from the ground surface while main body 1111 is hanging. Connector 1120 includes: fixed portion 1123; first arm 1121 including one end connected to fixed portion 1123 and another end that opens and closes with respect to fixed portion 1123; second arm 1122 including one end connected to fixed portion 1123 and another end that opens and closes with respect to fixed portion 1123; first actuator 1122*a* that opens and closes first arm 1121; second actuator 1122*b* that opens and closes second arm 1122; and controller 1124 that controls first actuator 1122*a* and second actuator 1122*b*. First region R1 enclosed by first arm 1121 in the closed state and fixed portion 1123 is separated from second region R2 enclosed by second arm 1122 in the closed state and fixed portion 1123.

With this, when first arm 1121 of unmanned aerial vehicle 1105 is connected to a first rail, which is one example of a rail, first arm 1121 can be disconnected from the first rail after second arm 1122 is connected to a second rail. This allows unmanned aerial vehicle 1105 to switch connections from the first rail to the second rail, which is one example of another rail, and continue moving.

In unmanned aerial vehicle 1105 according to the present embodiment, fixed portion 1123 extends upwardly from main body 1111 and includes a partition portion separating first region R1 and second region R2.

With this, a single connector 1120 can be used to connect to two rails. Accordingly, the attitude of connector 1120 can be maintained better than when two connectors 1120 are used.

In unmanned aerial vehicle 1105 according to the present embodiment, controller 1124 controls first actuator 1122*a* and second actuator 1122*b* so that at least one of first arm 1121 and second arm 1122 is in a closed state.

With this, if a rail is present in at least one of closed first region R1 and closed second region R2, unmanned aerial vehicle 1105 can securely hang from the rail.

In unmanned aerial vehicle 1105 according to the present embodiment, when controller 1124 receives an instruction to change first arm 1121 from the closed state to the open state, controller 1124 determines whether second arm 1122 is in the closed state or not. When second arm 1122 is in the closed state, controller 1124 changes first arm 1121 to the open state. When second arm 1122 is in the open state, controller 1124 maintains first arm 1121 in the closed state.

With this, when a second rail is connected to second arm 1122 in the closed state, a first rail can be connected to first arm 1121. When second arm 1122 is in the open state, if a first rail is connected to first arm 1121 in the closed state, first arm 1121 can be maintained in the closed state without placing first arm 1121 in the open state. In this way, unmanned aerial vehicle 1105 can reliably hang from a rail, thereby inhibiting unmanned aerial vehicle 1105 from falling.

In unmanned aerial vehicle 1105 according to the present embodiment, when controller 1124 receives an instruction to change second arm 1122 from the closed state to the open state, controller 1124 determines whether first arm 1121 is in the closed state or not. When controller 1124 receives the instruction while first arm 1121 is in the closed state, controller 1124 changes second arm 1122 to the open state. When controller 1124 receives the instruction while first arm 1121 is in the open state, controller 1124 maintains second arm 1122 in the closed state.

With this, when a first rail is connected to first arm 1121 in the closed state, a second rail can be connected to second arm 1122. When first arm 1121 is in the open state, if a second rail is connected to second arm 1122 in the closed state, second arm 1122 can be maintained in the closed state without placing second arm 1122 in the open state. In this way, unmanned aerial vehicle 1105 can reliably hang from a rail, thereby inhibiting unmanned aerial vehicle 1105 from falling.

Variation 1 of Embodiment 17

Hereinafter, since the basic configuration of unmanned aerial vehicle 1105 according to the present variation is the same as the basic configuration of the unmanned aerial vehicle of Embodiment 17 and the like, repeated description of the basic configuration of unmanned aerial vehicle 1105 in the present variation will be omitted where appropriate. The present variation differs from Embodiment 17 and the like in that connector 1120 of unmanned aerial vehicle 1105 rotates around axis O.

Figure 110:
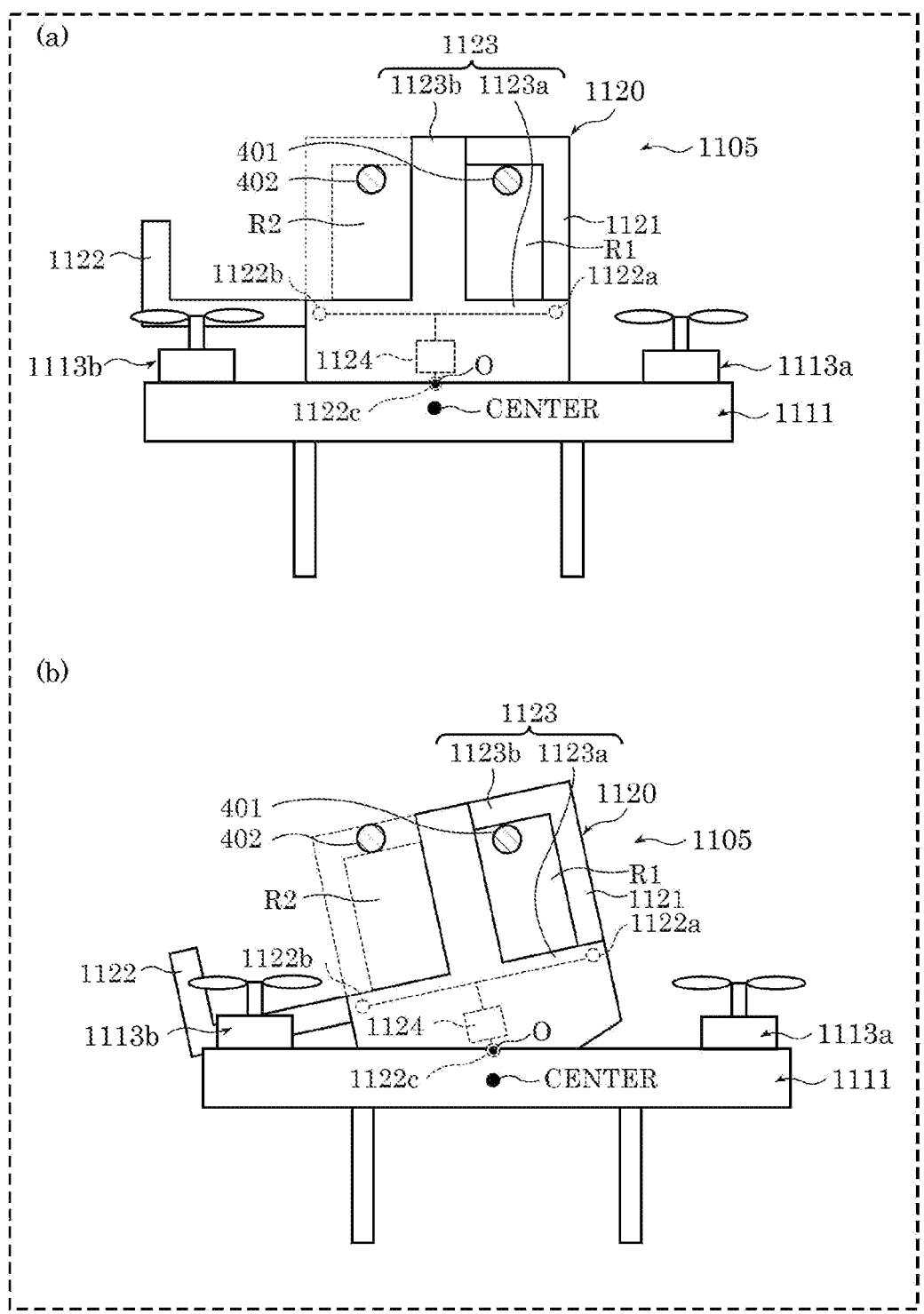
FIG. 110 is a schematic diagram illustrating an example of the unmanned aerial vehicle according to Variation 1 of Embodiment 17.

FIG. 110 is a schematic diagram illustrating an example of unmanned aerial vehicle 1105 according to Variation 1 of Embodiment 17. In FIG. 110, (a) illustrates an example of second arm 1122 of unmanned aerial vehicle 1105 in an open state, and (b) illustrates an example in which connector 1120 is pivoted around axis O while second arm 1122 of unmanned aerial vehicle 1105 is in an open state.

Controller 1124 controls the rotational speed of the plurality of motors 1113. More specifically, when first arm 1121 is in the open state, second arm 1122 is in the closed state, and second arm 1122 is hanging from a rail passing through second region R2, controller 1124 increases a first rotational speed of first motor 1113a, which is the motor closest to first arm 1121 among the plurality of motors 1113, to a rotational speed greater than a second rotational speed of second motor 1113b, which is the motor closest to second arm 1122 among the plurality of motors 1113.

When second arm 1122 is in the open state, first arm 1121 is in the closed state, and first arm 1121 is hanging from a rail passing through first region R1, controller 1124 increases the second rotational speed of second motor 1113b, which is the motor closest to second arm 1122 among the plurality of motors 1113, to a rotational speed greater than the first rotational speed of first motor 1113a, which is the motor closest to first arm 1121 among the plurality of motors 1113.

In order to maintain the attitude of unmanned aerial vehicle 1105 substantially horizontal when the center of gravity shifts due to the pivoting of first arm 1121 or second arm 1122, controller 1124 adds buoyancy to the side to which the center of gravity has shifted (the side of first arm 1121 or the side of second arm 1122 in the open state) so as to compensate for the incline of the attitude of unmanned aerial vehicle 1105 caused by the shift.

Connector 1120 further includes third actuator 1122c that changes the angle of fixed portion 1123 relative to main body 1111. An angle of fixed portion 1123 relative to main body 1111 indicates an attitude of fixed portion 1123 relative to main body 1111, and is an angle the direction in which second base portion 1123b of fixed portion 1123 extends (i.e., the lengthwise direction of second base portion 1123b) relative to a surface of main body 1111 (for example, a surface parallel to a horizontal plane).

Controller 1124 further controls third actuator 1122c. More specifically, when first arm 1121 is in the open state, second arm 1122 is in the closed state, and second arm 1122 is hanging on a rail passing through second region R2, controller 1124 changes the angle via third actuator 1122c to position second region R2 directly above the center of main body 1111.

When second arm 1122 is in the open state, first arm 1121 is in the closed state, and first arm 1121 is hanging on a rail passing through first region R1, controller 1124 changes the angle via third actuator 1122c to position first region R1 directly above the center of main body 1111.

Controller 1124 causes the attitude of fixed portion 1123 to be inclined relative to main body 1111 of unmanned aerial vehicle 1105 using third actuator 1122c to, for example, separate first rail 401 from first region R1 if only first arm 1121 is in the open state or separate second rail 402 from second region R2 if only second arm 1122 is in the open state.

In this way, in unmanned aerial vehicle 1105 according to the present variation, controller 1124 further controls the rotational speed of the plurality of motors 1113. When first arm 1121 is in the open state, second arm 1122 is in the closed state, and second arm 1122 is hanging from a rail passing through second region R2, controller 1124 increases a first rotational speed of first motor 1113a, which is the motor closest to first arm 1121 among the plurality of motors 1113, to a rotational speed greater than a second rotational speed of second motor 1113b, which is the motor closest to second arm 1122 among the plurality of motors 1113. Alternatively, when second arm 1122 is in the open state, first arm 1121 is in the closed state, and first arm 1121 is hanging from a rail passing through first region R1, controller 1124 increases the second rotational speed of second motor 1113b, which is the motor closest to second arm 1122 among the plurality of motors 1113, to a rotational speed greater than the first rotational speed of first motor 1113a, which is the motor closest to first arm 1121 among the plurality of motors 1113.

With this, if second arm 1122 is in the closed state and first arm 1121 is in the open state, the weight of first arm 1121 moves the center of gravity to the first arm 1121 side. Therefore, by making the first rotational speed of first motor 1113a on the first arm 1121 side greater than the second rotational speed of second motor 1113b on the second arm 1122 side, an amount of buoyancy equivalent to the weight of the center of gravity displaced to the first arm 1121 side can be imparted to unmanned aerial vehicle 1105.

The same is true when first arm 1121 is in the closed state and second arm 1122 is in the open state; the weight of second arm 1122 shifts the center of gravity to the second arm 1122 side. Therefore, by making the second rotational speed of second motor 1113b on the second arm 1122 side greater than the first rotational speed of first motor 1113a on the first arm 1121 side, an amount of buoyancy equivalent to the weight of the center of gravity displaced to the second arm 1122 side can be imparted to unmanned aerial vehicle 1105.

As a result, unmanned aerial vehicle 1105 can maintain the attitude of main body 1111 of unmanned aerial vehicle 1105 approximately parallel to the horizontal direction, even if the center of gravity is displaced from the center of main body 1111 of unmanned aerial vehicle 1105.

In unmanned aerial vehicle 1105 according to the present variation, connector 1120 further includes third actuator 1122c that changes the angle of fixed portion 1123 relative to main body 1111. Controller 1124 further controls third actuator 1122c. When first arm 1121 is in an open state, second arm 1122 is in a closed state, and second arm 1122 is hanging from a rail passing through second region R2, controller 1124 changes the angle via third actuator 1122c to position second region R2 directly above the center of main body 1111. When second arm 1122 is in an open state, first arm 1121 is in a closed state, and first arm 1121 is hanging from a rail passing through first region R1, controller 1124 changes the angle via third actuator 1122c to position first region R1 directly above the center of main body 1111.

With this, if first arm 1121 is in the open state and second arm 1122 hanging on second rail 402 is in the closed state, first rail 401 present in first region R1 can be let outside of first region R1 by simply changing the attitude (angle) of fixed portion 1123 relative to main body 1111 of unmanned aerial vehicle 1105.

If second arm 1122 is in the open state and first arm 1121 hanging on first rail 401 is in the closed state, second rail 402 present in second region R2 can be let outside second region R2 by simply changing the attitude (angle) of fixed portion 1123 relative to main body 1111 of unmanned aerial vehicle 1105.

Thus, first rail 401 can be easily disconnected from connector 1120 and second rail 402 can be easily disconnected from connector 1120 by simply inclining fixed portion 1123 relative to main body 1111. This also makes it easy to switch connector 1120 connected to first rail 401 to second rail 402 or to switch connector 1120 connected to second rail 402 to first rail 401.

Variation 2 of Embodiment 17

Configuration

Hereinafter, since the basic configurations of unmanned aerial vehicle 1105 and rail 400 included in system 1102 according to the present variation are the same as the basic configurations of the unmanned aerial vehicle and the rail according to Embodiment 17 and the like, repeated description of the basic configurations of unmanned aerial vehicle 1105 and rail 400 in the present variation will be omitted where appropriate. The present variation differs from Embodiment 17 and the like in that information is added to rail 400.

Figure 111:
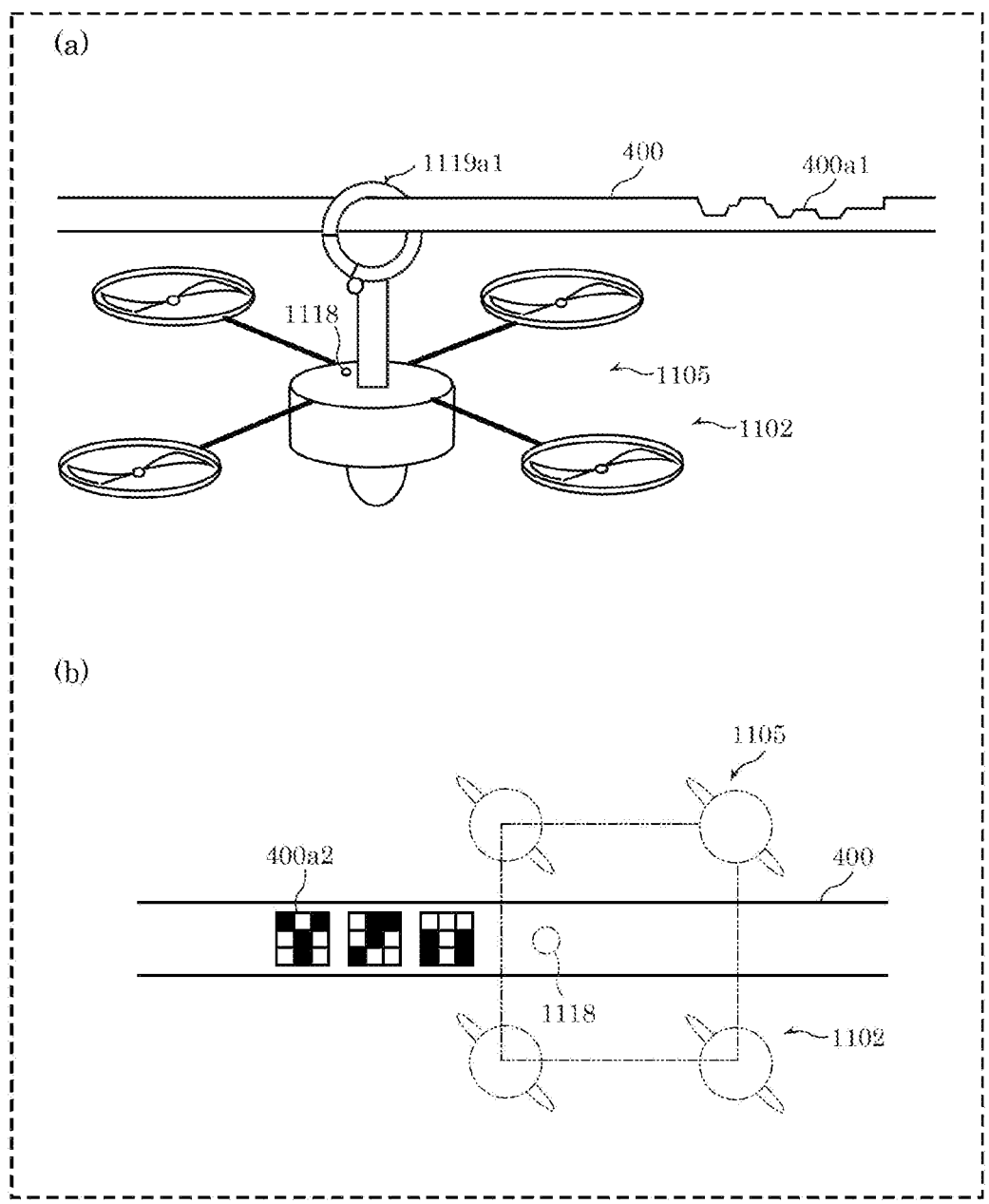
FIG. 111 is a schematic diagram illustrating an example of a system including the unmanned aerial vehicle and a rail according to Variation 2 of Embodiment 17.

FIG. 111 is a schematic diagram illustrating an example of system 1102 including unmanned aerial vehicle 1105 and rail 400 according to Variation 2 of Embodiment 17. In (a) of FIG. 111, uneven portion 400a1 including predetermined information is provided on rail 400, and in (b) of FIG. 111, marker 400a2 including predetermined information is provided on rail 400. In FIG. 111, (b) illustrates an example of a view of the lower surface side of rail 400 from unmanned aerial vehicle 1105 indicated by the double-dotted line.

As illustrated in FIG. 111, system 1102 includes unmanned aerial vehicle 1105 and rail 400.

Rail 400 includes uneven portion 400a1 including predetermined information, as illustrated in (a) in FIG. 111. Rail 400 includes uneven portion 400a1 on the top portion that contacts connector 1119a1 of unmanned aerial vehicle 1105. Since it is only necessary for connector 1119a1 to be able to read the predetermined information indicated by uneven portion 400a1, the location of uneven portion 400a1 is not limited and may be formed on a surface other than the upper surface of rail 400. Since unmanned aerial vehicle 1105 passes through uneven portion 400a1 when moving on rail 400, unmanned aerial vehicle 1105 reads the predetermined information from the shape of uneven portion 400a1. The predetermined information is read by sensor 1118 provided on connector 1119a1 or main body 1111 of unmanned aerial vehicle 1105. For example, the predetermined information is an address or position information. Note that sensor 1118 may be provided on an arm of connector 1119a1.

As illustrated in (b) in FIG. 111, rail 400 may be provided with marker 400a2 including predetermined information. Rail 400 includes marker 400a2 on the bottom portion that contacts connector 1119a1 of unmanned aerial vehicle 1105. Since it is only necessary for connector 1119a1 to be able to read the predetermined information indicated by marker 400a2, the location of marker 400a2 is not limited and may be formed on a surface other than the lower surface of rail 400. Since unmanned aerial vehicle 1105 passes by marker 400a2 when moving on rail 400, unmanned aerial vehicle 1105 reads the predetermined information from the pattern of marker 400a2. The predetermined information is read by sensor 1118 provided on connector 1119a1 or main body 1111 of unmanned aerial vehicle 1105. For example, the predetermined information is an address or position information.

System 1102 according to the present variation includes unmanned aerial vehicle 1105 and rail 400, and rail 400 is provided with marker 400a2 that includes predetermined information.

This allows unmanned aerial vehicle 1105 to read the predetermined information indicated by marker 400a2 added to rail 400. For example, the package can be more accurately delivered to the predetermined position by the predetermined information including an address or position information or the like.

System 1102 according to the present variation includes unmanned aerial vehicle 1105 and rail 400, and rail 400 is provided with uneven portion 400a1 that includes predetermined information.

This allows unmanned aerial vehicle 1105 to obtain predetermined information from uneven portion 400a1 added to rail 400 as it moves along rail 400. For example, the package can be more accurately delivered to the predetermined position by the predetermined information including an address or position information or the like.

Embodiment 18

Configuration

Hereinafter, since the basic configuration of unmanned aerial vehicle 1106 according to the present embodiment is the same as the basic configuration of the unmanned aerial vehicle (drone) according to Embodiment 7 and the like, repeated description of the basic configuration of unmanned aerial vehicle 1106 in the present embodiment will be omitted where appropriate. The present embodiment differs from Embodiment 3 and the like in that main body 1106a of unmanned aerial vehicle 1106 changes its attitude according to the inclination of rail 400.

Figure 112:
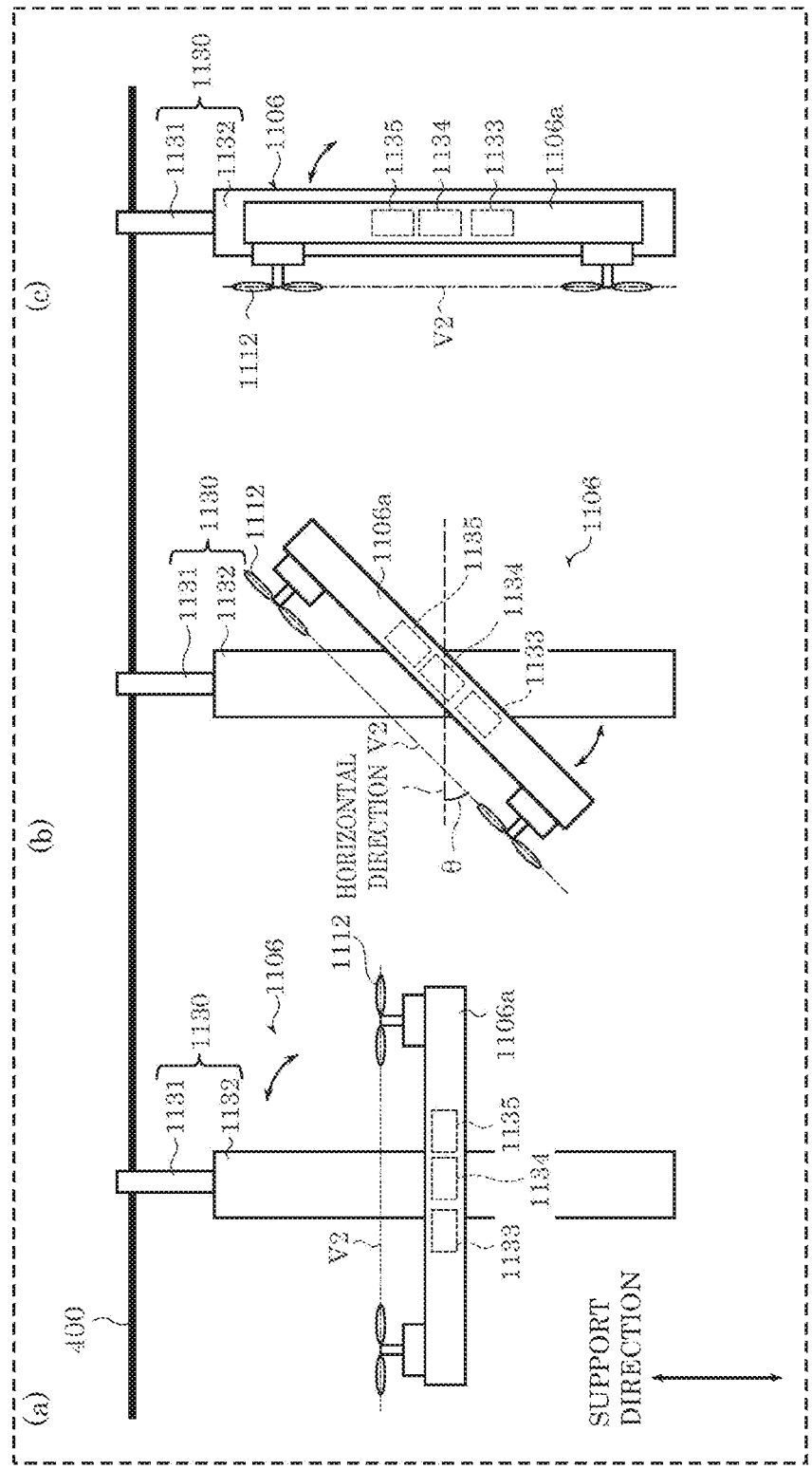
FIG. 112 is a schematic diagram illustrating an example of the unmanned aerial vehicle according to Embodiment 18.

FIG. 112 is a schematic diagram illustrating an example of unmanned aerial vehicle 1106 according to Embodiment 18. In FIG. 112, (a) illustrates an example in which the attitude of main body 1106a of unmanned aerial vehicle 1106 is parallel to the horizontal direction with respect to virtual plane V2, and the angle of the normal direction of virtual plane V2 relative to the support direction is 0°. In FIG. 112, (b) illustrates an example in which the attitude of main body 1106a of unmanned aerial vehicle 1106 is inclined a predetermined angle from the horizontal direction with respect to virtual plane V2, and the angle of the normal direction of virtual plane V2 relative to the support direction is the predetermined angle. In FIG. 112, (c) illustrates an example in which the attitude of main body 1106a of unmanned aerial vehicle 1106 is perpendicular to the horizontal direction with respect to virtual plane V2, and the angle of the normal direction of virtual plane V2 relative to the support direction is 90°.

As illustrated in FIG. 112, unmanned aerial vehicle 1106 includes a plurality of rotary wings 1112, a plurality of motors that respectively rotate the plurality of rotary wings 1112, main body 1106a that supports the plurality of motors, connector 1130, actuator 1133, controller 1134 that controls the plurality of motors and actuator 1133, and sensor 1135.

Connector 1130 connects to rail 400 positioned separated from the ground surface while main body 1106a is hanging. Connector 1130 includes a first end connected to main body 1106a and a second end for slidably connecting to rail 400.

As illustrated in (a) through (c) of FIG. 112, actuator 1133 changes the angle of the normal direction of virtual plane V2 including the plurality of rotary wings 1112 relative to the support direction when connector 1130 is supported on rail 400. The support direction is the direction from the first end to the second end of connector 1130.

Sensor 1135 detects the inclination of rail 400. The inclination of rail 400 is the inclination of rail 400 relative to the horizontal direction, and specifically is the inclination of the upper surface of rail 400 relative to the horizontal direction. Sensor 1135 outputs rail inclination information indicating the detected inclination of rail 400 to controller 1134.

Controller 1134 includes a first mode, a second mode, and a third mode.

As illustrated in (a) in FIG. 112, the first mode aligns the normal direction of virtual plane V2 with the support direction via actuator 1133. As illustrated in (c) in FIG. 112, the second mode makes the normal direction of virtual plane V2 orthogonal to the support direction via actuator 1133. As illustrated in (b) in FIG. 112, the third mode makes angle θ at least 10 degrees and at most 30 degrees via actuator 1133.

Figure 113:
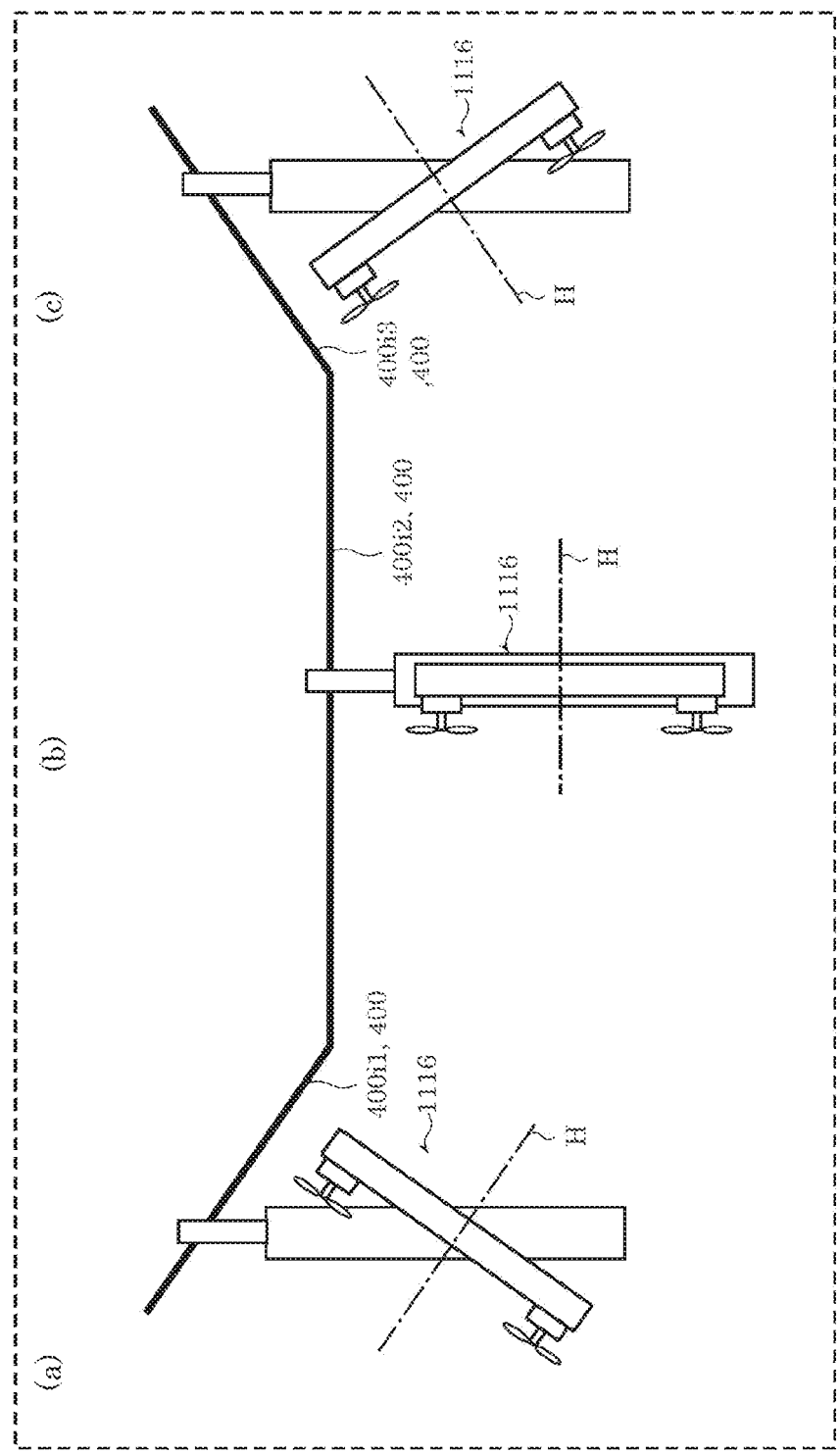
FIG. 113 is a schematic diagram illustrating an example of the unmanned aerial vehicle according to Embodiment 18 moving along a rail.

FIG. 113 is a schematic diagram illustrating an example of unmanned aerial vehicle 1106 according to Embodiment 18 moving along rail 400. In (a) through (c), FIG. 113 illustrates that the inclination of rail 400 relative to the horizontal direction (the lengthwise direction of rail 400) and the normal of virtual plane V2 are parallel. In FIG. 113, (a) illustrates unmanned aerial vehicle 1106 traveling on upwardly inclined rail 400i1, (b) illustrates unmanned aerial vehicle 1106 traveling on rail 400i2 that is parallel to the horizontal direction, and (c) illustrates unmanned aerial vehicle 1106 traveling on downwardly inclined rail 400i3.

As illustrated in FIG. 113, controller 1134 changes the angle in accordance with the inclination of rail 400 indicated by the rail inclination information obtained from sensor 1135. More specifically, controller 1134 aligns the normal direction of virtual plane V2 with the inclination of rail 400 via actuator 1133.

Figure 114:
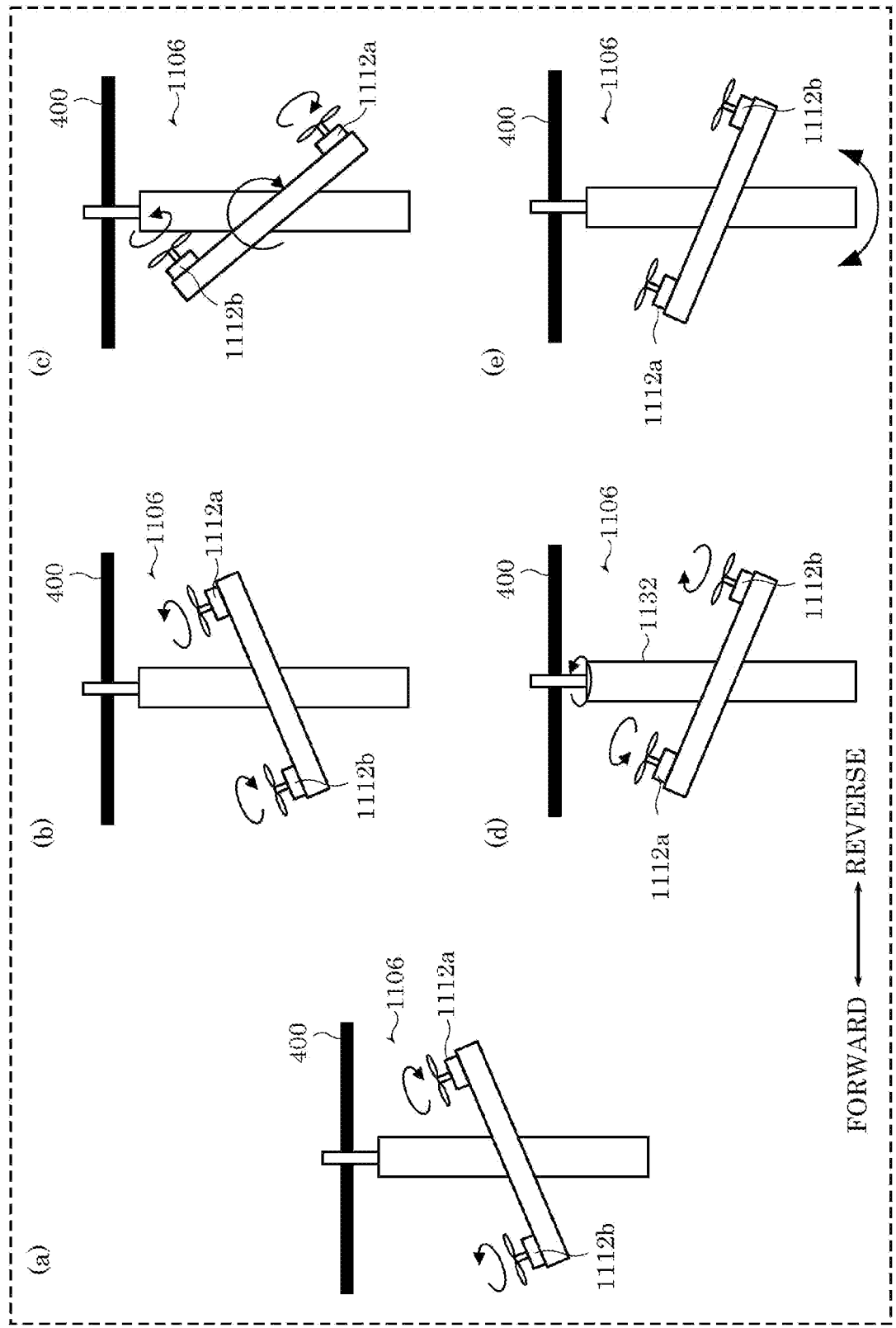
FIG. 114 is a schematic diagram illustrating an example of how the unmanned aerial vehicle according to Embodiment 18 moves forward and in reverse, and how the unmanned aerial vehicle according to Variations 1 and 2 of Embodiment 18 moves in reverse.

FIG. 114 is a schematic diagram illustrating an example of how unmanned aerial vehicle 1106 according to Embodiment 18 moves forward and in reverse, and how unmanned aerial vehicle 1106 according to Variations 1 and 2 moves in reverse. In FIG. 114, (a) illustrates an example in which unmanned aerial vehicle 1106 is moved forward when main body 1106a of unmanned aerial vehicle 1106 is inclined relative to the support direction. In FIG. 114, (b) illustrates an example in which unmanned aerial vehicle 1106 is caused to travel in reverse relative to the state illustrated in (a) in FIG. 114 by reversing the rotations of first motor 1136a and second motor 1136b. In FIG. 114, (c) illustrates an example in which unmanned aerial vehicle 1106 is caused to travel in reverse relative to the state illustrated in (b) in FIG. 114 by reversing the inclination of main body 1106a of unmanned aerial vehicle 1106 relative to the support direction, and further reversing the rotations of first motor 1136a and second motor 1136b (to restore the directions of rotation of first motor 1136a and second motor 1136b).

As illustrated in (a) in FIG. 114, when controller 1134 obtains a first instruction to propel unmanned aerial vehicle 1106 in a first direction along rail 400, controller 1134 inclines the normal direction of virtual plane V2 from the support direction toward the first direction. Here, the first direction is the direction in which unmanned aerial vehicle 1106 travels when moving unmanned aerial vehicle 1106 forward, and the second direction is the opposite of the first direction. When this instruction is obtained, among the plurality of motors, controller 1134 rotates the propeller of first motor 1136a, which is positioned in the first direction from the center of main body 1106a, in the first direction of rotation. Furthermore, when this instruction is obtained, among the plurality of motors, controller 1134 rotates the propeller of second motor 1136b, which is positioned in the second direction from the center of main body 1106a, in the second direction of rotation. Here, the second direction of rotation is the opposite of the first direction of rotation. This causes unmanned aerial vehicle 1106 to move forward.

As illustrated in (b) FIG. 114, when controller 1134 obtains a second instruction to propel unmanned aerial vehicle 1106 in the second direction along rail 400, controller 1134 rotates the propeller of first motor 1136a in the second direction of rotation and rotates the propeller of second motor 1136b in the first direction of rotation. Controller 1134 causes unmanned aerial vehicle 1106 to move in reverse along rail 400 by reversing the directions of rotation of first motor 1136a and second motor 1136b. The first instruction and the second instruction are obtained, for example, by being transmitted from a manager that manages the flying state, or based on sensor 1135 or the like that detects the current position for heading to the destination.

As illustrated in (c) FIG. 114, when controller 1134 obtains the second instruction, controller 1134 further inclines the normal direction of virtual plane V2 from the support direction toward the first direction via actuator 1133. Controller 1134 inclines the attitude of main body 1106a of unmanned aerial vehicle 1106, whose normal direction of virtual plane V2 has been inclined toward the second direction relative to the support direction, to the opposite side, i.e., such that the normal direction of virtual plane V2 is inclined toward the first direction relative to the support direction. Controller 1134 further reverses the rotation of first motor 1136a and second motor 1136b, such that first motor 1136a rotates in the first direction of rotation and second motor 1136b rotates in the first direction of rotation. This causes unmanned aerial vehicle 1106 to move in reverse.

Variation 1

In FIG. 114, (d) illustrates an example of unmanned aerial vehicle 1106 moving in reverse relative to the state illustrated in (a) FIG. 114, by rotating fixed portion 1132 along a direction of rotation about an axis extending in the support direction. In FIG. 114, (d) is a variation of (a) through (c) according to the present embodiment.

Connector 1130 includes fixed portion 1132 connected to main body 1106a, arm 1131 connected to rail 400, and second actuator 1133. Connector 1130 may further include the configurations of the respective embodiments described above.

Second actuator 1133 is disposed between fixed portion 1132 and arm 1131, and is rotatable about an axis of rotation that is parallel to the support direction.

As illustrated in (d) in FIG. 114, when controller 1134 obtains the second instruction to propel unmanned aerial vehicle 1106 in the second direction along rail 400, controller 1134 reverses the orientation of main body 1106a by rotating main body 1106a via second actuator 1133 about an axis of rotation that is parallel to the support direction.

In such an unmanned aerial vehicle 1106 according the present variation, the inclination of main body 1106a of unmanned aerial vehicle 1106 can be inverted symmetrically with respect to the support direction by fixed portion 1132 rotating relative to arm 1131 about an axis of rotation that is parallel to the support direction. This allows unmanned aerial vehicle 1106 to move in reverse. In this case as well, after the package is delivered, unmanned aerial vehicle 1106 can return along the same rail 400 along which it arrived.

Variation 2

In FIG. 114, (e) illustrates an example in which unmanned aerial vehicle 1106 is caused to travel in reverse relative to the state illustrated in (a) in FIG. 114, by disconnecting connector 1130 from rail 400 and causing unmanned aerial vehicle 1106 to determine a horizontal attitude. In FIG. 114, (e) is a variation of (a) through (d) according to the present embodiment.

In the present variation, connector 1130 includes arm 1131 that is connected to rail 400 and can be opened and closed, and third actuator 1133 that opens and closes arm 1131. Connector 1130 may further include the configurations of the respective embodiments described above.

As illustrated in (e) in FIG. 114, when controller 1134 obtains the second instruction to propel unmanned aerial vehicle 1106 in the second direction along rail 400, controller 1134 reverses the orientation of main body 1106a by changing arm 1131 from a closed state to an open state via third actuator 1133. Controller 1134 further controls the plurality of motors to reverse the orientation of main body 1106a about the support direction. Controller 1134 further causes arm 1131 to change from the open state to the closed state via third actuator 1133.

With such an unmanned aerial vehicle 1106 according to the present variation, unmanned aerial vehicle 1106 is temporarily disconnected from rail 400, the direction of unmanned aerial vehicle 1106 is reversed, and then connector 1130 of unmanned aerial vehicle 1106 is reconnected to rail 400. This allows unmanned aerial vehicle 1106 to move in reverse. In this case as well, after the package is delivered, unmanned aerial vehicle 1106 can return along the same rail 400 along which it arrived.

Advantageous Effects

Next, advantageous effects achieved by unmanned aerial vehicle 1106 according to the present embodiment will be described.

As described above, unmanned aerial vehicle 1106 according to the present embodiment includes: a plurality of rotary wings 1112; a plurality of motors that respectively rotate the plurality of rotary wings 1112; main body 1106a that supports the plurality of motors; connector 1130 for connecting to rail 400 positioned separated from the ground surface while main body 1106a is hanging; actuator 1133 that changes the angle of the normal direction of virtual plane V2 including the plurality of rotary wings 1112 relative to a support direction in which connector 1130 is supported by rail 400; and controller 1134 that controls the plurality of motors and actuator 1133. Connector 1130 includes a first end connected to main body 1106a and a second end for slidably connecting to rail 400. The support direction is a direction from the first end of connector 1130 toward the second end of connector 1130. In a first mode, controller 1134 aligns the normal direction of virtual plane V2 with the support direction via actuator 1133, and in a second mode, controller 1134 makes the normal direction of virtual plane V2 orthogonal to the support direction via actuator 1133.

With this, controller 1134 can change the attitude of main body 1106a of unmanned aerial vehicle 1106 relative to the support direction when traveling on rail 400. For example, when unmanned aerial vehicle 1106 is to travel on rail 400, the second mode can be implemented, and when unmanned aerial vehicle 1106 is to leave rail 400, the first mode can be implemented. Accordingly, unmanned aerial vehicle 1106 can change its flight mode as appropriate depending on the situation.

In a third mode, controller 1134 makes the angle at least 10 degrees and at most 30 degrees via actuator 1133.

This allows unmanned aerial vehicle 1106 to move along rail 400 without contact between rail 400 and the support member.

Unmanned aerial vehicle 1106 further includes sensor 1135 that detects the inclination of rail 400. Controller 1134 changes the angle according to the inclination of rail 400.

With this, even when rail 400 is inclined relative to the horizontal direction, unmanned aerial vehicle 1106 can move along the inclined rail 400.

Controller 1134 aligns the normal direction of virtual plane V2 with the inclination of rail 400 via actuator 1133.

This allows connector 1130 to move along rail 400, thereby inhibiting rail 400 from coming into contact with the support member.

When controller 1134 receives a first instruction to propel unmanned aerial vehicle 1106 in a first direction along rail 400, controller 1134 inclines the normal direction of virtual plane V2 from the support direction toward a second direction, rotates rotary wings 1112 of first motor 1136a among the plurality of motors that is positioned in the first direction from the center of main body 1106a in a first direction of rotation, and rotates rotary wings 1112 of second motor 1136b among the plurality of motors that is positioned in the second direction from the center of main body 1106a in a second direction of rotation. The second direction is the opposite of the first direction, and the second direction of rotation is the opposite of the first direction of rotation.

This allows unmanned aerial vehicle 1106 to move forward while maintaining the attitude of unmanned aerial vehicle 1106 with respect to main body 1106a relative to the support direction in a desired state.

When controller 1134 obtains a second instruction to propel unmanned aerial vehicle 1106 in the second direction along rail 400, controller 1134 rotates rotary wings 1112 of first motor 1136a in the second direction of rotation and rotates rotary wings 1112 of second motor 1136b in the first direction of rotation.

With this, by reversing the directions of rotation of first motor 1136a and second motor 1136b, unmanned aerial vehicle 1106 can move in reverse. For example, after the package is delivered, unmanned aerial vehicle 1106 can return along the same rail 400 along which it arrived.

When controller 1134 obtains the second instruction, controller 1134 further inclines the normal direction of virtual plane V2 from the support direction toward the first direction via actuator 1133, rotates rotary wings 1112 of first motor 1136a in the first direction of rotation, and rotates rotary wings 1112 of second motor 1136b in the second direction of rotation.

This allows unmanned aerial vehicle 1106 to reverse the inclination of main body 1106a of unmanned aerial vehicle 1106 relative to the support direction. The inclination of the normal direction of virtual plane V2 changes from inclining toward the second direction to inclining toward the first direction relative to the support direction. This causes unmanned aerial vehicle 1106 to move in reverse. For example, in this case as well, after the package is delivered, unmanned aerial vehicle 1106 can return along the same rail 400 along which it arrived.

Connector 1130 includes fixed portion 1132 connected to main body 1106a, arm 1131 connected to rail 400, and second actuator 1133 that is disposed between fixed portion 1132 and arm 1131 and is rotatable about an axis of rotation parallel to the support direction. When controller 1134 receives a second instruction to propel unmanned aerial vehicle 1106 in the second direction along rail 400, controller 1134 reverses the orientation of main body 1106a by rotating main body 1106a via second actuator 1133 about the axis of rotation that is parallel to the support direction.

This makes it possible to invert the inclination of main body 1106a of unmanned aerial vehicle 1106 symmetrically with respect to the support direction by fixed portion 1132 rotating relative to arm 1131 about the axis of rotation that is parallel to the support direction. This allows unmanned aerial vehicle 1106 to move in reverse. For example, in this case as well, after the package is delivered, unmanned aerial vehicle 1106 can return along the same rail 400 along which it arrived.

Connector 1130 includes arm 1131 that is connected to rail 400 and can be opened and closed, and third actuator 1133 that opens and closes arm 1131. When controller 1134 receives the second instruction to propel unmanned aerial vehicle 1106 in the second direction along rail 400, controller 1134 changes arm 1131 from a closed state to an open state via third actuator 1133, controls the plurality of motors to reverse the orientation of main body 1106a about the support direction, and changes arm 1131 from the open state to the closed state via third actuator 1133.

With this, unmanned aerial vehicle 1106 is temporarily disconnected from rail 400, the orientation of unmanned aerial vehicle 1106 is reversed, and then connector 1130 of unmanned aerial vehicle 1106 is reconnected to rail 400. For example, in this case as well, after the package is delivered, unmanned aerial vehicle 1106 can return along the same rail 400 along which it arrived.

Variation 1 of Embodiment 18

Hereinafter, since the basic configuration of unmanned aerial vehicle 1106 according to the present variation is the same as the basic configuration of the unmanned aerial vehicle according to Embodiment 18 and the like, and the basic configuration of connector 1150 according to the present variation is the same as the basic configuration of the connector according to Variation 1 of Embodiment 4 and the like, repeated description of the basic configurations of unmanned aerial vehicle 1106 and connector 1150 in the present variation will be omitted where appropriate. The present variation differs from Embodiment 18 and the like in that roller 1154 is provided in connector 1150, and differs from Variation 1 of Embodiment 4 and the like in that recess 1154a is formed in roller 1154.

Figure 115:
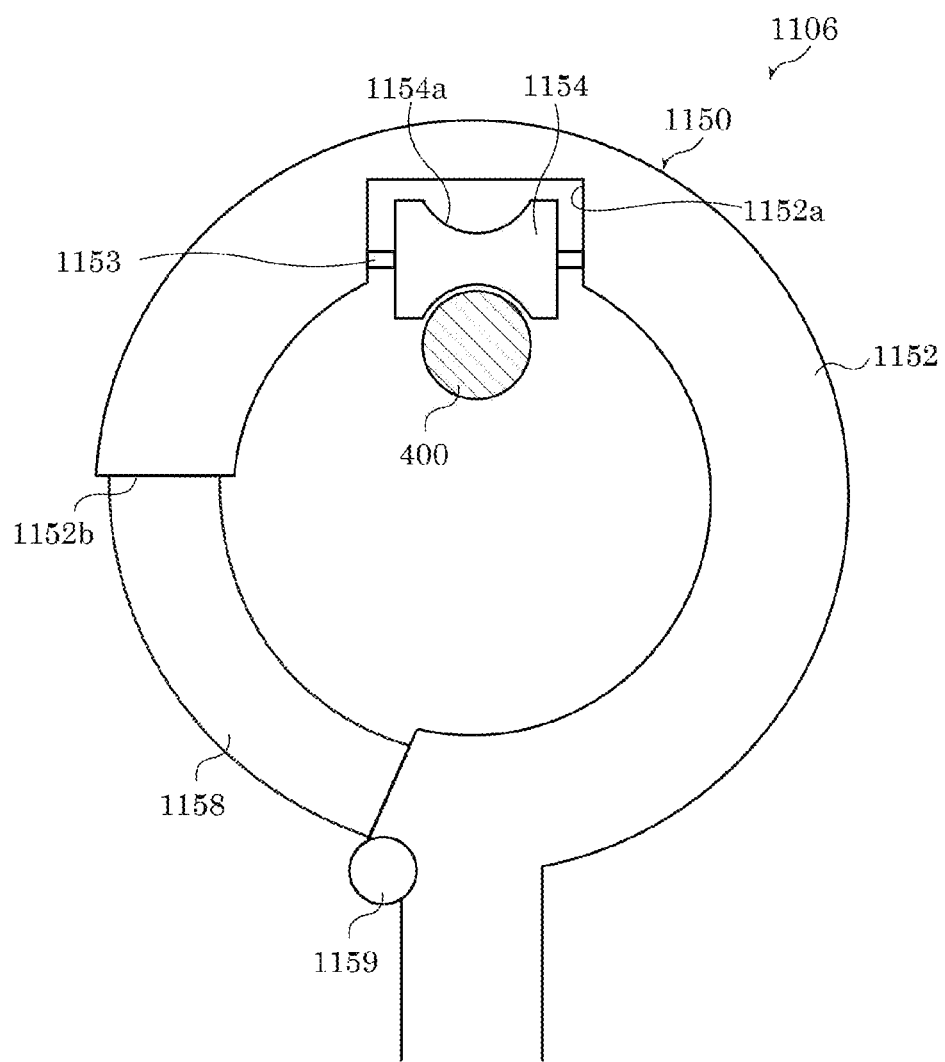

FIG. 115 is a schematic diagram illustrating an example of connector 1150 of unmanned aerial vehicle 1106 according to Variation 1 of Embodiment 18.

Connector 1150 according to the present variation includes arm 1131 connected to rail 400, roller 1154 that is provided on an inner peripheral surface of arm 1131 and rotatably contacts rail 400, and motor 1159. Note that connector 1150 need not include motor 1159; motor 1159 is not an essential component of connector 1150.

Arm 1131 includes first arm 1152 connected to rail 400 and second arm 1158 that opens or closes opening 1152b of first arm 1152. Second arm 1158 is moved so as to slide by motor 1159.

Roller 1154 is a wheel for rotatably contacting rail 400 and is rotatably provided on first arm 1152. More specifically, roller 1154 is axially supported by rotary shaft 1153 provided in notch 1152a in the inner circumference of first arm 1152, and rotates about rotary shaft 1153. Both ends of rotary shaft 1153 are fixed to first arm 1152.

Roller 1154 includes recess 1154a that is recessed along the direction of rotation (circumferential direction) of rotary shaft 1153 so as to guide rail 400. Recess 1154a is formed to correspond to the shape of rail 400. For example, if the cross section of rail 400 is circular when rail 400 is cut in a plane orthogonal to the lengthwise direction of rail 400, roller 1154 is formed in a semicircular shape in plan view, and if the cross section is square, roller 1154 is formed in a square shape in plan view.

The actuation of motor 1159 is controlled by controller 1134. Motor 1159 slides second arm 1158 to store it inside first arm 1152.

In this way, in unmanned aerial vehicle 1106 according to the present variation, connector 1150 includes arm 1131 connected to rail 400, and roller 1154 that is provided on an inner peripheral surface of arm 1131 and rotatably contacts rail 400.

Accordingly, when connector 1150 of unmanned aerial vehicle 1106 is connected to rail 400, roller 1154 contacts rail 400, allowing unmanned aerial vehicle 1106 to move along rail 400. Unmanned aerial vehicle 1106 is able to move along rail 400 using only its own propulsion in the traveling direction. Since unmanned aerial vehicle 1106 does not have to expend energy on lift force to lift itself, unmanned aerial vehicle 1106 can save energy.

Variation 2 of Embodiment 18

Configuration

Hereinafter, since the basic configuration of unmanned aerial vehicle 1106 according to the present variation is the same as the basic configuration of the unmanned aerial vehicle according to Embodiment 18 and the like, and the basic configuration of connector 1160 according to the present variation is the same as the basic configuration of the connector according to Variation 1 of Embodiment 18 and the like, repeated description of the basic configurations of unmanned aerial vehicle 1106 and connector 1160 in the present variation will be omitted where appropriate. The present variation differs from Variation 1 of Embodiment 18 and the like in that connector 1160 is provided with a pair of brake pads 1166.

Figure 116:
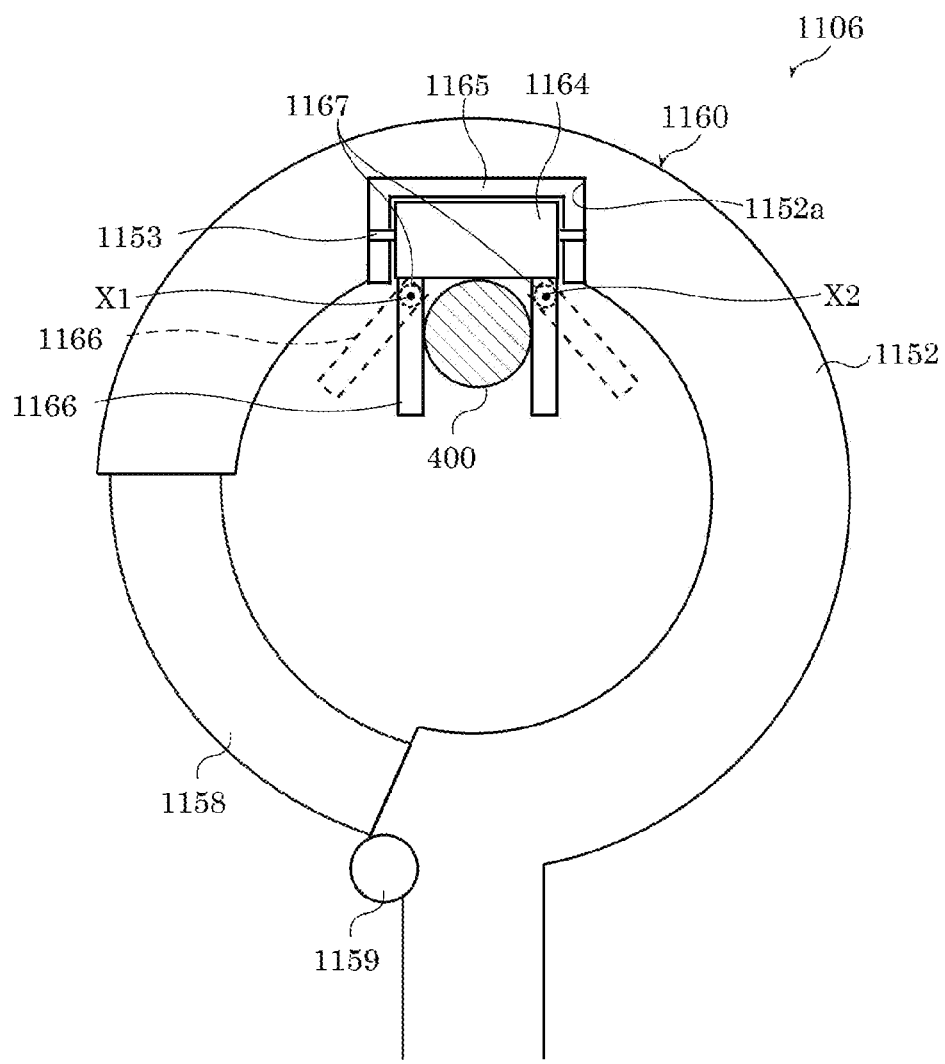

FIG. 116 is a schematic diagram illustrating an example of connector 1160 of unmanned aerial vehicle 1106 according to Variation 2 of Embodiment 18.

In addition to first arm 1152, second arm 1158, roller 1164, motor 1159, and controller 1134, connector 1160 of the present variation includes enclosure 1165, a pair of brake pads 1166, and braking mechanism 1167. Connector 1160 need not include first arm 1152, second arm 1158, roller 1164, motor 1159, controller 1134, and enclosure 1165; and first arm 1152, second arm 1158, roller 1164, motor 1159, controller 1134, and enclosure 1165 are not essential components of connector 1160.

Enclosure 1165 is provided in notch 1152*a* in the inner circumference of first arm 1152. Enclosure 1165 houses rotary shaft 1153 and roller 1164. Enclosure 1165 fixes both ends of rotary shaft 1153.

The pair of brake pads 1166 are coupled to enclosure 1165 or first arm 1152 so as to be pivotable around axes X1 and X2. The actuation of brake pads 1166 is controlled by braking mechanism 1167 to pivot the pair of brake pads 1166 around axes X1 and X2 so as to sandwich rail 400 or move away from rail 400. The pair of brake pads 1166 operate in conjunction with each other.

Braking mechanism 1167 changes the distance between the pair of brake pads 1166 to sandwich rail 400 between the pair of brake pads 1166. Braking mechanism 1167 includes an actuation unit such as actuator 1133 that controls the pivoting of the pair of brake pads 1166. Braking mechanism 1167 controls the pivoting of the pair of brake pads 1166 by being controlled by controller 1134, for example.

Figure 117:
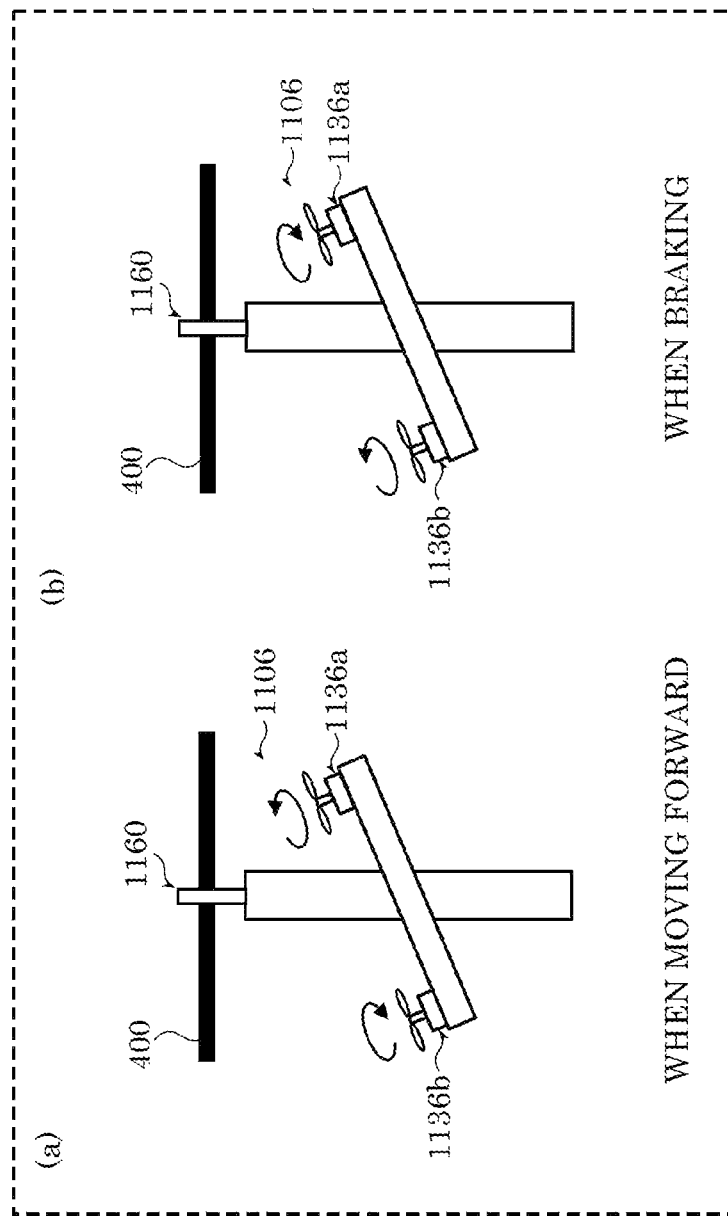

FIG. 117 is a schematic diagram illustrating an example of the directions of rotation of the propellers when unmanned aerial vehicle 1106 according to Variation 2 of Embodiment 18 is moving forward and braking. In FIG. 117, (a) illustrates an example in which first motor 1136*a* rotates the propeller in the first direction of rotation and second motor 1136*b* rotates the propeller in the second direction of rotation when unmanned aerial vehicle 1106 is moving forward. In FIG. 117, (b) illustrates an example in which first motor 1136*a* rotates the propeller in the second direction of rotation and second motor 1136*b* rotates the propeller in the first direction of rotation when unmanned aerial vehicle 1106 is braking.

When controller 1134 transitions unmanned aerial vehicle 1106 from a state of forward travel as illustrated in (a) in FIG. 117 to a stopped state as illustrated in (b) in FIG. 117, controller 1134 reverses the directions of rotation of the propeller of first motor 1136*a* and the propeller of second motor 1136*b*. When controller 1134 obtains a stop instruction to stop unmanned aerial vehicle 1106, controller 1134 rotates the propeller of first motor 1136*a* in the second direction of rotation and rotates the propeller of second motor 1136*b* in the first direction of rotation. The stop instruction is obtained, for example, by being transmitted from the manager that manages the flying state when approaching the destination (receiver), or based on a sensor or the like that detects proximity to the destination (receiver).

When controller 1134 obtains such a stop instruction, controller 1134 pivots the pair of brake pads 1166 by controlling braking mechanism 1167 to cause the pair of brake pads 1166 to sandwich rail 400.

In such an unmanned aerial vehicle 1106 according the present variation, connector 1160 includes a pair of brake pads 1166 and braking mechanism 1167 that changes the distance between the pair of brake pads 1166 so as to sandwich rail 400 between the pair of brake pads 1166.

Accordingly, when connector 1160 of unmanned aerial vehicle 1106 is connected to rail 400, rail 400 can be sandwiched between the pair of brake pads 1166. This makes it easy to decelerate or stop unmanned aerial vehicle 1106 that is moving.

In unmanned aerial vehicle 1106 according to the present variation, when controller 1134 obtains a stop instruction to stop unmanned aerial vehicle 1106, controller 1134 rotates rotary wings 1112 of first motor 1136*a* in the second direction of rotation and rotates rotary wings 1112 of second motor 1136*b* in the first direction of rotation.

This makes it possible to reverse the directions of rotation of rotary wings 1112 of first motor 1136*a* and rotary wings 1112 of second motor 1136*b*, in accordance with the stop instruction, relative to the directions of rotation of rotary wings 1112 of first motor 1136*a* and rotary wings 1112 of second motor 1136*b* when traveling forward. This makes it possible to stop movement of unmanned aerial vehicle 1106.

Embodiment 19

Configuration

Hereinafter, since the basic configuration of delivery box 1004*h* according to the present embodiment is the same as the basic configuration of the delivery box according to Embodiment 15 and the like, and the basic configuration of unmanned aerial vehicle 1170 according to the present embodiment is the same as the basic configuration of the unmanned aerial vehicle according to Embodiment 1 and the like, repeated description of the basic configurations of delivery box 1004*h* and unmanned aerial vehicle 1170 in the present embodiment will be omitted where appropriate. The present embodiment differs from Embodiment 15 and the like in that delivery box 1004*h* includes load support member 1006*h* and unmanned aerial vehicle 1170 includes a plurality of legs 1170*a* that connect to load support member 1006*h*.

Figure 118:
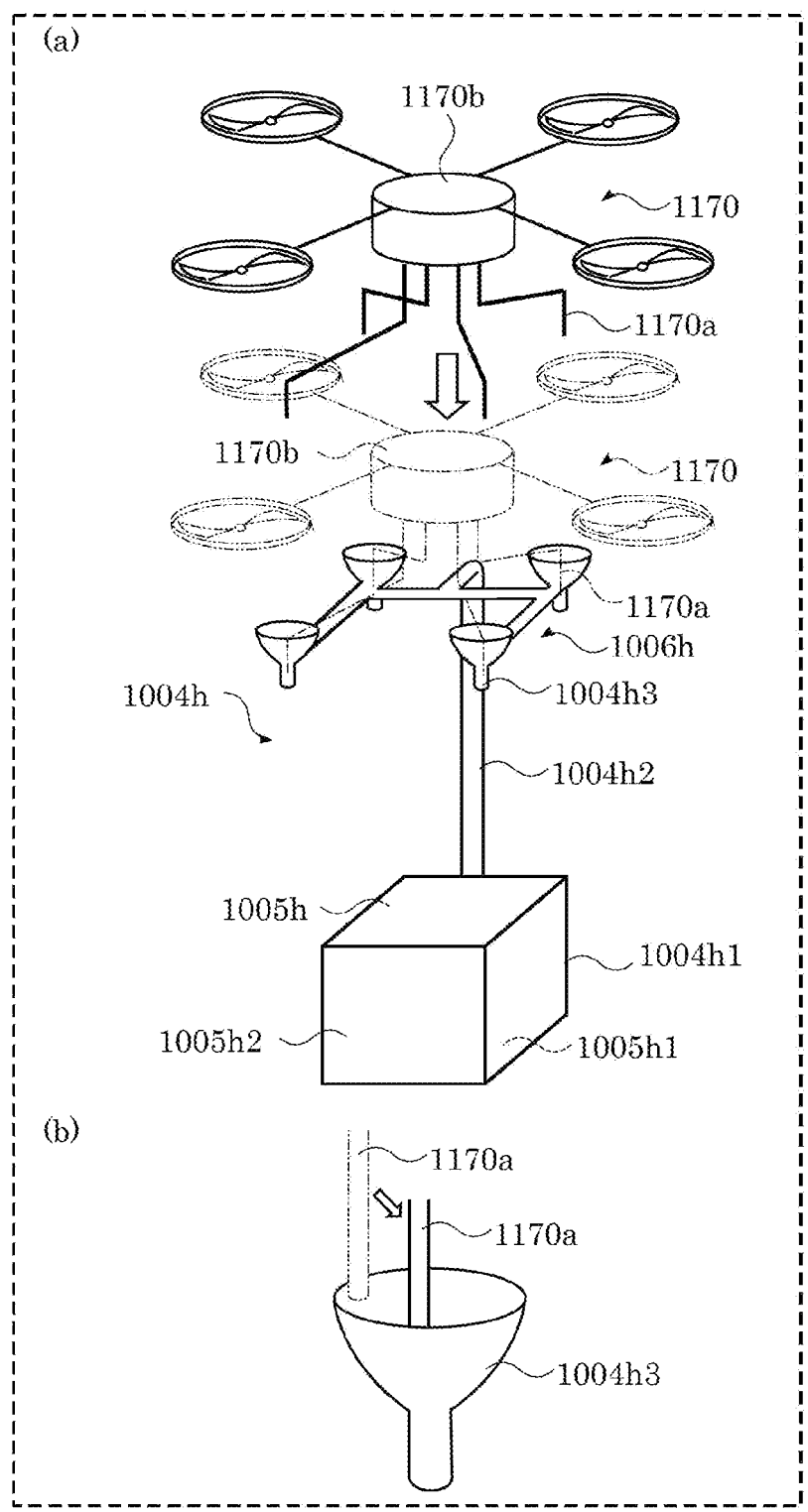

FIG. 118 is a schematic diagram illustrating an example of unmanned aerial vehicle 1170 and delivery box 1004*h* according to Embodiment 19. In FIG. 118, (a) illustrates an example in which unmanned aerial vehicle 1170 is landing on load support member 1006*h* of delivery box 1004*h*. In (a) in FIG. 118, unmanned aerial vehicle 1170 before landing on load support member 1006*h* is illustrated in solid lines and unmanned aerial vehicle 1170 after landing on load support member 1006*h* in double-dotted lines. In FIG. 118, (b) illustrates an example of how legs 1170*a* of unmanned aerial vehicle 1170 are guided into recess 1004*h*3 as unmanned aerial vehicle 1170 lands on load support member 1006*h* of delivery box 1004*h*. In (b) in FIG. 118, the engagement of leg 1170*a* with recess 1004*h*3 is illustrated in double-dotted lines, and the movement of leg 1170*a* guided by recess 1004*h*3 is illustrated in solid lines.

Delivery box 1004*h* is capable of storing a package delivered by unmanned aerial vehicle 1170. Delivery box 1004*h* includes container 1004*h*1, top lid 1005*h*, and load support member 1006*h*.

Container 1004*h*1 includes bottom portion 1005*h*1 and a plurality of side portions 1005*h*2 rising from bottom portion 1005*h*1. Container 1004*h*1 defines a space for storing a package. Container 1004*h*1 is an enclosure for storing a package. A top opening coverable by the closing of top lid 1005*h* is formed in the top portion of container 1004*h*1, which is located in the vertically upward part of container 1004*h*1.

Top lid 1005*h* is provided on the top portion of container 1004*h*1, which is the upper portion of container 1004*h*1, and can open and close the top opening for inserting a package in the space. Top lid 1005*h* covers the top opening when closed and opens the top opening when opened.

Load support member 1006*h* is arranged horizontally or along a ground surface and is capable of supporting unmanned aerial vehicle 1170 carrying a package. Load support member 1006*h* provided on container 1004*h*1 of delivery box 1004*h* includes support portion 1004*h*2 and a plurality of recesses 1004*h*3.

Support portion 1004*h*2 is secured to at least one of a plurality of side portions 1005*h*2 of container 1004*h*1. Support portion 1004*h*2 is elongated in the vertical direction and rises from the top portion of container 1004*h*1. The lower end of support portion 1004*h*2 is connected to the top portion of container 1004*h*1 and the upper end of support portion 1004*h*2 is connected to the plurality of recesses 1004*h*3. In the present embodiment, support portion 1004*h*2 supports four recesses 1004*h*3.

The plurality of recesses 1004*h*3 correspond one-to-one with the plurality of legs 1170*a* of unmanned aerial vehicle 1170 and are capable of supporting the plurality of legs 1170*a* of unmanned aerial vehicle 1170. Each of the plurality of recesses 1004*h*3 is a bowl-shaped or cone-shaped recess that opens upwardly. The plurality of recesses 1004*h*3 are arranged vertically above container 1004*h*1, that is, vertically above the top opening of container 1004*h*1. The plurality of recesses 1004*h*3 are arranged at positions where they do not contact top lid 1005*h* when top lid 1005*h* is opened from the top portion of container 1004*h*1.

In the present embodiment, four recesses 1004*h*3 are supported by support portion 1004*h*2. The four recesses 1004*h*3 are distributed so that each corresponds to a corner of the top portion of container 1004*h*1. The four recesses 1004*h*3 are positioned apart so as not to interfere with the package carried by unmanned aerial vehicle 1170. For this reason, it is preferable that recesses 1004*h*3 and support portion 1004*h*2 are not located vertically above the top opening of container 1004*h*1. Although load support member 1006*h* is exemplified as including four recesses 1004*h*3 in the present embodiment, the number of recesses 1004*h*3 is not limited.

Unmanned aerial vehicle 1170 includes a plurality of legs 1170*a* that can land on load support member 1006*h* of delivery box 1004*h*. The plurality of legs 1170*a* are provided on main body 1170*b* of unmanned aerial vehicle 1170 and are located on the vertical underside of aerial vehicle 1170 when unmanned aerial vehicle 1170 is flying. When unmanned aerial vehicle 1170 flies vertically above the plurality of recesses 1004*h*3, it begins to descend and aligns the plurality of legs 1170*a* with the plurality of recesses 1004*h*3 one-to-one. With this, the plurality of legs 1170*a* engage the plurality of recesses 1004*h*3 and are guided by the plurality of recesses 1004*h*3 one-to-one. This results in unmanned aerial vehicle 1170 being held in a predetermined position by load support member 1006*h*. Although unmanned aerial vehicle 1170 is exemplified as including four legs 1170*a* in the present embodiment, the number of legs 1170*a* is not limited.

Advantageous Effects

Next, the advantageous effects achieved by delivery box 1004*h* according to the present embodiment will be described.

As described above, delivery box 1004*h* according to the present embodiment is capable of storing a package delivered by unmanned aerial vehicle 1170, and includes: container 1004*h*1 including bottom portion 1005*h*1 and side portion 1005*h*2; top lid 1005*h* provided above container 1004*h*1; and load support member 1006*h* capable of supporting the load of unmanned aerial vehicle 1170 carrying a package. Unmanned aerial vehicle 1170 includes a plurality of legs 1170*a* that can land on load support member 1006*h*. Load support member 1006*h* includes a plurality of recesses 1004*h*3 that can support the plurality of legs 1170*a*. Each of the plurality of recesses 1004*h*3 is a bowl-shaped or cone-shaped recess that opens upwardly.

With this, the plurality of recesses 1004*h*3 can engage with the plurality of legs 1170*a* to guide the plurality of legs 1170*a* when unmanned aerial vehicle 1170 descends. As a result, load support member 1006*h* can hold unmanned aerial vehicle 1170 at a predetermined attitude. When unmanned aerial vehicle 1170 delivers a package, unmanned aerial vehicle 1170 can thus position itself vertically above container 1004*h*1. As a result, a package can be stored with certainty in delivery box 1004*h*.

Embodiment 20

Configuration

Hereinafter, since the basic configurations of delivery box 1140, system 1107, and the method according to the present embodiment are the same as the basic configurations of the delivery system according to Embodiment 7 and the like, and the basic configuration of delivery box 1140 is the same as the basic configuration of the delivery box according to Embodiment 15 and the like, repeated description of the basic configurations of system 1107 and delivery box 1140 in the present embodiment will be omitted where appropriate. The present embodiment differs from Embodiment 7 and the like in that system 1107 includes delivery box 1140 and the like.

Figure 120:
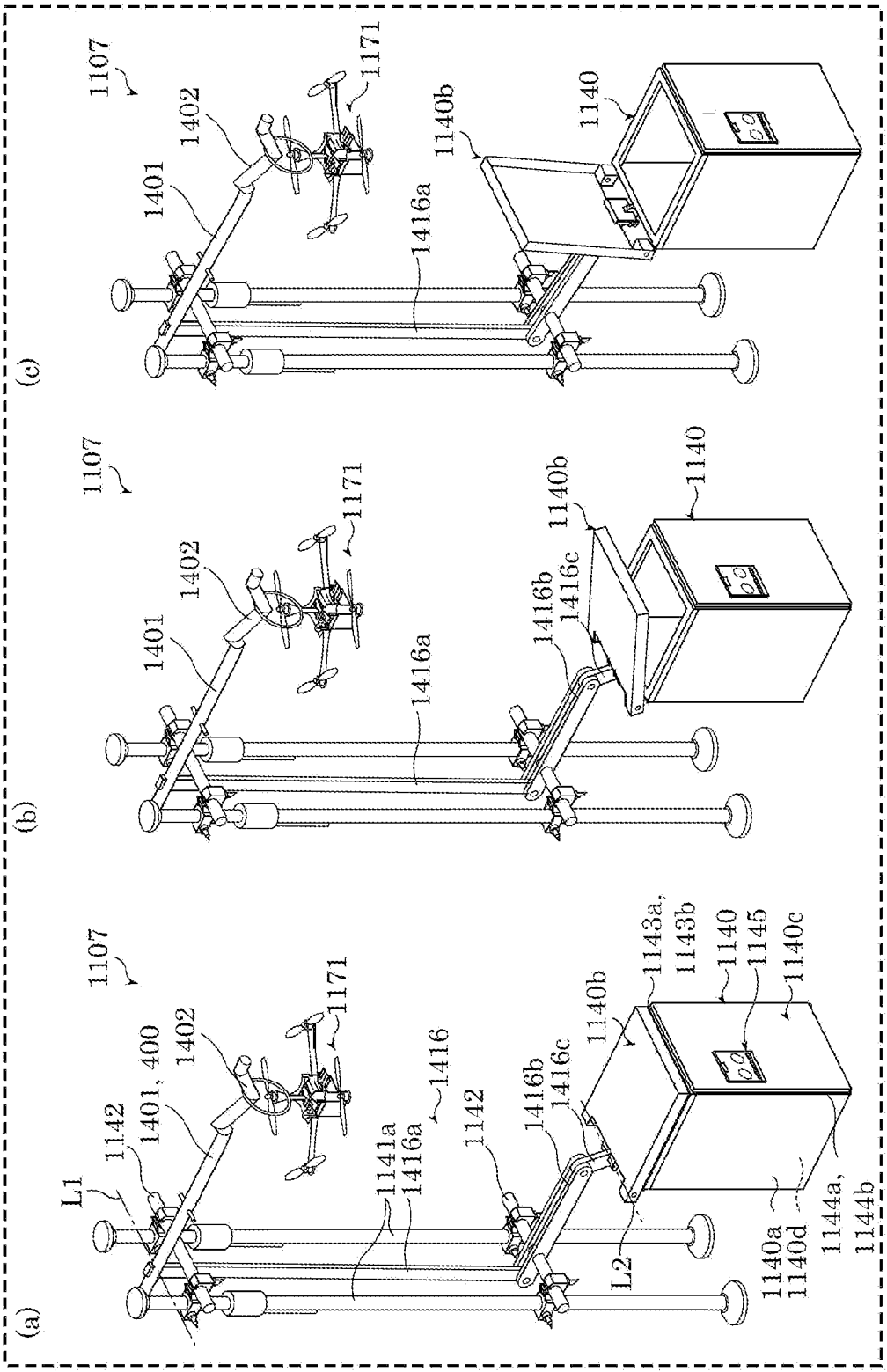

FIG. 119 is a schematic diagram illustrating an example of unmanned aerial vehicle 1171 and delivery box 1140 according to Embodiment 20. FIG. 120 is a perspective view of an example of unmanned aerial vehicle 1171 and delivery box 1140 according to Embodiment 20.

As illustrated in FIG. 119 and (a) in FIG. 120, system 1107 includes delivery box 1140 and unmanned aerial vehicle 1171.

Delivery box 1140 is capable of storing an article delivered by unmanned aerial vehicle 1171. Delivery box 1140 includes container 1140*a*, lid 1140*b*, door 1140*c*, load support member 1401, one or more link rods 1416, a pair of rod support members 1141*a*, first axle L1, second axle L2, first interlocking portion 1161, second interlocking portion 1162, and operational display 1145.

Container 1140*a* includes bottom portion 1140*d* and a plurality of side portions 1144*a* that rise from bottom portion 1140*d*. Container 1140*a* is an enclosure that defines a space for storing a package.

Lid 1140*b* is a top lid provided on top portion 1143*a* of container 1140*a*, and is rotatably coupled to container 1140*a*. Lid 1140*b* is capable of opening and closing top opening 1143*b* of container 1140*a* for inserting a package into the space through top opening 1143*b*. Lid 1140*b* opens in order to open top portion 1143*a* of container 1140*a* when the load of unmanned aerial vehicle 1171 is applied to load support member 1401. Lid 1140*b* closes in order to cover top opening 1143*b* of container 1140*a* when the load of unmanned aerial vehicle 1171 applied to load support member 1401 is removed.

Door 1140*c* is a side lid provided on side opening 1144*b* of container 1140*a*, and is rotatably coupled to container 1140*a*. Door 1140*c* is capable of opening and closing side opening 1144*b* of container 1140*a* in order to remove a package in the space from side opening 1144*b*.

Load support member 1401 is arranged horizontally or along a ground surface and is capable of supporting the load of unmanned aerial vehicle 1171 carrying an article. Load support member 1401 is disposed vertically above container 1140*a*. Load support member 1401 is part of rail 400 described above and is a suspension rod capable of hanging unmanned aerial vehicle 1171. Load support member 1401 includes a V-shaped or U-shaped bend 1402 that bends in a vertical direction. Bend 1402 is located directly above container 1140*a* and bends in a vertical direction. Bend 1402 is connected to first arm 1172 of unmanned aerial vehicle 1171 and is capable of holding first arm 1172.

One or more link rods 1416 are coupled between load support member 1401 and lid 1140*b* of delivery box 1140, and connect load support member 1401 and lid 1140*b* of delivery box 1140. More specifically, one or more link rods 1416 are connected at one end to load support member 1401 and at the other end to lid 1140*b* of delivery box 1140. The one or more link rods 1416 transfer the load to lid 1140*b* of delivery box 1140 when unmanned aerial vehicle 1171 applies a load to load support member 1401, causing lid 1140*b* to open.

More specifically, the one or more link rods 1416 include first link rod 1416*a*, second link rod 1416*b*, and third link rod 1416*c*.

First link rod 1416*a* connects load support member 1401 and second link rod 1416*b*, and transfers the load of unmanned aerial vehicle 1171 applied to load support member 1401 to second link rod 1416*b*. A first end of first link rod 1416*a* is rotatably coupled to load support member 1401. A second end of first link rod 1416*a* is rotatably coupled to a third end of second link rod 1416*b*. In the present embodiment, first link rod 1416*a* is upright, i.e., extends vertically.

Second link rod 1416*b* connects second link rod 1416*b* and third link rod 1416*c*, and transfers the load of unmanned aerial vehicle 1171 transferred from first link rod 1416*a* to third link rod 1416*c*. A fourth end of second link rod 1416*b* is rotatably coupled to a fifth end of third link rod 1416*c*. In the present embodiment, second link rod 1416*b* is disposed horizontally so as to be orthogonal to the lengthwise direction of first link rod 1416*a*.

Third link rod 1416*c* connects third link rod 1416*c* and lid 1140*b* of delivery box 1140, and transfers the load of unmanned aerial vehicle 1171 transferred from first link rod 1416*a* and second link rod 1416*b* to lid 1140*b* of delivery box 1140. A sixth end of third link rod 1416*c* is rotatably coupled to lid 1140*b* of delivery box 1140.

The pair of rod support members 1141*a* are elongated rods for supporting first link rod 1416*a*, second link rod 1416*b* and third link rod 1416*c* in the above-described attitudes. The pair of rod support members 1141*a* are disposed on the ground surface vertically or in an upright attitude relative to the ground surface. The pair of rod support members 1141*a* may support first link rod 1416*a*, second link rod 1416*b*, and third link rod 1416*c* by one of rod support members 1141*a*.

The pair of rod support members 1141*a* are disposed parallel to one another, and the one or more link rods 1416 are disposed between one rod support member 1141*a* and the other rod support member 1141*a*. In the present embodiment, the one or more link rods 1416 include first link rod 1416*a* and second link rod 1416*b*.

The pair of rod support members 1141*a* includes a pair of couplings 1142. In the present embodiment, the pair of couplings 1142 are cylindrical rods extending horizontally.

The pair of couplings 1142 maintain the attitude of the pair of rod support members 1141*a* by coupling one rod support member 1141*a* to the other rod support member 1141*a*. One coupling 1142 is disposed on the upper side of the pair of rod support members 1141*a* and couples the one rod support member 1141*a* to the other rod support member 1141*a*. The other coupling 1142 is disposed on the lower side of the pair of rod support members 1141*a* and couples the one rod support member 1141*a* to the other rod support member 1141*a*. The other coupling 1142 is inserted at the third end of second link rod 1416*b* so as to be orthogonal to second link rod 1416*b*. The other coupling 1142 rotatably axially supports second link rod 1416*b* and serves as a fulcrum when second link rod 1416*b* rotates from the load of unmanned aerial vehicle 1171. The one coupling 1142 may be a support member that functions as first axle L1, and the other coupling 1142 may be a support member that functions as second axle L2.

The one rod support member 1141*a* may be inserted so as to be orthogonal to load support member 1401. In this case, the one coupling 1142 may rotatably axially support load support member 1401 and may serve as a fulcrum when load support member 1401 rotates from the load of unmanned aerial vehicle 1171. In such cases, the pair of rod support members 1141*a* may be an example of a support member that fixes the one coupling 1142 that functions as first axle L1.

First axle L1 supports the rotation of load support member 1401 at a position between the two ends of load support member 1401, which is a suspension rod. First axle L1 rotatably axially supports first link rod 1416*a* relative to load support member 1401. First axle L1 may be fixed to the pair of rod support members 1141*a*.

Second axle L2 supports the rotation of third link rod 1416*c* at a position between the fifth and sixth ends of third link rod 1416*c*. Second axle L2 rotatably supports lid 1140*b* of delivery box 1140 relative to third link rod 1416*c*. Second axle L2 may be fixed to container 1140*a* or lid 1140*b* of delivery box 1140. In such cases, container 1140*a* or lid 1140*b* is an example of a support member that fixes second axle L2. Second axle L2 may be fixed to a support member other than container 1140*a* or lid 1140*b*.

First interlocking portion 1161 locks door 1140*c* when lid 1140*b* is opened. When the load of unmanned aerial vehicle 1171 is transferred to lid 1140*b* of delivery box 1140 via the one or more link rods 1416, first interlocking portion 1161 locks door 1140*c*, that is, locks door 1140*c* so that it cannot be opened. First interlocking portion 1161 may lock door 1140*c* before, at the same time as, or directly after lid 1140*b* is opened. First interlocking portion 1161 locks door 1140*c* of container 1140*a* so that door 1140*c* of container 1140*a* does not open when storing a package in container 1140*a*. First interlocking portion 1161 is a key or an actuation mechanism such as an actuator or the like that locks door 1140*c*.

Second interlocking portion 1162 locks lid 1140*b* when lid 1140*b* is closed. When the removal of the load of unmanned aerial vehicle 1171 is transferred to lid 1140*b* of delivery box 1140 via the one or more link rods 1416, second interlocking portion 1162 locks lid 1140*b* immediately after lid 1140*b* is closed, that is, locks lid 1140*b* so that it cannot be opened. Second interlocking portion 1162 is a key or an actuation mechanism such as an actuator or the like that locks door 1140*c*.

Operational display 1145 is an input device for a user of delivery box 1140 to perform an unlocking process using a key if a package is stored in delivery box 1140. Operational display 1145 may display, for example, "in use" if a package is stored in delivery box 1140, and operational display 1145 includes a display.

As illustrated in FIG. 119, unmanned aerial vehicle 1171 includes first arm 1172 for hanging from load support member 1401. As first arm 1172 is the same as the connector described above or the arm included in the connector described above, repeated description will be omitted.

Unmanned aerial vehicle 1171 further includes wire 1174, second arm 1173, reel 1175, lift motor 1176, controller 1177, and camera 1178.

Wire 1174 is capable of hanging second arm 1173 and is connected to one end (e.g., the vertical upper end) of second arm 1173.

Second arm 1173 is connected to one end of wire 1174 and holds the package. Second arm 1173 according to the present embodiment includes a pair of gripping portions and a motor, and holds the package at a predetermined attitude by sandwiching a portion of the package from both sides. By controlling the actuation of the motor by controller 1177, second arm 1173 lifts the package by grasping the package between the pair of gripping portions, and lets go of the grasped package by releasing the pair of gripping portions. Note that second arm 1173 is not limited to the example given in present embodiment; it is sufficient if second arm 1173 is capable of holding and releasing a package by operating a pair of gripping portions by actuating a motor.

Reel 1175 is connected to the other end of wire 1174 and can reel wire 1174 in and out by rotating. The rotation of reel 1175 is controlled by lift motor 1176.

After lid 1140*b* is opened, controller 1177 controls lift motor 1176 to rotate reel 1175 to reel out wire 1174 to place the package into container 1140*a*. After the package is placed on bottom portion 1140*d* of container 1140*a*, controller 1177 causes second arm 1173 to release its hold on the package and causes reel 1175 to reel in wire 1174. Controller 1177 controls the motor of second arm 1173 to cause second arm 1173 to rotate and disconnect the package from second arm 1173.

When controller 1177 controls the motor of second arm 1173 to execute the disconnection of the package from second arm 1173, controller 1177 outputs an imaging instruction to camera 1178. Controller 1177 obtains an image of the interior (space) of container 1140*a* of delivery box 1140 via camera 1178. Controller 1177 executes an authenticated process that confirms that unmanned aerial vehicle 1171 has stored the package, based on an image showing the container 1140*a* and the interior of container 1140*a* captured by camera 1178.

For example, controller 1177 may determine whether the captured image includes an object corresponding to the package. If the package is stored in container 1140*a*, controller 1177 may determine the delivery as completed as the authenticated process, and if the package is not stored in container 1140*a*, controller 1177 may, as an unauthenticated process, rotate reel 1175 by controlling lift motor 1176 to reel in wire 1174, and rotate reel 1175 again to reel out wire 1174 to place the package into container 1140*a*.

Upon completion of the delivery, controller 1177 controls lift motor 1176 to rotate reel 1175 to reel in wire 1174, and releases unmanned aerial vehicle 1171 from rail 400.

Camera 1178 is capable of capturing images of the inside of container 1140*a*. Camera 1178 is provided on the lower side of the main body of unmanned aerial vehicle 1171 and captures images vertically below the main body. Although camera 1178 takes images by obtaining an imaging instruction from controller 1177, camera 1178 may constantly capture images.

Operations

This section describes operations performed by unmanned aerial vehicle 1171 to store packages in delivery box 1140.

Figure 121:
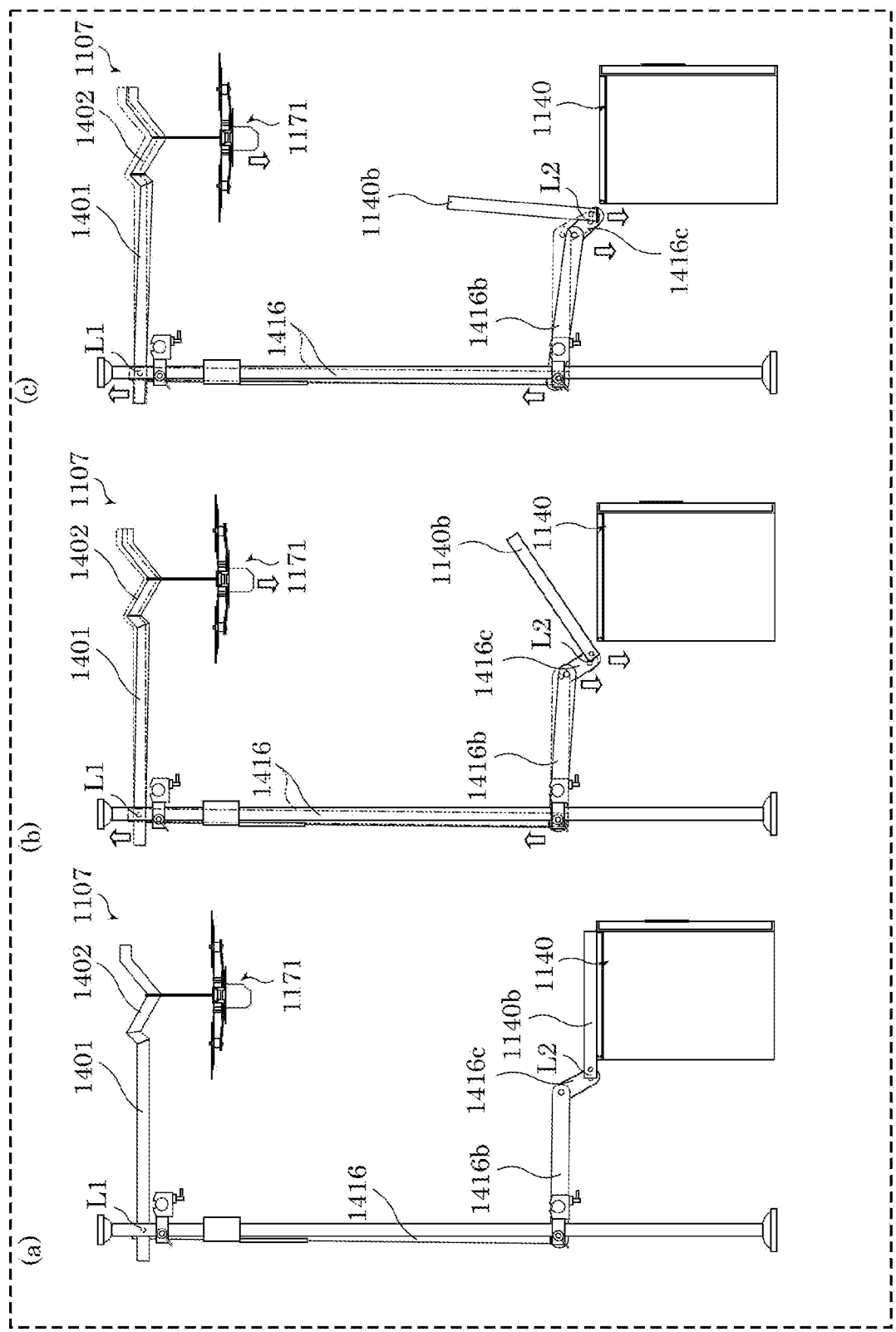
Figure 122:
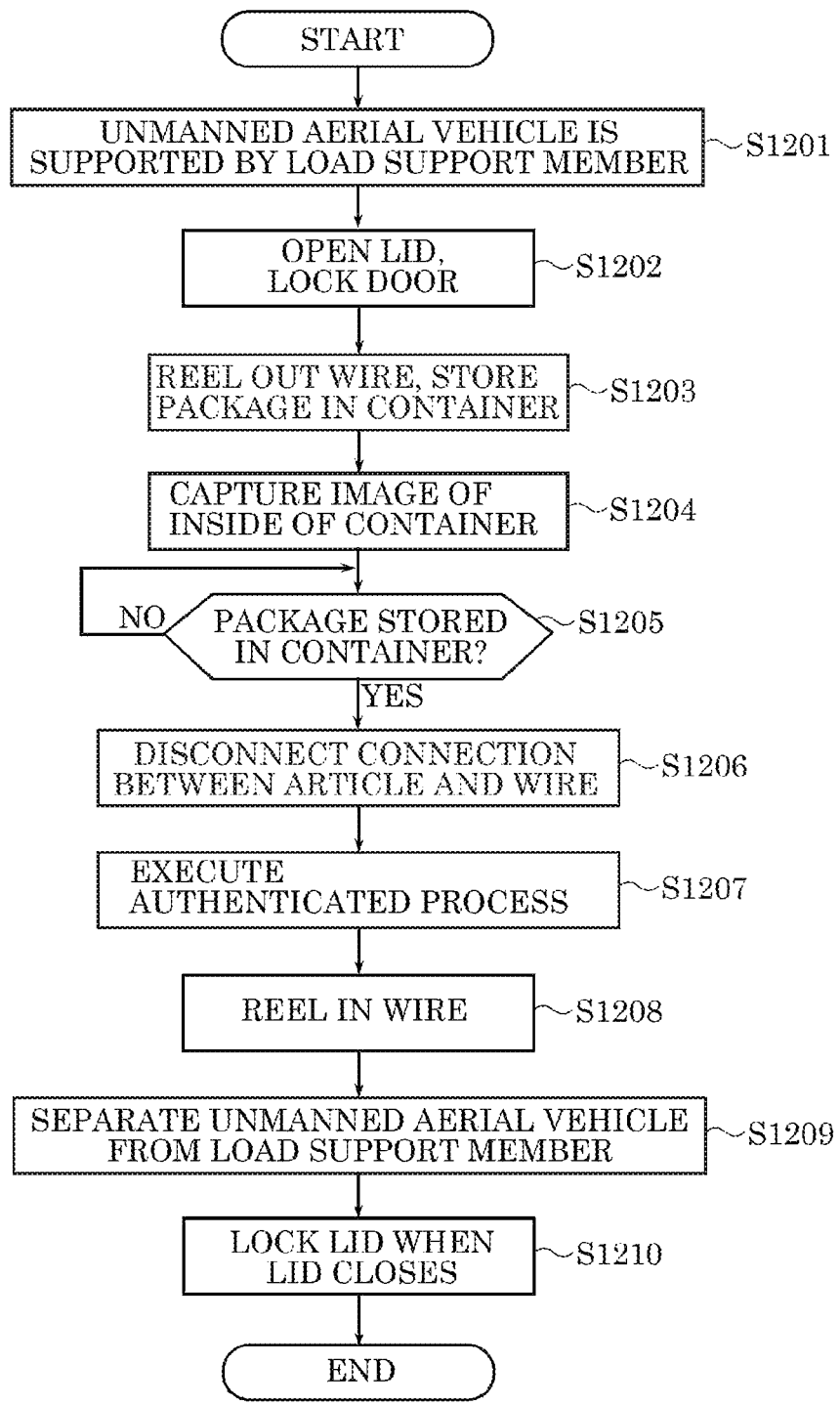
Figure 123:
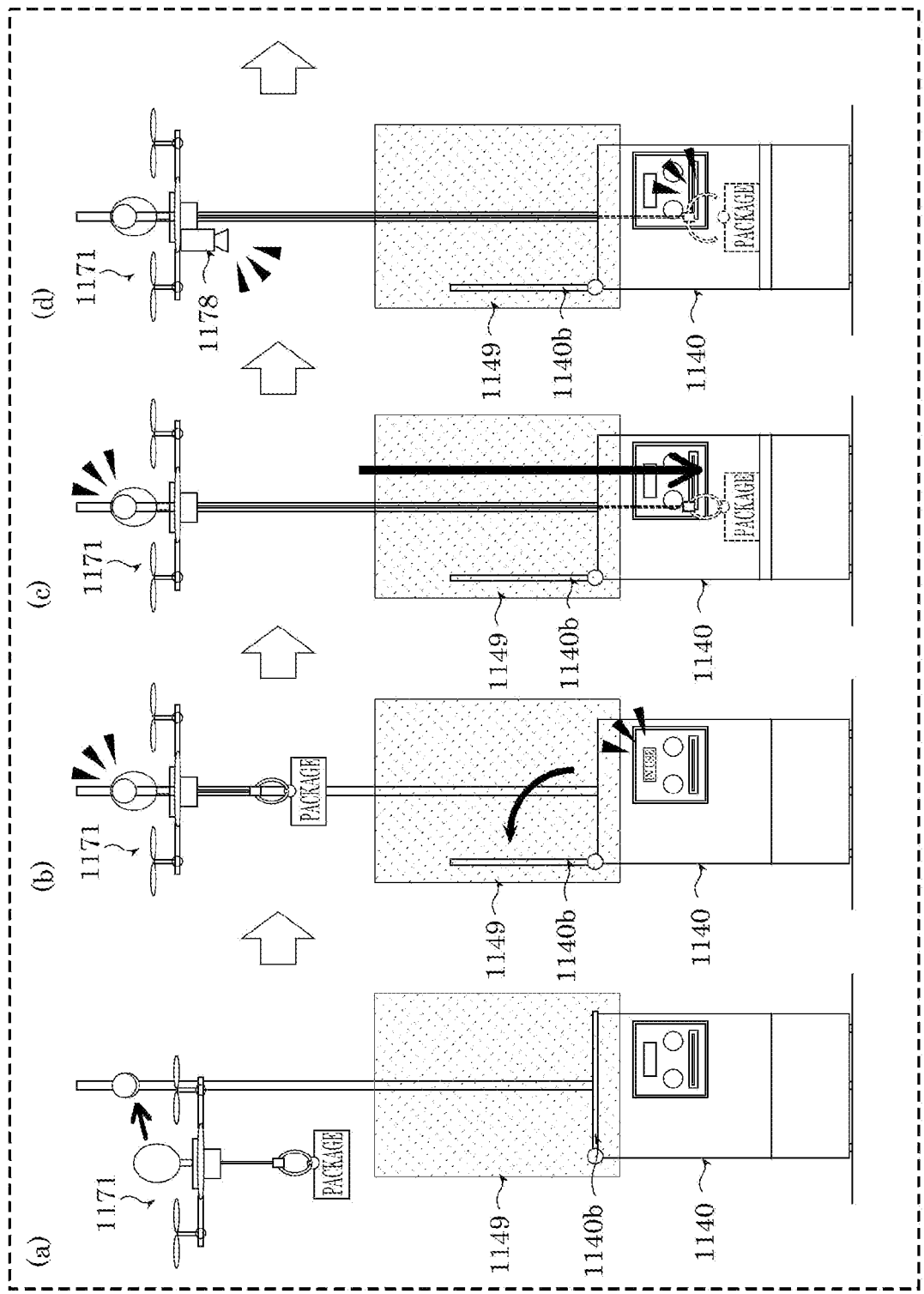

FIG. 122 is a flowchart illustrating an example of processes from start to finish of the delivery of a package to delivery box 1140 by unmanned aerial vehicle 1171 according to Embodiment 20. FIG. 123 is a schematic diagram illustrating an example of processes from the start of storing of a package in delivery box 1140 by unmanned aerial vehicle 1171 according to Embodiment 20 to the disconnecting of the package by second arm 1173. Although FIG. 123 is not entirely consistent with FIG. 120 and FIG. 121, they share at least the point that lid 1140*b* of delivery box 1140 opens when unmanned aerial vehicle 1171 is hanging from load support member 1401. In FIG. 123, guide portion 1149 surrounds the perimeter of lid 1140*b* of delivery box 1140 and is located between unmanned aerial vehicle 1171 and delivery box 1140.

First, as illustrated in FIG. 122 and (a) in FIG. 123, when unmanned aerial vehicle 1171 arrives at a location vertically above delivery box 1140, which is the receiver of the package, the controller of unmanned aerial vehicle 1171 stops operation of the plurality of motors. Unmanned aerial vehicle 1171 applies a load by contacting load support member 1401. Unmanned aerial vehicle 1171 is supported by load support member 1401 by hanging on bend 1402 of load support member 1401 (S1201). Step S1201 is an example of a step in which unmanned aerial vehicle 1171 is supported by load support member 1401 of delivery box 1140.

Next, the operation of delivery box 1140 opening lid 1140*b* will be described with reference to FIG. 120 and FIG. 121.

FIG. 121 is a side view of an example of the movement of delivery box 1140 when unmanned aerial vehicle 1171 according to Embodiment 20 is hanging from rail 400.

In (a) in FIG. 120 and (a) in FIG. 121, unmanned aerial vehicle 1171 is connected to load support member 1401. In (b) in FIG. 120 and (b) in FIG. 121, which show the states after (a) in FIG. 120 and (a) in FIG. 121, unmanned aerial vehicle 1171 is connected to load support member 1401 of rail 400, and the load of unmanned aerial vehicle 1171 is applied to load support member 1401. In (b) in FIG. 120 and (b) in FIG. 121, when the load of unmanned aerial vehicle 1171 is applied to load support member 1401, load support member 1401 flexes due to the load of unmanned aerial vehicle 1171, whereby first link rod 1416a, which pivots relative to load support member 1401 via first axle L1, is raised vertically upward. First link rod 1416a pulls second link rod 1416b vertically upward. Second link rod 1416b pivots with the other coupling 142 as a fulcrum while pivoting relative to first link rod 1416a to push third link rod 1416c vertically downward. Third link rod 1416c pushes down lid 1140b of delivery box 1140 while pivoting relative to second link rod 1416b. Lid 1140b pivots relative to third link rod 1416c to pivot about second axle L2 to open top opening 1143b of container 1140a. With this, as illustrated in (c) in FIG. 120 and (c) in FIG. 121, the load of unmanned aerial vehicle 1171 causes lid 1140b to stand upright relative to container 1140a, completely opening top opening 1143b of container 1140a.

We will now return to the description of FIG. 122 and FIG. 123. As illustrated in FIG. 122 and (b) in FIG. 123, delivery box 1140 opens lid 1140b which opens top opening 1143b. When the load of unmanned aerial vehicle 1171 is transferred to lid 1140b of delivery box 1140 via the one or more link rods 1416, first interlocking portion 1161 locks door 1140c so that it cannot be opened (S1202).

Next, as illustrated in FIG. 122 and (c) in FIG. 123, the controller controls lift motor 1176 to start reeling out wire 1174 in order to store the package in container 1140a (S1203). Controller 1177 controls lift motor 1176 to rotate reel 1175 to reel out wire 1174 to lower and place the package into container 1140a. Here, since the package is guided by guide portion 1149, the package can be aligned with delivery box 1140. As a result, guide portion 1149 can store a package in delivery box 1140. Guide portion 1149 is, for example, a netted frame or a plate-like frame. Step S1203 is an example of a step in which an article is stored in container 1140a.

Figure 124:
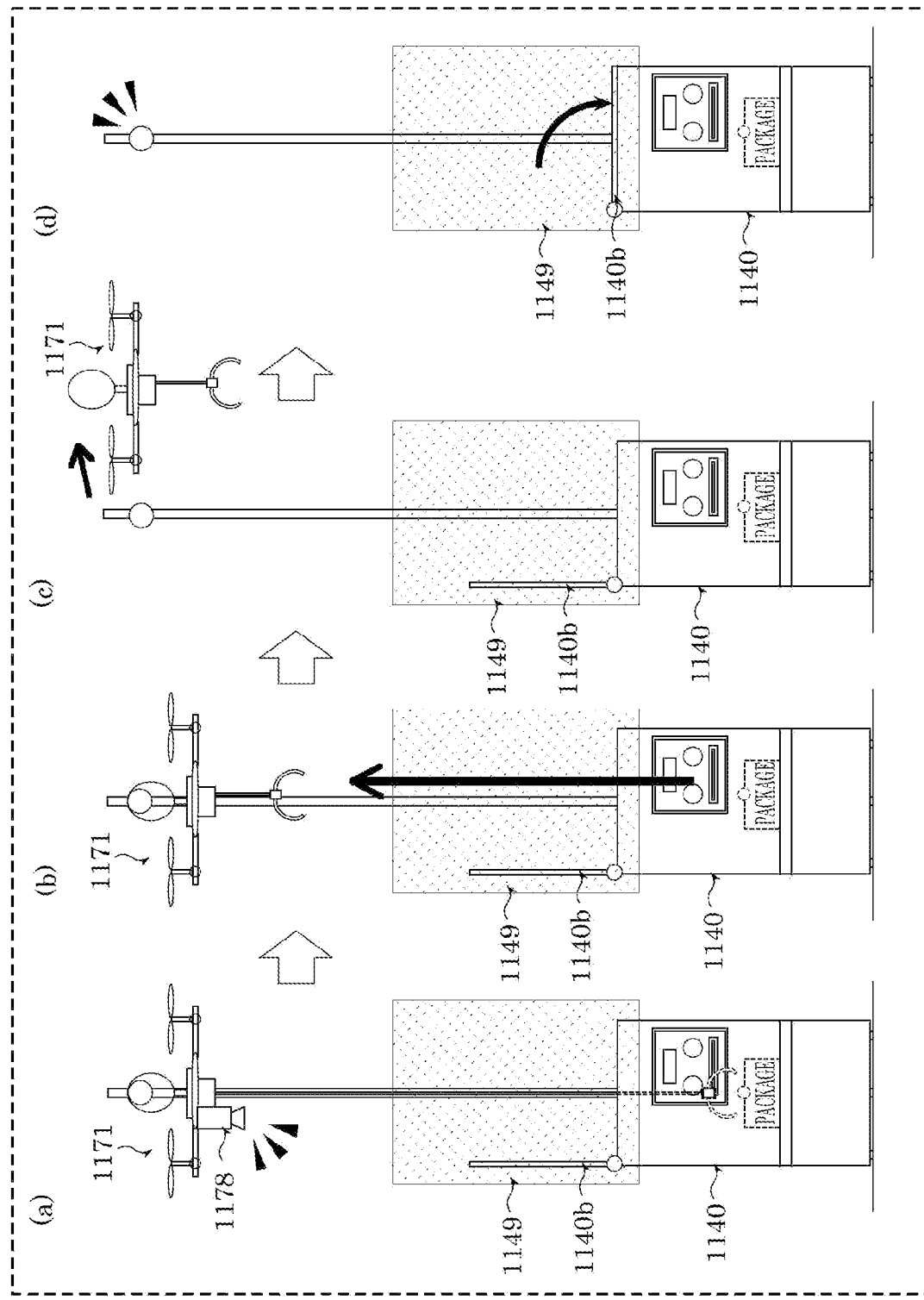

FIG. 124 is a schematic diagram illustrating an example of unmanned aerial vehicle 1171 according to Embodiment 20 from the time camera 1178 captures an image of a package stored in delivery box 1140 to the time unmanned aerial vehicle 1171 leaves rail 400.

Next, as illustrated in FIG. 122, (d) in FIG. 123, and (a) in FIG. 124, the controller outputs an imaging instruction to camera 1178 when step S1203 is executed. The controller checks whether the package has been stored in delivery box 1140. This causes camera 1178 to capture an image of the package and container 1140a (S1204). Camera 1178 outputs the captured image to the controller.

The controller determines, based on the captured image, whether or not a package has been stored in container 1140a (S1205). When a package is stored in container 1140a (YES in S1205), the controller disconnects the connection between the article and wire 1174 (S1206). The controller rotates second arm 1173 by controlling the motor of second arm 1173 to open the pair of gripping portions and disconnect the package from second arm 1173. Step S1206 is an example of a step of disconnecting the connection between the article and wire 1174.

If the package is not stored in container 1140a (NO in S1205), as an unauthenticated process, the controller rotates reel 1175 by controlling lift motor 1176 to reel in wire 1174, and rotates reel 1175 again to reel out wire 1174 to place the package into container 1140a. This processing may be repeated a predetermined number of times.

Next, if the package is stored in container 1140a, the controller determines the delivery as completed as the authenticated process, and executes the authenticated process that confirms that unmanned aerial vehicle 1171 has stored the package (S1207).

Next, as illustrated in FIG. 122 and (b) in FIG. 124, upon completion of delivery, the controller controls lift motor 1176 to rotate reel 1175 to reel in wire 1174 (S1208). Step S1208 is an example of a step of reeling in wire 1174.

Next, as illustrated in FIG. 122 and (c) in FIG. 124, the controller actuates the plurality of motors to cause unmanned aerial vehicle 1171 to hover and separate unmanned aerial vehicle 1171 from load support member 1401 (S1209). Since the load of unmanned aerial vehicle 1171 on load support member 1401 is removed, lid 1140b of delivery box 1140 closes to cover top opening 1143b of container 1140a. Step S1209 is an example of a step in which unmanned aerial vehicle 1171 is separated from load support member 1401.

Next, as illustrated in FIG. 122 and (d) in FIG. 124, second interlocking portion 1162 locks lid 1140b when lid 1140b is closed (S1210). As a result, lid 1140b of delivery box 1140 can be unlocked and opened by a user of delivery box 1140 executing an unlocking process using a key. System 1107 then ends the processing.

Advantageous Effects

Next, the advantageous effects achieved by delivery box 1140, system 1107, and the method according to the present embodiment will be described.

As described above, delivery box 1140 according to the present embodiment is capable of storing an article delivered by unmanned aerial vehicle 1171, and includes: container 1140a including bottom portion 1140d and side portion 1144a; lid 1140b rotatably coupled to container 1140a; load support member 1401 capable of supporting the load of unmanned aerial vehicle 1171 carrying an article; and one or more link rods 1416 coupled between load support member 1401 and lid 1140b. When unmanned aerial vehicle 1171 applies a load to load support member 1401, the one or more link rods 1416 transfer the load to lid 1140b and open lid 1140b.

With this, lid 1140b of container 1140a can be automatically opened simply by unmanned aerial vehicle 1171 hanging from load support member 1401. Accordingly, the article delivered by unmanned aerial vehicle 1171 can be stored in container 1140a.

The method according to the present embodiment is a method for storing an article delivered by unmanned aerial vehicle 1171 into delivery box 1140, and includes: supporting unmanned aerial vehicle 1171 using load support member 1401 of delivery box 1140; storing the article in container 1140a after lid 1140b of delivery box 1140 opens and the article is lowered from unmanned aerial vehicle 1171 via wire 1174; disconnecting the connection between the article and wire 1174; reeling in wire 1174; and separating unmanned aerial vehicle 1171 from load support member 1401.

In delivery box 1140 according to the present embodiment, lid 1140b closes to cover the top portion of container 1140a when the load applied to load support member 1401 is removed.

With this, lid 1140b of container 1140a can be automatically closed by unmanned aerial vehicle 1171 flying away from load support member 1401.

In delivery box 1140 according to present embodiment, load support member 1401 is disposed above container 1140a.

With this, since lid 1140b of container 1140a is opened so long as unmanned aerial vehicle 1171 is hanging from load support member 1401, the article delivered by unmanned aerial vehicle 1171 can be easily stored in container 1140a.

In delivery box 1140 according to the present embodiment, load support member 1401 is a suspension rod from which unmanned aerial vehicle 1171 can hang.

With this, the load of unmanned aerial vehicle 1171 hanging from load support member 1401 can be reliably supported.

In delivery box 1140 according to the present embodiment, the suspension rod includes a V-shaped or U-shaped bend 1402 directly above container 1140a.

This makes it easier to position unmanned aerial vehicle 1171 because unmanned aerial vehicle 1171 can easily be caught by bend 1402. Accordingly, since lid 1140b of container 1140a is opened so long as unmanned aerial vehicle 1171 is hanging from load support member 1401, the article delivered by unmanned aerial vehicle 1171 can be more easily stored in container 1140a.

In delivery box 1140 according to the present embodiment, the one or more link rods 1416 include first link rod 1416a, second link rod 1416b, and third link rod 1416c. A first end of first link rod 1416a is rotatably coupled to the suspension rod. A second end of first link rod 1416a is rotatably coupled to a third end of second link rod 1416b. A fourth end of second link rod 1416b is rotatably coupled to a fifth end of third link rod 1416c. A sixth end of third link rod 1416c is rotatably coupled to lid 1140b.

With this, when unmanned aerial vehicle 1171 is hanging from the suspension rod, the suspension rod flexes vertically downward due to the load of unmanned aerial vehicle 1171. As a result, the load thereof is transferred, via the suspension rod, to lid 1140b of container 1140a via first link rod 1416a, second link rod 1416b, and third link rod 1416c. Accordingly, lid 1140b of container 1140a can be reliably opened simply by unmanned aerial vehicle 1171 hanging from the suspension rod. Accordingly, with this delivery box 1140, the article delivered by unmanned aerial vehicle 1171 can be stored in container 1140a more easily.

Delivery box 1140 according to the present embodiment further includes first axle L1 that supports rotation of load support member 1401 at a position between the two ends of the suspension rod, and second axle L2 that supports rotation of third link rod 1416c at a position between the fifth end and the sixth end of third link rod 1416c.

With this, the load of unmanned aerial vehicle 1171 can be reliably transferred to first link rod 1416a via first axle L1. The load of unmanned aerial vehicle 1171 transferred to third link rod 1416c can be reliably transferred to lid 1140b of container 1140a via second axle L2. This makes it possible to open lid 1140b of container 1140a.

Delivery box 1140 according to the present embodiment further includes a support member that fixes the positions of first axle L1 and second axle L2.

With this, the weight of unmanned aerial vehicle 1171 hanging from the suspension rod can be reliably transferred to lid 1140b of container 1140a via first link rod 1416a, second link rod 1416b, and third link rod 1416c, so that lid 1140b of container 1140a can be reliably opened.

Delivery box 1140 according to the present embodiment further includes door 1140c provided on side portion 1144a of container 1140a, and first interlocking portion 1161 that locks door 1140c when lid 1140b is opened.

This inhibits an article from going through door 1140c upon storing the article in container 1140a. Locking door 1140c makes it possible to inhibit forgetting to lock door 1140c manually, which is excellent for convenience because it can inhibit theft of a package stored in delivery box 1140.

Delivery box 1140 according to the present embodiment further includes second interlocking portion 1162 that locks lid 1140b when lid 1140b is closed.

With this, lid 1140b can be automatically locked when lid 1140b is closed. This reduces the frequency of having to lock lid 1140b by hand. Locking lid 1140b makes it possible to inhibit forgetting to lock lid 1140b manually, which is excellent for convenience because it can inhibit theft of a package stored in delivery box 1140.

System 1107 according to the present embodiment includes delivery box 1140 and unmanned aerial vehicle 1171.

In system 1107 according to the present embodiment, unmanned aerial vehicle 1171 includes first arm 1172 for hanging from load support member 1401.

With this, since unmanned aerial vehicle 1171 can securely hang from load support member 1401, unmanned aerial vehicle 1171 can maintain its attitude even if the actuation of a motor, for example, is stopped.

In system 1107 according to the present embodiment, unmanned aerial vehicle 1171 includes: wire 1174; second arm 1173 that is connected to one end of wire 1174 and holds an article; reel 1175 that is connected to the other end of wire 1174 and is capable of reeling in wire 1174; and controller 1177. Controller 1177 reels out wire 1174 to place the article into container 1140a after lid 1140b is opened, and after the article is placed on bottom portion 1140d of container 1140a, causes second arm 1173 to let go of the article and causes reel 1175 to reel in wire 1174.

Accordingly, when unmanned aerial vehicle 1171 is hanging from load support member 1401, second arm 1173 and the article can be lowered toward container 1140a by reeling out wire 1174. Once the article is placed on bottom portion 1140d of container 1140a, second arm 1173 can be moved away from the article. Thus, system 1107 can ensure that the article is stored inside container 1140a.

In present system 1107 according to the present embodiment, unmanned aerial vehicle 1171 further includes camera 1178 capable of capturing images of the inside of container 1140a.

This enables unmanned aerial vehicle 1171 to confirm whether or not the package has been stored in container 1140a. This can also prevent second arm 1173 from separating from the article if the article is not correctly stored inside container 1140a. After pulling up the package, the package can be stored in container 1140a once again.

In system 1107 according to the present embodiment, controller 1177 obtains an image of the inside of delivery box 1140 via camera 1178, and based on the image, executes an authenticated process that confirms that unmanned aerial vehicle 1171 has stored the article.

This ensures the certainty that the article was stored in container 1140a since the storing of the article into delivery box 1140 can be verified.

Other Variations

For example, in the foregoing embodiments and the variations of the foregoing embodiments, a child drone may include a wheel that allows the child drone to travel like a vehicle on a rail. The child drone may be self-propelled with the wheel only while the child drone travels on a rail on a building. In this case, a rail may be a plate-like member on which the child drone can travel. A guide rail may be provided on a rail along its edge opposite the building so that the child drone does not fall off from the rail. This can ensure the safety.

In the foregoing embodiments, the constituent elements may each be implemented by dedicated hardware or may each be implemented through execution of a software program suitable for a corresponding constituent element. Each of the constituent elements may be implemented as a program executing unit, such as a CPU or a processor, reads out a software program recorded on a recording medium, such as a hard disk or a semiconductor memory, and executes the software program. Herein, software that implements the unmanned aerial vehicle and so on of the foregoing embodiments described above is a program such as the one described below.

Specifically, this program causes a computer to execute a method of controlling a first unmanned aerial vehicle and a second unmanned aerial vehicle in a system that includes the first unmanned aerial vehicle and the second unmanned aerial vehicle coupled to the first unmanned aerial vehicle via a coupling line. The method includes (A) causing the first unmanned aerial vehicle and the second unmanned aerial vehicle to move forward and (B) stopping the first unmanned aerial vehicle from moving forward when an anomaly has occurred in flying of the second unmanned aerial vehicle.

The techniques described above may be applied to an autonomous aerial vehicle instead of an unmanned aerial vehicle, for example. In this case, the term "unmanned aerial vehicle" or "drone" used in the foregoing descriptions is replaced with "autonomous aerial vehicle" as appropriate. Alternatively, the techniques described above may be applied to any aerial vehicle regardless of whether the aerial vehicle is manned or unmanned or regardless of whether the aerial vehicle is autonomously driven or manually driven.

Supplemental Information

A control method according to a first aspect is a control method of controlling a first unmanned aerial vehicle and a second unmanned aerial vehicle in a system that includes the first unmanned aerial vehicle and the second unmanned aerial vehicle coupled to the first unmanned aerial vehicle via a coupling line. The control method includes (A) causing the first unmanned aerial vehicle and the second unmanned aerial vehicle to move forward and (B) stopping the first unmanned aerial vehicle from moving forward when an anomaly has occurred in flying of the second unmanned aerial vehicle.

A control method according to a second aspect is a control method according to the first aspect. In the above (B), an operation of the first unmanned aerial vehicle is changed from the forward movement to hovering.

A control method according to a third aspect is a control method according to the first or second aspect. In the above (A), the first unmanned aerial vehicle monitors the tension in the coupling line. In the above (B), the first unmanned aerial vehicle detects an anomaly in flying of the second unmanned aerial vehicle based on a change in the tension.

A control method according to a fourth aspect is a control method according to the third aspect. In the above (B), the first unmanned aerial vehicle determines that an anomaly has occurred in flying of the second unmanned aerial vehicle when the tension has reached or exceeded a predetermined value.

A control method according to a fifth aspect is a control method according to the first or second aspect. In the above (B), the second unmanned aerial vehicle is caused to output an anomaly signal when an anomaly has occurred in flying of the second unmanned aerial vehicle, and the first unmanned aerial vehicle determines that an anomaly has occurred in flying of the second unmanned aerial vehicle in response to receiving the anomaly signal.

A control method according to a sixth aspect is a control method according to the fifth aspect. The coupling line includes a communication cable, and the anomaly signal is transmitted from the second unmanned aerial vehicle to the first unmanned aerial vehicle via the communication cable.

A control method according to a seventh aspect is a control method according to the first or second aspect. The first unmanned aerial vehicle includes a camera. In the above (B), the first unmanned aerial vehicle determines that an anomaly has occurred in the second unmanned aerial vehicle based on a video from the camera.

A control method according to an eighth aspect is a control method according to any one of the first to seventh aspects. In the above (B), the length of the coupling line is reduced when an anomaly has occurred in the second unmanned aerial vehicle.

A control method according to a ninth aspect is a control method according to the eighth aspect. In the above (B), the length of the extended coupling line is reduced by causing the first unmanned aerial vehicle to take up a portion of the coupling line.

A control method according to a tenth aspect is a control method according to any one of the first to ninth aspects. The system further includes a first rail fixed at a position spaced apart from a ground surface. In the above (A), the first unmanned aerial vehicle is caused to move forward at a position where the first unmanned aerial vehicle is closer to the first rail than the second unmanned aerial vehicle is.

A control method according to an eleventh aspect is a control method according to the tenth aspect. In the above (A), the first unmanned aerial vehicle is caused to move forward at a position lower than the first rail.

A control method according to a twelfth aspect is a control method according to the tenth or eleventh aspect. In the above (A), the first unmanned aerial vehicle is caused to move forward along the first rail with the first unmanned aerial vehicle being movably coupled to the first rail.

A control method according to a thirteenth aspect is a control method according to the tenth or eleventh aspect. In the above (B), the first unmanned aerial vehicle is coupled to the first rail when an anomaly has occurred in flying of the second unmanned aerial vehicle.

A control method according to a fourteenth aspect is a control method according to the thirteenth aspect. The first unmanned aerial vehicle includes an arm that can be opened and closed. In the above (A), the first unmanned aerial vehicle is caused to move forward with the arm open. In the above (B), the first unmanned aerial vehicle is coupled to the first rail by closing the arm so as to enclose the first rail.

A control method according to a fifteenth aspect is a control method according to the fourteenth aspect. The arm includes a first arm and a second arm. When the arm is open, the distance between one end of the first arm and one end of the second arm is greater than the width of the first rail. When the arm is closed, the distance between the one end of the first arm and the one end of the second arm is smaller than the width of the first rail.

A control method according to a sixteenth aspect is a control method according to any one of the first to fifteenth aspects. The first unmanned aerial vehicle is smaller than the second unmanned aerial vehicle.

A control method according to a seventeenth aspect is a control method according to any one of the first to sixteenth aspects. One end of the coupling line is coupled to a lower surface of the first unmanned aerial vehicle while the first unmanned aerial vehicle is in a flying state.

A control method according to an eighteenth aspect is a control method according to the seventeenth aspect. The second unmanned aerial vehicle includes a ring that encloses the main body of the second unmanned aerial vehicle and that is rotatable relative to the main body. An outer peripheral surface of the ring extends along a lower surface, a first side surface, an upper surface, and a second side surface of the main body of the second unmanned aerial vehicle while the second unmanned aerial vehicle is in a flying state. The other end of the coupling line is coupled to the outer peripheral surface of the ring of the second unmanned aerial vehicle while the second unmanned aerial vehicle is in a flying state.

A control method according to a nineteenth aspect is a control method according to any one of the tenth to fifteenth aspects. The system includes a management server. The first rail includes a first recording surface on which first identification information for identifying the first rail is recorded. The first unmanned aerial vehicle includes at least one reading sensor for reading the first identification information from the first recording surface. In the above (A), the first unmanned aerial vehicle causes the at least one reading sensor to read the first identification information continuously or intermittently. The first unmanned aerial vehicle causes itself to identify its own position based on the first identification information. The first unmanned aerial vehicle is caused to wirelessly transmit first position information indicating the position of the first unmanned aerial vehicle to the management server continuously or intermittently.

A control method according to a twentieth aspect is a control method according to the nineteenth aspect. In the above (A), the first unmanned aerial vehicle is caused to wirelessly transmit second position information indicating the relative positions of the first unmanned aerial vehicle and the second unmanned aerial vehicle to the management server continuously or intermittently. The management server is caused to identify the position of the second unmanned aerial vehicle based on the first position information and the second position information.

A control method according to a twenty-first aspect is a control method according to the nineteenth or twentieth aspect. Prior to the above (A), the first unmanned aerial vehicle is caused to download, from the management server, route information indicating a plurality of rails disposed along a planned flying route of the first unmanned aerial vehicle and the second unmanned aerial vehicle. In the above (A), the first unmanned aerial vehicle is caused to compare the first identification information against the rail information so as to identify the position of the first unmanned aerial vehicle.

A control method according to a twenty-second aspect is a control method according to the twenty-first aspect. The rail information includes identification information of each of the plurality of rails and coordinate information indicating the geographical coordinates of each of the plurality of rails.

A control method according to a twenty-third aspect is a control method according to any one of the nineteenth to twenty-second aspects. The at least one reading sensor is at least one optical sensor.

A control method according to a twenty-fourth aspect is a control method according to any one of the nineteenth to twenty-third aspects. The recording surface is disposed on the outer peripheral surface of the first rail. The at least one optical sensor includes a plurality of optical sensors. In the above (A), the plurality of optical sensors scan the recording surface in mutually different directions.

A control method according to a twenty-fifth aspect is a control method according to any one of the nineteenth to twenty-fourth aspects. The first recording surface has further recorded thereon altitude information indicating the altitude of the first rail.

A control method according to a twenty-sixth aspect is a control method according to any one of the first to twenty-fifth aspects. The control method further includes (C) changing the flying course of the second unmanned aerial vehicle when a following aerial vehicle that flies behind the second unmanned aerial vehicle passes the second unmanned aerial vehicle.

A control method according to a twenty-seventh aspect is a control method according to the twenty-sixth aspect. In the above (C), the flying course of the second unmanned aerial vehicle is changed to a direction away from the first unmanned aerial vehicle.

A control method according to a twenty-eighth aspect is a control method according to the twenty-sixth or twenty-seventh aspect. In the above (C), the second unmanned aerial vehicle is returned to its original flying course after the following aerial vehicle has passed the second unmanned aerial vehicle.

A control method according to a twenty-ninth aspect is a control method according to any one of the twenty-sixth to twenty-eighth aspects. In the above (C), the length of the coupling line extending from the first unmanned aerial vehicle to the second unmanned aerial vehicle is increased before the following aerial vehicle passes the second unmanned aerial vehicle.

A control method according to a thirtieth aspect is a control method according to the tenth aspect. The system further includes a third unmanned aerial vehicle that shares the first rail with the first unmanned aerial vehicle and a fourth unmanned aerial vehicle that is coupled to the third unmanned aerial vehicle via a coupling line. The control method further (D) changes the flying course of the first unmanned aerial vehicle when the third unmanned aerial vehicle flying behind the first unmanned aerial vehicle passes the first unmanned aerial vehicle.

A control method according to a thirty-first aspect is a control method according to the thirtieth aspect. In the above (D), the flying course of the first unmanned aerial vehicle is changed to a direction away from the first rail.

A control method according to a thirty-second aspect is a control method according to the thirty-first aspect. The system further includes a second rail that is fixed at a position spaced apart from the ground surface and that extends parallel to the first rail. In the above (D), the flying course of the first unmanned aerial vehicle is changed to a direction approaching the second rail.

A control method according to a thirty-third aspect is a control method according to the thirty-second aspect. In the above (A), the first unmanned aerial vehicle is caused to move forward along the first rail with the first unmanned aerial vehicle being movably coupled to the first rail. In the above (D), the first unmanned aerial vehicle is caused to disengage itself from the first rail and couple itself to the second rail before the third unmanned aerial vehicle passes the first unmanned aerial vehicle, and the first unmanned aerial vehicle is caused to disengage itself from the second rail and couple itself to the first unmanned aerial vehicle after the third unmanned aerial vehicle has passed the first unmanned aerial vehicle.

A control method according to a thirty-fourth aspect is a control method according to the thirty-second or thirty-third aspect. When viewed in a direction perpendicular to the ground surface, the distance between the first rail and the second rail is greater than the size of the first unmanned aerial vehicle.

A control method according to a thirty-fifth aspect is a control method according to any one of the thirty-second to thirty-fourth aspects. The first rail and the second rail are disposed at the same height from the ground surface.

A control method according to a thirty-sixth aspect is a control method according to the tenth aspect. The system further includes a third unmanned aerial vehicle that is coupled to the second unmanned aerial vehicle via a coupling line and that shares the first rail with the first unmanned aerial vehicle, a fourth unmanned aerial vehicle that shares the first rail with the first unmanned aerial vehicle and the third unmanned aerial vehicle, and a fifth unmanned aerial vehicle that is coupled to the fourth unmanned aerial vehicle via a coupling line. In the above (A), the first unmanned aerial vehicle and the third unmanned aerial vehicle are each caused to move forward along the first rail with the first unmanned aerial vehicle and the third unmanned aerial vehicle being movably coupled to the first rail. In the control method, furthermore, (E) in a case where the first unmanned aerial vehicle and the third unmanned aerial vehicle are flying behind the fourth unmanned aerial vehicle and where the second unmanned aerial vehicle is flying behind the fifth unmanned aerial vehicle, when the second unmanned aerial vehicle is to pass the fifth unmanned aerial vehicle, the first unmanned aerial vehicle is disengaged from the first rail, the first unmanned aerial vehicle is moved to the front of the fourth unmanned aerial vehicle, the first unmanned aerial vehicle is recoupled to the first rail, the second unmanned aerial vehicle is moved to the front of the fifth unmanned aerial vehicle after the first unmanned aerial vehicle has been recoupled to the first rail, the third unmanned aerial vehicle is disengaged from the first rail after the first unmanned aerial vehicle has been recoupled to the first rail, the third unmanned aerial vehicle is moved to the front of the fourth unmanned aerial vehicle, and the third unmanned aerial vehicle is recoupled to the first rail.

A control method according to a thirty-seventh aspect is a control method according to any one of the tenth to fifteenth aspects. The system further includes a second rail that is fixed at a position spaced apart from the ground surface and that is disposed adjacent to the first rail with a space provided therebetween. In the control method, furthermore, (F) the first unmanned aerial vehicle is moved from the vicinity of the first rail to the vicinity of the second rail when the first unmanned aerial vehicle is moving forward along the first rail and the second rail is located in the direction in which the first unmanned aerial vehicle moves forward.

A control method according to a thirty-eighth aspect is a control method according to the thirty-seventh aspect. In the above (F), the altitude of the first unmanned aerial vehicle is temporarily raised when the first unmanned aerial vehicle is disengaged from the first rail.

A control method according to a thirty-ninth aspect is a control method according to the thirty-eighth aspect. In the above (F), the altitude of the first unmanned aerial vehicle is raised higher than the height of the first rail and the height of the second rail.

A control method according to a fortieth aspect is a control method according to any one of the first to thirty-ninth aspects. In the control method, furthermore, (G) the first unmanned aerial vehicle is stopped from flying while the second unmanned aerial vehicle is flying, the second unmanned aerial vehicle is caused to take up the coupling line, and the first unmanned aerial vehicle is anchored to the second unmanned aerial vehicle.

A control method according to a forty-first aspect is a control method according to the fortieth aspect. In the above (G), the second unmanned aerial vehicle is housed inside the first unmanned aerial vehicle.

A control method according to a forty-second aspect is a control method according to the fortieth or forty-first aspect. The second unmanned aerial vehicle includes a housing opening for housing a package, and the housing opening is located in a panel regarded as a side panel when the second unmanned aerial vehicle is flying.

A program or a non-transitory recording medium according to a forty-third aspect causes a computer to execute any one of the control methods according to the first to forty-second aspects.

An unmanned aerial vehicle according to a forty-fourth aspect is an unmanned aerial vehicle in a system that includes the unmanned aerial vehicle and another unmanned aerial vehicle coupled to the unmanned aerial vehicle via a coupling line. The unmanned aerial vehicle includes a first controller. The first controller causes the unmanned aerial vehicle to move forward or to stop moving forward when an anomaly has occurred in the other unmanned aerial vehicle.

A flying system according to a forty-fifth aspect is a system that includes a first unmanned aerial vehicle and a second unmanned aerial vehicle coupled to the first unmanned aerial vehicle via a coupling line. The first unmanned aerial vehicle includes a first controller, and the second unmanned aerial vehicle includes a second controller. The first controller causes the first unmanned aerial vehicle to move forward or to stop moving forward when an anomaly has occurred in flying of the second unmanned aerial vehicle.

An unmanned aerial vehicle according to a forty-sixth aspect is an unmanned aerial vehicle that delivers a package, and the unmanned aerial vehicle includes a plurality of rotary wings, a plurality of first motors that respectively rotate the plurality of rotary wings, a main body that supports the plurality of first motors, a connector that is to be connected to a rail provided at a position spaced apart from a ground surface with the main body hanging from the connector, a movable block that sets an inclination of an virtual plane containing the plurality of rotary wings relative to a support direction in which the connector is supported on the rail, and a control circuit that controls the plurality of first motors and the movable block. The connector includes a first end connected to the main body and a second end to be slidably connected to the rail. The support direction extends from the first end toward the second end of the connector. When the second end of the connector is connected to the rail, the control circuit (i) sets a rotation rate of the plurality of first motors to a rotation rate that is lower than a minimum rotation rate necessary for causing the unmanned aerial vehicle to float and that is higher than a minimum rotation rate necessary for propelling the unmanned aerial vehicle in a direction in which the rail extends, and (ii) causes the movable block to increase an angle formed by a normal direction of the virtual plane relative to the support direction of the connector.

An unmanned aerial vehicle according to a forty-seventh aspect is an unmanned aerial vehicle according to the forty-sixth aspect. The movable block is disposed between the main body and the connector.

An unmanned aerial vehicle according to a forty-eighth aspect is an unmanned aerial vehicle according to the forty-sixth or forty-seventh aspect. The unmanned aerial vehicle further includes a pair of wings.

An unmanned aerial vehicle according to a forty-ninth aspect is an unmanned aerial vehicle according to the forty-eighth aspect. After the movable block has increased the angle, the control circuit disengages the connector from the rail when a propulsion speed of the unmanned aerial vehicle exceeds a predetermined value.

An unmanned aerial vehicle according to a fiftieth aspect is an unmanned aerial vehicle according to the forty-ninth aspect. When the connector is disengaged from the rail, the control circuit causes the movable block to reduce the angle and controls the rotation rate of the plurality of first motors to a rotation rate higher than the minimum rotation rate necessary for causing the unmanned aerial vehicle to float.

An unmanned aerial vehicle according to a fifty-first aspect is an unmanned aerial vehicle according to any one of the forty-sixth to fiftieth aspects. In the above (ii), the control circuit controls the rotation rate of the plurality of first motors so as to increase the angle to greater than 15 degrees.

An unmanned aerial vehicle according to a fifty-second aspect is an unmanned aerial vehicle according to the fifty-first aspect. In the above (ii), the control circuit controls the rotation rate of the plurality of first motors so as to increase the angle to greater than 45 degrees.

An unmanned aerial vehicle according to a fifty-third aspect is an unmanned aerial vehicle according to the fifty-second aspect. In the above (ii), the control circuit controls the rotation rate of the plurality of first motors so as to increase the angle to greater than 65 degrees.

An unmanned aerial vehicle according to a fifty-fourth aspect is an unmanned aerial vehicle according to the fifty-third aspect. In the above (ii), the control circuit controls the rotation rate of the plurality of first motors so as to increase the angle to greater than 80 degrees.

An unmanned aerial vehicle according to a fifty-fifth aspect is an unmanned aerial vehicle according to any one of the forty-fifth to fifty-fourth aspects. The connector includes a support portion swingably connected to the main body and a first arm connected to one end of the support portion.

An unmanned aerial vehicle according to a fifty-sixth aspect is an unmanned aerial vehicle according to the fifty-fifth aspect. The first arm is a hanger for hanging the unmanned aerial vehicle from the rail.

An unmanned aerial vehicle according to a fifty-seventh aspect is an unmanned aerial vehicle according to the fifty-fifth or fifty-sixth aspect. The connector further includes a wheel that is connected to the first arm and that allows the connector to rotatably make contact with the rail.

An unmanned aerial vehicle according to a fifty-eighth aspect is an unmanned aerial vehicle according to the fifty-fifth aspect. The connector further includes a second arm connected to the one end of the support portion.

An unmanned aerial vehicle according to a fifty-ninth aspect is an unmanned aerial vehicle according to the fifty-eighth aspect. The first arm is a first hanger for hanging the unmanned aerial vehicle from the rail. The second arm is a second hanger for hanging the unmanned aerial vehicle from the rail. The connector further includes a first actuator that sets an angle of the first arm relative to the support portion and a second actuator that sets an angle of the second arm relative to the support portion.

An unmanned aerial vehicle according to a sixtieth aspect is an unmanned aerial vehicle according to the fifty-ninth aspect. The connector further includes a base disposed between the support portion and the first and second arms and a third actuator that sets an angle of the base relative to the support portion.

An unmanned aerial vehicle according to a sixty-first aspect is an unmanned aerial vehicle according to the fifty-ninth or sixtieth aspect. The first arm includes a first hook that extends from a first connected end connected to the first actuator to a first open end. The second arm includes a second hook that extends from a second connected end connected to the second actuator to a second open end. The first hook includes a first bent portion that is bent in a first direction and located between the first connected end and the first open end. The second hook includes a second bent portion that is bent in a second direction opposite the first direction and located between the second connected end and the second open end.

An unmanned aerial vehicle according to a sixty-second aspect is an unmanned aerial vehicle according to the sixty-first aspect. When the unmanned aerial vehicle is slidably hung from a first rail via the first hook, the control circuit hooks the second hook onto a second rail extending along and adjacent to the first rail by controlling the second actuator and disengages the first hook from the first rail by controlling the first actuator.

An unmanned aerial vehicle according to a sixty-third aspect is an unmanned aerial vehicle according to the sixty-first aspect. When the unmanned aerial vehicle is slidably hung from the first rail via the first hook and the second hook, the control circuit disengages the second hook from the first rail and hooks the second hook onto the second rail extending along and adjacent to the first rail by controlling the second actuator and disengages the first hook from the first rail and hooks the first hook onto the second rail by controlling the first actuator.

An unmanned aerial vehicle according to a sixty-fourth aspect is an unmanned aerial vehicle according to the sixty-second or sixty-third aspect. When the second hook is to be hooked onto the second rail, the control circuit tilts the main body or the support portion in the second direction so as to position the second connected end higher than the first connected end. When the first hook is to be disengaged from the first rail, the control circuit tilts the main body or the support portion in the first direction so as to position the first connected end higher than the second connected end.

An unmanned aerial vehicle according to a sixty-fifth aspect is an unmanned aerial vehicle according to any one of the forty-sixth to sixty-fourth aspects. The unmanned aerial vehicle further includes a hanging wire connected to the main body and provided to hang the package and a lift motor that is capable of taking up the hanging wire. The control circuit positions the unmanned aerial vehicle vertically above a storage device for storing the package with the connector being connected to the rail. In addition, the control circuit lets out the hanging wire by actuating the lift motor, lowers the package from the main body, and stores the package into the storage device.

An unmanned aerial vehicle according to a sixty-sixth aspect is an unmanned aerial vehicle according to the sixty-fifth aspect. While the control circuit lets out the hanging wire, the control circuit adjusts at least one of the position and the orientation of the main body in accordance with the position of the package relative to the storage device.

An unmanned aerial vehicle according to a sixty-seventh aspect is an unmanned aerial vehicle according to the sixty-sixth aspect. When the position of the package is displaced in a third direction from the position vertically above the storage device, the control circuit moves the unmanned aerial vehicle in a fourth direction opposite the third direction along the direction in which the rail extends.

An unmanned aerial vehicle according to a sixty-eighth aspect is an unmanned aerial vehicle according to the sixty-seventh aspect. When the position of the package is displaced in a fifth direction from the position vertically above the storage device, the control circuit causes the unmanned aerial vehicle to swing about the rail and moves the center of gravity of the unmanned aerial vehicle in a sixth direction opposite the fifth direction.

An unmanned aerial vehicle according to a sixty-ninth aspect is an unmanned aerial vehicle according to the sixty-fifth aspect. The unmanned aerial vehicle further includes a thruster device removably attached to the package. The thruster device includes a plurality of propellers, a plurality of second motors that respectively rotate the plurality of propellers, and a support member that supports the plurality of second motors.

An unmanned aerial vehicle according to a seventieth aspect is an unmanned aerial vehicle according to the sixty-ninth aspect. The plurality of propellers include a first propeller disposed on a first side portion of the support member and a second propeller disposed on a second side portion of the support member, and the second side portion is different from the first side portion.

An unmanned aerial vehicle according to a seventy-first aspect is an unmanned aerial vehicle according to the seventieth aspect. The control circuit causes the thruster device to actuate at least one of the plurality of second motors in at least a portion of a period in which the hanging wire is let out.

A delivery system according to a seventy-second aspect includes an unmanned aerial vehicle according to any one of the forty-sixth to seventy-first aspects, a plurality of support pillars, and the rail stretched between two adjacent support pillars of the plurality of support pillars.

A delivery system according to a seventy-third aspect is a delivery system according to the seventy-second aspect. The plurality of support pillars are each a utility pole.

A delivery system according to a seventy-fourth aspect is a delivery system according to the seventy-third aspect. The delivery system further includes a lead-in support pillar disposed within a predetermined site and a lead-in wire stretched to the rail. The height from the ground surface to a first connection point at which the lead-in wire and the lead-in support pillar are connected to each other is lower than the height from the ground surface to a second connection point at which the lead-in wire and the rail are connected to each other.

A delivery system according to a seventy-fifth aspect is a delivery system according to the seventy-fourth aspect. The utility pole supports a power transmission line, and the rail is provided at a position lower than the power transmission line and higher than the leading end of the lead-in support pillar.

A delivery system according to a seventy-sixth aspect is a delivery system according to the seventy-second aspect. The plurality of support pillars are each a streetlight.

A delivery system according to a seventy-seventh aspect includes an unmanned aerial vehicle according to any one of the sixty-second to sixty-fourth aspects, a plurality of support pillars, and the first rail and the second rail stretched between two adjacent support pillars of the plurality of support pillars.

A delivery system according to a seventy-eighth aspect is a delivery system according to the seventy-seventh aspect. The delivery system further includes a protective net stretched along a position vertically below an approaching region of the first rail and the second rail. The approaching region is a region where the distance between the first rail and the second rail is smaller than or equal to the size of the unmanned aerial vehicle.

A delivery system according to a seventy-ninth aspect is a delivery system according to the seventy-seventh or seventy-eighth aspect. The height of at least a portion of the second rail is higher than the height of the adjacent first rail.

Thus far, a method of controlling an unmanned aerial vehicle has been described based on some embodiments. The present disclosure, however, is not limited to these embodiments. Unless departing from the spirit of the present disclosure, an embodiment obtained by making various modifications conceivable by a person skilled in the art to the present embodiments or an embodiment obtained by combining the constituent elements in different embodiments may also be included within the scope of one or more aspects.

Among the configurations described in Embodiments 1 to 6, the configuration of the child drone where the presence of a parent drone is not assumed or the configuration of the parent drone where the presence of a child drone is not assumed may be applied as a configuration of a standalone drone as illustrated in Embodiments 7 to 9, aside from the parent-child drone system. In this case, an embodiment in which one of the parent drone and the child drone described in Embodiments 1 to 6 is replaced with another object (e.g., a package or a moving means other than an unmanned aerial vehicle) may also be encompassed by the present disclosure. For example, the parent drone illustrated in FIG. 31 may be replaced with a package.

INDUSTRIAL APPLICABILITY

The present disclosure can be used in, for example but not limited to, a system of delivering packages with a drone in a city area.

The invention claimed is:
1. A lifting system, comprising:
an unmanned aerial vehicle that delivers a package to a destination by flying separated from the ground;
a first device attachable to and detachable from the unmanned aerial vehicle;
a first wire that connects the first device and the unmanned aerial vehicle;

a first reel capable of reeling in and out the first wire;

a second device attachable to and detachable from the package and attachable to and detachable from the first device;

a second wire that connects the first device and the second device;

a second reel capable of reeling in and out the second wire; and a controller, wherein the controller:

causes the unmanned aerial vehicle to hover in air when the unmanned aerial vehicle is to unload and deliver the package to the destination;

causes the first reel to reel out the first wire and detach, from the unmanned aerial vehicle, the first device attached in advance to the unmanned aerial vehicle and the second device attached in advance to the first device; and after detaching the first device and the second device from the unmanned aerial vehicle, further causes the second reel to reel out the second wire and detach the second device from the first device; and wherein the first device includes:

a first support member attachable to and detachable from the unmanned aerial vehicle;

a plurality of first motors disposed on a plurality of side portions of the first support member; and a plurality of first propellers actuated by the plurality of first motors, and the second device includes:

a second support member attachable to and detachable from the first device;

a plurality of second motors disposed on a plurality of side portions of the second support member; and a plurality of second propellers actuated by the plurality of second motors.

2. The lifting system according to claim 1, wherein the controller:

actuates at least one of the plurality of first motors or the plurality of second motors after detaching the first device and the second device from the unmanned aerial vehicle; and actuates the plurality of first motors and the plurality of second motors after detaching the second device from the first device.

3. The lifting system according to claim 1, wherein after detaching the second device from the first device, the controller:

controls the plurality of first motors; and controls the plurality of second motors differently than the plurality of first motors, the plurality of first motors and the plurality of second motors being differently controlled to make a first hanging direction and a second hanging direction mutually different, the first hanging direction being a direction in which the first wire extends between the unmanned aerial vehicle and the first device, and the second hanging direction being a direction in which the second wire extends between the first device and the second device.

4. The lifting system according to claim 1, wherein after detaching the second device from the first device, the controller:

controls the plurality of first motors; and controls the plurality of second motors differently than the plurality of first motors, the plurality of first motors and the plurality of second motors being differently controlled to reduce or eliminate an amount of overlap between the first device and the second device in terms of area in a view perpendicular to a ground surface.

5. The lifting system according to claim 1, wherein after detaching the package from the second device, the controller:

reels in the second wire using the second reel;

attaches the second device to the first device;

reels in the first wire using the first reel; and attaches the first device and the second device to the unmanned aerial vehicle.

6. The lifting system according to claim 1, wherein the unmanned aerial vehicle includes an arm capable of engaging a rail, and when the unmanned aerial vehicle is in a position separated from the ground and the arm is engaged with the rail, the controller detaches the first device and the second device from the unmanned aerial vehicle.

7. The lifting system according to claim 1, further comprising:

a third device attachable between and detachable from between the first device and the second device;

a third wire that connects the first device and the third device;

a third reel capable of reeling in the third wire;

a fourth wire that connects the third device and the second device; and a fourth reel capable of reeling in the fourth wire.

8. The lifting system according to claim 1, wherein an angle of each of rotary shafts of the plurality of first motors relative to a virtual surface passing through a center of each of the plurality of first propellers is at least −45 degrees and at most +45 degrees.

9. The lifting system according to claim 8, further comprising:

one or more actuators that adjust the angle of each of the rotary shafts of the plurality of first motors relative to the virtual surface.

10. The lifting system according to claim 9, wherein the one or more actuators:

incline each of the rotary shafts so that the angle is 0 degrees in a first mode; and incline each of the rotary shafts so that the angle is an elevation angle in a second mode.

11. The lifting system according to claim 1, wherein the first wire is directly connected to at least one connection point of the first support member.

12. The lifting system according to claim 11, wherein the first support member includes a first frame that is polygonal, and the at least one connection point is movable in a plane that is within the first frame and parallel to a virtual surface.

13. The lifting system according to claim 1, wherein the first wire includes a first main wire and a plurality of first sub-wires, first ends of the plurality of first sub-wires are respectively directly connected to a plurality of connection points of the first support member, second ends of the plurality of first sub-wires are connected to one end of the first main wire at a single common connection point, and the first main wire hangs and supports the first support member from the unmanned aerial vehicle via the plurality of first sub-wires.

14. The lifting system according to claim 13,
wherein the first support member includes a first frame that is polygonal, and
the plurality of connection points are arranged at a plurality of portions of the first frame corresponding to a plurality of vertices.

15. The lifting system according to claim 1,
wherein the plurality of side portions of the first support member include a first side portion and a second side portion on opposite sides of at least one of the first support member or the package,
the plurality of first motors include:
a first motor provided on the first side portion and including a first rotary shaft; and
a second first motor provided on the second side portion and including a second rotary shaft, and
the controller executes:
a third mode that rotates the first rotary shaft in a first direction of rotation and rotates the second rotary shaft in a second direction of rotation opposite the first direction of rotation; and
a fourth mode that rotates the first rotary shaft and the second rotary shaft in the second direction of rotation.

16. The lifting system according to claim 15,
wherein the plurality of first motors further include:
a third first motor that is provided on the first side portion in a position adjacent to the first first motor in a virtual surface and includes a third rotary shaft; and
a fourth first motor that is provided on the second side portion in a position adjacent to the second first motor in the virtual surface and includes a fourth rotary shaft, and
the controller:
rotates the third rotary shaft in the second direction of rotation and rotates the fourth rotary shaft in the first direction of rotation in the third mode; and
rotates the third rotary shaft and the fourth rotary shaft in the first direction of rotation in the fourth mode.

17. The lifting system according to claim 1,
wherein the second device further includes a sensor that detects a position of a storage device for storing the package.

\* \* \* \* \*